US005377303A

United States Patent [19]

Firman

[11] Patent Number: 5,377,303

[45] Date of Patent: Dec. 27, 1994

[54] CONTROLLED COMPUTER INTERFACE

[75] Inventor: Thomas R. Firman, Oakland, Calif.

[73] Assignee: Articulate Systems, Inc., Woburn, Mass.

[21] Appl. No.: 165,014

[22] Filed: Dec. 9, 1993

Related U.S. Application Data

[63] Continuation of Ser. No. 973,435, Nov. 9, 1992, abandoned, which is a continuation of Ser. No. 370,779, Jun. 23, 1989, abandoned.

[51] Int. Cl.[5] .......... G10L 9/00

[52] U.S. Cl. .......... 395/2.84; 395/2.6

[58] Field of Search .......... 381/41–45; 395/2.6, 2.84

[56] References Cited

U.S. PATENT DOCUMENTS

| | | | |
|---|---|---|---|
| 3,928,724 | 12/1975 | Bryman et al. | 179/1 |
| 4,144,582 | 3/1979 | Hyatt | 381/43 |
| 4,462,080 | 7/1984 | Johnstone et al. | 395/2 |
| 4,627,001 | 12/1986 | Stapleford et al. | 381/48 |
| 4,677,569 | 6/1987 | Nakano et al. | 381/43 |
| 4,688,195 | 8/1987 | Thompson et al. | 364/300 |
| 4,704,696 | 11/1987 | Reimer et al. | 395/2 |
| 4,776,016 | 10/1988 | Hansen | 381/42 |
| 4,783,803 | 11/1988 | Baker et al. | 381/42 |
| 4,799,144 | 1/1989 | Parruck et al. | 364/200 |
| 4,811,243 | 3/1989 | Racine | 381/43 |
| 4,827,520 | 5/1989 | Zeinstra | 381/41 |

(List continued on next page.)

OTHER PUBLICATIONS

Calingaert, "Assemblers, Compilers, and Program Translation", Computer Science Press, 1979, pp. 142–150.

Peterson et al., *Operating System Concepts*, 1985, p. 136.

Manual, Inside Macintosh vol. I, Apple Computer, Inc., "The Toolbox Event Manager", pp. I-243–I-260, 1985.

VoiceScribe DragonWriter, Installation Manual, Release 3.00, Dragon Systems, Inc, 1988.

VoiceScribe DragonWriter, DragonKey User's Manual, Release 3.00, Dragon Systems, Inc., 1988.

"HearHere Toolbox", sales brochure from SID Products, Inc., pp. 1–6, 1989.

(List continued on next page.)

*Primary Examiner*—Allen R. MacDonald
*Assistant Examiner*—Michael A. Sartori
*Attorney, Agent, or Firm*—Fish & Richardson

[57] ABSTRACT

Voice utterances are substituted for manipulation of a pointing device, the pointing device being of the kind which is manipulated to control motion of a cursor on a computer display and to indicate desired actions associated with the position of the cursor on the display, the cursor being moved and the desired actions being aided by an operating system in, the computer in response to control signals received from the pointing device, the computer also having an alphanumeric keyboard, the operating system being separately responsive to control signals received from the keyboard in accordance with a predetermined format specific to the keyboard; in the system, a voice recognizer recognizes the voiced utterance, and an interpreter converts the voiced utterance into control signals which will directly create a desired action aided by the operating system without first being converted into control signals expressed in the predetermined format specific to the keyboard. In another aspect, voiced utterances are converted to commands, expressed in a predefined command language, to be used by an operating system of a computer, by converting some voiced utterances into commands corresponding to actions to be taken by the operating system, and converting other voiced utterances into commands which carry associated text strings to be used as part of text being processed in an application program running under the operating system.

28 Claims, 159 Drawing Sheets

Microfiche Appendix Included
(3 Microfiche, 186 Pages)

U.S. PATENT DOCUMENTS

| | | | |
|---|---|---|---|
| 4,829,576 | 5/1989 | Porter | 381/44 |
| 4,907,274 | 5/1990 | Nomura et al. | 300/30 |
| 4,922,538 | 5/1990 | Tchorzewski | 381/42 |
| 4,931,950 | 6/1990 | Isle et al. | 381/110 |
| 4,949,382 | 8/1990 | Griggs | 381/44 |
| 4,962,535 | 10/1990 | Klwara et al. | 381/43 |
| 4,984,177 | 1/1991 | Rondel et al. | 364/513.5 |
| 5,036,538 | 7/1991 | Oken et al. | 381/43 |
| 5,054,082 | 10/1991 | Smith et al. | 381/42 |
| 5,086,472 | 2/1992 | Yoshida | 381/43 |
| 5,095,508 | 3/1992 | Fujimoto | 381/43 |

OTHER PUBLICATIONS

"SID" sound digitizer, assembly manual, available from CEDAR Technologies, P.O. Box 224, Dublin, N.H. 03444, pp. 1-15, 1989.

Shipman, "MacRecorder-A Speech Digitizer for the MacIntosh", MBUG Newsletter, Fall 1985, pp. 51-57.

V. Zue, S. Seneff and J. Glass, "Speech Database Development at MIT: TIMIT and Beyond", Speech Communication, vol. 9, (1990) pp. 351-356.

Holley R. Lange, "Voice Recognition and Voice Response: A Report on Tomorrow's Technologies", *Proceeding of the eleventh National Online Meeting,* May 1-3, 1990, pp. 233-240.

M. Brandetti et al., "Building Reliable Large Speech Databases: An Automated Approach", *Signal Processing* IV, vol. 1, pp. 147-150, 1988.

J. Caelen, "An Acquisition and Research System for an Evolving Nucleus of Acoustic-Phonetic Knowledge" IEEE, 8th Int'l. conference on Pattern Recognition, Paris, France, Oct. 27-31, 1986, pp. 896-898.

Japanese Lanugage "Transactions of the Institute of Electronics, Information and Communication Engineers", Series D, vol. J73-D-11, No. 10, Oct. 1990, pp. 1619-1629.

Hendriks, "A Formalism for Speech Database Access", Speech Communication Abstract of Article, vol. 9 (1990) pp. 381-388.

Carlson et al., "The Kth Speech Database", Speech Communication Abstract of Article, vol. 9, (1990) pp. 375-380.

Hedelin et al., "The Cth Speech Database: An Integrated Multilevel Approach", Speech Communication Abstract of Article, vol. 9 (1990), pp. 365-374.

Kurematsu et al., "ATR Japanese Speech Database As A Tool of Speech Recognition and Synthesis", Speech Communication Abstract of Article, vol. 9 (1990), pp. 357-363.

Zuc, "Speech Database Development at MIT: Timit and Beyond", Speech Communication 9 (1990) pp. 351-356, Abstract of Article.

Head ("Boulder Software Firm Has Affinity for MAC", *Denver Business Journal,* vol. 38, No. 23 (Mar. 2, 1987), Sec. 1, p. 15).

Yavelow ("Digital Sampling on the Apple MacIntosh", *Byte,* Jun., 1986). pp. 171-183.

Evans ("Talking to the Bug", *MicroCad News,* Mar., 1989), pp. 58-61.

DA Handler Language
Wednesday, June 7, 1989 4:54 PM

```
/*
DA Handler Language
  created on Wednesday, June 7, 1989
*/

#root   _DA_HANDLER;

_NEW = new ( symbol, drawing );

_FILE = file ( _NEW, open );

_EDIT = edit ( cut, copy, paste );

_DA_HANDLER = ( _FILE, _EDIT );

file;
new;
symbol;
drawing;
open;
edit;
cut;
copy;
paste;
```

FIG. 30

The Voice Navigator with a Mac SE or Mac Plus

Click in this top section to move up a level scroll ➡
go ➡
move ➡
spelling ➡
apple ➡
file ➡
edit ➡
view ➡
special ➡
first level Launch

CONTROLLED COMPUTER INTERFACE

This is a continuation of application Ser. No. 07/370,779, filed Jun. 23, 1989, now abandoned. This is a continuation of application Ser. No. 07/973,435, filed Nov. 9, 1992, now abandoned, which was a continuation of Ser. No. 07/370,779, filed Jun. 23, 1989, now abandoned. Appendix C is a microfiche appendix of the Voice Navigator executable code containing 3 microfiche with 186 frames.

BACKGROUND OF THE INVENTION

This invention relates to voice controlled computer interfaces.

Voice recognition systems can convert human speech into computer information. Such voice recognition systems have been used, for example, to control text-type user interfaces, e.g., the text-type interface of the disk operating system (DOS) of the IBM Personal Computer.

Voice control has also been applied to graphical user interfaces, such as the one implemented by the Apple Macintosh computer, which includes icons, pop-up windows, and a mouse. These voice control systems use voiced commands to generate keyboard keystrokes.

SUMMARY OF THE INVENTION

In general, in one aspect, the invention features enabling voiced utterances to be substituted for manipulation of a pointing device, the pointing device being of the kind which is manipulated to control motion of a cursor on a computer display and to indicate desired actions associated with the position of the cursor on the display, the cursor being moved and the desired actions being aided by an operating system in the computer in response to control signals received from the pointing device, the computer also having an alphanumeric keyboard, the operating system being separately responsive to control signals received from the keyboard in accordance with a predetermined format specific to the keyboard; a voice recognizer recognizes the voiced utterance, and an interpreter converts the voiced utterance into control signals which will directly create a desired action aided by the operating system without first being converted into control signals expressed in the predetermined format specific to the keyboard.

In general, in another aspect of the invention, voiced utterances are converted to commands, expressed in a predefined command language, to be used by an operating system of a computer, converting some voiced utterances into commands corresponding to actions to be taken by said operating system, and converting other voiced utterances into commands which carry associated text strings to be used as part of text being processed in an application program running under the operating system.

In general, in another aspect, the invention features generating a table for aiding the conversion of voiced utterances to commands for use in controlling an operating system of a computer to achieve desired actions in an application program running under the operating system, the application program including menus and control buttons; the instruction sequence of the application program is parsed to identify menu entries and control buttons, and an entry is included in the table for each menu entry and control button found in the application program, each entry in the table containing a command corresponding to the menu entry or control button.

In general, in another aspect, the invention features enabling a user to create an instance in a formal language of the kind which has a strictly defined syntax; a graphically displayed list of entries are expressed in a natural language and do not comply with the syntax, the user is permitted to point to an entry on the list, and the instance corresponding to the identified entry in the list is automatically generated in response to the pointing.

The invention enables a user to easily control the graphical interface of a computer. Any actions that the operating system can be commanded to take can be commanded by voiced utterances. The commands may include commands that are normally entered through the keyboard as well as commands normally entered through a mouse or any other input device. The user may switch back and forth between voiced utterances that correspond to commands for actions to be taken and voiced utterances that correspond to text strings to be used in an application program without giving any indication that the switch has been made. Any application may be made susceptible to a voice interface by automatically parsing the application instruction sequence for menus and control buttons that control the application.

Other advantages and features will become apparent from the following description of the preferred embodiment and from the claims.

DESCRIPTION OF THE PREFERRED EMBODIMENT

We first briefly describe the drawings.

Figure 18:
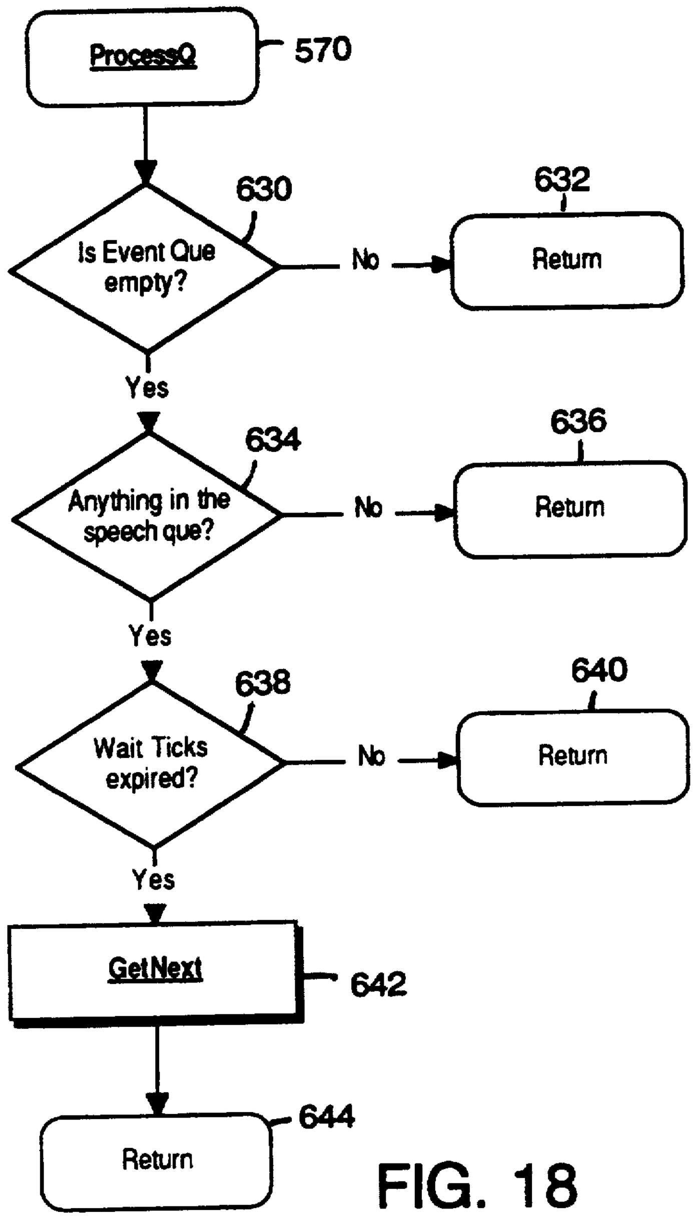
Figure 19:
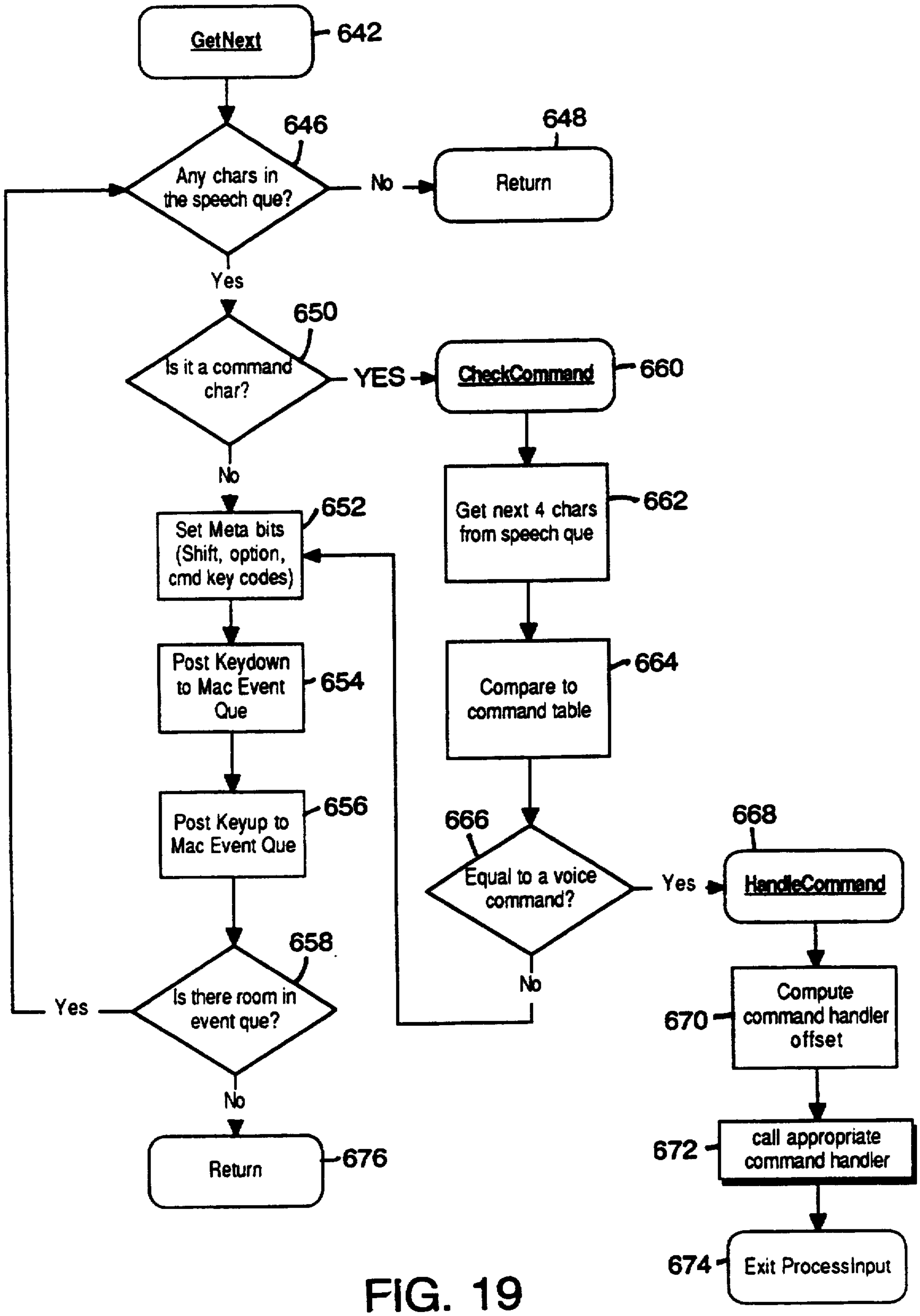
Figure 20:
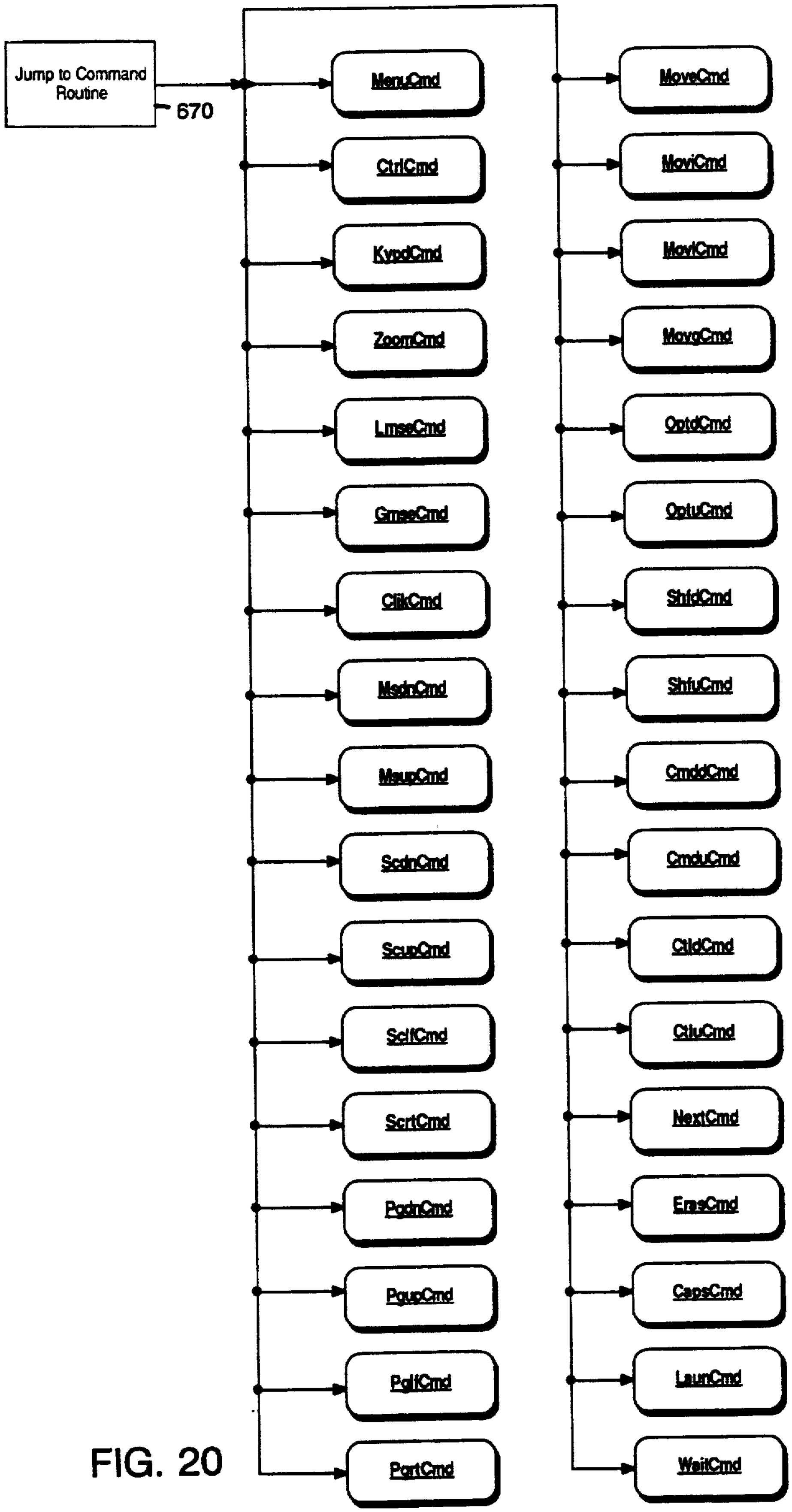
Figure 22:
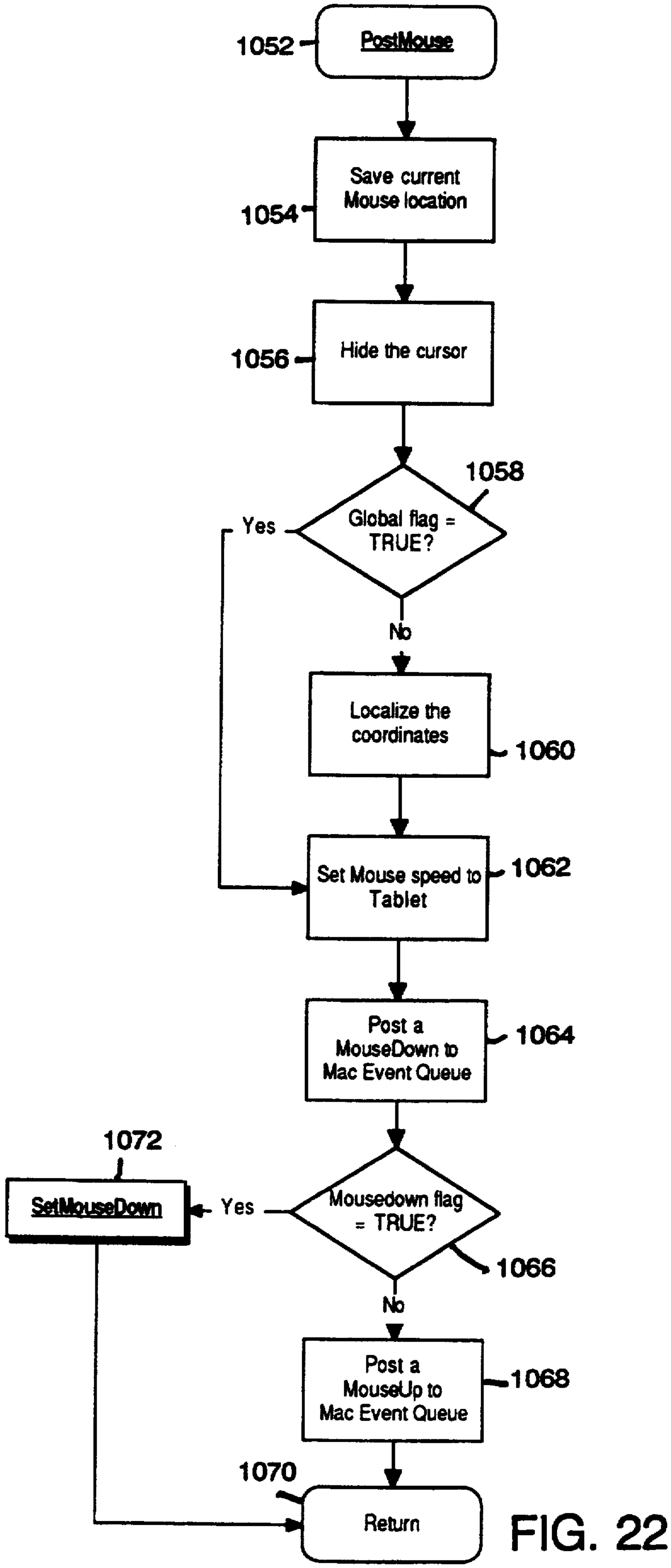
Figure 23:
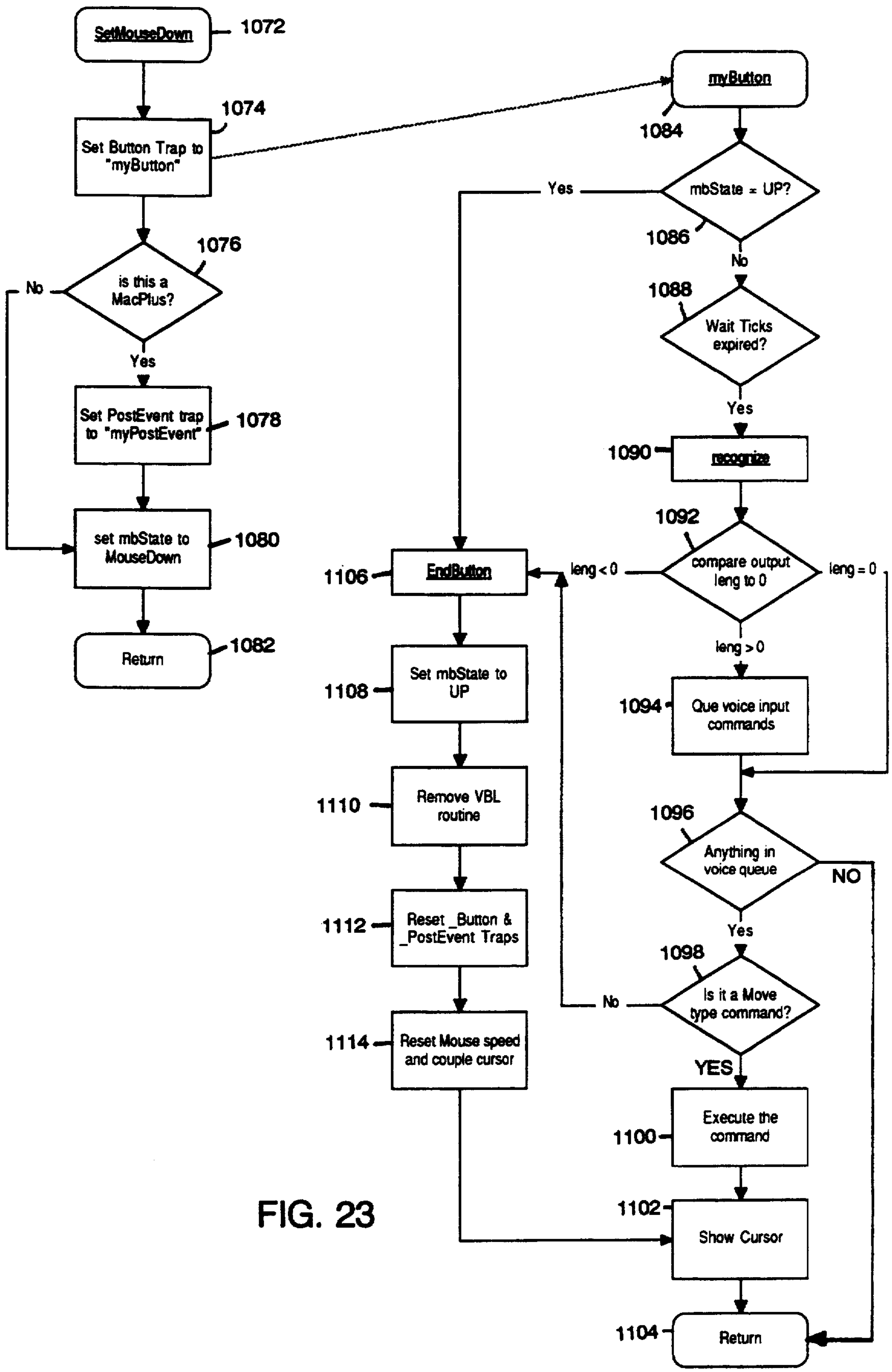
Figure 24:
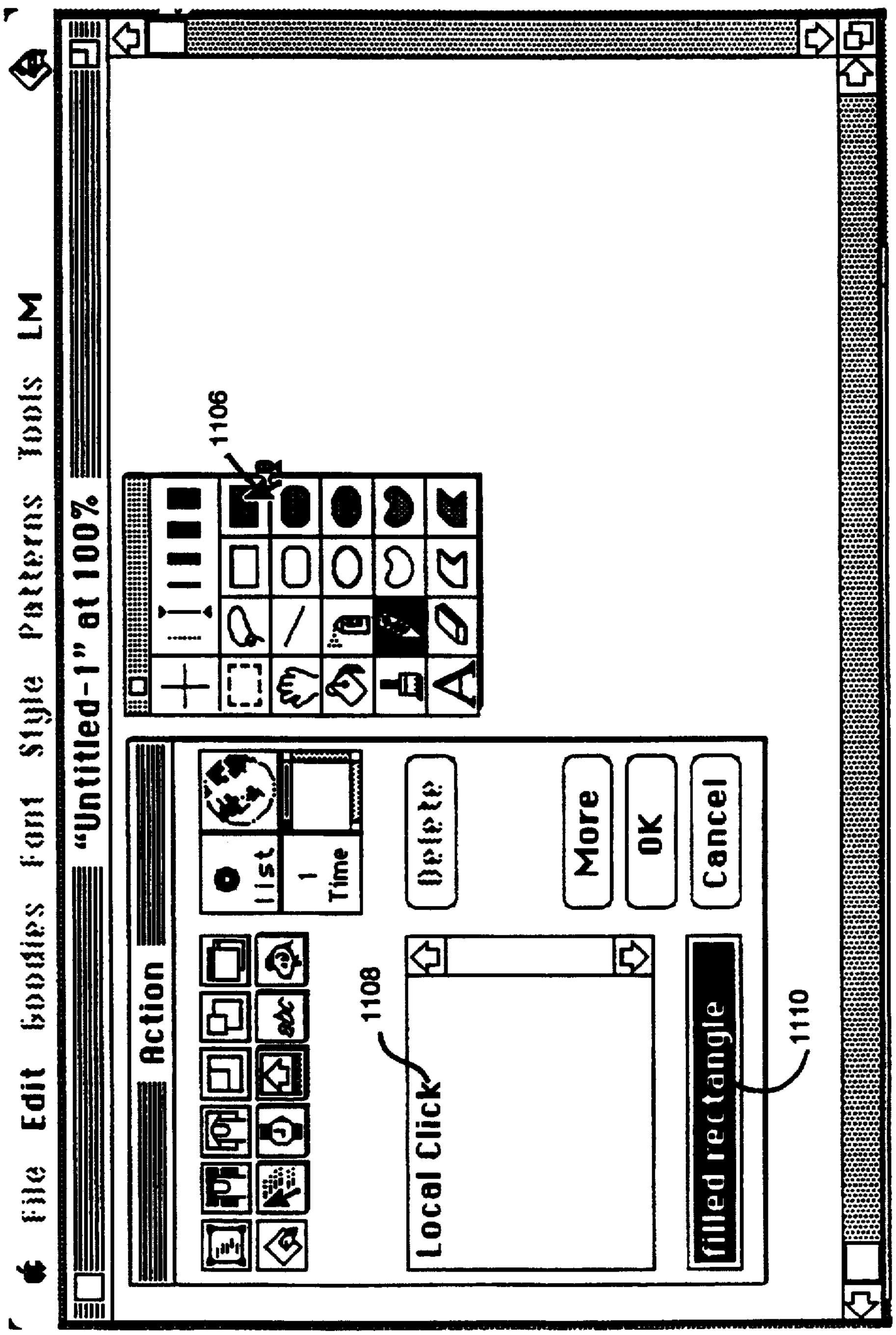
Figure 25:
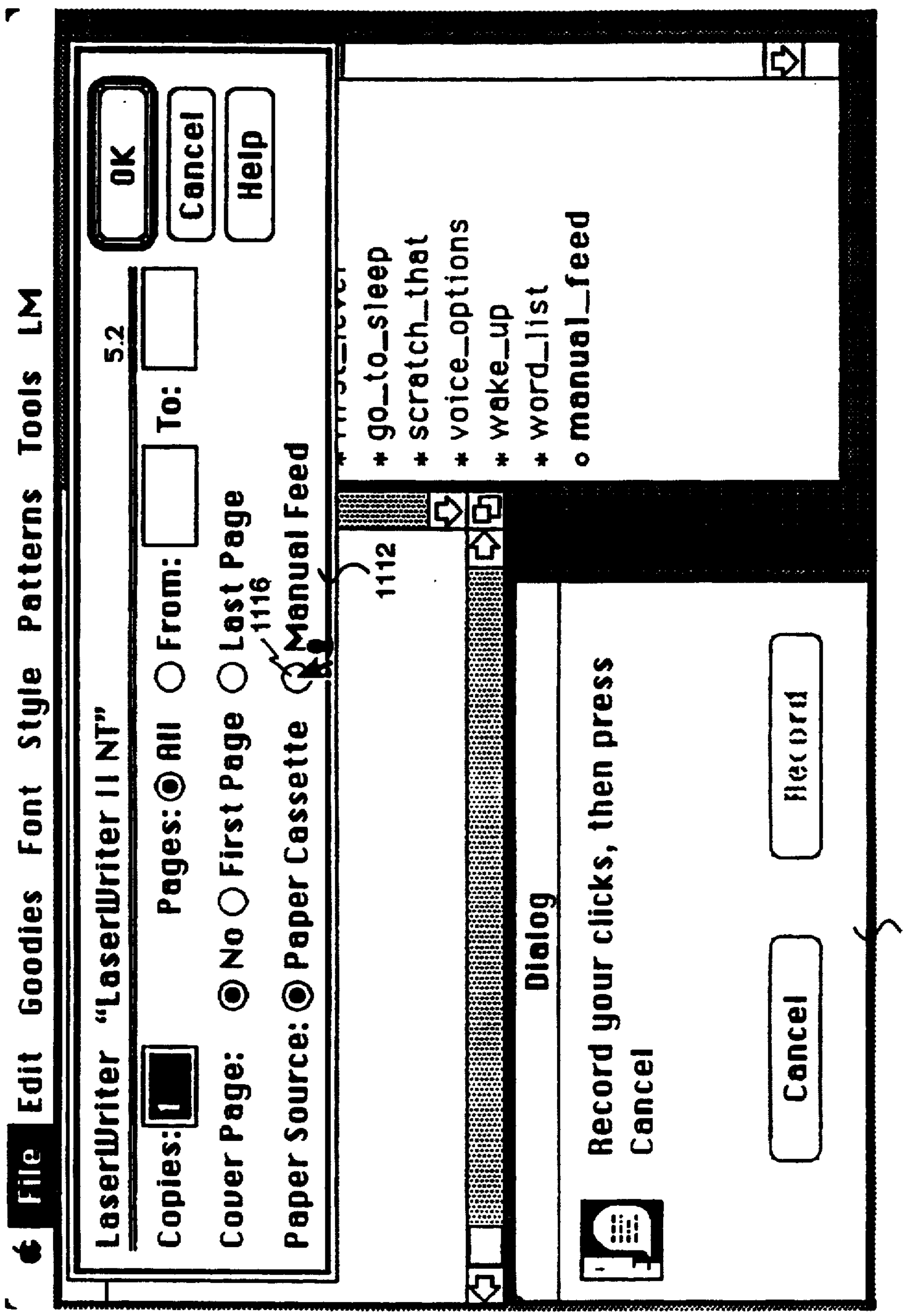
Figure 31:
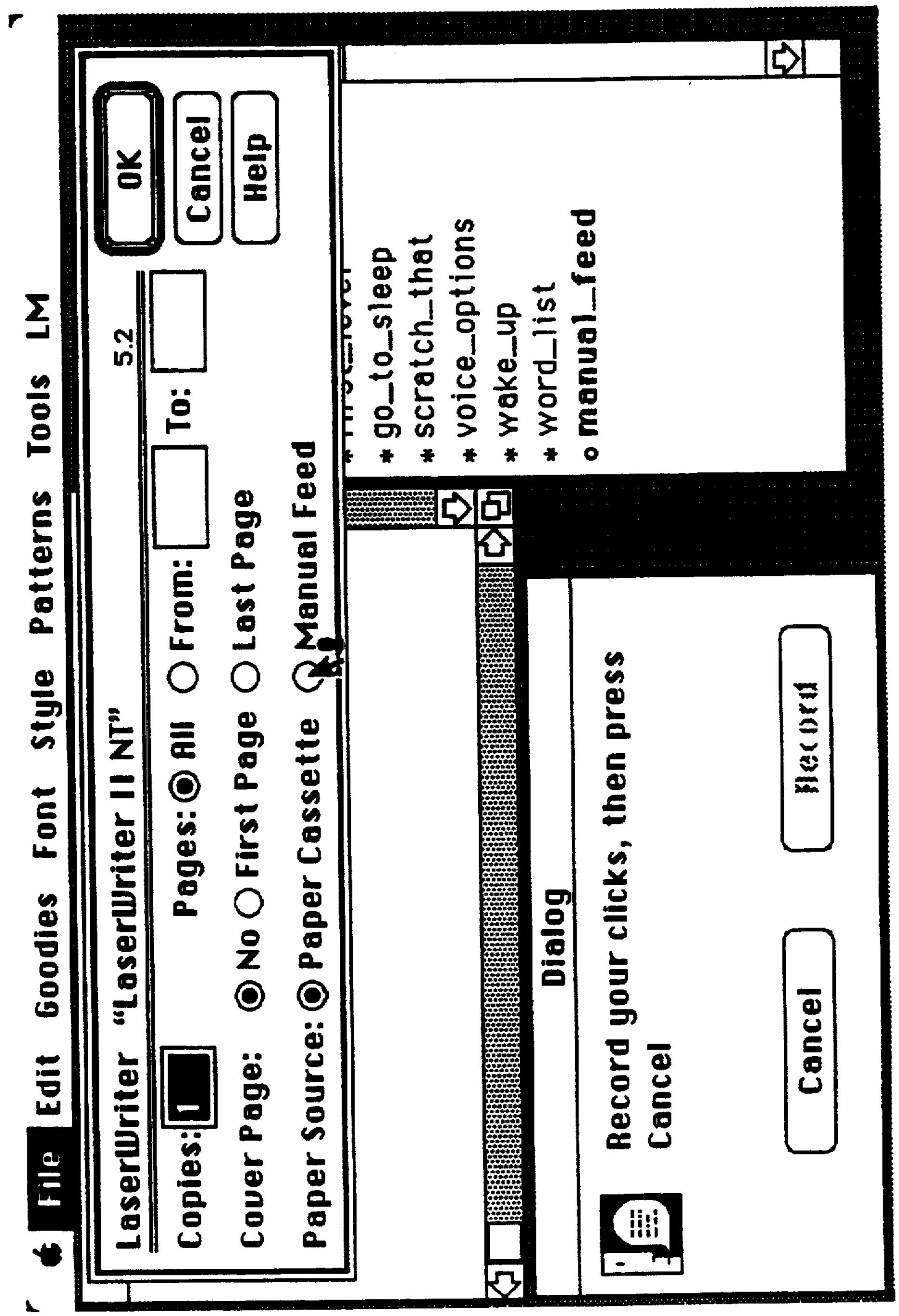
Figure 32:
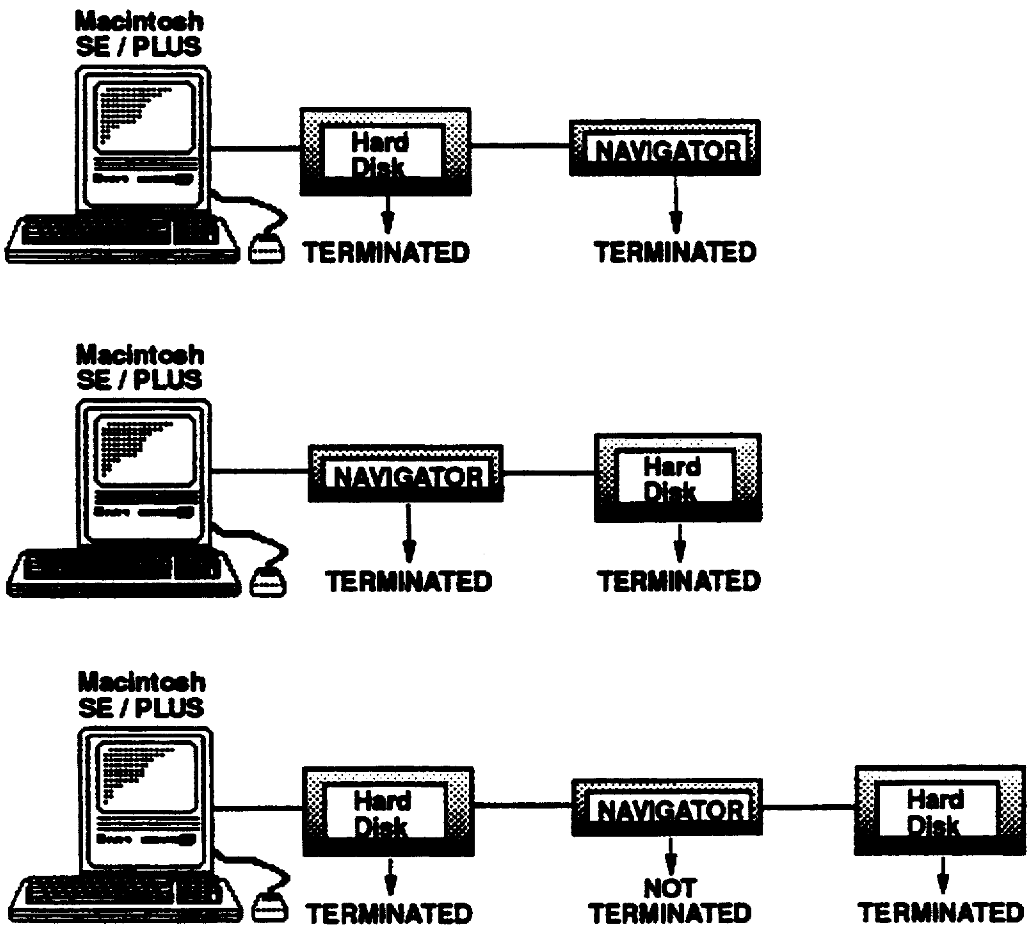
Figure 33:
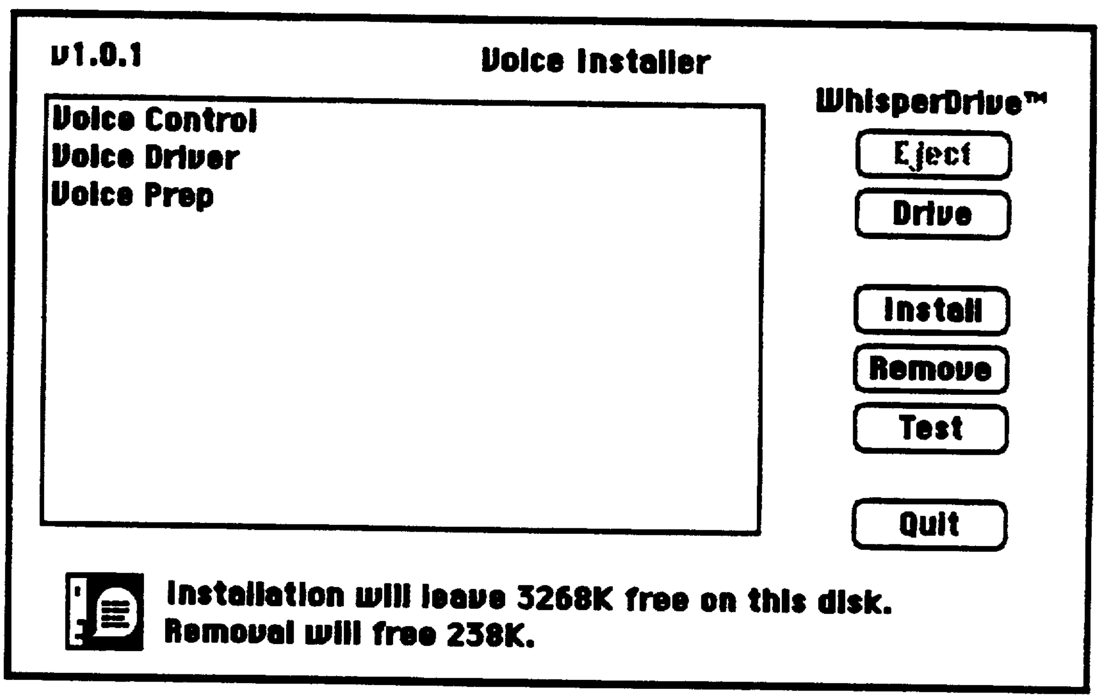
Figure 34:
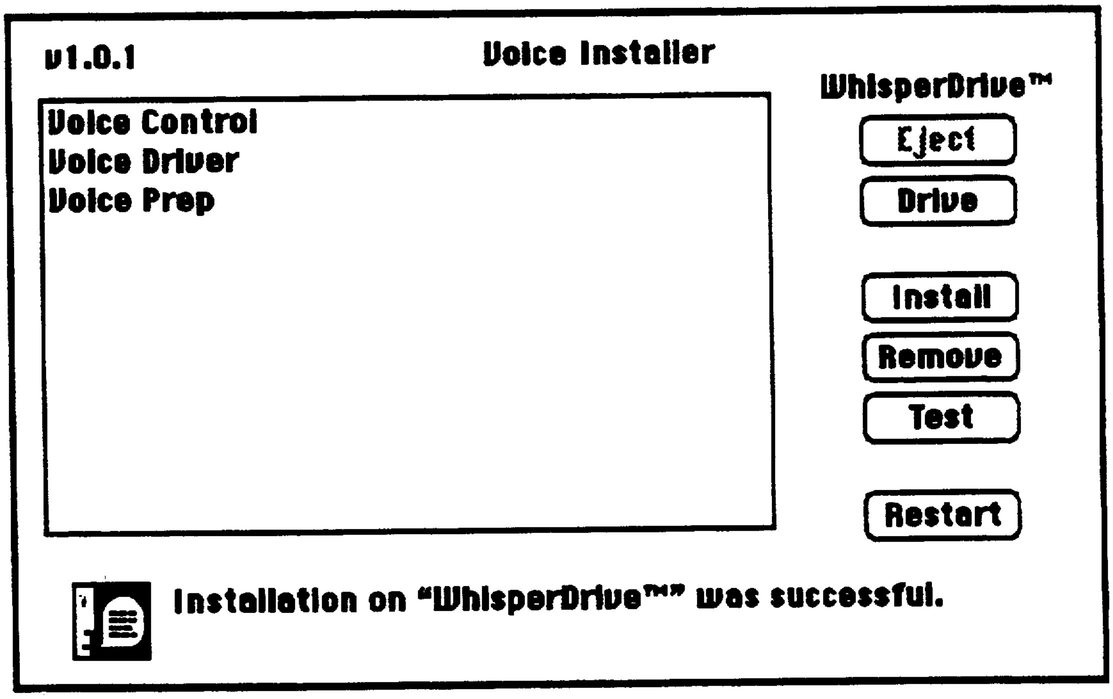
Figure 35:
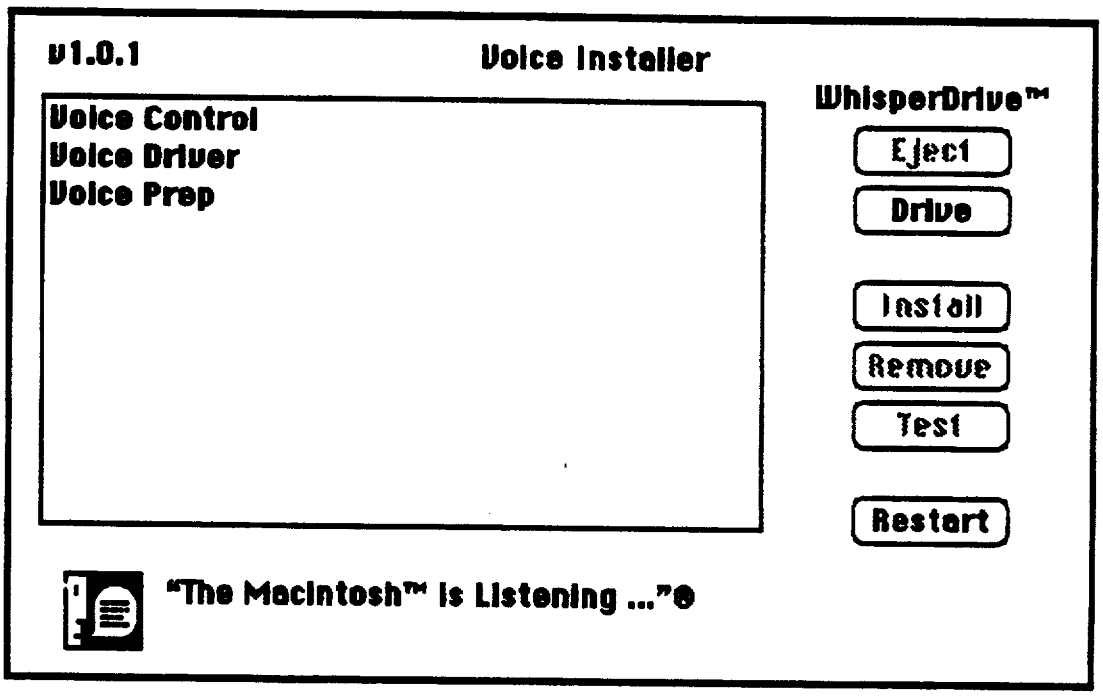
Figure 36:
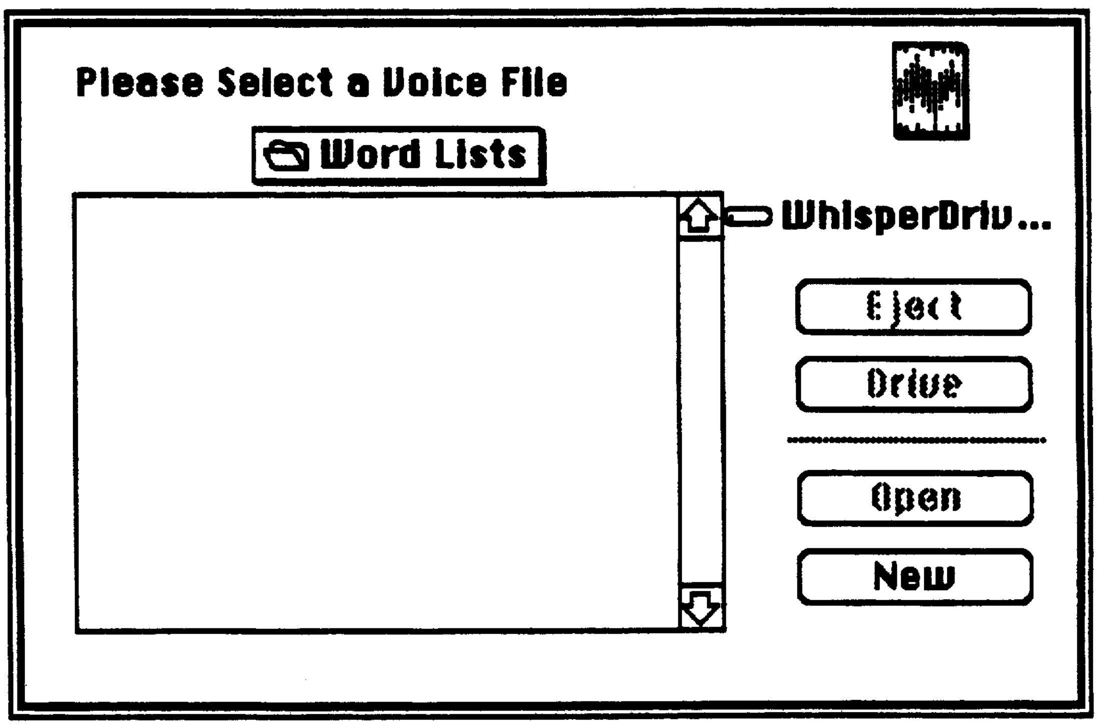
Figure 37:
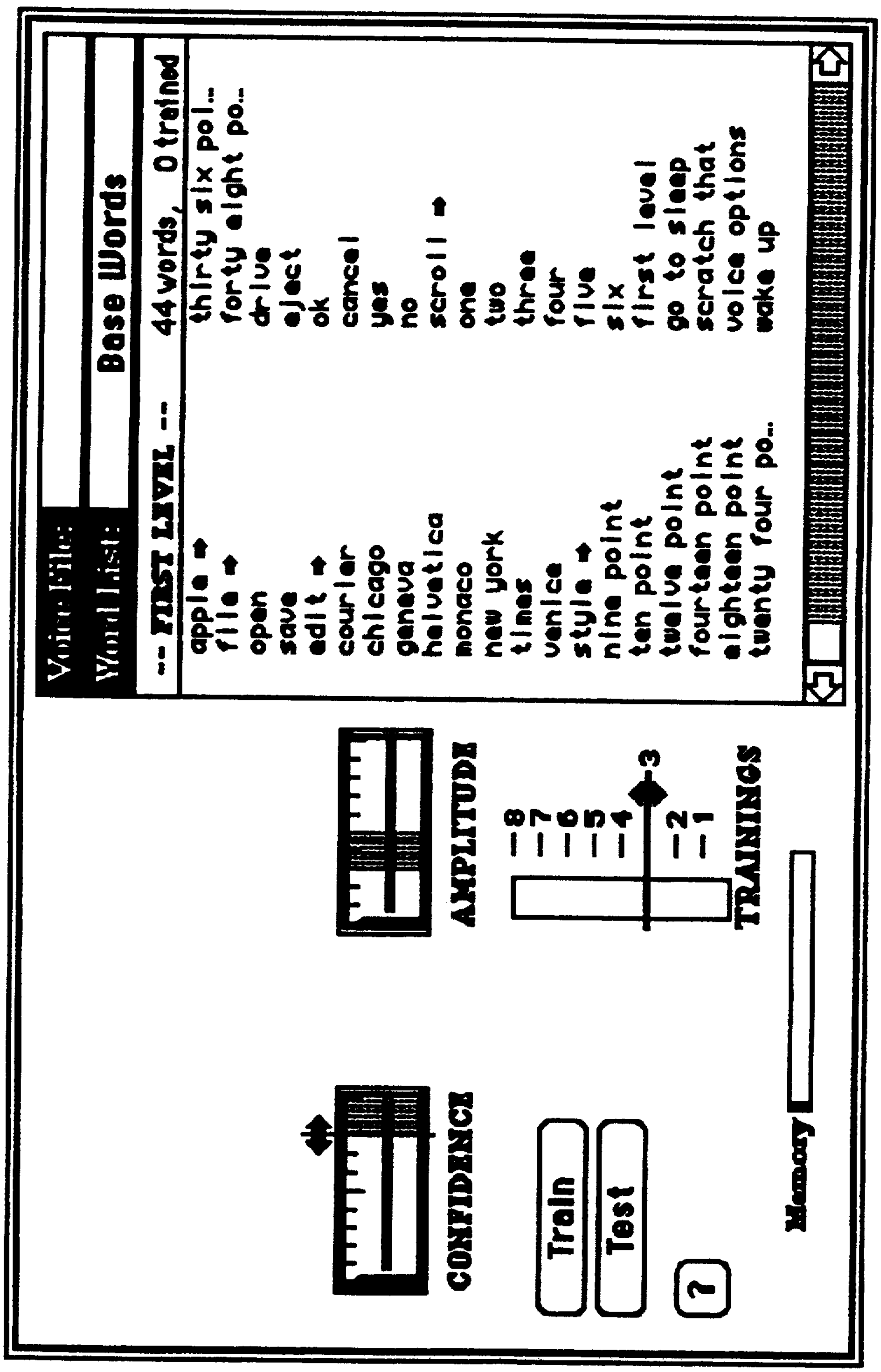
Figure 38:
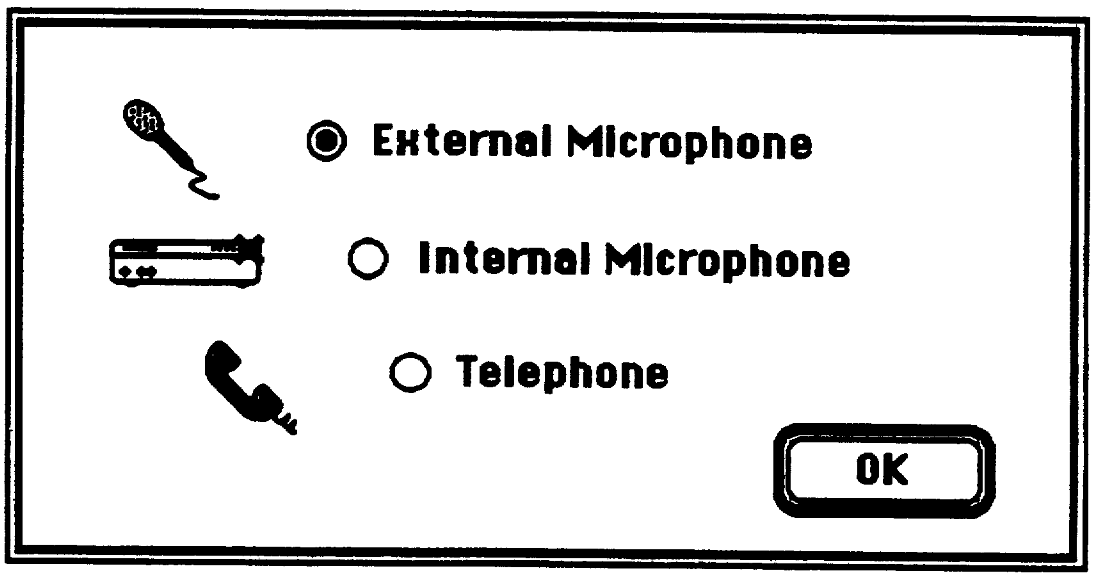
Figure 39:
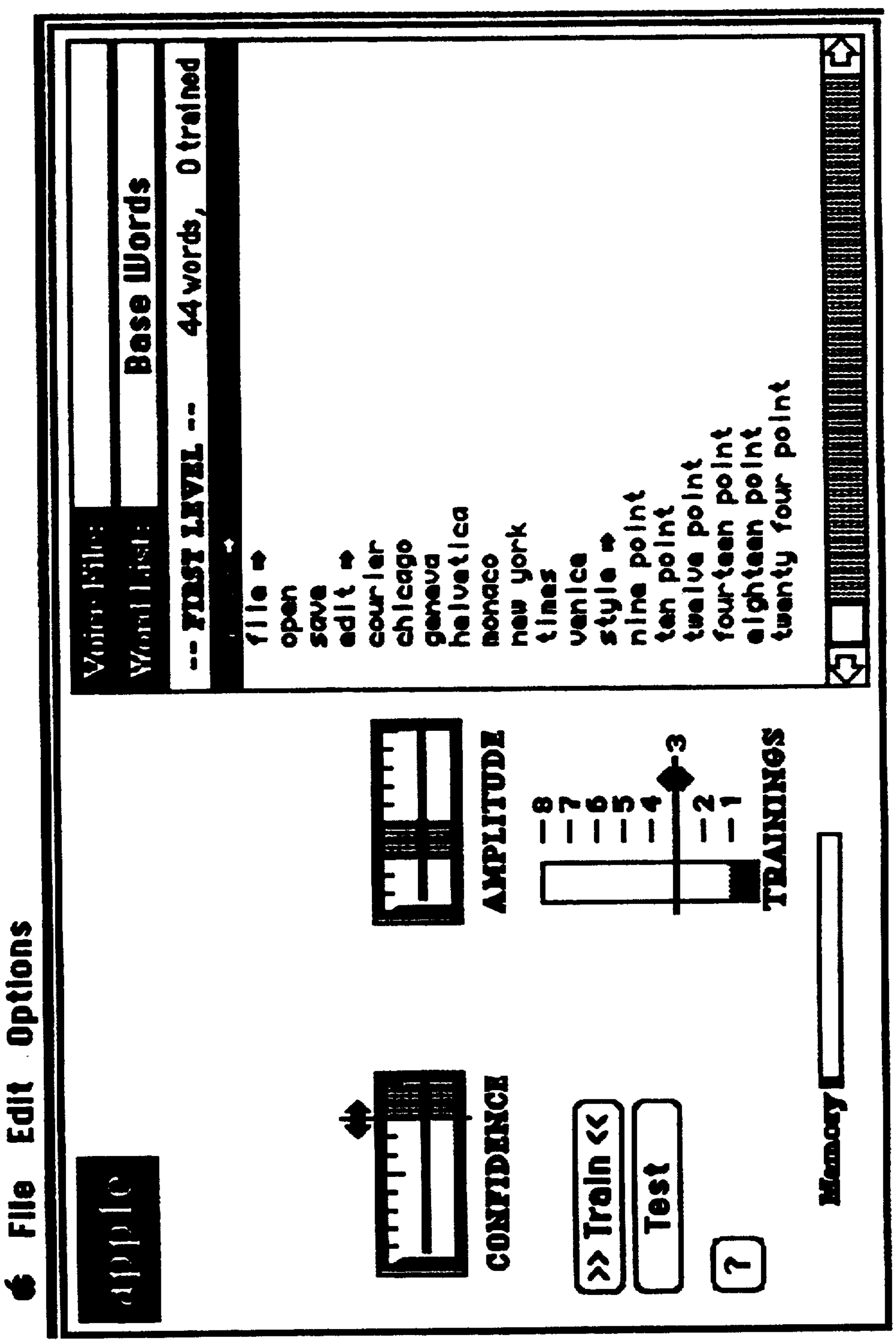
Figure 40:
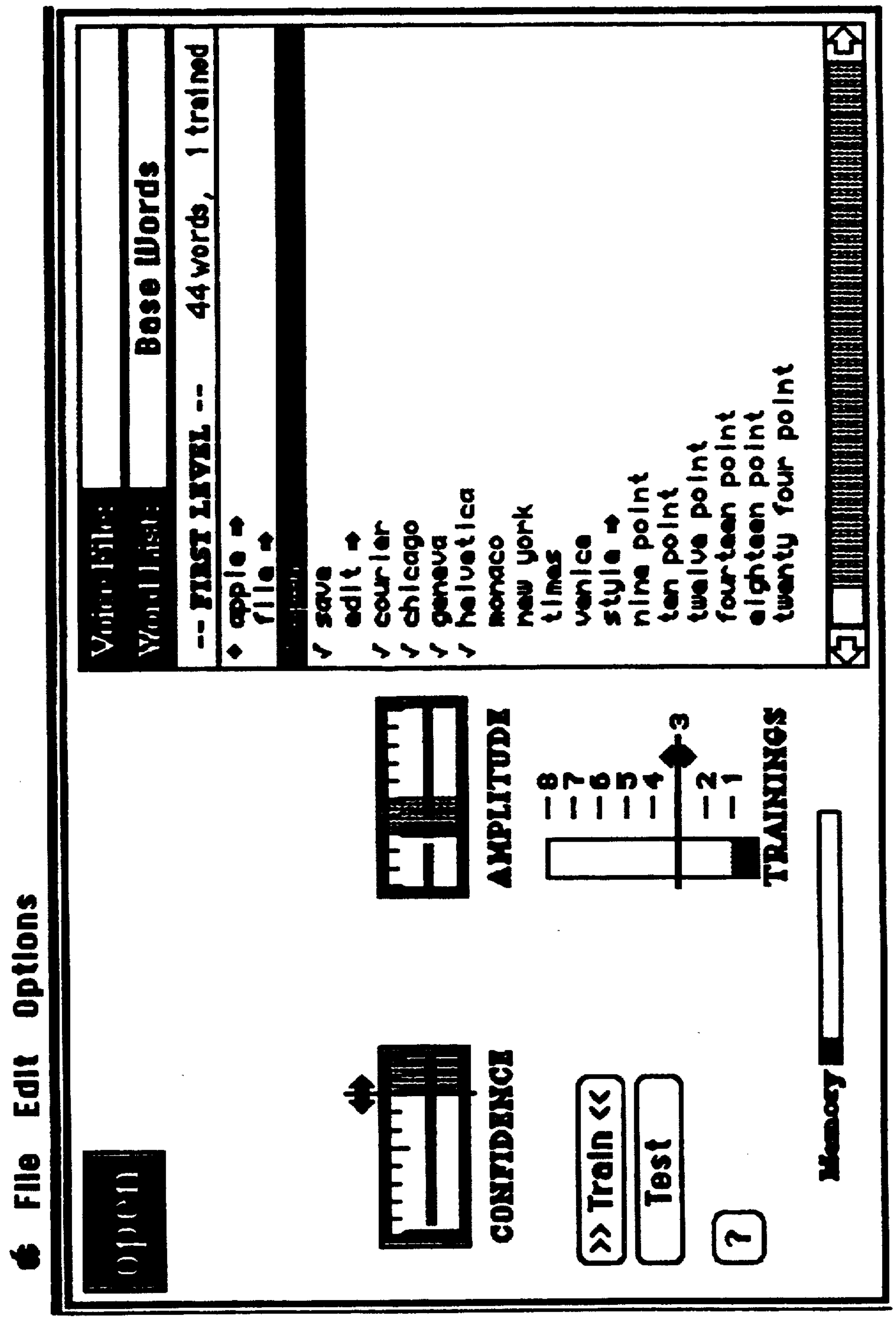
Figure 41:
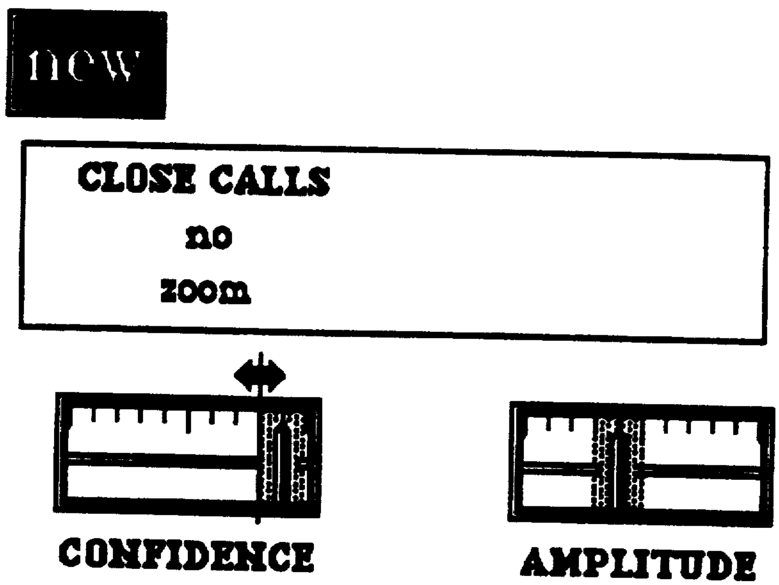
Figure 42:
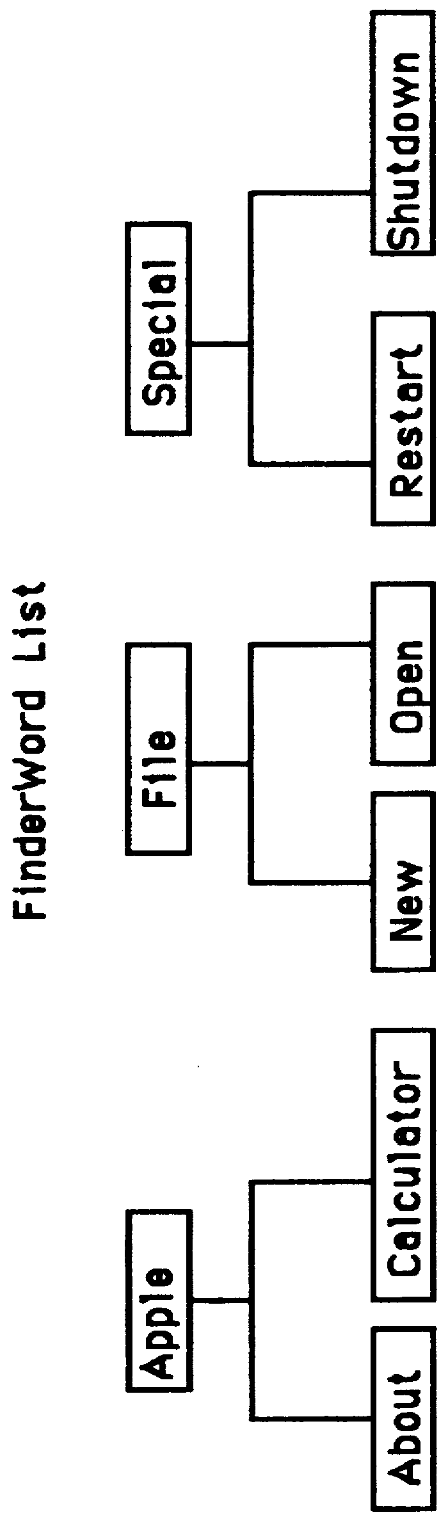
Figure 43:
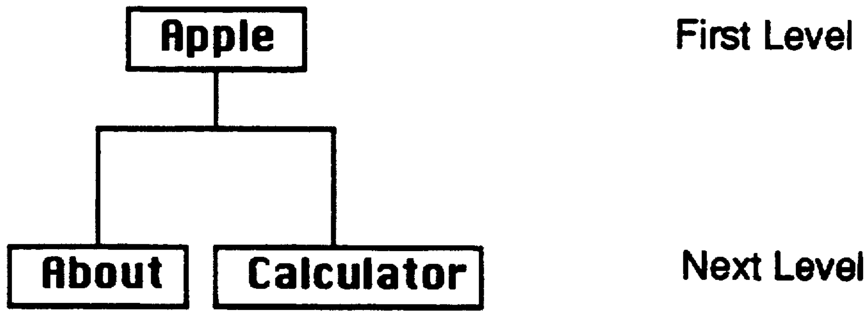
Figure 44:
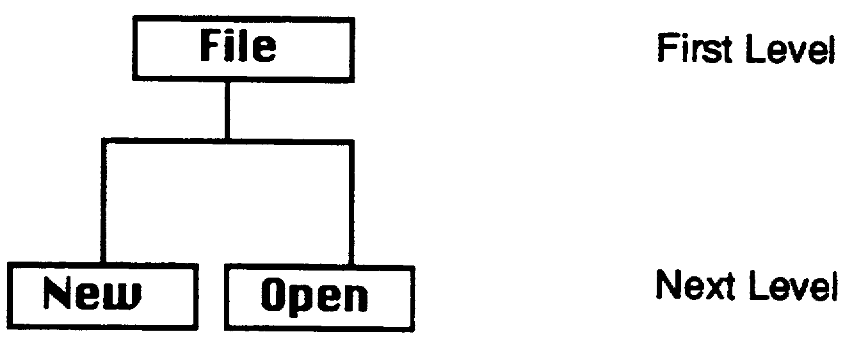
Figure 45:
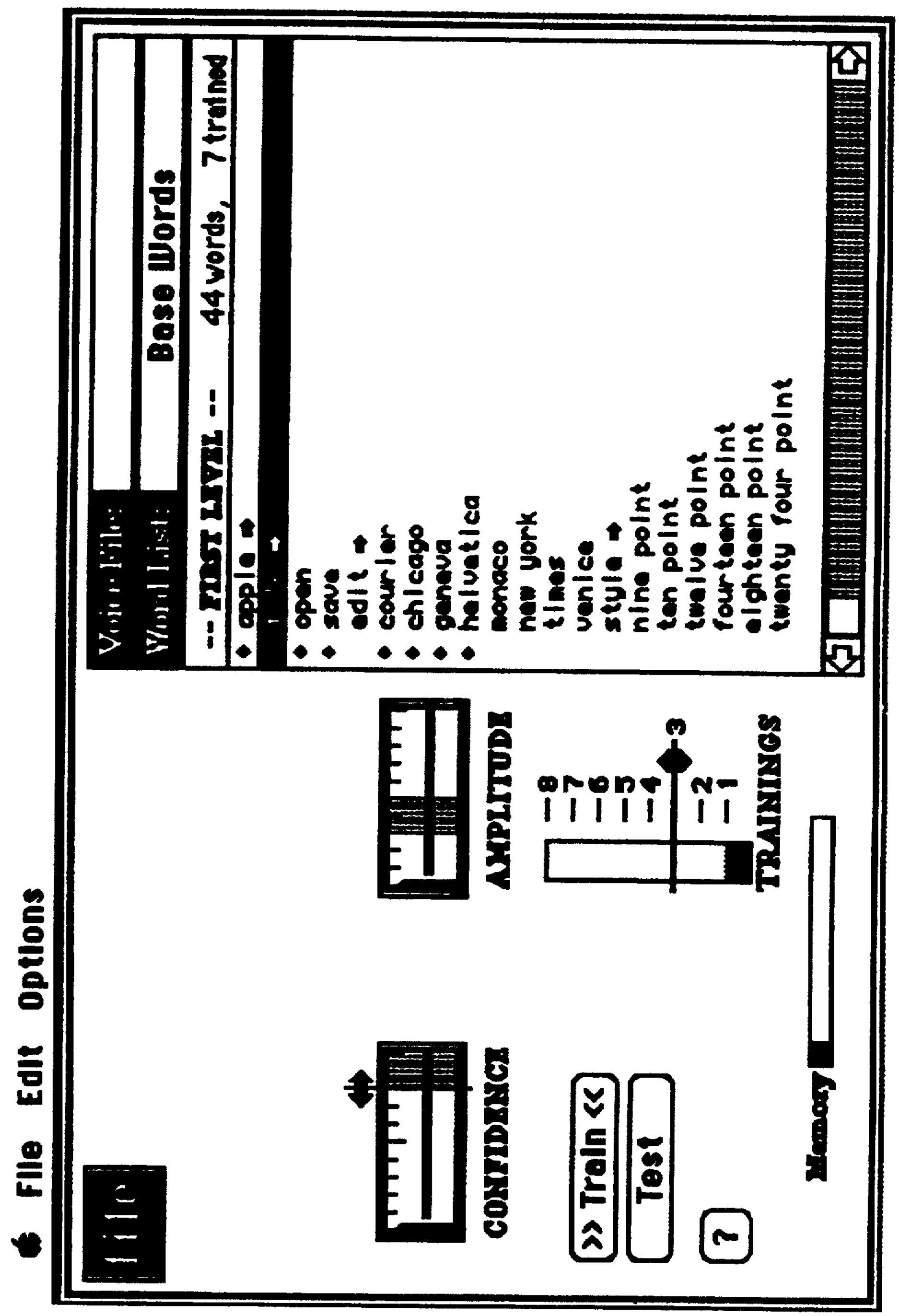
Figure 46:
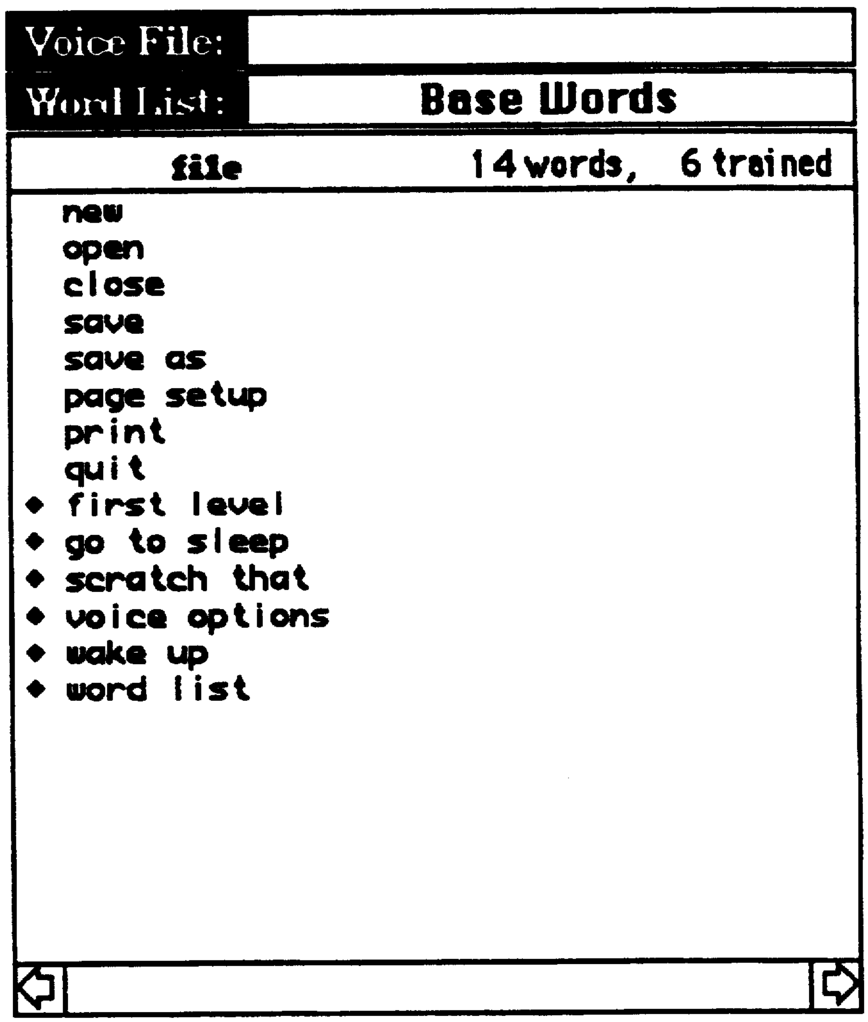
Figure 47:
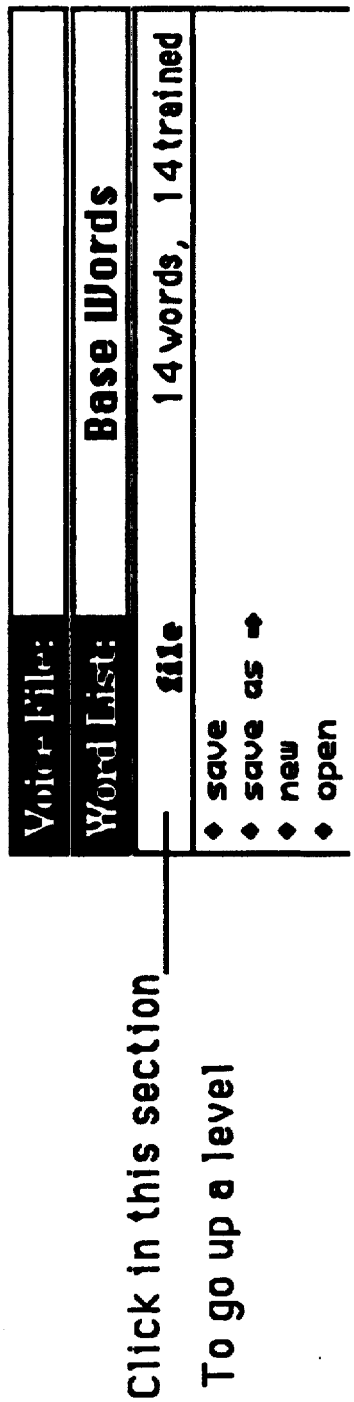
Figure 48:
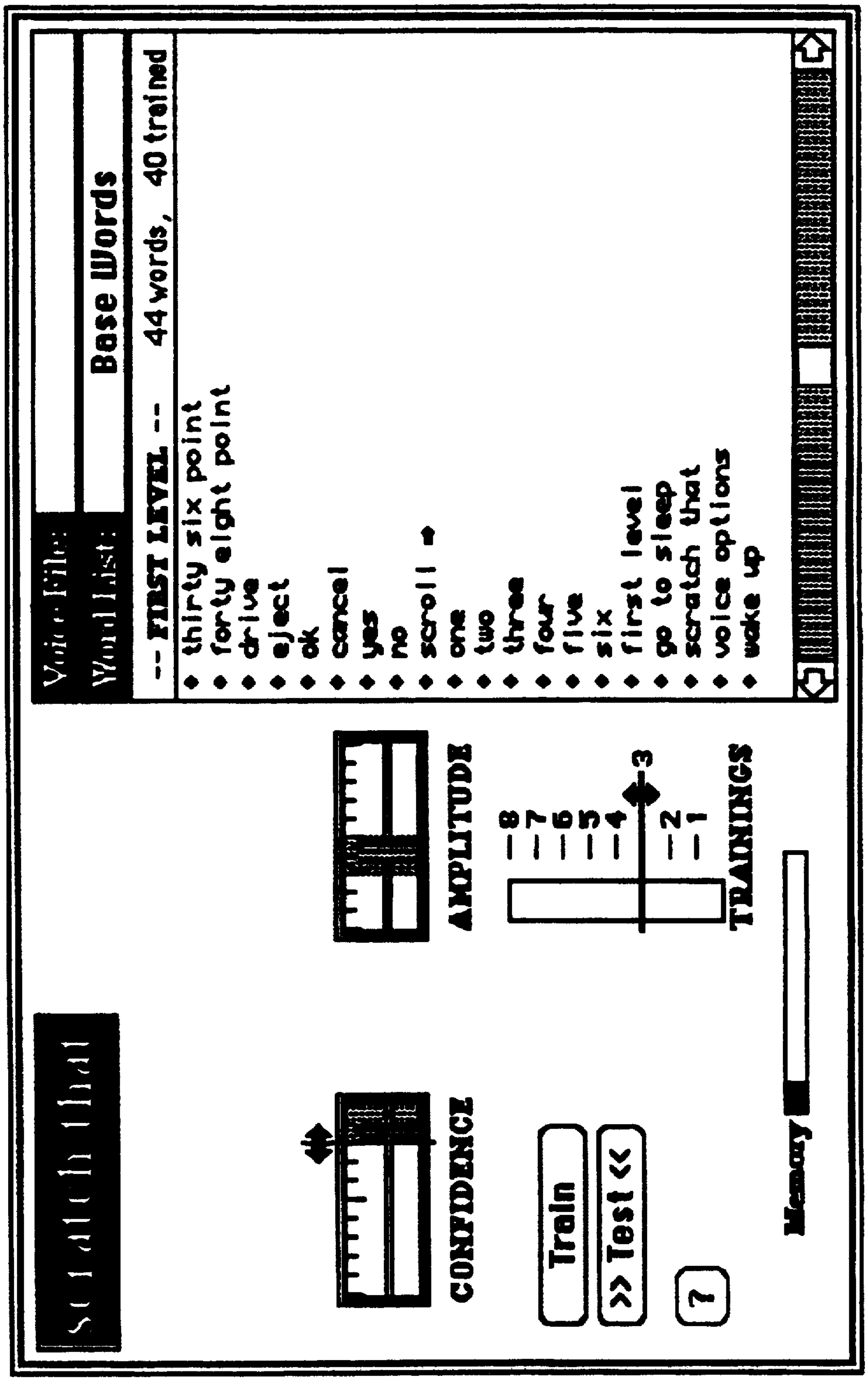
Figure 49:
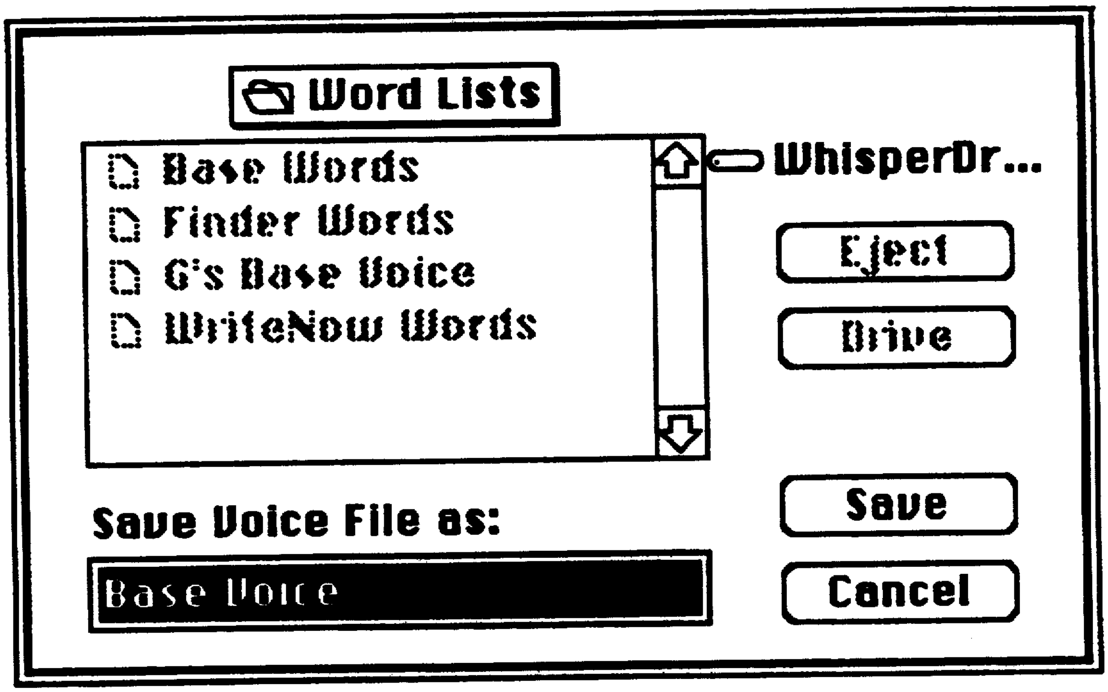
Figure 50:
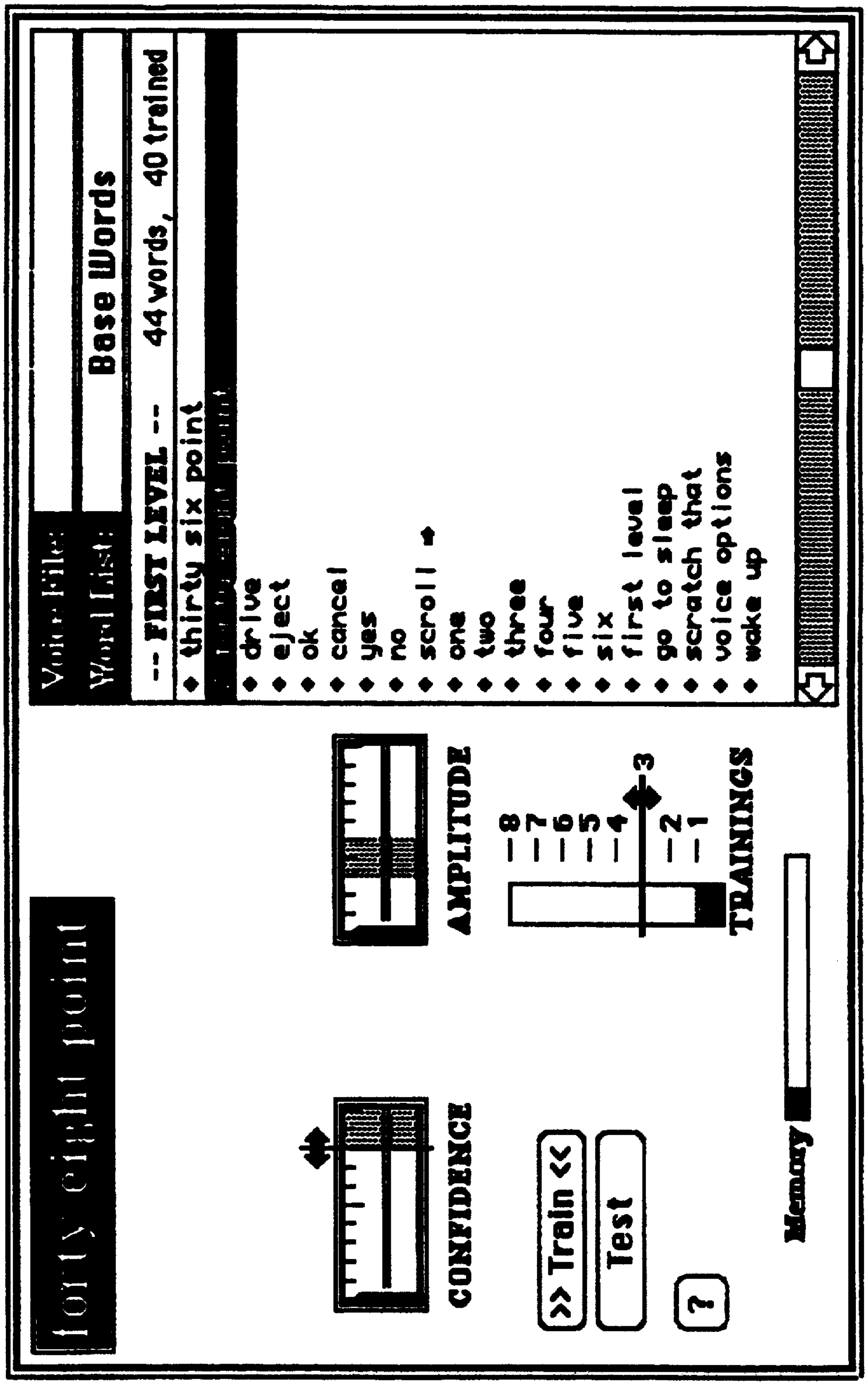
Figure 51:
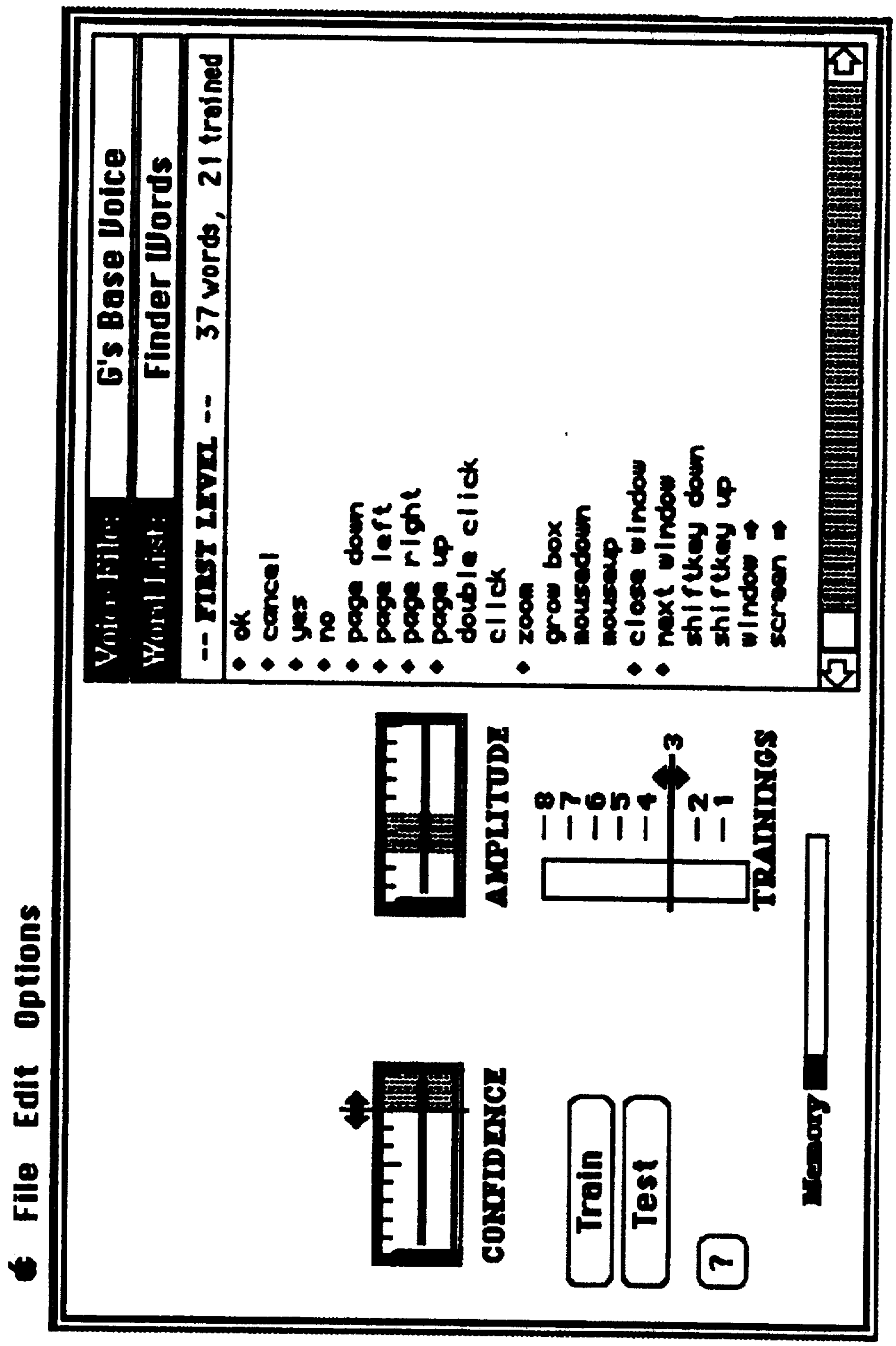
Figure 52:
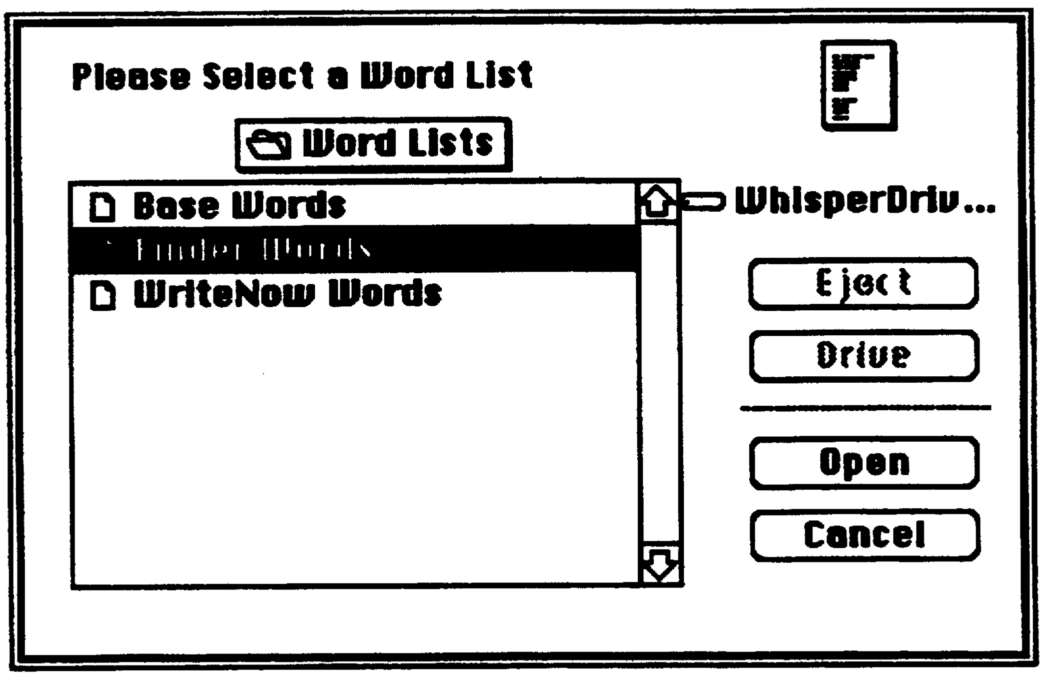
Figure 53:
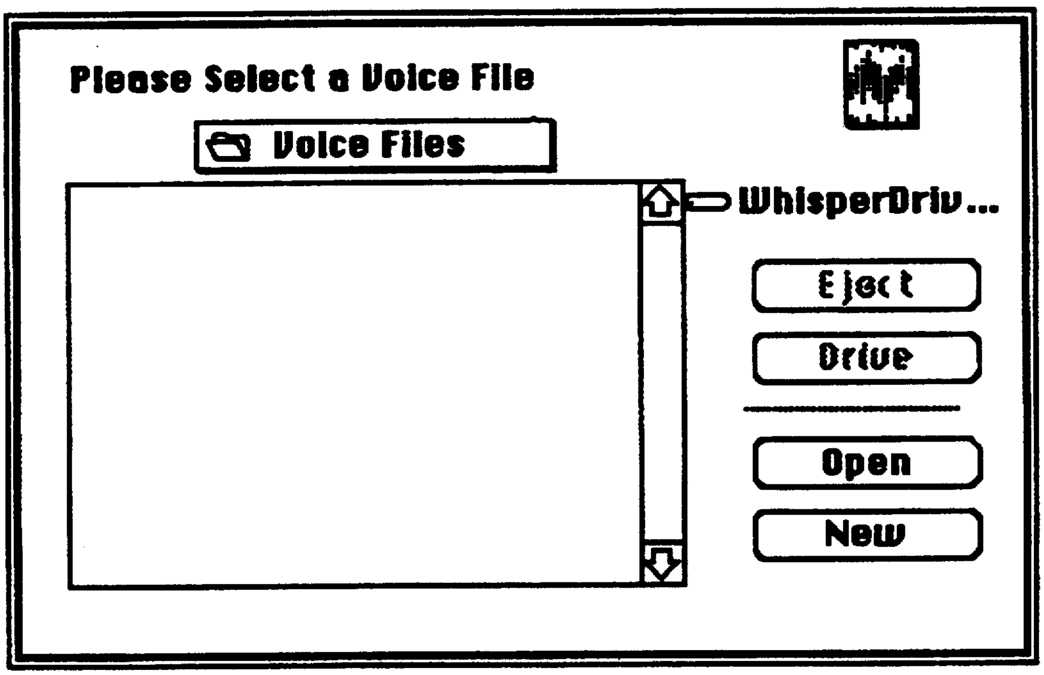
Figure 54:
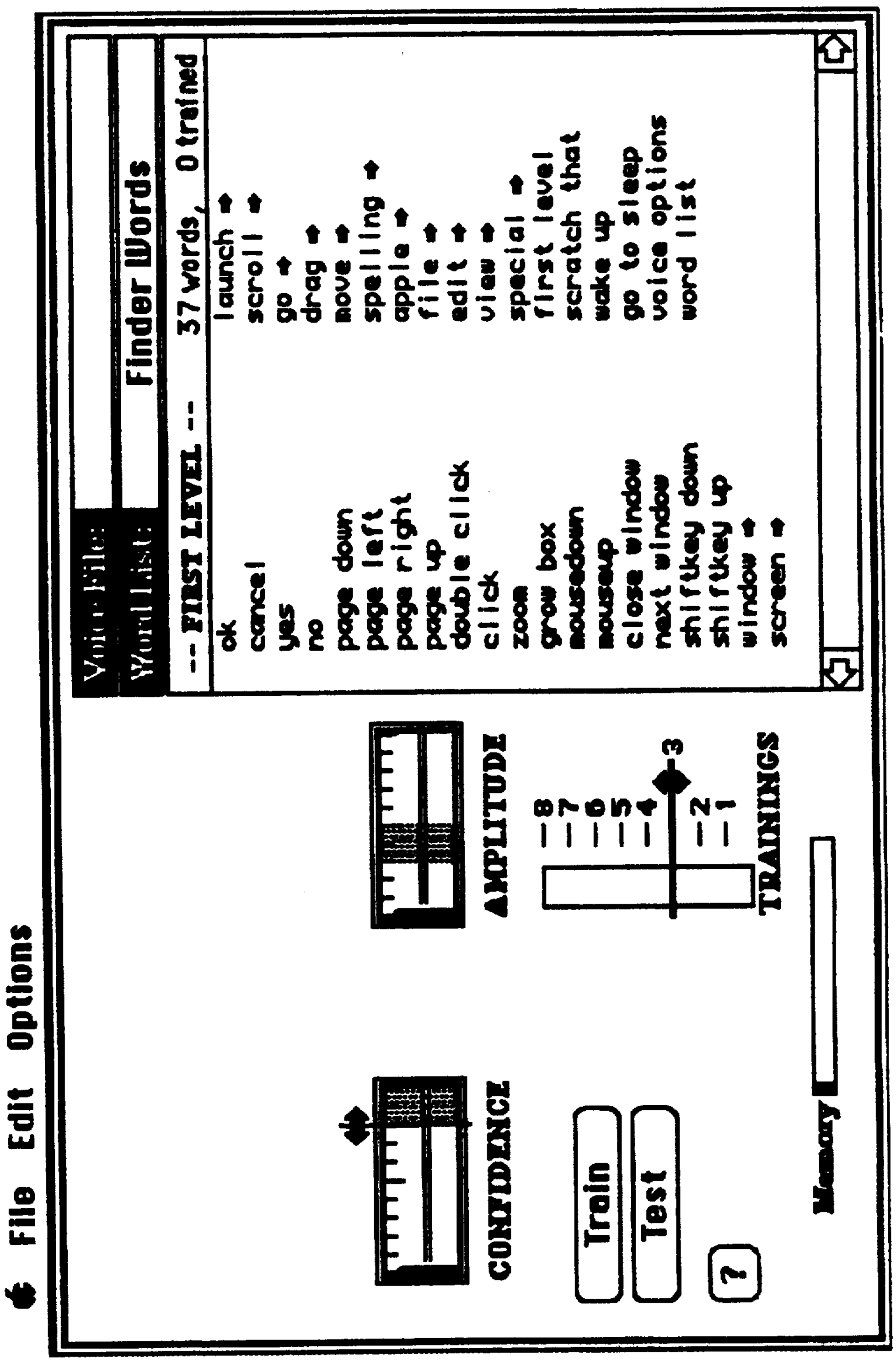
Figure 55:
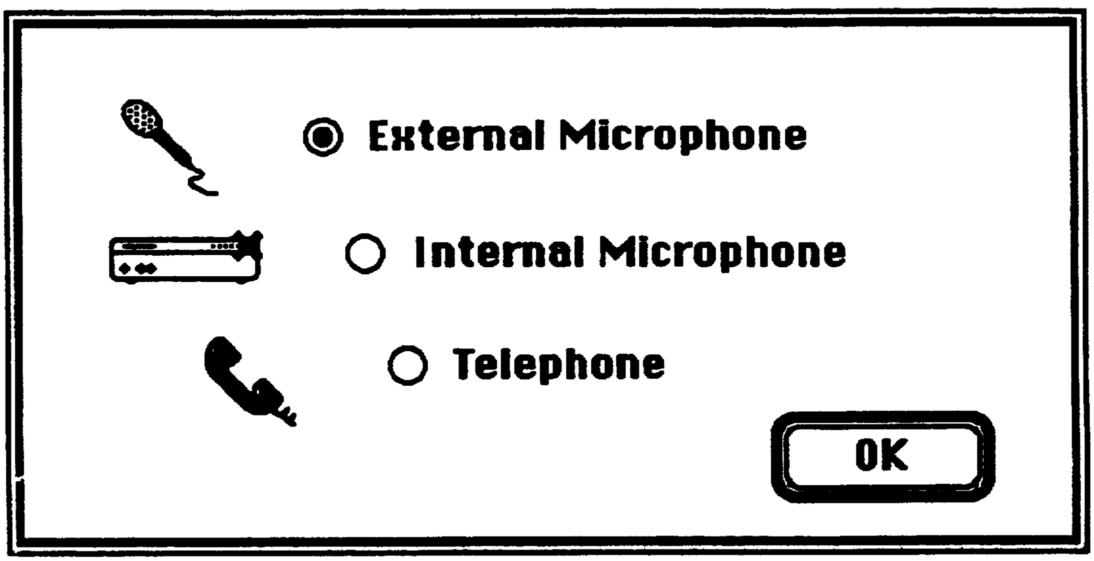
Figure 56:
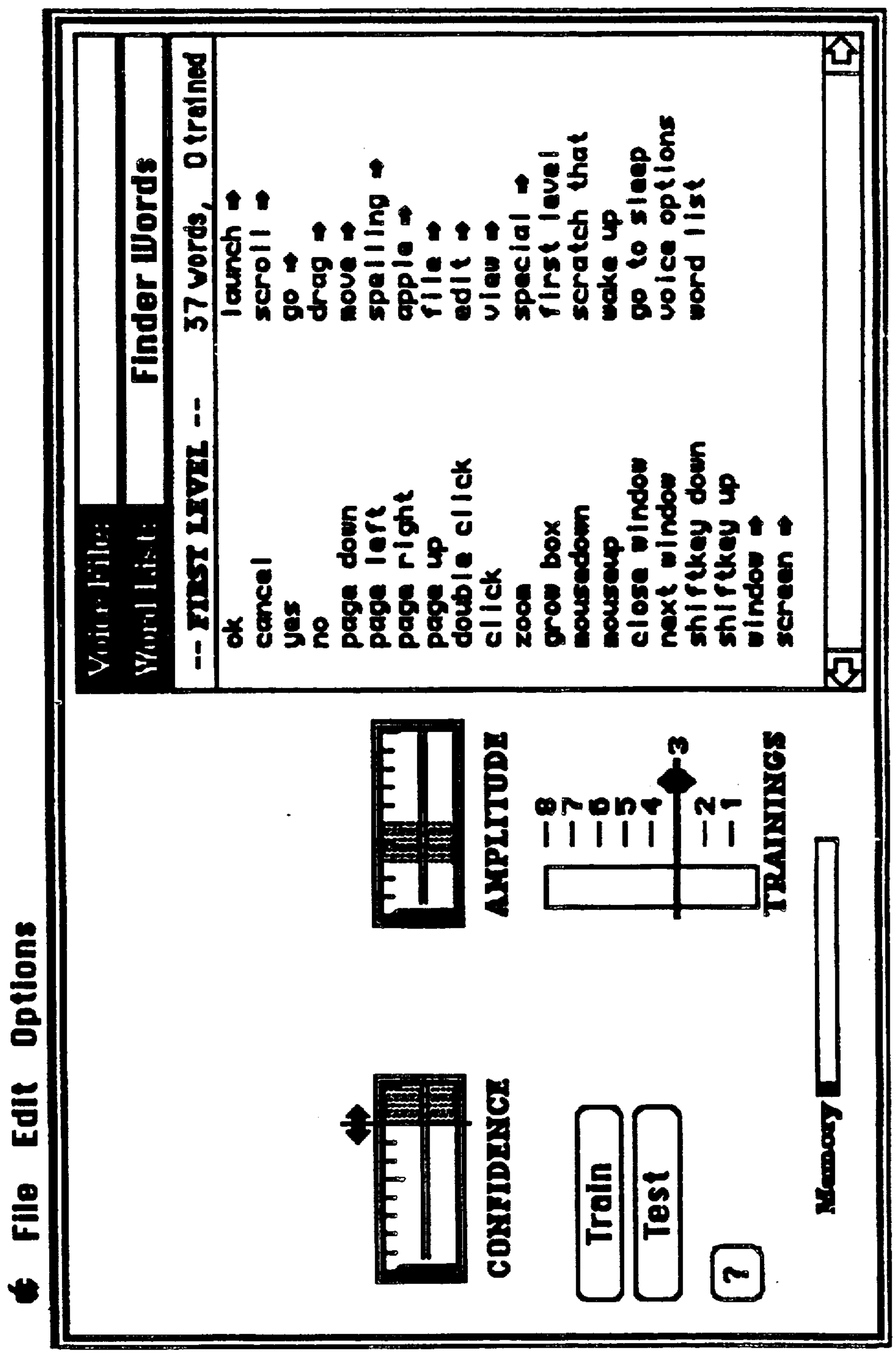
Figure 57:
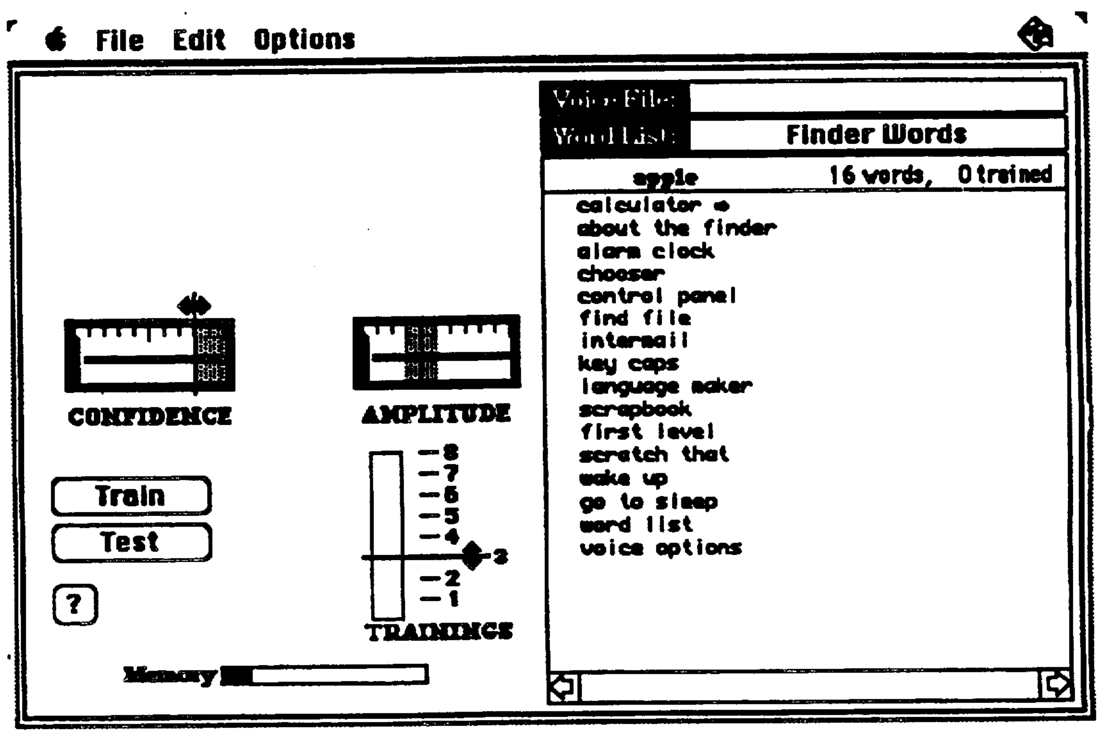
Figure 58:
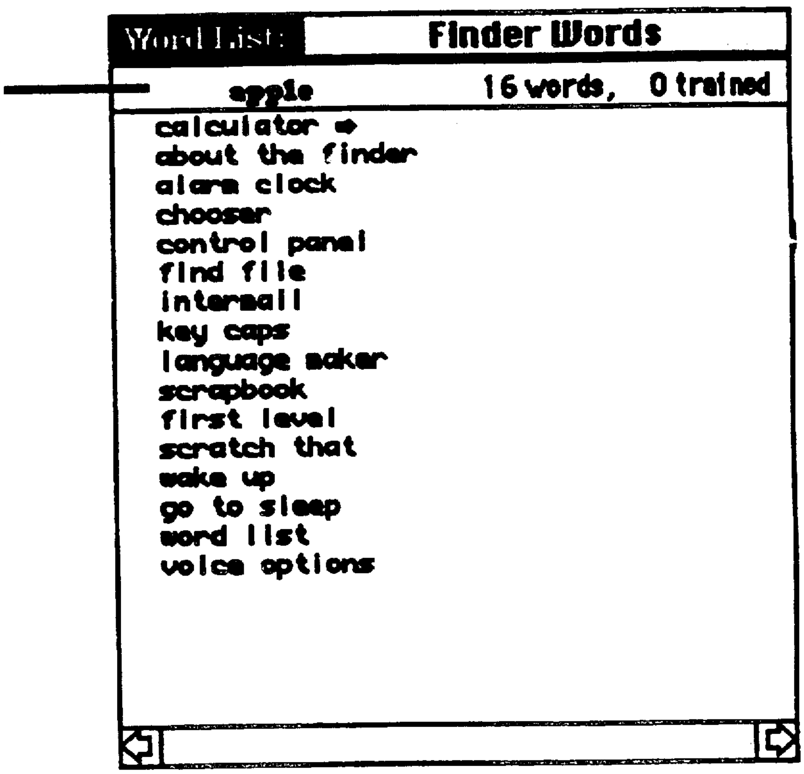
Figure 59:
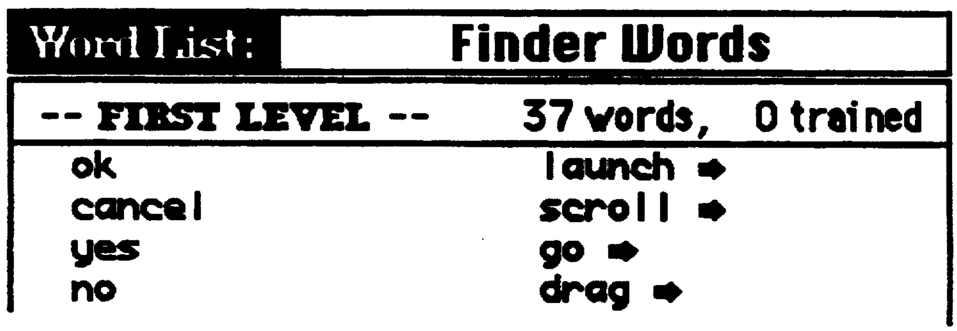
Figure 60:
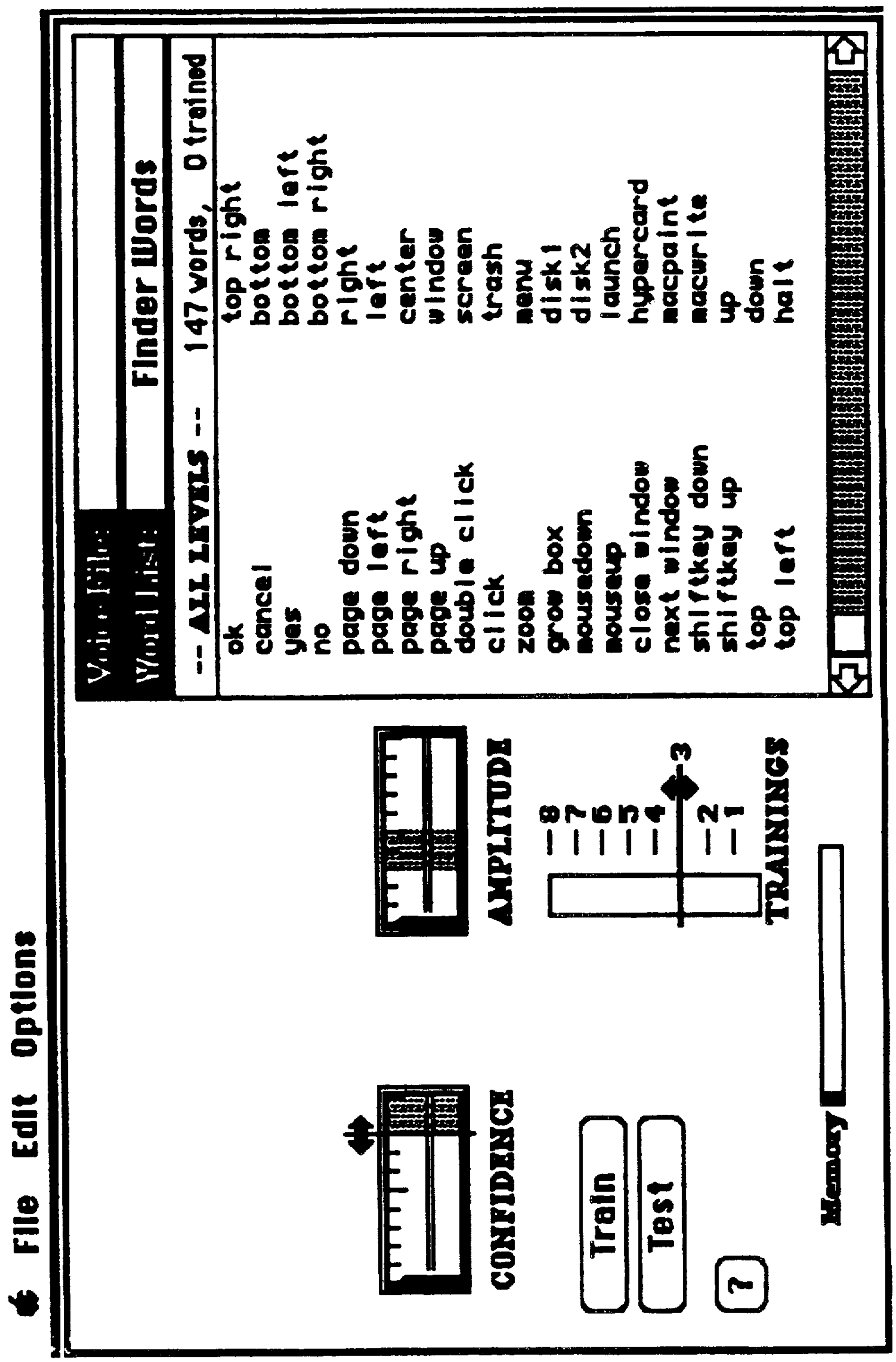
Figures 61, 62:
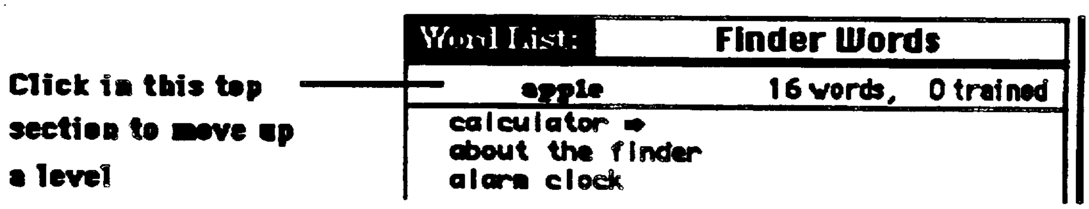
Figure 64:
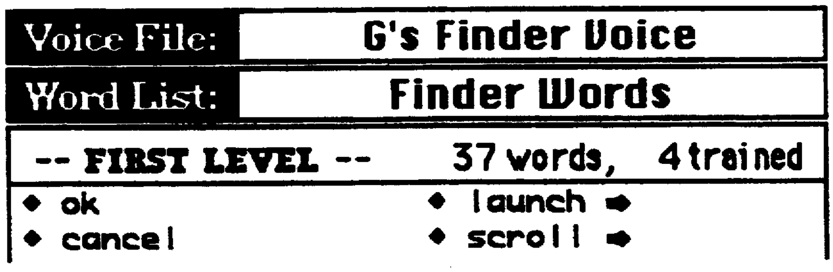
Figure 63:
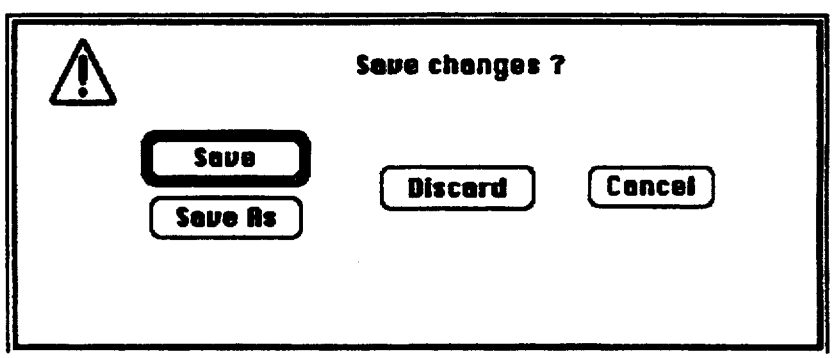
Figure 65:
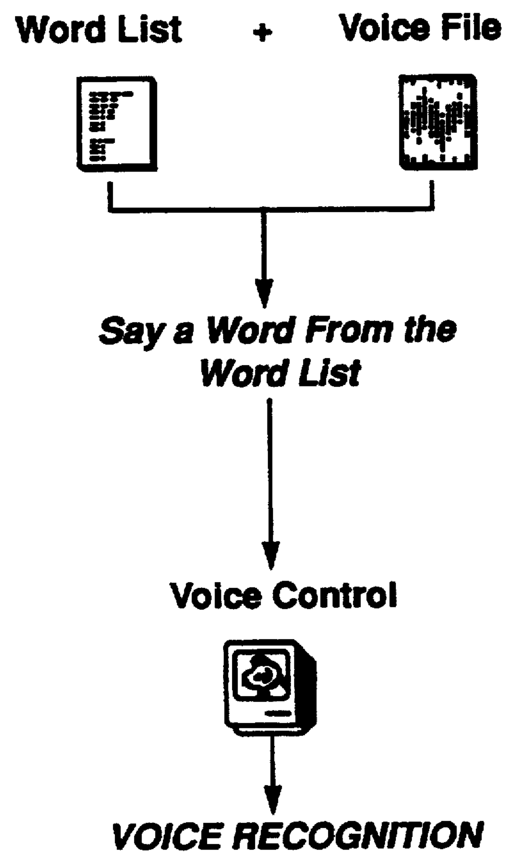
Figure 66:
Figure 67:
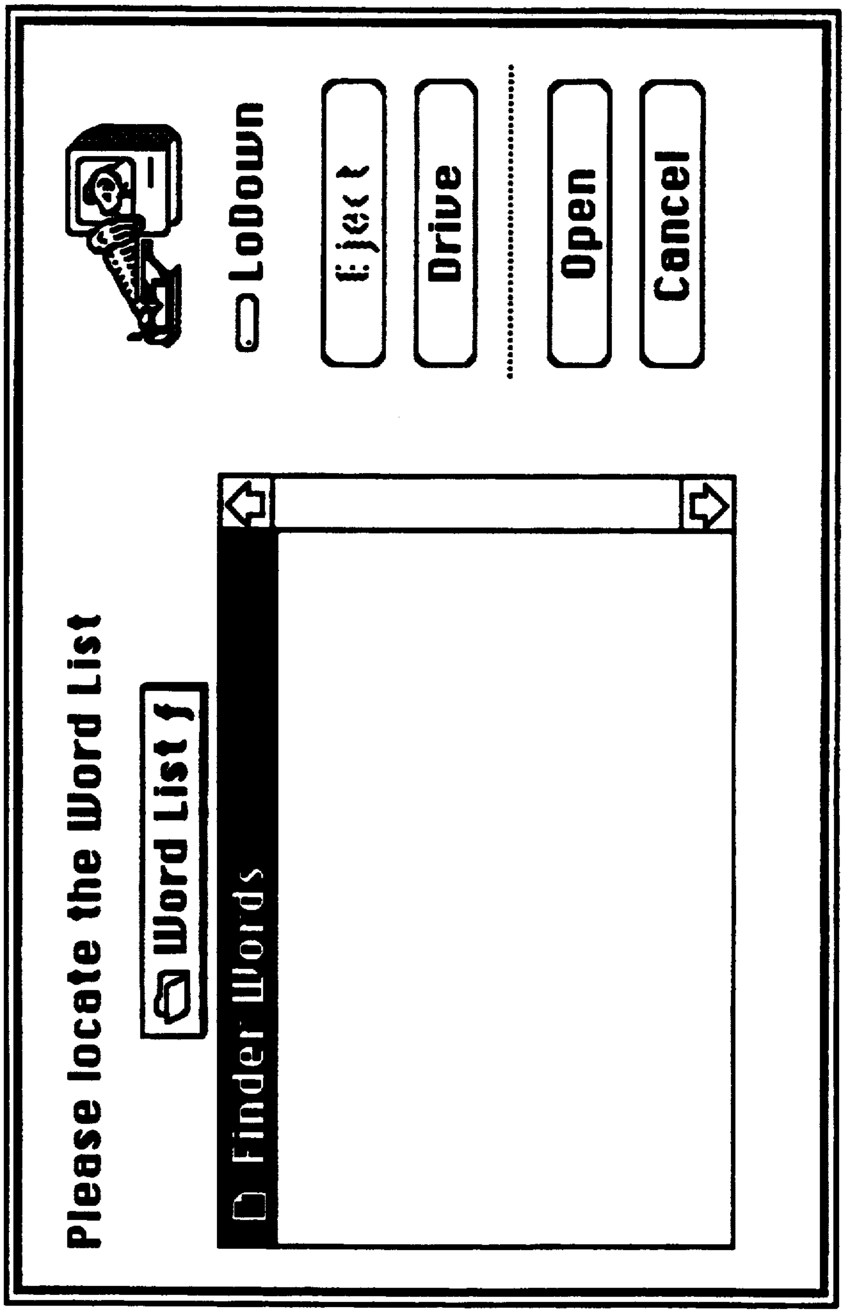
Figure 68:
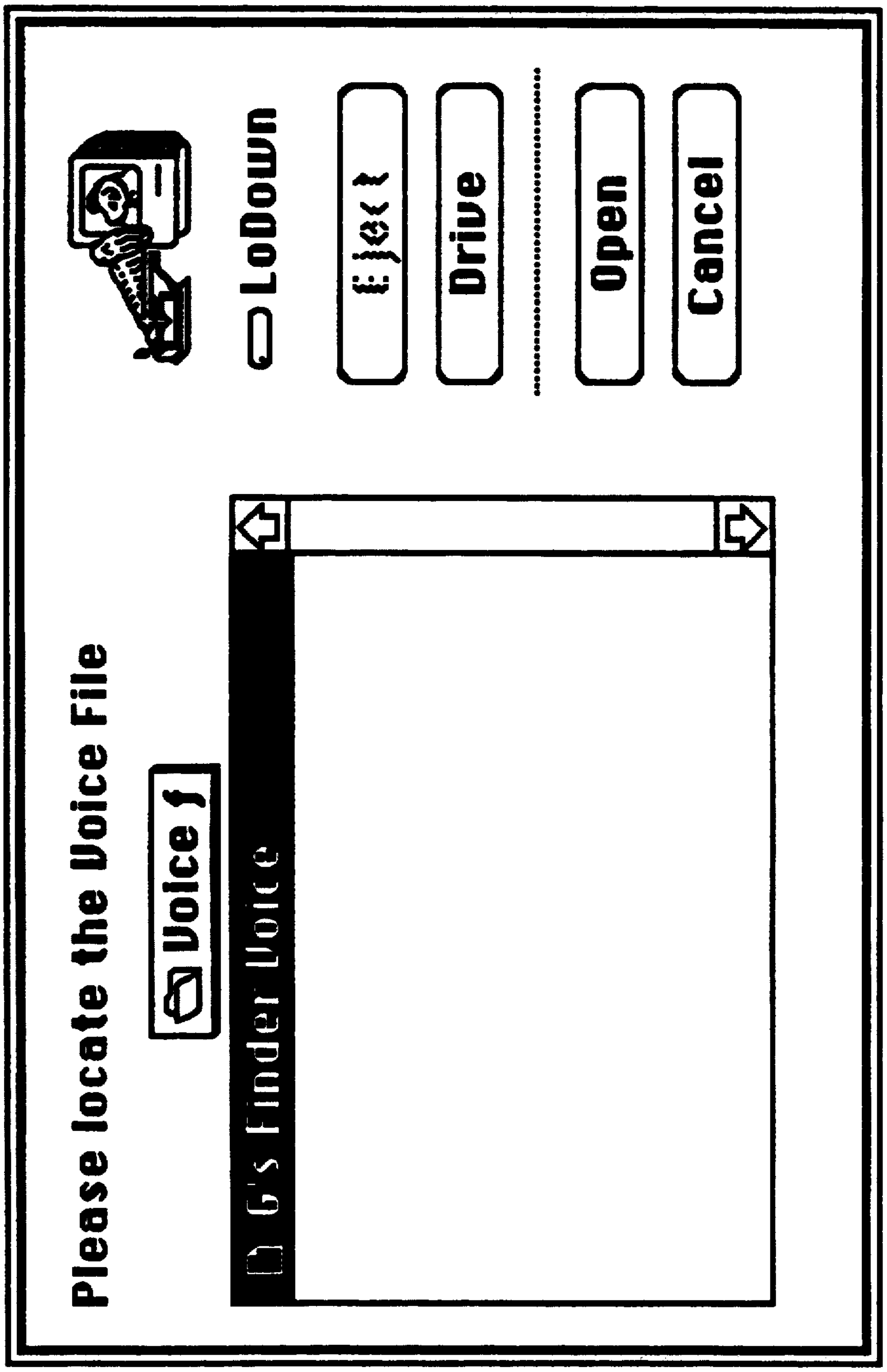
Figure 69:
Figure 70:
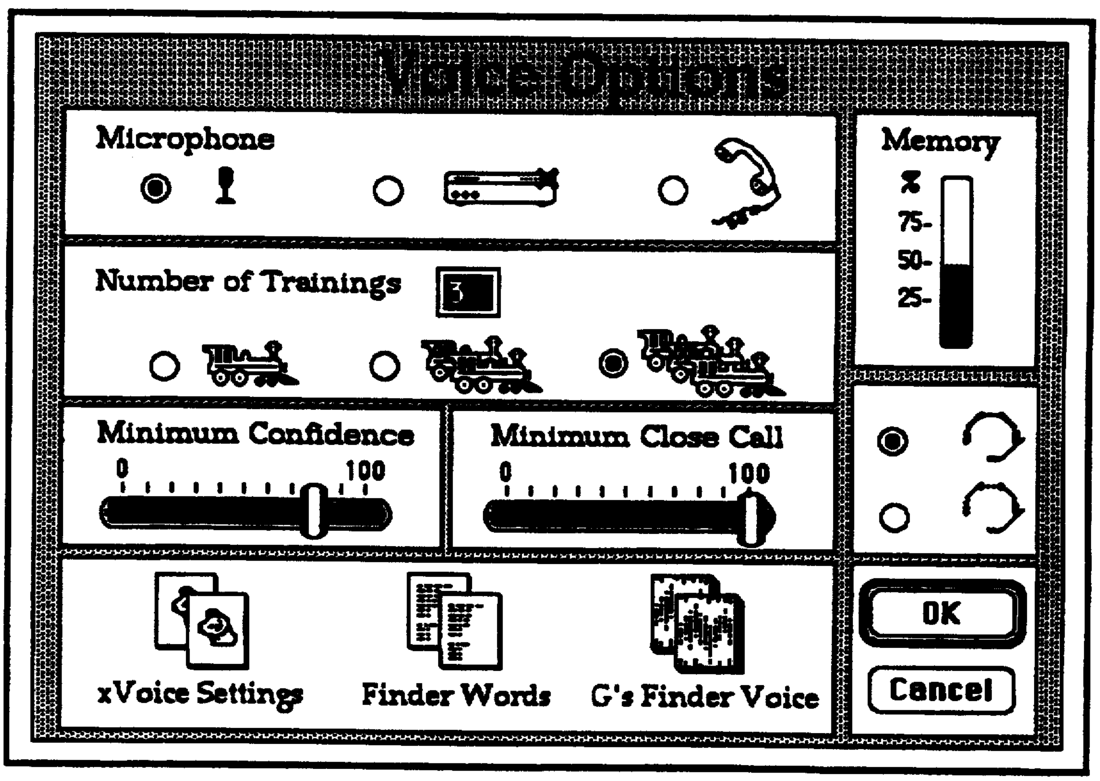
Figure 71:
Figure 72:
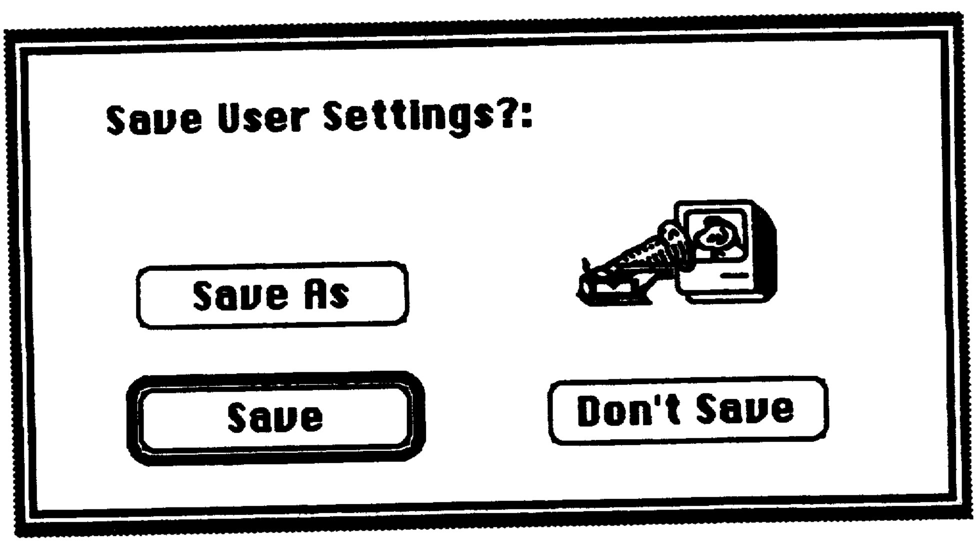
Figure 73:
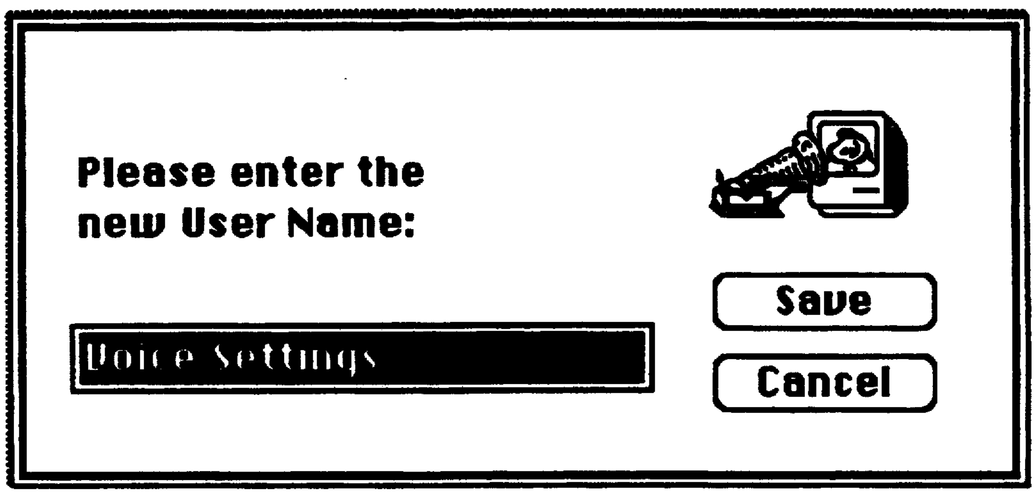
Figure 74:
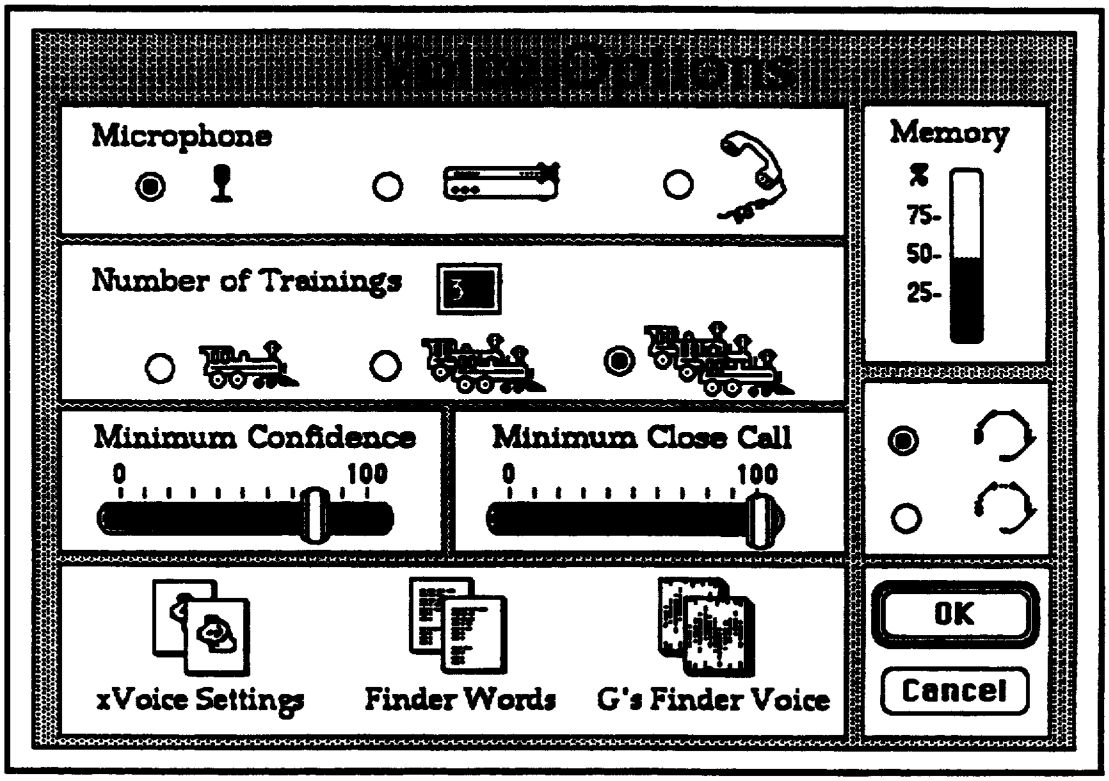
Figure 75:
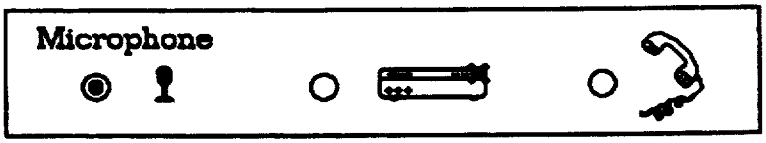
Figure 76:
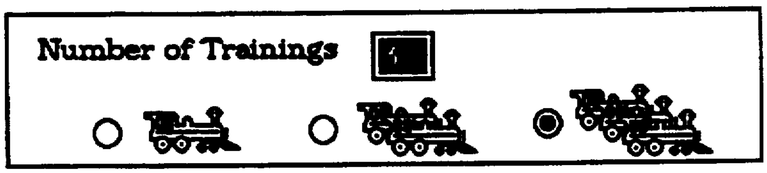
Figure 77:
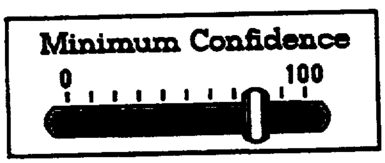
Figure 78:
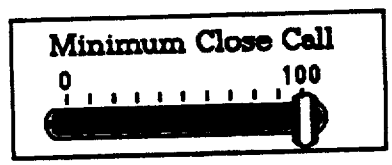
Figure 79:
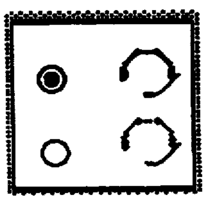
Figure 80:
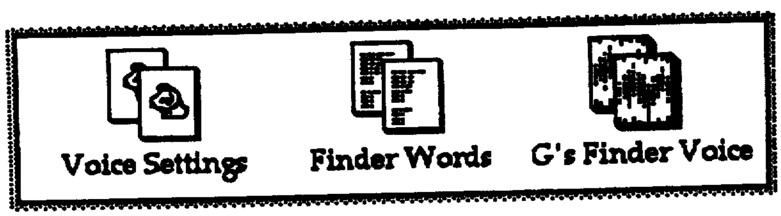
Figure 81:
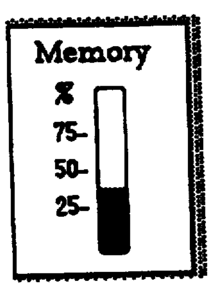
Figure 82:
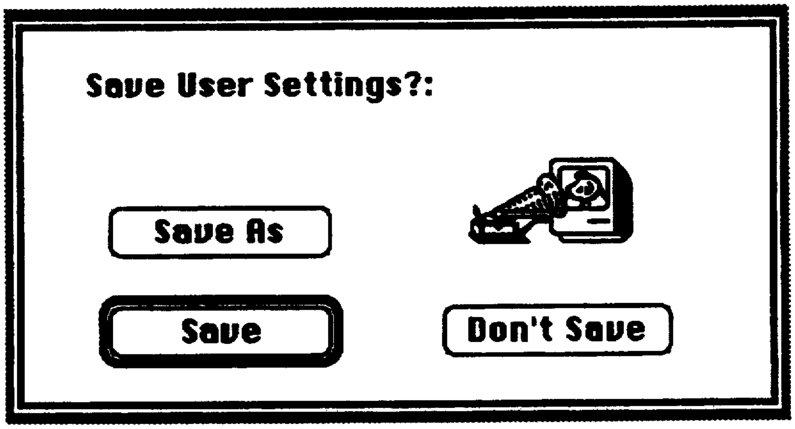
Figure 83:
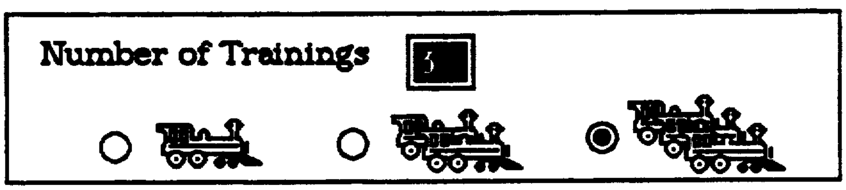
Figure 84:
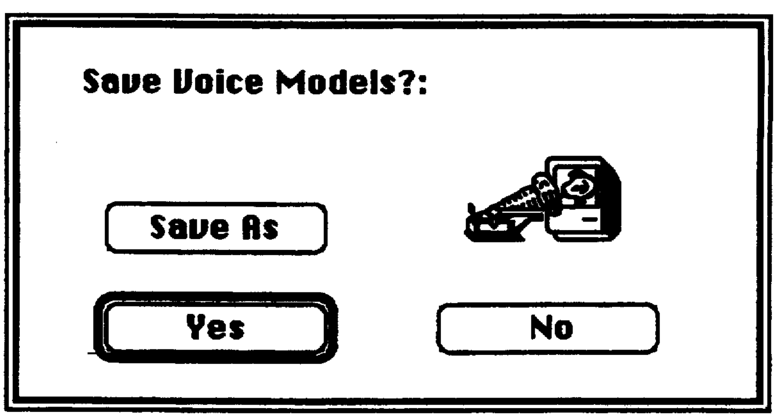
Figure 85:
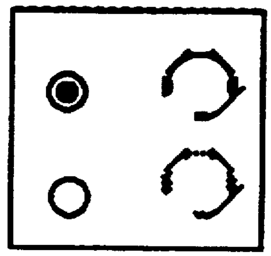
Figure 86:
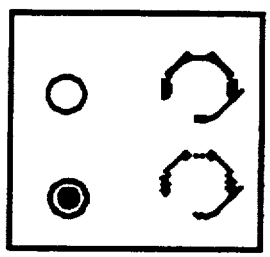
Figure 87:
Figure 88:
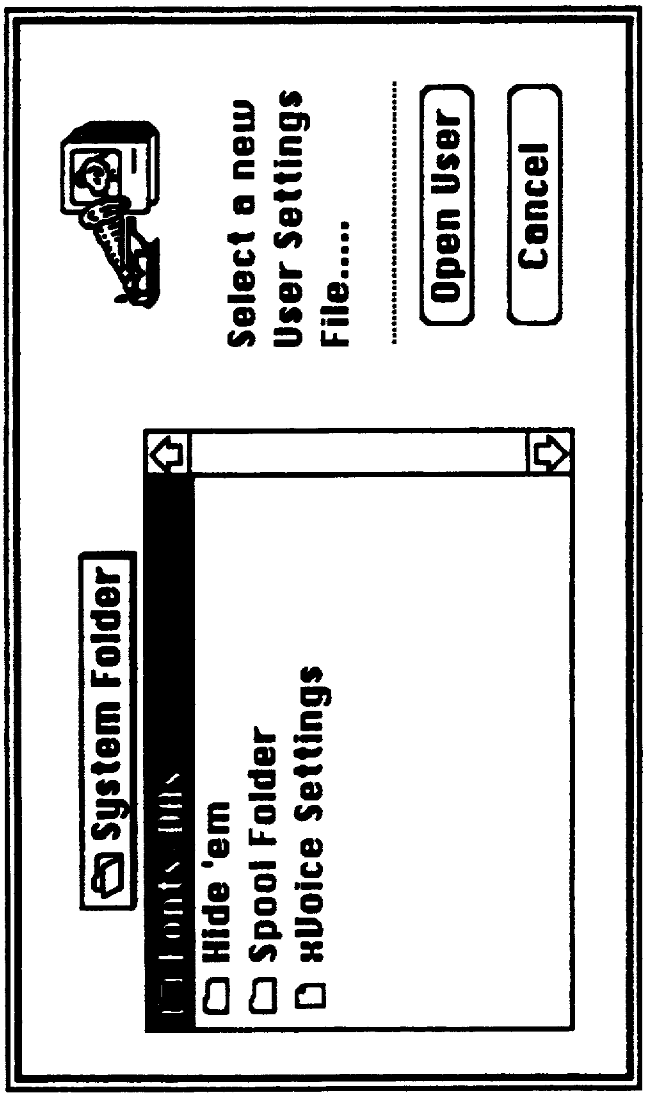
Figure 89:
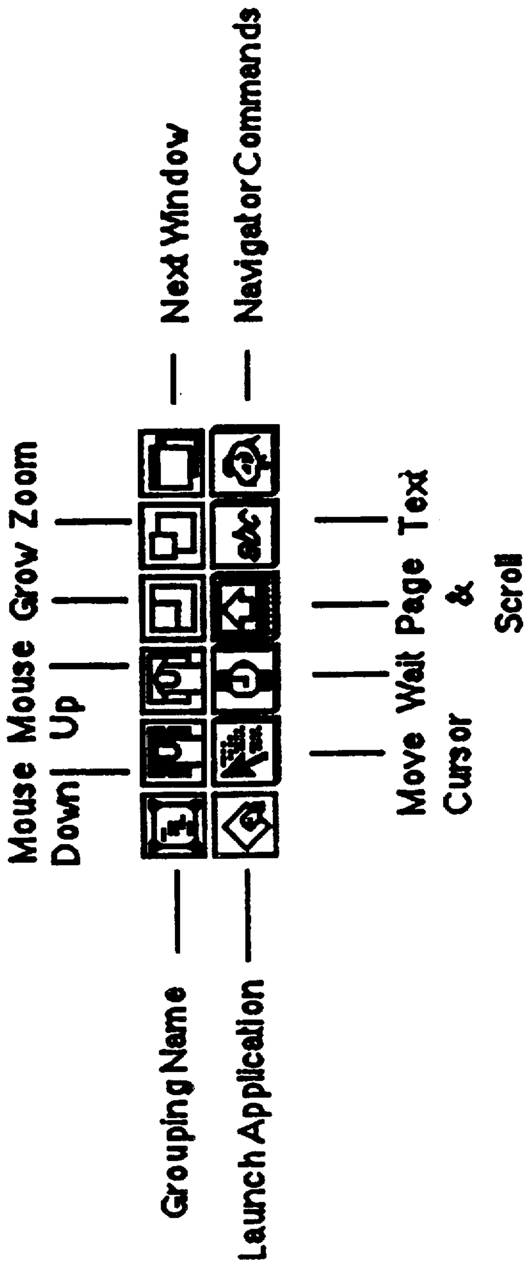
Figure 90:
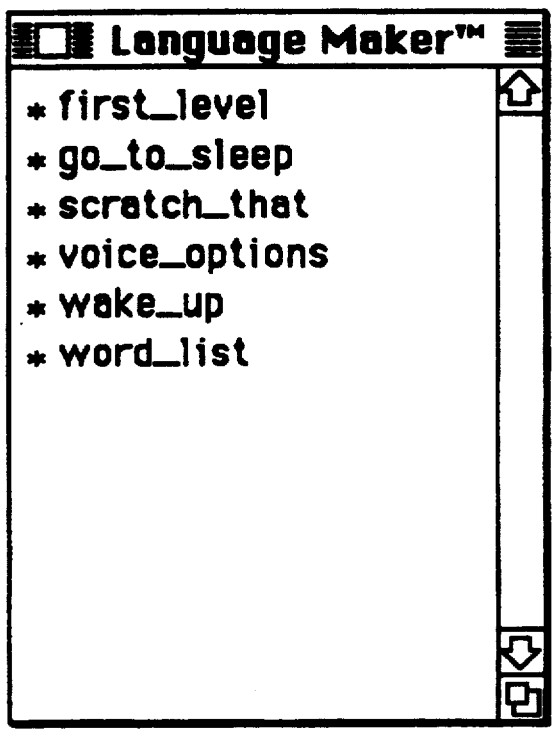
Figure 91:
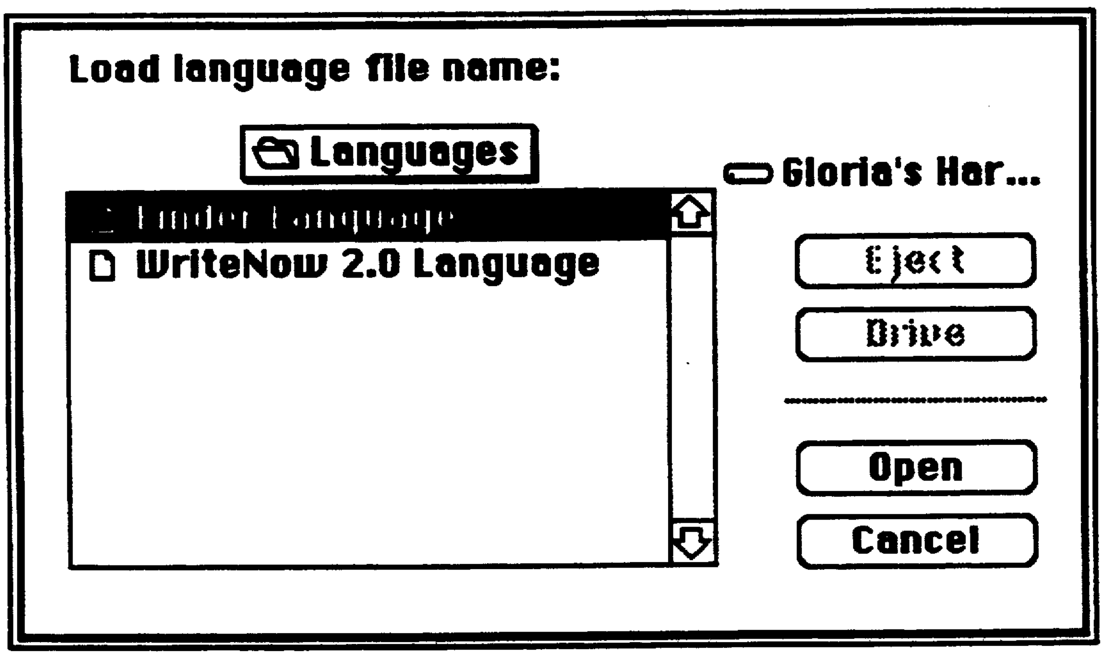
Figure 92:
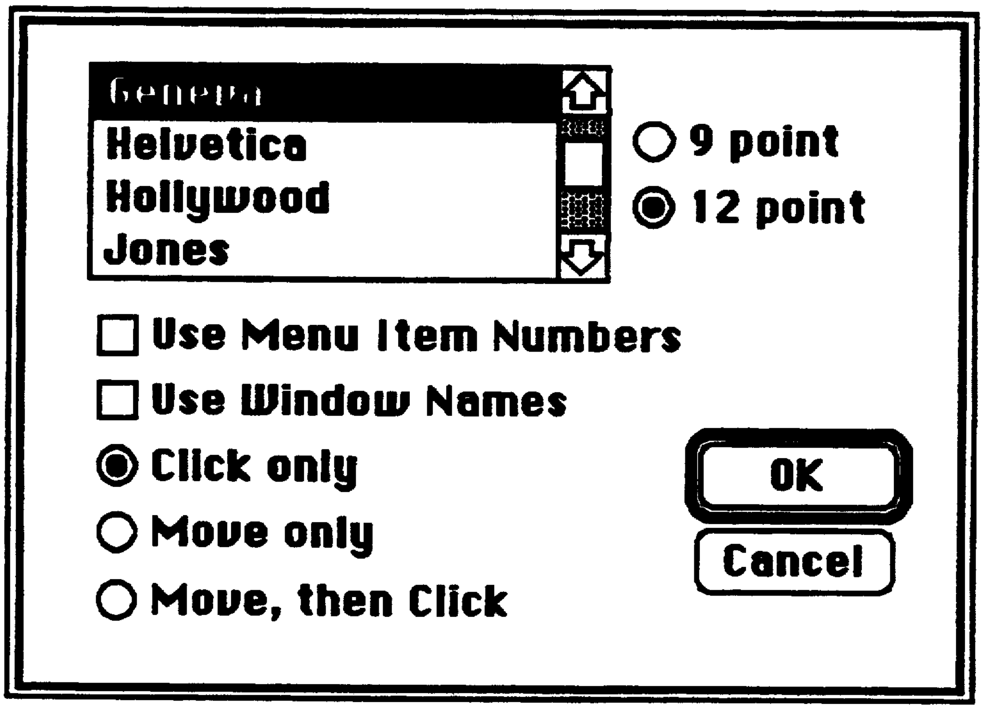
Figure 93:
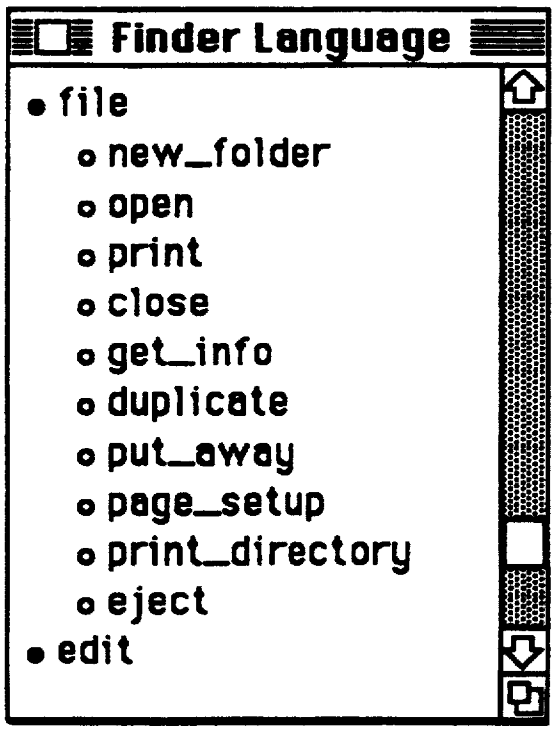
Figure 94:
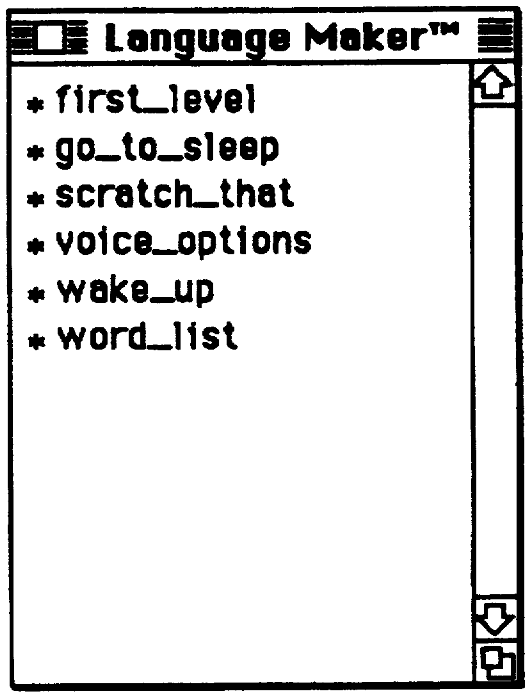
Figure 95:
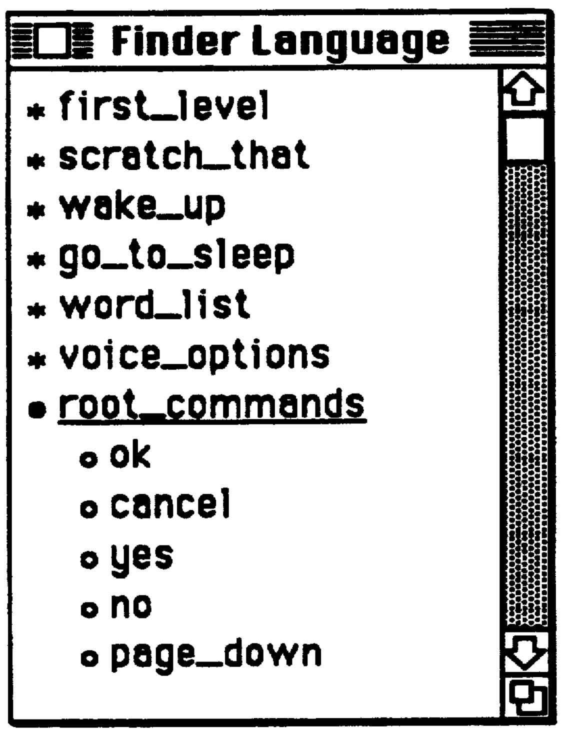
Figure 96:
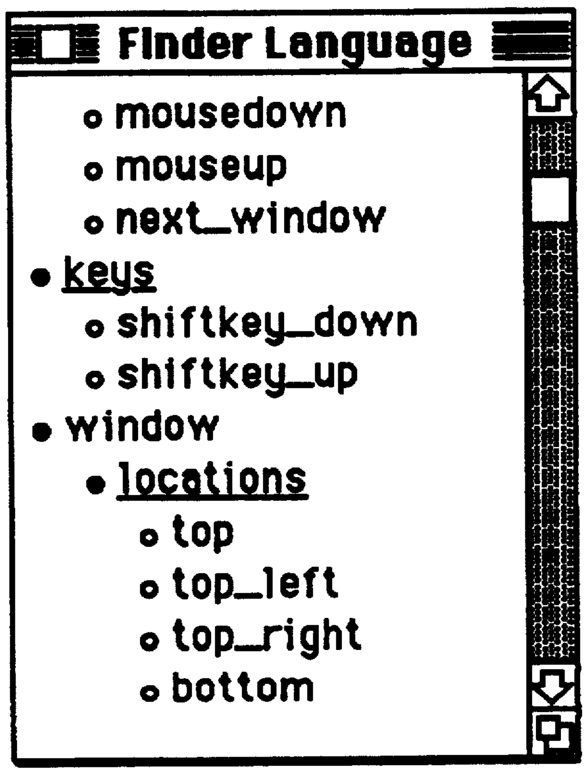
Figure 97:
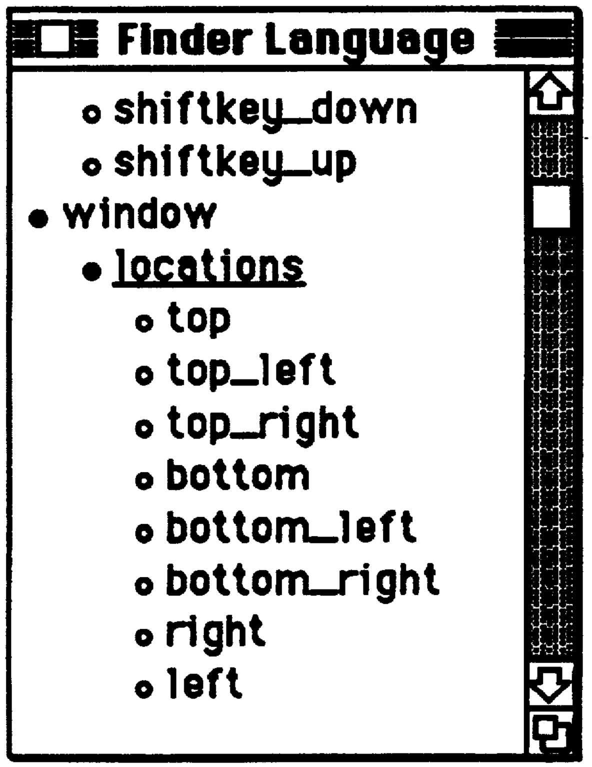
Figure 98:
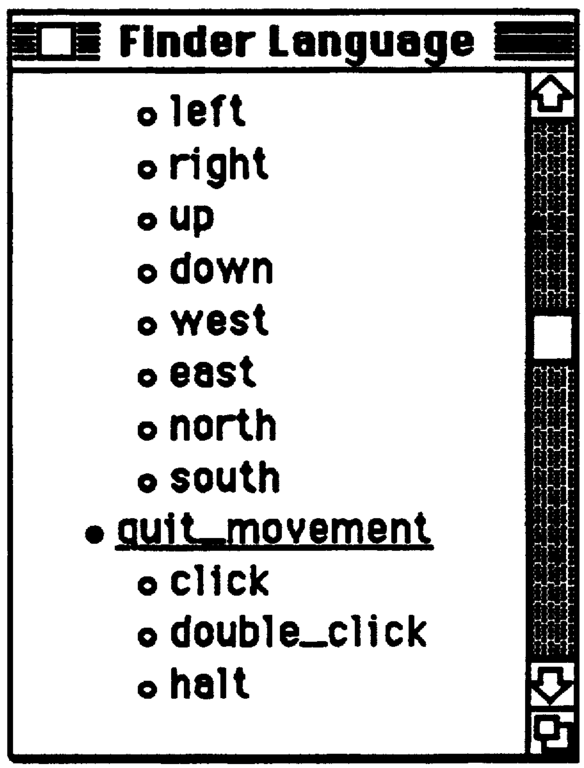
Figure 99:
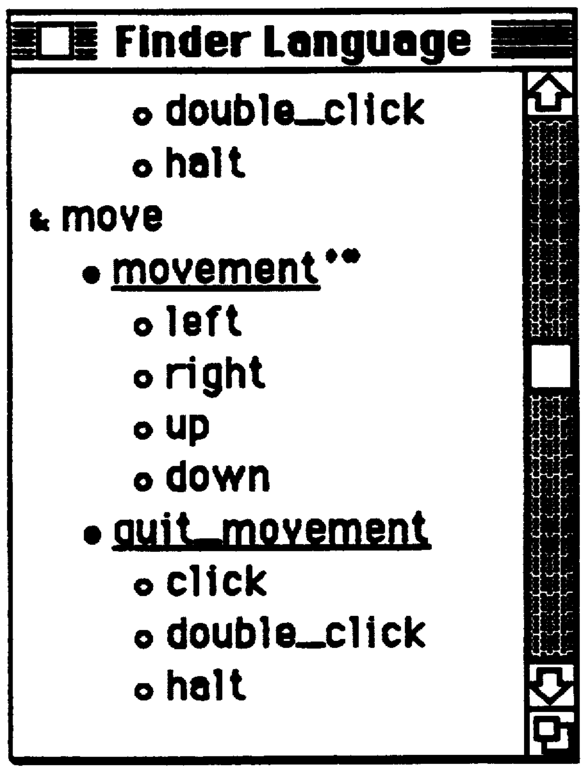
Figure 100:
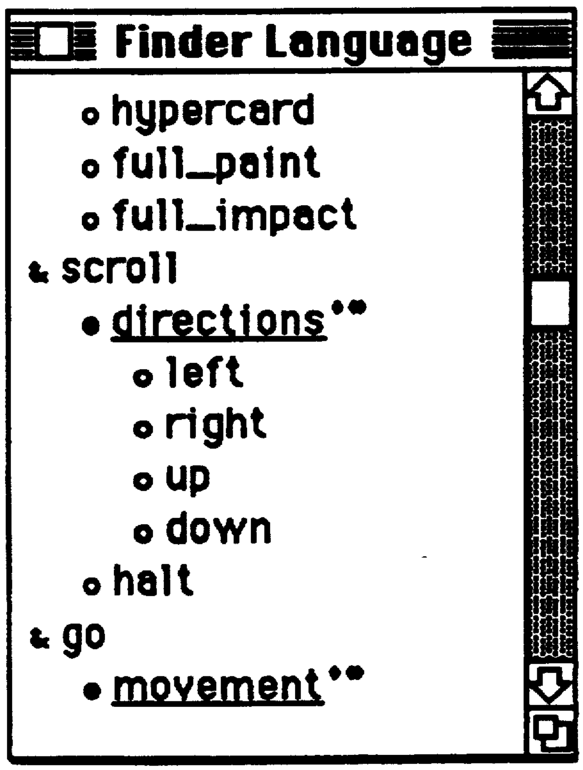
Figure 101:
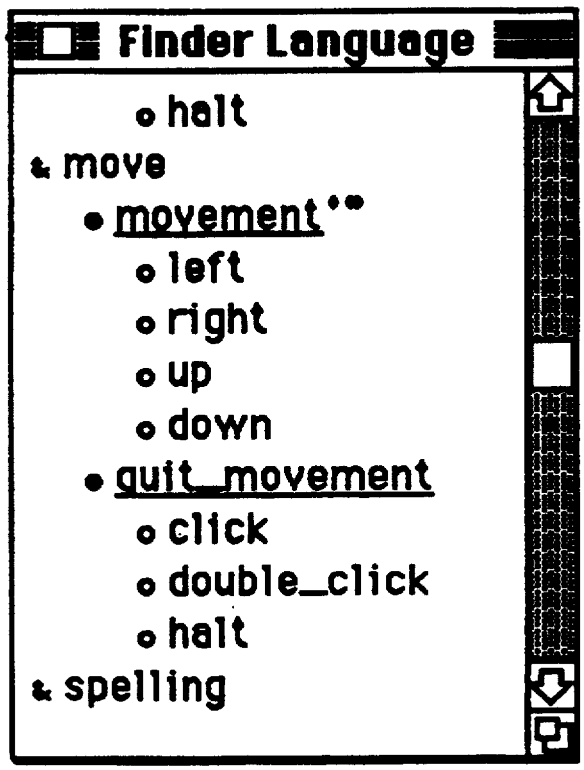
Figure 102:
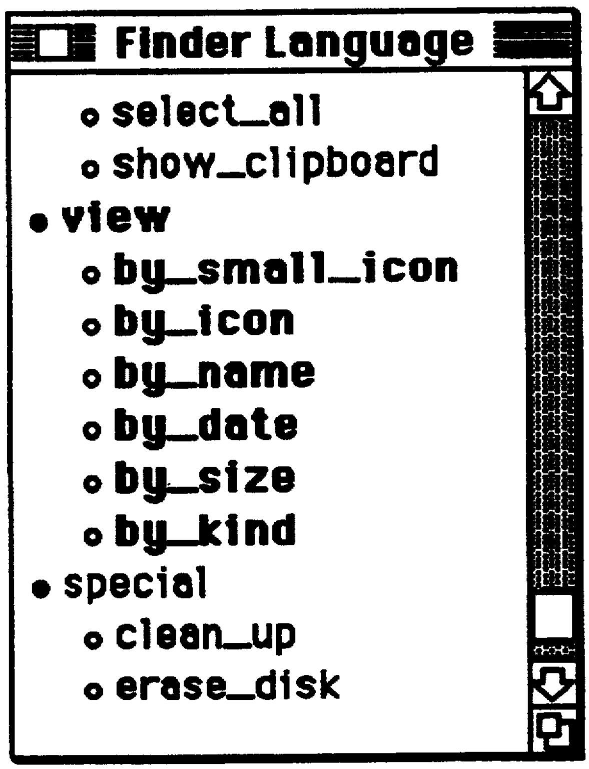
Figure 103:
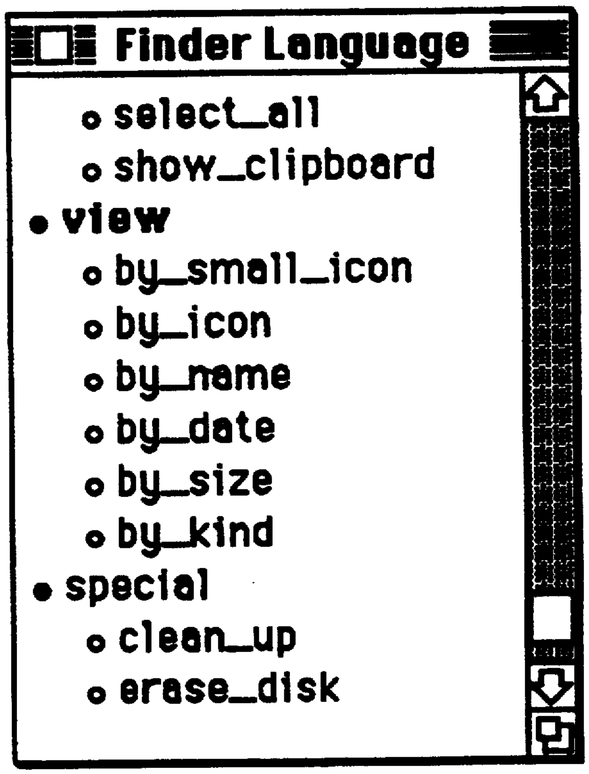
Figure 104:
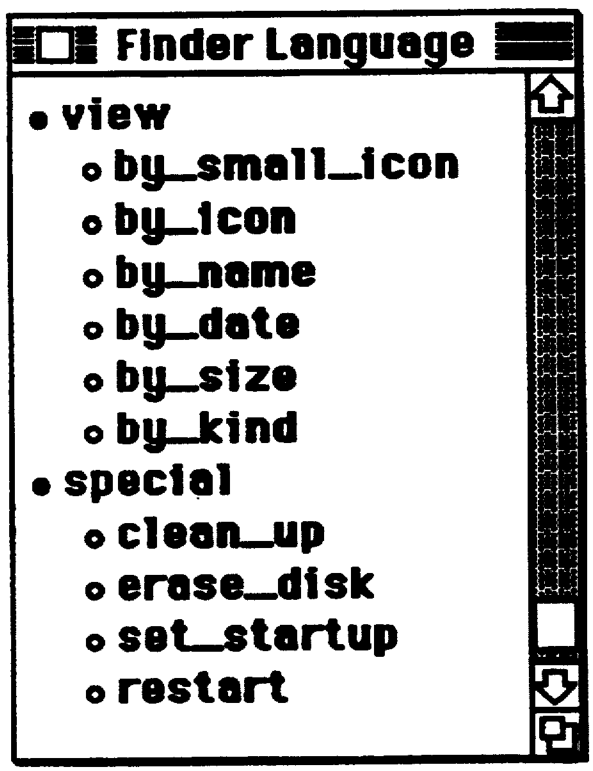
Figure 105:
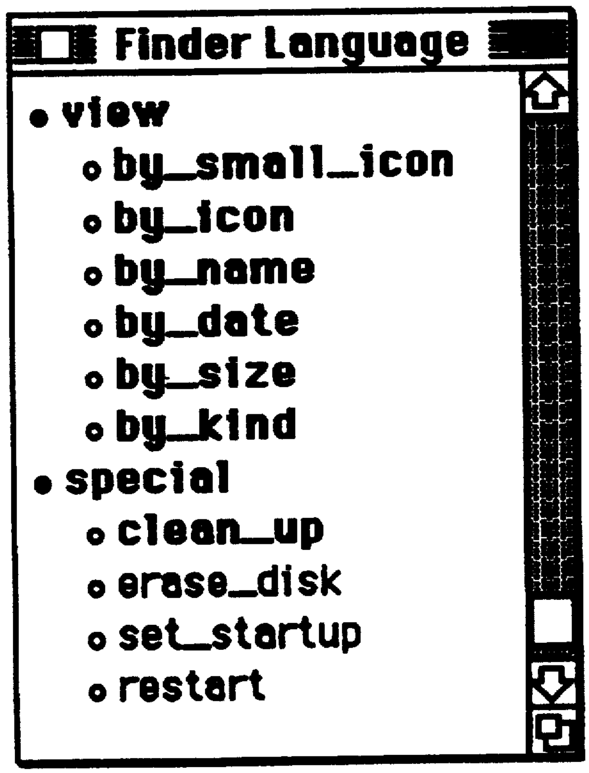
Figure 106:
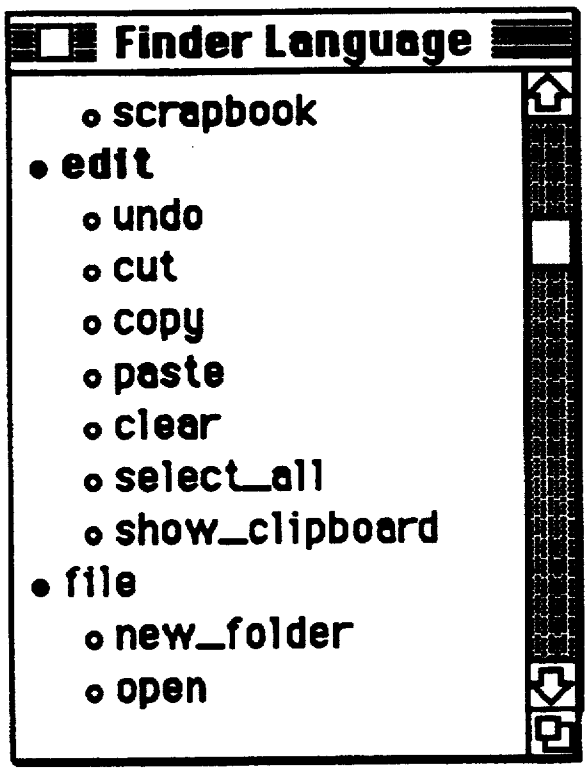
Figure 107:
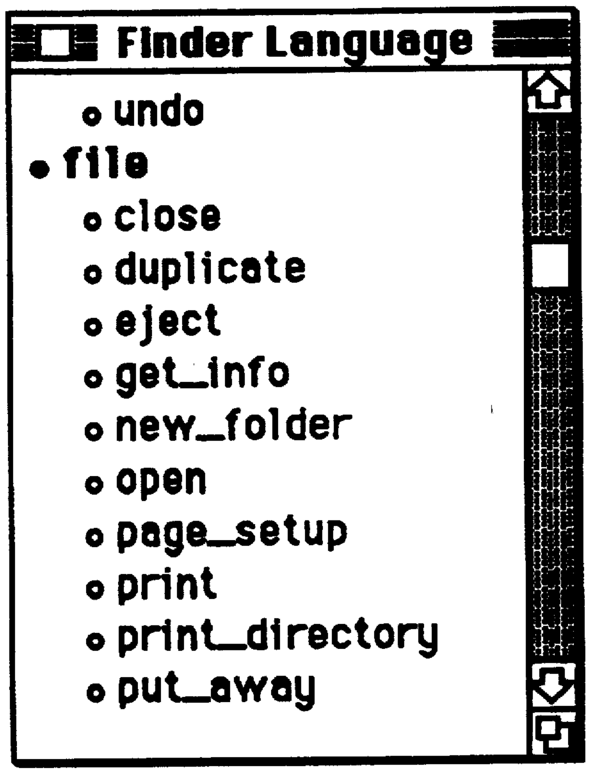
Figure 108:
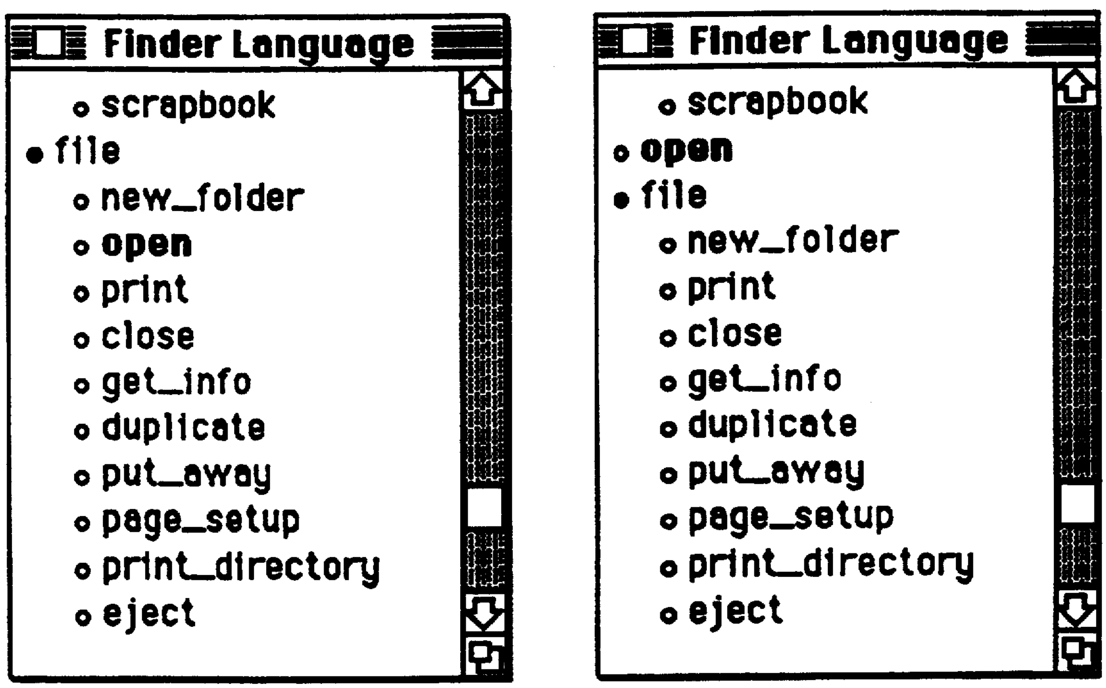
Figure 109:
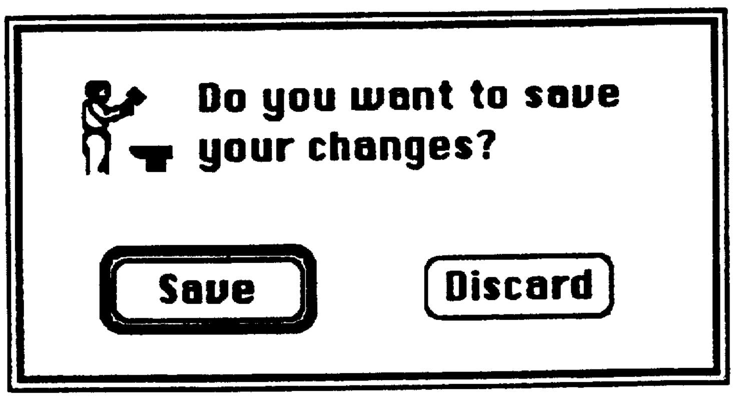
Figure 110:
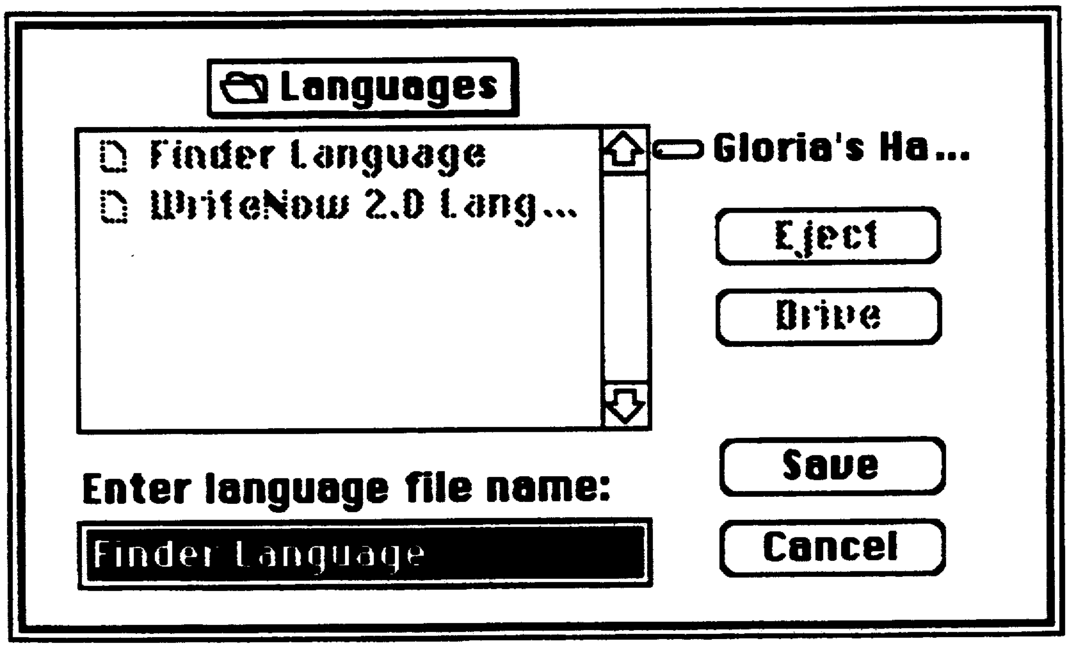
Figure 111:
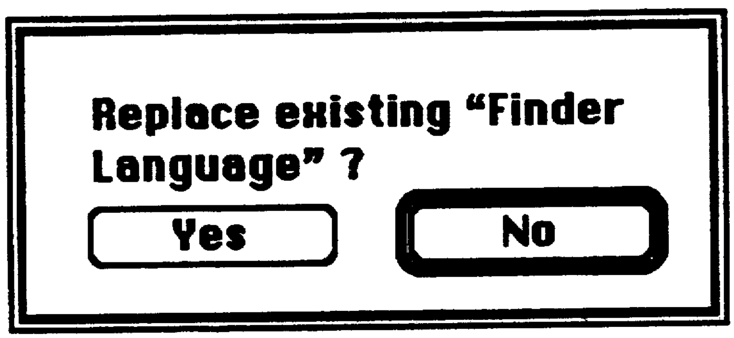
Figure 112:
Figure 113:
Figure 114:
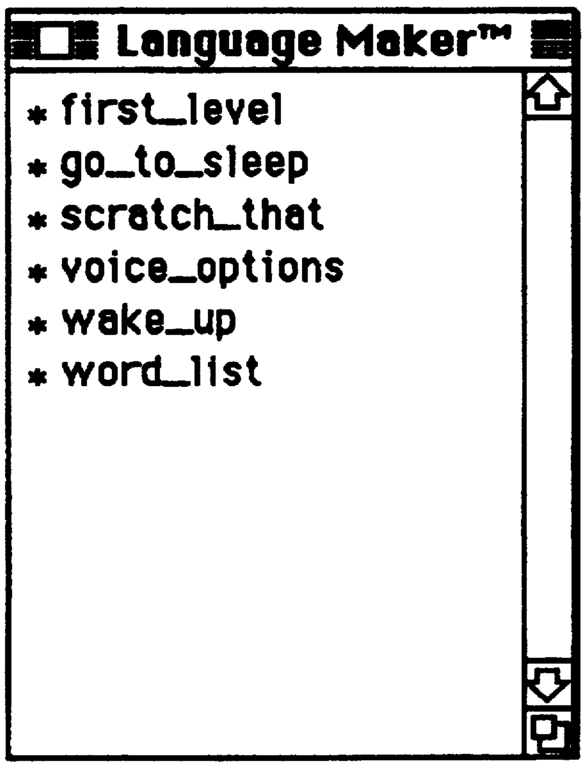

FIG. 18 is a flow diagram of the ProcessQ module.
FIG. 19 is a flow diagram of the Get Next submodule.
FIG. 20 is a chart of the command handlers.
FIGS. 21A through 21G are flow diagrams of the command handlers.
FIG. 22 is a flow diagram of the Post Mouse routine.
FIG. 23 is a flow diagram of the Set Mouse Down routine.
FIGS. 24 and 25 illustrate the screen displays of Voice Control.
FIGS. 26 through 29 illustrate the screen displays of Language Maker.
FIG. 30 is a listing of a language file.
FIG. 31 is a diagram of system configurations and termination.
FIG. 32 is another diagram of system configurations and termination.
FIG. 33 is a diagram of an installer dialog box.
FIG. 34 is a diagram of a successful installation.
FIG. 35 is a diagram of a voice installer dialog box prompting "The Macintosh is Listening".
FIG. 36 is a diagram of a voice file dialog box.
FIG. 37 is a diagram of Base Words, first level.
FIG. 38 is a diagram of a microphone dialog box.
FIG. 39 is a diagram of First word presented for Training.
FIG. 40 is a diagram of Second word presented for Training.
FIG. 41 is a diagram of Close Calls.
FIG. 42 is a diagram of levels in the Finder Word List.
FIG. 43 is a diagram of Apple words.
FIG. 44 is a diagram of File words.
FIG. 45 is a diagram of Training a word.
FIG. 46 is a diagram of file words in the Base Word list.
FIG. 47 is a diagram of how to go up a level.
FIG. 48 is a diagram of recognizing a word.
FIG. 49 is a diagram of saving a dialog box.
FIG. 50 is a diagram of retraining a word.
FIG. 51 is a diagram of finder words with trainings transferred from base words.
FIG. 52 is a diagram of a Voicetrain dialog box.
FIG. 53 is a diagram of a Voicetrain dialog box selecting a voice file.
FIG. 54 is a Voicetrain words list display.
FIG. 55 is a Voicetrain microphone dialog box.
FIG. 56 is a diagram of first level words in a Finder word list.
FIG. 57 is a diagram of Apple words in a Finder word list.
FIG. 58 is a diagram of how to move up a level in Voicetrain word list.
FIG. 59 is a diagram of first level display in a Finder word list.
FIG. 60 is a diagram of a Finder word list showing all levels.
FIG. 61 is list of words with an arrow indicating level below.
FIG. 62 is a diagram showing how to click in top section of a word list to go up a level.
FIG. 63 is a diagram of how to save a dialog box in Voicetrain.
FIG. 64 is a diagram of a word list with the Voice file name displayed.
FIG. 65 is a diagram of how to use Voice Control.
FIG. 66 is a Finder menu bar.
FIG. 67 is a diagram of locating the word list in Finder Words.
FIG. 68 is a diagram of locating the Voice file.
FIG. 69 shows a voice control headset around Apple icon.
FIG. 70 is a diagram of Voice Options.
FIG. 71 shows the last word prompt.
FIG. 72 is a diagram of the Save dialog box.
FIG. 73 is a diagram of Name Users voice settings to save.
FIG. 74 is a diagram of a Voice Options dialog box.
FIG. 75 shows the microphone choice.
FIG. 76 shows the Number of Trainings.
FIG. 77 is a diagram showing the confidence level.
FIG. 78 is a diagram showing the close call gauge.
FIG. 79 is a diagram showing the headset.
FIG. 80 is a diagram showing Voice Settings, Finder Words, Voice file.
FIG. 81 is a memory bar.
FIG. 82 is a diagram showing the Save dialog selection.
FIG. 83 is a diagram showing the Number of Trainings in voice options dialog.
FIG. 84 is a diagram showing a Save dialog box.
FIG. 85 is a diagram showing the headset active.
FIG. 86 is a diagram showing the headset dimmed.
FIG. 87 is a diagram showing NO word list or voice file.
FIG. 88 is a diagram of voice settings dialog.
FIG. 89 shows language maker commands.
FIG. 90 is a diagram showing global commands.
FIG. 91 is a diagram showing Load Language file.
FIG. 92 is a diagram showing preference dialog box.
FIG. 93 as a diagram showing file words.
FIG. 94 is a diagram showing global words.
FIG. 95 as a diagram showing root commands.
FIG. 96 is a diagram showing shift key commands.
FIG. 97 Is a diagram showing window location commands.
FIG. 98 is a diagram showing quit movement commands.
FIG. 99 is a diagram showing movement words.
FIG. 100 is a diagram showing scroll words.
FIG. 101 is a diagram showing a movement group with repetition symbol.
FIG. 102 is a diagram showing word and its levels selected.
FIG. 103 is a diagram showing how to select a single word.
FIG. 104 is a diagram showing how to select several levels.
FIG. 105 is a diagram showing how to select words spanning across levels.
FIG. 106 is a diagram showing first level words alphabetized.
FIG. 107 is a diagram showing words within a level alphabetized.
FIG. 108 shows two diagrams showing open below file verses open above file.
FIG. 109 shows a Save dialog box.
FIG. 110 is a diagram showing how to enter language name.
FIG. 111 is a diagram showing replacing existing finder language.
FIG. 112 is a diagram showing Finder language icon.
FIG. 113 is a diagram showing Finder word list icon.
FIG. 114 is a diagram showing Global words.

Figure 115:
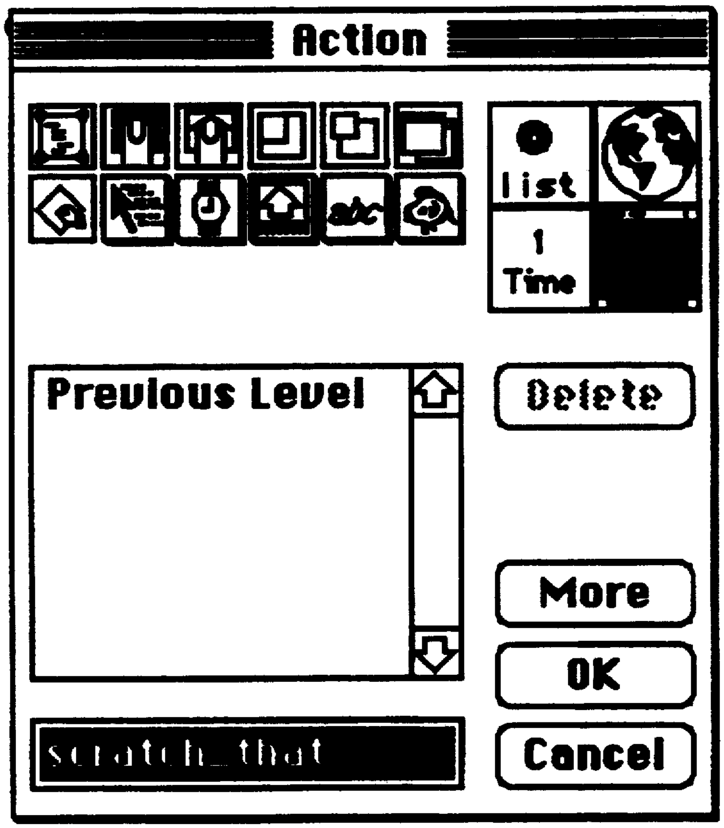

FIG. 115 is a diagram of an Action window for Scratch That.

Figure 116:
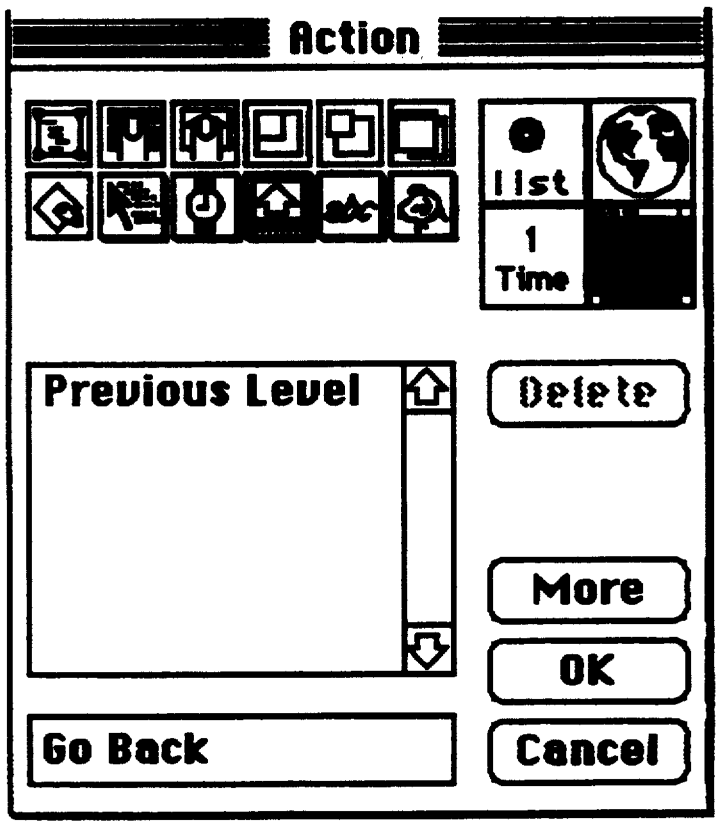

FIG. 116 is a diagram for Scratch That renamed Go Back.

Figure 117:
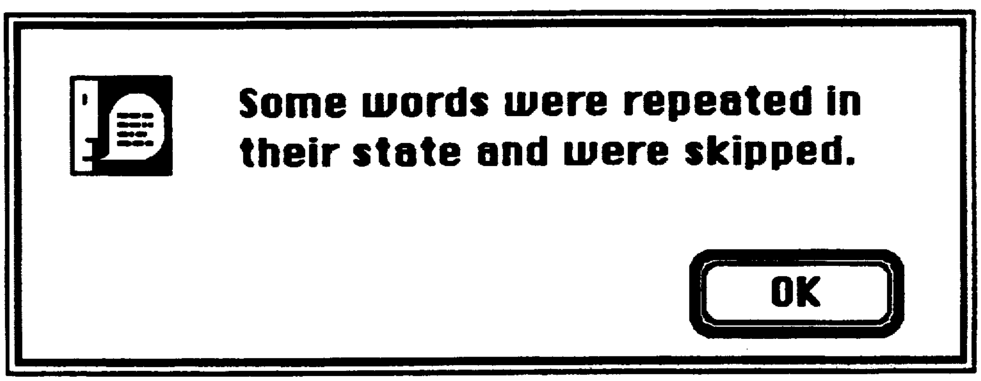

FIG. 117 is a diagram of words repeated and skipped.

Figure 118:
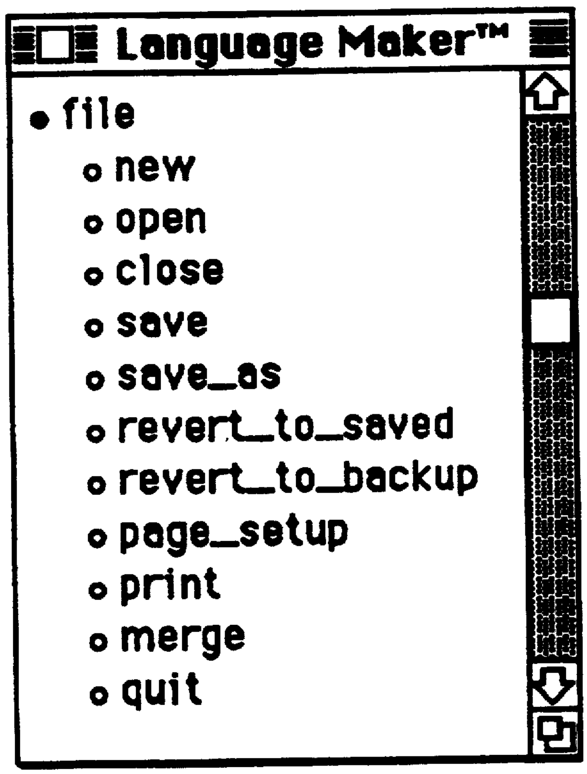

FIG. 118 is a diagram of menus in Language Maker list.

Figure 119:
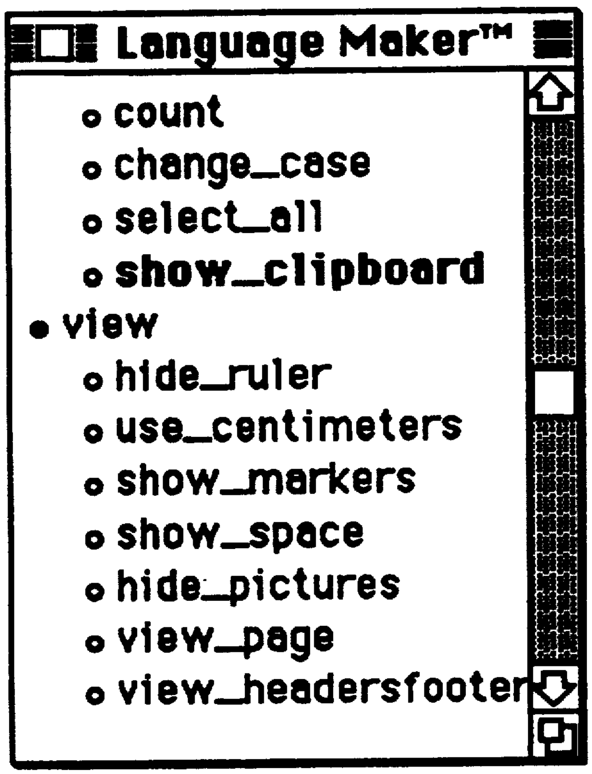

FIG. 119 is a diagram of Show Clipboard selected.

Figure 120:
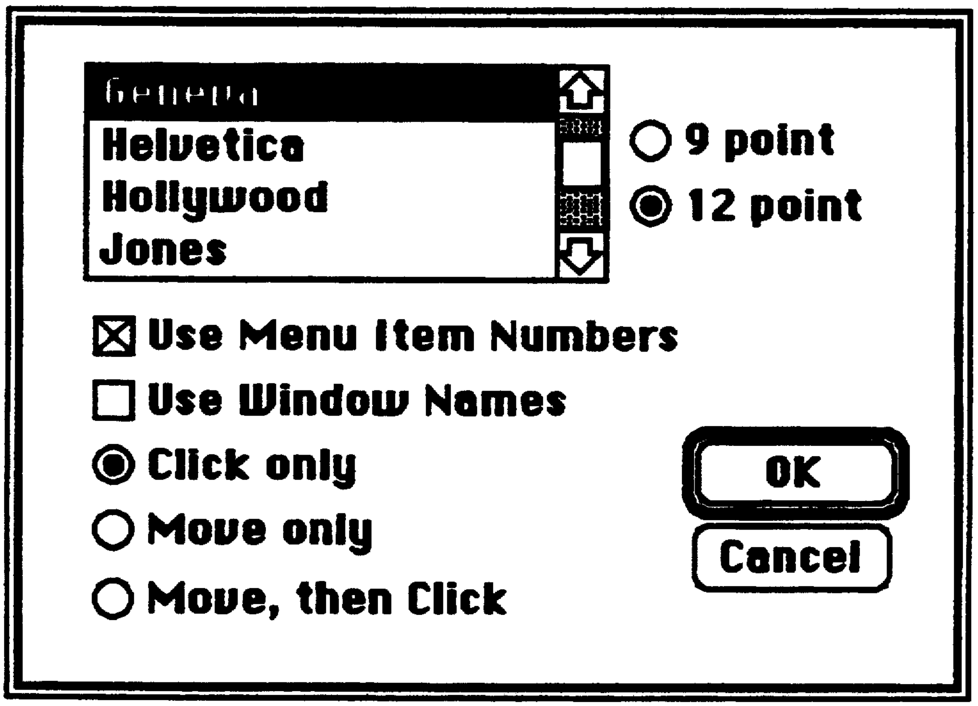

FIG. 120 is a diagram of preference dialog.

Figure 121:
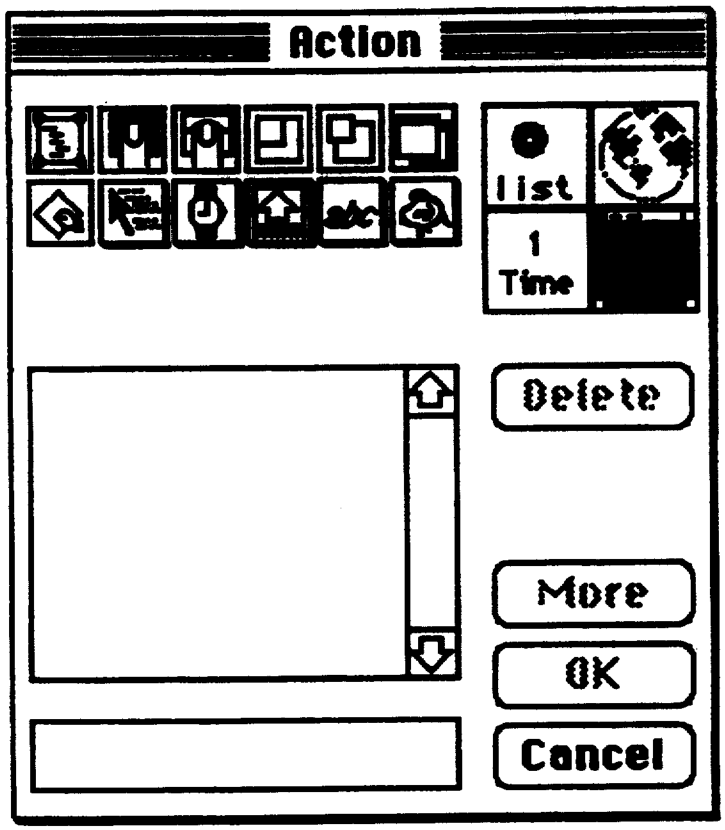

FIG. 121 is a diagram of a new Action window.

Figure 122:
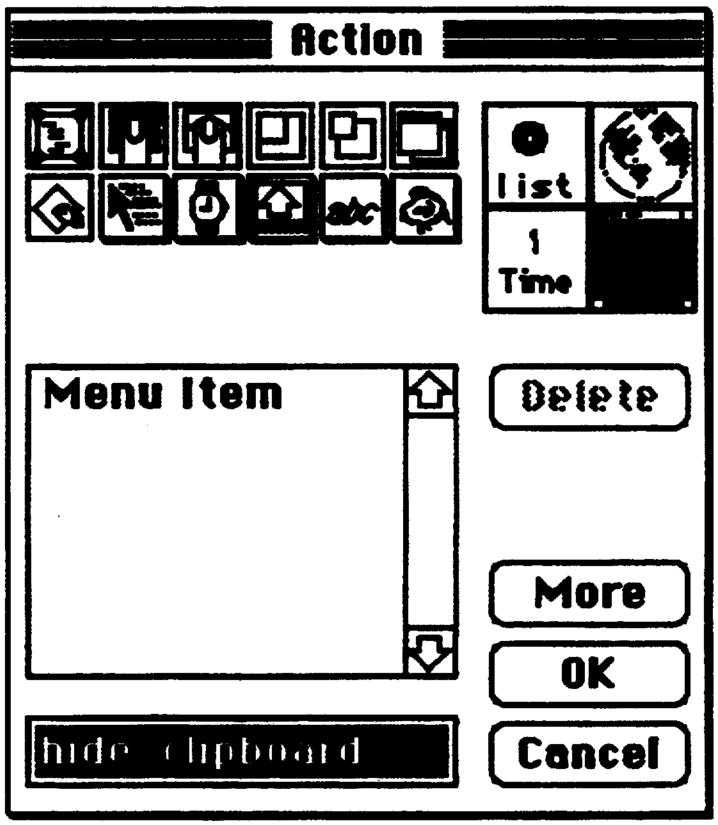

FIG. 122 is a diagram of an Action window with menu item recorded.

Figure 123:
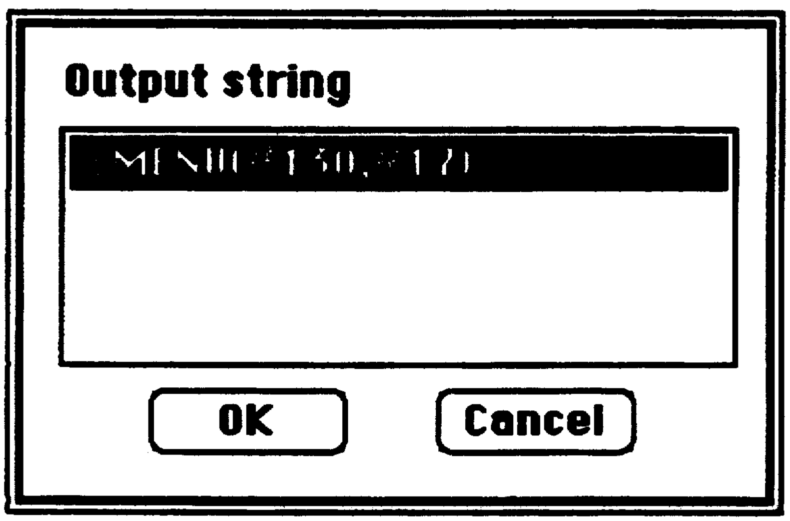

FIG. 123 is a diagram of a menu number used in output.

Figure 124:
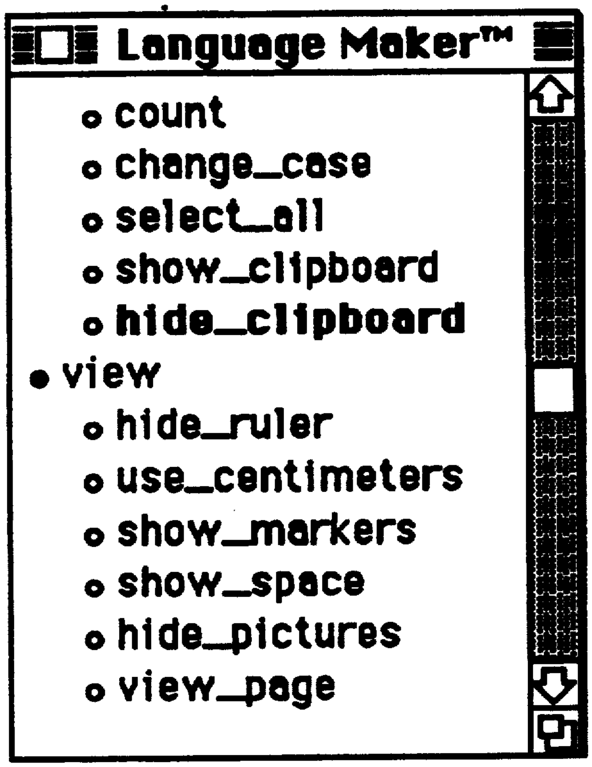

FIG. 124 is a diagram of Hide Clipboard selected in the Language Maker list.

Figure 125:
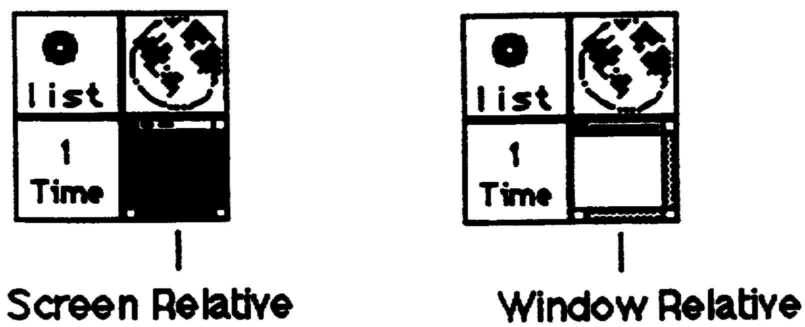

FIG. 125 shows two diagrams of window-relative box for click in a Local window.

Figure 126:
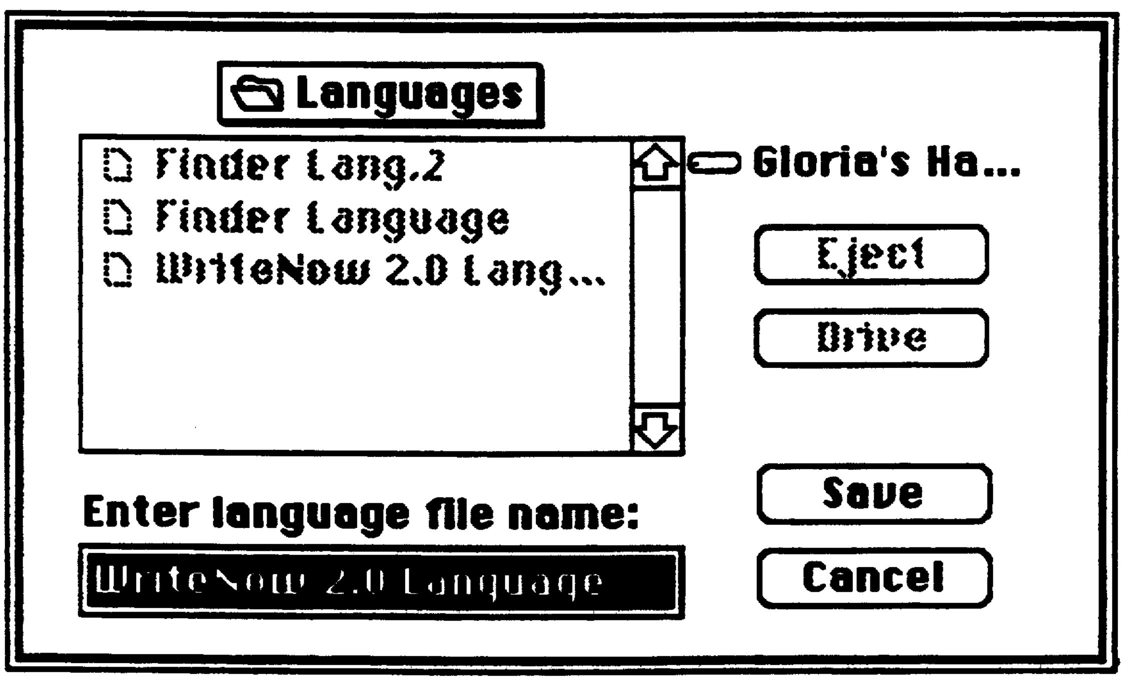

FIG. 126 is a diagram showing save dialog.

Figure 127:
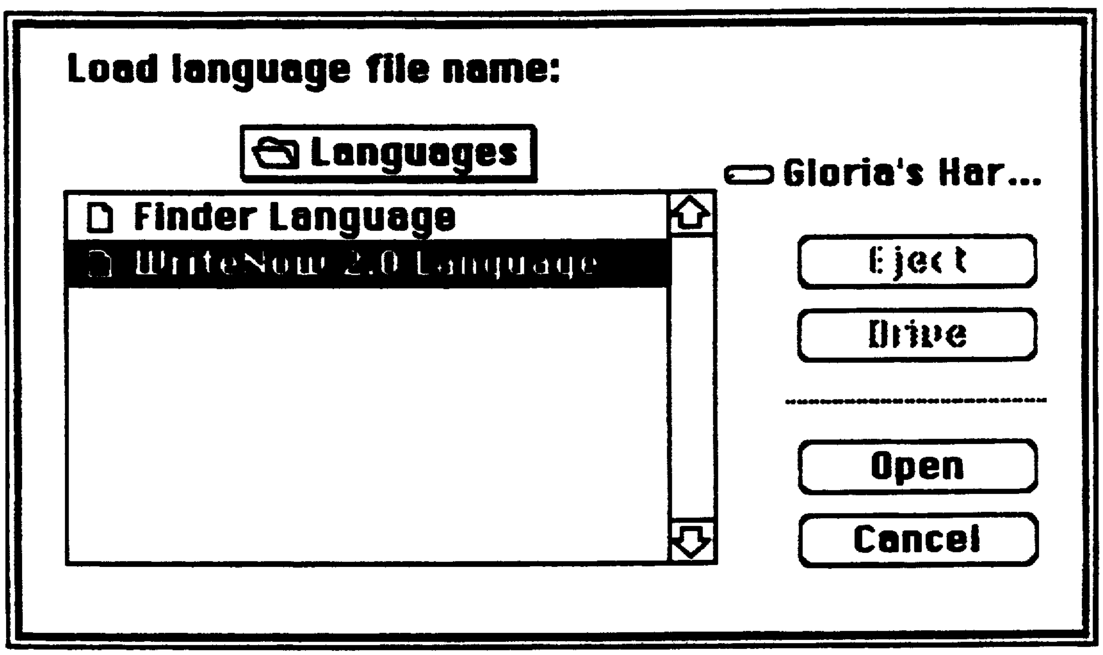

FIG. 127 is a diagram of a load language file dialog box.

Figure 128:
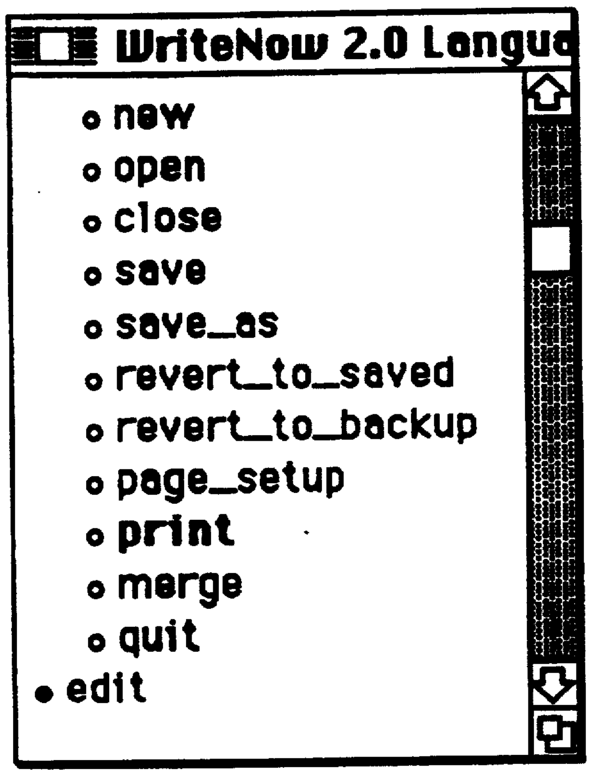

FIG. 128 is a diagram of Print selected in the Language Maker list.

Figure 129:
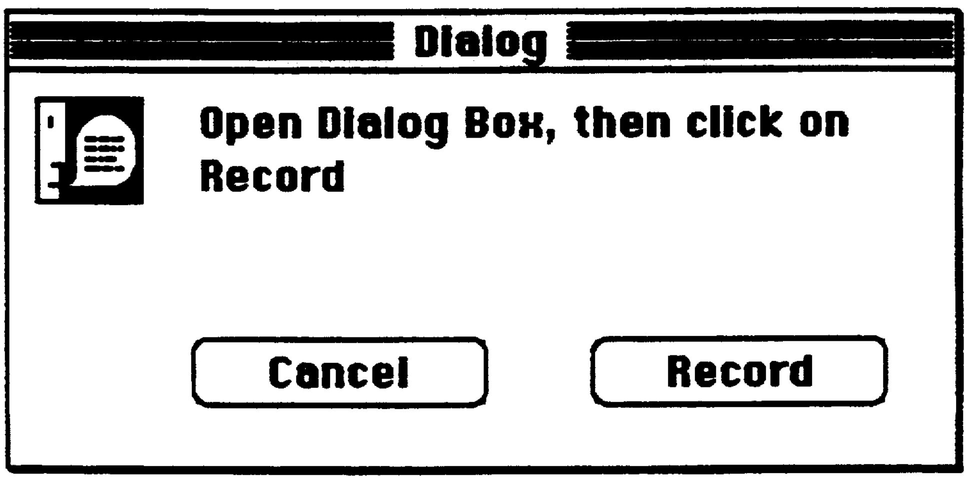

FIG. 129 is a diagram of a Dialog window.

Figure 130:
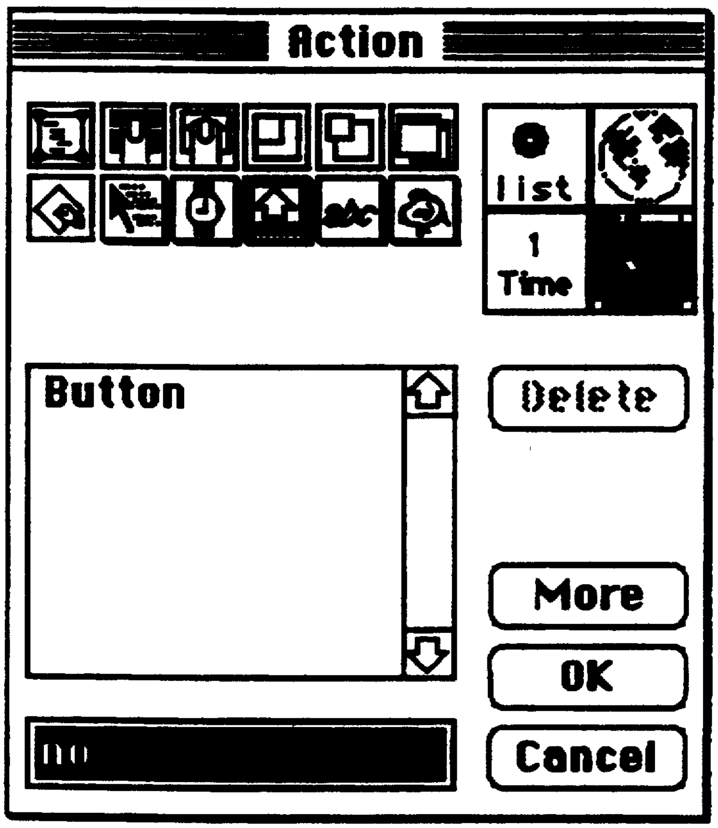

FIG. 130 is a diagram of an Action window for first click.

Figure 131:
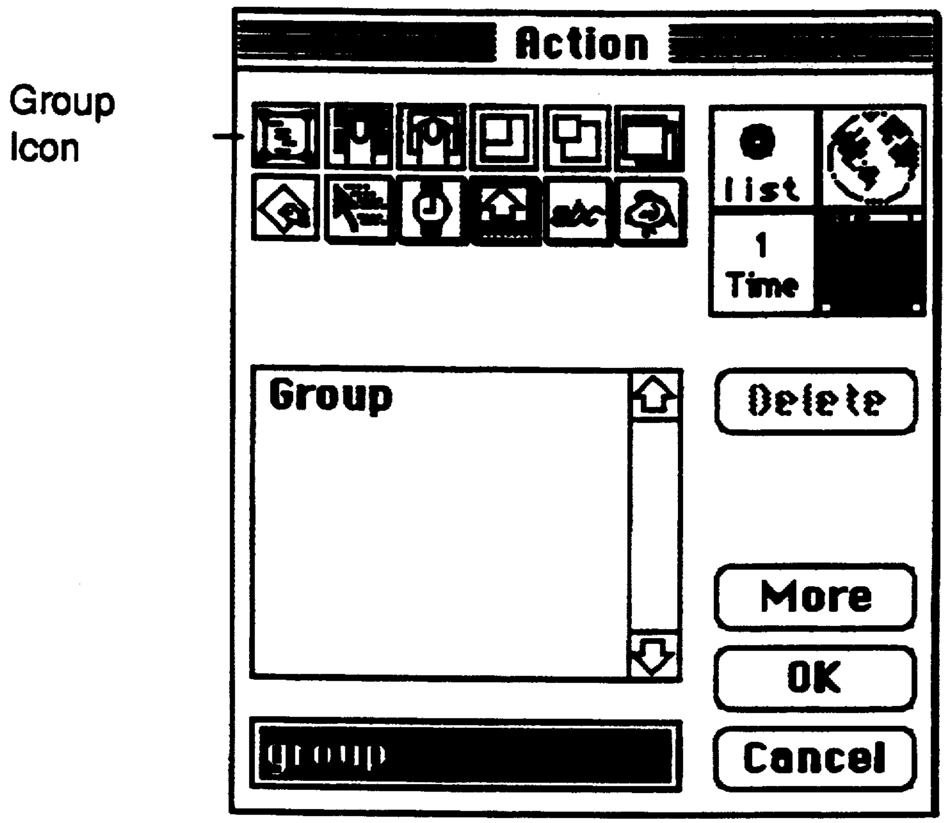

FIG. 131 is a diagram for an Action window with group icon clicked.

Figure 132:
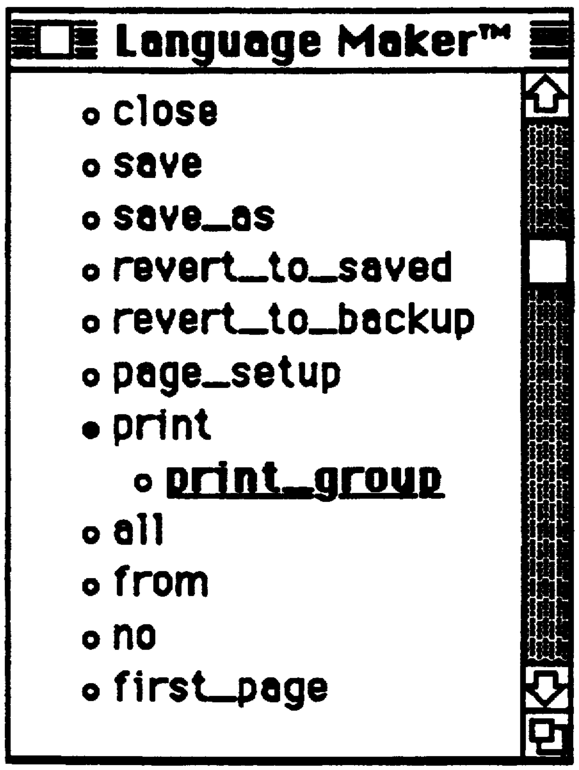

FIG. 132 is a diagram of a Print Group indented below print.

Figure 133:
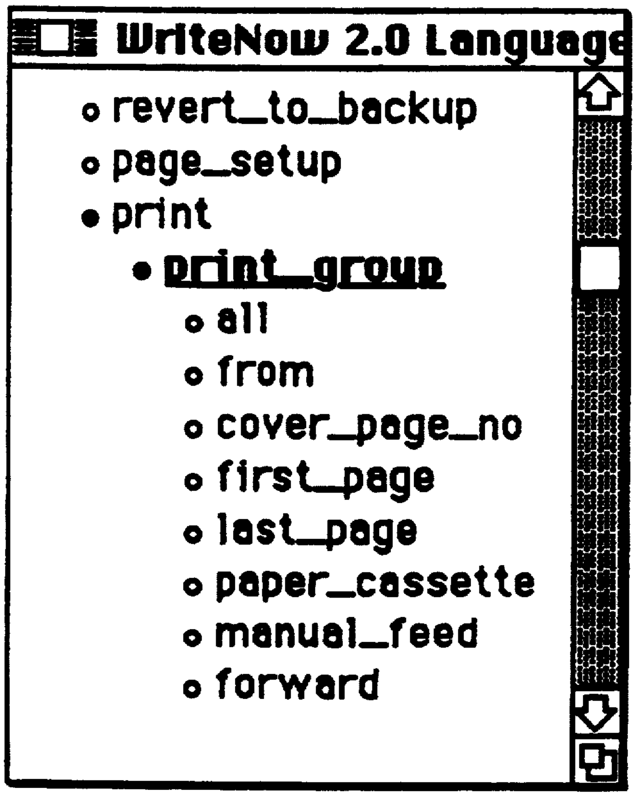

FIG. 133 is a diagram of Print Group indented.

Figure 134:
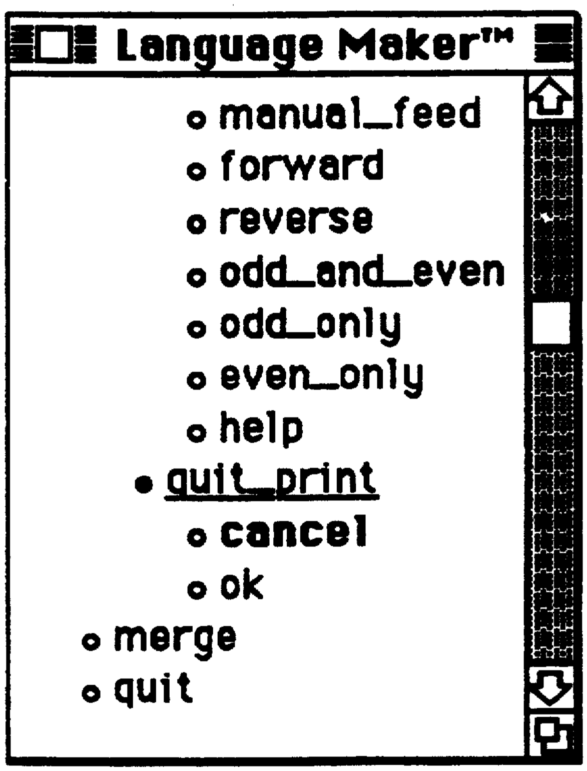

FIG. 134 is a diagram of group words positioned under group headings.

Figure 135:
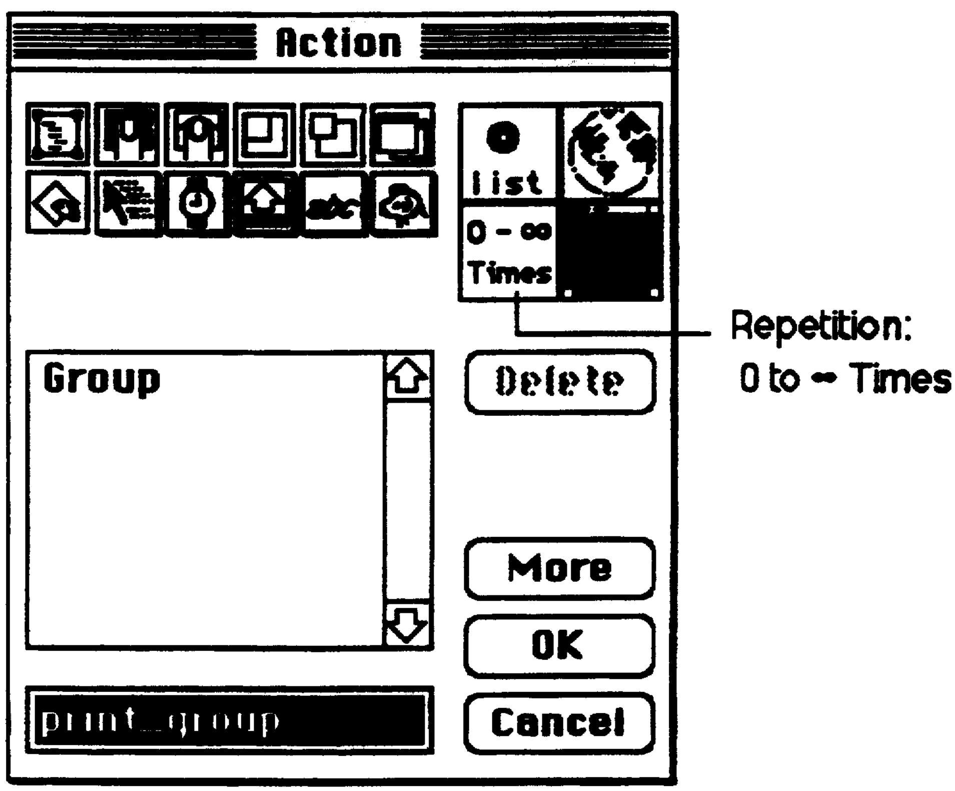

FIG. 135 is a diagram of an Action window with O to infinite items clicked.

Figure 136:
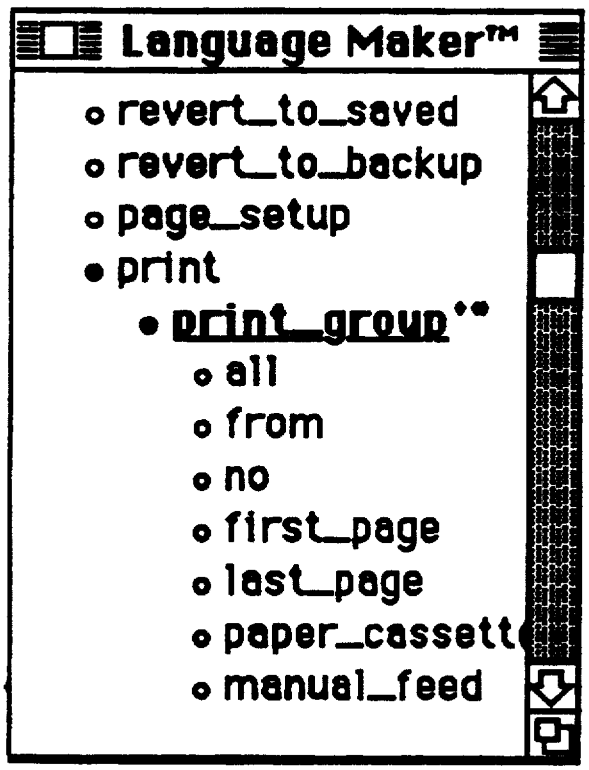

FIG. 136 is a diagram of first group heading with a repetition symbol.

Figure 137:
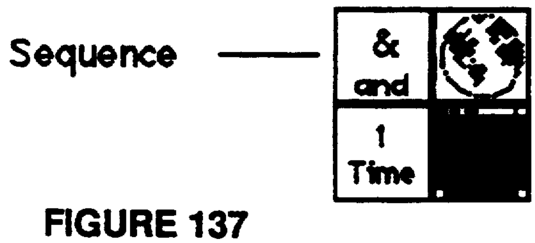

FIG. 137 is a diagram of Sequence in the Action window.

Figure 138:
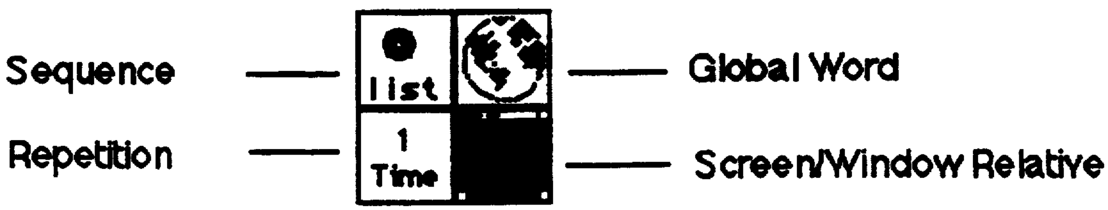

FIG. 138 is a diagram of a Screen/Window relative box.

Figure 139:
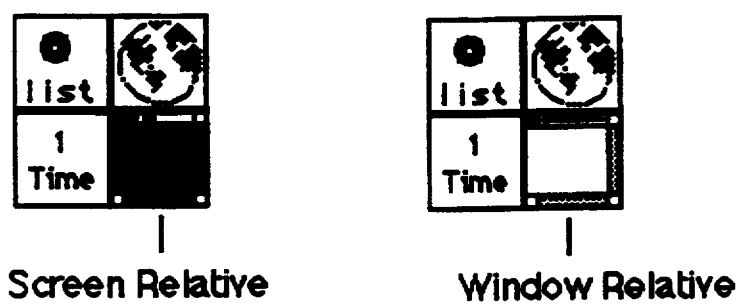

FIG. 139 shows two diagrams of screen and window choices in Action window.

Figure 140:
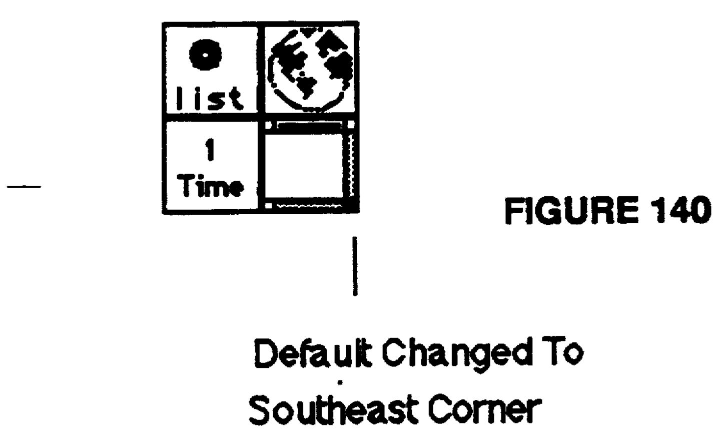

FIG. 140 is a diagram showing Default changed for click coordinates.

Figure 141:
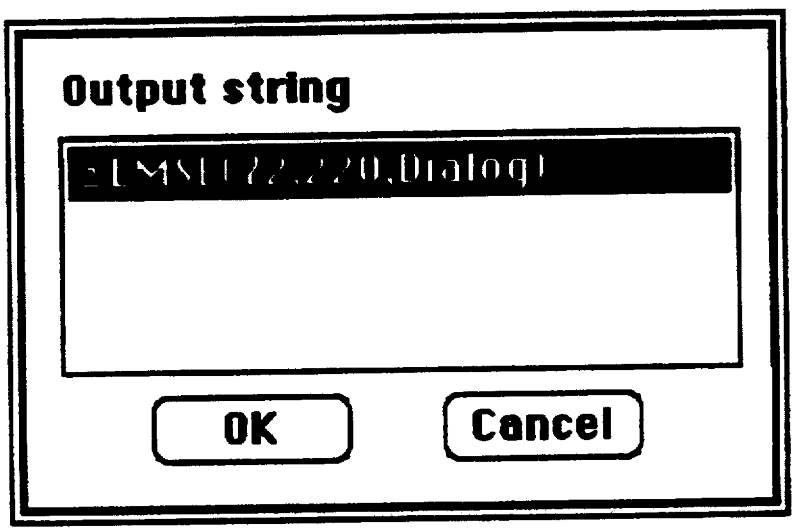

FIG. 141 is a diagram of a window name in output for a window-relative click.

Figure 142:
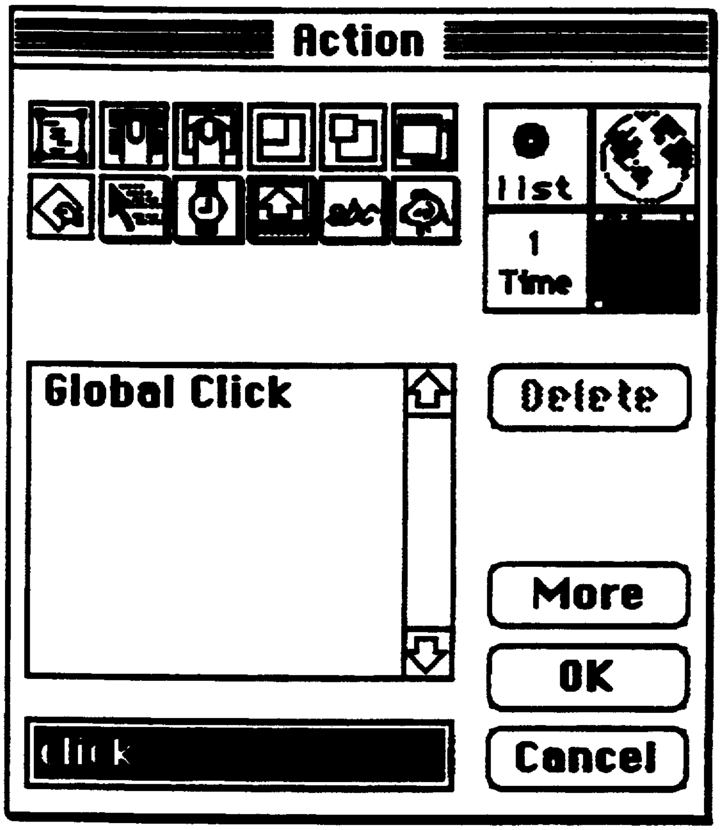

FIG. 142 is a diagram of a Screen-relative click.

Figure 143:
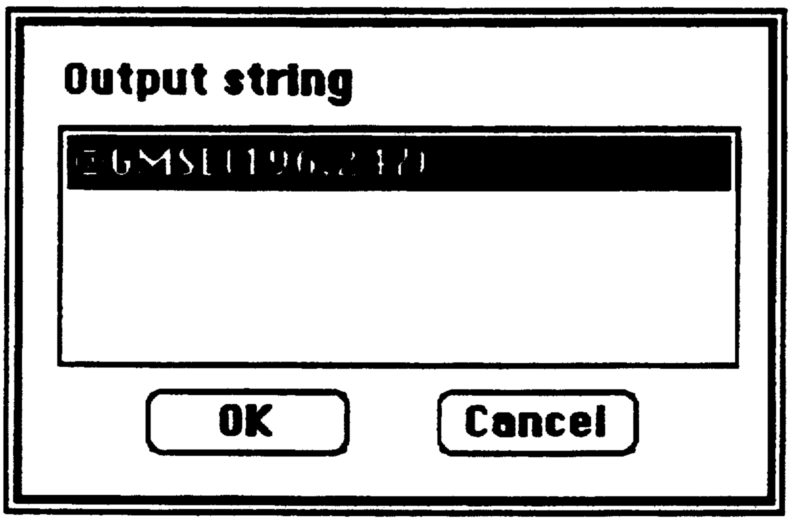

FIG. 143 is a diagram of coordinates for a screen-relative click.

Figure 144:
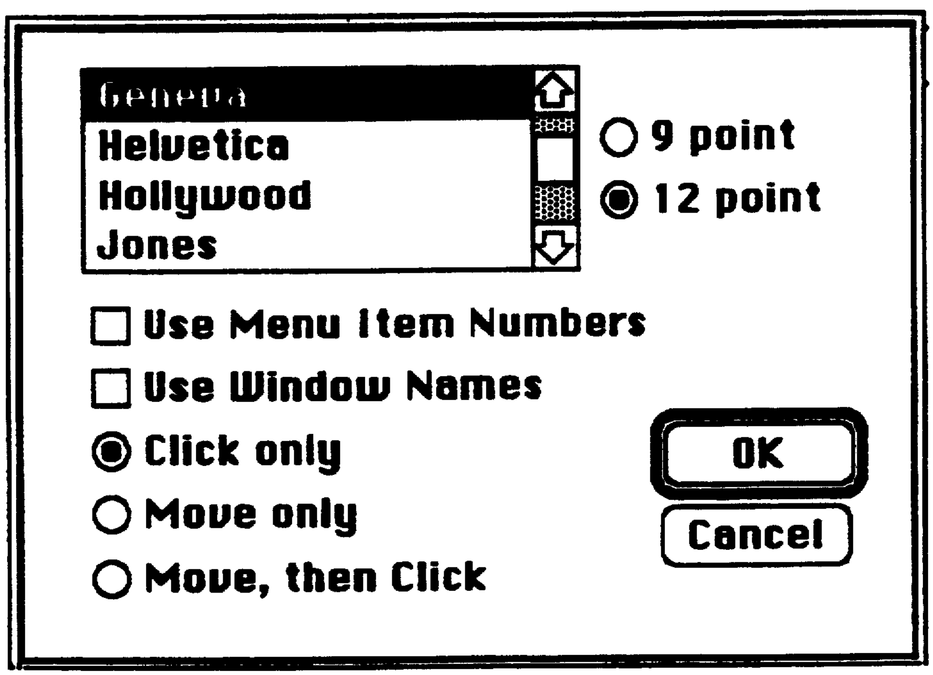

FIG. 144 is a diagram of a preference dialog box.

Figure 145:
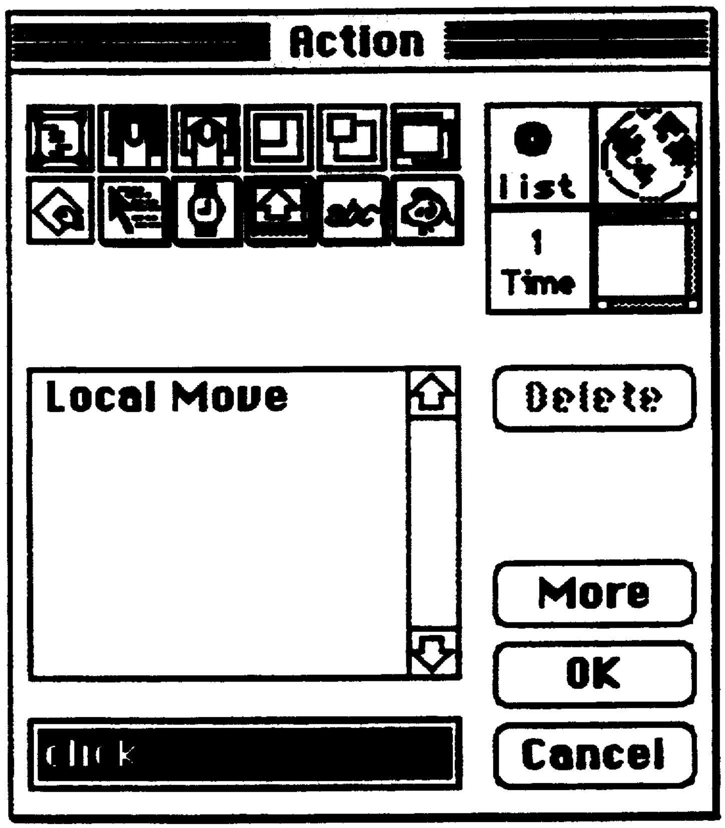

FIG. 145 is a diagram of move only selection recorded in the Action window.

Figure 146:
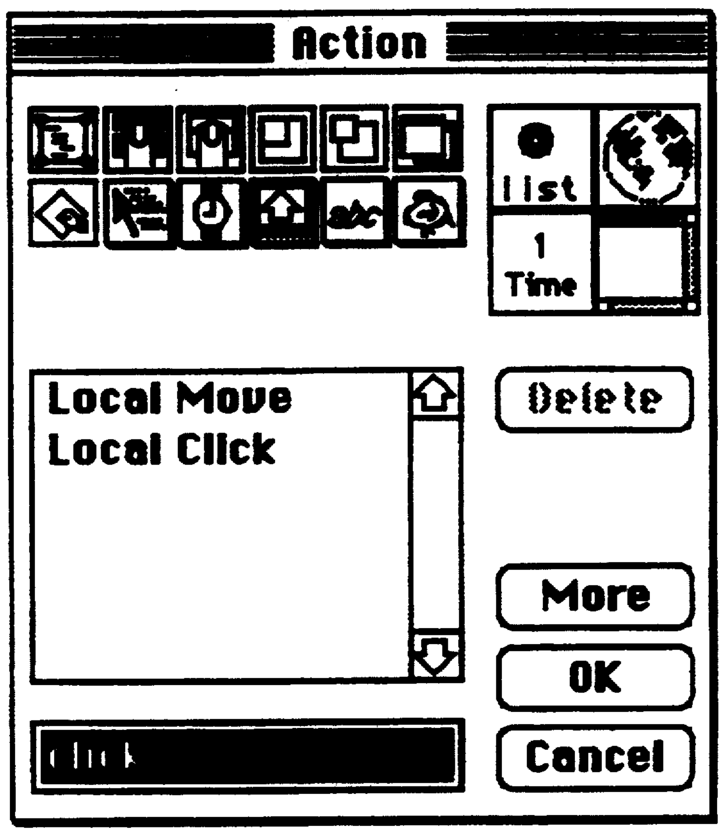

FIG. 146 is a diagram of a move and click selection in the Action window.

Figure 147:
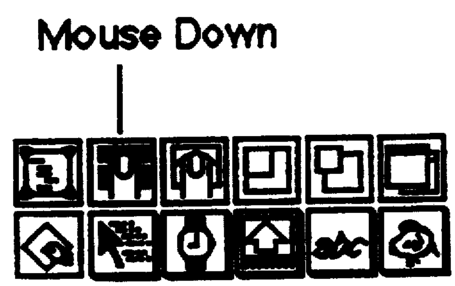

FIG. 147 shows the Mouse down icon.

Figure 148:
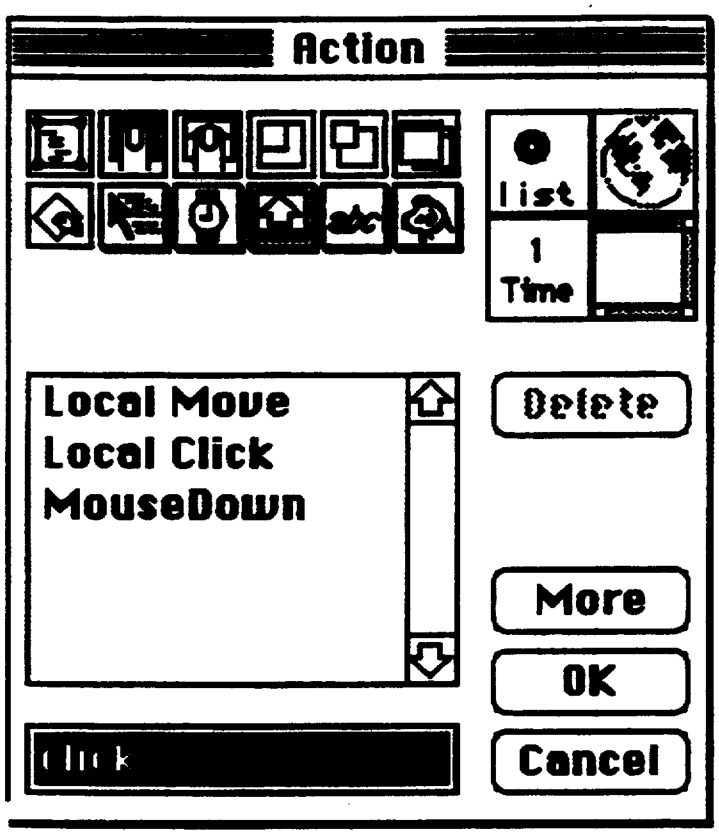

FIG. 148 is a diagram of the Mouse down after a move and click.

Figure 149:
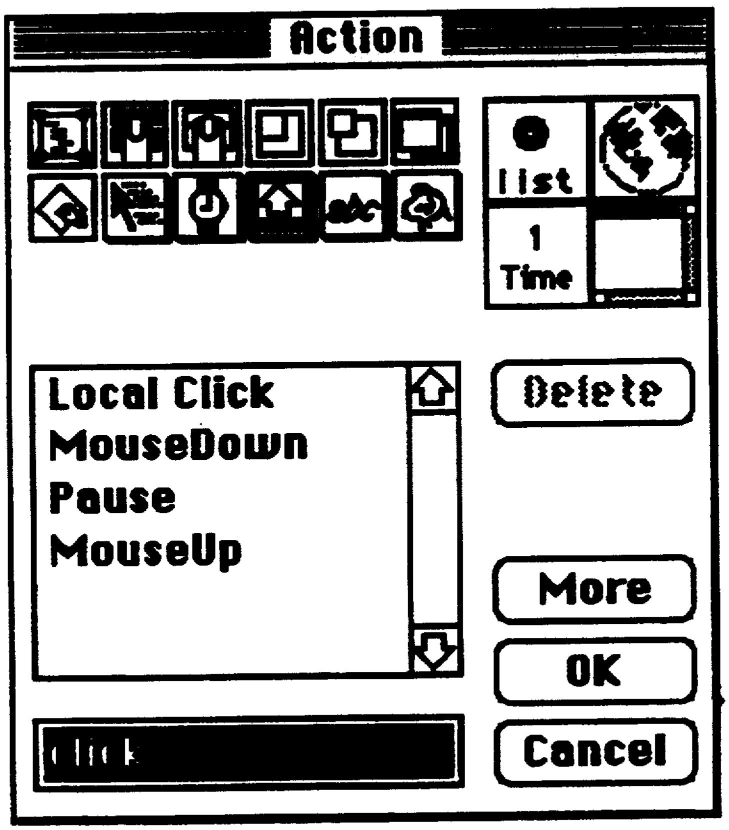

FIG. 149 is a diagram showing click, mouse down, pause, and mouse up.

Figure 150:
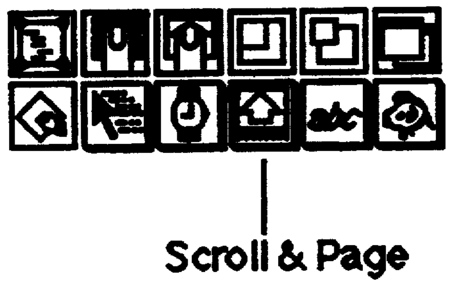

FIG. 150 shows the Scroll and Page icon in the Action window.

Figure 151:
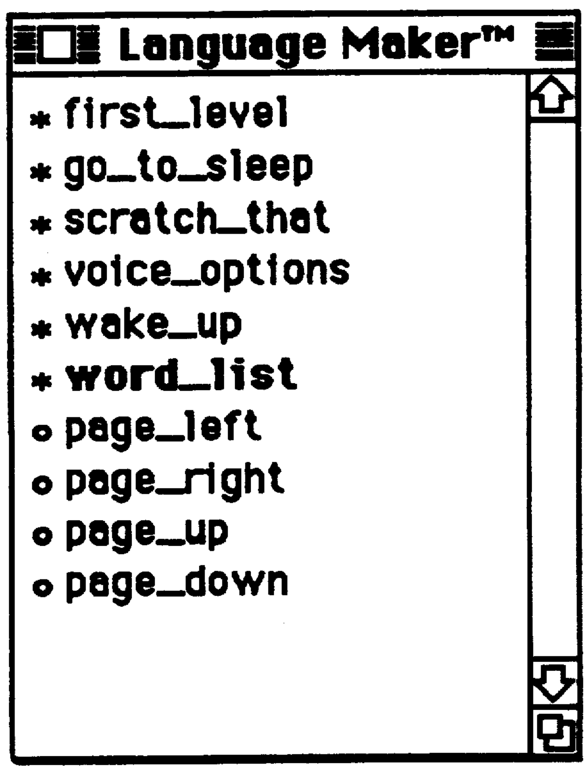

FIG. 151 is a diagram of first level page commands.

Figure 152:
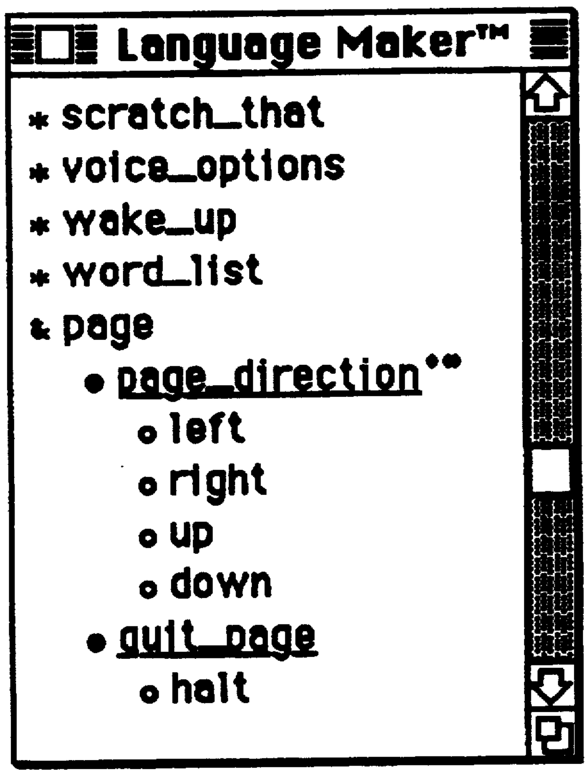

FIG. 152 is a diagram of page commands in the Language Maker list.

Figure 153:
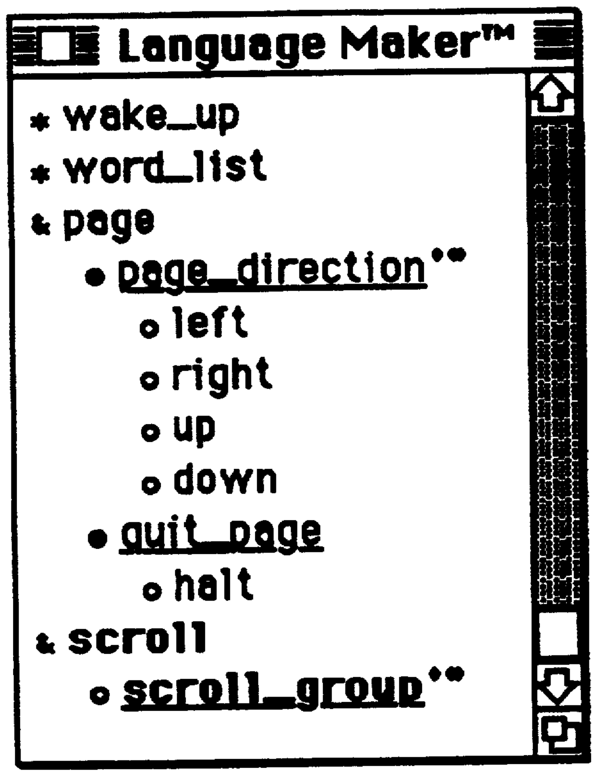

FIG. 153 is a diagram of Scroll Group indented below and Scroll.

Figure 154:
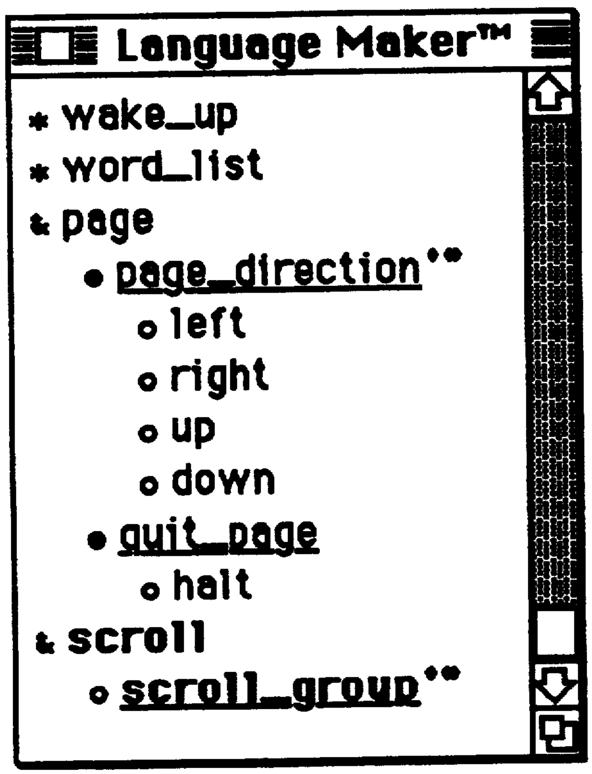

FIG. 154 is a diagram of scroll commands.

Figure 155:
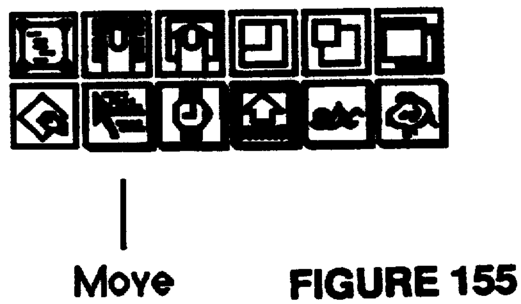

FIG. 155 shows the Move icon in the Action window.

Figure 156:
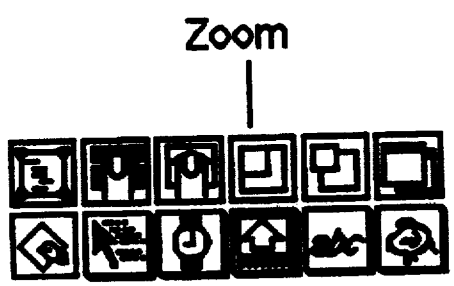

FIG. 156 shows the Zoom box icon in the Action window.

Figure 157:
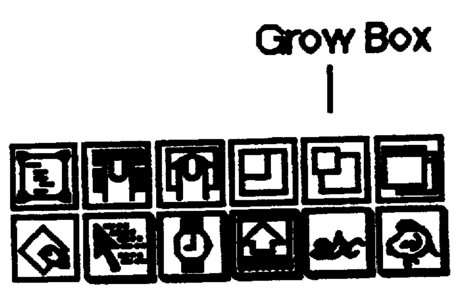

FIG. 157 shows the Grow Box icon in the Action window.

Figure 158:
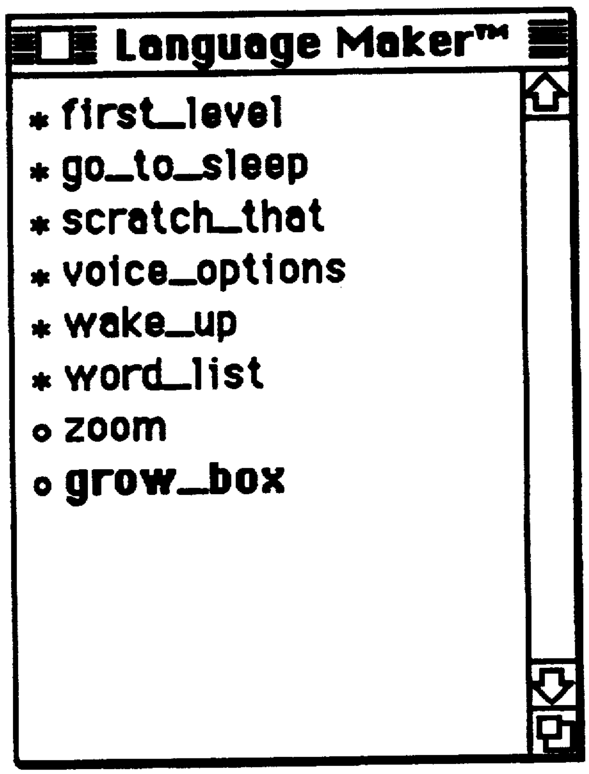

FIG. 158 is a diagram of the zoom and grow commands in language.

Figure 159:
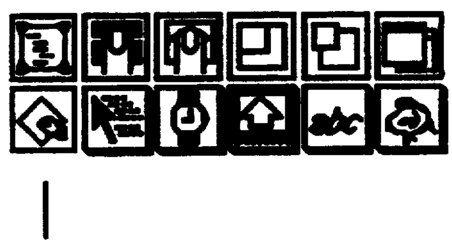

FIG. 159 shows the launch command in the Action window.

Figure 160:
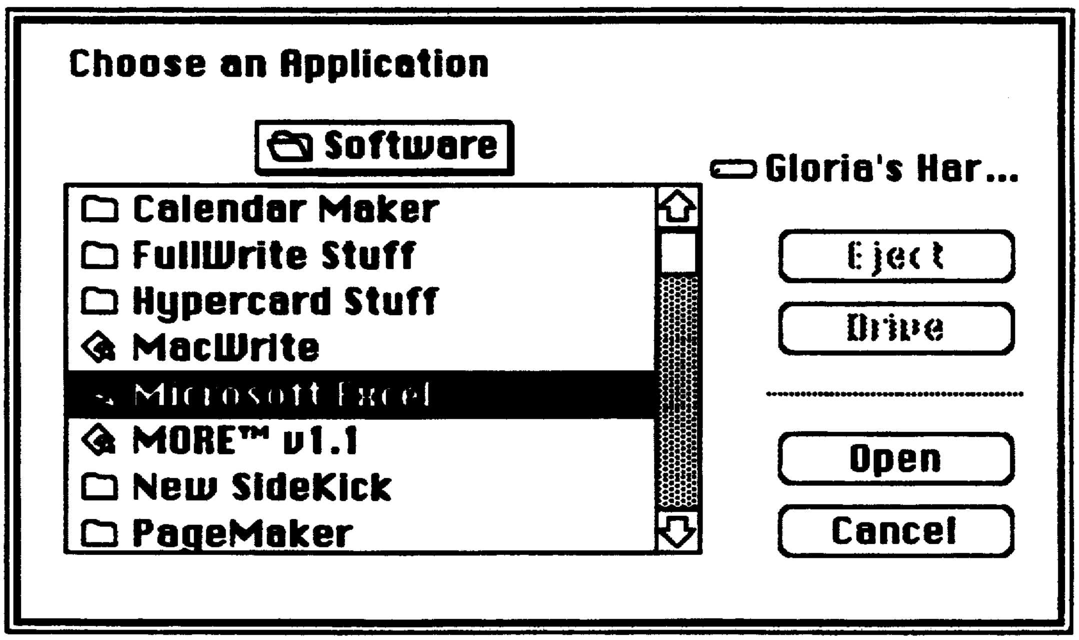

FIG. 160 is a diagram showing the Launch dialog.

Figure 161:
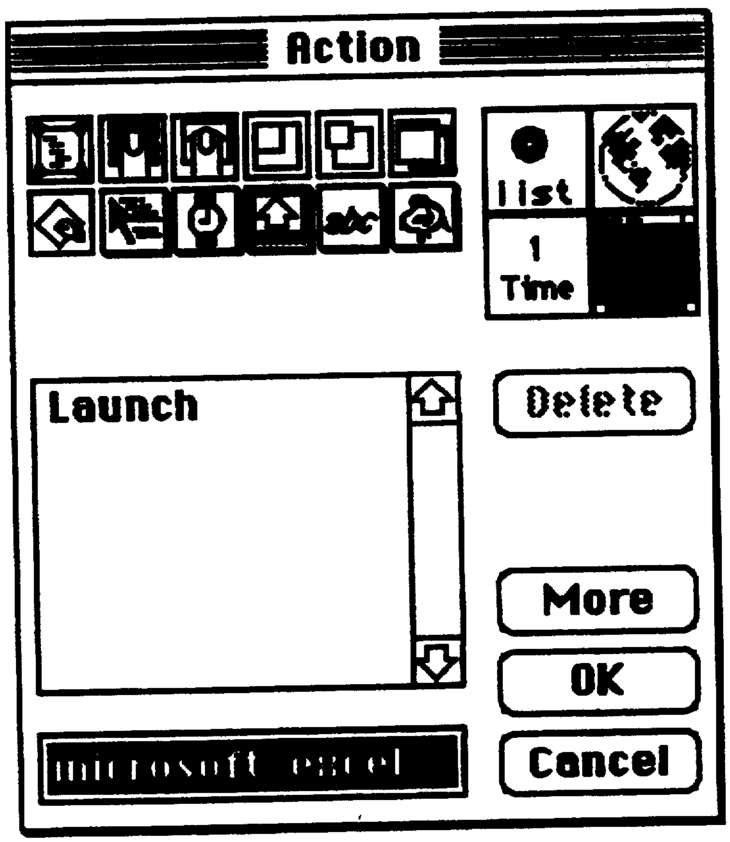

FIG. 161 is a diagram showing the Launch selected in the Action window.

Figure 162:
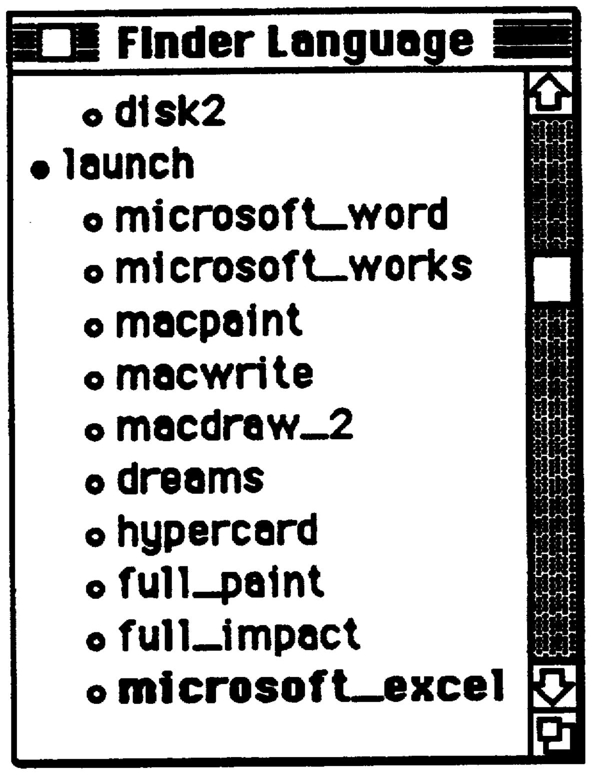

FIG. 162 is a diagram showing the application added to the Launch commands in the Finder list.

Figure 163:
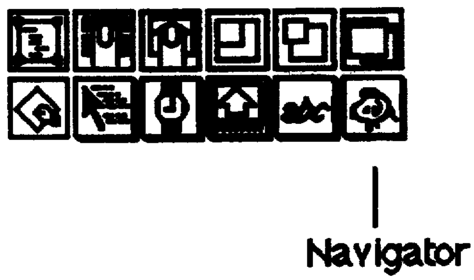

FIG. 163 shows the Navigator icon in the Action window.

Figure 164:
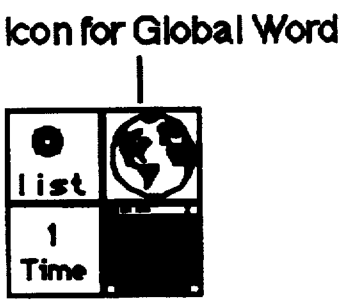

FIG. 164 shows the Global Word icon in the Action window.

Figure 165:
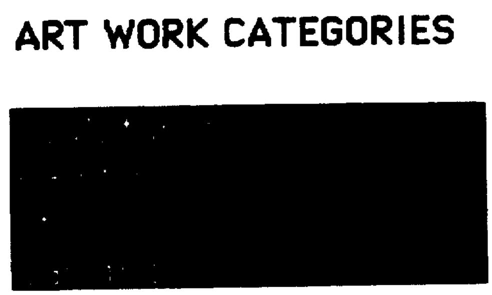

FIG. 165 shows text highlighted for copying to clipboard in one category.

Figure 166:
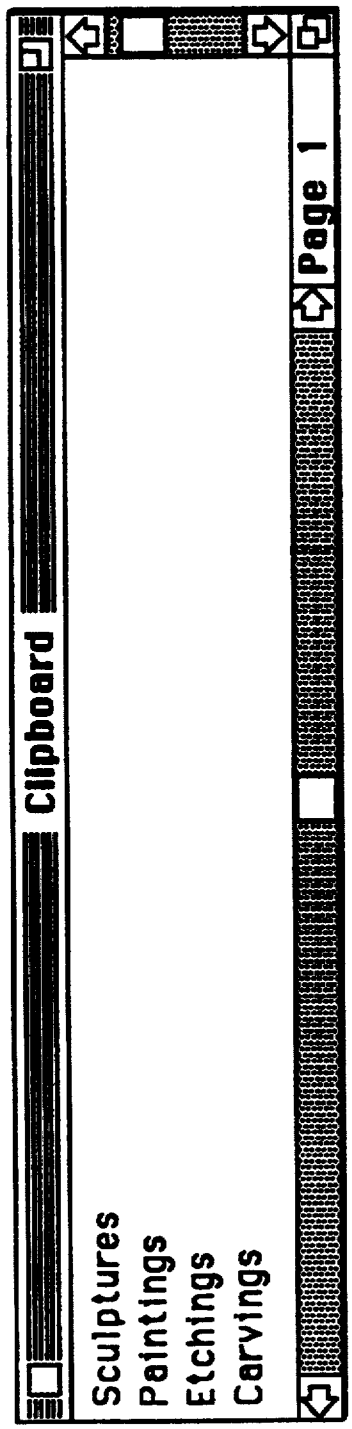

FIG. 166 shows text on clipboard of one category.

Figure 167:
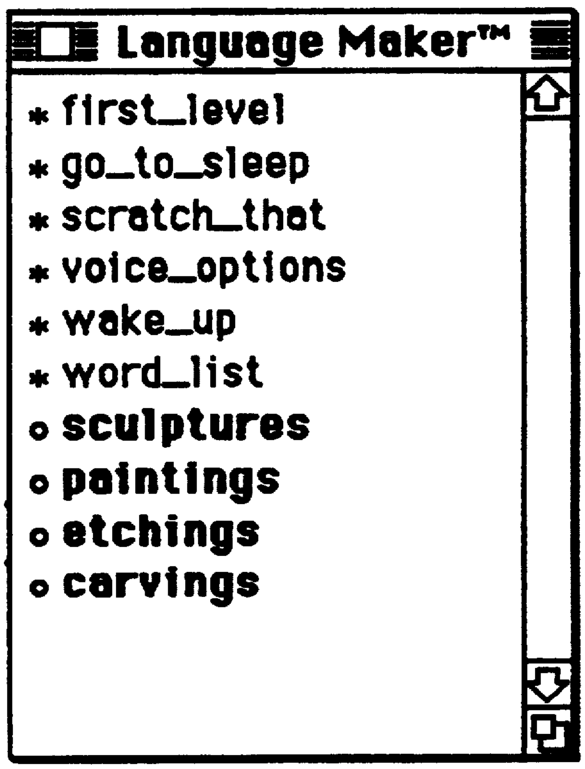

FIG. 167 is a diagram of text added as first level commands in Language Maker list.

Figure 168:
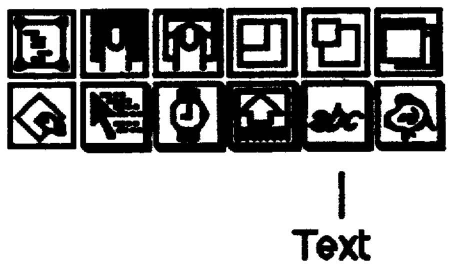

FIG. 168 shows the Text icon in the Action window.

Figure 169:
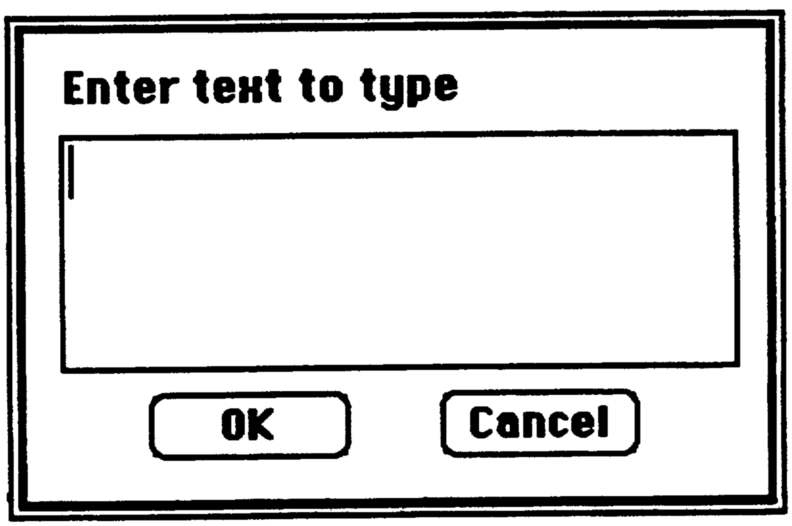

FIG. 169 is a diagram showing the Enter Text dialog.

Figure 170:
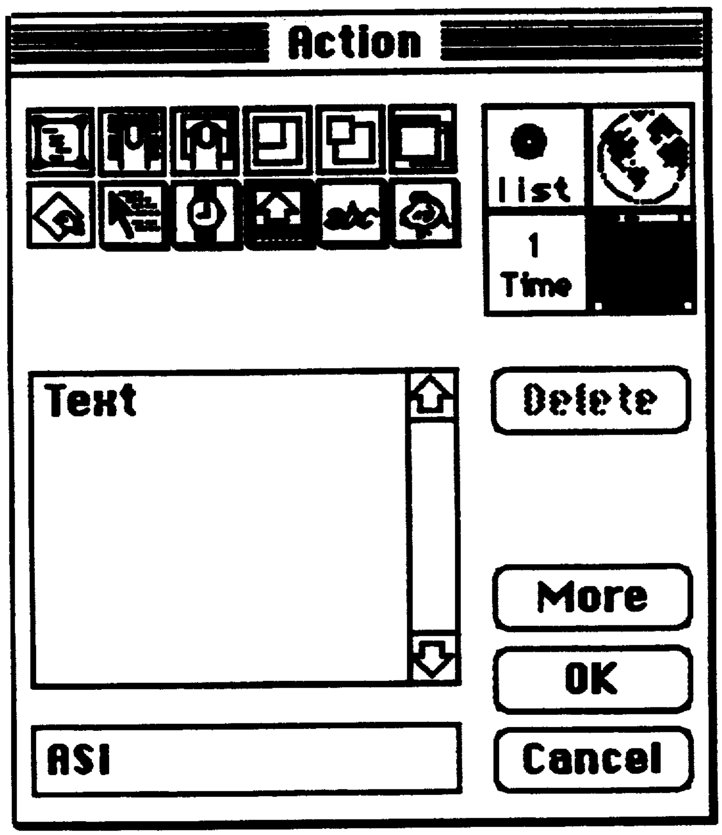

FIG. 170 is a diagram showing naming text in the Action window.

Figure 171:
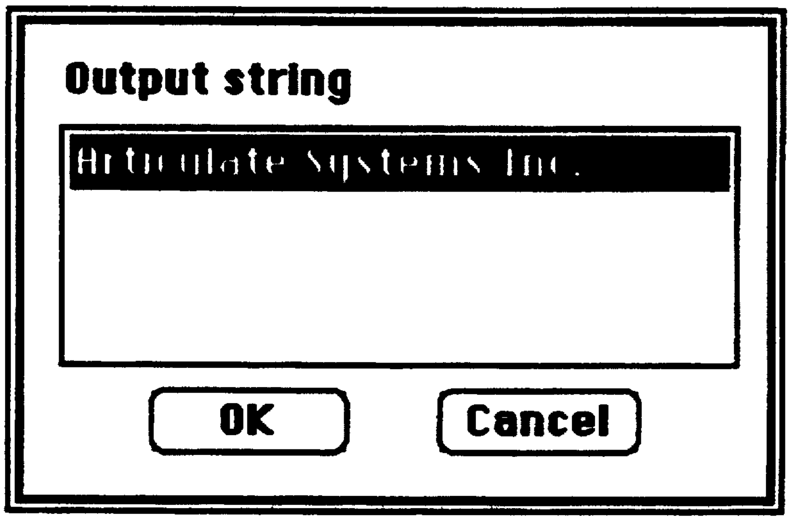

FIG. 171 is a diagram showing text in the Output window.

Figure 172:
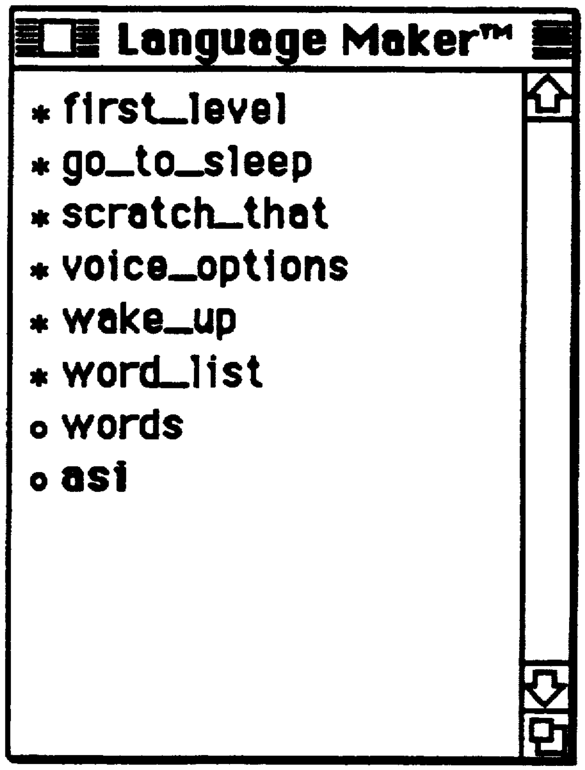

FIG. 172 is a diagram showing text abbreviation in the Action window.

Figure 173:
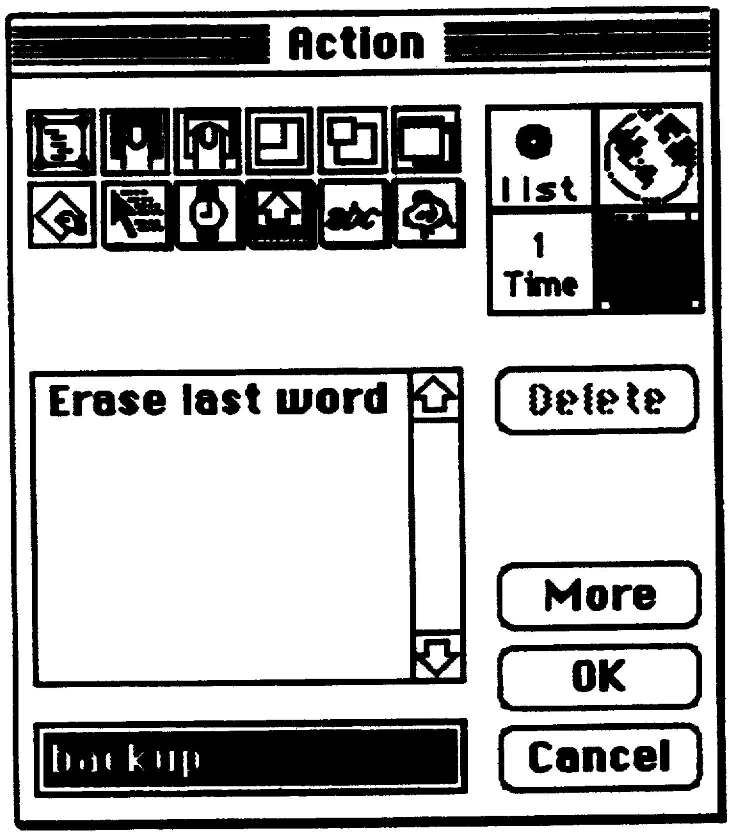

FIG. 173 is a diagram showing the erase command in the Action window.

SYSTEM OVERVIEW

Figure 1:
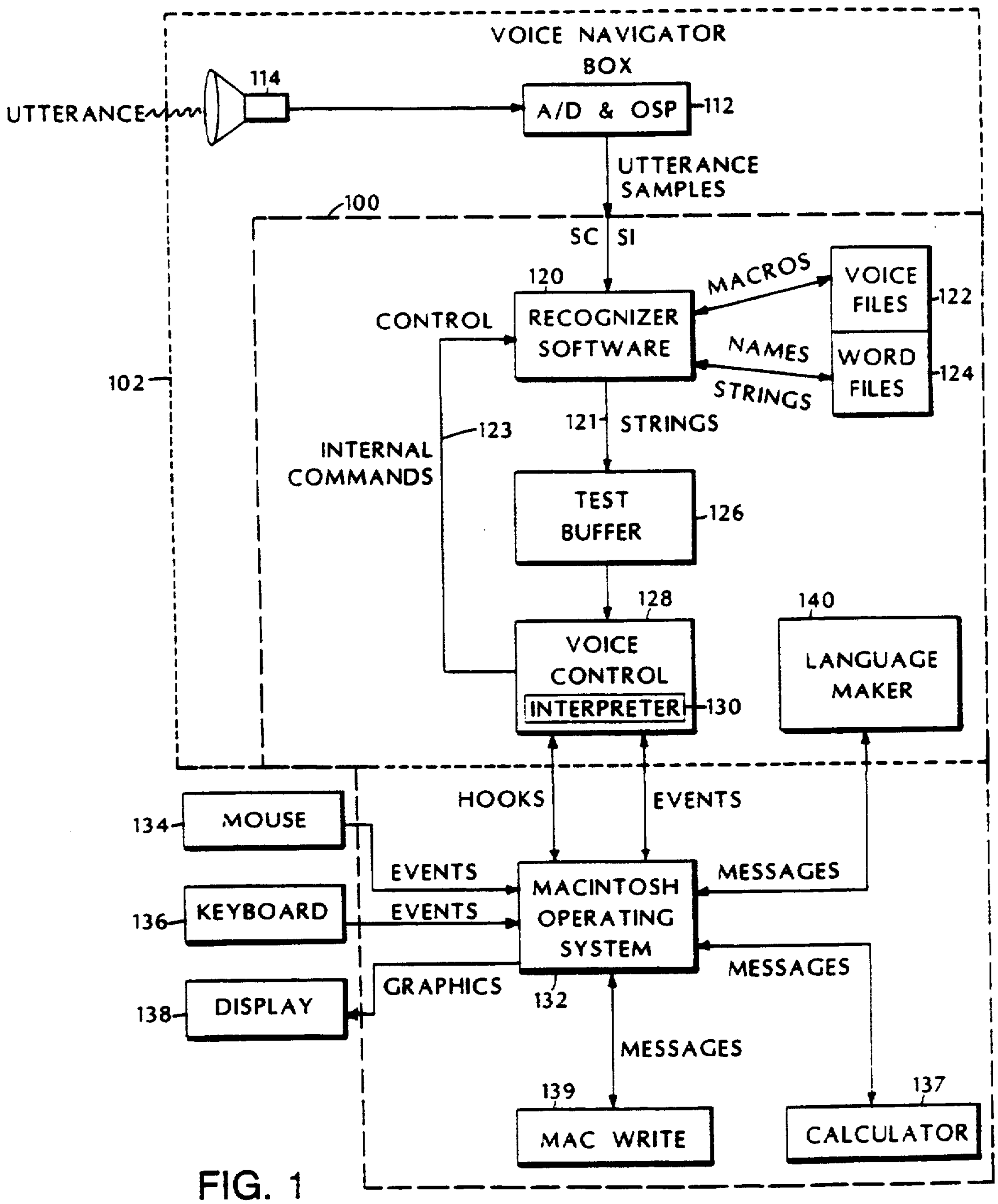
FIG. 1 is a functional block diagram of a Macintosh computer served by a Voice Navigator voice controlled interface system.

Referring to FIG. 1, in an Apple Macintosh computer 100, a Macintosh operating system 132 provides a graphical interactive user interface by processing events received from a mouse 134 and a keyboard 136 and by providing displays including icons, windows, and menus on a display device 138. Operating system 132 provides an environment in which application programs such as MacWrite 139, desktop utilities such as Calculator 137, and a wide variety of other programs can be run.

The operating system 132 also receives events from the Voice Navigator voice controlled computer interface 102 to enable the user to control the computer by voiced utterances. For this purpose, the user speaks into a microphone 114 connected via a Voice Navigator box 112 to the SCSI (Small Computer Systems Interface) port of the computer 100. The Voice Navigator box 112 digitizes and processes analog audio signals received from a microphone 114, and transmits processed digitized audio signals to the Macintosh SCSI port. The Voice Navigator box includes an analog-to-digital converter (A/D) for digitizing the audio signal, a DSP (Digital Signal Processing) chip for compressing the resulting digital samples, and protocol interface hardware which configures the digital samples to obey the SCSI protocols.

Recognizer Software 120 (available from Dragon Systems, Newton, Mass.) runs under the Macintosh operating system, and is controlled by internal commands 123 received from Voice Control driver 128 (which also operates under the Macintosh operating system). One possible algorithm for implementing Recognizer Software 120 is disclosed by Baker et al, in U.S. Pat. No. 4,783,803, incorporated by reference herein. Recognizer Software 120 processes the incoming compressed, digitized audio, and compares each utterance of the user to prestored utterance macros. If the user utterance matches a prestored utterance macro, the utterance is recognized, and a command string 121 corresponding to the recognized utterance is delivered to a text buffer 126. Command strings 121 delivered from the Recognizer Software represent commands to be issued to the Macintosh operating system (e.g., menu selections to be made or text to be displayed), or internal commands 123 to be issued by the Voice Control driver.

During recognition, the Recognizer Software 120 compares the incoming samples of an utterance with macros in a voice file 122. (The system requires the user to space apart his utterances briefly so that the system can recognize when each utterance ends.) The voice file macros are created by a "training" process, described below. If a match is found (as judged by the recognition algorithm of the Recognizer Software 120), a Voice Control command string from a word list 124 (which has been directly associated with voice file 122) is fetched and sent to text buffer 126.

The command strings in text buffer 126 are relayed to Voice control driver 128, which drives a Voice Control interpreter 130 in response to the strings.

A command string 121 may indicate an internal command 123, such as a command to the Recognizer Software to "learn" new voice file macros, or to adjust the sensitivity of the recognition algorithm. In this case, Voice Control interpreter 130 sends the appropriate internal command 123 to the Recognizer Software 120. In other cases, the command string may represent an operating system manipulation, such as a mouse movement. In this case. Voice Control interpreter 130 produces the appropriate action by interacting with the Macintosh operating system 132.

Each application or desktop accessory is associated with a word list 124 and a corresponding voice file 122; these are loaded by the Recognition Software when the application or desktop accessory is opened.

The voice files are generated by the Recognizer Software 120 in its "learn" mode, under the control of internal commands from the Voice Control driver 128.

The word lists are generated by the Language Maker desktop accessory 140, which creates "languages" of utterance names and associated Voice Control command strings, and converts the languages into the word lists. Voice Control command strings are strings such as "ESC" "TEXT" "@MENU(font,2)" and belong to a Voice Control command set, the syntax of which will be described later and is set forth in Appendix A.

The Voice Control and Language Maker software includes about 30,000 lines of code, most of which is written in the C language, the remainder being written in assembly language. A listing of the Voice Control and Language Maker software is provided in microfiche as appendix C. The Voice Control software will operate on a Macintosh Plus or later models, configured with a minimum of 1 Mbyte RAM (2 Mbyte for HyperCard and other large applications), a Hard Disk, and with Macintosh operating system version 6.01 or later.

In order to understand the interaction of the Voice Control interpreter 130 and the operating system, note that Macintosh operating system 132 is "event driven". The operating system maintains an event queue (not shown); input devices such as the mouse 134 or the keyboard 136 "post" events to this queue to cause the operating system to, for example, create the appropriate text entry, or trigger a mouse movement. The operating system 132 then, for example, passes messages to Macintosh applications (such as MacWrite 139) or to desktop accessories (such as Calculator 137) indicating events on the queues (if any). In one mode of operation, Voice Control interpreter 130 likewise controls the operating system (and hence the applications and desktop accessories which are currently running) by posting events to the operating system queues. The events posted by the Voice Control interpreter typically correspond to mouse activity or to keyboard keystrokes, or both, depending upon the voice commands. Thus, the Voice Navigator system 102 provides an additional user interface. In some cases, the "voice" events may comprise text strings to be displayed or included with text being processed by the application program.

At any time during the operation of the Voice Navigator system, the Recognizer Software 120 may be trained to recognize an utterance of a particular user and to associate a corresponding text string with each utterance. In this mode, the Recognizer Software 120 displays to the user a menu of the utterance names (such as "file", "page down") which are to be recognized. These names, and the corresponding Voice Control command strings (indicating the appropriate actions) appear in a current word list 124. The user designates the utterance name of interest and then is prompted to speak the utterance corresponding to that name. For example, if the utterance name is "file" the user might utter "FILE" or "PLEASE FILE". The digitized samples from the Voice Navigator box 112 corresponding to that utterance are then used by the Recognizer Software 120 to create a "macro" representing the utterance, which is stored in the voice file 122 and subsequently associated with the utterance name in the word list 124. Ordinarily, the utterance is repeated more than once, in order to create a macro for the utterance that accommodates variation in a particular speaker's voice.

The meaning of the spoken utterance need not correspond to the utterance name, and the text of the utterance name need not correspond to the Voice Control command strings stored in the word list. For example, the user may wish a command string that causes the operating system to save a file to have the utterance name "save file"; the associated command string may be "@MENU(file,2)"; and the utterance that the user trains for this utterance name may be the spoken phrase "immortalize". The Recognizer Software and Voice Control cause that utterance, name, and command string to be properly associated in the voice file and word list 124.

Figure 2A:
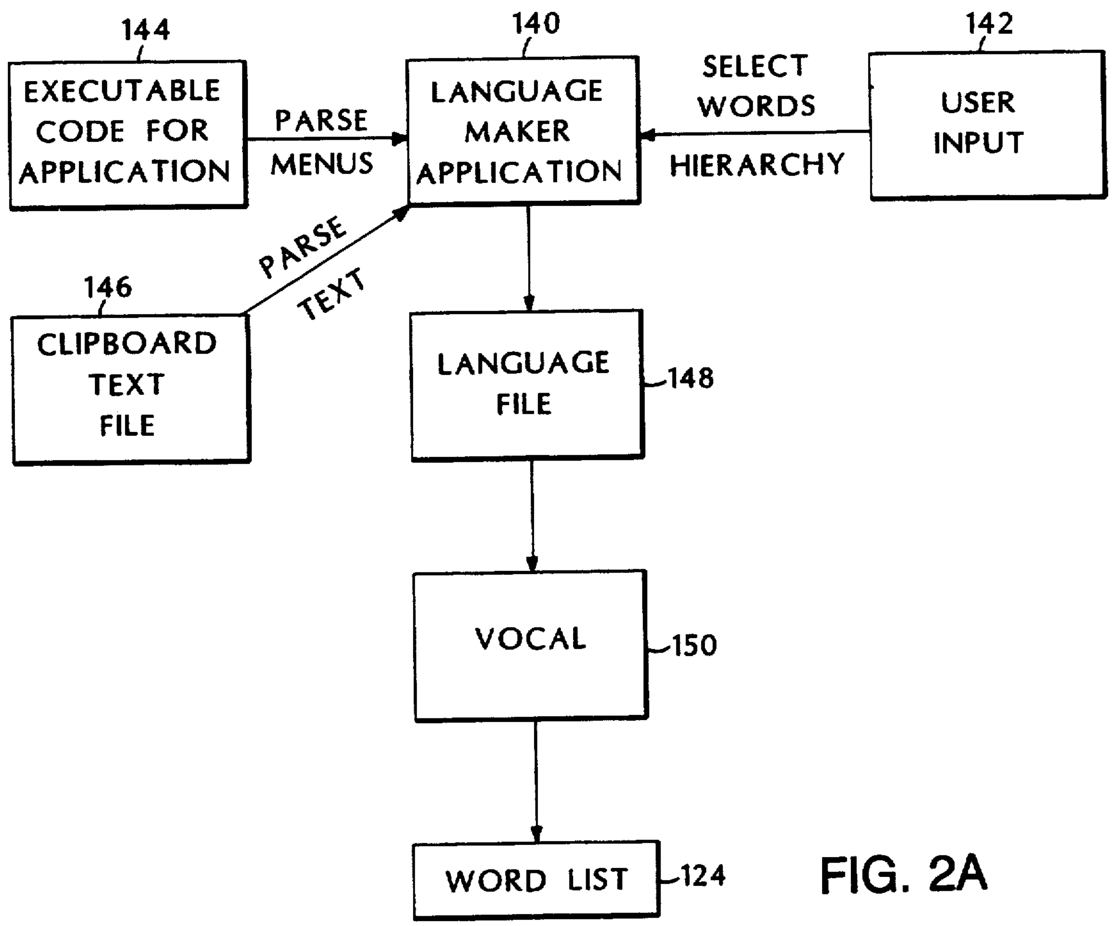
FIG. 2A is a functional block diagram of a Language Maker system for creating word lists for use with the Voice Navigator interface of FIG. 1.

Referring to FIG. 2A, the word lists 124 used by the Voice Navigator are created by the Language Maker desk accessory 140 running under the operating system. Each word list 124 is hierarchical, that is, some utterance names in the list link to sub-lists of other utterance names. Only the list of utterance names at a currently active level of the hierarchy can be recognized. (In the current embodiment, the number of utterance names at each level of the hierarchy can be as large as 1000.) In the operation of Voice Control, some utterances, such as "file", may summon the file menu on the screen, and link to a subsequent list of utterance names at a lower hierarchical level. For example, the file menu may list subsequent commands such as "save", "open", or "save as", each associated with an utterance.

Language Maker enables the user to create a hierarchical language of utterance names and associated command strings, rearrange the hierarchy of the language, and add new utterance names. Then, when the language is in the form that the user desires, the language is converted to a word list 124. Because the hierarchy of the utterance names and command strings can be adjusted, when using the Voice Navigator system the user is not bound by the preset menu hierarchy of an application. For example, the user may want to create a "save" command at the top level of the utterance hierarchy that directly saves a file without first summoning the file menu. Also, the user may, for example, create a new utterance name "goodbye", that saves a file and exits all at once.

Each language created by Language Maker 140 also contains the command strings which represent the actions (e.g. clicking the mouse at a location, typing text on the screen) to be associated with utterances and utterance names. In order for the training of the Voice Navigator system to be more intuitive, the user does not specify the command strings to describe the actions he wishes to be associated with an utterance and utterance name. In fact., the user does not need to know about, and never sees, the command strings stored in the Language Maker language or the resulting word list 124.

In a "record" mode, to associate a series of actions with an utterance name, the user simply performs the desired actions (such as typing the text at the keyboard, or clicking the mouse at a menu). The actions performed are converted into the appropriate command strings, and when the user turns off the record mode, the command strings are associated with the selected utterance name.

While using Language Maker, the user can cause the creation of a language by entering utterance names by typing the names at the keyboard 142, by using a "create default text" procedure 146 (to parse a text file on the clipboard, in which case one utterance name is created for each word in the text file, and the names all start at the same hierarchical level), or by using a "create default menus" procedure (to parse the executable code 144 for an application, and create a set of utterance names which equal the names of the commands in the menus of the application, in which case the initial hierarchy for the names is the same as the hierarchy of the menus in the application).

If the names are typed at the keyboard or created by parsing a text file, the names are initially associated with the keystrokes which, when typed at the keyboard, produce the name. Therefore, the name "text" would be initially be associated with the keystrokes t-e-x-t. If the names are created by parsing the executable code 144 for an application, then the names are initially associated with the command strings which execute the corresponding menu commands for the application. These initial command strings can be changed by simply selecting the utterance name to be changed and putting Language Maker into record mode.

The output of Language Maker is a language file 148. This file contains the utterance names and the corresponding command strings. The language file 148 is formatted for input to a VOCAL compiler 150 (available from Dragon Systems), which converts the language file into a word list 124 for use with the Recognition Software. The syntax of language files is specified in the Voice Navigator Developer's Reference Manual, provided as Appendix D, and incorporated by reference.

Figure 2B:
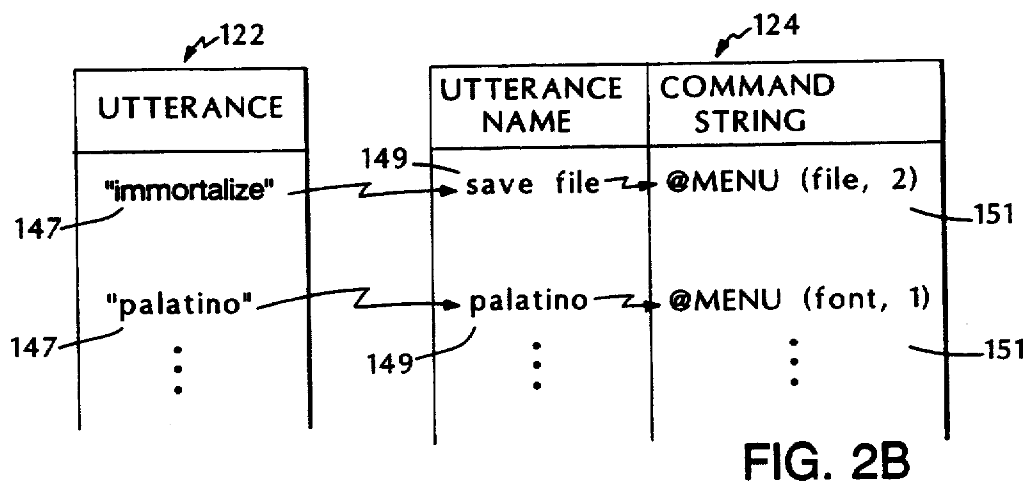
FIG. 2B depicts the format of the voice files and word lists used with the Voice Navigator interface.

Referring to FIG. 2B, a macro 147 of each learned utterance is stored in the voice file 122. A corresponding utterance name 149 and command string 151 are associated with one another and with the utterance and are stored in the word list 124. The word list 124 is created and modified by Language Maker 140, and the voice file 122 is created and modified by the Recognition Software 120 in its learn mode, under the control of the Voice Control driver 128.

Figure 3:
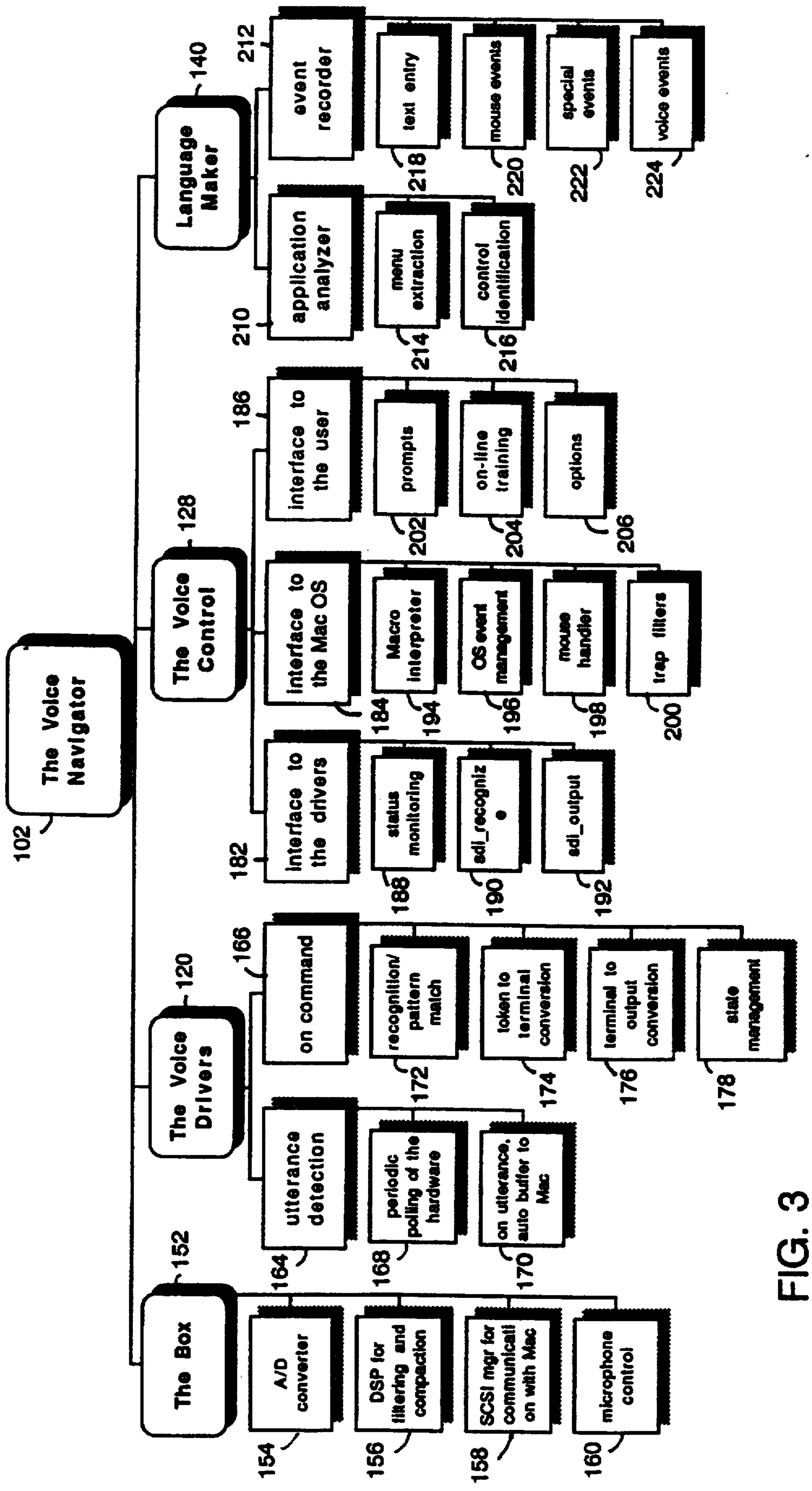
FIG. 3 is an organizational block diagram of the Voice Navigator interface system.

Referring to FIG. 3, in the Voice Navigator system 102, the Voice Navigator hardware box 152 includes an analog-to-digital (A/D) converter 154 for converting the analog signal from the microphone into a digital signal for processing, a DSP section 156 for filtering and compacting the digitized signal, a SCSI manager 158 for communication with the Macintosh, and a microphone control section 160 for controlling the microphone.

The Voice Navigator system also includes the Recognition Software voice drivers 120 which include routines for utterance detection 164 and command execution 166. For utterance detection 164, the voice drivers periodically poll 168 the Voice Navigator hardware to determine if an utterance is being received by Voice Navigator box 152, based on the amplitude of the signal received by the microphone. When an utterance is detected 170, the voice drivers create a speech buffer of encoded digital samples (tokens) to be used by the command execution drivers 166. On command 166 from the Voice Control driver 128, the recognition drivers can learn new utterances by token-to-terminal conversion 174. The token is converted to a macro for the utterance, and stored as a terminal in a voice file 122 (FIG. 1).

Recognition and pattern matching 172 is also performed on command by the voice drivers. During recognition, a stored token of incoming digitized samples is compared with macros for the utterances in the current level of the recognition hierarchy. If a match is found, terminal to output conversion 176 is also performed, selecting the command string associated with the recognized utterance from the word list 124 (FIG. 1). State management 178, such as changing of sensitivity controls, is also performed on command by the voice drivers.

The Voice Control driver 128 forms an interface 182 to the voice drivers 120 through control commands, an interface 184 to the Macintosh operating system 132 (FIG. 1) through event posting and operating system hooks, and an interface 186 to the user through display menus and prompts.

The interface 182 to the drivers allows Voice Control access to the Voice Driver command functions 166. This interface allows Voice Control to monitor 188 the status of the recognizer, for example to check for an utterance token in the utterance queue buffered 170 to the Macintosh. If there is an utterance, and if processor time is available, Voice Control issues command sdi_recognize 190, calling the recognition and pattern match routine 172 in the voice drivers. In addition, the interface to the drivers may issue command sdi_output 192 which controls the terminal to output conversion routine 176 in the voice drivers, converting a recognized utterance to an command string for use by Voice Control. The command string may indicate mouse or keystroke events to be posted to the operating system, or may indicate commands to Voice Control itself (e.g. enabling or disabling Voice Control).

From the user's perspective, Voice Control is simply a Macintosh driver with internal parameters, such as sensitivity, and internal commands, such as commands to learn new utterances. The actual processing which the user perceives as Voice Control may actually be performed by Voice Control, or by the Voice Drivers, depending upon the function. For example, the utterance learning procedures are performed by the Voice Drivers under the control of Voice Control.

The interface 184 to the Macintosh operating system allows Voice Control, where appropriate, to manipulate the operating system (e.g., by posting events or modifying event queues). The macro interpreter 194 takes the command strings delivered from the voice drivers via the text buffer and interprets them to decide what actions to take. These commands may indicate text strings to be displayed on the display or mouse movements or menu selections to be executed.

In the interpretive execution of the command strings, Voice Control must manipulate the Macintosh event queues. This task is performed by OS event management 196. As discussed above, voice events may simulate events which are ordinarily associated with the keyboard or with the mouse. Keyboard events are handled by OS event management 196 directly. Mouse events are handled by mouse handler 198. Mouse events require an additional level of handling because mouse events can require operating system manipulation outside of the standard event post routines which are accomplished by the OS event management 196.

The main interface into the Macintosh operating system 132 is event based, and is used in the majority of the commands which are voice recognized and issued to the Macintosh. However, there are other "hooks" to the operating system state which are used to control parameters such as mouse placement and mouse motion. For example, as will be discussed later, pushing the mouse button down generates an event, however, keeping the mouse button pushed down and dragging the mouse across a menu requires the use of an operating system hook. For reference, the operating system hooks used by the Voice Navigator are listed in Appendix B.

The operating system hooks are implemented by the trap filters 200, which are filters used by Voice Control to force the Macintosh operating system to accept the controls implemented by OS event management 196 and mouse handler 198.

The Macintosh operating system traps are held in Macintosh read only memories (ROMs), and implement high level commands for controlling the system. Examples of these high level commands are: drawing a string onto the screen, window zooming, moving windows to the front and back of the screen, and polling the status of the mouse button. In order for the Voice Control driver to properly interface with the Macintosh operating system it must control these operating system traps to generate the appropriate events.

To generate menu events, for example, Voice Control "seizes" the menu select trap (i.e. takes control of the trap from the operating system). Once Voice Control has seized the trap, application requests for menu selections are forwarded to Voice Control. In this way Voice Control is able to modify, where necessary, the operating system output to the program, thereby controlling the system behavior as desired.

The interface 186 to the user provides user control of the Voice Control operations. Prompts 202 display the name of each recognized utterance on the Macintosh screen so that the user may determine if the proper utterance has been recognized. On-line training 204 allows the user to access, at any time while using the Macintosh, the utterance names in the word list 124 currently in use. The user may see which utterance names have been trained and may retrain the utterance names in an on-line manner (these functions require Voice Control to use the Voice Driver interface, as discussed above). User options 206 provide selection of various Voice Control settings, such as the sensitivity and confidence level of the recognizer (i.e., the level of certainty required to decide that an utterance has been recognized). The optimal values for these parameters depend upon the microphone in use and the speaking voice of the user.

The interface 186 to the user does not operate via the Macintosh event interface. Rather, it is simply a recursive loop which controls the Recognition Software and the state of the Voice Control driver.

Language Maker 140 includes an application analyzer 210 and an event recorder 212. Application analyzer 210 parses the executable code of applications as discussed above, and produces suitable default utterance names and pre-programmed command strings. The application analyzer 210 includes a menu extraction procedure 214 which searches executable code to find text strings corresponding to menus. The application analyzer 210 also includes control identification procedures 216 for creating the command strings corresponding to each menu item in an application.

The event recorder 212 is a driver for recording user commands and creating command strings for utterances. This allows the user to easily create and edit command strings as discussed above.

Types of events which may be entered into the event recorder include: text entry 218, mouse events 220 (such as clicking at a specified place on the screen), special events 222 which may be necessary to control a particular application, and voice events 224 which may be associated with operations of the Voice Control driver.

LANGUAGE MAKER

Figure 4:
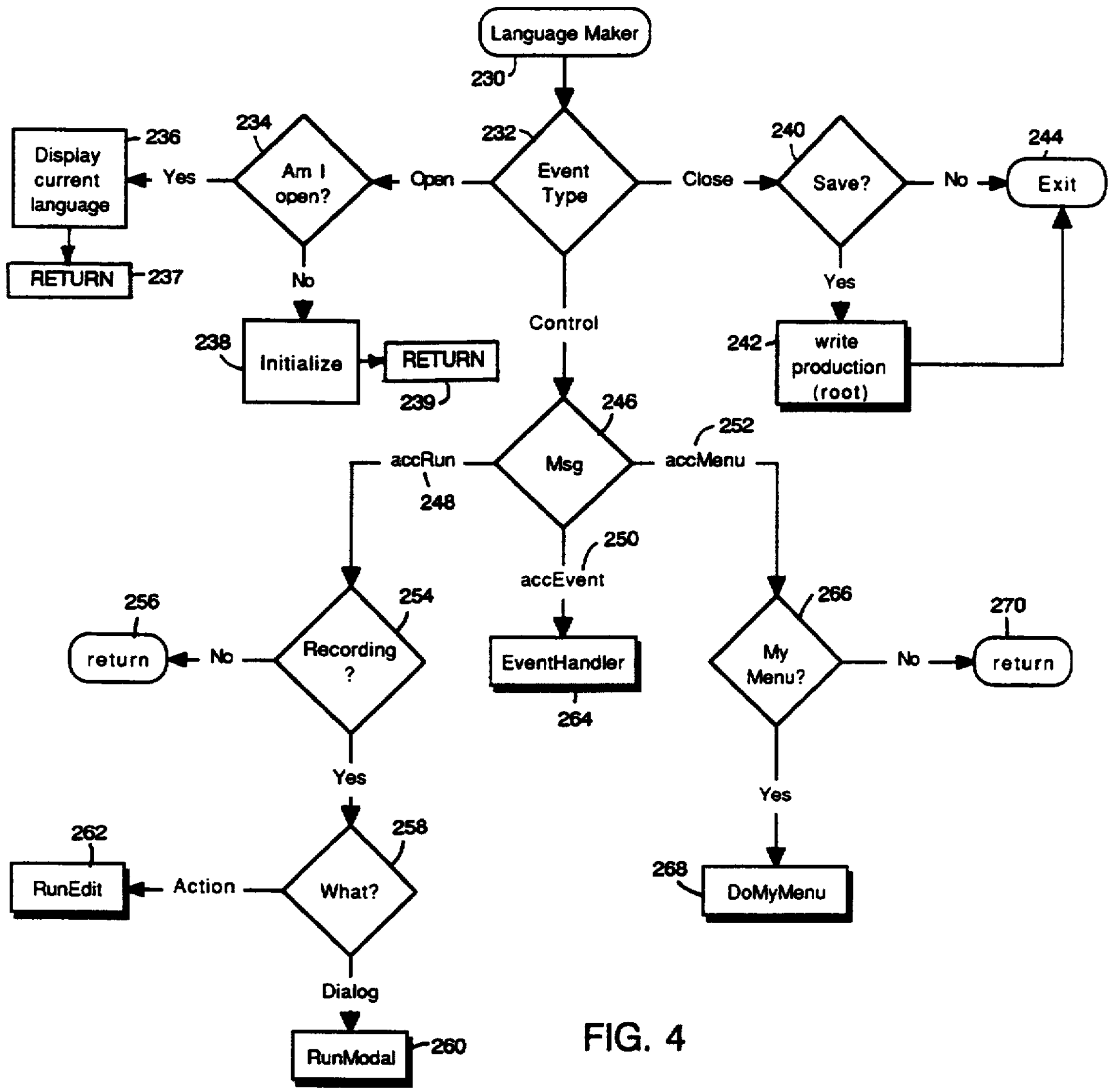
FIG. 4 is a flow diagram of the Language Maker main event loop.

Referring to FIG. 4, the Language Maker main event loop 230 is similar in structure to main event loops used by other desk accessories in the Macintosh operating system. If a desk accessory is selected from the "Apple" menu, an "open" event is transmitted to the accessory. In general, if the application in which it resides quits or if the user quits it using its menus, a "close" event is transmitted to the accessory. Otherwise, the accessory is transmitted control events. The message parameter of a control event indicates the kind of event. As seen in FIG. 4, the Language Maker main event loop 230 begins with an analysis 232 of the event type.

If the event is an open event Language Maker tests 234 whether it is already opened. If Language Maker is already opened 236, the current language (i.e. the list of utterance names from the current word list) is displayed and Language Maker returns 237 to the operating system. If Language Maker is not open 238, it is initialized and then returns 239 to the operating system.

If the event is a close event, Language Maker prompts the user 240 to save the current language as a language file. If the user commands Language Maker to save the current language, the current language is converted by the Write Production module 242 to a language file, and then Language Maker exits 244. If the current language is not saved, Language Maker exits directly.

If the event is a control event 246, then the way in which Language Maker responds to the event depends upon the mode that Language Maker is in, because Language Maker has a utility for recording events (i.e. the mouse movements and clicks or text entry that the user wishes to assign to an utterance), and must record events which do not involve the Language Maker window. However, when not recording, Language Maker should only respond to events in its window. Therefore, Language Maker may respond to events in one mode but not in another.

A control event 246 is forwarded to one of three branches 248, 250, 252. All menu events are forwarded to the accMenu branch 252. (Only menu events occurring in desk accessory menus will be forwarded to Language Maker.) All window events for the Language Maker window are forwarded to the accEvent branch 250. All other events received by Language Maker, which correspond to events for desktop accessories or applications other than Language Maker, initiate activity in the accRun branch 248, to enable recording of actions.

In the accRun branch 248, events are recorded and associated with the selected utterance name. Before any events are recorded Language Maker checks 254 if Language Maker is recording; if not, Language Maker returns 256. If recording is on 258, then Language Maker checks the current recording mode.

While recording, Language Maker seizes control of the operating system by setting control flags that cause the operating system to call Language Maker every tick of the Macintosh (i.e. every 1/60 second).

If the user has set Language Maker in dialog mode, Language Maker can record dialog events (i.e. events which involve modal dialog, where the user cannot do anything except respond to the actions in modal dialog boxes). To accomplish this, the user must be able to produce actions (i.e. mouse clicks, menu selections) in the current application so that the dialog boxes are prompted to the screen. Then the user can initialize recording and respond to the dialog boxes. When modal dialog boxes should be produced, events received by Language Maker are also forwarded to the operating system. otherwise, events are not forwarded to the operating system. Language Maker's modal dialog recording is performed by the Run Modal module 260.

If modal dialog events are not being recorded, the user records with Language Maker in "action" mode, and Language Maker proceeds to the Run Edit module 262.

In the accEvent branch, all events are forwarded to the Event Handler module 264.

In the accMenu branch, the menu indicated by the desk accessory menu event is checked 266. If the event occurred in the Language Maker menu, it is forwarded to the Do My Menu module 268. Other events are ignored 270.

Figure 5:
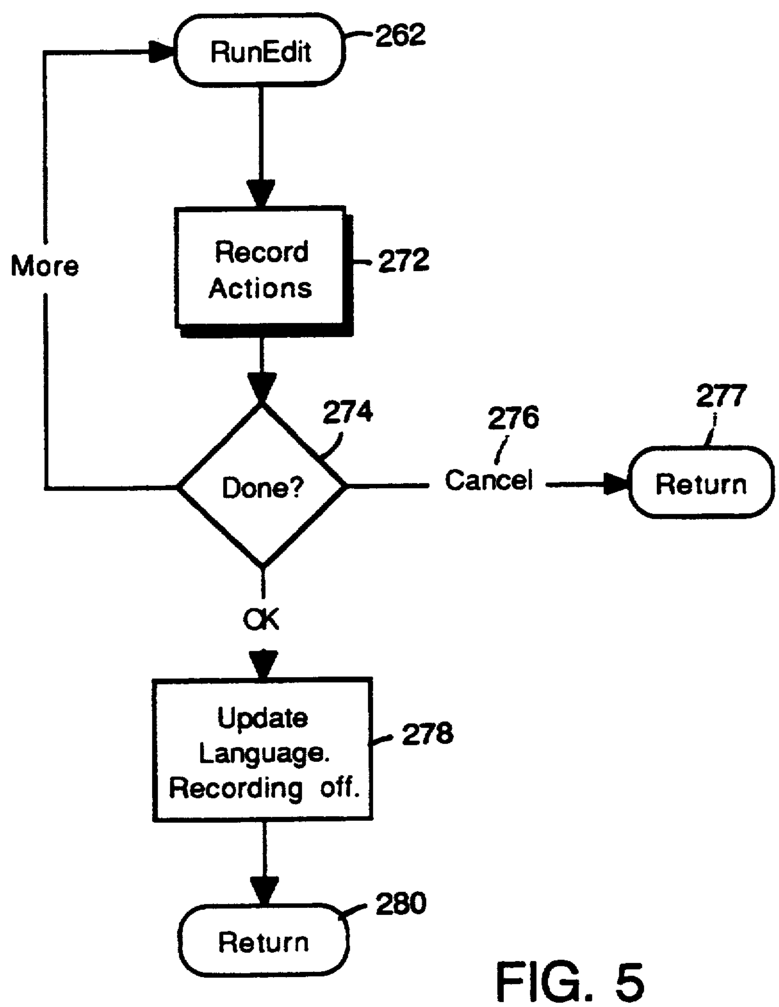
FIG. 5 is a flow diagram of the Run Edit module.

Referring to FIG. 5, the Run Edit module 262 performs a loop 272,274. Each action is recorded by the Record Actions submodule 272. If there are more actions in the event queue then the loop returns to the Record Actions submodule. If a cancel action appears 276 in the event queue then Run Edit returns 277 without updating the current language in memory. Otherwise, if the events are completed successfully, run edit updates the language in memory and turns off recording 278 and returns to the operating system 280.

Figure 6:
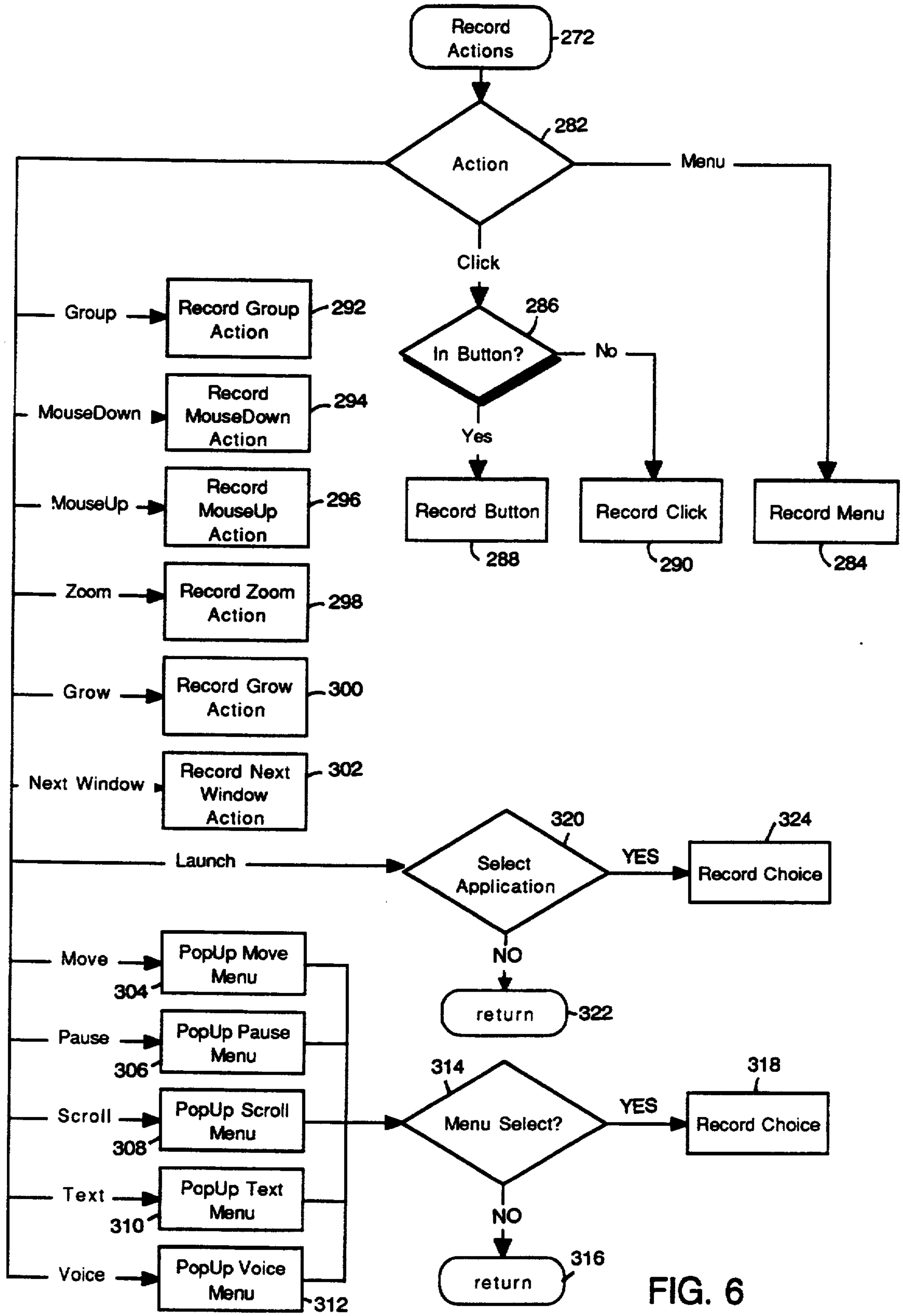
FIG. 6 is a flow diagram of the Record Actions submodule.

Referring to FIG. 6, in the Record Actions submodule 272, actions performed by the user in record mode are recorded. When the current application makes a request for the next event on the event queue, the event is checked by record actions. Each non-null event (i.e. each action) is processed by Record Actions. First, the type of action is checked 282. If the action selects a menu 284, then the selected menu is recorded. If the action is a mouse click 286, the In Button? routine (see FIG. 8) checks if the click occurred inside of a button (a button is a menu selection area in the front window) or not. If so, the button is recorded 288. If not, the location of the click is recorded 290.

Other actions are recorded by special handlers. These actions include group actions 292, mouse down actions 294, mouse up actions 296, zoom actions 298, grow actions 300, and next window actions 302.

Some actions in menus can create pop-up menus with subchoices. These actions are handled by popping up the appropriate pop-up menu so that the user may select the desired subchoice. Move actions 304, pause actions 306, scroll actions 308, text actions 310 and voice actions 312 pop up respective menus and Record Actions checks 314 for the menu selection made by the user (with a mouse drag). If no menu selection is made, then no action is recorded 316. Otherwise, the choice is recorded 318.

Other actions may launch applications. In this case 320 the selected application is determined. If no application has been selected then no action is recorded 322, otherwise the selected application is recorded 324.

Figure 7:
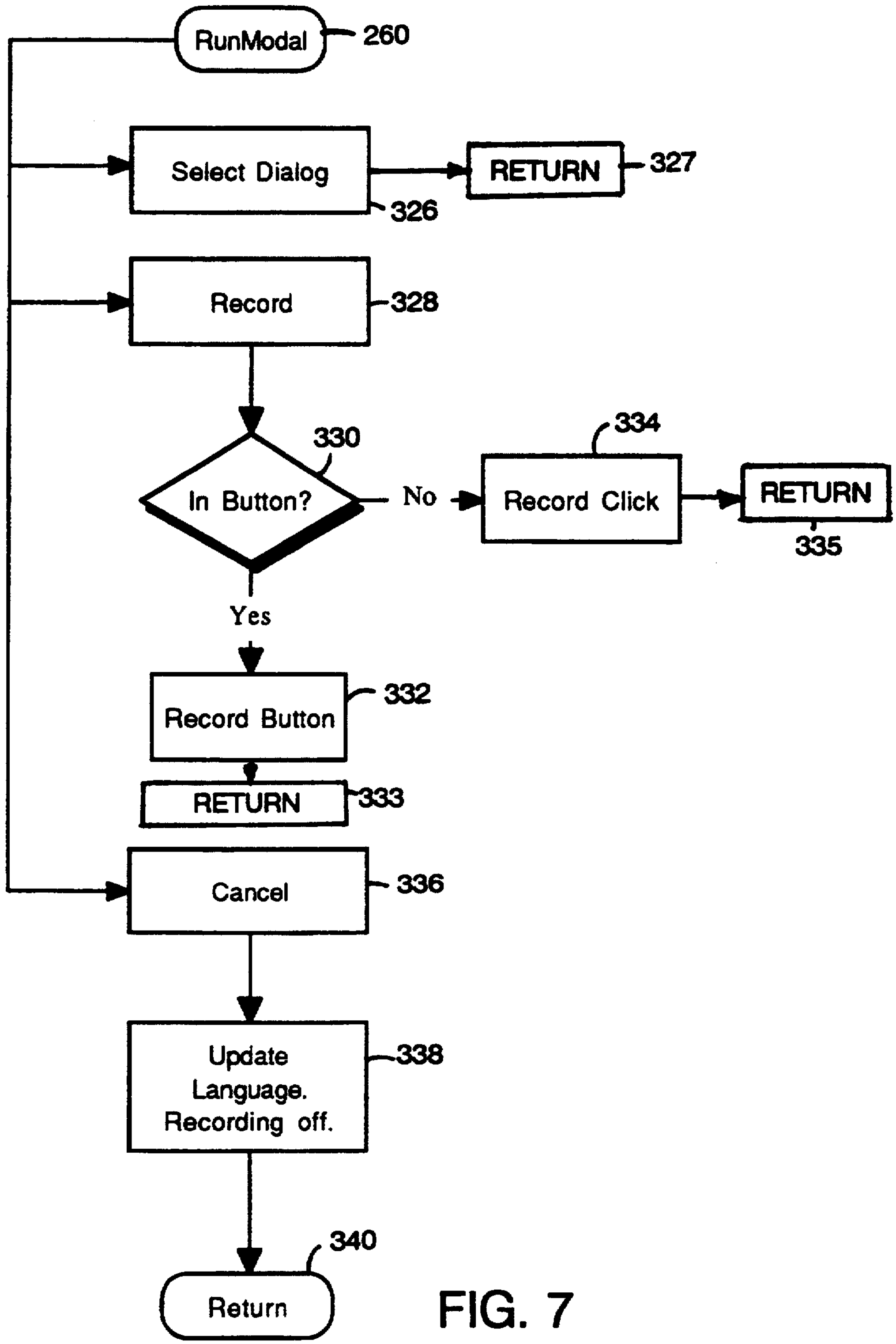
FIG. 7 is a flow diagram of the Run Modal module.

Referring to FIG. 7, the Run Modal procedure 260 allows recording of the modal dialogs of the Macintosh computer. During modal dialogs, the user cannot do anything except respond to the actions in the modal dialog box. In order to record responses to those actions, Run Modal has several phases, each phase corresponding to a step in the recording process.

In the first phase, when the user selects dialog recording, Run Modal prompts the user with a Language Maker dialog box that gives the user the options "record" and "cancel" (see FIG. 25). The user may then interact with the current application until arriving at the dialog click that is to be recorded. During this phase, all calls to Run Modal are routed through Select Dialog 326, which produces the initial Language Maker dialog box, and then returns 327, ignoring further actions.

To enter the second, recording, phase, the user clicks on the "record" button in the Language Maker dialog box, indicating that the following dialog responses are to be recorded. In this phase, calls to Run Modal are routed to Record 328, which uses the In Button? routine 330 to check if a button in current application's dialog box has been selected. If the click occurred in a button, then the button is recorded 332, and Run Modal returns 333. Otherwise, the location of the click is recorded 334 and Run Modal returns 335.

Finally, when all clicks are recorded, the user clicks on the "cancel" button in the Language Maker dialog box, entering the third phase of the recording session. The click in the "cancel" button causes Run Modal to route to Cancel 336, which updates 338 the current language in memory, then returns 340.

Figure 8:
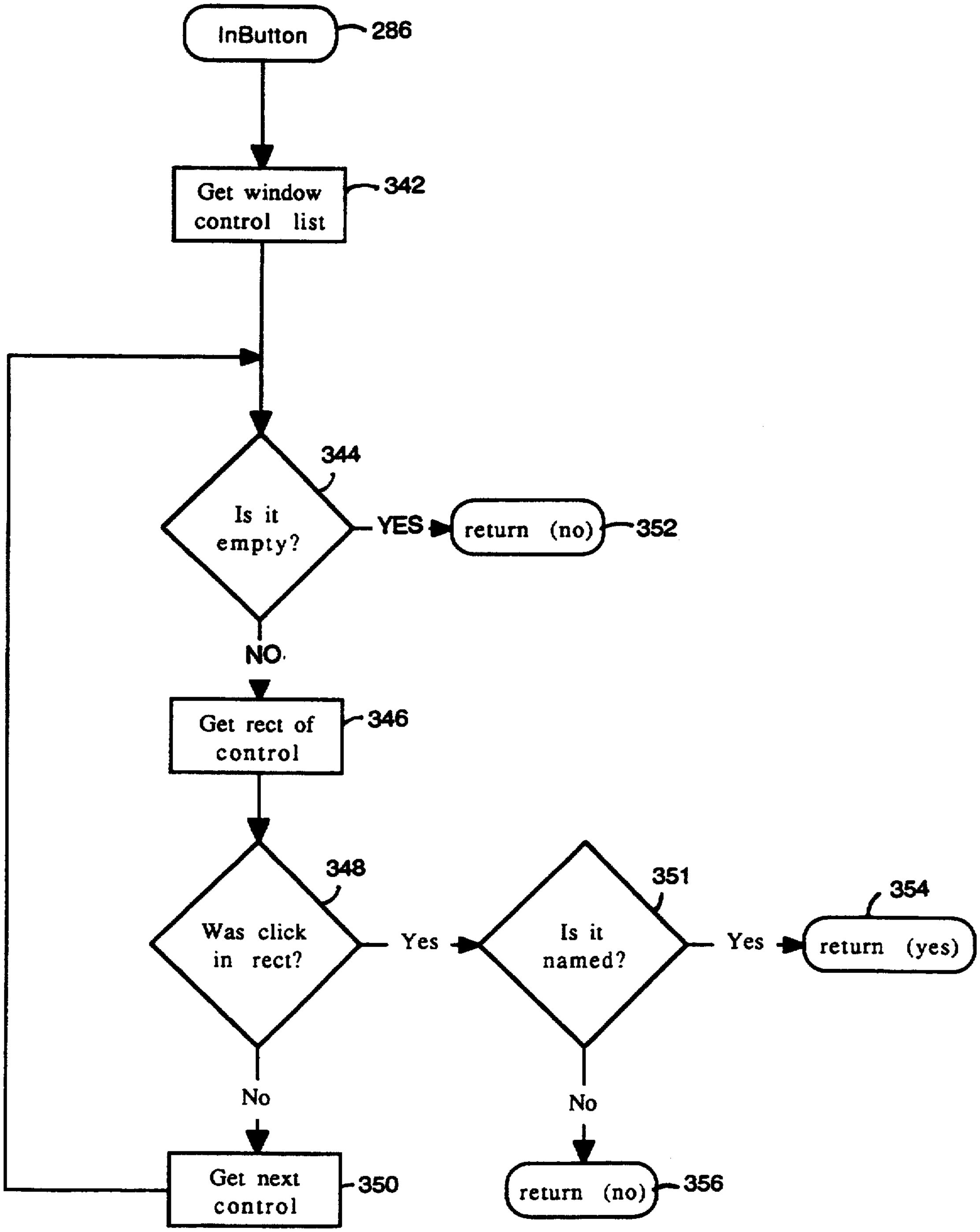
FIG. 8 is a flow diagram of the In Button? routine.

Referring to FIG. 8, the In Button? procedure 286 determines whether a mouse click event occurred on a button. In Button? gets the current window control list 342 (a Macintosh global which contains the locations of all of the button rectangles in the current window, refer to Appendix B) from the operating system and parses the list with a loop 344–350. Each control is fetched 350, and then the rectangle of the control is found 346. Each rectangle is analyzed 348 to determine if the click occurred in the rectangle. If not, the next control is fetched 350, and the loop recurses. If, 344, the list is empty, then the click did not occur on a button, and no is returned 352. However, if the click did occur in a rectangle, then, if, 351, the rectangle is named, the click occurred on a button, and yes is returned 354; if the rectangle is not named 356, the click did not occur on a button, and no is returned 356.

Figure 9:
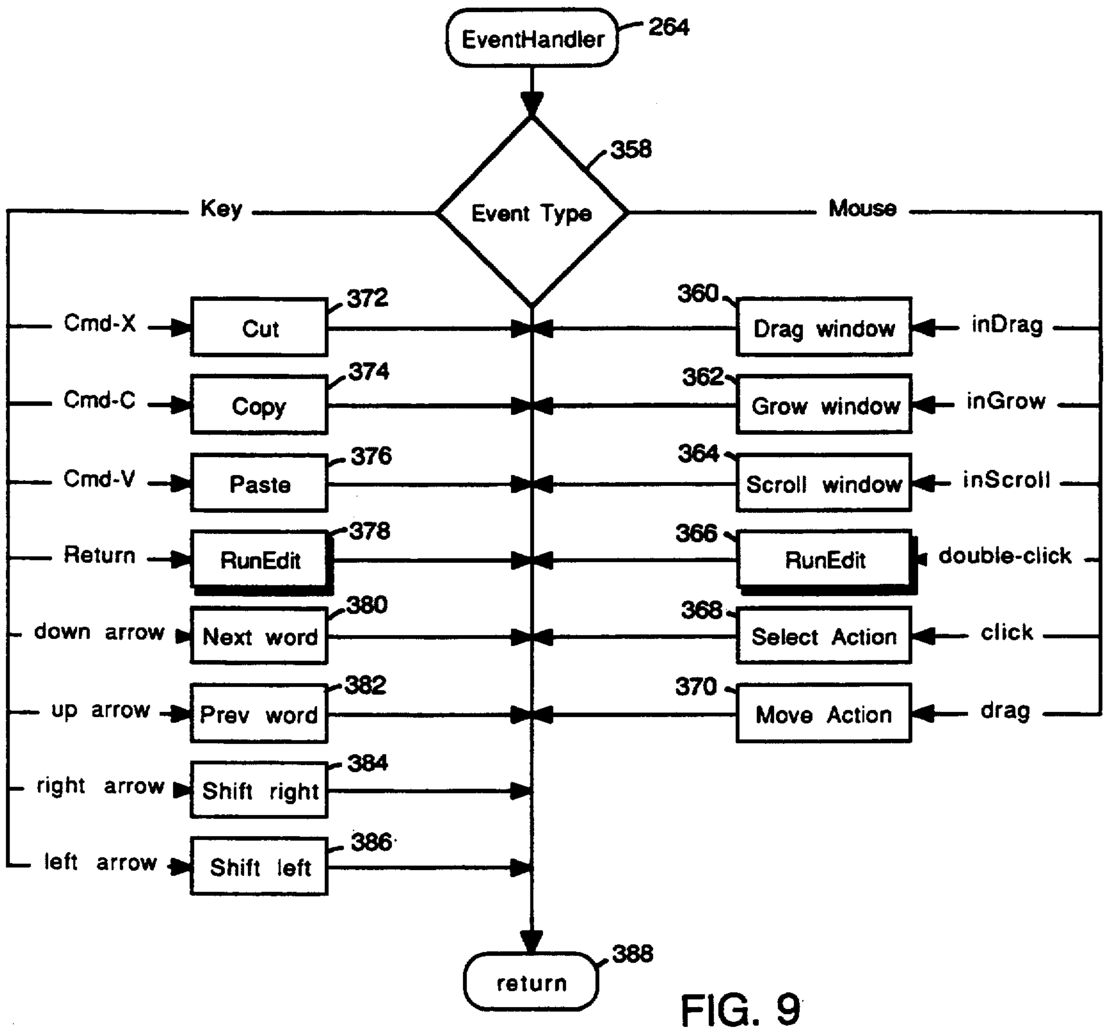
FIG. 9 is a flow diagram of the Event Handler module.

Referring to FIG. 9, the Event Handler module 264 deals with standard Macintosh events in the Language Maker display window. The Language Maker display window lists the utterance names in the current language. As shown in FIG. 9, Event Handler determines 358 whether the event is a mouse or keyboard event and subsequently performs the proper action on the Language Maker window.

Mouse events include: dragging the window 360, growing the window 362, scrolling the window 364, clicking on the window 368 (which selects an utterance name), and dragging on the window 370 (which moves an utterance name from one location on the screen to another, potentially changing the utterance's position in the language hierarchy). Double-clicking 366 on an utterance name in the window selects that utterance name for action recording, and therefore starts the Run Edit module.

Keyboard events include the standard cut 372, copy 374, and paste 376 routines, as well as cursor movements down 380, up 382, right 384, and left 386. Pressing return at the keyboard 378, as with a double click at the mouse, selects the current utterance name for action recording by Run Edit. After the appropriate command handler is called, Event Handler returns 388. The modifications to the language hierarchy performed by the Event Handler module are reflected in hierarchical structure of the language file produced by the Write Production module during close and save operations.

Figure 10:
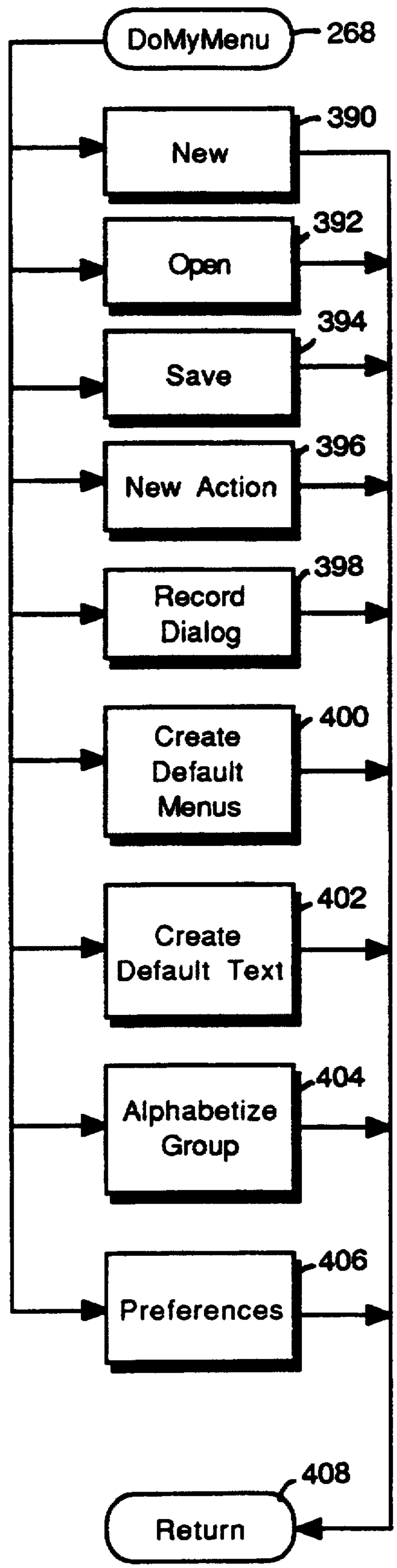
FIG. 10 is a flow diagram of the Do My Menu module.

Referring to FIG. 10, the Do My Menu module 268 controls all of the menu choices supported by Language Maker. After summoning the appropriate submodule (discussed in detail in FIGS. 11A through 11I), Do My Menu returns 408.

Figure 11A:
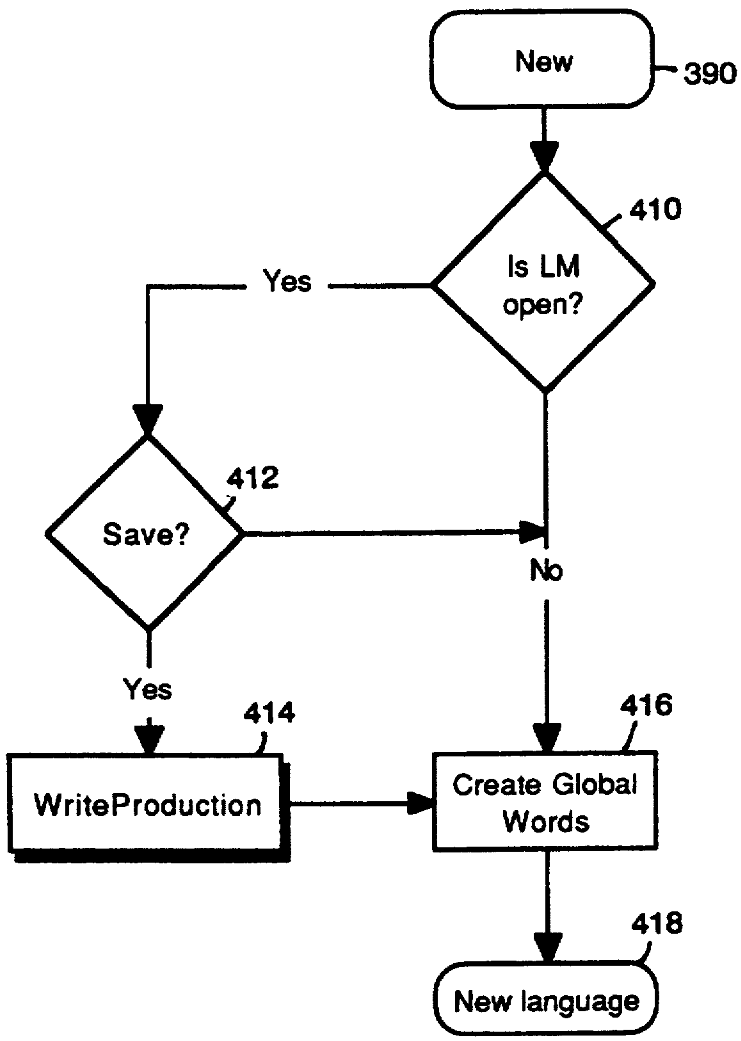
FIGS. 11A through 11I are flow diagrams of the Language Maker menu submodules.

Referring to FIG. 11A, the New submodule 390 creates a new language. The New submodule first checks 410 if Language Maker is open. If so, it prompts the user 412 to save the current language as a language file. If the user saves the current language, New calls Write Production module 414 to save the language. New then calls Create Global Words 416 and forms a new language 418. Create Global Words 416 will automatically enter a few global (i.e. resident in all languages) utterance names and command strings into the new language. These utterance names and command strings allow the user to make Voice Control commands, and correspond to utterances such as "show me the active words" and "bring up the voice options" (the utterance macros for the corresponding voice file are trained by the user, or copied from an existing voice file, after the new language is saved).

Figure 11B:
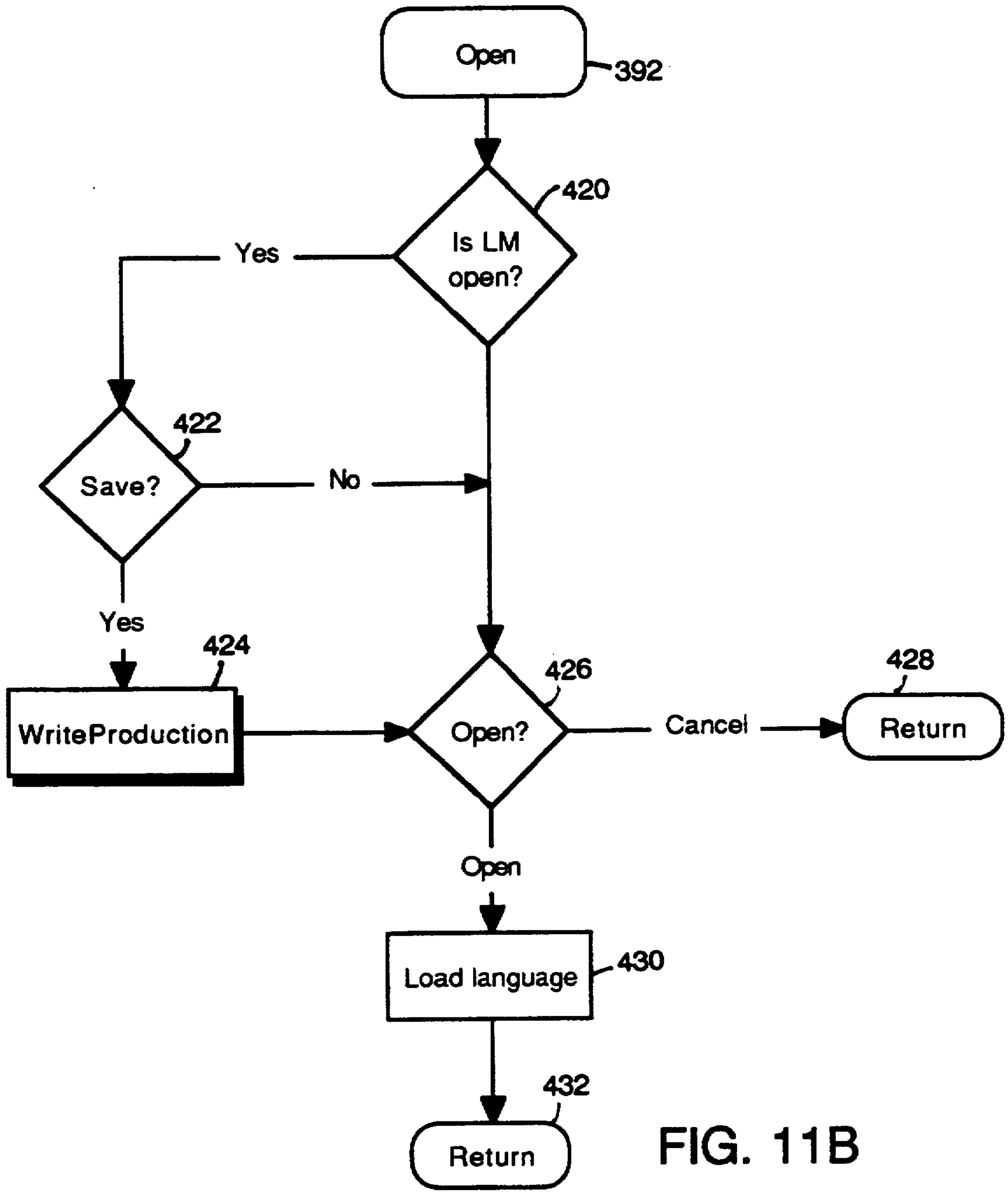

Referring to FIG. 11B, the Open submodule 392 opens an existing language for modification. The Open submodule 392 checks 420 if Language Maker is open. If so, it prompts the user 422 to save the current language, calling Write Production 424 if yes. Open then prompts the user to open the selected language 426. If the user cancels, Open returns 428. Otherwise, the language is loaded 430 and Open returns 432.

Figure 11C:
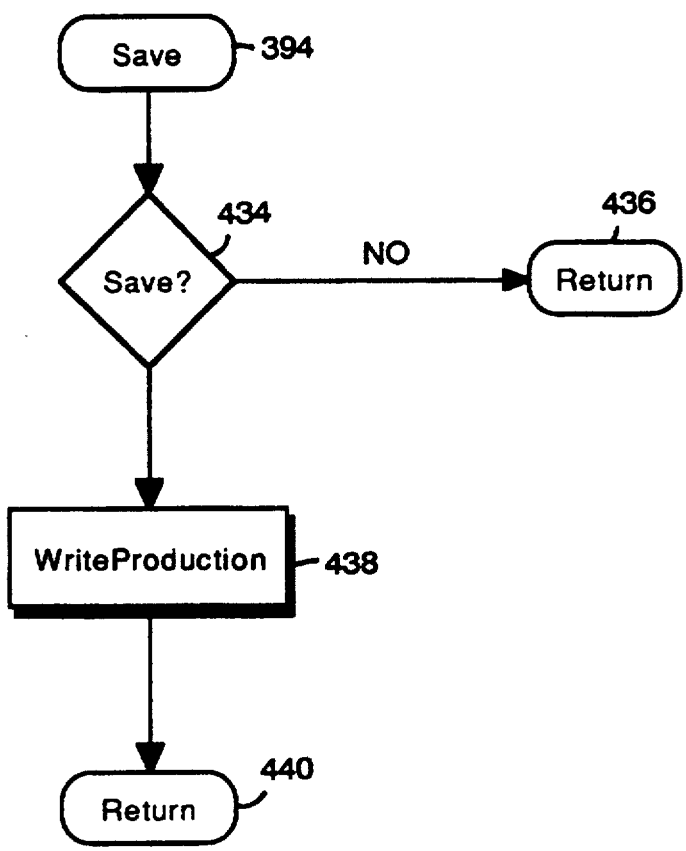

Referring to FIG. 11C, the Save submodule 394 saves the current language in memory as a language file. Save prompts the user to save the current language 434. If the user cancels, Save returns 436, otherwise, Save calls Write Production 438 to convert the language into a state machine control file suitable for use by VOCAL (FIG. 2). Finally, Save returns 440.

Figure 11D:
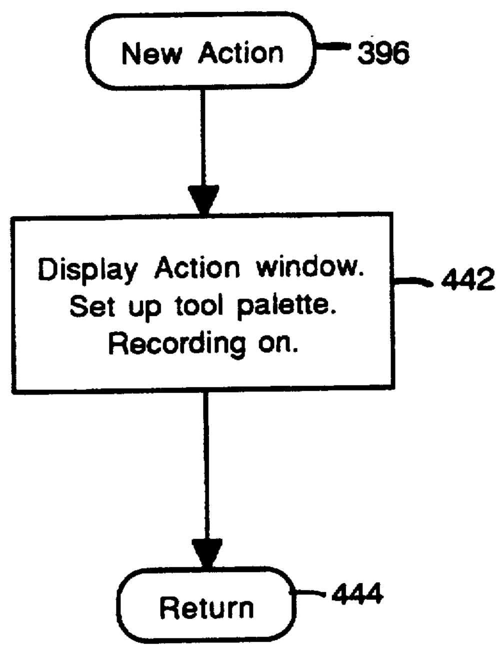

Referring to FIG. 11D, the New Action submodule 396 initializes the event recorders to begin recording a new sequence of actions. New Action initializes the event recorder by displaying an action window to the user 442, setting up a tool palette for the user to use, and initializing recording of actions. Then New Action returns 444. After New Action is started, actions are not delivered to the operating system directly; rather they are filtered through Language Maker.

Figure 11E:
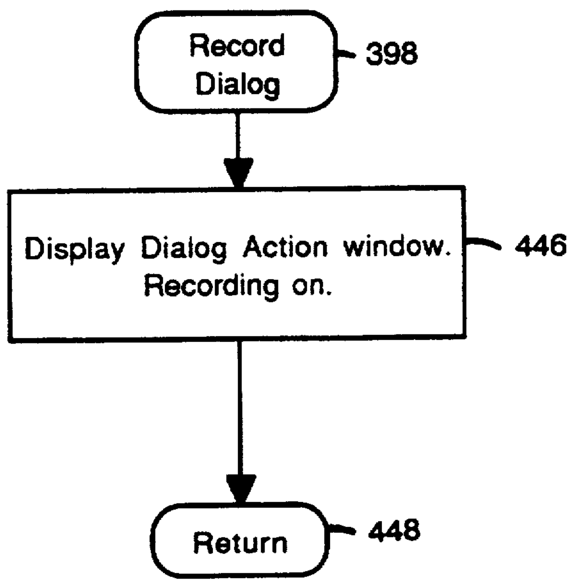

Referring to FIG. 11E, the Record Dialog submodule 398 records responses to dialog boxes through the use of the Run Modal module. Record Dialog 398 gives the user a way to record actions in modal dialog; otherwise the user would be prevented from performing the actions which bring up the dialog boxes. Record Dialog displays 446 the dialog action window (see FIG. 25) and turns recording on. Then Record Dialog returns 448.

Figure 11F:
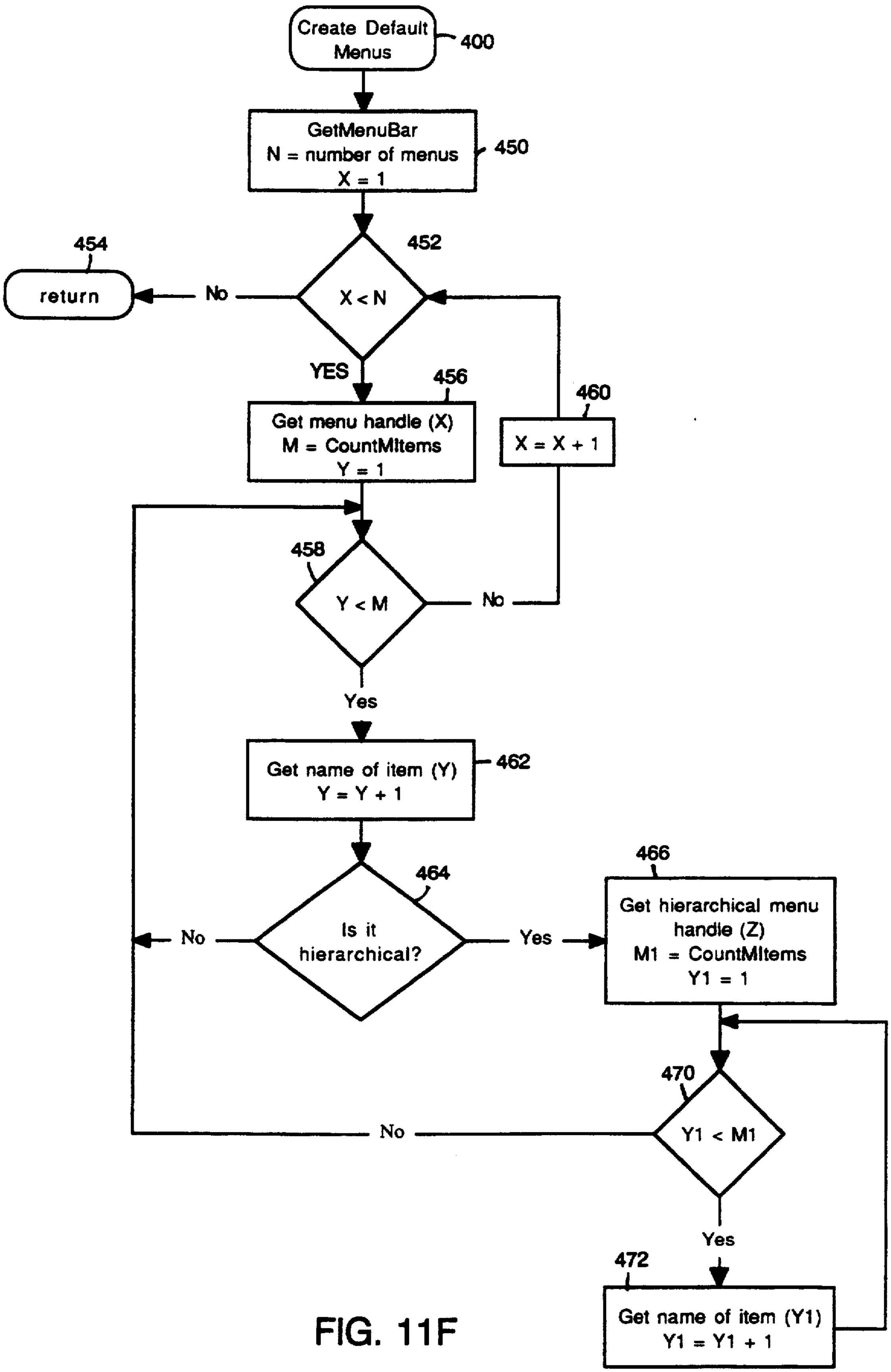

Referring to FIG. 11F, the Create Default Menus submodule 400 extracts default utterance names (and generates associated command strings) from the executable code for an application. Create Default Menus 270 is ordinarily the first choice selected by a user when creating a language for a particular application. This submodule looks at the executable code of an application and creates an utterance name for each menu command in the application, associating the utterance name with a command string that will select that menu command. When called, Create Default Menus gets 450 the menu bar from the executable code of the application, and initializes the current menu to be the first menu (X=1). Next, each menu is processed recursively. When all menus are processed, Create Default Menus returns 454. A first loop 452,456, 458, 460 locates the current ($X^{th}$) menu handle 456, initializes menu parsing, checks if the current menu is fully parsed 458, and reiterates by updating the current menu to the next menu. A second loop 458, 462, 464 finds each menu name 462, and checks 464 if the name is hierarchical (i.e. if the name points to further menus). If the names are not hierarchical, the loop recurses. Otherwise, the hierarchical menu is fetched 466, and a third loop 470, 472 starts. In the third loop, each item name in the hierarchical menu is fetched 472, and the loop checks if all hierarchical item names have been fetched 470.

Figure 11G:
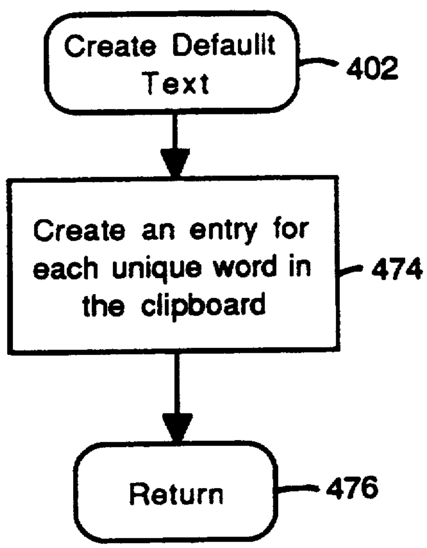

Referring to FIG. 11G, the Create Default Text submodule 402 allows the user to convert a text file on the clipboard into a list of utterance names. Create default text 402 creates an utterance name for each unique word in the clipboard 474, and then returns 476. The utterance names are associated with the keyboard entries which will type out the name. For example, a business letter can be copied from the clipboard into default text. Utterances would then be associated with each of the common business terms in the letter. After ten or twelve business letters have been converted the majority of the business letter words would be stored as a set of utterances.

Figure 11H:
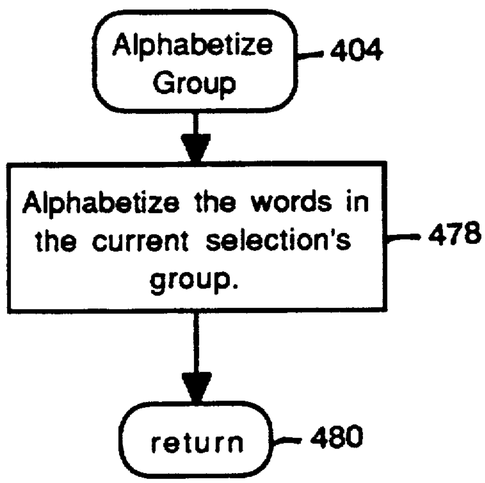

Referring to FIG. 11H, the Alphabetize Group submodule 404 allows the user to alphabetize the utterance names in a language. The selected group of names (created by dragging the mouse over utterance names in the Language Maker window) is alphabetized 478, and then Alphabetize Group returns 480.

Figure 11I:
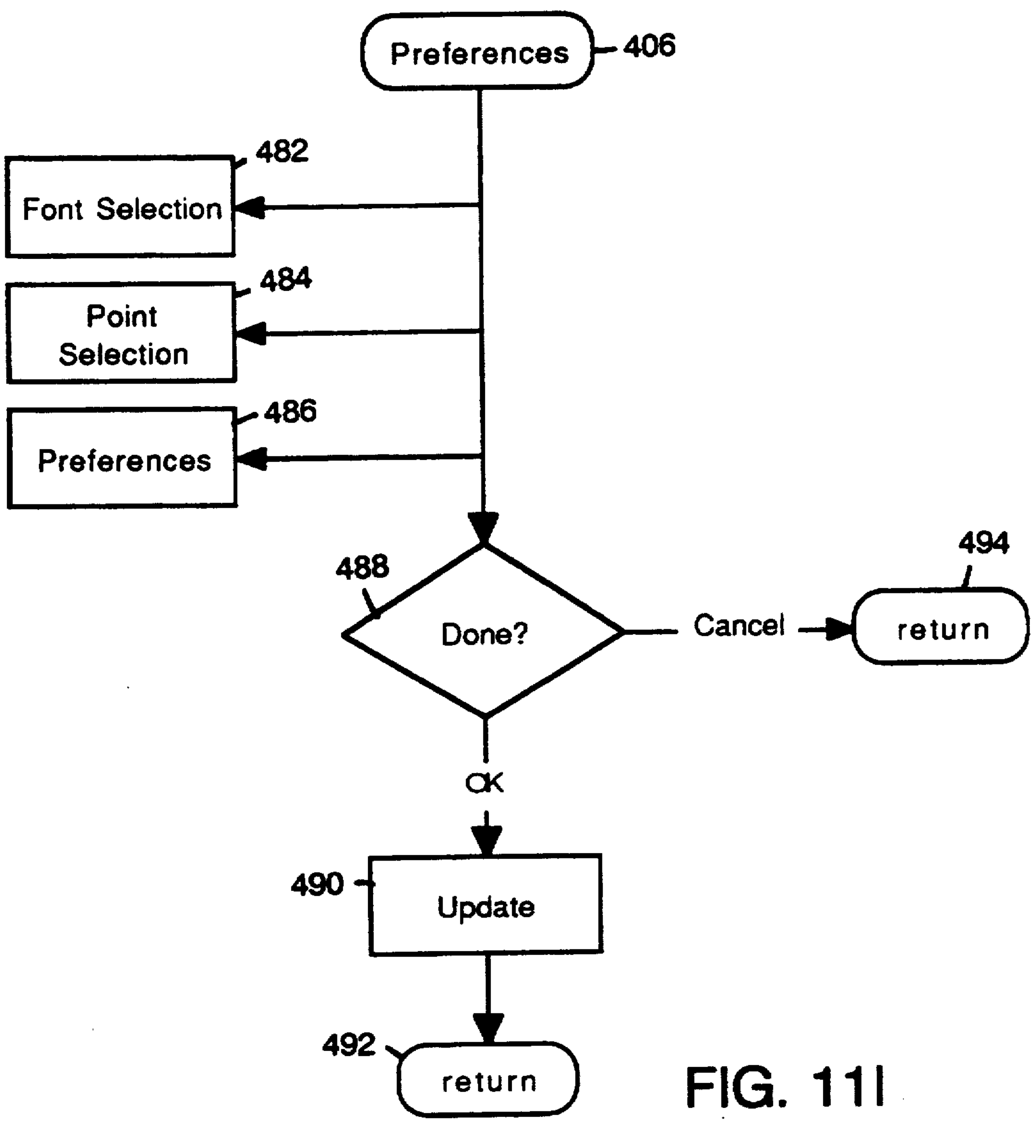

Referring to FIG. 11I, the Preferences submodule 406 allows the user to select standard graphic user interface preferences such as font style 482 and font size 484. The Preferences submenu 486 allows the user to state the metric by which mouse locations of recorded actions are stored. The coordinates for mouse actions can be relative to the global window coordinates or relative to the application window coordinates. In the case where application menu selections are performed by mouse clicks, the mouse clicks must always be in relative coordinates so that the window may be moved on the screen without affecting the function of the mouse click. The Preferences submenu 486 also determines whether, when a mouse action is recorded, the mouse is left at the location of a click or returned to its original location after a click. When the preference selections are done 488, the user is prompted whether he wants to update the current preference settings for Language Maker. If so, the file is updated 490 and Preferences returns 492. If not, Preferences returns directly to the operating system 494 without saving.

Figure 12:
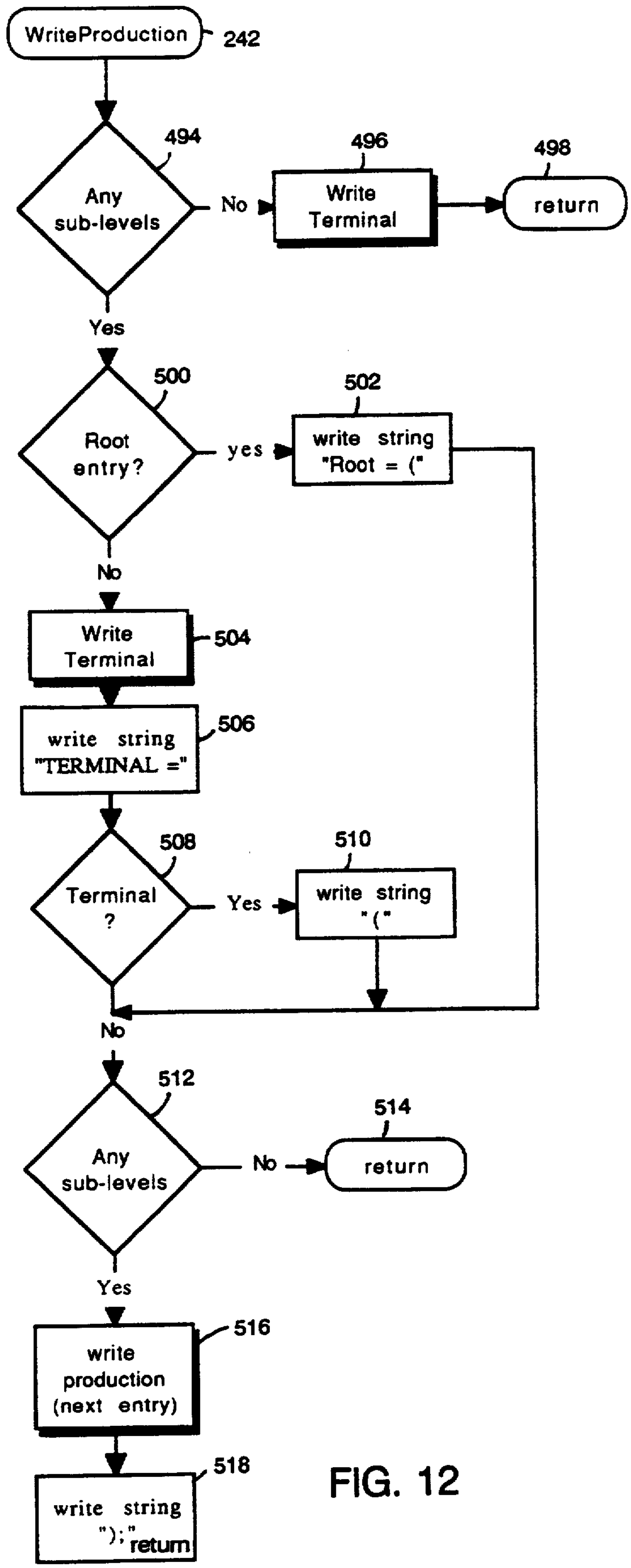
FIG. 12 is a flow diagram of the Write Production module.

Referring to FIG. 12, the Write Production module 242 is called when a file is saved. Write Production saves the current language and converts it from an outline processor format such as that used in the Language Maker application to a hierarchical text format suitable for use with the state machine based Recognition Software. Language files are associated with applications and new language files can be created or edited for each additional application to incorporate the various commands of the application into voice recognition.

The embodiment of the Write Production module depends upon the Recognition Software in use. In general, the Write Production module is written to convert the current language to suitable format for the Recognition Software in use. The particular embodiment of Write Production shown in FIG. 12 applies to the syntax of the VOCAL compiler for the Dragon Systems Recognition Software.

Write Production first tests the language 494 to determine if there are any sub-levels. If not, the Write Terminal submodule 496 saves the top level language, and Write Production returns 498. If sub-levels exist in the language, then each sub-level is processed by a tail-recursive loop. If a root entry exists in the language 500 (i.e. if only one utterance name exists at the current level) then Write Production writes 502 the string "Root=(" to the file, and checks for sub-levels 512. Otherwise, if no root exists, Write Terminal is called 504 to save the names in the current level of the language. Next, the string "TERMINAL=" is written 506, and if, 508, the language level is terminal, the string "(" is written. Next, Write Production checks 512 for sublevels in the language. If no sub-levels exist, Write Production returns 514. Otherwise, the sub-levels are processed by another call 516 to Write Production on the sub-level of the language. After the sub-level is processed, Write Production writes the string ")" and returns 518.

Figure 13:
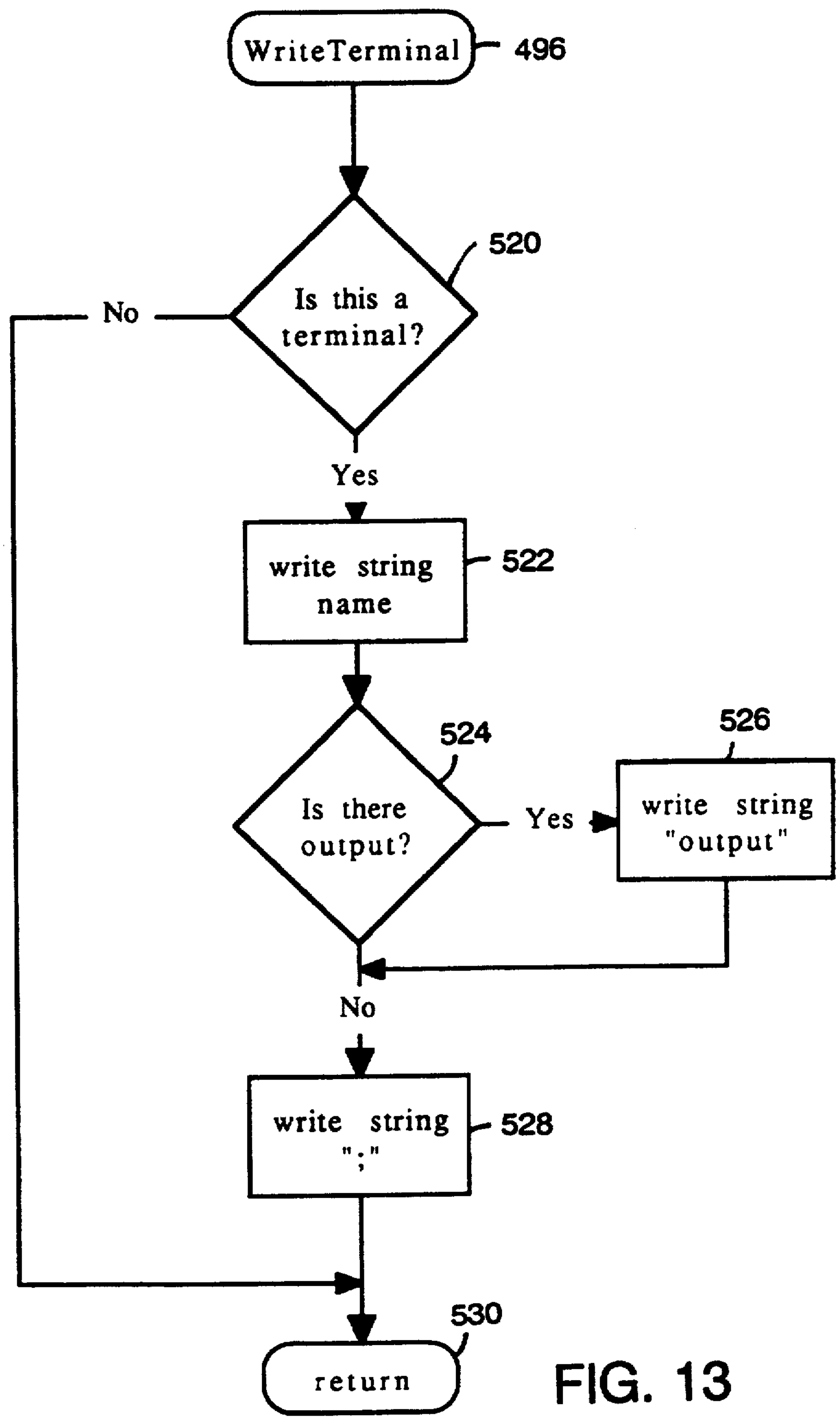
FIG. 13 is a flow diagram of the Write Terminal submodule.

Referring to FIG. 13, the Write Terminal submodule 496 writes each utterance name and the associated command string to the language file. First, Write Terminal checks 520 if it is at a terminal. If not, it returns 530. Otherwise, Write Terminal writes 522 the string corresponding to the utterance name to the language file. Next, if, 524, there is an associated command string, Write Terminal writes the command string (i.e. "output") to the language file. Finally, Write Terminal writes 528 the string ";" to the language file and returns 530.

VOICE CONTROL

The Voice Control software serves as a gate between the operating system and the applications running on the operating system. This is accomplished by setting the Macintosh operating system's get_next_event procedure equal to a filter procedure created by Voice Control. The get_next_event procedure runs when each next_event request is generated by the operating system or by applications. Ordinarily the get_next_event procedure is null, and next_event requests go directly to the operating system. The filter procedure passes control to Voice Control on every request. This allows Voice Control to perform voice actions by intercepting mouse and keyboard events, and create new events corresponding to spoken commands.

Figure 14:
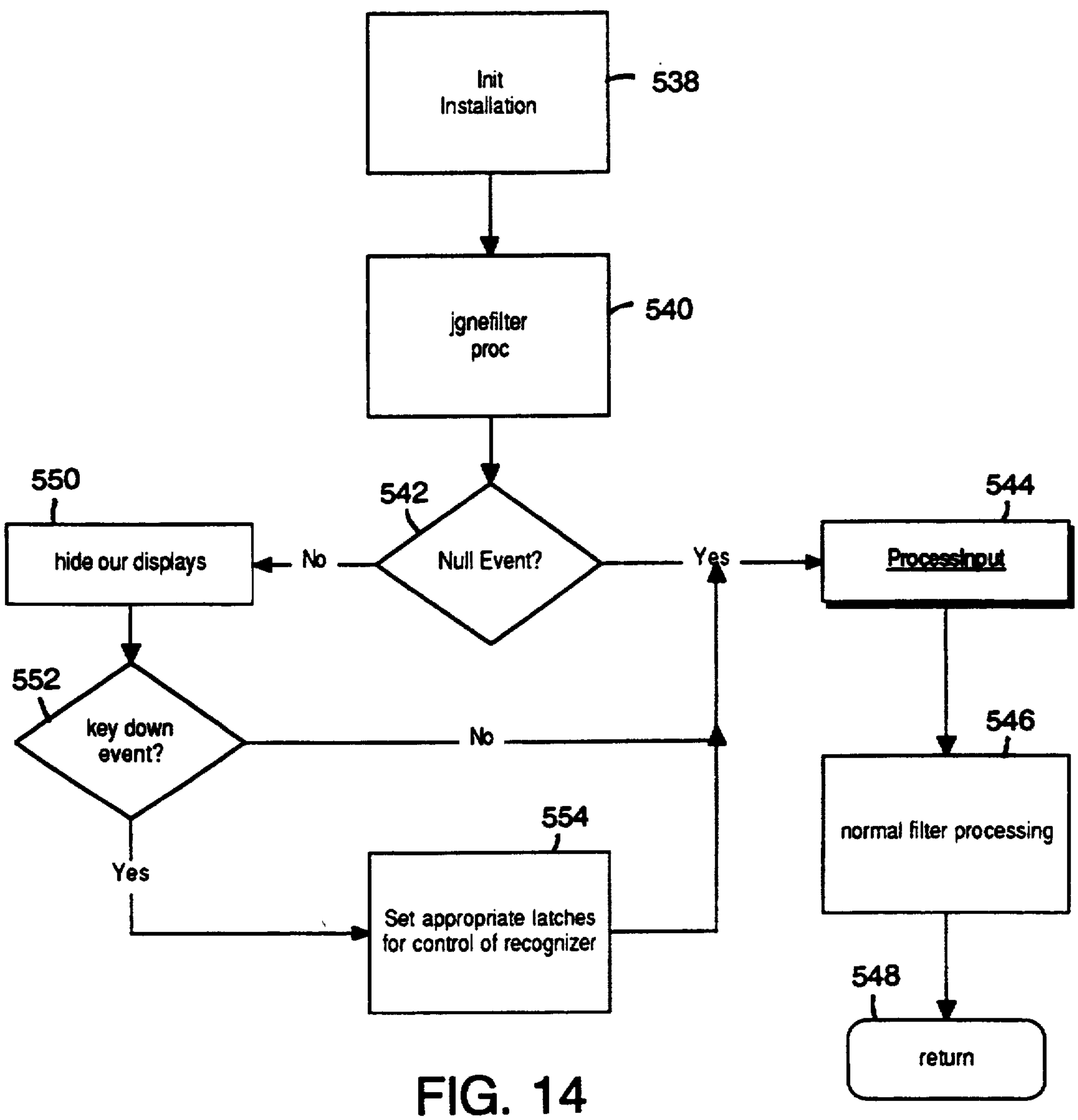
FIG. 14 is a flow diagram of the Voice Control main driver loop.

The Voice Control filter procedure is shown in FIG. 14.

After installation 538, the get_next_event filter procedure 540 is called before an event is generated by the operating system. The event is first checked 542 to see if it is a null event. If so, the Process Input module 544 is called directly. The Process Input routine 544 checks for new speech input and processes any that has been received. After Process Input, the Voice Control driver proceeds through normal filter processing 546 (i.e., any filter processing caused by other applications) and returns 548. If the next event is not a null event, then displays are hidden 550. This allows Voice Control to hide any Voice Control displays (such as current language lists) which could have been generated by a previous non-null action. Therefore, if any prompt windows have been produced by Voice Control, when a non-null event occurs, the prompt windows are hidden. Next, key down events are checked 552. Because the recognizer is controlled (i.e. turned on and off) by certain special key down events, if the event is a key down event then Voice Control must do further processing. Otherwise, the Voice Control drive procedure moves directly to Process Input 544. If a key down event has occurred 554, where appropriate, software latches which control the recognizer are set. This allows activation of the Recognizer Software, the selection of Recognizer options, or the display of languages. Thereafter, the Voice Control driver moves to Process Input 544.

Figure 15:
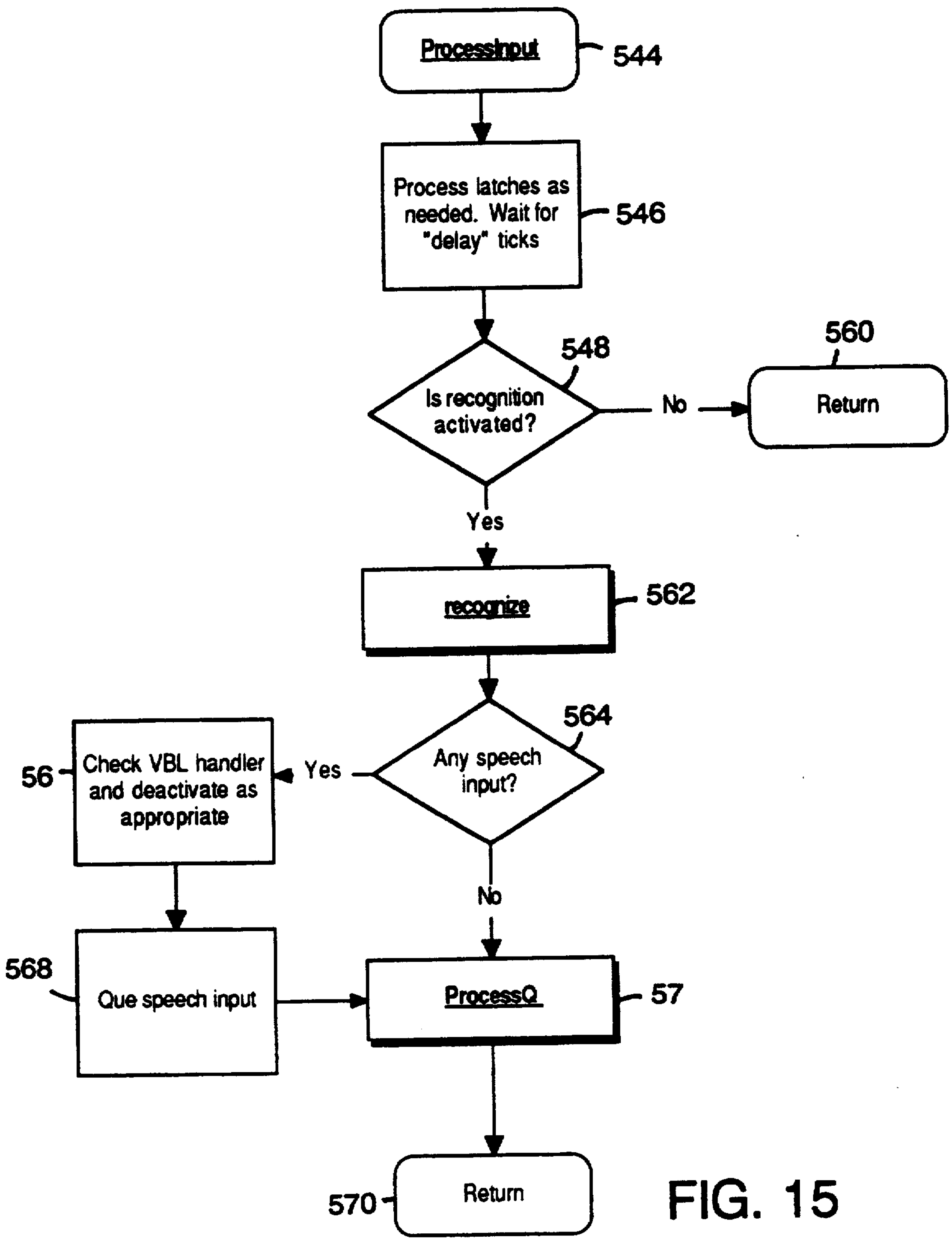
FIG. 15 is a flow diagram of the Process Input module.

Referring to FIG. 15, the Process Input routine is the heart of the Voice Control driver. It manages all voice input for the Voice Navigator. The Process Input module is called each time an event is processed by the operating system. First 546, any latches which need to be set are processed, and the Macintosh waits for a number of delay ticks, if necessary. Delay ticks are included, for example, where a menu drag is being performed by Voice Control, to allow the menu to be drawn on the screen before starting the drag. Also, some applications require delay between mouse or keyboard events. Next, if recognition is activated 548 the process input routine proceeds to do recognition 562. If recognition is deactivated, Process Input returns 560.

The recognition routine 562 prompts the recognition drivers to check for an utterance (i.e., sound that could be speech input). If there is recognized speech input 564, Process Input checks the vertical blanking interrupt VBL handler 566, and deactivates it where appropriate.

The vertical blanking interrupt cycle is a very low level cycle in the operating system. Every time the screen is refreshed, as the raster is moving from the bottom right to the top left of the screen, the vertical blanking interrupt time occurs. During this blanking time, very short and very high priority routines can be executed. The cycle is used by the Process Input routine to move the mouse continuously by very slowly incrementing of the mouse coordinates where appropriate. To accomplish this, mouse move events are installed onto the VBL queue. Therefore, where appropriate, the VBL handler must be deactivated to move the mouse.

Other speech input is placed 568 on a speech queue, which stores speech related events for the processor until they can be handled by the ProcessQ routine. However, regardless of whether speech is recognized, ProcessQ 570 is always called by Process Input. Therefore, the speech events queued to ProcessQ are eventually executed, but not necessarily in the same Process Input cycle. After calling ProcessQ, Process Input returns 571.

Figure 16:
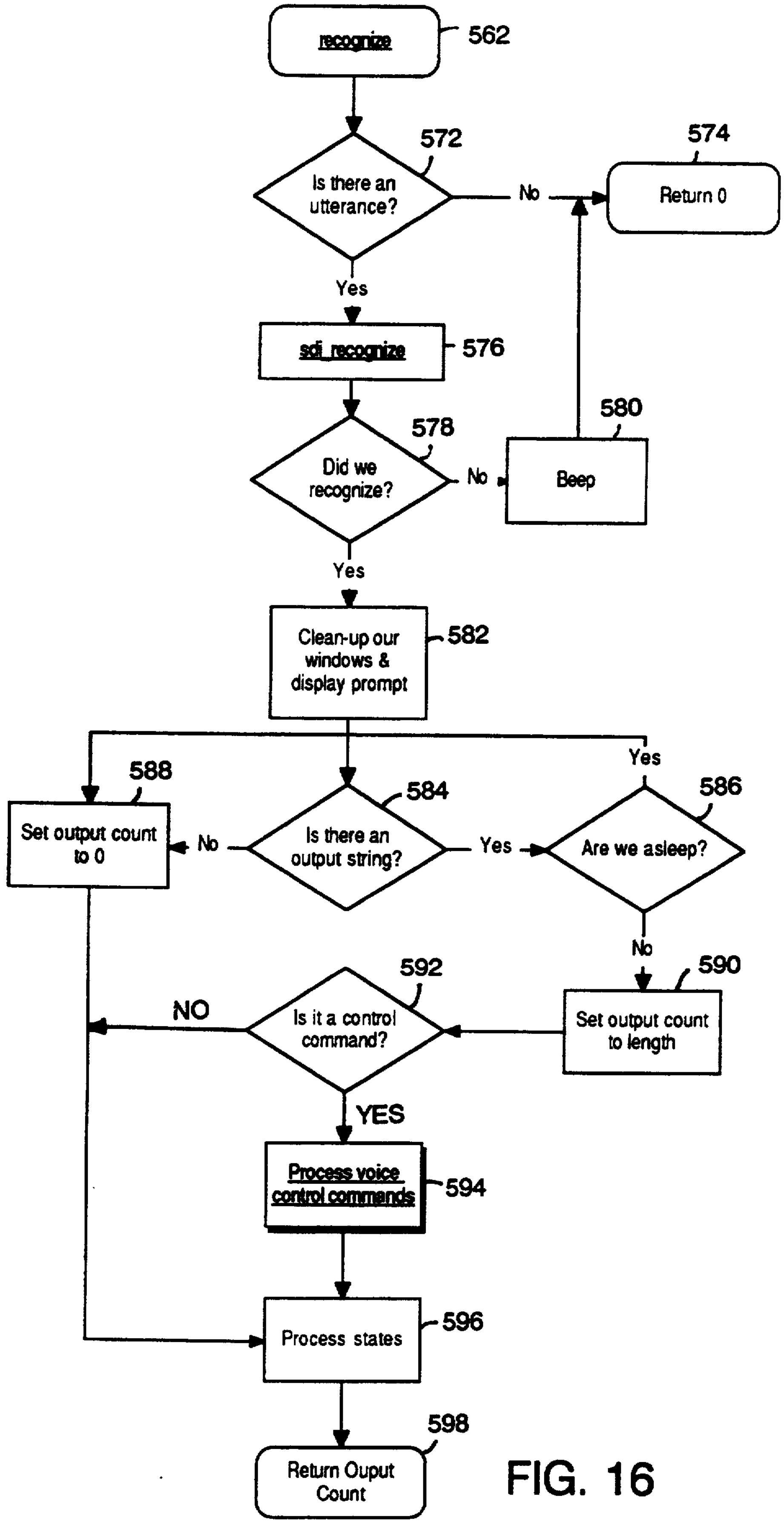
FIG. 16 is a flow diagram of the Recognize submodule.

Referring to FIG. 16, the Recognize submodule 562 checks for encoded utterances queued by the Voice Navigator box, and then calls the recognition drivers' to attempt to recognize any utterances. Recognize returns the number of commands in (i.e. the length of) the command string returned from the recognizer. If, 572, no utterance is returned from the recognizer, then Recognize returns a length of zero (574), indicating no recognition has occurred. If an utterance is available, then Recognize calls sdi_recognize 576, instructing the Recognizer Software to attempt recognition on the utterance. If, 578, recognition is successful, then the name of the utterance is displayed 582 to the user. At the same time, any close call windows (i.e. windows associated with close call choices, prompted by Voice Control in response to the Recognizer Software) are cleared from the display. If recognition is unsuccessful, the Macintosh beeps 580 and zero length is returned 574.

If recognition is successful, Recognize searches 584 for an output string associated with the utterance. If there is an output string, recognize checks if it is asleep 586. If it is not asleep 590, the output count is set to the length of the output string and, if the command is a control command 592 (such as "go to sleep" or "wake up"), it is handled by the Process Voice Commands routine 594.

If there is no output string for the recognized utterance, or if the recognizer is asleep, then the output of Recognize is zero (588). After the output count is determined 596, the state of the recognizer is processed 596. At this time, if the Voice Control state flags have been modified by any of the Recognize subroutines, the appropriate actions are initialized. Finally, Recognize returns 598.

Figure 17:
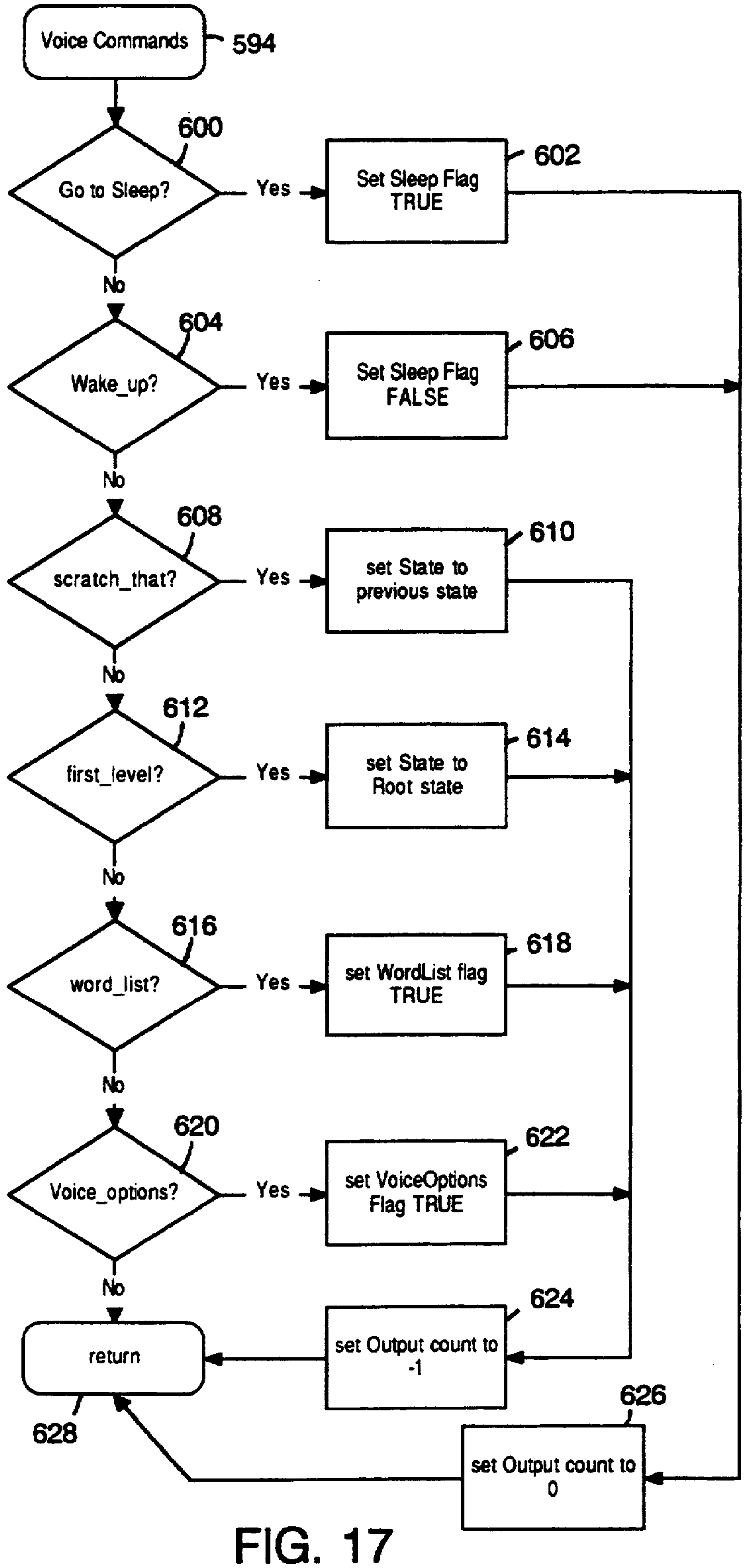
FIG. 17 is a flow diagram of the Process Voice Control Commands routine.

Referring to FIG. 17, the Process Voice Commands module deals with commands that control the recognizer. The module may perform actions, or may flag actions to be performed by the Process States block 596 (FIG. 16). If the recognizer is put to sleep 600 or awakened 604, the appropriate flags are set 602, 606, and zero is returned 626, 628 for the length of the command string, indicating to Process States to take no further actions. Otherwise, if the command is scratch_that 608 (ignore last utterance), first_level 612 (go to top of language hierarchy, i.e. set the Voice Control state to the root state for the language), word_list 616 (show the current language), or voice_options 620, the appropriate flags are set and 610, 614, 618, 622, and a string length of −1 is returned 624, 628, indicating that the recognizer state should be changed by Process States 596 (FIG. 16).

Referring to FIG. 18 the ProcessQ module 570 pulls speech input from the speech queue and processes it. If, 630, the event queue is empty then ProcessQ may proceed, otherwise ProcessQ aborts 632 because the event queue may overflow if speech events are placed on the queue along with other events. If, 634, the speech queue has any events then process queue checks to see if, 636, delay ticks for menu drawing or other related activities have expired. If no events are on the speech queue the ProcessQ aborts 636. If delay ticks have expired, then ProcessQ calls Get Next 642 and returns 644. Otherwise, if delay ticks have not expired, ProcessQ aborts 640.

Referring to FIG. 19, the Get Next submodule 642 gets characters from the speech queue and processes them. If, 646, there are no characters in the speech queue then the procedure simply returns 648. If there are characters in the speech queue then Get Next checks 650 to see if the characters are command characters. If they are, then Get Next calls Check Command 660. If not, then the characters are text, and Get Next sets the meta bits 652 where appropriate.

When the Macintosh posts an event, the meta bits (see Appendix B) are used as flags for conditioning keystrokes such as the condition key, the option key, or the command key. These keys condition the character pressed at the keyboard and create control characters. To create the proper operating system events, therefore, the meta bits must be set where necessary. Once the meta bits are set 652, a key down event is posted 654 to the Macintosh event queue, simulating a keypush at the keyboard. Following this, a key up is posted 656 to the event queue, simulating a key up. If, 658, there is still room in the event queue, then further speech characters are obtained and processed 646. If not, then the Get Next procedure returns 676.

If the command string input corresponds to a command rather than simple key strokes, the string is handled by the Check Command procedure 660 as illustrated in FIG. 19. In the Check Command procedure 660 the next four characters from the speech queue (four characters is the length of all command strings, see Appendix A) are fetched 662 and compared 664 to a command table. If, 666, the characters equal a voice command, then a command is recognized, and processing is continued by the Handle Command routine 668. Otherwise, the characters are interpreted as text and processing returns to the meta bits step 652.

In the Handle Command procedure 668 each command is referenced into a table of command procedures by first computing 670 the command handler offset into the table and then referencing the table, and calling the appropriate command handler 672. After calling the appropriate command handler, Get Next exits the Process Input module directly 674 (the structure of the software is such that a return from Handle Command would return to the meta bits step 652, which would be incorrect).

The command handlers available to the Handle Command routine are illustrated in FIG. 20. Each command handler is detailed by a flow diagram in FIGS. 21A through 21G. The syntax for the commands is detailed in Appendix A.

Figure 21A:
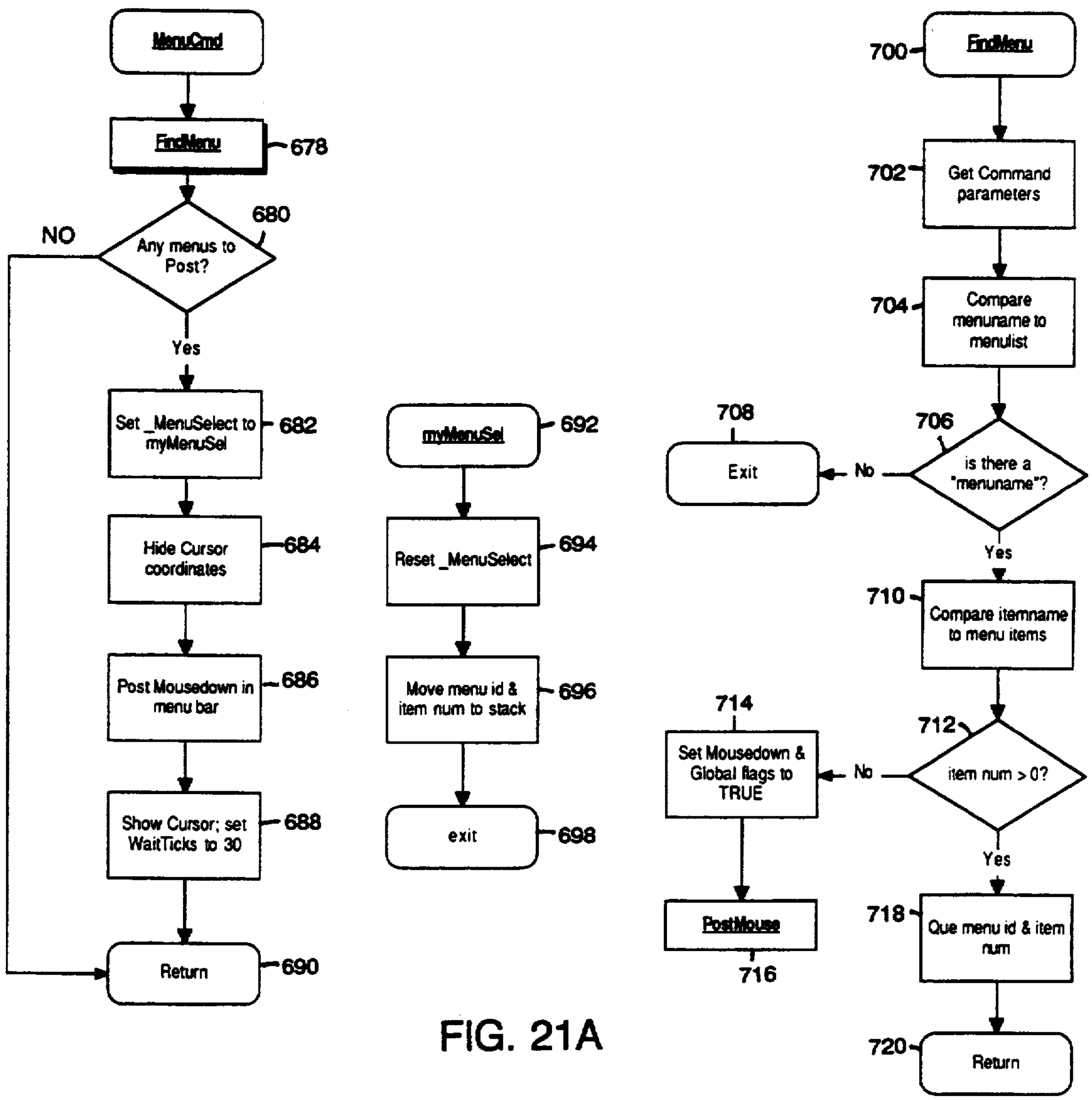

Referring to FIG. 21A, the Menu command will pull down a menu, for example, @MENU(apple,O) (where apple is the menu number for the apple menu) will pull down the apple menu. Menu command will also select an item from the menu, for example, @MENU(apple,-calculator) (where calculator is the itemnumber for the calculator in the apple menu) will select the calculator from the apple menu. Menu command initializes by running the Find Menu routine 678 which queues the menu id and the item number for the selected menu. (If the item number in the menu is 0 then Find Menu simply clicks on the menu bar.) After Find Menu returns, if 680, there are no menus queued for posting, the Menu command simply returns 690. However, if menus are queued for posting, Menu command intercepts 682 one of the Macintosh internal traps called Menu Select. The Menu Select trap is set equal to the My Menu Select routine 692. Next the cursor coordinates are hidden 684 so that the mouse cannot be seen as it moves on the screen. Next, Menu command posts 686 a mouse down (i.e. pushes the mouse button down) on the menu bar. When the mouse down occurs on the menu bar the Macintosh operating system generates a menu event for the application. Each application receiving a menu event requests service from the operating system to find out what the menu event is. To do this the application issues a Menu Select trap. The menu select trap then places the location of the mouse on the stack. However, when the application issues a menu select trap in this case, it is serviced by the My Menu Select routine 692 instead, thereby allowing Menu command to insert the desired menu coordinates in the place of the real coordinates. After posting a mouse down in the appropriate menu bar, Menu Command sets 688 the wait ticks to 30, which gives the operating system time to draw the menu, and returns 690.

In the My Menu Select trap 692 the menuselect global state is reset 694 to clear any previously selected menus, and the desired menu id and the item number are moved to the Macintosh stack 696, thus selecting the desired menu item.

The Find Menu routine 700 collects 702 the command parameters for the desired menu. Next, the menuname is compared 704 to the menu name list. If, 706, there is no menu with the name "menuname" Find Menu exits 708 Otherwise, Find Menu compares 710 the itemname to the names of the items in the menu. If, 712, the located item number is greater than 0, then Find Menu queues 718 the menu id and item number for use by Menu command, and returns 720. Otherwise, if the item number is 0 then Find Menu simply sets 714 the internal Voice Control flags "mousedown" and "global" flags to true. This indicates to Voice Control that the mouse location should be globally referenced, and that the mouse button should be held down. Then Find Menu calls 716 the Post Mouse routine, which references these flags to manipulate the operating system's mouse state accordingly.

Figure 21B:
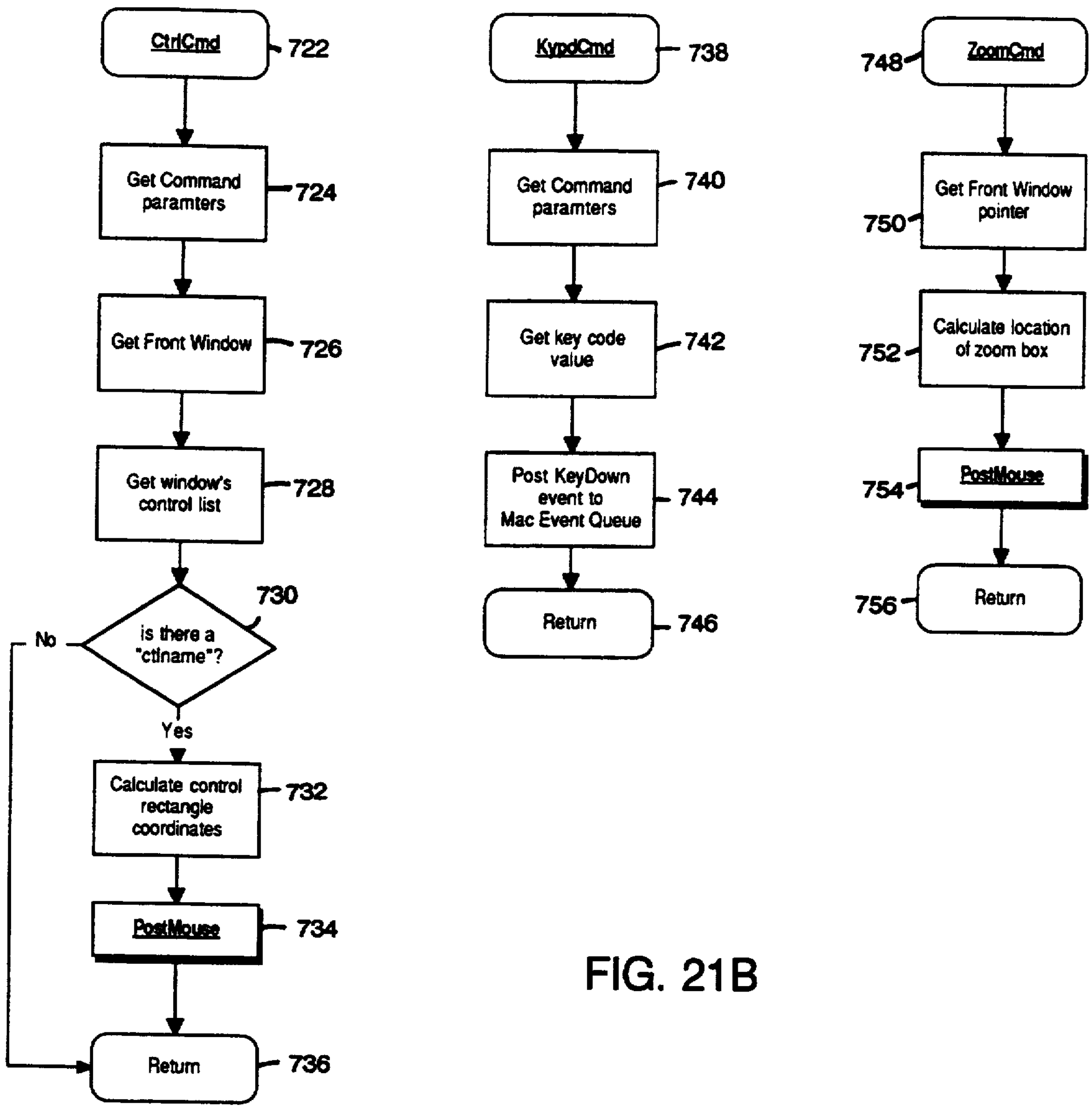
Figure 21C:
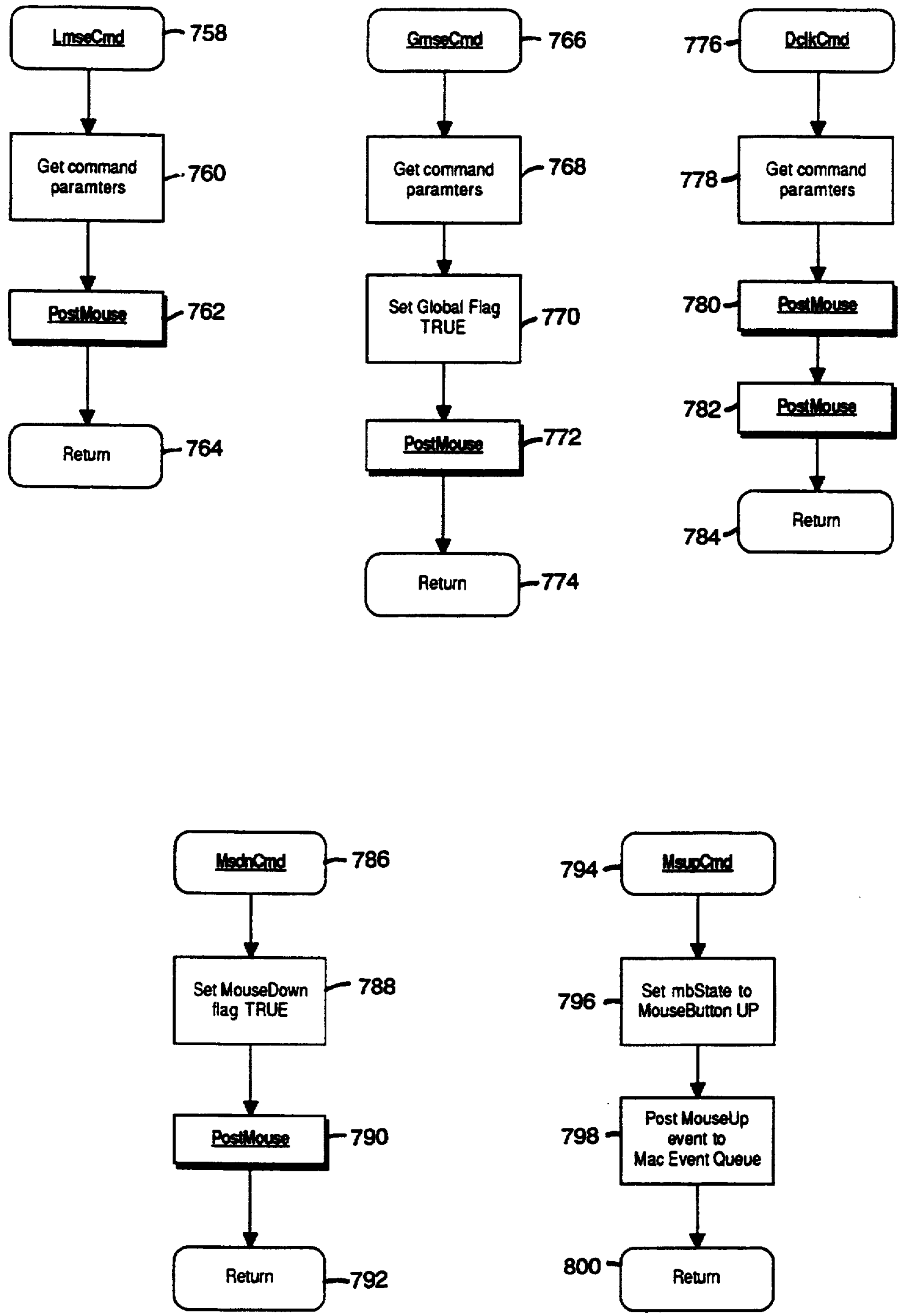

Referring to FIG. 21B, the Control command 722 performs a button push within a menu, invoking actions such as the save command in the file menu of an application. To do this, the Control command gets the command parameters 724 from the control string, finds the front window 726, gets the window command list 728, and checks 730 if the control name exists in the control list. If the control name does exist in the control list then the control rectangle coordinates are calculated 732, the Post Mouse routine 734 clicks the mouse in the proper coordinates, and the Control command returns 736. If the control name is not found, the Control command returns directly.

The Keypad command 738 simulates numerical entries at the Macintosh keypad. Keypad finds the command parameters for the command string 740, gets the keycode value 742 for the desired key, posts a key down event 744 to the Macintosh event queue, and returns 746.

The Zoom command 748 zooms the front window. Zoom obtains the front window pointer 750 in order to reference the mouse to the front window, calculates the location of the zoom box 752, uses Post Mouse to click in the zoom box 754, and returns 756.

The Local Mouse command 758 clicks the mouse at a locally referenced location. Local Mouse obtains the command parameters for the desired mouse location 760, uses Post Mouse to click at the desired coordinate 762, and returns 764.

The Global Mouse command 766 clicks the mouse at a globally referenced location. Global Mouse obtains the command parameters for the desired mouse location 768, sets the global flag to true 770 (to signal to Post Mouse that the coordinates are global), uses Post Mouse to click at the desired coordinate 772, and returns 774.

The Double Click command double clicks the mouse at a locally referenced location. Double Click obtains the command parameters for the desired mouse location 778, calls Post Mouse twice 780, 782 (to click twice in the desired location), and returns 784.

The Mouse Down command 786 sets the mouse button down. Mouse Down sets the mousedown flag to true 788 (to signal to Post Mouse that mouse button should be held down), uses Post Mouse to set the button down 790, and returns 792.

The Mouse Up command 794 sets the mouse button up. Mouse Up sets the mbState global (see Appendix B) to Mouse Button UP 796 (to signal to the operating system that mouse button should be set up), posts a mouse up event to the Macintosh event queue 798 (to signal to applications that the mouse button has gone up), and returns 800.

Figure 21D:
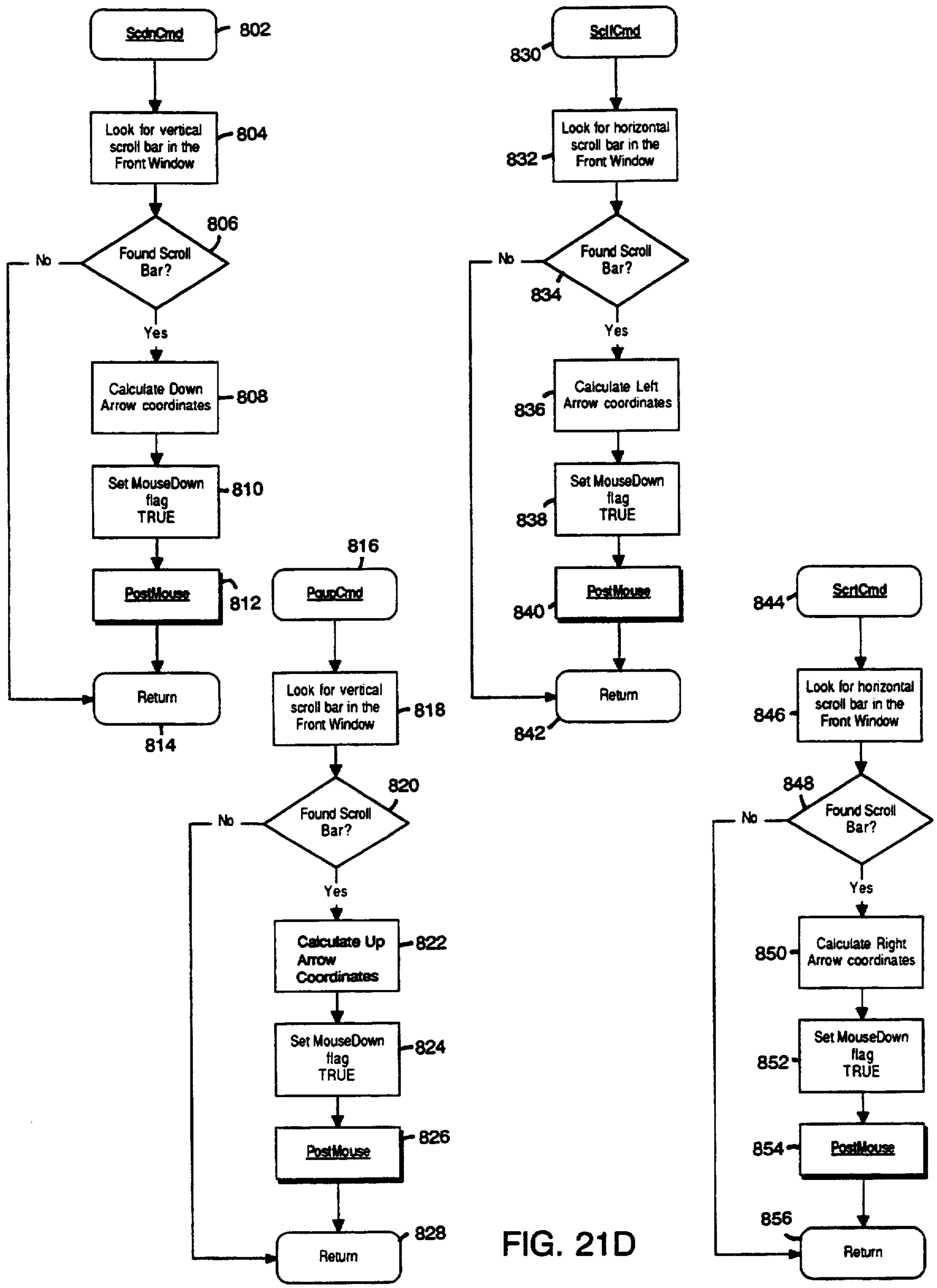

Referring to FIG. 21D, the Screen Down command 802 scrolls the contents of the current window down. Screen Down first looks 804 for the vertical scroll bat in the front window. If, 806, the scroll bar is not found, Screen Down simply returns 814. If the scroll bar is found, Screen Down calculates the coordinates of the down arrow 808, sets the mousedown flag to true 810 (indicating to Post Mouse that the mouse button should be held down), uses Post Mouse to set the mouse button down 812, and returns 814.

The Screen Up command 816 scrolls the contents of the current window up. Screen Up first looks 818 for the vertical scroll bar in the front window. If, 820, the scroll bar is not found, Screen Up simply returns 828. If the scroll bar is found, Screen Up calculates the coordinates of the up arrow 822, sets the mousedown flag to true 824 (indicating to Post Mouse that the mouse button should be held down), uses Post Mouse to set the mouse button down 826, and returns 828.

The Screen Left command 830 scrolls the contents of the current window left. Screen Left first looks 832 for the horizontal scroll bar in the front window. If, 834, the scroll bar is not found, Screen Left simply returns 842. If the scroll bar is found, Screen Left calculates the coordinates of the left arrow 836, sets the mousedown flag to true 838 (indicating to Post Mouse that the mouse button should be held down), uses Post Mouse to set the mouse button down 840, and returns 842.

The Screen Right command 844 scrolls the contents of the current window right. Screen Right first looks 846 for the horizontal scroll bar in the front window. If, 848, the scroll bar is not found, Screen Right simply returns 856. If the scroll bar is found, Screen Right calculates the coordinates of the right arrow 850, sets the mousedown flag to true 852 (indicating to Post Mouse that the mouse button should be set down), uses Post Mouse to set the mouse button down 854, and returns 856.

Figure 21E:
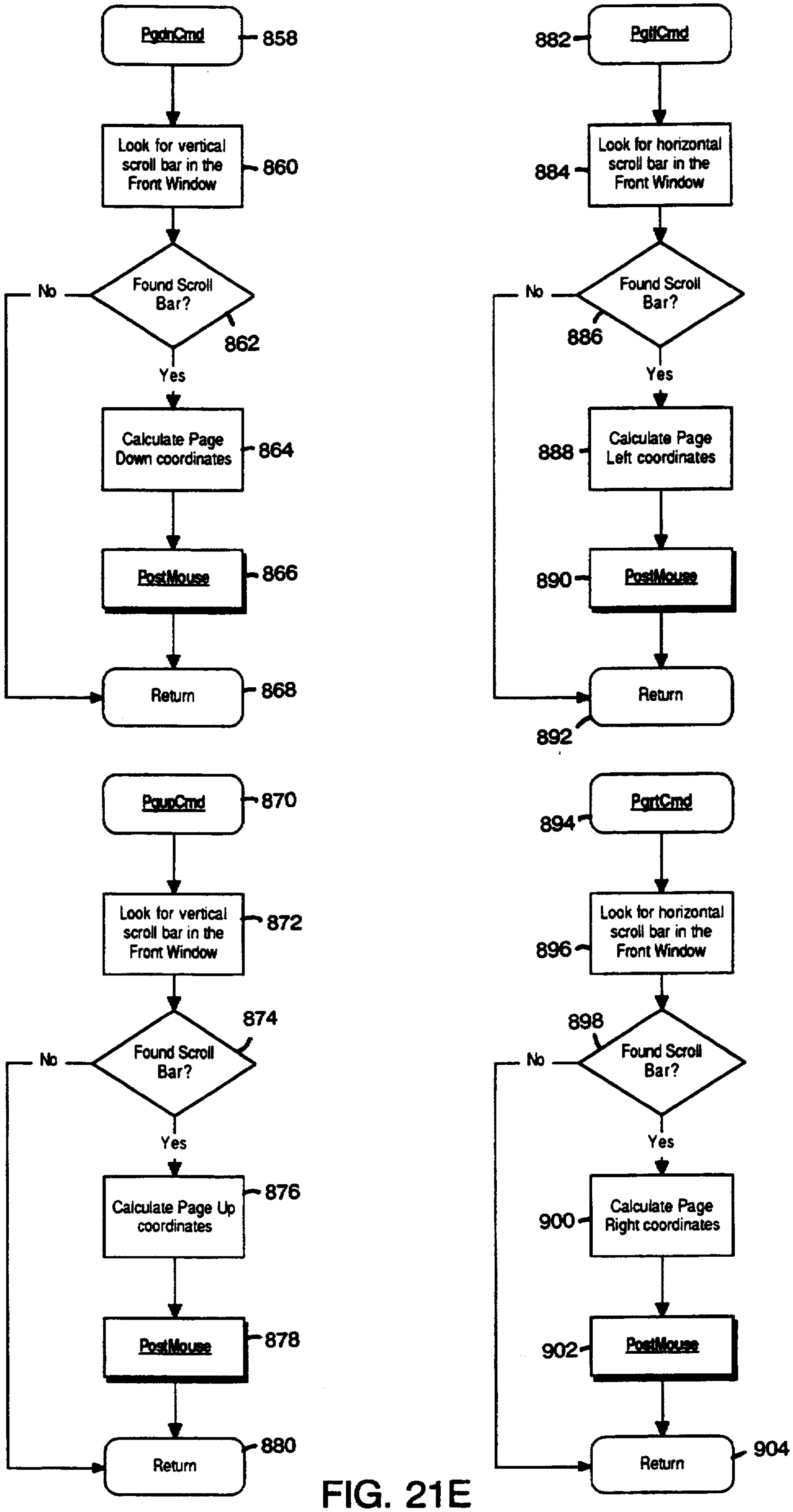

Referring to FIG. 21E, the Page Down command 858 moves the contents of the current window down a page. Page Down first looks 860 for the vertical scroll bar in the front window. If, 862, the scroll bar is not found, Page Down-simply returns 868. If the scroll bar is found, Page Down calculates the page down button coordinates 864, uses Post Mouse to click the mouse button down 866, and returns 868.

The Page Up command 870 moves the contents of the current window up a page. Page Up first looks 872 for the vertical scroll bar in the front window. If, 874, the scroll bar is not found, Page Up simply returns 880. If the scroll bar is found, Page Up calculates the page up button coordinates 876, uses Post Mouse to click the mouse button down 878, and returns 880.

The Page Left command 882 moves the contents of the current window left a page. Page Left first looks 884 for the horizontal scroll bar in the front window. If, 886, the scroll bar is not found, Page Left simply returns 892. If the scroll bar is found, Page Left calculates the page left button coordinates 888, uses Post Mouse to click the mouse button down 890, and returns 892.

The Page Right command 894 moves the contents of the current window right a page. Page Right first looks 896 for the horizontal scroll bar in the front window. If, 898, the scroll bar is not found, Page Right simply returns 904. If the scroll bar is found, Page Right calculates the page right button coordinates 900, uses Post Mouse to click the mouse button down 902, and returns 904.

Figure 21F:
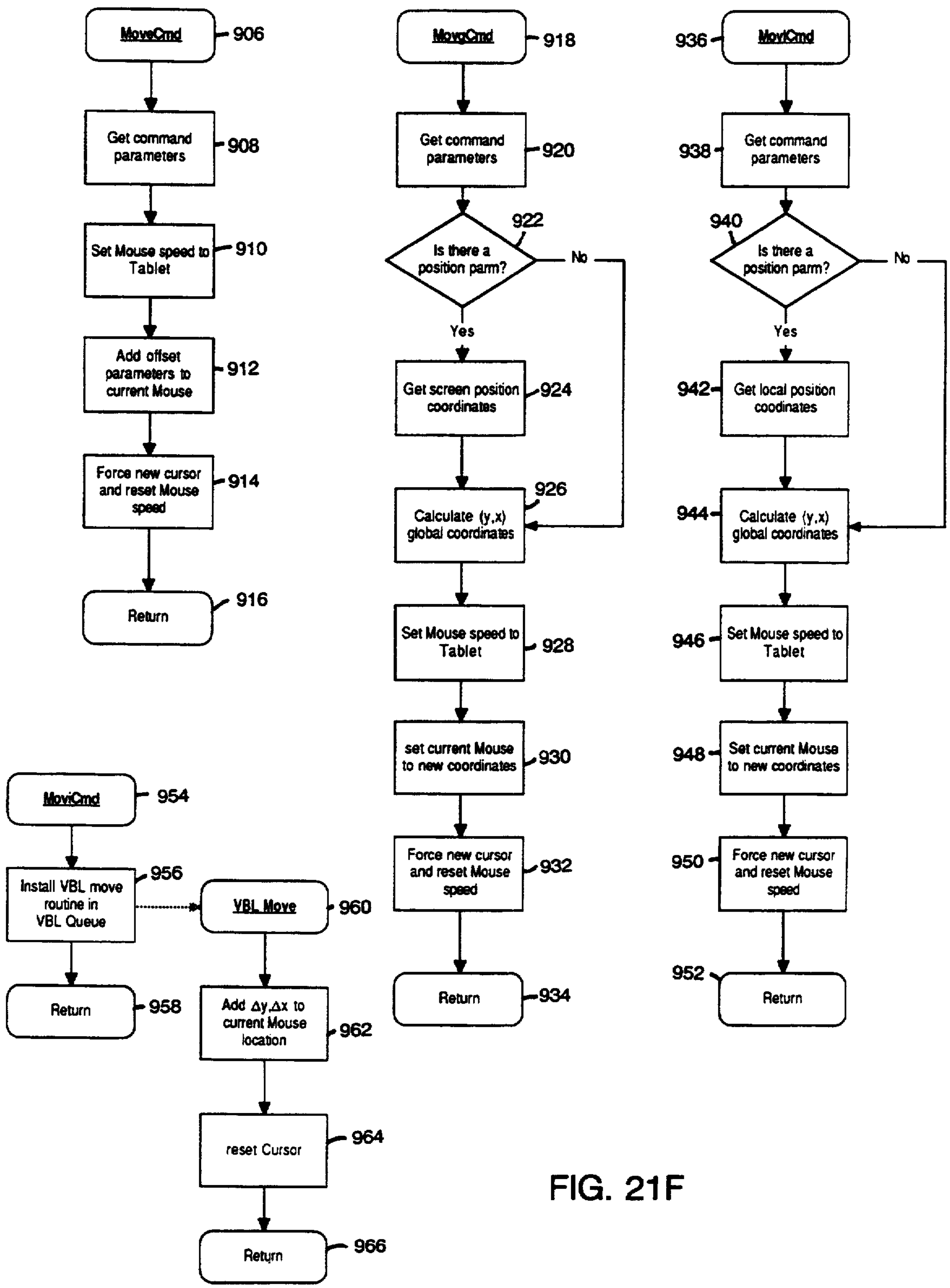

Referring to FIG. 21F, the Move command 906 moves the mouse from its current location (y,x), to a new location ($y+\delta y, x+\delta x$). First, Move gets the command parameters 908, then Move sets the mouse speed to tablet 910 (this cancels the mouse acceleration, which otherwise would make mouse movements uncontrollable), adds the offset parameters to the current mouse location 912, forces a new cursor position and resets the mouse speed 914, and returns 916.

The Move to Global Coordinate command 918 moves the cursor to the global coordinates given by the Voice Control command string. First, Move to Global gets the command parameters 920, then Move to Global checks 922 if there is a position parameter. If there is a position parameter, the screen position coordinates are fetched 924. In either case, the global coordinates are calculated 926, the mouse speed is set to tablet 928, the mouse position is set to the new coordinates 930, the cursor is forced to the new position 932, and Move to Global returns 934.

The Move to Local Coordinate command 936 moves the cursor to the local coordinates given by the Voice Control command string. First, Move to Local gets the command parameters 938, then Move to Local checks 940 if there is a position parameter. If there is a position parameter, the local position coordinates are fetched 942. In either case, the global coordinates are calculated 944, the mouse speed is set to tablet 946, the mouse position is set to the new coordinates 948, the cursor is forced to the new position 950, and Move to Global returns 952.

The Move Continuous command 954 moves the mouse continuously from its present location, moving $\delta y,\delta x$ every refresh of the screen. This is accomplished by inserting 956 the VBL Move routine 960 in the Vertical Blanking Interrupt queue of the Macintosh and returning 958. Once in the queue, the VBL Move routine 960 will be executed every screen refresh. The VBL Move routine simply adds the $\delta y$ and $\delta x$ values to the current cursor position 962, resets the cursor 964, and returns 966.

Figure 21G:
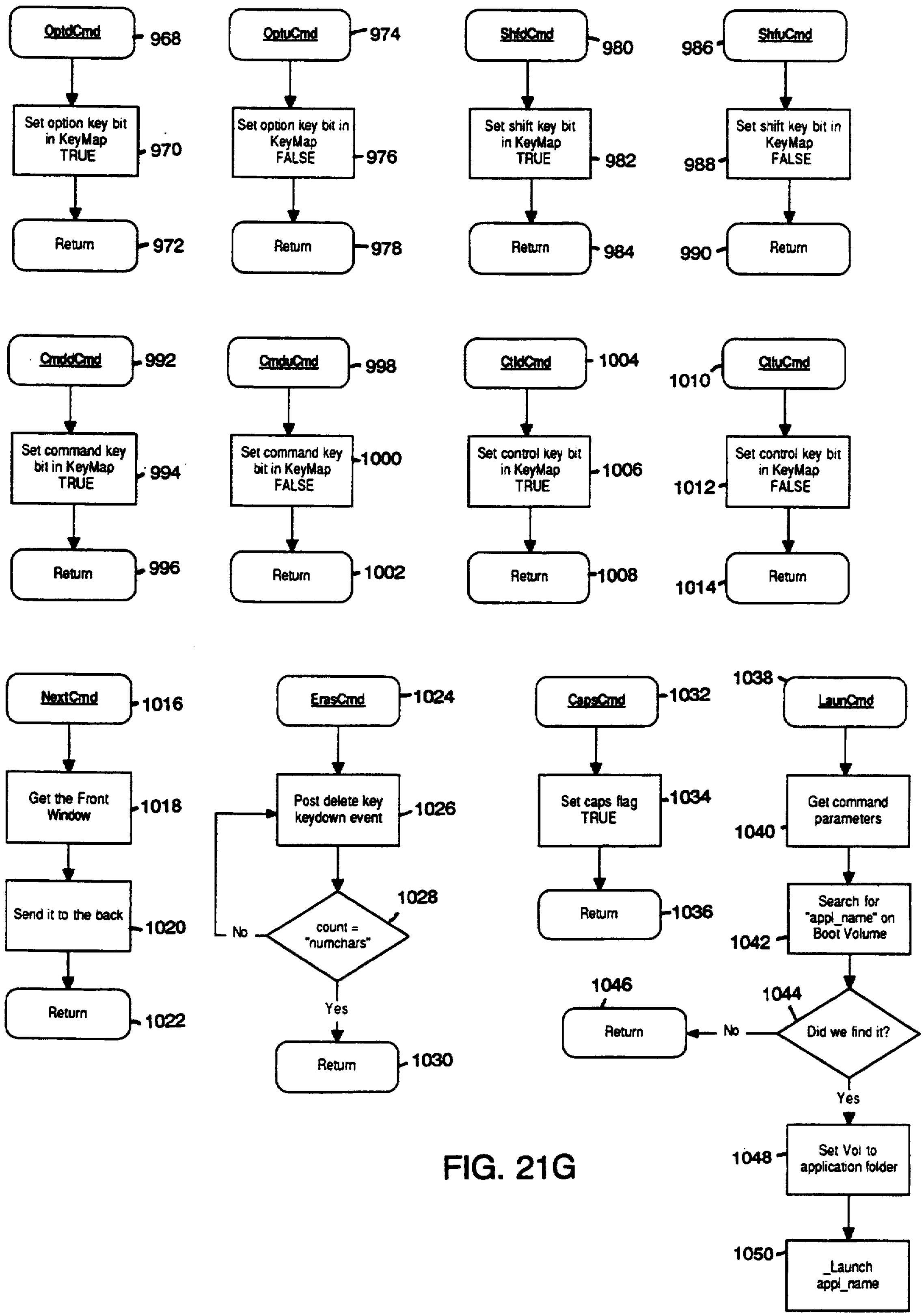

Referring to FIG. 21G, the Option Key Down command 968 sets the option key down. This is done by setting the option key bit in the keyboard bit map to TRUE 970, and returning 972.

The Option Key Up command 974 sets the option key up. This is done by setting the option key bit in the keyboard bit map to FALSE 976, and returning 978.

The Shift Key Down command 980 sets the shift key down. This is done by setting the shift key bit in the keyboard bit map to TRUE 982, and returning 984.

The Shift Key Up command 986 sets the shift key up. This is done by setting the shift key bit in the keyboard bit map to FALSE 988, and returning 990.

The Command Key Down command 992 sets the command key down. This is done by setting the command key bit in the keyboard bit map to TRUE 994, and returning 996.

The Command Key Up command 998 sets the command key up. This is done by setting the command key bit in the keyboard bit map to FALSE 1000, and returning 1002.

The Control Key Down command 1004 sets the control key down. This is done by setting the control key bit in the keyboard bit map to TRUE 1006, and returning 1008.

The Control Key Up command 1010 sets the control key up. This is done by setting the control key bit in the keyboard bit map to FALSE 1012, and returning 1014.

The Next Window command 1016 moves the front window to the back. This is done by getting the front window 1018 and sending it to the back 1020, and returning 1022.

The Erase command 1024 erases numchars characters from the screen. The number of characters typed by the most recent voice command is stored by Voice Control. Therefore, Erase will erase the characters from the most recent voice command. This is done by a loop which posts delete key keydown events 1026 and checks 1028 if the number posted equals numchars. When numchars deletes have been posted, Erase returns 1030.

The Capitalize command 1032 capitalizes the next keystroke. This is done by setting the caps flag to TRUE 1034, and returning 1036.

The Launch command 1038 launches an application. The application must be on the boot drive no more than one level deep. This is done by getting the name of the application 1040 ("appl_name"), searching for appl_name on the boot volume 1042, and, if, 1044, the application is found, setting the volume to the application folder 1048, launching the application 1050 (no return is necessary because the new application will clear the Macintosh queue). If the application is not found, Launch simply returns 1046.

Referring to FIG. 22, the Post Mouse routine 1052 posts mouse down events to the Macintosh event queue and can set traps to monitor mouse activity and to keep the mouse down. The actions of Post Mouse are determined by the Voice Control flags global and mousedown, which are set by command handlers before calling Post Mouse. After a Post MouSe, when an application does a get_next_event it will see a mouse down event in the event queue, leading to events such as clicks, mouse downs or double clicks.

First, Post Mouse saves the current mouse location 1054 so that the mouse may be returned to its initial location after the mouse events are produced. Next the cursor is hidden 1056 to shield the user from seeing the mouse moving around the screen. Next the global flag is checked. If, 1058, the coordinates are local (i.e. global=FALSE) then they are converted 1060 to global coordinates. Next, the mouse speed is set to tablet 1062 (to avoid acceleration problems), and the mouse down is posted to the Macintosh event queue 1064. If, 1066, the mousedown flag is TRUE (i.e. if the mouse button should be held down) then the Set Mouse Down routine is called 1072 and Post Mouse returns 1070. Otherwise, if the mouse down flag is FALSE, then a click is created by posting a mouse up event to the Macintosh event queue 1068 and returning 1070.

Referring to FIG. 23, the Set Mouse Down routine 1072 holds the mouse button down by replacing 1074 the Macintosh button trap with a Voice Control trap named My Button. The My Button trap then recognizes further voice commands and creates mouse drags or clicks as appropriate. After initializing My Button, Set Mouse Down checks 1076 if the Macintosh is a Macintosh Plus, in which case the Post Event trap must also be reset 1078 to the Voice Control My Post Event trap. (The Macintosh Plus will not simply check the mbState global flag to determine the mouse button state. Rather, the Post Event trap in a Macintosh Plus will poll the actual mouse button to determine its state, and will post mouse up events if the mouse button is up. Therefore, to force the Macintosh Plus to accept the mouse button state as dictated by Voice Control, during voice actions, the Post Event trap is replaced with a My Post Event trap, Which will not poll the status of the mouse button.) Next, the mbState flag is set to MouseDown 1080 (indicating that the mouse button is down) and Set Mouse Down returns 1082.

The My Button trap 1084 replaces the Macintosh button trap, thereby seizing control of the button state from the operating system. Each time My Button is called, it checks 1086 the Macintosh mouse button state bit mbState. If mbState has been set to UP, My Button moves to the End Button routine 1106 which sets mbState to UP 1108, removes any VBL routine which has been installed 1110, resets the Button and Post Event traps to the original Macintosh traps 1112, resets the mouse speed and couples the cursor to the mouse 1114, shows the cursor 1102, and returns 1104.

However, if the mouse button is to remain down, My Button checks for the expiration of wait ticks (which allow the Macintosh time to draw menus on the screen) 1088, and calls the recognize routine 1090 to recognize further speech commands. After further speech commands are recognized, My Button determines 1092 its next action based on the length of the command string. If the command string length is less than zero, then the next voice command was a Voice Control internal command, and the mouse button is released by calling End Button 1106. If the command string length is greater than zero, then a command was recognized, and the command is queued onto the voice que 1094, and the voice queue is checked for further commands 1096. If nothing was recognized (command string length of zero), then My Button skips directly to checking the voice queue 1096. If there is nothing in the voice queue, then My Button returns 1104. However, if there is a command in the voice queue, then My Button checks 1098 if the command is a mouse movement command (which would cause a mouse drag). If it is not a mouse movement, then the mouse button is released by calling End Button 1106. If the command is a mouse movement, then the command is executed 1100 (which drags the mouse), the cursor is displayed 1102, and My Button returns.

SCREEN DISPLAYS

Referring to FIG. 24, a screen display of a record actions session is shown. The user is recording a local mouse click 1106, and the click is being acknowledged in the action list 1108 and in the action window 1110.

Referring to FIG. 25, a record actions session using dialog boxes is shown. The dialog boxes 1112 for recording a manual printer feed are displayed to the user, as well as the Voice Control Run Modal dialog box 1114 prompting the user to record the dialogs. The user is preparing to record a click on the Manual Feed button 1116.

Figure 26:
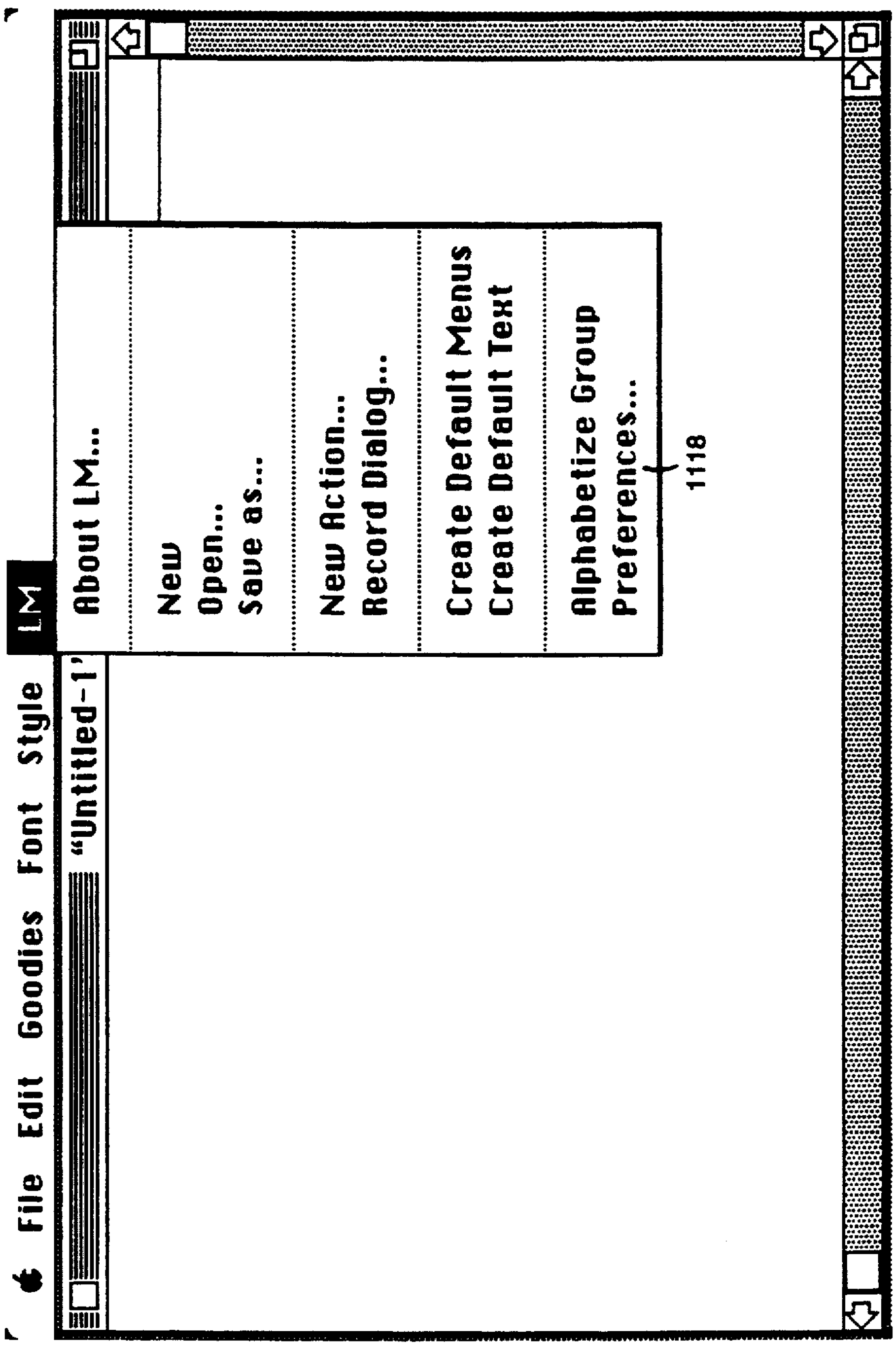

Referring to FIG. 26, the Language Maker menu 1118 is shown.

Figure 27:
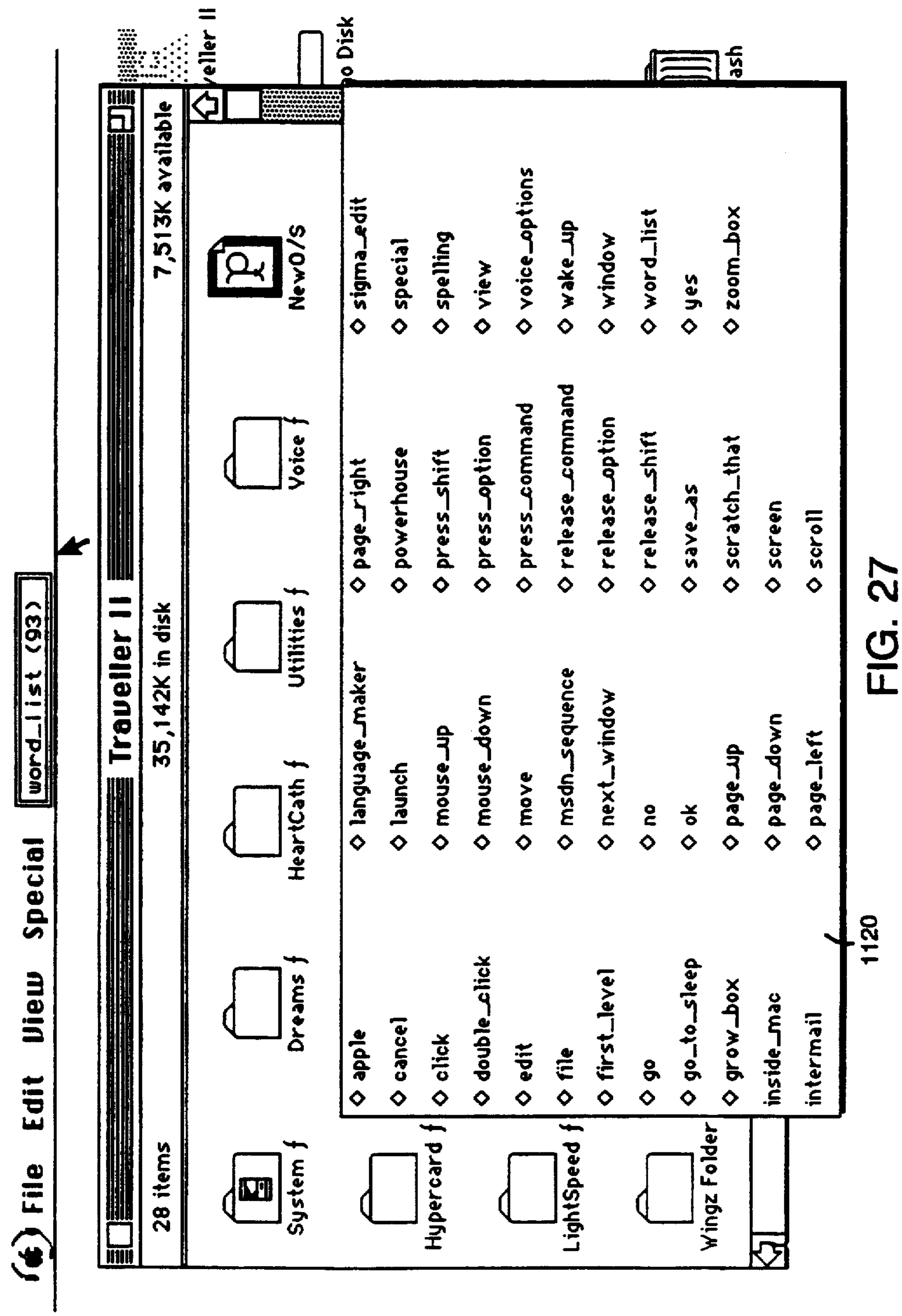

Referring to FIG. 27, the user has requested the current language, which is displayed by Voice Control in a pop-up display 1120.

Figure 28:
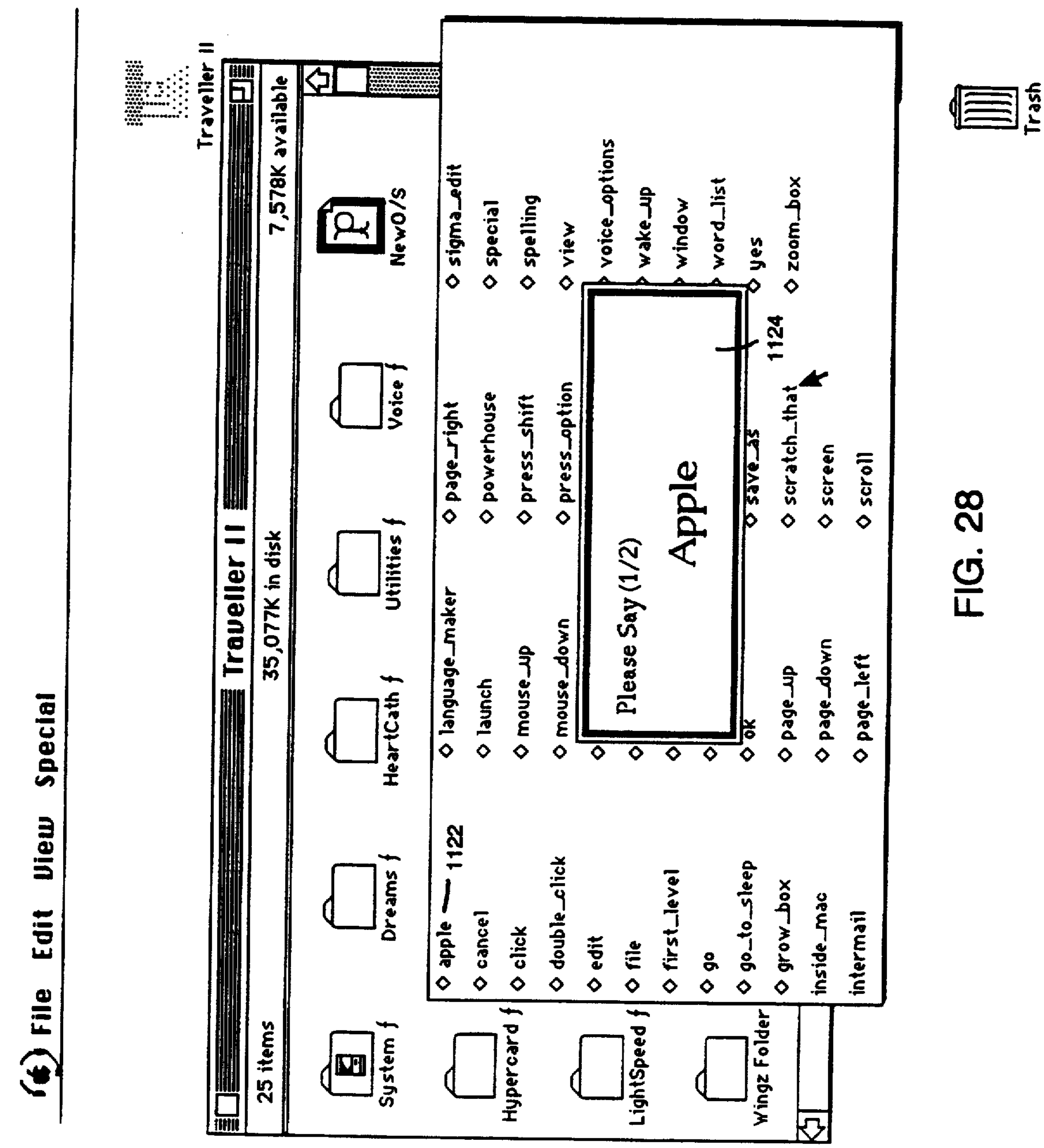

Referring to FIG. 28, the user has clicked on the utterance name "apple" 1122, requesting a retraining of the utterance for "apple". Voice Control has responded with a dialog box 1124 asking the user to say "apple" twice into the microphone.

Figure 29:
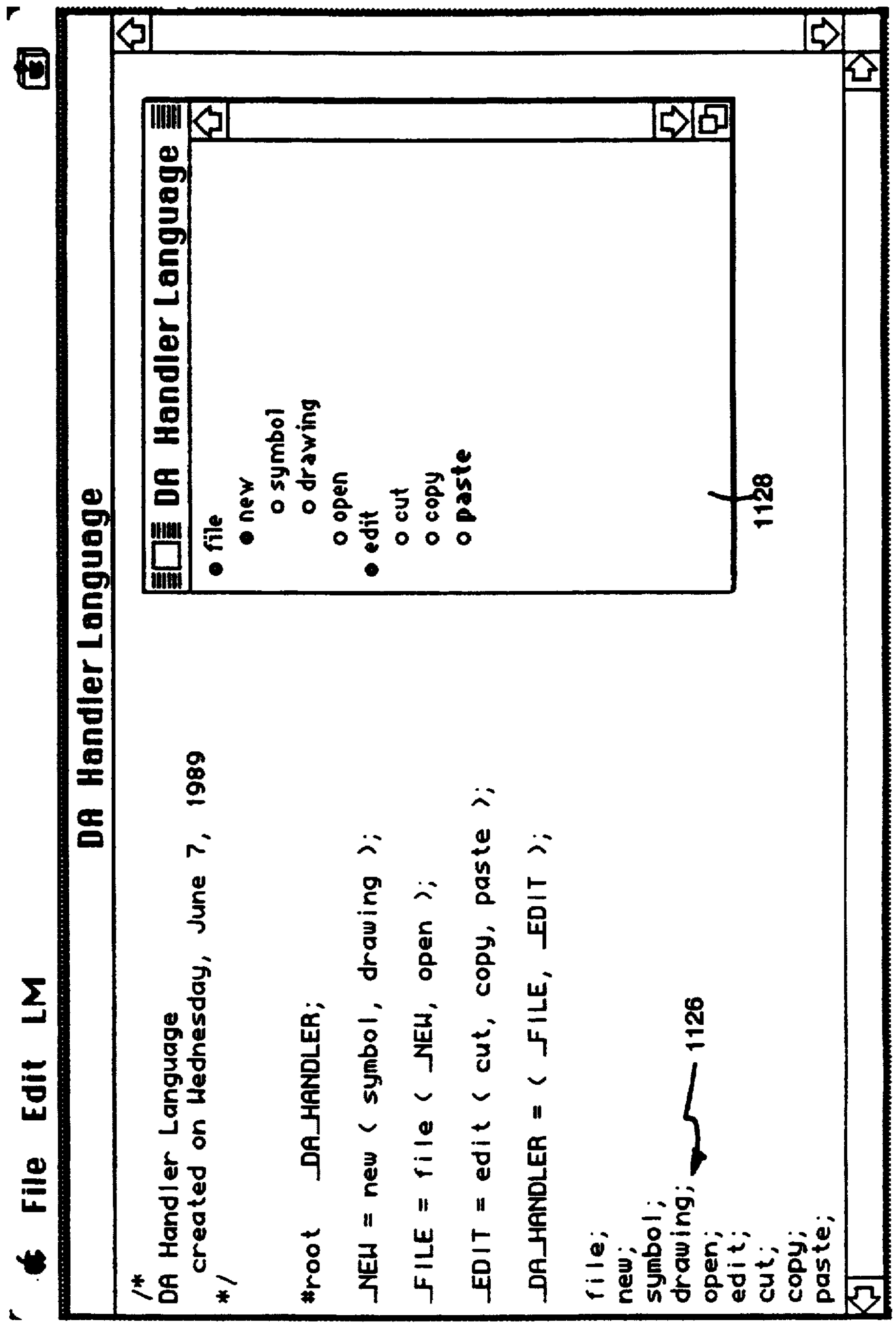

Referring to FIG. 29, the text format of a Write Production output file 1126 (to be compiled by VOCAL) and the corresponding Language Maker display for the file 1128 are shown. It is clear from FIG. 29 that the Language Maker display is far more intuitive.

Referring to FIG. 30, a listing of the Write Production output file as displayed in FIG. 29 is provided.

OTHER EMBODIMENTS

Other embodiments of the invention are within the scope of the claims which follow the appendices filed with this application. For example, the graphic user interface controlled by a voice recognition system could be other than that of the Apple Macintosh computer. The recognizer could be other than that marketed by Dragon Systems.

Included in the Appendices are Appendix A, which sets forth the voice Control command language syntax, and Appendix B which lists some of the Macintosh OS globals used by the Voice Navigator system. What follows here are first a manual of how to develop applications in accordance with the system and than a manual of how to use the system.

Voice Navigator™ Developer's Reference Manual

Introduction to Developer's Toolkit

The Voice Navigator Developer's Toolkit opens up a broad spectrum of possibilities in the field of voice recognition with the Macintosh.

The Speech Box hardware, Voice Navigator software utilities, and enclosed reference manual enable developers to build and compile customized languages for applications.

Virtually any form of voice-directed action on the Macintosh is feasible: from mouse clicks to menu selection, from control of graphic tools to text entry.

The Navigator is the key to an innovative range of voice-enhanced applications, such as interactive learning (voice-in, voice-out), voice-controlled presentations, and "hands busy/eyes busy" tasks such as recording research data. On-site and remote access via voice are possible with the telecommunications interface. HyperCard applications are supported as well.

With the Voice Navigator, speaking will join the mouse and keyboard as standards of Macintosh operation. The tools are at the command of your hand and voice: only your imagination will set the limits.

Contents of Developer's Toolkit

- Voice Driver, Voice Prep — Voice recognition software stored in the System Folder

*Consult Part II*

- LightspeedC™ Libraries & Source Code — Libraries and source code to interface to the Voice Driver

*Consult Part II,*

- VOCAL — Compiler for converting Language Files into Word Lists to use voice recognition in specific applications

*Consult Part I.*

| | |
|---|---|
| • **Language Files** | Sample source files used by VOCAL to compile Word Lists for applications<br><br>*Consult Part I* |
| • **Word Lists** | Pre-compiled files containing sets of words for using voice in specific applications<br><br>*Consult Part I* |
| • **VoiceINIT & VoiceWord** | INIT and desk accessory versions of the voice recognizer allow voice commands to be executed from any application<br><br>*Consult Parts IV and V* |
| • **VoiceTrain** | An application for training Word Lists to recognize the user's voice<br><br>*Consult Part III* |
| • **LanguageMaker** | A tool to create Word Lists for specific applications (a more limited program than VOCAL)<br><br>*Consult Part VI* |
| • **VoiceTalk** | HyperCard XCMD's and XFCN's for using voice recognition in stacks<br><br>*Consult Part II* |
| • **VoiceWorks** | An example of a HyperCard stack using voice recognition<br><br>*Consult Part III* |

PART I

LANGUAGE DESIGN

USING VOCAL

What Is in Part I:

Part I explains how to write a Language file, and how VOCAL compiles the file into a Word List. The Voice Driver uses the Word List file for voice recognition.

To Save Time:

Users familiar with concepts of language design should *skim* Chapters One and Two (Introduction to Language Design and Basic Elements of a Language File).

*Concentrate* on Chapters Three, Four and Five for details of how to design a language file to work with VOCAL (Writing a Language File, Language File Reference, How to Use VOCAL).

Terminology:

Specialized terms used in this manual are printed in italics when first introduced. They can be looked up in the Glossary for concise definitions. See the text for more detailed explanations.

*Special Note:* The terms *state* and *level* are used interchangeably in this manual (to mean the sets of words that are active at any one time).

Chapter One

Introduction to Language Design

This chapter covers:

- Speech Recognition: An Overview
  - What Is a Language?
  - What Are Language Files and Word Lists?
  - How Voice Recognition Takes Place
  - The Voice Navigator System: Diagram of Operation
- Finite State Machines
  - Limits on Size of Active Word List
  - Overcoming Limits with Finite State Machines
  - Theoretical Size of Entire Word List
  - Practical Restraints on Size of Entire Word List
- Using Grammar
  - What Is Grammar?
  - How Grammar Works
  - Example of Levels: Active & Inactive Words
  - Saying Words Not in the Currently Active Word List

Speech Recognition: An Overview

What Is a Language?

• A *language* is composed of words that can be spoken to control an application. The words are divided into sets or levels of words that can be *active* or *inactive* (available or unavailable for voice recognition). Only one set of words can be active at any time. The maximum number of words in a set is 200 or 1000, depending on your version of the Voice Navigator. The Voice Navigator recognizes up to 200 words at a time, while the Voice Navigator Plus recognizes up to 1000 words at a time.

• A language provides rules for making different words sets active and inactive, depending on what was previously said. For example, if you are using voice to select menu items in the Finder, saying "File" could activate the words "new," "open," "close," and "quit." Saying "Special" could activate the words "restart" and "shutdown."

• Dividing the total word list into sets of active and inactive words can dramatically increase the accuracy of recognition (there are fewer words in the active memory for the Voice Driver to compare with the word you say).

• Sets of active and inactive words also mean you can increase the total number of words in any particular language. The 200- or 1000-word limit only holds true for active words. There can be many times this amount of words in the total word list for an application.

What Are Language Files and Word Lists?

• A *Language File* is a text file that is compiled by VOCAL into a Word List. The Word List is used by the Voice Driver during voice recognition .

• The Language File describes which sets of words become active when. It also describes what actions occur (the "output") when you say a particular word.

Language File
|
VOCAL
|
Word List
|
Voice Driver
|
Voice Recognition
|
Output

• Usually you will want to create a specific Language File for a specific application. However, it is possible to create one Language File to incorporate more than one application.

•VoiceWord and VoiceINIT make it possible to execute any action by voice that is normally accomplished by the mouse or keyboard -- from menu selection to text entry. This is done via macros that are linked with the output.

Voice Recognition
|
VoiceWord or VoiceINIT
|
Macros for
Mouse and Keyboard Actions

*Note*: It is not necessary to use the VoiceWord or VoiceINIT for voice recognition -- recognition is done by the Voice Drivers. Developers can choose their own interface with the Voice Drivers.

How Voice Recognition Takes Place

To understand how to design a Language File, it will be helpful to review how the Voice Navigator operates. For this example, we'll assume the Language File for the application has already been written and the Word List compiled by VOCAL.

Create a Voice File

• Open VoiceTrain and select the Word List you wish to train.

• Say each word in the list when cued by VoiceTrain

• Every instance of saying a word in a language is called an *utterance* -- a discrete verbal unit, set off by a 1/2-second pause before and afterwards.

• An utterance is conveyed to the Speech Box via microphone, telephone, or other input device. The utterance is received as an analog signal. It is then amplified, filtered, and converted into digital form.

• The digitized utterance is stored as a *token* .The number of tokens *collected* for each word in the language is determined by the number of trainings the user decides to give ( 1 - 8 trainings in VoiceTrain).

• The tokens are placed in memory as training proceeds. After the training is complete, the driver takes the tokens for the word from memory and uses them to build a *model*. A model is a mathematical representation of a person's average voice pattern for an utterance. The model is an average of all the tokens, i.e., all the instances of voice-training that word.

(*Note:* In VoiceTrain, tokens are not saved after the model is built. A program could be designed to save the tokens if desired.)

• The voice models for all the words in an application's Word List become the user's Voice File for that language.

Recognize Speech in an Application

• Start the application. Select VoiceWord if you are using this desk accessory for voice recognition rather than VoiceINIT. Open the Word List for the application and the user's Voice File.

• Say a word you've voice-trained. The Voice Driver compares the token for this word with a set of models of previously trained words. The driver selects the model that most closely matches what you said.

• When a match is made, an output associated in the Language File with this particular model takes place. If the match is correct, the output will be what the user expects. This is successful speech recognition.

CREATE VOICE FILE

Load Training Application
|
Cue to Train Word List
|
Utterance
|
Analog Signal Sent to Speech Box
|
Signal Amplified, Filtered & Digitized
|
Token
|
Token Collected
|
Additional Utterances of Word
|
Additional Tokens of Word Collected
|
Model of Word Built From Tokens
|
Voice File

RECOGNIZE SPEECH

Open Application Word List & Voice File
|
Utterance During Application
|
Token for the Utterance
|
Voice Driver Compares Token With Model And Makes Closest Match
|
Output Associated with Model.

Finite State Machines

Limits on Size of Active Word List

• As we've seen, the Voice Navigator matches models of trained words with words spoken while running an application. The rule of thumb for the most accurate voice recognition is:

*Fewer active words to match the spoken word against means a higher chance of an accurate match.*

• Why? If there are many models of similar-sounding words and they are all in the active Word List (available for matching against a spoken word), correct matching will be more difficult.

• Other disadvantages of a large active Word List are increased recognition response time and strain on memory capacity.

Overcoming Limits: Finite State Machines

• An application may need hundreds or thousands of words in its language to handle the tasks required. To accommodate large Word Lists while maximizing accuracy of voice recognition, we've seen the advantages of breaking the language up into *levels* or *states* of active and inactive words.

•This type of operation is called working with *finite state machines (FSM)*. A finite state machine is not a "machine" per se, but a mode of operation involving a state in which there are a finite number of active words. Each spoken word determines succeeding states (succeeding FSM's) and the words that become active.

Theoretical Size of Entire Word List

• The Voice Driver limits only the *active* Word List to 200 or 1,000 words at a time. Theoretically, total number of words in a language is unrestricted so long as the active Word List in any one state or level is not more than 200 or 1,000 words.

Practical Restraints on Size of Entire Word List

• In practice, the total number of words in a language is restrained by several factors:

- The amount of memory available for a large and complex Language file
- The time the user wishes to put in to train a large number of words
- If a large Word List is divided up into many states, the user has to be willing to abide by many restrictions of state when using the words in applications.

Using Grammar

What Is Grammar?

• To accommodate the needs of a speech recognition system using FSMs, the language must follow rules of construction for setting up states or levels of words and switching between them. These rules are called the language's *grammar*. The structure created by the grammar is the language's *syntax*.

How Grammar Works

• When using voice recognition, the language's grammar cues the Voice Driver to bring up the models of only the words that are active in a particular set or level of words. The previous spoken word determines the succeeding level, and therefore the choice of active words for the next utterance. After the models of active words are selected by the Voice Driver for comparison with the spoken word, the closest match is made. Depending on the level of that word, another level might be invoked with another set of active words. Or the same level may be maintained for the following spoken word.

First Level of Active Words
|
Models of Words in that Level Activated for Possible Match
With Next Utterance
|
Utterance
|
Voice Driver Matches with Active Models
|
Voice Recognition
|
Next Level
|
Next Set of Active Words
etc.

Example of Levels: Active and Inactive Words

•To show the advantages of breaking up a language into levels of active and inactive words, let's take a language for selecting menu items in the Macintosh Finder.

For simplicity's sake, we'll start with three menu titles and some of their menu items:

| APPLE | FILE | SPECIAL |
|---|---|---|
| About | New | Restart |
| Calculator | Open | Shutdown |

• How many words would we need to develop a language for the Finder?

Menu Titles = 3
<u>Menu Items = 6</u>
Total = 9

This means that if we trained all 9 words for voice command we'd have 9 models in the Voice File for the Finder language. Each time we said one of these words in operation, the Voice Driver would have to compare the utterance to all 9 models and come up with the closest match.

• Suppose we want to reduce the number of models an utterance is compared to. We can do this by using the menu titles as natural breaking-points to invoke a level of active words.

The three menu titles -- Apple, File, and Special -- become the three active words in the first level. When the Voice Driver hears our first utterance, it activates only these three models for comparison with the utterance.

• How does this work? If we say the word "File," for example, the driver compares the utterance to models for Apple, File, and Special. It matches "File" with File, and carries out the task encoded in the output string: the File menu is selected.

Say "File"
|
First Level
|
Three Active Models: "Apple," "File," "Special"
|
Match Utterance of "File" With Model "File"
|
"File" Recognized What about the rest of the words in the language, the names for the menu items? We can structure the language to put the menu items in levels that are invoked when the menu titles are recognized.

If we say "File," the Driver recognizes File and gets ready to hear us say one of the two words in the next level: New or Open. Models for these two words are called up and compared with our next utterance. Let's say the utterance is "New." The match is made and the word is recognized.

"File" Recognized
|
Second Level
|
Two Active Models: "New," "Open"

|

Say "New"

|

Match Utterance of "New" With Model of "New"

|

"New" Recognized

What level is invoked after "new" is recognized? If we want to be able to say a menu title after we've said the name of a menu item, we'd structure the language so that after saying the menu item we'd go back to the first level where the words for the menu titles become active again.

Now we can say "Apple," and our utterance will be compared to the three menu titles, Apple, File, and Special. Voice recognition will occur.

"New" Recognized

|

First Level

|

Say "Apple"

|

Match Utterance of "Apple" With Models
"Apple," "File," "Special"

|

"Apple" Recognized.

Saying Words Not in the Currently Active Word List

What if we try to break the rules and use a word that's not active in the level we're in? For example, we've said "Apple" so that now we're in the level where the two active words are the Apple menu items About and Calculator. But we don't say either of these words, but "Open" instead.

The utterance "Open" is compared by the Driver with the two active words, About and Calculator. It tries to make a match. Two outcomes are possible here:

(1) The driver comes up with the closest match, pairing "Open" with About. Now we find we've selected About in the Apple menu when we wanted to Open a file. Result: a voice recognition error. We would have to say "File" to invoke the level that makes it possible to say "Open."

(2) The driver does not recognize "Open" and no action occurs.

Why? By adjusting the Confidence and Rejection gauges, we've ensured that a recognition error will not occur if a word is spoken that is not in the active level.

The Confidence and Rejection gauges enable you to calibrate how close an utterance has to be to the active words in a level in order for recognition to take place. If we have previously set the Confidence gauge high when we trained the words in the Word List, the driver will not make a match unless there is a close pairing of the utterance with one of the active models. If we say "Open" and the closest match match is "About," the confidence will be low and no match will be made. Result: no voice recognition will occur.

*Now that you understand the concept of voice recognition using levels of active words, go on to Chapter Two to find out how to write a Language file setting up levels of words for an application.*

Chapter Two

Basic Elements of a Language File

This chapter provides an introduction to writing a Language File. It uses a step-by-step approach to gradually describe the main concepts and terms that will be discussed more fully in later chapters.

This chapter covers:

- What is a Language File?
- Language File as a Hierarchy
- Format of a Production Statement
- Ordering Productions
- Output Strings
- Voice Recognition Redefined
- Designing Levels of Active Words
- Selecting Words for an Application Advanced users can skim this chapter and proceed to Chapters Three, Four and Five for technical details.

What Is a Language File?

• A Language File takes the voice commands for an application and puts them into the form of "statements." The statements specify the states or levels that make groups of words active and inactive in different contexts.

• The statements in a Language File are called *productions* because they describe how to *produce* a valid outcome.

Example

We will start with a simple Language File for a set of voice commands consisting of the digits zero through three. We want to be able to generate statements that have three digits in them.

The Language File has two productions:

```
S =        DIGIT DIGIT DIGIT;
DIGIT =    zero, one, two, three;
```

This means:

A statement, S, consists of three DIGITS. A DIGIT is any one of the words zero through three.

(For now, ignore the capitalization and punctuation in this format.)

• Here is how a statement consisting of three numbers can be generated:

Each instance of DIGIT is replaced with either zero, one, two, or three. We are left with the statement: *one, two, three*. Another possibility is the statement: *zero, three, zero*; or *one, zero, two*.

Language File as a Hierarchy

A Language File takes the words to be voice-recognized and organizes them into categories of active words. The categories are arranged in a hierarchy. It's similar to the hierarchy of folders and files within folders that you use on your Macintosh. If you open a folder certain files will become active. Similarly, if you open a category of words, the words in that category will become active.

The concept will be easy to grasp by looking at the following example.

*Example: Airline Language File*

This Language File uses words that a customer might say when asking for airline reservations. The words are organized into categories. Any word in the category can be selected and plugged into its proper position in the statement.

The main categories are :

| | |
|---|---|
| PREAMBLE | (words such as "I need," "I want," "Please give me") |
| REQUEST | (words such as "information on your flights," "a ticket," "a reservation") |
| ITINERARY | (words such as "from New York to Philadelphia" |
| DATE | (words such as "next Tuesday," "in July") |

*Note:* We're using the convention of capital letters for category names, lower case for the actual words that can be spoken. This is for our purposes only, since VOCAL does not recognize the difference between upper and lower case.

Let's list the names of the main categories under an overall title, Customer Query. The first statement in the Language File would look like this:

CUSTOMER QUERY - PREAMBLE REQUEST ITINERARY DATE;

• Second, we'll put each category name on the left and the words in the category on the right.

```
PREAMBLE =          I need,
                    I want,
                    Please give me ;

REQUEST =           information on your flights,
                    your schedule on flights,
                    a ticket ,
                    a reservation ;
```

• Now we come to the categories ITINERARY and DATE. These are a little more complicated.

ITINERARY contains words like "from" and "to." It also contains a sub-category, CITY NAME, with words like "New York" and "Philadelphia."

DATE also has sub-categories, such as DAY NAME and MONTH NAME.

• To set up the hierarchy of categories and sub-categories, list the category name on the left side of the = sign, and any sub-categories on the right. Later we can define what words are in the sub-category; we'll put the sub-category name on the left and the words in the sub-category on the right.

```
ITINERARY =         from CITY_NAME to CITY_NAME (via CITY_NAME)

CITY_NAME =         new_york, san_francisco, philadelphia,
                    baltimore, atlanta, ft_lauderdale, chicago,
                    seattle, boston ;

DATE =              next DAY_NAME,
                    in MONTH_NAME,
                    on WEEK DAY_NAME in MONTH_NAME ;

DAY_NAME =          sunday, monday, tuesday, wednesday,
                    thursday, friday, saturday ;

MONTH_NAME =        january, february, march, april, may, june, july,
                    august, september, october, november,
                    december ;
```

WEEK = the first, the second, the third, the fourth ;

*Note:* We're using an underscore between two parts of a single phrase. This is a convention that is useful because the compiler interprets the use of white space between words in a particular way (for details, see the section on Signs).

• Here are some requests that can be generated by this Language File. We're using the rules we've defined to plug in various words in each of the categories:

Please give me a reservation from New York to Philadelphia in January.

I want your schedule on flights the first Saturday in December.

I need a ticket from Seattle to Baltimore on Wednesday.

Format of Production Statement

Let's put what we've done into a general format we can use for any Language File:

Production Statement

<non-terminal> = <terminals, non-terminals>;

Notice that a statement has two sides separated by an = sign, ending in a semi-colon. Terminals and non-terminals are defined below.

• A *terminal* is a symbol that stands for an utterance leading to an output (such as a mouse or keyboard action).

• A *non-terminal* is a symbol that stands for the name of a *production*. Non-terminals are essentially names of categories, headings under which we can list various states and utterances in sequential order. Non-terminals are not voice-recognizable words (utterances), but ways of categorizing utterances under headings that define a series of finite state machines leading to an utterance and output.

• A language file also includes a *terminal declaration*.. A terminal declaration links a terminal with an output string, so that voice recognition leads to a result such as a keyboard or mouse action. (See the section on Output Strings below for more detail.)

Ordering Productions

The order of productions is not important, except in the case of the initial productions used to start off a Language File. The ways to begin a Language File are described below.

(1) Root Productions

• A Language File always begins with an initial or *root* production. The root production establishes how you can start the voice recognition process. In the airline examples the root production has been named "Customer Query". A root production can have any name.

• It is not the name of the production that identifies it as the root; it is the position in the Language File. By default, the compiler assumes the first production encountered in the Language File is the root, or beginning production.

(2) Primary Productions

• Productions can appear in any order in the Language File, aside from the convention that the root appears first.

• It may be useful to have more than one production as the starting-point for voice recognition. When a production other than the root are used to begin, it is called a *primary production.* It is indicated by an * (asterisk) at the beginning of the production statement that is to be marked as primary.

*Example:*

In this example, the grammar recognizes a valid telephone number to begin voice recognition, and it also recognizes a valid telephone credit card number.

*Note:* Again, the words that will actually be spoken are in lower-case, and the category names are in upper-case. Words that will be spoken are called *terminals* because they terminate a production. Category names are called *non-terminals* .

```
S =                  LOCAL, LONG_DISTANCE

LONG_DISTANCE = (zero, one) AREA_CODE# LOCAL ;

AREA_CODE =          NONZERO_DIGIT ( zero, one ) NONZERO_DIGIT ;

LOCAL =              NONZERO_DIGIT NONZERO_DIGIT DIGIT DIGIT
                     DIGIT DIGIT DIGIT ;

DIGIT =              zero, NONZERO_DIGIT ;

NONZERO_DIGIT = one, two, three, four, five, six, seven, eight, nine ;

/* mark the following production as primary */

*CREDIT_NO =         AREA_CODE LOCAL DIGIT DIGIT DIGIT DIGIT ;
```

In the example, telephone credit card numbers are assumed to consist of a full phone number plus four extra digits. At run-time the application can first listen for the CREDIT_NO, and then listen for the phone number S to complete the call.

• Every Language File has at least one primary production, the root production. The root production does not need to be marked with a *. There can be any number of primary productions in a Language File.

• *Note:* Adding primary productions can be useful, but it is also costly. VOCAL will take longer to compile a language file with many primary productions. It will also take longer for voice recognition at run-time (the Word List file is larger).

Output Strings

• Every word that can be voice-recognized (every terminal) has one output string. At run-time the Voice Driver looks for the output string associated with the spoken word. The output string specifies what the outcome of saying the word will be.

• If you are using the VoiceWord desk accessory for voice recognition during application run-time, an output string can cause a keyboard or mouse action to occur. If you are not using VoiceWord, the output string will result in whatever outcome you've programmed into the application.

*Example:*

For a long string of text that is typed often, like "This is another bogus idea," the output string could be associated with saying the terminal word *bogus*.

• In the Language file, output strings are enclosed in double quotes ("). Like all productions, they end in a semi-colon.

Format:

<terminal> <"output">;

*Example:* bogus "This is another bogus idea";

zero "0";
one "1";
two "2";
three "3";

Voice Recognition Redefined

Now that we've described the basic elements of a language file, we can more accurately describe the voice recognition process.

(1) At the beginning of voice recognition, the application begins with a production (usually the root production, although there can be other productions defined as the initial, or *primary* productions).

(2) The Voice Driver jumps to the first levels of words for that production, and collects a list of terminals active in that level.

(3) The driver listens for any one of the utterances named by the active terminals.

(4) When the driver receives an utterance in the active Word List, the driver looks to the list of terminals to see which level of words to go to next.

(5) The process is repeated for the new state, until a final state is reached. An output results from the final state, and the FSM's production is completed.

Designing Levels of Active Words

(1) When breaking up an application's Word List into levels of active and inactive words, try to have the levels closely parallel the way you normally function in that application.

• The idea isn't to create a tangle of arbitrary levels that trap you into clumps of active and inactive words and make it an ordeal to say what you mean and mean what you say. You shouldn't have to scratch you head and mutter "What state am I in?" (and answer, "the state of confusion!").

• To make it easy to remember what levels you're in and what words are active, structure levels logically. Words should be activated according your natural use of language in an application.

*Example:* Menu items can be put in levels according to their menu titles, such as saying "File" which would activate a level of words including the menu items "Open" and "New."

(2) Increase the number of levels to decrease the number of active words.

• A larger number of levels, or states, will decrease the number of words active at any one time, increasing the probability of accurate recognition.

(3) Keep the number of levels relatively small to avoid memory problems.

• Rule (2) must be balanced against the problem that the larger the number of states or levels, the more complex the grammar. Complexity of grammar affects VOCAL's memory requirements for compiling the Language file into a Word List. If memory requirements exceed the total available memory, VOCAL reports an error and halts.

• Complexity can be reduced by decreasing the number of levels, or by using special techniques when constructing a Language file. (For a description of these techniques, see the section Special Topics: How to Reduce Complexity of Language.)

Selecting Words for an Application

(1) Consider the pros and cons of matching Word List with words normally used in the application.

• Make your application's Word List as natural as possible. One way to achieve this is by matching the vocabulary with terms already used in the application wherever practical. For example, the Word List for menu items or dialog responses can be the same as the words seen on the screen. This way, you won't forget what word you've trained for voice-recognition -- you'll be cued by what you see on the screen.

• If you're customizing a Word List for your own use, it may be better for you to use words that you personally prefer rather than the words on the screen. You can use any utterance to match any output.

*Example:* Output = "File - Save"
Utterance = "Immortalize the stuff" or any other words you wish to use, as long as you've voice-trained the words to match the output.

(2) Try to avoid putting similar-sounding words in the same level.

• To minimize recognition errors caused by confusion between words that sound alike, try not to have similar-sounding words active in the same level. Use a synonym for one of the words if they're in the same level. If you want to keep the original words, see if you can put them in different states so they're not active at the same time.

(3) Use words that have "punch."

• The more "acoustic data" in a word (the larger the number of highly defined sounds in a word), the greater the probability of an accurate recognition of the word:

- It's better to use longer polysyllabic words than short, one-syllable words.

- It's better to use words that have strong sounds in them, like a hard g, k, s, or t, than soft sounds like m, n, p.

Note: A deeper, stronger speaking voice will give a better chance at accurate recognition (by providing more acoustic data) than a weak, thin, or mumbled speaking voice no matter what the words being said.

*Now that we've introduced some of the basic ideas of a Language File, turn to the next chapter for a more in-depth discussion of how to construct a file.*

Chapter Three

Writing a Language File

• This chapter describes how to write a Language File for compilation into a Word List by VOCAL.

• The chapter covers:

- Format of a Language File
- Examples of Language Files
- Modified BNF Grammar

• Some of these topics were touched upon in the previous chapter. This chapter consolidates the information thus far and begins to set out the formal rules of Language File design.

• For a thorough reference of the format and rules for each element of a Language File including definitions of all terms printed in Italics throughout the manual, see the Chapter Four, Language File Reference: Definitions and Rules.

Format of a Language File

Definition of Language File

• A Language file is a series of specifications used by VOCAL, the compiler. The specifications include *production statements* plus a number of optional compiler directives.

(Statements will be discussed in this chapter. For more on compiler directives, see the section, Compiler Directives).

- Statements structure the words used in an application into levels of active and inactive words. They are set out according to rules known as a *modified BNF grammar* .

- BNF rules organize an application's words into a series of *productions* . Productions are hierarchical. They start from the most general levels of words and proceed to specific voice commands in different levels.

Language File Format

The basic Language File format is defined below. The explanation of what each line is appears on the right in parentheses (in a real Language file, these would obviously not be included).

| | |
|---|---|
| /* */ | (Optional comment) |
| <Non-Terminal> = <Terminals, Non-Terminals>; | (Root Production) |
| <Non-Terminal> = <Terminals, Non-Terminals>; | (Production) |
| <Terminal> '<output string>'; | (Terminal Declaration) |

Examples of Language Files

To illustrate the format of a Language File, let's look at a file for digits and several examples of Language files for the Macintosh Finder. The examples demonstrate some of the ways terminals, non-terminals and signs are used in a Language File.

In each case the Language File is presented first, and then the format is analyzed.

The components in the files are numbered (1) through (4) for explanatory purposes only.

Digits Language File

/*(1) The file makes it possible to say the digits "zero" through "four" and then the word "enter." When the digits are spoken and recognized, they will be entered on the screen as text, i.e., as the digits 0 through 4. */

```
STATEMENT = DIGIT+ enter;                /* (2)  Root production */
```

```
DIGIT = zero, one, two, three, four;      /* (3) Production */

zero  '0';                                /* (4) Terminal declarations */
one   '1';
two   '2';
three '3';
four  '4';
enter "Return";
```

Analysis:

(1) Comment

/* The file makes it possible .....*/

• This is an optional *comment*, enclosed in /* */. Comments are not recognized by the compiler. They are put into a Language File for the convenience of the programmer, and can contain explanatory notes or reminders.

(2) Root Production

STATEMENT = DIGIT + enter;

• This is the first *statement*, or *production*. Because it is the first statement, this is where the compiler will begin. It is known as the *root production*. It names the initial level of active words that begin the application.

• STATEMENT is a non-terminal, because it appears on the left-hand side of the = sign and it names the production. Instead of the word "statement," we could have used any word since this does not correspond to any spoken word; it is merely the name of the entire group of productions in this Digits Language File.

• Notice that STATEMENT is in capital letters. This is a convention that the user can choose to follow if desired (non-terminals in capitals, terminals in lower-case). The convention is for the user's convenience in looking over the Language File. The compiler does not distinguish between upper and lower case.

• DIGIT is also in capital letters. DIGIT is a non-terminal that names the second production; that is, it stands for a category of words including "zero," "one," "two," etc.

• The plus sign (+) after DIGIT serves as a *repetition operator*. It is a way of signifying that whatever comes before it is repeated one or more times in succession. In other words, the utterances that DIGIT stands for can be repeated one or more times in a row.

• Notice 'enter.' This stands for the spoken command, 'enter'. It is a terminal. Following our convention we've used lower-case for the terminal "enter" (remember that capitals or lower-case letters are ignored by the compiler).

• The production ends with a semi-colon. All specifications in a Language file end with a semi-colon.

(3) Production Statement

DIGIT = zero, one, two, three, four;

- DIGIT appears on the left-hand side as a non-terminal naming the sequence of digits.

- The terminals on the right-hand side are words that can be spoken and recognized.

- The terminals standing for digit names are separated by commas. The comma is a sign that signifies "or" (it is called an *alternation operator*). In other words, the statement DIGIT = zero, one, two, three; means "A digit is either zero or one or two or three," etc.

(4) Terminal Declarations

```
zero  '0';
one   '1';
two   '2';
three '3';
four  '4'
enter  "Return";
```

• The fourth group of statements are *terminal declarations*. They associate the terminals "zero," "one," "two," etc. with *output strings*. The output strings are what cause an outcome (such as a simulation of a keyboard or mouse action when using VoiceWord). The outcome depends on what is programmed in the application. In this case, the outcome will be the keyboard entry of the digits "0," "1," "2," etc.

• An output string appears after a terminal name. The output string is enclosed in double quotation marks, and ends with a semi-colon.

• In a terminal declaration of this type, there is no = sign used (an = sign is only in a production where a non-terminal is on the left-hand side).

*Note:* In certain cases there can be an = sign in a terminal declaration (see the listing under "Terminal Declaration" in the following section, Definition of Terms). -

•The output string for the word "enter" is the '"Return"' key. 'Return' is in single quotes. Symbolic keystroke names are always enclosed in single quotes.

*Note:* Keystroke names are defined at the beginning of a Language File by using a compiler directive (see the section, Compiler Directives). Users of VoiceWord or VoiceINIT do not have to define keystroke names like escape, tab, etc. because there are predefined macros for them (see VoiceWord/VoiceINIT Macro Commands).

Finder Language File - Example 1

/* (1) This Language File makes it possible to use voice to select some of the items under the Apple and File menus in the Finder. */

```
Finder = APPLE_WORDS, FILE_WORDS;            /*(2) Root Production */

APPLE_WORDS = about, calculator;             /*(3) Production*/

FILE _WORDS = new, open, save_as;            /*(3) Production */

                                             /*(4) Terminal Declarations */
about       'about';
calculator  'calculator';

new         'new';
open        'open';
save_as     'save_as';
```

<u>Analysis:</u>

(1) Comment

• Notes for the user not recognized by VOCAL.

(2) Root Production

Finder = APPLE_WORDS, FILE_WORDS;

• The first line is the root production. The name of the production is arbitrarily chosen as "R." The name of a root production is always a non-terminal, appearing on the left-hand side of the production.

• APPLE_WORDS and FILE_WORDS are non-terminals. The compiler knows this because in the second statement they appear on the left-hand side of the = sign and are associated with their terminals (the word lists appropriate to the APPLE_WORDS level or the FILE_WORDS level).

• Notice the underscore between APPLE_WORDS and FILE_WORDS. The underscore is a convention to link the two parts of the non-terminal together. It serves the same function as a hyphen in English. The underscore is one of the signs that VOCAL recognizes.

(3) Productions

```
APPLE_WORDS = about, calculator;

FILE_WORDS = new, open, save_as;
```

•These productions associate Apple and File with their sets of voice commands.

• Note the underscore between save_as. Here, too, the underscore serves to associate the words together. In this case, they are a single utterance.

(4) Terminal Declarations

```
about       'about';
calculator  'calculator';
new          'new';
open         'open';
save_as     'save_as';
```

• These are terminal productions, associating each utterance with an output string.

• The output string "new" could be programmed in an application to select the "new" menu item in the file menu, or to do any other type of action desired.

•If you are using VoiceWord, you could insert a macro command for the output string; see the section, VoiceWord/VoiceINITMacro Commands.

Finder Language File - Example 2

/* (1) This is a more complete example of a Language File for the Finder. */

/*(2) Root Production*/

```
Application = Apple Apple_Words, File File_Words, Special Special_Words;
```

```
Apple_Words = About, Calculator;              /*(3) Productions*/
File_Words = New, Open, Close, Quit;
Special_Words = Restart, Shutdown;

                                              /*(4) Terminal Declarations*/

Apple       '@MENU(Apple,#0)';                /* select Apple menu */
About       '@MENU(Apple,#1);                 /* select item 1 in Apple menu */
Calculator  '@MENU(Apple,Calculator)';        /* select calculator item in
                                                 Apple menu */

File        '@MENU(File,#0)';                 /* select File menu */
New         '@MENU(File,New)';
Open        '@MENU(File,Open)';
Close       '@MENU(File,Close)';
Quit        '@MENU(File,Quit)';

Special     '@MENU(Special,#0)';              /* select Special menu */
Restart     '@MENU(Special,Restart)';
Shutdown    '@MENU(Special,Shutdown)';
Special     '@MENU(Special)';
```

<u>Analysis:</u>

- Note that in this example, it is not necessary to select a menu before selecting one of its items (i.e., you do not have to say "File" before saying "Open").

- The @ commands are specific to VoiceWord or VoiceINIT working with VOCAL. They are not supported by the VOCAL compiler by itself. (See VoiceWord/VoiceINIT MacroCommands.)

Finder Language File - Example #3

/* (1) This example shows how always-active words are used. It is an incomplete Language File, however, because we have not included any terminal declarations.*/

```
ROOT (scratch_that undo go_to_sleep wake_up reset_board) = file
file_menu, edit edit_menu;

file_menu (ok cancel drive eject) = new, open, close, quit;
edit_menu = undo, cut, copy, paste;
```

<u>Analysis:</u>

- The words in brackets are always active no matter what state or level of words you're in.

- Here is a list of useful always-active words and what they mean:

```
scratch_that      /* erase the last voice command */
undo or delete    /* undo/delete the last action */
go_to_sleep       /* deactivate the voice recognizer */
wake_up           /* reactivate the voice recognizer */
reset board       /* reset the Speech Box */
```

• For more information, see the section on Always Active Words.

Modified BNF Grammar

BNF Modifications

• VOCAL uses a kind of grammar that is a modification of BNF (BNF stands for Backus Naur Form). We've been using rules of BNF grammar in the above examples.The modifications of BNF are required by VOCAL in order to generate what is called a "regular" language and a "regular" grammar:

(1) Non-Recursion

• A regular grammar is not permitted to contain any explicit or implicit recursion. This means that no production can contain a non-terminal symbol on its right-hand side whose definition leads to an occurrence of the left-hand side.

• *Example:*

A = B;
B = A;

• Here is a somewhat more complicated example of recursion:

A = B;
B = C;
C = A;

• However, this is not recursive:

S = x A;
A = b, c;

Here "A" appears on the right-hand side of the first statement, and on the left-hand side of the second statement. However, in the second statement "A" is not defined in terms that are repeated in the first statement ("A" is not defined in terms of "S" or "x"). "A" is defined in new terms, "b" and "c". It is non-recursive.

(2) Non-Terminal Restrictions

- The left-hand side of a production cannot have more than one non-terminal.

- Each production must have a unique left-hand side. Two productions with the same left-hand side can be replaced with a single production using the comma operator (to mean OR).

- *Example:*

S = A;
S = B;

This is not valid. It can be replaced with:

S = A, B;

*Turn to the next chapter for a complete description of all the rules of construction for a Language File.*

Chapter Four

Language File Reference: Definitions and Rules

- This chapter will serve as a complete reference of the terms and rules of construction used in writing a Language File for an application. By following these rules, a valid file will be produced that can be compiled by VOCAL into a Word List. The Word List is then opened when running an application to enable voice recognition to take place.

- The topics are presented in the following order:

- Productions
  - Symbols
  - Terminals
  - Non-Terminals
  - Symbols

- Output Strings
- Signs
- Compiler Directives
- ID Numbers
- List Files
- VoiceWord/VoiceINIT Macro Commands

• You will find it helpful to cross-reference as you read the sections. For example, when reading about Productions you will find mention of terminals and symbols. You can check the sections on terminals and symbols for more detail on these subjects.

• For concise definitions of terms explained in this chapter, see the Glossary.

Productions

Definition

• A production is one of a sequence of statements in a Language File. A production always leads to the association of a voice command with an outcome. In the Language File, this is expressed by a terminal declaration which assigns an output string to a terminal .

*Examples of Productions:*

Finder = apple AppleMenu, file FileMenu;

AppleMenu = about, calculator;

FileMenu = new, open, save_as;

In this example, you can say the words apple, file, about, calculator, new, open, and save as.

Format

• A production consists of symbols and signs separated by an = sign and ending in a semi-colon (;). The symbol on the left-hand side is a non-terminal (i.e., not a symbol that stands for an utterance). The symbols on the right-hand side can include a mixture of terminals and non-terminals:

<non-terminal> = <expr>;

An <expr> can include other non-terminals and terminals, together with signs such as operators and parentheses.

(See later sections in this chapter for more information on terminals, non-terminals, and symbols.)

• A production statement can consist of any of the following:

- Alpha-numeric characters (upper and lower case)
- White space (created by space, tab, new line, formfeed)
- Signs:

| Sign | Name of Sign |
|---|---|
| - | Hyphen |
| , | Comma |
| * | Asterisk |
| # | Number Sign |
| + | Plus |
| ( ) | Parentheses |
| ! | Exclamation Point |
| = | Equal Sign |
| ; | Semi-Colon |
| " | Double Quotes |
| ' | Single Quote |
| \ | Backslash |
| _ | Underscore |

*Note:* For more detail, see the section on Signs in this chapter.

Non-Recursive Rule

• A non-terminal on the left-hand side can never be repeated on the right-hand side in the same statement. In other words, no non-terminal can ever (explicitly or implicitly) refer to itself. Statements must be *non-recursive*. A grammar with rules that exclude recursive statements is called a *regular grammar*.

*Examples of Recursion*

A = AB or

A = B
B = A C

• A non-terminal appearing on the left-hand side of a statement can appear on the right-hand side of a different statement in the same Language file under this condition: a non-terminal has to be defined in terms other than those in the previous statement.

*Examples of Non-Recursion*

A = B
B = x y

• The order in which symbols appear in a Language file is not important, as long as the compiler can find a reordering that follows a regular (non-recursive) grammar.

• The compiler generates an error if a grammar is recursive.

Order of Productions

• Productions can appear in any order in the Language file.

• By default, the first production in a Language File is taken to be the root production (see Root Production below). Other productions can also serve as the initial or primary production (see Primary Production below).

Types of Productions

(1) Production Definition

• A production definition consists of a non-terminal symbol on the left-hand side, an equal sign, and a combination of terminals and/or non-terminals and signs on the right-hand side, ending with a semi-colon.

Format:

NON-TERMINAL = <any sequence of terminals and/or non-terminals and other signs>;

*Example:*

FILE = open, new;

(2) Primary Production

Definition

• A primary production is a production that begins a sequence of states leading to a terminal and an output. A primary production is available when first beginning voice recognition in an application.

• There may be more than one primary production in a language file. This would give the user the option of more than one level of active words that can be used to open the application.

Format:

An asterisk (*) before the name of a non-terminal marks the production as primary.

*Example:*

*APPLE = open, close, save_as;

This marks APPLE as the primary production. Open, close, save_as become the active Word List to begin voice recognition in this application.

• Sub-productions of primary productions can also be marked primary.

• *Note:*

Adding primary productions can be useful to make different sets of words be the initially active sets. However, a Language File with additional primary productions results in longer compilation time. It also takes longer for voice recognition during run-time of the application.

(3) Root Production

Definition

• A root production is the production that is recognized as primary by default. It is the starting-point for the Language file. However, by marking other productions as primary, there can be more than one starting-point for the application's Language file.

Format:

The root production does not need a special format. The first production in the Language file is taken as the root production by the compiler, However, if a production anywhere in the Language file is marked by the "#root" directive then it will be taken as the root. (See the section on Compiler Directives.) There can only be one production marked with the "#root" directive in a file.

*Example Using the Root Directive Sign:*

#root MacDraft;

(4) Terminal Declaration

Definition

- A terminal declaration associates an output string with a terminal.
- A terminal declaration can appear by itself, OR as part of a production statement. In either case, it completes a production.

*Examples:*

```
new  = 'new';
open = 'open';
```

- In these examples, VoiceWord Macro Commands are being used as the terminal output string:

```
new  = '@ MENU (File,#1)';
open = '@MENU(File,#2)';
```

- See the section on Terminals for more detail.

Symbols

Definition

- A symbol is a (non-empty) string of less than 40 characters in a Language File. (Symbols longer than 39 characters are shortened to 39 characters by the compiler, and a warning message is issued).

Types of Symbols

- There are two types of symbols: *terminals* and *non-terminals*. In brief, a terminal represents an utterance. A non-terminal can serve a number of functions, such as naming a state that activates a group of words (see the sections on Terminals and Non-Terminals for more detail.)

Characters in a Symbol

- Characters allowed in a symbol include:

- Upper and lower-case letters
  - Digits

- Signs (explained more fully in section on Signs) :

- , * # + () [] ! = ; " ' \ _

• *Note:* Within comments (which are enclosed in /* */), output strings, or #define directives, any character is allowed.

• Some signs require special treatment. See the sections in this chapter for more detail on Comments, Output Strings, Compiler Directives, Signs.

• Characters can appear in any order, with one exception: a symbol cannot begin with a digit.

Examples of Symbols (1) APPLE
(2) FILE
(3) open
(4) Open
(5) save_as
(6) DIGIT
(7) zero
(8) one

Signs Within a Symbol

• A symbol can include several types of signs such as the underscore (_) in save_as, and the semi-colon (;). See the section on Signs below for a complete list of signs and their meanings.

Upper and Lower Case

• Upper-case and/or lower-case letters can be used for symbols.

• Upper and lower case can not be distinguished by the language compiler (VOCAL) or the run-time system. In other words, the programs will not recognize any difference between "FILE," "file," and FiLe". Upper and lower case therefore should not be used as the only device to convey information to VOCAL (such as which symbols are terminals and which are non-terminals).

• In practice, it is convenient to use upper and lower case in writing Language files so the user can look at a file and see at a glance which symbols are *terminals* (printed in lower case), and which are *NON-TERMINALS* (printed in upper case). This use of upper and lower case is a <u>convention</u>, not a requirement. (See the sections on Terminals and Non-Terminals.)

Function of the Underscore

• When used between words, the underscore shows that the words are spoken as a single utterance. VOCAL interprets words separated by an underscore as a single symbol, not two separate symbols.

*Examples:* save_as, select_all, close_all_files.

• *Note*: This use of underscore to link words as a single utterance is a convention, not a necessity. You could signify that two words are part of one utterance by using capitals, such as saveAs. The compiler does not recognize capitals, of course. The use of capitals or the underscore is more for the user's convenience in recognizing the phrase. The compiler would interpret these versions similarly, as one utterance (one terminal):

saveAs, saveas.

• However, VOCAL would differentiate these as different terminals:
save_as
saveAs.

Why? The underscore is recognized by VOCAL as a character, which gives save_as a different character content than saveAs.

Terminals

Definition

• A terminal represents a voice command. The command, or utterance, can lead to an output (such as a mouse or keyboard action).

a) A terminal is the final or "terminal" step in a sequence of statements in the Language File b) A terminal is the end-point of a *finite state machine* (see more in the section a finite state machine).

c) A terminal completes a *production* (for definition of a production, see the section on Productions).

d) VOCAL assumes that any symbol not naming a production (not appearing in the Language file on the left-hand side of the = sign) is a terminal.

• A terminal stands for a word that is spoken and recognized by the Navigator.

*Example:*

File
Open

• The sequence of voice commands using the words "file" and open" that lead to an output can be represented as follows:

Say the Word "File"
|
Activates a Level of Words Including "Open"
|
Say the Word "Open
|
Output (for example, the file opens)

In this case, "file" is a non-terminal: it doesn't result directly in an output, but activates a set of words including "open." When "open" is spoken, an output is the result; therefore "open" is a terminal.

Format

• A terminal is a type of *symbol* (both terminals and non-terminals are symbols).

• A terminal consists of a non-empty string of less than 40 characters. The characters can include:

- Upper and lower-case letters
- Digits

• Terminals may appear in conjunction with Signs (explained more fully in the section on Signs). Signs can include:

- , * # + ( ) [ ] ! = ; " ' \ _

Relation Between A Terminal and An Output String

• Each terminal is associated with one *output string* in the Language file. The output string causes an event to take place (a mouse or keyboard action).

Say the Terminal Symbol "Open"
|

Voice Driver Recognizes "Open"
|
Output String for Open (e.g. "Open" item selected in File menu)

• The association of an output string with a terminal symbol is called a *terminal symbol declaration*.

*Examples of Terminal Symbol Declarations*

```
/* This is an output string for the terminal "open" */

open '@MENU(File,#2)';

/* This is an output string for the terminal "four" */

four '4';
```

(For more detail, see the section on Output Strings.)

Terminal Symbol Declarations of Two Types

• A terminal symbol declaration can either stand alone, or be part of a production statement:

*Example: Terminal Declaration that Stands Alone (not part of a production statement):*

```
open 'open';
```

Format:

```
Terminal '<output string>';
```

Terminal symbol plus output string enclosed in double quotes, ending with a semi-colon.

*Example: Terminal Declaration as Part of a Production Statement* (statement with a left and right-hand side separated by an equal sign):

```
MoveUp '@MOVE(-16,0)' = up;
```

Format:

Non-Terminal <'output string'> = terminal;

/* Non-terminal plus output string in double quotes plus = sign plus non-terminal symbol, ending with a semi-colon */

- Why include a terminal declaration in a production statement?

This kind of format would be useful in a Language file where you want to be able to say the same word (in this case "up") in two different states and come out with two different outputs.

*Examples:*

The first output is moving the cursor up.
The productions and terminal declaration would be:

DIRECTION = MoveUp, MoveDown;

MoveUp '@MOVE(-16,0)' = up;

The second output is scrolling up. The productions and terminal declaration would be:

SCROLL = ScrollUp, ScrollDown;

ScrollUp '@SCUP' = up;

The word "up" could be used as an utterance in both cases.
The first output would result after the word "move" was said previously.
The second output would result after the word "scroll" was said previously.

*Examples:*

The first output is moving the cursor up.
The productions and terminal declaration would be:

DIRECTION = MoveUp, MoveDown;

MoveUp '@MOVE(-16,0)' = up;

The second output is scrolling up. The productions and terminal declaration would be:

SCROLL = ScrollUp, ScrollDown;

ScrollUp '@SCUP' = up;

The word "up" could be used as an utterance in both cases. The first output would result after the word "move" was said previously. The second output would result after the word "scroll" was said previously.

To Make Terminal Initially Inactive: Use Exclamation Point

- The exclamation point (!) before a terminal declaration makes the terminal initially inactive at run-time. If the ! is omitted, the symbol is initially active.

- Using the ! makes the terminal inactive until reactivated by the appropriate run-time function. Until this time, the Voice Driver ignores the inactive terminal in all productions in which it appears.

- The inactive ! is useful if the identity and number of terminals in a certain application is not known at compile time. (See the section on Signs below for more detail.)

To Include Always Active Terminals: Use Brackets

- Brackets can be used around terminals to make them always active. This means that the word symbolized by the terminal is available for voice recognition in every level.

Format:

<Non-Terminal> < (terminal terminal terminal)> = <expr>

*Note:* There is no comma between terminals enclosed in brackets, only white space. The brackets must appear on the left-hand side.

- Advantages of using brackets:

Having a terminal always active is useful for words such as "scratch that" or "delete" or "cancel," which enable you to undo the previous voice command and/or the previous state transition. Other always-active words can be used to cue the listening/non-listening function of the recognizer, by using terms such as "wake up" and "go to sleep."

• If a primary production has both an output string and an always-active list, the always-active list must come before the output string.

*Example:*

```
S (delete scratch_that) 'Thank you for your request' = PREAMBLE
                                                       REQUEST
```

In this example, "delete" would erase the last utterance recognized, and "scratch that" would restart at the root production.

• Always-active terminals can only be put into primary productions. If an always-active list is put into a non-primary production, the list will be ignored.

• Any symbols appearing in always-active lists are assumed to be terminals even if not explicitly declared.

*Example:*

```
S (delete scratch_that) 'Thank you for your request' = REQUEST;
```

Non-Terminals

Definition

• A non-terminal is any symbol in a Language File that is not a terminal. In other words, a non-terminal does not name a word that can be spoken for voice recognition.

• A non-terminal names a level or category under which terminals standing for spoken commands can be grouped.

• There can only be one non-terminal on the left-hand side of a production statement. A non-terminal cannot appear on both the left and right-hand side of the same production statement (*non-recursion rule*). However, in another production statement a non-terminal symbol may also appear on the right-hand side as a terminal.

Examples

*Example #1:*

```
S = apple AppleMenu, file FileMenu;
AppleMenu = about, calculator;
FileMenu = new, open, save_as;
```

Analysis:

a) "S" is a way of beginning the Language file (it is the root production). It shows that the first two states for voice recognition are APPLE and FILE. Instead of "S" we could have used the word FINDER since the production begins the Finder Language File.

b) APPLE and FILE activate states that make it possible to voice-recognize the utterances "about, calculator, new, open," etc. They are non-terminals because they name the states in which other utterances become active.

*Example #2:*

```
S = DIGIT + enter;
DIGIT = one, two, three, four;
```

Analysis:

In this example, non-terminals are: S, DIGIT. S names the root production. DIGIT names the production in which the utterances (terminals) one, two, three, four appear.

Output Strings

Definition

• An output string is used to produce an outcome such as a mouse or keyboard action after voice recognition of the terminal's utterance.

• Each terminal has a single output string. In the following examples, a the output associated with the string is just an example of what could occur. The program will determine what event takes place as a result of an output string.

*Examples:*

```
zero '0';
        /* Example of outcome: the number "0" is printed */

manage 'manage';
        /* Example of outcome: the text "manage" would be printed */

open '@MENU(File,#2)';
```

/* Example of outcome: the second item in the file menu, "Open," would be selected as a result of this macro. Macros of this form (@MENU) are used with VoiceWord. For more on the @ sign and VoiceWord macro commands, see the sections on Signs and VoiceWord Macro Commands). */

Format of Output String

• An output string is a sequence of printable ASCII characters. There are no limits on allowable characters, but some signs require special treatment (see Use of Backslash in the section on Signs).

• The characters can include an @ ("at") sign followed by a macro command. The @ sign allows mouse and keyboard actions to be simulated, such as clicks and scrolling. (For a full list of mouse and keyboard commands, see the section VoiceWord/VoiceINIT Macro Commands).

• An output string can be longer than one line, and can consist of up to 127 characters in length. A string longer than 127 characters is shortened, and the compiler issues a warning message.

• An output string is always enclosed in double quotes, and ends in a semi-colon (;).

Predefined Keystroke Names

• Keystroke names included in an output string must be enclosed in single quotes.

*Example:*

```
escape "'ESC'";
```

In this case, ESC is a symbolic keystroke name enclosed in single quotes.

• Keystroke names that are predefined and can be included in an output string:

Esc, enter, tab, space, backspace, asterisk, plus, minus.

• Keystroke names can be defined at the beginning of a language file by using the #define directive (see section on Compiler Directives.) Any character is allowable in a keystroke name.

Use of Backslash to Include Certain Signs in Output Strings

• To include single quotes, double quotes, or the @ sign as part of the output string itself with a meaning other than its specialized meaning noted above, use a backslash (\) preceding the sign. A backslash can itself be included in the output string in this way.

*Examples:*

To get the output:

at@double'single'back\

The output string would be:

'at\@double\'single\'back\\'

Technical Note

- Output strings are converted to integer strings by the compiler. The ASCII value of each character is placed in the low-order byte of each integer.

Signs

*Note:* Signs used in Language files are non-alphanumeric characters. They are defined below in alphabetical order. There are several exceptions -- all Operators (asterisk, number sign, plus, comma, and white space) are listed together under "Operators" (and their subhead, Repetition Operators).

| SIGN | NAME | MEANING |
| --- | --- | --- |
| * | Asterisk | • When written just before the name of a production (a non-terminal on the left-hand side of the = sign), the * sign marks a primary production.<br><br>*Example:*<br><br>*File = new, open;<br><br>• When appearing after a symbol, the * is a repetition operator signifying repetition zero or more times in succession (See "Operators" below.)<br><br>*Example:*<br><br>GO (mUp, mDown)*<br>/* Go mouse-up or mouse-down a number of times */ |
| @ | **"at" sign** | • The @ sign is used before VoiceWord/ VoiceINIT macro commands in output strings. It allows the simulation of mouse events such as menu commands, clicks and scrolling. |

(For a full list of @ sign macros, see the section VoiceWord/VoiceINIT Macro Commands.)

[ ] Brackets

• Brackets ..ark terminal symbols as always active for the entire production, no matter what state is active.

• Useful terminals to have always active are:

```
scratch_that      /* erase the last voice command */
undo or delete    /* undo/delete the last action */
go_to_sleep       /* deactivate the voice recognizer */
wake_up           /* reactivate the voice recognizer */
reset board       /* reset the Speech Box */
```

• Brackets can only be used in primary productions. Symbols inside the brackets should be separated by white space.

*Example:*

```
S (delete scratch_that) = apple_menu (about),
file_menu (quit);
```

**/* */ Comments**

• A comment is any type of explanatory note or group of symbols included in a language file that will not be recognized by the compiler. They are useful when printing out a Language File to explain a notation to the user.

•• Comments are inserted by enclosing the comment inside /* */.

• Comments may appear anywhere in the Language File except inside identifiers, output strings and #define strings.

•Comments may be nested.

*Example:*

```
'@MOVEL(y,x)';
```

/* Move the mouse to the front window's (y,x) coordinates */

Number Sign

• The # sign used at the beginning of a Language file indicates a compiler directive.

*Examples:*

#keystroke <name><n>

This declares a keystroke to have a certain numeric value, as:

#keystroke ESC 0x1b (See the section Compiler Directives for a full list of types of compiler directives.)

• The number sign used directly after a symbol is an operator. (See Operators in this list of Signs.)

" " Double Quotes

• Double quotes are used to enclose an output string.

*Examples* new 'newFile';
new '@MENU(File,#1)';

! Exclamation Point

• The exclamation point is used to make a terminal initially inactive.

• The sign is useful if the identity and number of terminals in a certain application are not known at compile time.

*Example:*

| | |
|---|---|
| S = | PREAMBLE REQUEST ITINERARY DATE; |
| PREAMBLE = | I need,<br>I want,<br>Please give me ; |
| REQUEST = | information on your flights,<br>your schedule on flights, |

a ticket ,
a reservation ;

ITINERARY = from CITY_NAME to CITY_NAME (via

DATE = next DAY_NAME,
in MONTH_NAME,
on WEEK DAY_NAME in MONTH _NAME;

WEEK = the first, the second, the third, the fourth ;

CITY_NAME = city-a, city-b, city-c, city-d, city-e ;

DAY_NAME = sunday, monday, tuesday, wednesday, thursday, friday, saturday ;

MONTH_NAME = january, february, march, april, may, june, july, august, september, october, november, ! city-a 'This is the first city' ;
! city-b 'This is the second city' ;
! city-c
! city-d
! city-e

• In the previous example, the terminals in CITY_NAME have been made anonymous, and deactivated. Before any complete statement can be recognized, at least one of the terminals will have to be activates from the application program; otherwise there will be no active terminals once the word from has been recognized.

Operators

Comma

• The comma is an *alternation operator*. It is a binary, commutative, left-associative operator. The comma indicates that either symbol can be in effect. In other words, the comma stands for OR:

*Example:* APPLE = about, calculator;

(Either "about" OR "calculator" can be uttered.)

White Space

• White space between symbols serves as a *concatenation operator*. It is a binary, left-associative operator.

• White Space indicates that one symbol must be followed by the next. In other words, white space stands for AND.

*Example:* S = Digit Digit (Statement = digit AND digit, such as 34).

*Note:* White space can be generated in any manner from the keyboard: by the tab key, the space bar, the return key or formfeed.

Repetition Operators

* Asterisk

• When placed after a symbol, the * signifies repetition:
Zero or more times in succession.

Format: <expr>*

\# Number Sign

• When placed after a symbol, the # sign signifies repetition:

Zero or one time.

Format: <expr>#

*Note:* a) # can also be used within the the parentheses of an output string after the name of a menu, to indicate a menu item.

*Example:* '@MENU (File, #5)';

b) See use of # before a symbol, indicating a compiler directive (below).

\+ Plus

• When placed after a symbol, the + signifies repetition:

One or more times in succession.

Format: <expr>+

*Note on Operator Hierarchy*

• The operator hierarchy from highest to lowest is:

| | |
|---|---|
| Repetition | (*, #, +) |
| Concatenation | (white space) |
| Alternation | (,). |

• Operators with the same precedence (as the three repetition operators) are evaluated left to right.

( ) Parentheses

• Symbols surrounded by parentheses are grouped together.

*Example:* open "@MENU(File,#2)"

• Parentheses can be used to eliminate redundancies, which can save memory.

*Example:*

(A, B, C, D)*

The operator * applies to A, B, C and D This is a way of eliminating redundant repetition operators, as in (A#, B#, C#, D#)*

• Any expression can be surrounded by parentheses to force a particular order of evaluation. This is important because spaces and commas mean special things in a language file (a space means AND and a comma means OR). For clarity, use parentheses to group an expression together.

*Example:* overtime pay, income means (overtime pay) OR income and not overtime AND (pay OR income).

• Generally speaking, parenthesize anything you think needs to be explicitly connected to avoid confusion.

; Semi-colon • A semi-colon always ends a production or terminal declaration.

*Example:*

```
File = new, open;
```

' ' Single Quotes • Single quotes enclose the symbol for a keystroke name when included in an output string.

*Examples:*

```
escape"ESC";
```

Compiler Directives

What is a Compiler Directive?

- Compiler directives tell VOCAL to accomplish certain tasks.
- Directives are optional.
- Directives are the first specifications in a Language file.

Format of a Compiler Directive

```
#<expr>;
```

Compiler directives begin with a number sign (#) and end with a semicolon.

Examples of Compiler Directives

In the examples below, the items enclosed in braces { } are optional.

include <filename> ;

- Includes <filename> in the compilation at the point of the include statement.

- #include statements can be nested to a level four deep.

c {<filename>} ;

- Creates a C-language symbol definition file named <filename>.

- If <filename> is omitted then the name of the Language file is appended with .H.

- The file contains definitions for all symbols in the language of the form:
  #define <symbol> <id>
  where <name> is the name of a symbol, and id is the ID number assigned to the symbol by the compiler.

- *Note:* Symbols defined by the #define directive must be distinct from any symbols in the language.

basic { <filename> } { <baseline> { , <index> } } ;

- Creates a BASIC language symbol definition file. The file contains basic definitions for all symbols in the language, in the form:
  <line> <name>=<id>
  where <name> is the name of a symbol as described above and <line> is a BASIC line number.

- Numbering starts at <baseline> and increments by <index>. The default values for <baseline> and <index> are 100 and 10 respectively.

root <symbol> ;

- Declares production <symbol> to be the root production in the language. The default root is the first production defined in the source file.

- The #root directive must precede the first production definition in the Language file, or the directive is ignored.

keystroke <symbol> <n> ;

- Declares a keystroke to have the numeric value <n>. Names for commonly declared values, such as ASCII <esc> or <return>, can be defined in a header file and included in the Language file via the #include directive.

- The symbol may be any legal symbol name: a string of less than forty characters (alphanumeric plus '-' and '_') not beginning with a digit.

- Symbolic keystroke names can be the same as symbols, as the compiler has separate name specs for keystrokes and symbol identifiers. Keystroke names so defined may be included in the <output> declaration portion of production definitions.

- The numeric value of <n> is any sixteen-bit unsigned value (0<n<65535). These may be specified in decimal (the default), octal (precede the number with 0, as in 0123) or hexadecimal (precede the number with 0x, as in 0x123). Both upper and lower case may be used in hexadecimal numbers.

*Example:* keystroke esc 0x1b;

This defines the symbol esc to have the hexadecimal value of 1b (decimal 27).

- A symbolic keystroke name can be included in output strings by enclosing the name in single quotes (').

*Example:*

```
#keystroke esc 0x1b;
up_line  "esc'U';
```

- Note on Predefined Keystrokes:

The example above using 'esc' is actually redundant, as 'esc' has been predefined so that VOCAL already recognizes the symbolic keystroke 'esc'. Other keystrokes in this category are: enter, tab, plus, minus, asterisk, backspace, space.

If a predefined keystroke is redefined, the compiler issues a warning and replaces the old value with the new one.

listing <filename> ;

- Creates a List file to the file <filename>.

- The default compiler action is not to create a listing.

- The default filename is the source filename appended with .LIST. (See the section List File for more detail.)

define <symbol> <string> ;

- Defines an external symbol. Symbols so defined are not part of the language. They can be used to pass any application-specific information to an application program.

- The argument <symbol> may be any valid symbol name, and <string> can be any ASCII string enclosed in double quotes of length less than 16K characters.

- The backslash (\) is the escape character for a double quote that is to appear on the string as well as the backslash itself.

- The string may span multiple lines; a line break in the string is converted to a newline character.

- An external symbol name may not coincide with a language symbol name.

terminal
nonterminal
primary

- Any or all of these three directives may be used in conjunction with the #c or #basic directives to include only symbols of a certain type in the symbol definition file.

- These directives may appear either before or after the #c or #basic directives.

- The directives are ignored if no List file is produced (either through the directives or at compile time).

- If none of the three symbols appear, then all symbols are included in the symbol definitions file. If one or more directives appear, then only the symbols of the types named by the directives will be included.

ID Numbers

Definition

• An ID number is a unique integer assigned by VOCAL to every symbol (terminals and non-terminals) in a Language file.

• An ID number is also assigned to every model of an utterance. The ID number of a model matches the ID number of its terminal symbol in the Language file.

Order of ID Numbers

• Terminals are numbered first, beginning at 1, followed by non-terminals and primaries. The numbers are displayed in the List file which can be generated as a VOCAL option (see section on List File, below).

• The algorithm used by VOCAL to assign ID numbers is described here:

A. Terminal ID Numbers

1) VOCAL scans productions and terminal symbol definitions in the Language file from the beginning of the file to the end. Each production is scanned left to right.

2) Every time VOCAL scans a terminal symbol that has not yet been assigned an ID number, the next available number is assigned to it.

3) Every time the name of a production appears, VOCAL jumps to the beginning of the defining expression for the production and scans it from left to right. The process proceeds recursively as additional production names are scanned. VOCAL then returns to the point immediately after the original symbol's appearance at the top level.

B. Non-Terminal and Primary ID Numbers

1) After terminal ID's are assigned, non-terminals and primaries are assigned ID numbers beginning with a number one greater than the last assigned terminal ID.

2) Non-terminals and primaries are assigned in the order that the symbols appear on the left-hand sides of productions.

Changing Order of ID Numbers

- Normally ID numbers are assigned automatically by VOCAL. However, you can have some effect on the order. You may want to specify a particular ID order for two reasons:

- To preserve the ID's already assigned to a language which you are editing.

- To set up a particular order of symbols in the lists generated by certain Voice Driver functions. The lists order symbols by ascending ID number.

- To force a particular ID order, place all terminal definitions at the beginning of the Language file in the desired order. Since the compiler reads through the Language file from top to bottom, the terminals will be read first and assigned with ID's beginning at 1.

- When placing terminal definitions at the beginning of the Language file, output strings or exclamation marks need not be included. The form can simply be:

<terminal>;

List Files

What Is a List File?

A List file describes in detail the states and other statistics for a Language file.

How Is a List File Generated?

There are two ways of generating a List file:

(1) Select VOCAL's option "Listing file"

(2) Include List file as a compiler directive in the Language file, using the #listing directive at the beginning of the file.

*Example:*

#listing;

What Is In a List File?

A. Summary Information (1) Total number of terminals, primaries, non-terminals, and states (2) The name of the root production (3) A list of any terminals declared initially inactive (4) Estimated memory size (an estimate of the heap size required by the run-time system for this language)

(5) Talkahead queue size (in seconds and bytes/second)

(6) Average token size (in seconds and bytes/second)

(7) Model types and their memory size (adaptable and unadaptable).

*Example:*

| Terminal Symbols | Primary Symbols | Nonterminal Symbols | Total States | Root Production |
|---|---|---|---|---|
| 108 | 1 | 26 | 37 | _MedicalRecords |

Estimated Memory Size Assumptions:

| | |
|---|---|
| Talkahead queue size: | 5 seconds (800 bytes/sec) |
| Average token size: | 1 second (400 bytes/sec) |
| Resident tokens: | 5 |

| Model Type | Memory Size |
|---|---|
| Adaptable (336 bytes/model) | 66316 bytes |
| Unadaptable (265 bytes/model) | 58648 bytes |

B. Symbol Information (1) ID number of each symbol (2) Type of symbol (terminal, non-terminal, primary)

(3) Whether the symbols are active (Y or N)

(4) Whether there is an output for each symbol (Y or N)

*Example:*

| ID# | TYPE | ACTIVE | OUTPUT | NAME |
|---|---|---|---|---|
| 1 | Term | Y | Y | apple |
| 2 | Term | Y | Y | about_medical_records |
| 3 | Term | Y | Y | _medical_records_help |
| | *etc. until* | | | |
| 109 | Ntrm | | N | _FILE |
| 110 | Ntrm | | N | _EDIT |

C. List of Finite State Machines for Each Primary Production (1) Always active symbols (2) The set of active terminals in each state of the primary (3) The state transition for each active terminal (4) List of productions completed by each state (5) For any state completing the current primary production, an indication of whether the ending is *ambiguous*, i.e., whether there are any state transitions out of the final state of the primary. (See the section, Ambiguous Grammar for more detail.)

*Example:*

Primary production_Medical_Records
Always Active Symbols:
scratch_that
go_to_sleep
wake_up
reset_board >>>>>>>>>>>>>state_Medical_Records [1]

| GO TO STATE | ON TERMINAL | Completed Productions |
|---|---|---|
| 2 | apple | |
| 3 | file | |
| 4 | edit | |

VoiceWord/VoiceINIT Macro Commands

Macro Commands

• Macro Commands have been precompiled for mouse and keyboard actions when using voice recognition with the VoiceWord desk accessory or VoiceINIT.

• Commands include:

- Hold down the mouse
- Move the mouse
- Mouse Clicks
- Continuous scroll, Page scroll
- Change Windows
- Menu selection
- Zoom
- Hold down keys (option, shift, command, control)
- Numeric Key Down

• The commands are presented in the following format:

An explanation of each command is enclosed by the comment convention /* */. Beneath it is the output string, which consists of an 'at' sign (@) followed by a macro command, enclosed within double quotes and ending with a semi-colon.

Any special considerations regarding the command are flagged by a *Note* below the output string.

Hold Down the Mouse

/* Hold the mouse button down */

'@MSDN';

/**Note:* The mouse stays down until "ESC" or '@MSUP' */

/* Let the mouse button up */

'@MSUP';

Move the Mouse

/* Move the mouse to current location (± Δy, ±Δx) coordinates */

'@MOVE(Δy, Δx)':

/* Continuously move the mouse to current location (±Δy, ±Δx) */

'@MOVI(Δy, Δx)';

/*Note: Move is halted by any new command or event */

/* Move the mouse to the front front window's (y,x) coordinates */

'@MOVL(y,x)';

/* Move the mouse to screen's (y,x) coordinates */

'@MOVG(y,x)';

Mouse Clicks

The click command allows simulation of mouse clicks on the screen. This option is very useful in applications like HyperCard to click on buttons that are in fixed places on the screen.

/* Click the mouse in front window's (y,x) coordinates */

'@LMSE(local y, local x)';

/* Click the mouse in screen's (y,x) coordinates *

'@GMSE(global y, global x)';

/* Double-click the mouse in screen's (y,x) coordinates */

'@DCLK(global y, global x)';

/*Note: (0,0) double-clicks at current mouse */

/* Click the mouse in controlname's rectangle */

'@CTRL(cntrlname)';

Continuous Scroll and Page Scroll

The SCxx and PGxx commands locate the first horizontal or vertical scroll bar in the front window, and scroll or page it accordingly.

*Note:* Scroll down, up, left, and right commands continue until halted by "@MSUP" (mouse up command).

```
/* Move the scroll bar down */

        '@SCDN';

/* Move the scroll bar up */

        '@SCUP';

/* Move the scroll bar left */

        @SCLF';

/* Move the scroll bar right */

        '@SCRT';

/* Move scroll bar down a windowful */

        '@PGDN';

/* Move scroll bar up a windowful */

        '@PGUP';

/* Move scroll bar left a windowful */

        '@PGLF';

/* Move scroll bar right a windowful */

        '@PGRT';
```

Change Windows

/* Select the next window, if it exists */

'@NEXT';

Menu Selection

/* Select menu and item */

'@MENU(menuname,{itemname or '#'itemnum})';

/* *Example:* file '@MENU(File,#1)
This selects the first item in the file menu */

*Note:* (menuname,#0) pulls down menuname */

Zoom

/* Click in zoom box of front window */

'@ZOOM';

Hold Down Keys

These commands place the option, shift, command or control keys in a down or up position as appropriate:

/* Put the option key down */

'@OPDN';

/* Let the option key up */

'@OPUP';

/* Put the shift key down */

'@SHDN';

/* Let the shift key up */

'@SHUP';

/* Put the command key down */

'@CMDN';

/* Let the command key up */

'@CMUP';

/* Put the control key down */

'@CTDN';

/* Let the control key up */

'@CTUP';

Numeric Key Down

/* Put key down from numeric keypad */

'@KYPD(0-9)';

Chapter Five

How to Use VOCAL

This chapter covers:

- What is VOCAL?
- How to Compile a Language File

What is VOCAL?

• VOCAL is the compiler program. It accepts as input a text file (the Language File) designed for a specific application. VOCAL converts the Languge File into a binary form, called the Word List. The Word List is then used by the Voice Driver for voice recognition while running the application.

• VOCAL works with languages that have been structured into levels of active and inactive words. The result is more accurate voice recognition, plus quicker response time (there are fewer models in active memory to match an utterance against).

How to Compile a Language File (1) *Start the application by double-clicking the VOCAL icon.*

(2) A blank screen appears with a menu bar at the top. The menu items available are:

| FILE | EDIT | OPTIONS |
|---|---|---|
| Open | Undo | Produce a listing file |
| Compile | Cut | Make all non-terminals primary |
| Close | Copy | Force terminals to be declared |
| Quit | Paste | C header file |
| | | BASIC header file |
| | | Change number of active terminals |
| | | Change output filename |

(3) *Select the Options menu first, to choose preferences.* a) Produce a listing file

The List file includes information such as run-time statistics and descriptions of the finite state machines that were built.

See the section List File for more detail.

b) Make all non-terminals primary

Select this option if you wish to make all non-terminals potential starting-points for voice recognition.

c) Force terminals to be declared

• Ordinarily any symbol not explicitly declared as a terminal or non-terminal defaults (silently) to a terminal.

• If the "Force terminals to be declared" option is selected, the compiler generates a warning for each undeclared symbol. It will still assume that such symbols are terminals unless the user declares that the symbols are non-terminals.

d) C header file

The name of the C header file is the source name appended with <.H>.

e) BASIC header file

The name of the BASIC header file is the source name appended with <.BAS>.

f) Change number of active terminals

VOCAL issues a warning message if the number of active terminals in any state exceeds a given value. The default value is 200 in the Voice Navigator system 200, and 1000 in the system 1000.

g) Change output filename

The default output file is the source file appended with <.LDF>.

(4) *Go to the File menu and select "Open."*

You will be asked for the source file (Language file) to be compiled.

*Select the Language file.*

(5) *Select "Compile" from the File menu to compile your Language file into a Word List.*

Chapter Six

Special Topics

This chapter covers two special topics regarding Language Files:

- How to Reduce Complexity of a Language
- Ambiguous Grammars

How to Reduce Complexity of Language File

You may want to make a language less complex because of memory constraints. There are several ways to do this:

(1) Reduce the number of states

Remember there's a balance between reducing the number of states and increasing the number of active words in any one state (which increases the chance of a voice recognition error due to confusion between words in a state).

(2) Make some words always active

Use brackets [ ] to specify always-active words (words that are active in all states) so that they don't have to be put into every state named in the Language file.

(For more detail, see section on Terminals - Use of Brackets).

(3) Use repetition operators

Use repetition operators where possible, instead of using the same sign a number of times.

*Example:*

(A#,B#,C#,D#)

can be switched to (A,B,C,D)*

Ambiguous Grammar

What is an "Ambiguous Grammar"?

• An ambiguous grammar ends with a final state in which there are active terminals.

• It is preferable to design Language Files that avoid ambiguities. This can be done by making sure there is a terminal that ends the state.

Example of Ambiguous Grammar

Take the simple digit string:

```
S = DIGIT +;
DIGIT = zero, one, two, three, four;
```

The compiler builds an FSM for the production with two states, State 1 and State 2 , as shown in the transition list for the List File compiled by VOCAL:

>>>>>>>>>>>>>>>>state_S [1]

| GO TO STATE | ON TERMINAL |
|---|---|
| 2 | zero |
| 2 | one |
| 2 | two |
| 2 | three |
| 2 | four |

In other words, any digit from zero to four causes a transition from state S[1] to state S[2]. Utterering any succeeding digit maintains state S[2]. It is possible to keep uttering digits in this state. This is clearly allowed by the grammar, which says that S is a sequence of an undetermined number of digits.

How to Correct an Ambiguous Grammar

• To remove ambiguity in the previous example, we can use a new terminal: *enter*. Enter will be spoken when the digit string is complete.

• The Language File would now look like this:

S = DIGIT+ enter;

DIGIT = zero, one, two, three, four;

• The FSM built for this Language File has an additional state, S[3], which is an unambiguous final state.

>>>>>>>>>>>>>>>>state_S [1]

| GO TO STATE | ON TERMINAL |
|---|---|
| 2 | zero |
| 2 | one |
| 2 | two |
| 2 | three |
| 2 | four |
| 3 | enter |

On uttering the word "enter." there would be a transition from S[2] to S[3] There are no active terminals in S[3]. It is an unambiguous final state.

• The List File warns of such ambiguous final states.

Chapter Seven

~~Appendix A~~

Vocal Compiler Error Messages

Introduction

• Errors detected while VOCAL is running are sent to the standard output device. If errors are detected during the parsing phase, the compiler does not generate a Word List file.

• Nonfatal errors during parsing are preceded by "WARNING." They do not prevent the compiler from producing a Language file.

• Remember that one syntax error can lead to many others, so that fixing the first reported error may fix the ones that follow.

• Many of the messages have line numbers. These are the lines where the error is first detected. The lines may appear later in the Language file than where the error actually occurs.

Error Messages

";" expected

Every statement must end with a semi-colon.
This is true for compiler directives as well.

Argument missing for option /<x>

In the VOCAL command line, option /<x> required an argument but none was supplied.

Bad always-active list in non-terminal XXXX

There was a syntax error in the always-active list.
The compiler ignores the list.

Can't close file XXXX

This message can be generated for a number of reasons, mainly due to system faults (disk not in drive, no space on disk, etc.)

Can't have non-terminal XXXX in always-active list

A symbol that was previously declared a non-terminal appears in an always-active list. Only terminals can appear in the always-active list.

Can't open XXXX

The include file XXXX cannot be found or read.

Can't open file XXXX for READING

These messages are generated for a variety of reasons, mainly due to system faults (disk not in drive, files not on disk, etc.).

Can't redefine symbol XXXX

This message appears if a terminal symbol is declared later in the Language file to be a non-terminal, or vice-versa.

Any symbols appearing in always-active lists are assumed to be terminals even if not explicitly declared.

A frequent reason for this error is the case insensitivity of the compiler (VOCAL does not distinguish between upper and lower-case letters). Symbols you thought were distinct due to differences in upper and lower-case are seen as the same by the compiler.

Constant not allowed

A numeric constant appeared somewhere outside a directive.

Remember that symbol names cannot begin with a digit.

External symbol XXXX collides with grammar symbol

Symbols defined by the #define directive must be distinct from any symbols in the language.

Remember that the compiler does not distinguish upper and lower case letters.

Internal compiler error

This error should never occur by itself. If it accompanies other errors, correct those.

Invalid numeric argument for option /<x>

In the VOCAL command line, option /<x> required a numeric argument, but the argument supplied was not a number.

Invalid option: /<x>

In the VOCAL command line an invalid option, /<x>, was specified.

LAN file name missing

The name of a Language file was missing from the VOCAL command line.

Missing ")"

An open parenthesis is not matched by a closing parenthesis.

No non-terminals defined; cannot continue

The compiler needs at least one non-terminal to compile a Word List file. VOCAL quits after issuing this message.

No such directive XXXX

This means exactly what it says: there is no such directive.

Out of memory

When this message appears, it indicates that a grammar is very large (containing many terminals), very complex , or both.

Try using fewer primary productions, or restructuring the grammar so that it is simpler (see Chapter VI, Special Topics - How to Reduce Complexity of a Language).

Premature EOF

The Language file ended before a comment was fully terminated.

Syntax Error

An error other than the ones described above has occurred.

If the error is not obvious, try commenting out sections of the Language file to see what section is at fault.

Symbol XXXX already defined

Each non-terminal is only allowed to appear once on the left-hand side of a production.

Each terminal can only be declared once (associated with one output string).

Symbol XXXX recursively defined: Quitting

The grammar in the Language file is recursive, and possibly not regular. Eliminate any recursive references between non-terminals.

Terminal symbol XXXX is declared always-active and also used in primary production YYYY

You have used a terminal in two conflicting ways in the named primary production.

A terminal may either appear in the always-active list, or in a regular expression that defines a primary symbol -- but not both.

The grammar is large; expect to wait about XX minute(s)

This is not an error message. VOCAL is announcing it is about to begin a long period of computation, without any disk activity.

The time indicated is approximate. Actual time will probably be less.

Too many nested #include's

VOCAL allows a maximum of four nested #include statements.

WARNING: Can't deactivate non-terminals

A production definition is preceded by a ! (exclamation character), declaring it to be inactive. Non-terminals cannot be made inactive. Only terminals can be deactivated.

WARNING: Can't have always-active in non-primary production XXXX

Only primary productions can have always-active terminal lists.

If such a list is included in a production that is not primary, VOCAL ignores the list.

WARNING: External symbol XXXX redefined

This warning appears whenever a #define directive tries to define a symbol that has already been given a value by a previous directive.

The latest value given in the directive overrides any previous value.

WARNING: Illegal character X

A character was used illegally in the Language file.

Within comments or character strings (used in #define directives and output strings), any character is legal.

Outside of comments, character strings and symbolic keystroke names, the only characters that are legal are:

- Upper and lower-case letters
- Digits
- Signs: - , * + # ( ) [ ] ! = ; " '
- White space (from space bar, tab, new line or formfeed).

WARNING: Keystroke XXXX not defined

You have referenced a keystroke in an output string that has not been defined. It has not been built into VOCAL, or defined via the #keystroke directive.

The keystroke is given the value 0.

WARNING: Keystroke XXXX not terminated

A keystroke name referenced in an output string was not terminated by a single quote.

VOCAL inserts a single quote just before the end of the output string.

WARNING: Keystroke XXXX redefined

This warning appears when a #keystroke directive defines a symbol that a) Has already been given a value by a previous directive, or
b) Has been predefined by VOCAL.

The latest value given in the directive overrides any previous value.

WARNING: Keystroke XXXX truncated to 39 characters

A keystroke name is too long. This message is repeated each time the keystroke name appears.

WARNING: Output string truncated to 127 integers

An output string is too long.

WARNING: #root directive ignored

The #root directive must appear before the first production definition in the Language file.

If it appears afterwards, it is ignored and the first production becomes the root.

WARNING: Symbol XXXX truncated to 39 characters

A symbol name is too long. This message is repeated each time the symbol appears.

WARNING: Too many active terminals in state XX

The maximum number of terminals that can be active at once in the Voice Navigator 200 system is 200 terminals; the maximum number for the Voice Navigator 1000 system is 1000 terminals for recognition, including terminals declared to be inactive.

Use the /m command line option to specify how many active terminals VOCAL should allow before generating this warning.

Chapter Eight

~~Appendix B~~

Glossary of Terms

The major technical terms used in this manual are briefly defined below, with references for further information.

| | |
|---|---|
| **Active Words** | Set of words available for voice recognition at any one time while running an application. The number of active words cannot exceed 200 or 1000, depending on the Voice Navigator system being used. Active words are only a portion of the total number of possible voice commands for an application. *(See Chapters One, Two, Three.)* |
| **Ambiguous Grammar** | A grammar that structures a state in which there are still active words even after an utterance is recognized. A word that completes the state and causes a transition to a new state removes the ambiguity. *(See Chapter Six, Ambiguous Grammar.)* |
| **BNF Grammar** | Backus Naur Form Grammar structures an application language into states or levels of active and inactive words. *(See Chapters Two and Three.)* |
| **Build** | A process in which the system takes a mathematical average of a person's voice-trainings of a word, and creates a model that is stored for later use in voice recognition. *(See Chapters One and Two, and the Voice Driver Specifications.)* |
| **Collect** | A term that refers to how the system gathers the digitized form of words that have been spoken. *(See Part II, Voice Driver Specifications.)* |

| | |
|---|---|
| **Compiler Directive** | A specification at the beginning of a Language File that tells the compiler (VOCAL) to carry out an optional task, such as producing a List File. *(See Chapter Four.)* |
| **FSM** | See Finite State Machine below. |
| **Final State Machine** | A mode of operation that activates a limited set of active words for voice recognition. *(See Chapter One.)* |
| **Grammar** | The structure of a Language File for an application that sets up possible possible sequences of words which can be spoken for voice recognition. Refer to BNF Grammar above. *(See Chapters One, Two, and Three.)* |
| **ID Number** | An integer assigned by the compiler to every symbol in the Language File. Every utterance is also given an ID number. *(See Chapter Four.)* |
| **Inactive Words** | The voice commands for an application that are not active for recognition during certain times or in certain contexts. Inactive words can become active if their state or level is invoked by a previous voice command. *(See Chapters One, Two, Three.)* |
| **Language** | The complete set of voice commands for an application that are structured into sets of active and inactive words. *(See Chapters One and Two.)* |
| **Language File** | A stand-alone text file of voice commands for an application. It is compiled by VOCAL into a Word List used for voice recognition while running an application. *(See Chapters Two, Three and Four.)* |
| **Language Maker** | A program that makes it possible for the general user to customize a list of voice commands for an application. *(See Part Six, User's Manual.)* |

| | |
|---|---|
| **Level** | A state in which certain words are active or inactive for voice recognition. *(See Chapters One, Two, Three.)* |
| **List File** | An optional file generated by VOCAL with information about the Language File and the Word List compiled from that file. *(See Chapter Four.)* |
| **Macro Command** | An output string using the @ sign that is recognized by VoiceWord or VoiceINIT. After a word associated with an output string is spoken, the result is an outcome such as a menu selection or a mouse click. *(See Chapter Four.)* |
| **Model** | The mathematical average of how a person's voice sounds while training a word in an application's list of voice commands. Models for words become the person's Voice File for that application. *(See Chapters One and Two.)* |
| **Non-Terminal** | A symbol in a Language File that does not stand for a voice command. A non-terminal is a category name used in organizing voice commands (terminals) into levels of active and inactive words. *(See Chapters Three and Four.)* |
| **Operator** | A non-alphanumeric character used in a Language File that has an effect on associated symbols. Examples of operators: comma ("or"), white space ("and"), or the repetition operators asterisk ("zero or more times"), number sign ("zero or one time"), and plus ("one or more times"). *(See Signs, Chapter Four.)* |
| **Output String** | An output string is a sequence of characters in a Language File that result in an outcome after a voice command is recognized. Examples of outcomes are text entry or menu selection. *(See Output Strings, Chapter Four.)* |
| **Production** | A production is a statement in a Language File consisting of alphanumeric characters and signs that organize voice commands into |

levels of active and inactive words.
*(See Productions, Chapter Four.)*

| | |
|---|---|
| **Recognize** | The Voice Driver matches a spoken word with a stored model of the trained word. When the match is made, the word is recognized. *(For technical details, see Part II, Voice Driver Specifications.)* |
| **Recursion** | In a Language File, there can be no recursion: the symbols in a statement cannot refer back to themselves. *(See Chapters Three and Four.)* |
| **Sign** | A non-alphanumeric character used in a Language File. Examples of signs are asterisk, comma, white space, and # sign. *(See Signs, Chapter Four.)* |
| **State** | A state is a level in which there are certain words that are active (available for voice recognition). An application's voice commands are divided into states of active and inactive words. *(See Chapters One, Two and Three.)* |
| **Symbol** | A symbol is a sequence of alphanumeric characters used in a Language File. The types of symbols are terminals and non-terminals. *(See Symbols, Chapter Four.)* |
| **Syntax** | Syntax refers to the organization of a Language File that uses rules of grammar to set up states or levels of active words. *(See Chapters One, Two, and Three.)* |
| **Terminal** | A terminal is a symbol in a Language File that stands for a word that can be recognized by the Voice Driver. *(See Chapters Three and Four.)* |
| **Token** | A token is a digitized form of a word that is spoken. The Speech Box changes the analog form of the word into digitized form. *(see Chapters One and Two.)* |

| | |
|---|---|
| Utterance | An utterance is a discrete spoken unit set off by a half-second pause before and afterwards. Words and phrases that are recognized are called utterances. *(See Chapters One and Two.)* |
| Vocabulary | Vocabulary is the entire set of words that can be recognized for a particular application. *(See Chapters One and Two.)* |
| VOCAL | VOCAL is the compiler that converts a Language file into a Word List for a specific application. *(See Chapter Five.)* |
| Voice Driver | The driver used for voice recognition. The Voice Driver works in conjunction with Voice Prep. *(See Voice Driver Specifications.)* |
| Voice File | A Voice File is the user's file of words for an application that they have trained with their own voice. It is opened when running an application, and makes speech recognition possible. *(See User's Manual.)* |
| VoiceINIT | The voice recognizer installed in the System Folder that automatically loads when you start an application. *(See Part IV, User's Manual.)* |
| VoiceTalk | VoiceTalk is the HyperCard software that contains XCMD's and XFCN's to include voice recognition in stacks. *(See Part III of the Reference Manual.)* |
| VoiceTrain | VoiceTrain is the program that allows a user to train the words for a specific application so that the words can be recognized when spoken during the running of the application. *(See Part III, User's Manual.)* |
| VoiceWord | VoiceWord is the Desk accessory that interfaces between the Voice Drivers, the application's Word List, and the user's Voice Files. It enables recognition to take place, and also |

allows for on-line training and testing of words (similar to VoiceINIT).
*(See Part V, User's Manual.)*

VoiceWorks — VoiceWorks is a demonstration stack showing how voice can be integrated into a HyperCard setting.
*(See Part III of Reference Manual.)*

Word List — A Word List is a compiled Language file of voice commands for a specific application. A Word List is compiled using VOCAL.
*(See Chapters One, Two, and Five.)*

Part II

Speech Driver Specifications:

A LightspeedC™ Interface

Chapter One

Introduction to the Speech Driver

This introduction covers:

- Files and Data Used by Speech Driver Routines

- Speech Driver Functions

- Speech Driver Operations: A Summary

- Structure of SD Calls: Diagram

Files and Data Used by Speech Driver Routines

Note: Throughout this manual, Voice Driver and Speech Driver are used interchangeably.

- Speech Driver routines use two types of files:

(1) Word Lists compiled from Language Files,
(2) Voice Files.

- Word Lists contain two types of data: *symbols* and *strings*.

- Voice Files contain two types of data: *models* and *tokens*.

These are described below.

Language Files

- Language Files contain *symbols*, which are grouped into statements.

- The properties of symbols are:

(1) *Symbol Name* - The string of characters typed to represent it.

(2) *Symbol ID Number* - The number assigned by the compiler. Numbers are assigned sequentially.

(3) *Symbol Type:*

| | |
|---|---|
| *terminal* | if it ends a production |
| *non-terminal* | otherwise |
| *primary* | if it starts a production |

(4) Each terminal is associated with an output string (a Pascal string). The string tells the computer what to do when a word is recognized. The string can represent text or commands.

Voice Files

Voice files contain data specific to each user, as opposed to Word Lists which are specific to an application.

Voice files store these data:

(1) *Tokens*

- Digitized representations of utterances made when training words in an application word list.

(2) *Models*

- Averaged representations of tokens for a word.

- During voice recognition, a model is matched with an utterance.

Speech Driver Functions

• The low-level Speech Driver routines are built around four simple functions: Collect, Build, Adapt, and Recognize.

• Training modules will need SDCollect and SDBuild to retrieve utterances and build models.

• SDRecognize will be the core of most applications involving speech, since it does everything related to the recognition of an utterance and stepping through the production of a sentence.

Speech Driver Operations: A Summary

(1) SDOpenTask

• The first thing an application must do is to introduce itself to the Speech Driver via SDOpenTask. This tells the driver that the application is expecting to use it, and it saves a task ID that is included (silently) in every call made to the driver.

(2) SDInitMem

• The second thing an application must do is tell the driver how much memory to use via SDInitMem.

• The amount of memory you should allocate depends on how big your language is, whether you will use adaptable or non-adaptable models, and whether or not you plan to save tokens. As a rough guide VOCAL will tell you about how much memory the models will need, but that is based on an average model size. If you have particularly long utterances (multi-word voice commands), you will need more memory.

(3) Integer ID

• The driver references almost every object via an integer ID. This allows you to have several of each type of object available at once. However, it adds complexity in that your application must manage these ID's.

a) Language ID

• The first type of ID is a language ID. Each call to SDLoadLang returns a language ID. If your application only intends to use one language, you can forget this ID and use the value 0 (zero) anywhere a language ID is needed to represent the current language. SDLoadLang makes the new language the current one.

b) Symbol ID

• Each symbol in a language has a number associated with it, a symbol ID.

• You can get the ID number in two ways:

1) A header file created by VOCAL

2) Use the SDGetSymID function, which will return the ID of a symbol given its name.

• SDListSyms is also helpful. It will return the number of symbols in a language.

• Unless you plan to train or build symbols, you can get around having to keep a table of every symbol and its ID. Instead, each symbol has an output string associated with it. SDRecognize will return a symbol ID, which an application can pass to SDGetString to get the string, and base its actions on the value return in the string rather than the ID of the symbol.

(4) Voice Files

• Only one Voice file can be open at once, so there is no such thing as a "voice ID."

(5) Models

• Models are directly associated with the tokens that name them: they have the same ID number.

• Models are loaded according to specified productions and states in the current language.

• To test whether a model exists for a given symbol, the application can use SDIsTrained. Note that not every model has to be in memory for a given production. Symbols without resident models will simply not be recognized.

(6) Tokens

• Tokens are stored by a group number and an index. The group number (usually) is the same as the symbol ID naming the token, and the index specifies a token inside a group.

• Note that models are assigned a name to associate them with a symbol, but tokens are not. Therefore an application must be careful with tokens stored in Voice files, and make sure that the symbol numbers match the token IDs when the file is loaded (if that is what is desired).

(7) Quitting an Application

• Before an application quits, call SDCloseTask to free memory space and inform the Speech Driver that recognition is finished.

SAMPLE STRUCTURE OF SD CALLS

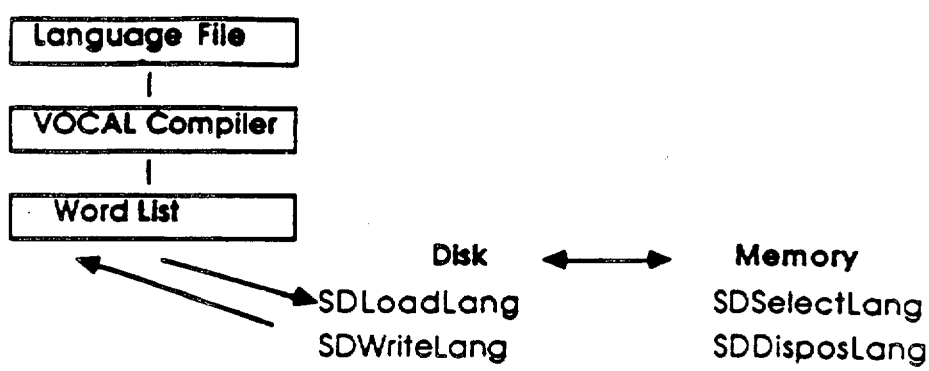

Retrieve Information

SDGetSymName

Change Information

SDSet SymName

SDGet SymID
SDGet SymType
SDGet String
SDIsActive
SDIsTrained
SDGet Def
SDListSyms
SDNextSym SDSet String
SDActivate
SDDeactivate Voice File → SDCreateVoice
SDOpenVoice
SDCloseVoice

To Access Voice Labels
SDGetLabel
SDWriteLabel

File Functions
SDWriteModel
SDRmveModel
SDWriteToken
SDRmveToken

Memory Functions

| | |
|---|---|
| SDLoadModel | SDListModels |
| SDDisposModel | SDNextModel |
| SDLoadToken | SDListTokens |
| SDDisposToken | SDNextToken |

Chapter Two

A Sample Program

This is a simple Speech Driver application program illustrating use of the SDI interface library.

It is highly recommended that you read "Introduction to the Speech Driver" and skim through the specifications in the following chapters before trying to understand this program.

The program was written in LightspeedC™, and compiled with the UNIX™ libraries to simplify the input/output. The only Macintosh-like feature is the Standard file package which was implemented because of the need of a vRefNum in SDLoadLang and SDOpenVoice.

```
/* A Speech Driver application program. */

#include <StdFilePkg.h>
#include <MacTypes.h>
#include "stdio.h"
#include "globals.h"
#include "SpeechDvr.h"
```

```
/* This program runs through a simple scenario for training and recognition using the Speech Driver
and making use of the SDI library.*/

void main()
{
   Boolean didtrain;
   int scsi_id;
   int scode;

   printf("Please enter number of trainings (1 to 8):");
   {
      char buf[256];
      gets(buf);
      printf("# %d\n",Nr_tokens= atoi(buf));
   }

/* INITIALIZE */
/* Introduce task to driver */
   if (scode = SDOpenTask(scsi_id = -1)) {
      printf("Opentask error %d\n",scode);
      if (scode == -1)
         printf("ResErr %d  OpenErr %d%c",      /* couldn't open driver.. */
            SDResErr(),SDDriverOpenErr(),'\0');
      else
         printf("%x\n",scode);                  /* got a driver error message */
      exit(1);
   }

/* Set up error handler */
   SDErrorHandler(efunc);

/* Initialize memory */
/* Set initial size at 320 Kbytes, plus a five second talkahead queue */
   SDInitMem(320*1024L,5);

/* Claim the speech input channel */
   SDClaim(true);

/* LOAD LANGUAGE */
   Get_Language();

/* ESTABLISH MODELS IN MEMORY */
   Get_Vocabulary();                 /* Load models if desired */

   didtrain= train();                /* Train vocabulary if necessary */

   if (didtrain)
      SDWriteModels(ALL_SYMBOLS, true); /* Save new models when done */


/* RECOGNIZE */
   recognize();                      /* Accept speech and recognize */

/* CLEAN UP */
/* Release claim on input channel */
   SDReleaseClaim();

/* Close and update the active vocabulary */
   SDCloseVoice();

/* Free the memory allocated for heap and free task */
   SDCloseTask();
```

```
}

/* efunc is the error handler set up by SDErrorHandler(efunc) - if an error is reported by the Speech
Driver, control is passed to this routine. See documentation of SDErrorHandler in the manual for more
details. */

void efunc(scode,id)
int scode;      /* error code */
int id;         /* id of the function reporting the error */
{
   Str255 errname, funcname, classname;

   SDFunctionName(id,funcname);
   SDErrorName(scode,errname);
   SDClassName(scode,classname);

   static Boolean closecall = false;       /* true if this function has called
                                              SDCloseVoice() */
   static Boolean freecall = false; /* true if this function has called
                                       SDCloseTask */

   printf("\nERROR in Speech Driver function %d(%s): %x %s
   (Class %s)", id, funcname, scode, errname, classname);

   if(!closecall) {
      closecall = true;
      SDCloseVoice();      /* Close and update active vocabulary if there is one */
   }

   if(!freecall){                  /* SDCloseTask() can report an error, so check to
                                      see that you aren't already processing one */
      freecall = true;
      SDCloseTask();               /* tell the driver you no longer need it - this routine
                                      frees the memory allocated by SDInitMem() and

                                      frees the task handle */

   }

   exit(1);                        /* abort the program */
}

/* SDEventHandler(EVENT_WATCHDOG,&start_watch) will set up start_watch() to be called every
250 milliseconds during COLLECT (see description of Driver function SDEventHandler).
start_watch() erases the prompt when beginning of utterance has been detected. */

void start_watch()
{
   StatusRec a_status;

   if (kbhit()) { eatkey(); SDQuit(); }   /* abort on key press */
   SDStatus(&a_status);                   /* get status */
   if (a_status.f_start)          /* erase prompt if start of utterance detected */
      clearline();
}

/* Train the words for which models don't exist in memory - return true if trained at least one model
successfully */

Boolean train() /* [6.6] */
{
```

```
    int nsyms, symid, k;
    Boolean did_train = false, quit = false;

/* prepare to get symbol ids */
    nsyms = SDListSyms(ALL_SYMBOLS,ALL_STATES,TERMINAL);

/* set up watchdog to erase prompt at beginning of utterance */
    SDEventHandler(EVENT_WATCHDOG,start_watch);

    puts("TRAINING. Press any key to quit.");

/* Train all untrained words */
    for (k = 0; k < nsyms; k++) {

    /* Get id of next terminal symbol */
        symid = SDNextSym();

    /* If already trained, skip it */
        if (SDIsTrained(symid)) continue;

    /* Get name of symbol for prompt */
        SDGetSymName(symid,sizeof(buffer),buffer);

    /* Start listening (purge queue and disable microphone switch) */
        SDListen(true, false);

    /* Collect tokens for and build a model for the symbol. The FOREVER loop ensures that the
model is built from Nr_tokens unrejected tokens. */

        for (;;) {

        /* Collect Nr_tokens tokens */
            if (!collect(symid)) {
                quit = true;            /* User pressed a key */
                break;
            }

        /* Build a model based on these tokens */
            if (build_model(symid)) {
                did_train = true;
                break;
            }

        /* else continue, a token was rejected during the build pause so that the user can
    view the error message */
            else {
                printf(" Press any key to continue.\n");
                eatkey();
            }

        }   /* end of FOREVER loop */

        if (quit) break;
    }    /* end of loop on symbols */

    if (did_train) {
        clearline();
        puts("Training was successful.");
    }

/* Call off the watchdog */
    SDEventHandler(EVENT_WATCHDOG,NULL);
```

```
   return (did_train);
}

/* Collect Nr_tokens tokens, ignoring rejections return true if successful, false if not */

Boolean collect(symid)
unsigned symid;
{
   int i;
   CollectRec a_collect;

   for (i = 0; i < Nr_tokens;) {
      clearline();
      printf("Please say (%d/%d): %s\r",i+1,Nr_tokens,buffer);

/* collect a token - no need to set up argument block, because the SD function does it for you */
      SDCollect(&a_collect,symid);

      a_collect.rejcode &= 0xff;

      if (a_collect.rejcode == RC_OK) i++;

      else {
         clearline();
         if (a_collect.rejcode == RC_QUIT) {
            printf("Training aborted per user request.\n");
            return false;
         } else
            printf("Utterance rejected: code %d. Press any key to
continue.\r",
            a_collect.rejcode);
            eatkey();
         }
      }

      return (true);

}

/* Build model for the symbol from all tokens and throw the tokens out when done */

Boolean build_model(symid) /* [6.6.4] */
unsigned symid;
{
     BuildRec a_build;
     TokenEntryRec toklist[NTRTOKS];

     clearline();
     printf("Building a model. Please wait.\r");

/* set up arguments to BUILD */
     a_build.sym = symid;                  /* Build model for current sym */
     a_build.all = true;                   /* Build from all tokens */
     a_build.adaptable = false;            /* Not adaptable */
     a_build.tolerance = 0;                /* Use default tolerance */

     a_build.ntokens = sizeof(toklist) / sizeof(toklist[0]);

/* Build a model for the symbol */
     SDBuild(&a_build,toklist);
```

```
/* Throw out the tokens used */
     SDDisposToken(ALL_TOKENS,0);

/* If any  tokens were rejected, print message and return false */
   if (a_build.rejcnt > 0) {
      clearline();
      printf("%d token(s) rejected. Code(s):",a_build.rejcnt);

      {
         int i;
         for (i = 0; i < Nr_tokens; i++) {
            if (toklist[i].rejcode)

               printf(" %d",toklist[i].rejcode);
            }
      }
      return (false);
   }

      return (true);
}

/* During recognition, this routine will be called every 250 milliseconds */

void key_watch()
{
   if (kbhit()) {
      eatkey();
      SDQuit();
   }
}

void recognize() /* [6.7] */
{
     int i,nout;
     int *ibuf;
     RecogRec a_recog;

/* Set up arguments to SDRecog */
     a_recog.production = ROOT_SYMBOL;       /* prepare to step through
                                                main production */
     a_recog.state = 1;                      /* first state */
     a_recog.rejthresh = 1;                  /* minimal rejection */
     a_recog.intoken = 0;                    /* live input */
     a_recog.insym = 0;                      /* don't fake recognition */
     a_recog.docollect = false;              /* don't collect a token */
     a_recog.lactions = 0;           /* don't return list of productions completed
                                        by recognized symbol */

     ibuf = (int*)buffer;

/* Enable abort by key press */
   SDEventHandler(EVENT_WATCHDOG,key_watch);

/* Start listening (purge queue and disable microphone switch) */
   SDListen(true, false);

/* Display the prompt AFTER listening started */
     printf("RECOGNIZING. Press any key to quit.\n");

     for (;;) {
      if (kbhit()) { eatkey();break; } /* abort on keyboard */
```

```
/* recognize an utterance */
     SDRecognize(&a_recog,NULL);   /* ignore productions completed
*/
       a_recog.rejcode &= 0xFF;

       if(a_recog.rejcode != RC_OK)  {
       /* if because user pressed a key, causing watchdog to
       signal an abort, break out of FOREVER loop */
          if (a_recog.rejcode == RC_QUIT) break;
          else
             /* there was a problem */
             printf("\n[REJECT code %d: %s]\n",
       a_recog.rejcode, rejnames[a_recog.rejcode]);

       /* If no models trained, return to first state of
       production.  If already in first state, give up. */
          if (a_recog.rejcode == RC_NO_MODELS) {
             if (a_recog.state == 1) break;
             else a_recog.state = 1;
          }
       }
       else {
       /* display name of symbol recognized */
          SDGetSymName(a_recog.answer,sizeof(buffer),buffer);
          printf("%s",buffer);

       /* display the output string */
          nout = SDGetString(a_recog.answer,
                      (sizeof(buffer)/sizeof(int)),ibuf);
          if (nout != 0)
             putchar('/');
          for  (i=1; i<nout; i++)       /* low byte of each int in  the ibuf is an
                                        ASCII code */
          putchar(ibuf[i]);
          putchar(' ');                 /* leave a space*/
          if  (a_recog.endflag) {
             printf("\n[End of production]\n");
             a_recog.state= 1;
          } else {
             a_recog.state= a_recog.newstate;
          }
       }
/* continue recognition */
     }
     putchar('\n');

/* Call off watchdog */
     SDEventHandler(EVENT_WATCHDOG,NULL);

}


/* GENERAL UTILITY FUNCTIONS */

/* Load language description from file */

 void Get_Language() {

   SFTypeList typeList;
   SFReply reply;
   Point loc;
```

```
    loc.v = 80;
    loc.h = 100;
    typeList[0] = 'VLDF';
    SFGetFile(loc, "\pPlease Select a Language File", 0, 1,
    &typeList, 0, &reply);
    if (!reply.good) exit(1);

    SDLoadLang(reply.fName, reply.vRefNum);
}

/* Load vocabulary from file */

void Get_Vocabulary() {

   SFTypeList typeList;
   SFReply reply;
   Point loc;
   int nmodels;

    loc.v = 80;
    loc.h = 100;
    typeList[0] = 'VPTN';
    SFGetFile(loc, "\pPlease Select a Model File", 0, 1,
       &typeList, 0, &reply);
    if (reply.good) {
       SDOpenVoice(reply.fName,reply.vRefNum);
       nmodels = SDLoadModel(ALL_SYMBOLS, ALL_STATES, false);
    } else {
       nmodels = 0;
    }
    printf("%d model(s) loaded.\n",nmodels);
}

void eatkey()
{
   getch();
}

void clearline()
{
   putchar('\n');
}
```

Chapter Three

Initialization

SDInitMem

PURPOSE

Declare initial memory requirements of the Speech Driver.

SYNOPSIS

SDInitMem(memsize, lqueue)

| | |
|---|---|
| long memsize; | amount of memory to allocate |
| int lqueue; | length of talkahead queue |

DESCRIPTION memsize — Amount of memory (in bytes) on the application heap to be dedicated to the Speech Driver. A maximum of 512K can be allocated to the driver.

lqueue — Specifies the length of the talkahead queue in seconds. The queue occupies approximately 800 bytes per second of speech.

SUMMARY

- This function automatically allocates a block of memory of the specified size, and passes the address to the Speech Driver.
- The SDI module retains the address of the memory space for subsequent deallocation by SDCloseTask.

SDGetMemStat

PURPOSE

Get status about the task's memory space.

SYNOPSIS

```
void SDGetMemStat(pargs)
   MemStatusPtr pargs;
```

DESCRIPTION pargs — A pointer to an information structure:

```
struct          {
      long size;
      long used;
 } MemStatus, *MemStatusPtr;
```

size — Allocated size of the memory space (all sizes are in bytes).

used — Amount of the memory space currently used.

SDGrowMem

PURPOSE

Increase size of task's memory space.

SYNOPSIS

```
void SDGrowMem(memsize)
    long memsize;
```

DESCRIPTION memsize — New memory size in bytes (i.e., total memory size) available for the Speech Driver.

SUMMARY

- This function tries to increase the size of the task's memory space.
- The function reports an error if the specified size is smaller than the current size.
- The maximum amount of memory possible for allocation is 512K.

SDOpenTask

PURPOSE

Open a task.

SYNOPSIS

```
int SDOpenTask(address)        success flag
    int address                SCSI port
```

DESCRIPTION address — Specifies the SCSI port to which the Speech Box is connected, or the reserved value -1, to tell the driver to find the Speech Box.

SUMMARY

- This must be the first function called by a task.
- It returns *true* if the call was successful; *false* if it failed.
- This function also sets the future values of SDStyle and SDVersion.

SDCloseTask

PURPOSE

Terminate a task and deallocate the memory associated with it.

SYNOPSIS

```
void SDCloseTask()
```

SUMMARY

- If the application currently owns a task ID, this function first frees the task and then deallocates the Speech Driver memory space.
- It is safe to call SDCloseTask even if SDOpenTask has not been called.

SDClaim

PURPOSE

Claim the speech channel for the task's exclusive use.

SYNOPSIS

```
void SDClaim(seize)
   int seize;
```

DESCRIPTION seize — Specifies if task should claim channel if another task currently owns it.

True = seize; False = don't seize.

SUMMARY

- This function must be called before a task can call SDMeter, SDListen, SDPause.
- The functions SDRecognize and SDCollect report an error if a task's talkahead queue is empty (no utterances have been heard), and the task has no claim on the speech channel.

SDReleaseClaim

PURPOSE

Release the speech channel.

SYNOPSIS

```
void SDReleaseClaim()
```

DESCRIPTION

- This function releases a task's claim on the input channel, making it available for use by other tasks.

SDListen

PURPOSE

Initiate interrupt-level listening for speech.
Optionally, purge a task's talkahead queue.

SYNOPSIS

```
void SDListen(purge, mic_switch)
    int purge;        flag; true means purge before listening
    int mic_switch;   flag; sensitive to mic switch
```

DESCRIPTION purge — Specifies whether to purge the task's talkahead queue before enabling listening. Otherwise it leaves all previously-heard utterances in the queue.

mic_switch — Specifies if the driver will listen for speech only when the hardware microphone switch is ON.

- If mic_switch is false, the driver ignores the state of the microphone switch. (Obviously this feature is only for hardware that supports a microphone switch.)

SUMMARY

- Once activated, the driver continuously listens for speech and places detected utterances in the talkahead queue. This goes on until the task suspends listening by calling SDPause, or until another task seizes the speech channel.
- If the queue becomes full, the driver marks any incomplete utterance with a flag indicating that the utterance was truncated.
- If a task attempts to recognize or collect a token for a truncated utterance, the driver rejects the utterance and returns a special rejection code.
- As long as the queue remains full, the driver continues listening, but discards incoming utterances.
- SDRecognize and SDCollect remove utterances from the queue. When one of these functions is called, there may or may not already be utterances in the queue:

a) If the queue already contains utterances, SDRecognize and SDCollect remove the next available utterance.

b) If the queue is empty, the functions wait for a new utterance to be heard.

- SDRecognize and SDCollect report an error if the queue is empty and the task has not enabled listening.

SDPause

PURPOSE

Suspend interrupt-level listening for speech.

SYNOPSIS

```
void SDPause()
```

SUMMARY

- This function temporarily suspends listening for speech. All utterances already heard remain in the task's speech queue.
- If the user is speaking when the SDPause function is called, the function truncates the utterance being heard.
- If a task later attempts to recognize or collect a truncated utterance, the driver returns a special reject code.

Chapter Four

Languages

SDLoadLang

PURPOSE

Load a compiled language definition (Word List) into the task's memory space.

SYNOPSIS

```
int SDLoadLang(filename, vRefNum)      returns an integer ID
    char *filename;                    name of a Voice file
    int vRefNum;                       volume reference number
```

DESCRIPTION filename — A Pascal string.

vRefNum — A volume reference number, telling where to find the filename.

SUMMARY

- This function opens the compiled language file (the Word List), loads it into the task's memory space, and closes the file. It returns a positive non-zero integer ID to the language. The ID must be used when calling the functions SDSelectLang and SDDisposLang.
- The function makes the newly-loaded language the active language. If the task's memory space already contains voice models associated with other resident languages, the function searches for any voice models that match terminal symbols in the newly loaded language.
- A maximum of eight languages can be resident simultaneously.

SDWriteLang

PURPOSE

Save a copy of a resident language to a file.

SYNOPSIS

```
void SDWriteLang(pname, lang)
   char *pname;          filename of Word List file
   int lang;             language ID
```

DESCRIPTION pname — Specifies a pointer to a Pascal string of the destination Word List file.

- If the named file already exists, the function overwrites the old copy of the file.

lang — Specifies the integer language ID, or 0 (zero), to save the current language.

SUMMARY

- This function saves all changes that have been made to the resident copy of the language.
- Functions that change a language are:

| | |
|---|---|
| SDSetSymName | Change the name of a symbol |
| SDSetString | Change the output string associated with a symbol |
| SDActivate | Activate a terminal symbol |
| SDDeactivate | Deactivate a terminal symbol |

SDSelectLang

PURPOSE

Make a resident language the active language.

SYNOPSIS

```
void SDSelectLanguage(lang)
  int lang;                    language ID
```

DESCRIPTION lang — Specifies a language ID returned by the function SDLoadLang.

SUMMARY

- This function makes a previously loaded language the current language.
- Note that SDLoadLang automatically makes a loaded language the current one.

SDDisposLang

PURPOSE

Delete a language definition (Word List) from a task's memory space.

SYNOPSIS

```
void SDDisposLang(lang)
  int lang;
```

DESCRIPTION lang — Specifies the language definition (Word List) to be deleted.

SUMMARY

- This function deletes the designated language from the task's memory space.
- It deletes all resident models associated with the language that are not associated with any other resident languages.
- If lang is 0 (zero) the function deletes all resident languages and deletes all models.
- If the language being used is the active language, and there are other languages resident, the function selects the language with the lowest-numbered ID to be the new active language.

SDGetSymName

PURPOSE

Retrieve the name of a language symbol.

SYNOPSIS

```
int SDGetSymName(sym, lbuf, pbuf)          return actual name length
    int sym;                               language symbol ID
    int lbuf;                              length of pbuf in bytes
    char *pbuf;                            buffer for the name
```

DESCRIPTION sym — Specifies an integer symbol ID, or one of the reserved values: ROOT_SYMBOL, CURRENT_SYMBOL.

lbuf
- On entry, the length of pbuf in bytes.
- On exit, the actual length of the name, including the terminator, or 0 (zero) if the specified symbol is not defined.

pbuf — Specifies a pointer to a text buffer which is at least lbuf bytes long.

SUMMARY

- This function returns the text name of the language symbol sym. Sym can be any terminal, non-terminal, or primary symbol in the active language, or one of the reserved values ROOT_SYMBOL or CURRENT_SYMBOL.
- The function returns the nam as a Pascal string in pbuf.
- If the buffer is too small, the function truncates the name to lbuf characters.

SDGetSymID

PURPOSE

Retrieve the ID for a symbol with a specified text name.

SYNOPSIS

```
int SDGetSymID(pname, perfect, pmatches)   return symbol ID
    char *pname;                           text string symbol name
    int perfect;                           flag; true for perfect match
    int *pmatches;                         returns number of matches
```

DESCRIPTION pname — Specifies a pointer to a symbol name.

perfect — Flag.

- *If true*, the function requires that a symbol name match pname perfectly. In that case the function set pmatches to 0 (zero) if no matching symbol is found, or 1 (one) if a match is found.
- *If false*, the function returns via pmatches the number of symbol names for which pname is a substring. sym is returned with the ID of the first (lowest numbered) matching symbol.

pmatches — Returns with number of matches found

SUMMARY

- This function returns the ID for the language symbol with the text name specified by pname.
- Any terminal, non-terminal, or primary symbol can be named.
- The matching is case-insensitive.

SDGetSymType

PURPOSE

Retrieve the type of a language symbol.

SYNOPSIS

| | |
|---|---|
| int SDGetSymType(sym) | return code in flag (see below) |
| int sym; | language symbol ID |

DESCRIPTION sym — Specifies an integer language symbol ID for a terminal, non-terminal, or primary symbol in the active language.

SUMMARY

- This function returns the type of the language symbol as one of the specified codes:

| CODE | SYMBOL TYPE |
|---|---|
| 0 | Specified symbol not in language |
| 1 | Terminal symbol |
| 2 | non-terminal, non-primary symbol |
| 4 | non-terminal, primary symbol |

SDSetSymName

PURPOSE

Set the name of a language symbol.

SYNOPSIS

```
int SDSetSymName(sym, pname)
   int sym;                language symbol ID
    char *pname;           new text name
```

DESCRIPTION sym — Specifies the integer symbol ID of the symbol whose name is changing.

pname — Specifies a pointer to a Pascal string symbol name.

SUMMARY

- This function changes the name of language symbol sym to pname.
- The name can be any length. However, the names of models stored in Voice files are truncated to forty characters.

SDGetString

PURPOSE

Retrieve the output string associated with a language symbol.

SYNOPSIS

```
int SDGetString(sym, lbuf, pbuf)
                                 return length of string,
                                       in words
  int sym;                       language symbol ID
```

```
int lbuf;        the size of pbuf in words
char *pbuf;      a buffer for the definition
```

DESCRIPTION sym — Specifies an integer ID for a terminal, non-terminal, or primary symbol in the active language.

lbuf —
- *On entry*, an integer specifying the length of the buffer pbuf in words.
- *On exit*, the actual number of words in the string, or the value 0 (zero) if the symbol is not defined.

pbuf — A string of 16-bit words. The first word is a count.

SUMMARY

- This function returns the output string associated with the language symbol sym.
- Sym can be any terminal, non-terminal, or primary in the active language.
- If a zero-length word is defined, the function returns lbuf with 1 (one) and places a single 0 (zero) in pbuf.
- If no string is defined, lbuf is set to 0 (zero) and pbuf is unchanged.

SDSetString

PURPOSE

Set the output string of a language symbol.

SYNOPSIS

```
void SDSetString(sym, pstr)
   int sym;        language symbol ID
   char *pstr;     new output string
```

DESCRIPTION memsize — Specifies an integer ID for a terminal, non-terminal, or primary symbol in the active language.

lqueue — Specifies a pointer to a string of 16-bit words. The first word is a count of the length of the string (in words), excluding the count word.

SUMMARY

- This function takes the string associated with the language symbol sym and sets it at pstr.
- The string can be any length.
- To designate a zero-length string, pstr must point to a single word containing the value 0 (zero).
- To undefine a string, pstr must be a NULL pointer.

SDActivate

PURPOSE

Retrieve the terminal ID for a symbol with a specified text name.

SYNOPSIS

```
void SDActivate(terminal)
    int terminal;                    terminal symbol ID
```

DESCRIPTION terminal — Specifies a terminal symbol ID to be activated.

SUMMARY

- This function activates the terminal symbol ID specified by a terminal for all productions in the active language.
- The SDRecognize function only recognizes the utterances corresponding to terminal symbols that are active.
- If a terminal is already active, this function does nothing.

SDDeactivate

PURPOSE

Deactivate a terminal language symbol

SYNOPSIS

```
void SDDeactivate(terminal)
    int terminal;                    terminal language symbol
```

DESCRIPTION terminal — Specifies an integer ID for a terminal language symbol.

SUMMARY

- This function deactivates the terminal symbol ID specified by a terminal for all productions in the active language.
- SDRecognize only recognizes the utterances corresponding to terminal symbols that are active.
- If a terminal is already inactive, this function does nothing.

SDIsActive

PURPOSE

Determine whether a terminal symbol is active or not.

SYNOPSIS

| | |
|---|---|
| int SDIsActive(terminal) | returns flag; true means active |
| int terminal; | terminal symbol ID |

DESCRIPTION terminal — Specifies an integer terminal ID.

SUMMARY

- This function returns a flag indicating whether a given terminal is active or inactive.
- *True* means the terminal is active.
- *False* means the terminal is inactive.

SDIsTrained

PURPOSE

Determine the status of the resident model associated with a terminal symbol.

SYNOPSIS

| | |
|---|---|
| int SDIsTrained(terminal) | return code |
| int terminal; | terminal symbol ID |

DESCRIPTION terminal — Specifies an integer terminal symbol ID.

SUMMARY

- This function returns a set of flags indicating the status of the resident model (if any) that is associated with the specified terminal symbol.

| BIT | MEANING IF TRUE |
|---|---|
| 0 | A resident model exists |
| 1 | The model is adaptable |
| 2 | The model has been modified |

SDGetDef

PURPOSE

Retrieve the text string definition for an external language symbol.

SYNOPSIS

```
int SDGetDef(pname, lbuf, pbuf)   return length of definition
    char *pname;                  external symbol text name
    int lbuf;                     the size of pbuf in bytes
    char *pbuf;                   a buffer for the definition
```

DESCRIPTION pname — A Pascal text name of an external symbol defined in the active language.

lbuf
- *On entry*, an integer specifying the length of the buffer pbuf in bytes.
- *On exit*, the actual number of characters in the definition, including the terminator, or NULL if the symbol is not defined.

pbuf — A pointer to an output buffer for the text string.

SUMMARY

- This function returns the text string that defines the external language symbol pname in the active language. The matching function is case-insensitive.
- The function returns no more than lbuf characters, including the terminator. If a definition is too long, the function truncates it to lbuf-1 characters. The function returns the actual number of characters in the definition via lbuf, even if fewer characters are returned.
- To make a definition in a Language file, use:

define *symbol definition*

SDListSyms

PURPOSE

Prepare to list the symbols in a task's active language.

SYNOPSIS

```
int SDListSyms(sym, state, flags)          return the number of symbols
    int sym;                                language symbol ID
    int state;                              state ID or 0 (zero)
    int flags;                              symbol selection flags
```

DESCRIPTION sym — Specifies the integer ID for the group.

state — Specifies the index in the token group of the specific token.

flags — Specifies the type of the specific token:

| FLAG | TYPE |
|---|---|
| 1 | Terminal |
| 2 | Non-terminal, non-primary |
| 4 | Non-terminal, primary |

SUMMARY

- Prepare to return the union of symbols contained in or named by the pair (sym, state). This function marks the specified symbols.
- The function SDNextSym must be called repeatedly to return the ID's of the prepared symbols.

SDNextSym

PURPOSE

Retrieve the next symbol prepared by SDListSyms.

SYNOPSIS

```
int SDNextSymbol()                          return the next symbol
```

SUMMARY

- This function returns the next symbol in the list defined by the most recent call to SDListSyms.
- If there are no more symbols to list or if SDListSyms hasn't been called, the function returns the value 0 (zero).

Chapter Five

Voice Files

SDCreateVoice

PURPOSE

Create a new Voice file.

SYNOPSIS

```
void SDCreateVoice(pname, vRefNum)
    char *pname;            the name of a Voice file
    int vRefNum;            volume reference number
```

DESCRIPTION pname — A Pascal filename string.

vRefNum — A volume reference number, telling where to find pname.

SUMMARY

- This function creates and initializes a Voice file.
- The function must be called before any tokens or models can be written to a new file.
- The function also designates the file to be the active Voice file for I/O operations.
- If there is already an active Voice file, the function first closes the active file, using SDWriteVoice.

SDOpenVoice

PURPOSE

Select an active Voice file for I/O operations.

SYNOPSIS

```
void SDOpenVoice(pname, vRefNum)
```

| | |
|---|---|
| char *pname; | name of a Voice file |
| int vRefNum | destination volume |

DESCRIPTION pname — Specifies a pointer to a Pascal string filename of a Voice file.

vRefNum — Specifies the volume in which the file will be located (as per Standard File Package).

SUMMARY

- This function opens the specified file and designates it to be the active Voice file for I/O operations.
- If there is already an active Voice file open, the function first closes the file.

(See the SDCloseVoice function).

SDCloseVoice

PURPOSE

Make all changes to the active Voice file permanent, and close the file.

SYNOPSIS

```
void SDCloseVoice()
```

SUMMARY

- This function writes all pending changes to the active Voice file, deactivates the file, and closes it.
- It is not an error to call SDCloseVoice if there is no open file. In this case it simply returns, doing nothing.

IMPORTANT: The driver maintains directory information in memory for the active Voice file. If the Voice file has been modified, SDCloseVoice must be called to update the file's copy of its directory before a task terminates.

SDWriteLabel

PURPOSE

Write a label to the active Voice file.

SYNOPSIS

```
void SDWriteLabel(plabel)
    char *plabel;                pointer to the label
```

DESCRIPTION plabel — Specifies a Pascal string. with a maximum length of 81 characters including the terminator.

SUMMARY

- This function writes a text label to the active Voice file.
- A task can use the label to mark a file in any way desired.
- One use for a label would be to record the environment (microphone type, noise level) in which the Voice data was collected.
- If the value at plabel is too long, the function truncates it.

(See SDGetLabel )

SDGetLabel

PURPOSE

Retrieve a Voice file's label.

SYNOPSIS

```
void SDGetLabel(pbuf)
    char *pbuf;                pointer to the buffer
```

DESCRIPTION pbuf — Specifies a buffer in which a Pascal string will be placed. The string can have a maximum length of 81 characters including the terminator.

SUMMARY

- This function retrieves the text label from the active Voice file.
- pbuf should point to an allocated memory space of at least 81 characters.

(See SDWriteLabel.)

SDWriteModel

PURPOSE

Take a model or set of models from a task's memory space and write it to the active Voice file.

SYNOPSIS int SDWriteModel(sym, update)

| | |
|---|---|
| | returns number of models saved |
| int sym; | token group |
| int update; | token index, lower bound |

DESCRIPTION sym

- Specifies the integer ID for a terminal or primary symbol in the active language, or one of the reserved values: CURRENT_SYMBOL, ALL_SYMBOLS, ROOT_SYMBOL, 0 (zero).
- If sym is a terminal symbol, the function saves the single model associated with that symbol.
- If sym names a primary symbol, the function saves the set of models associated with the terminal symbols in that production.
- CURRENT_SYMBOL saves models associated with the production currently being recognized. The production currently being recognized is the production most recently specified as an argument to the SDRecognize command.
- ALL_SYMBOLS saves all models associated with the language.
- ROOT_SYMBOL saves models associated with the root production in the language. This is the production declared to be the root in the language's Word List file compiled by VOCAL.
- 0 (zero) saves all models for all resident languages.

update

Flag.

- *True* if only modified models are to be saved.
- *False* if all named models are to be saved.

SUMMARY

- This function takes a set of models from a task's memory space and writes it to the active Voice file, as designated by the functions SDCreateVoice or SDOpenVoice.

SDRmveModel

PURPOSE

Remove a model from the active Voice file.

SYNOPSIS

```
int SDRmveModel(pname)
                              return the number of models removed
    char *pname;              a model text name
```

DESCRIPTION pname — Specifies a pointer to a Pascal string model name.

SUMMARY

- This function removes the model with the text name pname from the active Voice file.
- The specified name must match the model's name perfectly. (The test is case-insensitive.)
- The function returns true if the model was removed.

SDLoadModel

PURPOSE

Load a model (or set of models) from the active Voice file into a task's memory space.

SYNOPSIS

```
int SDLoadModel(sym, state, optimize)
                              return number loaded
    int sym;                  language symbol ID
    int state;                state ID, or ALL_STATES
    int optimize              optimized load flag
```

DESCRIPTION sym

- Specifies the integer ID for a terminal or primary symbol in the active language, or one of the reserved values: CURRENT_SYMBOL, ALL_SYMBOLS, or ROOT_SYMBOL.
- If sym names a terminal symbol, the function loads the single model associated with that symbol. State is ignored.
- If sym names a primary symbol, the function loads a set of models associated with terminal symbols in that production.
- CURRENT_SYMBOL loads models associated with the production currently being recognized. The production currently recognized is the production most recently specified as an argument to the SDRecognize command.

- ALL_SYMBOLS loads all models associated with the active language.
- ROOT_SYMBOL loads models associated with the root production in the active language. This is the production declared to be the root in the Language file.

state

- State further specifies which models associated with a production to load.
- If state is a positive state number, the function loads all models required for recognition of that particular state. (State numbers are assigned automatically by the language compiler.)
- Alternatively state could be one of two reserved values:

a) CURRENT_STATE loads all models associated with the current state of production.

Thus the pair (CURRENT_SYMBOL, CURRENT_STATE) causes the function to load the models required for the next recognition of the current production.

If sym does not name the current production, the function assumes state 1 (one).

b) ALL_STATES loads all models associated with the entire production.

optimize

- Specifies the mode in which the models will be loaded.

*If true*, the function loads only those models that are not already resident.

- The function also deletes all other resident models to make room for the models being loaded.
- The function will not delete a model that has been built or adapted but not yet saved to a Voice file.
- Optimize mode is intended to be used to make sure that a set of models is resident in preparation for recognition.

SUMMARY

- This function loads a set of models from the active Voice file into a task's memory space.
- There must be an active language and an active Voice file prior to calling.

• It is invalid to load models from a new Voice file before disposing of models from the previous Voice file. (See SDDisposModel.)

SDDisposModel

PURPOSE

Delete a model or set of models from a task's memory space.

SYNOPSIS

```
int SDDisposModel(sym)
                              returns the number of models deleted
   int sym;                   language symbol ID
```

DESCRIPTION sym

• Specifies the integer ID for the terminal or primary symbol in the active language, or one of the reserved values: CURRENT_SYMBOL, ALL_SYMBOLS, ROOT_SYMBOL, or 0 (zero).

• If sym names a terminal symbol, the function deletes the single model associated with that symbol.

• If sym names a primary symbol, the function deletes the set of models associated with the terminal symbols in that production.

• CURRENT_SYMBOL deletes models associated with the production currently being recognized. The production currently recognized is the production most recently specified as an argument to the SDRecognize command.

• ALL_SYMBOLS deletes all symbols associated with the language.

• ROOT_SYMBOL deletes models associated with the root production in the language. This is the production declared to be the root of the language's Language file.

• 0 (zero) deletes all models in all resident languages (i.e., all models in the memory space)

SUMMARY

• This function deletes a set of models from the task's memory space.

• The argument sym names the set of models to be deleted.

• If sym names a terminal symbol, the function deletes the single model associated with that symbol.

SDListModels

PURPOSE

Prepare to list a token or set of tokens from a task's memory space.

SYNOPSIS

| | |
|---|---|
| int SDListModels(pname) | return the number of models |
| char *pname; | model text name, or NULL |

DESCRIPTION pname

- A Pascal string specifying a model name to query about:

a) The function returns *true* if the named model exists in the file b) The function returns *false* if the model does not exist.

- A subsequent call SDNextModel will return the name of the specified model.

- pname can also be a NULL pointer. In this case, the function prepares to return a complete directory for the Voice file, beginning with the first model in the file. SDListModels will return the number of models in the file.

SUMMARY

- This function returns a list of models contained in the active Voice file.

- After a task has called this function to identify the model(s) it wishes to obtain, the task must call SDNextModel repeatedly to retrieve each directory entry.

SDNextModel

PURPOSE

Retrieve the next symbol prepared by SDListModels.

SYNOPSIS

| | |
|---|---|
| int SDNextModel(lbuf, pbuf) | return length of name |
| int lbuf; | the size of pbuf in bytes |
| char *pbuf; | a buffer for the model name |

DESCRIPTION lbuf

- *On entry*, an integer specifying the length of the buffer pbuf in bytes.

- *On exit*, the actual number of characters in the definition, including the terminator, or the value 0 (zero) if the symbol is not defined.

- If the actual length is longer than lbuf bytes, the actual length is returned.

pbuf
- A pointer to an output buffer for the Pascal string.
- The function returns a NULL if:

a) SDListModels hasn't been called, or b) There are no additional entries, or c) The file has been modified since the last call to SDListModels.

SUMMARY

- This function returns the name of the next model in the directory listing initiated by SDListModels.
- If the initial value of lbuf is 0 (zero) or pname is NULL, the function returns no name (pname is not changed). In any case, the function returns the actual length via lbuf.

SDWriteToken

PURPOSE

Take a token from a task's memory space and write it to a Voice file.

SYNOPSIS

```
void SDWriteToken(group, index, token)
    int group;        token group
    int index;        token index
    int token;        token ID assigned by driver
```

DESCRIPTION group
Specifies the non-zero token group ID to be assigned to the resident token.

index
Specifies the non-zero token index to be assigned to the resident token.

token
Specifies an integer ID for a resident token as returned by SDLoadToken, SDCollect, or SDRecognize.

SUMMARY

- This function takes a token from a task's memory space and writes it to the active Voice file.

- The argument token is an ID naming the resident token

- The arguments group and index specify the name to be given to the filed token.

- If a token already exists with the same group and index as the token being saved, the function overwrites the original token.

SDRmveToken

PURPOSE

Remove a token or set of tokens from the active Voice file.

SYNOPSIS

```
int SDRmveToken(group, lo_index, hi_index)
                                returns number of tokens removed
    int group;                  token group
    int lo_index;               token index, lower bound
    int hi_index                token index, upper bound
```

DESCRIPTION group — Specifies an integer ID for a token group, or the reserved value ALL_GROUPS which removes the token(s) from all groups in the file.

lo_index — Specifies an integer token index, or the reserved value ALL_INDICES. A lo_index of ALL_INDICES sets the lower bound to the first token in the group, i.e., token[1].

hi_index — Specifies an integer token index, or the reserved value ALL_INDICES.

A hi_index of ALL_INDICES sets the upper bound to the last token in the group.

SUMMARY

- This function removes a token or set of tokens from the active Voice file.

- The argument group names a token group.

- lo_index and hi_index specify the range of tokens within that group to remove.

- All tokens between lo_index and hi_index (inclusive) will be removed.

SDLoadToken

PURPOSE

Load a token from a Voice file into a task's memory space

SYNOPSIS

```
int SDLoadToken(group, index)
                              return the token ID assigned
    int group;                token group
    int index;                token index
```

DESCRIPTION group — Specifies the integer ID for the group.

index — Specifies the index in group of the token.

SUMMARY

- This function loads a token from the active Voice file into a task's memory space.
- The arguments group and index name the token to be loaded.
- The function returns an ID for the token which must be used to name the resident copy of the token.
- All resident tokens have optional labels which associate them with terminal symbols in the active language.
- The SDBuild and SDAdapt functions compare and give a warning message if the labels do not match.
- SDLoadToken labels the tokens it loads with the group ID that the tokens had in the Voice file.

SDDisposToken

PURPOSE

Delete a token or set of tokens from a task's memory space.

SYNOPSIS

```
int SDDisposToken(token, sym)
                              return the number of tokens deleted
    int token;                token ID assigned by the driver
    int sym;                  language symbol ID or 0 (zero)
```

DESCRIPTION token — Specifies the integer ID for the resident token, as returned by SDLoadToken, SDCollect, or SDRecognize, or the reserved value ALL_TOKENS.

sym — Optional symbol ID to delete multiple symbols.

SUMMARY

- This function deletes a token or set of tokens from a task's memory space.
- If the argument token is a token ID, the function ignores the argument sym and deletes the single token specified.
- If token has the wildcard value ALL_TOKENS and sym is 0 (zero), the function deletes all resident tokens.
- If sym is not 0 (zero), the function deletes only those tokens with the symbol sym (i.e., those tokens associated with the specified terminal symbol).

SDListTokens

PURPOSE

Count number of specified tokens in the active Voice file.

SYNOPSIS

```
int SDListTokens(group, index)
                        return the number of specified tokens
   int group;           token group, or ALL_GROUPS
   int index;           token index, or ALL_INDICES
```

DESCRIPTION group

- Specifies a token group.
- If group has the reserved value ALL_GROUPS, the function lists the token(s) named by index in all groups in the file.

index

- Specifies the token within a group to list.
- If index has the reserved value ALL_INDICES, the function lists all the tokens in the group.

SUMMARY

- This function returns a count of the number of specified tokens in the active Voice file.
- After a task has called this function to identify the directory it wishes to obtain, the task must call SDNextToken repeatedly to retrieve each directory entry.

SDNextToken

PURPOSE

Retrieve the next symbol prepared by SDListTokens.

SYNOPSIS

| | |
|---|---|
| int SDNextToken(pargs) | return group ID of next token |
| NextTokenPtr pargs; | return buffer |

DESCRIPTION pargs A pointer to a return structure:

```
struct         {
   int    group;
   int    index;
}      NextTokenRec, *NextTokenPtr;
```

group Returned group ID.

index Returned group index.

SUMMARY

- This function returns the group and index name of the next token in the list prepared by SDListTokens.
- The function returns the value 0 (zero) via group if:

a) SDListTokens has not been called, or b) There are no additional tokens to list, or c) The file has been modified since the last call to SDListTokens.

Chapter Six

Complex Functions

SDAdapt

PURPOSE

Adapt an existing model from a set of tokens.

SYNOPSIS

```
void SDAdapt(pargs, ptoklist)
    AdaptPtr pargs;
    TokenEntryPtr ptoklist;
```

DESCRIPTION

A_ADAPT

The structure is:

```
struct          {
    int sym;
    int all;
    int weight;
    int tolerance;
    int rejcnt;
    int ntokens;
    TokenEntryPtr ptoklist;
}   AdaptRec, *AdaptPtr;
```

S_TOKENTRY

```
struct          {
    int token;
    int rejcode;
} TokenEntryRec, *TokenEntryPtr;
```

sym

- An integer ID for a terminal symbol in the active language, naming the model to adapt.

all

- all gives the task a choice of:

a) Specifying which tokens should be used to adapt the model, or b) Having the driver use tokens it already has associated with the model.

- *True* if the model is to be adapted from all tokens in the task's memory space that have the label sym.

- If all is true, the function adapts the model from all tokens in the task's memory space with the label sym.

- The function returns the number of tokens used via ntokens and the ID's for the tokens via ptoklist.

- If the initial value of ntokens indicates ptoklist contains fewer entries than the number actually used, the function returns as many ID's as will fit in ptoklist.

- *False* if ptoklist names the set of tokens from which the model is to be adapted.

- If all is false, ptoklist must contain ntokens entries in which the token fields contain ID's naming the tokens from which the model is to be adapted.

- The function verifies that the labels for the tokens in ptoklist match the model's label, sym.

- If there is a mismatch the function adapts the model, but also returns a warning flag in the rejection code for that token.

- A mismatch may indicate that a model is being adapted from the wrong tokens.

weight

- An integer between 1 and 20 specifying the weighting to be applied, or the reserved value 0 (zero).

- The argument specifies how much to weight the new tokens with respect to the tokens originally used to adapt the model, plus those used in previous adapts.

- weight represents the total number of tokens that have been averaged into the model so far.

- If ntokens equals the number of new tokens, then the following formula expresses the weight of each new token as a fraction:

1 / (weight + ntokens )

Thus if weight is set to 1 and the model is adapted to a single new token, the program will give the new token equal weight to the combined weight of all previously averaged tokens.

- The default weighting is selected when weight equals 0 (zero).. The default is the actual number of previous tokens. It causes the program to apply equal weighting to all tokens.

- If weight is set to an illegal value it is truncated to the nearest legal value.

tolerance
- An integer argument specifying how tolerant the function should of variability in the token set.
- The argument can range over the following values:

1 - minimum tolerance
  3 - maximum tolerance

- If tolerance is out of range, the function truncates to the nearest legal value.
- The reserved value of 0 (zero) selects the default tolerance that is optimum for most situations.

rejcnt
- An integer output buffer for the number of tokens rejected.

ntokens
- *On entry*, an integer specifying the number of tokens in ptoklist.
- *On exit*, the number of tokens actually used to adapt the model.

ptoklist
- A pointer to a buffer of two-word TokenEntryRec structures, or a NULL pointer.
- The routine sets pargs->ptoklist equal to ptoklist before calling the driver function. (See all.)

SUMMARY

- SDAdapt adaptively trains the model associated with <sym> , a terminal symbol in the active language.
- The model must have been built to be adaptable (see SDBuild).
- The function does not delete the tokens from which the model was adapted.
- If all tokens are rejected during the adapt operation, the function leaves the original model unchanged.
- An adapted model remains so until a task reloads the model from disk.

SDBuild

PURPOSE

Build a model from a set of training tokens.

SYNOPSIS

```
SDBuild(pargs, ptoklist)
    BuildPtr pargs;
    TokenEntryPtr ptoklist;
```

DESCRIPTION parg A pointer to an information structure:

```
struct          {
     int sym;
     int all;
     int adaptable;
     int tolerance;
     int rejcnt;
     int ntokens;
     TokenEntryPtr pargs;
}BuildRec, *BuildPtr

struct          {
     int token
     int rejcode
}TokenEntryRec, *TokenEntryPtr;
```

sym An integer ID for the terminal symbol in the active language to be built.

all

- *True* if the model is to be built from all tokens in the task's memory space that have the label sym.

- The function returns the number of tokens used via and the ID's for the tokens via ptoklist.

- If the initial value of ntokens indicates that ptoklist contains fewer entries than the number of tokens actually used, the function returns only as many ID's as will fit in ptoklist.

- *False* if ptoklist names the set of tokens from which the model is to be built

- ptoklist must contain ntokens entries in which the token fields contain integer ID's naming tokens from which the model is to be built.

- The function verifies that the labels for the tokens in ptoklist match the model's label, sym.

- If there is a mismatch the function adapts the model, but also returns a warning flag in the rejcode for that token. A mismatch may indicate that a model is being adapted from the wrong tokens.

adaptable

- *True* if the model is to be adaptable, *false* if not.

- If adaptable is yes, the function builds a model that can later be adapted. (See SDAdapt.)

- An adaptable model is approximately fifty percent larger than one that cannot be adapted.

tolerance

- An integer specifying the amount of variability to be tolerated in the tokens.
- The argument can range over the following values:

1 - minimum tolerance
  3 - maximum tolerance

- If tolerance is out of range, the function truncates it to the nearest legal value.
- The reserved value of 0 (zero) selects a default which is optimum for most situations.

ptoklist

- Specifies a pointer to a buffer of TokenEntryRec structures, or a NULL pointer.

SUMMARY

- SDBuild builds a model for the terminal symbol sym in the active language.
- The argument pargs->ntokens should contain the number of elements in the array.
- The routine sets pargs->ntokens to ptoklist before calling the driver.

SDCollect

PURPOSE

Collect a training token from the next utterance in a task's talkahead queue.

SYNOPSIS

```
void SDCollect(pargs, sym)
   CollectPtr pargs;

   int sym;                    terminal symbol ID
```

DESCRIPTION pargs

A pointer to an information structure:

```
struct          {
      int token;
      int amplitude;;
      int loudsoft;
      int rejcode;
      int *psym;
}CollectRec, *CollectPtr;
```

token

- An integer output buffer for an assigned token ID.
- The function returns a 0 (zero) ID if rejection occurs.

amplitude

- Specifies the amplitude of the utterance collected.
- The measure is in decibels, where 0dB is the current background noise level.
- The amplitude is in the following range:

0 - Silence
  30 - Minimum optimum speech level
  40 - Typical level for speech
  126 - Maximum amplitude loudsoft

- Specifies whether the user is speaking too loudly or too softly.
- The function returns one of the following values:

1 - Too soft
  2 - Amplitude OK
  3 - Too loud rejcode

- Specifies the rejection code, indicating whether or not the utterance was rejected.
- Appendix B contains a list of rejection codes and their meanings.

sym

- Specifies a terminal symbol ID with which the token is to be associated.
- psym is set to point to sym before the driver is called.

SUMMARY

- This function collects a token for training and puts it in the task's memory space.
- The function returns an ID which must be used for all future references to the token.
- SDCollect constructs the token from the next utterance in the task's talkahead queue.
- If the queue is empty when the function is called:
  - It waits until the driver hears an utterance.
  - The driver listens only if the task has called SDListen to activate interrupt-level listening for speech.
  - The SDCollect function returns a special rejection code via rejcode if the queue is empty and listening is not enabled.

- A task can designate a watchdog function to be called periodically while the SDCollect function is waiting for an utterance:

- The watchdog can check on the status of the driver by calling SDStatus.

- It can terminate the SDCollect function by calling SDQuit. Typically a watchdog would trigger a termination in response to some external event, such as a keystroke.

- To install a watchdog function, a task should call the function SDEventHandler before calling SDCollect.

SDRecognize

PURPOSE

Recognize the next utterance on the task's talkahead queue, using the grammar defined by a primary production.

SYNOPSIS

```
void SDRecognize(pargs, pactions)
  RecogPtr pargs;
  int *pactions;
```

DESCRIPTION pargs

A pointer to an input/output block:

```
struct          {
  int production;
  int state;
  int rejthresh;
  int intoken;
  int insym;
  int docollect;
  int answer;
  int newstate;
  int endflag;
  int rejcode;
  int confidence;
  int amplitude;
  int loudsoft;
  int token;
  int toplist(5);
  int distances(5);
  int *pactions;
 }RecogRec, *RecogPtr;
```

production

- An integer ID for a primary production in the active languag… or one of the reserved symbols: CURRENT_SYMBOL, ALL_SYMBOLS, ROOT_SYMBOL.

- CURRENT_SYMBOL names the production most recently recognized. It can be used to cause the recognizer to step through an active production. If there is no current production, it causes the function to initiate recognition of a language's root production.

- ROOT_SYMBOL makes the root production in a language. It can be used to initiate recognition of a language's main production.

- ALL_SYMBOLS causes the function to simultaneously recognize all terminal symbols in the language. In this case, the function ignores the argument state.

state

- An integer ID for a state in production, or one of the reserved values: CURRENT_STATE, ALL_STATES.

- CURRENT_STATE names the current state of production. It can be used when a task wishes to step through all of the states of production. Otherwise state names a specific state to be recognized in a production.

- ALL_STATES causes the function to simultaneously recognize all terminal symbols in the named production. In this case the recognizer does not step through the production's grammar, and the returned newstate is set to ALL_STATES.

rejthresh

- Specifies a rejection threshold for recognition.
- The measure is an integer between 1 and 100, or the reserved value 0 (zero) if the default threshold is to be used.

1 - Widest variation accepted
  100 - Tightest tolerance

- If an out of bounds rejthresh is specified, the function truncates it to its nearest legal value.

intoken

- Specifies an ID for a token to be recognized, or the reserved value 0 (zero).
- For normal recognition, intoken should be 0 (zero).
- Can also b… sed to recognize pre-collected tokens (see below).

insym

- The ID for a terminal symbol in the active language, or the reserved value 0 ( zero).
- For normal recognition, insym should be 0 (zero).

• Can also be used to artificially step through production (see below)

docollect
• Flag: *true* if a token is to be collected during recognition; *false* otherwise.

• The ID is returned via token (see below).

answer
• Returns the terminal symbol ID of the recognized utterance.

• If the utterance was rejected, answer is set to 0 (zero).

newstate
• Returns the new current state of the production being recognized.

• If production is ALL_SYMBOLS, or state is ALL_STATES, the function sets newstate equal to ALL_STATES.

endflag
• Returns a flag indicating *true* if the end of production has been reached.

rejcode
• Returns the rejection code.

• Appendix B contains a list of rejection codes and their meanings.

confidence
• Returns a measure of the recognizer's confidence in its selection.

• The measure is a number between 1 and 100:

0 - Lowest confidence
100 - Highest confidence amplitude
• Returns the measure of amplitude of the recognized utterance.

• The measure will be in the following range:

0 - Silence
30 - Minimum optimum speech level
40 - Typical level for speech
126 - Maximum amplitude loudsoft
• Returns an indication of whether the user is speaking too loudly or too softly.

• The measure will be in the following range:

1 - Too soft
2 - Amplitude OK
3 - Too loud token
• Returns the optional token ID if docollect was true.

toplist
• Returns the recognizer's top five choices.

- If fewer than five models were acceptable, the function terminates toplist with a 0 (zero).

distances
- Returns distance measures for the recognizer's top fives choices.
- The measures are in the following range:

| | |
|---|---|
| 0 | - Best fit (the best choice) |
| 254 | - Worst fit |

lactions
- The length of the pactions, or 0 (zero) if no actions are to be returned.

pactions
- A pointer to an output buffer for a list of productions completed as a result of recognition. This is required only if lactions is not 0 (zero).
- The productions are listed lowest to highest precedence.
- If the utterance was rejected, the first item in the list is 0 (zero).
- The function returns no more than lactions items including the terminator.

SUMMARY

- This function recognizes an utterance using the grammar defined by a production in the active language.
- The arguments production and state name a primary production and a state within that production which defines the utterances that are to be active for the recognition.
- When the recognizer reaches the end of a production, it remains at that state (i.e. CURRENT_SYMBOL continues to name the production's final state) until a task explicitly directs it to return to the beginning of the current or a new production.
- A task must explicitly load the models required for recognition into its memory space prior to calling SDRecognize. The standard way to do this is to call the function SDLoadModel before each recognition.
- SDLoadModel can be directed to:

a) Load just those models required for the next recognition, b) Load the models required for the recognition of the whole production, or c) Load the models for an entire language.
- The SDRecognize function does not recognize utterances corresponding to terminal symbols that are inactive. (See functions SDActivate and SDDeactivate.)

- The function ignores terminal symbols for which no models are resident. Thus it is not an error to attempt to recognize from a partially trained vocabulary. The function simply will not recognize untrained or inactive utterances. The function does report an error if there are no active terminal symbols or resident models.

- Normally the SDRecognize function recognizes the next utterance in the task's talkahead queue.

- If the queue is empty when the function is called, it waits until the driver hears an utterance.

- The driver listens if a task has called SDListen to activate interrupt-level listening for speech.

- The SDRecognize function returns a special reject code via rejcode if the queue is empty and listening is not enabled.

- Alternatively, the function can be directed to recognize a token that had been collected earlier.

- This mode is intended primarily for automatic testing procedures.

- It permits utterances to be collected, saved in a file, and recognized off-line at a later time.

- If the argument intoken is non-zero, it specifies the ID for a token to be recognized.

- The function can be directed not to recognize at all, but rather to pretend that a particular utterance was recognized.

- This capability is provided for applications that wish to cause transitions through a production in response to input other than speech.

- If the argument insym is non-zero, it specifies the ID of the terminal symbol in the active language. In that case, the function does not attempt to recognize, and simply acts as if insym were recognized.

- A task can designate a watchdog event handler to be called periodically while the SDRecognize function is waiting for an utterance.

- The watchdog can check on the status of the driver (by calling SDGetMemStat).

- The watchdog can terminate SDRecognize by calling SDQuit.

- Typically a watchdog would trigger a termination in response to some external event, such as a keystroke.

- To install a watchdog function, a task should call SDEventHandler before calling SDRecognize.

• If the argument docollect is *true*, the function saves a token for the recognized utterance and returns an ID via token.

- The token can be used for later building, adaptation, or even recognition.

- The function assigns the token a label which is the ID of the terminal symbol corresponding to the recognized utterance.

- If the utterance was rejected, the function does not label the token.

- For all rejections except those due to low confidence, the function collects no token and returns the value 0 (zero) in token.

- If both docollect is true and intoken is specified, the function simply returns the ID intoken via token. It does not create a new output token.

SDEventHandler

PURPOSE

Designates an event handler routine

SYNOPSIS

```
void SDEventHandler(event, pfunc)
   int event;              event ID number
   void (*pfunc)();        address of watchdog routine
```

DESCRIPTION event — Event ID number (see below).

pfunc — Specifies the function to be called when event occurs.

SUMMARY

• This function designates a routine to be called when one of the following events occur:

| EVENT | DESCRIPTION |
|---|---|
| 0 - START | Start of utterance during listening |
| 1 - END | End of utterance during listening |
| 2 - OVERFLOW | Talkahead queue overflow during listening |
| 3 - WATCHDOG | Watchdog timer during SDCollect or SDRecognize |

- An event handler can in turn call the Speech Driver function SDStatus or SDQuit. The driver reports an error if a handler attempts to call any other function.
- All events except watchdog occur at interrupt level during listening.
  - Interrupt-level handlers must execute in less than 10 milliseconds, or speech samples can be lost.
  - The board will report a fatal error if the event handler does not return soon enough to avoid speech loss.
- The watchdog event occurs at regular intervals whenever the functions SDCollect or SDRecognize are running.
  - The driver guarantees to call the watchdog routine approximately every 250 milliseconds.
  - There are no restrictions on the execution time of a watchdog handler.
  - However, time spent in a handler increases the time required for recognition.
  - If a watchdog calls SDQuit, the speech function that called the watchdog aborts immediately after the watchdog returns. It also returns a special rejection code indicating the reason for the abort.

SDQuit

PURPOSE

Terminate the SDRecognize or SDCollect functions.

SYNOPSIS void SDQuit()

SUMMARY

- This function is intended to be called by a task's watchdog event handler.
- If the driver is currently recognizing an utterance or collecting a token, SDQuit causes the function to terminate immediately and return the quit rejection code.

SDStatus

PURPOSE

Check the status of the Speech Driver

SYNOPSIS

```
void SDStatus(pargs)
   StatusPtr pargs;          address of status buffer
```

DESCRIPTION pargs — Specifies the address of a status structure:

```
struct        {
  int     flags;
  int     depth;
  int     amplitude;
}StatusRec, *StatusPtr
```

flags — All flags (except mic_switch) are set to *false* after the function returns their values:

| FLAG | NAME |
|---|---|
| 0x01 | START |
| 0x02 | END |
| 0x04 | OVERFLOW |
| 0x10 | WATCHDOG |

START — True if the driver has detected the beginning of an utterance since the last call to SDStatus.

END — True if the driver has detected the end of an utterance since the last call to SDStatus OVERFLOW — True if the task's talkahead queue has overflowed since the last call to SDStatus.

- The overflow condition occurs when there is not enough room on the talkahead queue for an incoming utterance.

- If none of the utterance has yet been placed on the queue, the driver discards the entire utterance.

- If the overflow occurs when part of an utterance has already been queued, the driver marks the queued portion with an overflow flag and discards the rest of the utterance.

- If a task attempts to recognize an utterance so flagged, the driver will return a special reject code indicating that the utterance was truncated because of a queue overflow.

MIC_SWITCH

- True if microphone switch is on. This flag is only valid for hardware that supports a microphone switch.

depth — Specifies the current number of utterances on the talkahead queue, including the utterance currently being heard.

amplitude
- Specifies a measure of the instantaneous amplitude of the utterance currently being spoken.
- The measure is in decibels, where 0dB is the current background noise level.
- The amplitude is in the following range:

0 - Silence
  30 - Minimum optimum speech level
  40 - Typical level for speech
  126 - Maximum amplitude

SUMMARY

- This function returns information about the Speech Driver.
- The METER function returns additional information about speech signal levels.

Chapter Seven

Miscellaneous

SDMeter

PURPOSE

Measure the signal level on the speech input channel.

SYNOPSIS

```
void SDMeter(pargs)
   MeterPtr pargs;
```

DESCRIPTION pargs — A pointer to a structure returned by the function:

```
struct        (
    unsigned int max_level;
```

```
        unsigned int noise_level;
        unsigned int speech_level;
        int speech;
        int clipping;
        int noise_warning;
        int mic_switch
}MeterRec, *MeterPtr;
```

max_level — Maximum dynamic range of input hardware, in dB.

noise_level — Current average noise, in dB.

speech_level — Current speech signal level, relative to the average background level, in dB.

speech — Flag:

- *True* if an utterance is being spoken;
- *False* if not.

clipping — Flag:

- *True* if the input signal is clipping (within approximately 6dB of max_level);
- *False* if not.

noise_warning — Flag:

- *True* if background noise level is too high for recognition;
- *False* if not.

mic_switch — Flag:

- *True* if microphone switch is enabled;
- *False* if it is ignored.

(If there is no hardware switch, the flag is always true.)

SUMMARY

- This function measures the signal levels on the speech input channel and returns the information described above in the argument block.
- The signal levels returned are only valid if listening is enabled.
- speech_level is the instantaneous signal level, relative to the background noise.

• When the instantaneous level exceeds a certain threshold, it triggers the start of an utterance.

• The end of the utterance is triggered when the signal falls below another threshold.

SDGetParam

PURPOSE

Get the current value of a Speech Driver parameter.

SYNOPSIS

```
void SDGetParam(param, value)
   int param;                      parameter ID
   struct <param_type> *value;     address of parameter block
```

DESCRIPTION param

• Specifies the parameter.

value

• Specifies the buffer to which the parameter value should be written.

• For most parameters the value is a single integer. Some parameters have more complex values.

SDSetParam

PURPOSE

Set the value of a parameter.

SYNOPSIS

```
void SDSetParam(param, pvals)
   int param;                      parameter ID number
   struct <param_type> *pvals;     address of buffer
```

DESCRIPTION param

Specifies the integer ID number for a parameter that can be set.

pvals

Specifies the address of a structure containing the value to be assigned to the parameter.

SUMMARY

• This function sets the parameter param to the value contained in pvals.

• For most parameters, the value is a single integer. Some parameters have more complex values.

SDSelectChannel

PURPOSE

Select an input channel.

SYNOPSIS

```
void SDSelectChannel(chl)
   int chl;
```

DESCRIPTION chl Specifies an channel ID number, from the list of defined channels:

| ID | NAME | DESCRIPTION |
|---|---|---|
| 0 | MIC_CHANNEL | Standard microphone input |
| 1 | LINE_CHANNEL | Line-level input |
| 2 | TEL_CHANNEL | Telephone input |

SDErrorHandler

PURPOSE

Establish an error handler

SYNOPSIS

```
void SDErrorHandler(errfunc)
   void (*errfunc) ();
```

DESCRIPTION

• Designate an error-handling procedure to be called whenever the Speech Driver returns an error.

• The handler is defined as follows:

```
errfunc (scode, funcID)
   int scode;          driver error code
   int funcID;         ID of driver function reporting error.
```

SDStatusCode

PURPOSE

Return most recent status code

SYNOPSIS

```
int SDStatusCode()
```

SUMMARY

- Returns a two-byte status code returned by the most recent Speech Driver call.
- For normal returns the status code is zero.
- Non-zero indicates error.

SDClassName, SDFunctionName, SDErrorName

PURPOSE

Return the name of an error class, function, or error.

SYNOPSIS

```
SDClassName(num, string)
SDFunctionName(num, string)
SDErrorName(num, string)
   int num;
   str255 *string;
```

SUMMARY

- Returns the address of a text string containing the name of the class, function or error for num.

SDStyle

PURPOSE

Return the Speech Driver's style.

SYNOPSIS

```
int SDStyle()
```

SUMMARY

- Returns the Speech Driver style as reported by SDOpenTask.
- The style parameter is used to distinguish different implementations of the driver.

• The following styles are currently defined:

| STYLE | DRIVER |
|---|---|
| 4 | Speech Board with automatic calibration |

SDVersion

PURPOSE

Return the version number of the Speech Driver.

SYNOPSIS int SDVersion()

SUMMARY

Returns the version of the Speech Driver as reported by SDOpenTask.

Appendix A
Speech Driver Error Codes

Introduction

- All Speech Driver functions return a status code indicating whether the operation was successful.
- A code of zero indicates that the function completed successfully.
- A non-zero code indicates that an error was encountered.

Status Code

- A status code is a sixteen-byte value divided into two fields, as shown below:

| 15 8 | 7 0 |
|---|---|
| error code | error class |

- The low byte is an error class, which indicates the general nature of the error. In most cases, it is sufficient to examine the class field to determine how to handle an error.
- The high byte contains a specific error code.

Error Classes

1 Internal Error

The driver detected an internal error, caused by either a programming bug or some other program corrupting the driver's memory.

2 Hardware Failure

The driver detected a failure in the speech input hardware.

3 Bad Request

The calling program requested an illegal operation or specified an out of bound argument value.

4 File Access Error

An error was reported by the operating system during a Voice or language file access.

5 Out of Memory

The driver has run out of heap space.

6 Bad File

The driver detected an internal inconsistency in a Voice or language file.

This error usually means that a file has become corrupted or the application attempted to access a file of the wrong type.

7 Calibration Mismatch

An attempt was made to open (via SDSelectVoice) a Voice file that is incompatible with this version of the Speech Driver.

8 Resource Unavailable

SDOpenTask found no task handles available.

9 Too Many Items

The calling program attempted to create too many instances of some object. Specifically, the program attempted to:

a) Load too many languages at once, b) Create too many tokens, or c) Recognize too many models simultaneously.

10 Item Not Found

A specified model or token does not exist.

11 Claim Error

A SDClaim operation failed because:

a) Another task owns the channel, or b) The calling program attempted an operation requiring ownership of the speech channel when it did not own the channel.

Specific Error Codes

1 BAD_PARAMETER_ID (Class: BAD_REQUEST)

An illegal parameter ID number was specified to SDSetParam or SDGetParam.

2 BAD_PARAMETER_VALUE (Class: BAD_REQUEST)

An out of bounds parameter value was specified to SDSetParam.

3 FILE_OPEN (Class: FILE_ACCESS_ERROR)

An attempt to open Voice or language file failed.

4 FILE_CREATE (Class: FILE_ACCESS_ERROR)

An attempt to create a Voice or language file failed.

5 FILE_SEEK (Class: FILE_ACCESS_ERROR)

A failure occurred while performing a seek in a Voice or language file. Typically, an attempt was made to seek beyond the end of file. This error indicates that the file may be corrupted.

6 FILE_CLOSE (Class: FILE_ACCESS_ERROR)

A file close operation failed.

7 FILE_READ (Class: FILE_ACCESS_ERROR)

An error occurred while reading a Voice or language file.

8 FILE_WRITE (Class: FILE_ACCESS_ERROR)

An error occurred while writing a Voice or language file.

9 BAD_FUNCTION (Class: BAD_REQUEST)

An illegal function ID was passed to the driver.

10 BAD_TASK (Class: BAD_REQUEST)

An inactive or out of bounds task ID was passed to the driver.

11 PORT_UNCLAIMED (Class: CLAIM_ERROR)

An attempt was made to perform an operation that required ownership of the speech channel, but the task did not own the channel.

12 ALREADY_ENTERED (Class: BAD_REQUEST)

An attempt was made to call a function other than SDStatus or SDQuit from a watchdog event handler.

13 UNINITIALIZED (Class: BAD_REQUEST)

An attempt was made to perform an operation that required the existence of a driver memory space before SDInitMem was called.

14 TASK_UNAVAILABLE (Class: RESOURCE_UNAVAILABLE)

No free task handles are available. The maximum number of tasks are already active.

15 CLAIM_DENIED (Class: CLAIM_ERROR)

A speech channel SDClaim request was issued with seize equal to no, and another task already owns the channel.

16 ALREADY_LISTENING (Class: BAD_REQUEST)

An attempt was made to perform an operation that required that listening not be enabled.

17 NOT_LISTENING (Class: BAD_REQUEST)

An attempt was made to perform an operation that required that listening be enabled.

18 REQUEST_TOO_SMALL (Class: BAD_REQUEST)

The initial memory size passed to SDInitMem was too small.

19 OUT_OF_MEMORY (Class: OUT_OF_MEMORY)

The driver ran out of heap space or a grow attempt failed.

20 MEMORY_CORRUPTED (Class: INTERNAL_ERROR)

The driver detected that its memory space has become corrupted. This error suggests a failure due to a driver programming bug, or that another program has overwritten the heap.

21 NEGATIVE_TRIM (Class: INTERNAL_ERROR)

This is another form of memory corruption.

22 MEM_SHRINK (Class: BAD_REQUEST)

A new memory size passed to SDGrowMem was smaller than the current memory size.

23 FEP_BAD_PARAMETER (Class: INTERNAL_ERROR)

An out of bounds parameter was passed to the hardware interface module, because of a bug in the driver.

24 FEP_TIME_OUT (Class: HARDWARE_FAILURE)

The data acquisition hardware failed to respond within a prescribed period of time.

25 FEP_BAD (Class: HARDWARE_FAILURE)

The driver detected a failure in the data acquisition hardware.

26 FEP_WRONG_VERSION (Class: HARDWARE_FAILURE)

The version number reported by the data acquisition driver hardware is incompatible with this version of the driver.

27 FEP_BAD_RAM (Class: HARDWARE_FAILURE)

Data memory within the data acquisition hardware is faulty.

28 FEP_CHECKSUM_ERROR (Class: HARDWARE_FAILURE)

Program memory within the data acquisition hardware is faulty.

29 FEP_INIT_NOT_CALLED (Class: INTERNAL_ERROR)

A driver programming bug.

30 FEP_LISTENING (Class: INTERNAL_ERROR)

A driver programming bug.

31 TOO_MANY_LANS (Class: TOO_MANY_ITEMS)

An attempt was made to load more than the legal number of languages.

32 BAD_LANGUAGE_HANDLE (Class: BAD_REQUEST)

A reference was made to an inactive or out of bounds language ID.

33 NO_ACTIVE_LANGUAGE (Class: BAD_REQUEST)

An attempt was made to perform an operation requiring that a language be active, but no language is active.

34 Obsolete

35 BAD_TOKENS (Class: BAD_REQUEST)

A reference was made to one or more illegal token handles.

36 Obsolete

37 MODEL_NOT_RESIDENT (Class: ITEM_NOT_FOUND)

A reference was made to a model which is not resident.

38 Obsolete

39 TOO_MANY_ACTIVE (Class: TOO_MANY_ITEMS)

An attempt was made to recognize more than the maximum legal number of active terminal symbols.

40 CAL_MISMATCH (Class: CALIBRATION_MISMATCH)

A SDSelectVoice operation was attempted, but the Voice file is incompatible with this version of the Speech Driver.

41 TOO_MANY_TOKENS (Class: TOO_MANY_ITEMS)

An attempt was made to SDBuild or SDAdapt from more than seventy-five tokens.

42 QUEUE_TOO_BIG (Class: BAD_REQUEST)

The size of the talkahead queue specified by SDInitMem was too large.

43 BAD_SYMBOL (Class: BAD_REQUEST)

An unknown language symbol was specified, or a symbol was specified with a type illegal for the requested operation.

44 BAD_STATE (Class: BAD_REQUEST)

A state was specified which is illegal for the current production.

45 INACTIVE_SYMBOL (Class: BAD_REQUEST)

An insym was specified to SDRecognize which was not active for the current state of the finite state machine.

46 BAD_LDF (Class: BAD_FILE)

A language file was opened which contained internal inconsistencies. Usually this indicates that the file has become corrupted or is not really a language file.

47 NO_ACTIVE_VOCABULARY (Class: BAD_REQUEST)

An operation was attempted that required an active Voice file, but there wasn't one active.

48 BAD_VOC_FILE (Class: BAD_FILE)

A Voice file was opened which contained internal inconsistencies. Usually this indicates that the file has become corrupted or is not really a Voice file.

49 VOC_FILE_FULL (Class: TOO_MANY_ITEMS)

The maximum Voice file length was exceeded.

50 Obsolete

51 Obsolete

52 BAD_TOKEN_NAME (Class: BAD_REQUEST)

An illegal Voice file token group or index was specified. (It was less than or equal to zero.)

53 TBLBAD (Class: INTERNAL_ERROR)

An internal driver table has become corrupted. This usually indicates that the driver's program segment has been modified.

54 AMBBAD (Class: BAD_FILE)

The calibration information in a Voice file was corrupted. This usually indicates that the Voice file has become corrupted, or is not really a Voice file.

55 Internal Error

56 NOTADAPTABLE (Class: BAD_REQUEST)

An attempt was made to adapt a model which was not originally built to be adaptable.

57 IRQ_BUSY (Class: HARDWARE_FAILURE)

The driver found that the hardware line it was to use was already in use.

58 NAME_ALREADY_EXISTS (Class: BAD_REQUEST)

SDSetSymName was passed a new symbol name that already exists.

59 GENERAL_ERROR (Class: INTERNAL_ERROR)

The driver detected an internal error, caused by either a programming bug or some other program corrupting the driver's memory.

Appendix B

Speech Driver Rejection Codes

Introduction

• This appendix lists the rejection codes returned by the functions SDAdapt, SDBuild, SDCollect and SDRecognize. The functions that return each specific code are listed in the column FUNCTIONS as follows:

| | |
|---|---|
| A | **SDAdapt** |
| B | **SDBuild** |
| C | **SDCollect** |
| R | **SDRecognize** |

• If the functions SDAdapt or SDBuild find that the label of a token does not match the terminal symbol ID for the model being built or adapted, the functions OR the rejection code for that token with the warning flag 0x8000.

| CODE | FUNCTIONS | DESCRIPTION |
|---|---|---|
| 0 | | **No rejection** |
| 1 | R | **Low confidence.**<br><br>Confidence is below rejection threshold. During SDRecognize, the Speech Driver's confidence that an utterance was correctly recognized was worse (less) than the threshold specified. |
| 2 | C, R | **Quit**<br><br>A SDQuit command was called from a watchdog event handler. |

| | | |
|---|---|---|
| 3 | C, R | **Not Listening**<br><br>The function found the talkahead queue empty, and listening was not enabled. |
| 4 | A, B, C, R | **Truncated utterance.**<br><br>An utterance in the talkahead queue was truncated. The code indicates that the application program suspended listening (via SDPause) while the user was speaking. |
| 5 | A, B, C, R | **Queue overflow**<br><br>The talkahead queue overflowed while the user was speaking, and the remainder of the utterance was lost. |
| 6 | C, R | **Token overflow**<br><br>The utterance being collected is too long to fit in the largest token buffer allowed. |
| 7 | A, B | **No preceding silence**<br><br>No silence preceded an utterance. This code indicates that the user was already speaking when the application program enabled listening (via SDListen), or that the user did not pause long enough between utterances. |
| 8 | A, B | **Token too different**<br><br>A token used to adapt or build a model was too different from the others and was not averaged in to the model. |
| 9 | R | **No active models**<br><br>There are no active models for the specified production and state. |

Part III

HyperCard Applications

Chapter One

VoiceTalk:

An Extension of HyperTalk

The VoiceTalk Stack includes XCMD's and XFCN's for controlling voice recognition in HyperTalk scripts. "Install" and "Remove" buttons allow you to add or delete these commands from HyperCard stacks.

Commands include:

| | |
|---|---|
| InitVoice | Collect |
| QuitVoice | Build |
| LoadLang | Trained |
| LoadVoice | Recognize |
| CloseVoice | Vocabulary |
| Listen | Macro |

How Does VoiceTalk Work?

• Double-click on the VoiceTalk icon. Select a command. The explanation of the command appears on the left, and the command on the right.

• To install, press the Install button; to remove, press the Remove button.

• The commands with their descriptions are listed on the following pages.

InitVoice

InitVoice
InitVoice <errorhandler>

```
on openStack
   InitVoice "VoiceError"
   if the result is not empty then
      -- there's a problem
   end if
end openStack
```

• You must use InitVoice to initialize the Voice Driver before using any of the voice functions.

• If you pass InitVoice the name of a HyperCard handler, it will be called in the event of an error generated by any of the VoiceTalk commands.

• InitVoice initializes the following global variables (as well as some private global variables for its own internal use):

| | |
|---|---|
| SDActive | True if the Voice Driver is working |
| SDState | The number of the current state |
| SDConfidence | The confidence set by the last recognize() |
| SDAmplitude | The amplitude set by the last collect()/recognize() |

• If there is a problem with the driver, the result will contain an error message.

• SDState is initialized to 1.

QuitVoice

QuitVoice

```
on closeStack
   -- close and update active voice file
   put CloseVoice() into oblivion
   -- and exit gracefully
   QuitVoice
end closeStack
```

• Use QuitVoice before quitting HyperCard to free up any memory associated with the Voice Drivers and to close any open voice files.

LoadLang

LoadLang()
LoadLang(filename)

```
get LoadLang("HD:foo.ldf")
if it is not empty then...

get LoadLang()
if it is not empty then
    put it into langName
else
    -- the user cancelled
```

• Filename is the name of any language template on your Macintosh, or a source that yields such a name.

• If the specified file cannot be found, LoadLang calls the standard open file dialog routine.

• LoadLang returns the name of the file.

LoadVoice

LoadVoice
LoadVoice(filename)

```
get LoadVoice("HD:foo.vox")
if it is not empty then...

get LoadVoice()
if it is not empty then
    put it into voice
else
    -- the user cancelled
```

• Filename is the name of any voice file on your Macintosh, or a source that yields such a name.

• If the specified file cannot be found, LoadVoice calls the standard open file dialog routine.

• LoadVoice returns the name of the file.

CloseVoice

CloseVoice()
CloseVoice(filename)

```
put CloseVoice() into oblivion

get CloseVoice()
if it is empty then
   -- user cancelled
else put it into voice
```

• Filename is the name of any voice file on your Macintosh, or a source that yields such a name.

• If filename is not specified, CloseVoice calls the standard save file dialog routine.

• CloseVoice returns the name of the file.

Listen

Listen

```
-- wait for the user to say 'hello'
listen
repeat forever
   get recognize()
   if it is 'hello' then
   exit repeat
end repeat
```

• Listen prepares the Speech Driver to accept speech input.

• Listen also purges the talkahead queue.

• Listen must be called before collect or recognize, and probably should be called after build to purge the talkahead queue.

Collect

Collect(theWord)

```
-- collect three iterations
put 1 into i
repeat forever
    if i > 3 then exit repeat
    if collect (theWord) then
    add 1 to i
end repeat
```

• Use repeatedly to collect several iterations of an utterance for building a model.

• Normally collect returns *false*. If an utterance is detected and was successfully collected, collect returns *true*.

• Collect sets the global variable SDAmplitude.

• See build.

Build

Build(theWord)

```
-- example of one iteration
-- training

if collect(theWord) then
    if build(theWord) then
    -- train next word
```

• Use build after collecting utterances to build a model.

• Build returns *true* or *false* depending on whether it was successful or not.

• See collect.

Trained

Trained(theWord)

```
if trained(theWord) then
    -- mark it
    put '◊' before theWord
else
    -- train it
end if
```

• Trained returns *true* or *false* depending on whether theWord is trained or not.

Recognize

Recognize()
Recognize(theWord)

```
on idle
    global SDConfidence
    put recognize() into rword
    if rword is not empty and
    SDConfidence > 80 then
        put rword into message
    end if
end idle
```

• Normally recognize returns the empty string. If an utterance is detected, recognize returns the name of the recognized word.

• Recognize also sets these global variables: SDState, SDConfidence, SDAmplitude.

Vocabulary

Vocabulary()

```
get vocabulary()
put it into field 'word list'
```

• Vocabulary returns the list of words currently active.

• *Note:* If you want a list of all the words in a particular Word List, set the global variable SDState to -2.

Macro(theWord)

Macro(theWord)

```
get macro(theWord)
if it is not empty then do it
```

• Macro returns the macro string associated with theWord.

• The macro string might be a HyperTalk command, for instance.

• *Note:* The association between the macro string and the word is defined in the language file.

Chapter Two

VoiceWorks

This chapter includes:

- What Is VoiceWorks?
- Setting Up
- Training
- Listening (Testing)

What Is VoiceWorks?

VoiceWorks is a HyperCard stack demonstrating the use of VoiceTalk XCMD's. VoiceWorks is similar to the VoiceTrain program used to train words for voice recognition.

*Note: VoiceWorks is meant to serve as an example of accessing voice from HyperCard, not as a workable application for training words at this time.*

Setting Up (1) *Click on the VoiceWorks icon*

(2) *If asked whether the Speech Box is installed, click "Yes."*

(3) *Click on the Language icon.*

You will be asked to load a Language (Word List) for your application.

(4) *Select the Word List for your application.*

• The name of theWord List at the right-hand side of the window. The number of words in the list is indicated on the line below.

• Notice that the Voice icon appears next the Language icon. This allows you to load a Voice, if you've already done a training and have a Voice file stored.

(5) Make sure you're in the "Not Listening" mode while you're training. Listening is for testing the words after training.

*Click on the icon if it shows "Listening" to change to "Not Listening".*

(6) Choose the number of trainings you want to give each word.

*Click on the down or up arrow to increase or decrease the number of trainings. Notice the number changes in the box.*

(7) Check the "Use Grammar" option at the bottom of the Word List.

• This allows you to train words by groups (levels) of active words. If you do not check "Use Grammar," all the words will be displayed for training at once.

• *Click on the Use Grammar box to train in levels. To train all words at once, do not click on Use Grammar.*

• The group of words you're training is displayed on the upper left hand side of the Word List. Next to it is the number of words in that group (level), and the number of words that have been trained.

Training

Decide what type of training you want to do:

Train All Words
Train Selected Words
Train Untrained Words.

Each option is described below.

Train All Words (1) *Click on theTrain All Words button..*

• Notice that "Training" appears at the top left, with the number of trainings in parenthesis, for example (1,3) indicating it's ready for the first of three trainings.

• The first word to be trained appears highlighted after Word.

(2) *Say the word into the microphone the appropriate number of times.*

• When you've finished training, the word "Build" appears at the top to show that the voice model for that word is being built. Then the next word will appear listed at the top for training.

• *Note:* In all training modes (Train All, Train Selected Words, or Train Untrained Words), a diamond (◊) appears next to each word in the Word List on the right after training of that word is completed.

• The number of words trained is indicated on the upper right-hand side of the Word List.

Train Selected Words (1) *Select the words you wish to train by clicking on them. Select a group of words by using shift-click.*

A bullet (•) appears next to each selected word, showing they're ready for training.

(2) *Click on the "Train Selected Words" button.*

The first word for training will appear in a box at the bottom of the window, with the number of trainings in parenthesis.

(3) *If you're training individual words one at a time rather than in a selected group:*

*After each word is trained ,click on the next word in the Word list and then click on "Train Selected Words."*

*Proceed as above.*

Train Untrained Words

(1) *Click on "Train Untrained Words" to train all words that don't have a diamond next to them.*

(2) *Say each word as they come up in the box at the bottom of the window.*

Listening (Testing)

"Listening" allows you to test the words you've trained.

(1) *Click on the icon to convert from "Not Listening" to "Listening".*

(2) *Say the word that appears at the top left -hand side of the card.*

(3) *Check the display showing Word, Confidence and Amplitude.*

- Word: Shows what word was recognized.

*If this is not the word you said, check Confidence and Amplitude.*

- Confidence: There will be a number between 1 and 100. If the word displayed is not the word you said, the confidence level will be low (probably below 85).

*Try saying the word again. If you get an incorrect display, try retraining the word or saying it the way you did when you trained it the first time. Also check amplitude below.*

- Amplitude: The number displayed represents the decibel level above the background noise. The optimum level is between 30-40.

*If the amplitude is below 30, try saying the word more loudly or increasing the volume on your microphone.*

(4) *Notice the display after "Macro".* This shows the macro string or output that will result from your using the word in an application.

Uses of VoiceTalk

*If you're using the Navigator with HyperCard stacks, you will probably want to do your tvoice raining in HyperCard.*

*By using the XCMD's and XFCN's in VoiceTalk, you can write your own HyperCard script to amend VoiceWorks as you wish.*

Voice Navigator™
User's Manual

*Checklist Before You Begin*

Before starting to use the Navigator, go through this checklist:

*Memory*

You should have at least one megabyte of RAM to operate the Navigator. Two megabytes or more are highly recommended, especially if:

• You have many fonts, desk accessories, INITs, and other features that take up memory, or if you will be using Multifinder.

• You will be working with large applications like HyperCard.

See Chapter One and Appendix B for more information on memory.

*System Version*

The System running your Macintosh must be version 6.0 or later to work with the Navigator. Obtain an upgrade from your dealer if necessary.

*Microphone*

The microphones provided with the Navigator include an external microphone and a built-in microphone in the Speech Box.
To make sure these options will provide the best recognition accuracy for your work situation, consult Appendix A: *Microphones*.

Termination and ID Number of Other SCSI Devices

The Speech Box is a SCSI device. If you have any other SCSI devices connected to your computer (such as an external hard disk), you will need to know some information about that device:

(1) What is the SCSI ID Number of the device?
(2) What is the termination status of the device?

*See Part IV, Language Maker..*

(6) Use the Language Files for applications you are running with voice to modify Word Lists, tailoring voice commands to your needs.

*See Part IV, Language Maker.*

Chapter One

1. What Is the Voice Navigator?

*"In the beginning was the Word."*

This is the beginning of a new era for computers, the era of voice recognition. With the Voice Navigator you can *talk* to your Macintosh – and it will respond, instantly.

Voice commands make the Macintosh quicker, easier, more spontaneous and productive. When combined with the traditional keyboard and mouse, voice enhances any application.

New ways of using computers will also emerge when hands-on operation is no longer necessary at all times. Voice input and output will change how people and computers interact, generating a whole new realm of possibilities.

Here are some examples of how you can use the Voice Navigator.

Run Applications by Voice Faster, More Efficiently

Select menu items, answer dialog boxes, scroll up or down, change windows, move the cursor, click or double click with voice.

A spoken command can replace a complex series . f moves with the mouse or on the keyboard. Macros can be executed with a single word.

*Examples:*

- Word Processing
  You can use the same words no matter what word processor you are working with to change font sizes and styles, cut, copy, paste, save. Enter long strings of text with a single command.

- Desktop Publishing
  Format text and graphics, alter layout, answer dialogs, print.

- Paint and Draw Programs
  Select and use graphic tools, palettes, etc.

- Spreadsheets
  Enter data, access data, perform computations.

- CAD/CAM
  Choose design tools, draw, manipulate objects.

- HyperCard
  Flip through stacks, click on buttons, get information.

- Games
  Play games with your voice, as well as your hands.

*Control by Voice When Hands and Eyes Are Busy or You Can't Be at Your Desk*

When you are doing a task that involves working with your hands, you don't want to put everything down to use the keyboard or move the mouse.

When you are concentrating on drawing a diagram or writing a report, you don't want to constantly interrupt your creativity by taking your eyes off the screen to look at the keyboard.

When you are doing something that takes you away from your desk, you don't want to have to sit next to the computer for data input or access.

*Examples:*

- If you are doing design work or page layout, you can concentrate on what you are creating. You can *tell* the computer to select graphic tools, open menus, and do all the things that divert attention from your actual work.

- If you are checking x-rays, conducting a lab experiment, or doing quality control testing, you can enter and access data by speaking. There is no need to stop, look up, and go to a desk to use the computer.

- If you are composing music, your hands don't have to leave the keyboard to tell your music software to change keys or modify the tempo.

• If you are doing desktop presentations, you don't have to shift your focus from the audience to your computer to call up information on a spreadsheet or database. Questions can be answered immediately by using voice to obtain information. Video disks can also be operated by voice.

• If you are browsing a CD-ROM for information, you can use your voice to call up the data you need.

*Use the Macintosh in Entirely New Ways That Were Not Possible Before Voice Recognition*

Voice input as well as output are possible with the Speech Box. The box can be connected to an external speaker for better sound quality. Voice input/output creates a new type of computer-user interaction.

*Examples:*

• Practice foreign languages and receive verbal feedback (correction of pronunciation).

• Learn how to read (literacy programs for children or adults).

• Make computers easier to use for people who prefer to talk rather than type.

• In the future, there will be the capability of adding voice annotation to databases, spreadsheets, or documents. Embedded information will be accessible by voice, with high-quality sound playback.

• In the future you will also be able to use the telephone for long-distance access to your computer.

*2.*
*How the Navigator Recognizes Your Voice*

*Software*

• Each application has its own Word List, a set of voice commands you can say while working in the application.

• The voice commands on the Word List have already been designed to perform the tasks that the mouse or keyboard ordinarily would accomplish.

• Use Voice Train to train the Navigator to understand your voice as you say the commands on a Word List. Save the training to create a Voice File for that application.

• When you open an application, Voice Control uses the Word List and Voice File you created. If you say a word that you have trained, the Navigator will recognize what you said and the Macintosh will respond to your voice.

• If you are working with an application that does not have a Word List included with the Navigator, you can create your own Word List with Language Maker. Language Maker creates a Language File. The Language File is compiled into a Word List with the help of another program, Vocal.

• You can also use Language Maker to alter a Word List so that it works in a way that is more convenient. For example, you can eliminate steps by creating macros that enter a body of text with a single command, or select a menu item without first selecting a menu name (you can say "Open" without first saying "File").

Hardware

• A microphone connected to the Speech Box receives the sound of your voice when you train words.

• The sound waves are converted to digital form, and the words that are trained are stored in memory.

• When you speak while running an application, the Navigator tries to make a match between the sound of your voice as you are saying the word and previously trained words stored in memory.

• A successful match produces accurate voice recognition.

• Voice recognition results in a computer response -- whether it is a button clicked in a dialog box, a document scrolled up or down, or a menu item selected.

3. Requirements for Using the Navigator

Train the Navigator to Recognize Your Voice

• The Navigator will work with any person's voice, any accent, or any language. The key is consistency in speaking. The way the words are trained should be the way words are spoken while running an application. Do not vary your pronunciation widely.

• Another way to ensure accuracy of recognition is to speak with a clear, distinct voice that is not too soft or muffled. You should not have to shout, but neither should you mumble in a very low voice. Again, the way you speak when training should be the way you speak when using the trained words in an application.

Train a Word List for Each Application

• Each application should have a Word List. The Word List will either come with the Navigator, or you can create a Word List with Language Maker.

• The Navigator will work with almost all Macintosh applications. (If an application was not programmed according to Apple standards, there may be some inconsistencies in the way it works with the Navigator.)

Choose a Microphone

• The microphones that come with the Navigator include:

- A high-quality headset microphone
- An internal microphone built into the Speech Box.

• To ensure that the microphone you use is the best for your work environment, and suits your personal needs, see Appendix A: *Microphones*. You may decide that another type of microphone is more suitable. Consult the *Accessory Guide* (separately printed) for specific brands of recommended microphones.

• To get the most out of the internal or headset microphones that come with the Speech Box, carefully read the instructions in Chapter Two, *How to Install Hardware*. For instructions on using other types of microphones, read the appropriate section in Appendix-A: *Microphones*.

Connect to a Macintosh Plus, SE or II

• The Navigator works with any Macintosh Plus, SE, or II.

• There are some special ways that the Navigator works with the Macintosh Plus because of the way the Plus is designed. For example, when pulling down menus with voice you also must select the menu item with voice (normally you can use voice to pull down menus and then if you wish use the mouse to select menu items, instead of using voice).

Use System Version 6.0 or Later

The Navigator will only work with System version 6.0 or later.

If you have an earlier System (lower than 6.0), it is advised that you get an upda... See your Apple dealer.

If you do not know what System version you have, go into the Finder (the desktop which appears when you first boot up the Macintosh). Select About the Finder from the Apple menu. The System version number will appear in the upper left.

*Check Memory Requirement*

At least one megabyte of RAM is required to run the Navigator. Two megabytes or more are highly recommended and are essential if you have many items installed in your System, if you are using Multifinder, or if you are using voice with large applications such as HyperCard.

To determine whether the memory on your system is sufficient, and to find out what to do if it is not, see Appendix B: *Memory*.

*Turn to Chapter Two to install the Voice Navigator.*

*Chapter Two*

*1. What To Install*

*Warning!*

Installing the Speech Box incorrectly can damage your computer system. You must follow all of the instructions in this chapter for proper installation.

*Hardware Checklist*

Before you begin, check to make sure that you have all the hardware components of the Voice Navigator:

*(1) Speech Box*

Digitizes the sound of your voice and relays it to the computer.

*(2) SCSI Cable*

The cable connects the Speech Box to the SCSI port of your Macintosh or to another SCSI device connected to the computer (such as an external hard disk).

*Note:* The cable is a 25 pin-25 pin connector (standard cables are 25 pin-50 pin). This may necessitate connecting the Speech Box directly to the computer rather than in the middle of a daisy chain of other devices. See Section 3 for details.

*(3) Power Supply*

Connects the Speech Box to an electrical outlet.

*(4) Microphone*

Plugs into the Speech Box.

*Note:* You can use the built-in microphone or telephone instead, or substitute your own microphone. See Appendix A: *Microphones*.

2. How to Set the SCSI Number of the Speech Box

The Speech Box Is a SCSI Device

• The Speech Box is a SCSI device. SCSI (pronounced "SKUH-zee") stands for Small Computer System Interface.

• What is a SCSI device? It is an external device that enables data to be transferred quickly to and from the computer.

• An external hard disk is an example of a SCSI device.

• A cable connects the SCSI port in back of the Speech Box to the SCSI port of a computer or another SCSI device.

Determine SCSI ID and Termination Status (1) Before proceeding any further, review the sections of your Macintosh Plus, SE, or II manual that explain how to connect SCSI devices.

(2) Read this chapter carefully for information about setting the *SCSI ID number* and the *termination* of the Speech Box.

This is especially important if you have any other SCSI devices hooked up to your computer, such as an external hard disk.

(3) If you do not have information about the ID numbers and termination *status* of other SCSI devices hooked up to your computer, contact your dealer for this information before trying to connect the Speech Box.

*What Is a SCSI ID?*

(1) Every SCSI device has its own *SCSI ID number*. This is a number that serves as the SCSI device's "address."

• The SCSI ID consists of any one of eight numbers, from 0 through 7.

• Up to eight separate SCSI devices, each with its own ID, can be hooked together in one system as long as they each have a different ID number.

(2) The Speech Box ID number should not be the same as the ID of any other SCSI device in your system.

(3) Macintosh SCSI Number:

• The Macintosh, without a hard disk, is a SCSI device. It always has a pre-set, reserved ID number of 7 (seven).

• If your Macintosh comes with an internal hard disk, the disk is usually set at 0 (zero). Confirm the SCSI number by checking the Control Panel under the Apple menu (if you have a SCSI bus utility that shows SCSI ID numbers), by looking in the computer/hard disk manual, or by asking your dealer.

(4) Numbers of other SCSI devices:

• If you have other SCSI devices hooked up to your computer, such as an external hard disk, also check the SCSI number of these devices.

• To check the SCSI number of the disk drive, select the disk drive icon when you first boot up. Go to the File menu and select Get Info. You will see a designation for SCSI Unit Number

*How to Change the Speech Box ID*

(1) Check the SCSI ID Number of the Speech Box:

• See what number the Speech Box is set at by looking at the back of the Speech Box. The SCSI number is selected on a round black dial with white numbers around it and a red section in the middle.

• A small white mark on the outside of the dial shows the SCSI number at which the dial is currently set.

(2) If necessary change the Speech Box ID:

• If the number at which the Speech Box dial is set is the same as the ID number of any other SCSI device hooked up to your computer, you need to change the SCSI number of the Speech Box.

• Use a small Phillips-head screwdriver to rotate the red and black dial at the back of the Speech Box.

• Stop rotating when a "free" number (not taken by any other SCSI device) hits the white mark.

3. How to Set the Termination of the Speech Box

The SCSI "Daisy Chain"

(1) If you have more than one SCSI device -- such as the Speech Box and an external hard disk -- each one can be connected to the other in a "daisy chain."

• For example, the computer can be connected to the hard disk, and the hard disk connected to the Speech Box. The devices are connected to each other with SCSI cables.

(2) This is not the only order in which a Speech Box can be connected. There are many other configurations possible, depending on what other SCSI devices you have.

*Note:* The cable provided with the Navigator is a nonstandard size: It is a 25 pin-25 pin, rather than a 25 pin-50 pin. This means that if another SCSI device in your system has a SCSI port that will only accommodate a 50 pin cable, you must connect the Speech Box directly to the Macintosh (which has a 25 pin port). The other SCSI device can then be connected to the Speech Box with a 25 pin-50 pin cable. As a result, the order would be :
*Macintosh -- Speech Box -- Other SCSI Device.*

Termination of SCSI Devices (1) Depending on where the Speech Box is in the order of the daisy chain, the Speech Box *termination status* should be switched *on* or *off*.

What is a *terminator?* It is an electrical resistor that reduces "noise" on the SCSI chain, so that reliable, error-free data transmission can take place.

(2) How do you know whether to turn the Speech Box terminators on or off?

Termination Rules

*Termination On:*

- Only two terminated SCSI devices can be in any SCSI chain – one at the beginning of the chain and one at the end.

- If the Speech Box is the only external SCSI device hooked up to your Macintosh, it is considered the end of the chain:

The Speech Box should be *terminated (termination on).*

*Termination Off:*

- If your Speech Box is hooked up in the middle of a series of terminated devices (for example, between the Macintosh with an internal hard disk and an external hard disk that is terminated):

The Speech Box should be *not be terminated (termination off).*

*Note:* If you are using a Macintosh with no internal hard disk, it has no termination at all. The first SCSI device connected to the Macintosh will be terminated.

Consult the following diagram to determine where your Speech Box will be placed, and whether termination should be on or off (terminated or not terminated). See Fig. 31.

See Fig. 32.

How to Turn Termination On or Off (1) Turn off the computer.

(2) Decide where you will connect the Speech Box if it is in a daisy chain of other SCSI devices.

(3) Depending on the position of the Speech Box, determine whether termination should be on or off.

| **Where In the Chain of SCSI Devices** | **Termination Status** |
|---|---|
| Speech Box at beginning or end of the chain | Termination ON |
| Speech Box in the middle of the chain | Termination OFF |

For further information, see Figure 3, *Computer Configurations and Termination.*

(4) Plug the black power supply cube into the Speech Box.

• Insert the jack at the cord end of the power supply into the port labeled Power at the rear right corner of the Speech Box (looking at the back of the box).

(5) Plug the electrical prongs of the power cube into an outlet.

(6) Turn on the Speech Box.

• Push in the top of the white oblong button at the rear of the box (on the right-hand side, looking at the back of the box). The button has a circle at the top, and a straight line at the bottom.

(7) Check the current termination status of the box.

• Look at the two small LEDs (lights) beneath the SCSI ports at the rear of the Speech Box.

| **Color of Lights** | **Termination Status** |
|---|---|
| Both green | Not terminated (termination OFF) |
| One red, one green | Terminated (termination ON) |

(8) If you need to make a change in termination (turning termination on if it is currently off, or off if it is currently on):

• Turn the Speech Box power off (push in the bottom of the white button at the rear of the Speech Box).

• Look underneath the Speech Box to locate the terminator switch, a small plastic tab that protrudes slightly from the box.

• Use a flat-head screwdriver to push the tab in the direction required. Be sure to push the tab all the way in the proper direction.

Termination ON: Push tab away from the rear of the box .

Termination OFF: Push the tab toward the rear of the box.

(9) Confirm the termination change.

• Turn on the Speech Box by pushing in the top of the white power button at the rear of the box.

• Check the color of the LED below the SCSI Output port:

Green if not terminated (termination OFF)

Red if terminated (termination ON).

(10) Turn the Speech Box off.

Push in the bottom of the white power button at the rear of the box.

4. How to Connect the Speech Box (1) Plug one end of the SCSI cable into a SCSI port at the rear of the Speech Box. Screw it down so it fits tightly.

*Note:* If you have terminated the Speech Box, you may find it convenient to plug the SCSI cable into the port with the LED that is lit up in red, showing that termination is on.

However, either SCSI port will work equally well whether or not the box is terminated and regardless of what color the LED is, red or green.

(2) Plug the other end of the SCSI cable into the SCSI port of the computer or other SCSI device, depending on where the Speech Box is in the SCSI chain.

*Remember:* The SCSI cable will only fit into a 25 pin port. Plug it into the Macintosh if other SCSI devices have a 50 pin port.

(3) Turn on the power for the Speech Box .

(4) Turn on the power for any other SCSI devices.

(5) Turn on the computer.

*Note:* When using the Speech Box, as with any SCSI device, always turn it on before the computer is turned on (during this installation process as well as during normal use hereafter). Likewise, always turn the computer off before turning the Speech Box off.

(6) Confirm successful installation:

• The green LED and the row of eight red LEDs at the front right corner of the Speech box will all be lit up.

5. Microphone

Microphone Choices

To serve as a microphone for voice input, you can use:

(1) Internal microphone built into the Speech Box
(2) Telephone
(3) External microphone

- Microphone provided with the Navigator
- Microphone of your choice

*Note:* A high-quality microphone appropriate to your work conditions is a must for accurate voice recognition. Read this section and then consult Appendix A: *Microphones* for guidelines on choosing the microphone best for you.

Most users will find that the external headset microphone included with the Navigator provides excellent results.

All three types of microphones are described below.

Internal Microphone

The Navigator comes with a microphone built into the Speech Box. A summary of the pluses and minuses of this type of microphone follows.

*Profile*

For very quiet work environments where noise interruptions are minimal.

*Advantages*

(1) Totally hands-free operation
(2) No external microphone necessary.

*Disadvantages*

(1) Must be positioned carefully to avoid external noise interference
(2) Cannot be physically switched on and off while the Speech Box is on. (However, there are verbal commands and keyboard methods of turning recognition on and off. See Part III, Chapter Five.)

*Description*

The internal electret microphone built into the Speech Box gives the user totally hands-free voice control.

However, several conditions must be met for the built-in mike to work satisfactorily:

(1) The work environment must be very quiet. If there is a lot of background noise, it will be picked up by the internal mike.

(2) The box must be carefully positioned so that there is no source of low-level noise interference nearby.

Sources of low-level noise include:

a) Fans

This includes fans in the SE or Mac II and fans in some hard disks. Do not place the box near any devices that have such fans. If the box will be in the vicinity of a fan, try to muffle the sound created by the fan. Also, placing the box in an upright position will slightly diminish noise input.

b) Hard disks and other devices that hum

Try not to place the Speech Box under a computer that has a hard disk or under/on top of an external hard disk, as the hum will cause vibrations that will be picked up as noise by the internal microphone in the Speech Box.

(3) Experiment with the position of the box to obtain the best amplitude levels.

• The box should be close enough to pick up your voice with adequate volume. (See Chapter Four, Section 3, *Test Sound levels.*)

• To take up less room on the desktop, the box can be placed on its side as shown in the diagram above. This will also keep the box cooler (the vents are on the left-hand side of the box).

(4) Keep the microphone in the same spot each time you use voice.

Once you have placed the Speech Box in the optimum position, it should stay in more or less the same position each time you use voice recognition. If the position changes, the dynamics of echoes and reverberations in the room may also change and make a difference in recognition accuracy.

(5) When training words, always do three or more trainings per word.

Each training should be done with a different amplitude and distance from the Speech Box. Speak slightly louder or softer and move closer or further away from the box to give a variety of input when training words.

*Telephone*

The telephone can also be used as a speech input device. Remember that when you are using the telephone as a microphone, the telephone cannot send or receive calls. Otherwise it can be used as a normal telephone.

(1) Plug the line attached to the telephone receiver into the port labeled Telephone at the left rear of the Speech Box (looking at the back of the box).

(2) Plug the telephone line into the port labeled Telephone Line at the left rear of the Speech Box (looking at the back of the box).

External Microphone

Most users will prefer using an external microphone connected to the Speech Box rather than the built-in microphone.

(1) The headset provided with the Navigator is an excellent microphone. It is superior to the internal microphone in its capacity to tolerate background noise without compromising clarity of voice pickup.

(2) You may want to purchase another type of external microphone to better suit your work environment and personal preferences.

For guidance on microphone selection, see Appendix A: *Microphones* and the enclosed *Voice Navigator Accessory Guide* (separately printed).

Headset Microphone

*Profile*

Provides the highest quality recognition accuracy, whether in normal or high-noise environments.

*Advantages*

(1) External noise has minimal effect due to noise-cancelling features of the headset microphone (2) Microphone can easily be placed close to the user's mouth for optimum voice pickup (3) Recognition accuracy is excellent. This is especially important for large Word Lists with many active words on each level (4) Hands-free operation.

*Disadvantages*

(1) May be inconvenient to wear around the head (2) The headset is attached to the Speech Box (wires run from the headset to the box)

(3) Must check to make sure the microphone element is positioned the same distance and angle from the mouth each time the headset is used.

*Description*

Headset microphones offer the best recognition accuracy, for two reasons:

(1) The microphone element can be placed close to the user's mouth, and can be kept consistently at the same distance if positioned accurately when the headset is put on.

(2) Many headset microphones have a noise-cancelling cartridge that allows them to work well in noisy offices, even in industrial settings with a very high level of ambient noise.

Because accuracy is the highest, a headset microphone is particularly advantageous when doing text entry or in any situation where you are working with large Word Lists that contain many active words on each level. A correct match is harder to make between what you say and the words you have trained if there are many active words in the pool of possibilities. The headset microphone offers top recognition quality so that an accurate match is much more easily achieved.

For users who require unsurpassed recognition accuracy, especially in a noisy environment, this type of microphone is highly recommended.

*How to Use*

(1) Insert the jack into the microphone port in front of the Speech Box. It is the furthest to the right of the three ports on the left-hand side.

(2) Put the headset on.

(3) Position the microphone carefully:

• Adjust it so that the microphone element is at the corner of your mouth, not directly in front of your mouth

• The microphone should be no more than 1/2" from the side of your mouth.

(4) Use the same microphone position each time you train words, test words, and use words in an application. A slight difference in the position can result in a different voice pickup and you will not achieve the recognition results that normally can be expected with this microphone.

(5) Since this type of microphone does not have an on/off switch, when you want to speak to someone, answer the phone, etc., you can do one of the following:

• When using Voice Control, you can say "Go to sleep" to temporarily turn off recognition, and "Wake up" to restore recognition. Or you can press Command-Escape (or Command-Clear, depending on your keyboard) to deactivate and reactivate Voice Control.

• When using Voice Train or Voice Control, tilt the microphone element away from your mouth temporarily. Since the microphone picks up sound primarily from one direction, tilting it away from your mouth means it will not pick up your voice while you are speaking.

*Remember*: When bringing the microphone back into place, be sure to reposition it at the same angle and distance from your mouth.

6. External Speaker

The Speech Box has a built-in speaker for voice output. However, you can also connect a separate external speaker if you wish.

To install:

(1) Insert the external speaker jack into the port in front of the Speech Box at the far left-hand side ( next to the microphone ports, looking at the front of the box).

(2) There is a volume control to adjust the volume for an external speaker. It is a lever above the external speaker jack. You can slide it back and forth to lower or raise the speaker volume (sliding to the left lowers the volume, and sliding to the right raises the volume).

Chapter Three

1. Introduction

There are two Navigator disks:

- The System disk includes: the Installer, Drivers and Voice Tools.
- The Word List disk includes Word Lists and Languages.

Before installing, read Section 2, *Which Disk and System Folder to Install On*, if you have more than one hard disk and more than one System Folder. Navigator software must be installed on the correct hard disk and System Folder to operate.

If you only have one hard disk and System Folder, go straight to Section 3, *Installing Voice Tools, Word Lists, Languages*.

2.
Which Disk and System Folder to Install On

Skip this section if you only have one hard disk and one System Folder on your computer. Go straight to Section 3, *Installing Voice Tools, Word Lists, Languages*.

More Than One Hard Disk

• Make sure the Navigator software is installed on your startup disk (the disk you boot from when you start your Macintosh).

*How to tell which is your startup disk:*

After you've started the computer, look for the disk's icon in the top-right corner of the desktop, above the icons for any other disk drives you might have connected to your computer. This is your startup disk (the disk you boot from).

• What if the startup disk is not the disk that contains some of the applications you want to use with voice recognition?

The System Folder on your startup disk will still run the applications on your other disks. As a result, Navigator software on the startup disk's System Folder will work with applications on other disks.

*Warning:* If you have more than one hard disk and you do a "switch launch" (starting the computer with another disk that does not contain your System Folder with Navigator software installed) – the results of working with the Voice Navigator are unpredictable.

For best results, install Navigator software on the startup disk with your System Folder, and always boot from this disk.

More than One System Folder on your Currently Active Disk

• Make sure that Voice Driver, Voice Prep, Voice Control, and Language Maker are installed in the active System Folder. The active System folder is the folder that is currently running your Macintosh.

• If you have more than one System Folder, the "active" System Folder is the one with this icon.

• If you do have more than one System Folder on your startup disk, it is best to consolidate to one. Multiple System Folders on a hard disk can cause confusion not only for the Voice Navigator, but also for other applications.

• To check whether you have more than one System Folder, select Find File under the Apple menu to conduct a search.

• Before discarding unnecessary System Folders, be sure that all the utilities and applications you need are transferred to the one System Folder you want to keep. Then drag the extra System Folders into the Trash.

Proceed with installation of Navigator software.

3. Installing Voice Tools, Word Lists, Languages

You will be installing the software in these folders onto your active hard disk:

• Voice Tools

• Word Lists

• Languages

• You can put all of the Voice Navigator software in its own folder, or keep application Word Lists and Languages in the same folder as the applications themselves.

• Turn on the computer and open your startup hard disk by double clicking on the icon in the top-right corner of the desktop.

Voice Tools

• Insert the Navigator System disk into the floppy drive.

• Double click on the Voice Tools folder. Install the following software:

(1) Voice Train

*Function:* To train words on Word Lists and create a Voice File.

*To install:* Copy Voice Train onto your hard disk.

(2) Language Maker and Vocal

*Note:* Language Maker and Vocal are not necessary to run the Voice Navigator. Copy them if you want to be able to modify Word Lists or create new Word Lists for applications that have not come with prepared Word Lists.

• Language Maker

*Function:* To modify Word Lists or create new Word Lists.

*To install:* Language Maker is a Desk Accessory. Use the Font/DA Mover or Suitcase to install in your System Folder.

• Vocal

*Function:* Works with Language Maker to convert a Language into a Word List.

*To install:* Copy Vocal onto the same hard disk as the rest of the software.

Word Lists

Insert the Navigator Word Lists disk.

*Function:* Word Lists for specific applications contain voice commands that will be trained in order to use voice to run these applications.

*To install:* Double click on the Word List Folder.

• Select the Word Lists for applications you want to run by voice. Copy them onto the hard disk.

*Note:* Be sure to copy Base Words and Finder Words.

- Base Words will save you time by allowing you to train a set of words shared by many applications (words such as File - New, Open, Save; Edit - Copy, Paste, etc.).

- Finder Words will let you start using voice when you first boot up your machine, while still in the Finder. For example, you can move the cursor around the screen or launch applications by voice while in the Finder.

Languages

*Note:* You only need to copy Language Files if you are going to be using Language Maker to alter Word Lists. Language Maker alters Language Files, which are then compiled into Word Lists by Vocal.

*To install:*

• Double click on the Languages folder.

• Copy onto the hard disk the Language Files for applications you will be running with voice.

• The Base Language and the Finder Language are two important languages to copy.

4. Installing Software in Drivers Folder

Insert the Navigator System disk.

Software in the Drivers folder of the Navigator System disk includes:

- Voice Driver
- Voice Prep
- Voice Control

There are two ways you can install this software.

(1) Using the Automatic Installer

• The Installer program is a quick and easy way to install the software in the Drivers folder -- Voice Driver, Voice Prep and Voice Control. These are installed in your System Folder.

• The Installer also allows instant testing to see whether the Navigator is "listening," in other words, whether the installation was successful. It is recommended that you use the Installer.

(2) Installing Manually

All software in the Drivers folder will be individually installed.

The two methods are described below.

Using the Automatic Installer

The automatic Installer will install into your System Folder all the software in the Drivers folder.

(1) Double click on the Installer icon.

(2) A dialog box appears (See Fig. 33).

(3) Check the name of the drive in the upper right-hand corner. Make sure this is your startup hard drive that has the System Folder in which you want to install Voice Control, Voice Driver, and Voice Prep.

• If it is not the correct drive, click the Drive button in the dialog box.

• If it is the correct drive, click the Install button.

(4) Voice Driver, Voice Prep, and Voice Control will be installed.

(5) A message will appear saying installation was successful (if indeed it was). (See Fig. 34).

(6) To test whether the software and hardware are working together:

• Click on the Test button.

• If all is well, a message will appear, "The Macintosh is Listening" (See Fig. 35).

*Note:* If you receive updated versions of Voice Driver, Voice Prep and Voice Control, clicking on *Install* will automatically remove old versions of the software.

• If you ever want to remove the Navigator altogether, clicking on *Remove* will remove Voice Driver, Voice Prep, and Voice Control.

(7) Click *Restart* to exit the Installer and restart the computer.

• You will see a Dragon icon and the message, "Initializing Voice Drivers."

Installing Manually (1) Double click on the Voice Drivers Folder.

(2) Voice Driver and Voice Prep

*Function:* Voice Driver and Voice Prep run the Navigator.

*To install:* Copy Voice Driver and Voice Prep into the System Folder on your active disk.

(3) Voice Control

*Function:* Enables you to use voice while running an application.

*To install:* Copy Voice Control into the System Folder on your active hard disk.

(4) Restart the computer.

Chapter Four

1. Introduction

How to Start Using the Navigator

Now that you have installed the hardware and software, you can begin working with the Navigator.

The first step is to train a Word List and create a Voice File for any application you want to use with voice. However, there is a shortcut for training all Word Lists, no matter what application they run. The shortcut is called the Base Word List.

How to Use the Base Word List

Many Word Lists for applications share some of the same voice commands.

*Examples:*

- Words that control a window (scroll, page up, page down, etc.)
- Words that select common menu items (File: New, Open, Close; Edit: Cut, Copy, Paste, etc.).
- Words that click on dialog buttons (OK, Cancel).

The Base Word List contains many of these standard voice commands. Once you train Base Words you can automatically transfer the training to other Word Lists.

In this chapter you will learn:

- How to start up Voice Train with Base Words
- How to test sound levels for optimal training conditions
- How to work with Word Lists so that training results in accurate voice recognition.

Chapter Five goes into more detail on how to train a Word List. Chapter Six explains how to train Base Words and transfer the training to Finder Words (or any other application you choose).

If you feel comfortable with using Voice Train at this point, you can skip Part II for now (which goes into detail about Voice Train's features). Proceed directly to Part III, Voice Control, to operate your Macintosh with voice.

2. Start Up Voice Train (1) Double click on the Base Words icon.

(2) Voice Train will open up. A dialog box asks you to locate a Voice File. Since this is your first time training Base Words, and you have no Voice File yet, click *New*. (See Fig. 36).

(3) The first group of words appears in the Voice Train window. (See Fig. 37).

*Note:* Not all of the words will be displayed at once. Words will be displayed one level at a time (for more on levels, see Chapter Five).

To make sure that only one level is displayed, pull down the Options menu and see if *Show All Levels* is not checked. If it is checked, select it; the check will disappear.

(4) If you are not using an external microphone:

• Go to the Options menu and select Microphones . . .

• When the dialog box appears, select the type of microphone you are using (Internal Microphone or Telephone).

• Click OK.

See Fig. 38.

(5) Some of the words in the two-column word list may not be fully spelled out. To see the entire word, you can convert the list into one column.

• Go to the Options menu and select One Column List.

3. Test Sound Levels

Before you begin training, it is essential that you make sure your voice will be recorded clearly, with little interference from background noise. Poor sound reception will result in a poor Voice File, and significantly lower recognition quality.

Microphone Setup (1) If you are using the built-in (internal) microphone or telephone follow the directions for setting up in Chapter Two.

(2) If you are using a headset microphone, position the microphone element so that it is at the corner of your mouth, no more than 1/2" away.

Background Noise

To make sure that background noise does not interfere with recording your voice, follow these steps:

(1) Notice the row of lights (LEDs) at the front of the Speech Box on the right-hand side.

(2) Before Voice Train is open and the Train or Test button is clicked, all the lights will be red (except the first light, the green "power on" light).

(3) When Voice Train is open and the Train or Test button is clicked, recognition is activated. All the red lights should go off. The lights now become indicators of sound coming into the microphone.

(4) Red lights flickering when recognition is activated (before you say anything) indicate background noise coming into the microphone.

• One or two lights flickering on and off indicate a low level of background noise that is not enough to record or trigger (false) recognition.

*Note:* The minimum level of sound required for training words or triggering recognition is indicated when 4 to 5 lights are red. The optimal level of sound is indicated when 6 to 8 lights are red.

• If there are any red lights on, especially if there are more than one or two flickering on, reposition the microphone away from the noise or try to eliminate the source of noise.

*Remember:* A noisy fan inside the computer can be a source of background noise that is especially a problem if you are using the internal microphone in the Speech Box. Move the microphone away from the source of noise.

Voice Levels

To check the sound levels of your voice when you are speaking, begin to train words.

(1) Click on the Train button
to activate training.
Chevrons will appear on
either side when it is
activated.

(2) The first word in the Word List will be highlighted and displayed in the upper-left corner.

See Fig. 39.

(3) If your microphone has an on/off switch, check that your microphone is switched on.

*Note:* If the microphone switch makes a loud "click" when turning it on, it may be recorded by mistake. To avoid this problem:

• Turn on the microphone before you click on the Train or Test button in Voice Trair (before recognition is activated).

• If you turn the microphone off and then on again while recognition is still activated, try to move the on/off switch slowly and quietly so that it does not create a sound loud enough to be recorded or to trigger recognition.

(4) Say the word that is displayed. As you speak, look at the row of lights on the Speech Box:

• The lights should flicker red as you speak, then subside as you stop speaking. This shows that the microphone is picking up your voice.

• The number of lights that flicker red as you speak should peak at 4 or 5 at the minimum. This indicates satisfactory amplitude.

• 6 to 8 lights momentarily flickering red indicates best amplitude.

(5) Make adjustments if necessary to improve voice pickup:

• Speak louder (but not above normal voice levels that you will use when running an application with voice)

• Reposition the microphone If using the headset, make sure that the microphone is:

- Close enough to your mouth (no less than 1/2" away)
- At the corner, not in front of your mouth.

(6) Say the word again. Recheck the lights to see if there has been an improvement.

(7) Notice the Amplitude gauge in the Voice Train window. The needle moves to show how loudly you're speaking, and should corroborate the information displayed by the LEDs. The shaded area shows the optimum range.

4.
Test Recognition

So far you have tested how well your voice records when training a word. Now you will test recognition of trained words.

(1) Notice that each time you said the word that is displayed, if the amplitude was sufficient, the training gauge in the Voice Train window rose a notch.

• The gauge will rise one
notch each time you say a word and Voice Train accepts it as a valid training (it is loud enough, clear enough, etc.). If it is not accepted, the gauge will not rise a notch and you will have to say the word again.

• The black filled-in area on the gauge shows the number of trainings completed. The gray area shows the training in progress. The white area below the horizontal black line with the arrows shows the number of trainings left to do.

• When you reach the horizontal black line that shows the total number of trainings to give each word, there will be a short pause as the Navigator makes a model of how you said the word. Then the next word is displayed for training.

• If you are presented with the same word again for training, one or more of the times you said the word were not adequate. Training might be rejected if you spoke too softly or if there was too great a variation in pronouncing a word. For example, extraneous noise may have been picked up by the microphone and recorded by mistake as a training.

(2) To test recognition, train a few words. Decide which words you want to train and test from the list. To simplify the procedure for now, do not select words with an arrow next to them. (This will be explained in Chapter Six.)

(4) To select words for training, use shift-click (the mouse and shift key). A check mark will appear next to the words.

(5) Say the first word or phrase presented to you. Repeat it three times, using similar pronunciation. If using the internal microphone provided, vary the distance between your mouth and the Speech Box for each training. Sit back in the chair, sit straight, sit forward in your chair, etc., to simulate the different distances you will be at when actually using voice in an application.

*Important:* Whenever you use voice commands, whether training, testing, or using voice commands in an application, you must follow these rules:

• Do not pause between words if the voice command consists of more than one word. Speak continuously without interruption.

*Example:*

"Scratch That" [Do not pause between "Scratch" and "That"]

• Do pause before and after you say each voice command. If you are training each command three times, pause between each training.

*Example:*

"Scratch That"

*[Pause]*
"Scratch That"
*[Pause]*
"Scratch That"

(6) If the training is accepted:

- The check mark next to the word will be replaced by a diamond sign (◊).

- The next word you have selected will be displayed. (See Fig. 40).

(7) Repeat the training procedure with the words you have selected.

(8) After training the words, test recognition. Click on the Test button.

(9) Say any word that you have trained (as indicated by a diamond mark next to it).

(10) The word displayed in the upper-left corner is the word that the Navigator recognized.

- If the word displayed is the word you said, then recognition was accurate. If you had said this word while running an application, whatever the word signifies would have occurred. For example, if the word you trained was OK then you could have answered a dialog by saying OK rather than clicking on the OK button.
- If the word displayed is not the correct word:

- Check the words listed under Close Calls. See if your word is there.

See Fig. 41.

- If the word was not recognized correctly, it may be a word that needs more careful pronunciation . This is especially true for words that have only one syllable (the greater number of syllables and sounds in a word, the easier it is to recognize). Also words that consist of many "soft" sounds (vowels and consonants such as m, p, w), rather than sounds with "punch" (such as hard g, s, k, etc.), may have to be pronounced with more vigor and emphasis for accurate recognition. Such words can be retrained.

(11) You will learn more about retraining words in Chapter Six. For now, click the Test button again so that the chevrons disappear and recognition is deactivated. Proceed to the next chapter.

Chapter Five

1. Introduction

This chapter explains how to train a Word List. By following a few basic rules, you will create a Voice File that will result in highly accurate recognition.

You will learn how a Word List is structured, how to pronounce words when training, and how you can make changes in pronunciation to suit your preferences.

The rules you learn here for Voice Train also apply to Voice Control, which you will use to actually run an application with voice commands.

2. Format of a Word List

Levels of Words

• The voice commands in a Word List are divided into groups called levels.

*Example: Finder Words*

The top row of menu names are on the first level.
The bottom row of menu items are on a lower level. (See Fig. 42).

• Levels of words generally reflect the way you would normally use an application. When working with the mouse you have to select a menu name first before you can select a menu item beneath it. When working with the Navigator, you can say the menu name first (on the first level) and then say the menu item beneath it (on a lower level).

*Example:*

| First Level | Lower Level |
|---|---|
| Apple | About, Calculator |
| File | New, Open |
| Special | Restart, Shut down |

*How Do Levels Work?*

• Only one level of words can be *active* at a time. If a word is active it is available for voice recognition. Saying a word that is not active will not result in its recognition.

• For instance, when you begin to use a Word List you can say any of the words on the first level. Saying a word on the first level can make another level active.

- In the Finder Word List, Apple, File, and Special are on the first level.

- To be able to say any of the words on the next level, you have to say the first-level word that makes the next level active. In Voice Train, these words are marked with an arrow.

*Example 1.*

If you say *Apple* (on the first level) you can say *About* or *Calculator* (on the next level). (See Fig. 43).

*Example 2.*

If you say File (on the first level), New or Open (next level) become active. See Fig. 44.

• When working in an application, you can go back and forth between levels. You can say a word on the first level, a word on a lower level, and then a word on the first level again, etc.

• The only restriction is that in order to say a word on a lower level, you have to say the word that leads to the lower level. For example to say a menu item on the second level, you have to say the menu name on the first level. This should not pose a problem since levels of words usually follow the way an application normally operates.

• To make working with voice even faster, you can use Language Maker to alter levels of words. For example, you might want to consolidate an operation that would normally take two steps down to one step by putting a lower-level word up to the first level.

*Example:*

Instead of saying "Font Size" and then "12 point," you can simply say "12 point."

See Part IV, *Language Maker* for more details.

Why Are There Levels of Active Words?

The accuracy of voice recognition increases when there are a smaller number of words active at any one time.

*Why?* When you say a word, the Navigator tries to make a match between what you say and one of the words you have trained. If all the words in a Word List were always active, there would be so many choices that a matching error might occur.

By splitting up the Word List into levels, the total number of words it contains can be very large, but each active level can contain a few words.

Global Words

For convenience, every Word List has some *global words*. These are commonly used words that are active on all levels, at all times.

*Examples:*

Word List, Scratch That.

*Note:* " Scratch That" is a convenient way to erase the last word recognized. It is often used if the last word was incorrectly recognized and you want to return to the previous level. Saying Scratch That will also move up a level in the Word List until you reach the first level.

Number of Active Words on Each Level

• Depending on which model of the Voice Navigator you are using, there can be up to 200 words or up to 1,000 words on each level. That means that up to 200 words or up to 1,000 words could be spoken at any one time if that number of words were on each level.

*Models of the Voice Navigator*

| | |
|---|---|
| Voice Navigator | Unlimited commands for each application; 200 commands per level. |
| Voice Navigator XA | Unlimited commands for each application; 1,000 commands per level. |

• In practice, levels do not contain anywhere near the maximum number of words (200 or 1,000). Keeping the number of words relatively low is a way to increase recognition accuracy, as explained above: the smaller number of words that are active at a tim the easier it is to make a correct match between what you say and a word that is active.

Total Number of Words in a Word List

• The total number of words in a Word List is *theoretically limitless*. You can have an infinite number of levels, as long as the number of words on each level is under 200 or under 1,000, depending on the model of the Navigator.

• For practical reasons, however, Word Lists are kept to a reasonable size. The reasons include:

- The amount of memory it would take to run an application with a very large Word List and Voice File

- The time it would take to train so many words

- The number of levels there would have to be to keep recognition accuracy high, which would lead to a very complicated Word List.

*Note:* The Navigator is not meant as a dictation machine, which would use voice freely to dictate long letters and reports with a very large vocabulary. It is best used for control of an application (selecting menus, answering dialogs) or for dictation with a limited vocabulary (data entry, for example).

3. How to Increase Recognition Accuracy

Voice recognition is not infallible, but a consistently high degree of accuracy should result if you follow these basic rules for training, testing, and using voice commands.

(1) The Trainer and User Should Be the Same Person

• The person who trains a Word List and creates a Voice File should be the person who later uses that Voice File in an application.

*Why?* The Voice Navigator system is "speaker-dependent" – it learns to recognize the distinct pronunciation, accent, and tone of voice of the person who trains the Word List. A trained Word List becomes the Voice File that is used for recognition while testing in Voice Train or working with Voice Control in an application. Trained words are matched against a word spoken, and an accurate match results in accurate recognition.

- If you try to use someone else's Voice File, the chances of accurate recognition decrease. The person who created the Voice File may have a very different pronunciation or tone of voice. This is especially true for males v. females, very young v. very elderly users, or people with strongly different accents.

- For best results, each person should train and use their own Voice File. There is no limit to the number of Voice Files that can be created for each Word List.

*(2) How Two People Can Use One Voice File*

- It is sometimes feasible to have one person create a Voice File and another person use the same Voice File. After all, many people have similar ways of pronouncing words and similar types of voices. Two people may sound sufficiently alike for fairly accurate recognition. However, for best recognition accuracy, this is not advised.

- To save training time, it may be possible for two people to create one Voice File at the same time. For example, each word could be trained a total of six times. One person could do three trainings, and then the other person could do three trainings. The trainings would be saved in one Voice File. However, this is not recommended – especially if the voices are very different (as in male and female voices). It is better for each person to train separately and save their Voice Files for more accurate recognition.

*(3) Use an Appropriate Microphone and the Same Microphone Each Time*

- The microphone you use for voice input should be suitable to your work conditions and work habits. There is an appropriate microphone for noisy and quiet environments, for people who don't mind holding a microphone or for those who must have hands-free voice control.

See Appendix A, *Microphones* to select the correct microphone for your situation.

- Whatever microphone you choose, use the same microphone each time you use the Navigator, whether it is for training words, testing words, or running an application with voice. A different microphone can create enough difference in how your voice is picked up to cause recognition problems.

- It is also important to set up the microphone in a similar position each time you use it. This is particularly true for the headset microphone that comes with the Navigator. The microphone element should be placed at the same position in relation to your mouth each time you use it.

•If using the internal microphone provided, train each word at varying distances from the Speech Box. That way, if you are leaning back or hunching forward (further or closer to the mike) while using voice, recognition quality will still be high.

*(4) Train the Word List in Conditions Comparable to What You Expect When Using the Words*

• If you will be working in a quiet office, train in a quiet office. If you will be working in a noisy factory setting, train in that setting. The level of background noise and how much is picked up by the microphone will affect your training and therefore your Voice File. If the environment is a lot different when training and then using words, recognition errors may occur.

*(5) Try to Be Consistent When Speaking*

• Speak at about the same level of amplitude whether training, testing or using words in an application. Dramatic differences in how loudly or softly you speak can make a difference in recognition accuracy. If training a word at various distances from the internal microphone, make sure the amplitude is about the same. If leaning back, you may have to speak louder than if sitting close to the microphone to reach the same amplitude.

• The same principle of consistency applies to how you pronounce words. The more similar your pronunciation when training, testing, and using words, the better the recognition accuracy.

• When you train words, it is helpful to give each word at least three trainings. Vary the pronunciation slightly for each of the three trainings, so that you include the ways you will be speaking when using the words in an application. For example, pronounce a word as you would when speaking in a hurry (where you might tend to cut short the last syllable), when speaking slowly, when feeling irritated by your boss, etc. That way the model of the word that is stored in the Voice File will encompass a range of pronunciations that will match how you might pronounce the word when using it in an application.

• When you train words, use your "normal" pronunciation. If you articulate precisely as though trying out for a part in a Shakespearean play, and later on revert to a Brooklyn accent when actually running an application with voice, the accuracy of recognition will NOT be the best!

• On the other hand, you will probably find that when training as well as using voice commands, you become more conscious of speaking clearly. This is advantageous, because distinct articulation means better voice recognition. The more clearly sounds are uttered, the more "information" the Navigator will have to make distinctive models of words for the Voice File. It will be easier to match a trained word in a Voice File with a word spoken in an application if both are clearly pronounced.

(6) Pronounce Certain Words With Care

• Some words require extra attention to pronounce them distinctly so they are not confused:

*Examples:* a) Words that sound alike (like "File" and "Style"). Try to exaggerate the differences in pronunciation for such words if they are on the same level of active words. Otherwise they might be confused.

b) Words that have many "soft" sounds in them (like m and p and vowels) rather than "hard" sounds (like s and k and b).

> "Soft" sounds are not as distinct as "hard" sounds and may not come through clearly unless pronounced carefully. You may even have to exaggerate your pronunciation of such words.

c) Voice commands that consist of a single syllable (like "go" and "show"). Voice commands that consist of several syllables or more than one word are more distinct than voice commands that consist of one syllable.

*Note:* If you encounter difficulties with recognition of single-syllable words, try training the words with an extra word added.

For instance:

- "Go" can be changed to "Go to"
- "Show" can be changed to "Show me" or "Please show."

*(See Section 4 below for further explanation of this approach.)*

• If you are using Language Maker to compile your own Word List for an application, or to modify a Word List, try to avoid the above situations as much as possible. Use multi-syllabic or multi-word voice commands with distinct sounds where possible.

(7) Pause Between Voice Commands

• You must leave a slight pause (1/4 of a second) before and after pronouncing each voice command.

*Example:*

There are two voice commands, "File" and Open."

- Say "File" and pause;
- Then say "Open" and pause.

• If a single voice command consists of several words, you should not pause between the words in that command.

*Example:*

There is one voice command, "Scratch That." Say "Scratch That" as one continuous phrase with no pause between the two words.

(8) Take Your Time Training

• Don't be in a rush to train. Be prepared to spend some time training, about 10 to 20 seconds for each word (including testing to see if your training is accurate).

• It's tempting to just do one training for each word. However, you will have better results if you do at least three trainings per word. That way a range of pronunciations will be trained for each word, so that you have some leeway in how you pronounce the word while running with voice in an application.

• A larger number of trainings will only take a few seconds more for each word. The long-term results will pay off.

(9) Experiment with the Confidence Level

• You can exercise additional control over the recognition accuracy by using the Confidence Gauge. This gauge is present in both Voice Train and Voice Control.

• How does the Confidence Gauge work? It lets you set the level of Confidence the Navigator must have before it tries to recognize a word.

- Recognition takes place when the Navigator makes a match between what you say and trained words that are on the level that is active at the time.

- The Confidence Level is preset at 80%. This means that the Navigator will not try to recognize a word unless it is at least 80% confident that a correct match is being made between what you say and a word you have trained. If your pronunciation is not very close to the words you have trained, so that there is less than an 80% level of confidence, the Navigator will not try to make a match and there will be no word recognized.

• You can vary the level of Confidence, higher or lower than 80%.

• By raising the level to 90%, for example, you tell the Navigator to restrict its match-making even further. It must be at least 90% sure that the word you say is a word you've trained.

- This may result in more instances of non-recognition, but fewer instances of mistaken recognition, as explained below.

*More instances of non-recognition*: The Navigator has to be at least 90% sure of a correct match, and will make no match at all rather than make a guess that may be incorrect. If there is non-recognition (nothing happens), you have to say the word again.

*Fewer instances of mistaken recognition:* The Navigator does not make a guess if it is not at least 90% confident the guess is right. There will be fewer chances that a match will be mistaken.

• By lowering the level below 80%, you tell the Navigator you want it to try to make a match even if the Navigator is less than 80% confident in the match. For example you can lower the gauge to 70%, so that the Navigator will make a match when it is at least 70% confident in a correct match.

- This may result in more instances of mistaken recognition, but fewer instances of non-recognition, as explained below.

*More instances of mistaken recognition:* The Navigator will try to make a match if it is as low as 70% confident of the match, which may yield more instances of mistaken recognition.

*Fewer instances of non-recognition:* The Navigator will tend to try to make a match more frequently rather than have nothing happen at all if it is at least 70% confident.

• With experience, you will learn what Confidence Level suits you best -- according to your consistency of pronunciation , the size of levels in your Word List, whether you would rather repeat a word if there is no recognition at all or take your chances on an incorrect recognition, etc.

• To adjust the Confidence Gauge:

- The gauge is divided by notches. Each notch represents about 10%, with 0% Confidence at the far left and 100% Confidence at the far right. The left-hand notch at which the shaded area begins marks the Confidence Level.

*Example:*

If the shaded area begins one notch from the right it is set at 90%; if two notches from the right (as shown) it is at 80%, and so forth.

- To lower the Confidence Level, drag the arrow at the top of the Confidence Gauge to the left to widen the shaded area, so that it begins at a lower number.

- To raise the Confidence Level, drag the arrow to the right to shorten the shaded area, so that it begins at a higher number.

4.
How to Alter Voice Commands

There is a certain amount of flexibility possible when pronouncing the commands in a Word List:

*(1) Use an Abbreviation, Substitute Words, or Add Words Instead of saying the full phrase as written in the Word List, as long as you're consistent*

• You can make any changes you wish when pronouncing the commands in a Word List. You can use an abbreviation or your own expression rather than the full command when training the Word List. The Navigator will later recognize whatever sounds you have assigned to that word.

*Examples:*

Every Word List has "Scratch That" (to erase the previous word recognized). When you train, you could say "Go back" or "Erase" instead of "Scratch That."

Or if the voice command was "Shut Down," you could say instead "Shut My Mackie Down" or "Enough, already!"

• How does this work? The sound of your voice is what is stored in memory when you train the words on the Word List. Whatever sound is linked to a word on the list is the sound to which the Navigator will respond in the future.

So if you train the Navigator to Shut down when you say "Shut My Mackie Down," it'll do that. If you train the Navigator to erase the last word recognized when you say "Go back" instead of Scratch That, it'll do that whenever you say it in an application.

• Short, one-syllable commands can cause recognition problems. You can add a word to make the command easier to recognize. For instance, say "File Menu" instead of simply "File."

• If you use a certain pronunciation for a while and then decide you want to make a radical change, you can go back and retrain the word with the new pronunciation -- again, as long as you are consistent. However, retraining often is not recommended, as it increases the amount of memory a Voice File uses.

*Warning:*

Changes in how you pronounce words should be made with care, for several reasons:

• If you make too many changes in how you pronounce the Word List, you may not always remember the changes you've made. While you're running the application you will not get the recognition you expect.

• You cannot train a word by mixing very different pronunciations. For example, you cannot give a word one training with "Scratch that" and two trainings with "Go back." If you do, recognition accuracy will be almost impossible to achieve. When you train, pronunciation should be within the same general range, not so different as to include totally new words or completely different ways of saying the voice command.

• Your substitute words should not sound too similar to other words in the list, because recognition accuracy may be difficult to achieve.

• If you substitute an abbreviation that is very short (one syllable), or substitute a word with too many soft sounds in it (such as m's, n's, or p's), the word may be difficult to recognize. Multi-syllable words with hard sounds in them (like s and b) pack more "punch" and are more distinctive, therefore easier to recognize.

(2) Modify the Word List with Language Maker

• To change the actual word as written in a Word List, you can use Language Maker. You can also add and subtract words, or change the level a word is on (for example, you can move a word from a lower level up to the first level so that it is available more easily).

Chapter Six

1. Introduction

What This Chapter Covers

Now that you know how to train a Word List, you can go back to training the Base Words you started working with in Chapter Four.

This chapter briefly describes how to work with Voice Train to train and test words. You have already gone through some of the procedures in Chapter Four. For a more thorough explanation of any aspect of training or testing, consult Part II, *Voice Train*.

After training the Base Word List, you can transfer the trainings over to the Finder Word List. Training Finder Words will enable you to begin working with voice as soon as you start up your Macintosh, while in the Finder.

*Operating with Voice in the Finder*

Even though the Finder isn't generally considered an application, the Finder has its own Word List just as other applications do. However, many of the words are the same as the Base Words. Training the Base Words first will give you a head start on training the Finder Words.

By the end of this chapter you will be ready to use voice commands in the Finder to:

• Select menus: Select items from the Apple, File, Edit, View, and Special menus

• Move the Mouse: Move the mouse continually or by increments in different directions, move to specific locations in a window or on the screen

• Click or double click on icons, buttons, etc.

• Scroll, page up or page down windows

• Change windows

• Control the zoom box and grow box

• Access the trash, including emptying the trash and recovering the trash

• Launch applications such as HyperCard, MacPaint, etc.

• Use the international alphabet (alpha, bravo, etc.) to spell by voice.

*2.*
*Train Base Words*

(1) Make sure the Train button is clicked on: >> Train <<

(2) Say the first word that is presented to you in the upper-left corner:
See Fig. 45.

(3) After you say the word, the training gauge rises one notch. Say the word a second and then a third time, pausing between commands.

(4) If all three trainings are accepted, a diamond will appear next to the trained word and the succeeding word will be presented for training.

(5) Continue down the list until you have trained all of the First Level words.

(6) To train another level of words, double click on any word with an arrow. Arrow-marked words have a level of words beneath them. For example, double click on File to bring up all the words that become active when you say File.
See Fig. 46.

*Note:* The word that triggered the currently active level always appears at the top of the list, along with the number of words in the list and the number trained. If you are on the first level, there will be no word at the top, simply First Level.

(7) Train all the words on the File level as they are presented to you.

*Note:* If there are words on this level that have a diamond showing they have already been trained, they may be *global words* – words that are active on all levels. Global words include Scratch That, First Level, etc. They do not need to be retrained, but they appear in the Word List on every level to show that they are active on that level.

(8) To train another level, you can either:

• Go down another level by double clicking on any word that has an arrow

OR

• Go back up to the First Level and then double click on any word with an arrow.

*How to Go Up a Level*

• Click anywhere in the section at the top of the Word List that shows the level name, the number of words, and the number trained.

See Fig. 47.

OR

• If you have trained "First Level," say this while the test button is on. You will go up to the First Level. You can also say Scratch That to go up one level.

(9) Proceed until all of the words on all levels have been trained.

Now you are ready to test the training.

3.
Test Base Words (1) Click on the Test button. It will become active:

*Figure 4. The Active Test Button*

(2) If the First Level of words is not currently displayed, click on the title section of the Word List (the rectangle at the top) to return to the First Level. Or say "First Level" if you have trained that command.

*Note*: When testing, as when training, you can only say a word on the level that is displayed. The level displayed is the active level at the time.This is similar to how recognition works when saying words in an application – you can only say a word that is in the level that is active at the time.

By returning to the First Level to begin testing, you are simulating the real-life situation you will encounter when you use words in an application. When you first open the application you will only be able to say a first-level word.

(3) Say any trained word that is displayed (a word with a diamond mark next to it).

(4) See if the word was recognized. If it was, there will be a word displayed in the upper left-hand corner.

See Fig. 48.

(5) If the displayed word is the word you said, recognition was correct. Notice the Confidence Level shown on the gauge. It should fall within the Confidence range that was set (for example, if the gauge was set at 80% the needle should be within the 80-100% range).

(6) If the displayed word is not the word you said:

• Notice the Confidence Level.

• Check the Close Calls list to see if your word is there:

• Try saying the word again. Make sure the word is still in the level shown (if the wrong word was recognized, the level may have changed).

• When you test a word in Voice Train, the Word List changes to simulate what happens when you say that word in an application. If the word you said makes another level words active, that level will now be displayed in the Word List. Go up or down a level to return to the level with the word you want to test.

(7) If no word was displayed when you spoke:

• Check the needle on the Confidence Gauge. If no word was displayed, then the needle is probably below the Confidence Level that was set. The word was spoken too softly or too indistinctly for a high Confidence rating.

(8) Repeat the word until the correct word is displayed in the upper-left corner.

(9) Look at the Word List to see if it changed when the word was recognized. If the word you said is a word with an arrow, the list should have changed to the level that becomes active when the word is spoken.

(10) If the next word you want to test is on a different level than what is now displayed, you have to change levels:

*To go up a level:*

- Click anywhere in the section at the top of the Word List showing the name of the trigger word, the number of words, and the number trained.

OR

- Say "Scratch That" to go up one level or "First Level" to go directly to the top level.

*To go down a level:*

Double click on a word with an arrow.

(11) As you continue to test, notice if there are certain words that continually bring up Close Calls.

• Close Calls indicate what other words sound similar to the word you've said (up to five Close Calls may be listed). Be sure to pronounce these words distinctly.

• If some words are not recognized but show up in the Close Calls list instead, you may have to retrain these words. See the next section for retraining.

*Warning:* Retraining should be done selectively if you have limited memory, as retraining increases the size of the Voice File. Before retraining, save the Voice File.

(1) Save the Voice File you have created:

• Go to the File menu and select Save. A Save dialog box appears (see Fig. 49).

• Name the Voice File. The default name will have the name of the application (in this case "Base") with the word "Voice" after it.

• If you are not the only person creating a Voice File for this Word List, add your name or initial to the name of the Voice File so that you can identify it as yours.

(2) To retrain a word, click on the Test button to deactivate the Test mode (the chevrons will disappear from the Test button).

(3) Click on the word you want to retrain.

(4) Click on the Train button. The word will be highlighted with a check next to it and displayed in the upper-left corner for retraining. See Fig. 50.

(5) Say the word more clearly and distinctly than you did for your first training.

(6) Now test the retrained word:

• Click on the Test button.

• Say the word.

• See if recognition is accurate by looking at the word that is displayed at the upper left.

(7) Repeat this procedure for all the words you want to retrain. Then test the words to make sure training was better this time.

(8) Save the Voice File.

5.
Transfer Training to the Finder Word List

Now that you have trained the Base Words, you can transfer trained words to the Finder Word List (or to any application Word List you choose).

(1) Go to the Voice Train File menu and select Open Word List. A dialog box appears.

(2) Select Finder Words.

(3) Finder Words are now loaded in Voice Train. See. Fig. 51.

(4) When a dialog box appears asking to Select a Voice File, open the Base Voice.

- The Voice File is the one you created for Base Words.

- Any words in the Finder list that are the same as words you trained in the Base List appear with a diamond sign next to them. This shows the training has been automatically transferred from the Base Voice File to the Finder list.

(5) To train the remaining words on the Finder List, click the Train button. Untrained words will be presented to you in sequence for training.

(6) Train and test the rest of the words in the Finder list.

(7) To save the trainings as a new Voice File for the Finder, select Save As from the File menu.

(8) Give the file a name that is different from the name given to the Base Voice File.

*Important*: If you give the Voice File a new name, you will have two voice files, Base Voice and Finder Voice. If you do not give the Voice File a new name, the original Base Voice File will be deleted and only this second Voice File with Finder Words will be saved. You do not want this to occur. Retain the Base Voice File so that you can transfer training over to other Word Lists as well. Give the second Voice File a different name.

(9) Go to the File menu and Quit Voice Train.

*If you feel comfortable with the training process, you do not need to read Part II: Voice Train right now. You can proceed directly to Part III: Voice Control to operate in the Finder with voice.*

*If you want to learn more about how to use Voice Train to your best advantage, review Part II first before going on to Part III.*

1. Introduction

Part I covered the basics of using Voice Train. Part II goes into greater detail on how to work with Voice Train.

Voice Train has many uses:

(1) Train the Navigator to recognize your voice when you pronounce the phrases on a Word List for an application. This creates the Voice File used to run the application with Voice Control.

(2) Test the words you have trained, and retrain if training is inadequate.

(3) See what words appear as Close Calls, words that sound similar to the word you just trained. Such words should be pronounced as distinctly as possible from each other when training and using the words, to avoid possible recognition problems. Or add an extra word when you train and pronounce a command, such as "File menu" instead of "File" so it will not be confused with "Style."

(4) Vary the number of trainings you give words, from one to eight trainings. Troublesome words (words that are often misrecognized and appear as Close Calls) can be trained more times if necessary, up to eight times.

(5) Train the Word List in levels of *active* words, words that can be spoken at any one time when using the application. Learning about levels during the training stage will help you avoid making mistakes later on when using voice commands in an application. There's nothing more frustrating than trying to say a word that is not "active" because you've forgotten what level it is on.

For example, words in the File menu (Save, Quit) may be grouped on a level that becomes active when you say the word "File." Words in the Edit menu (Cut, Paste) may be grouped on another level that becomes active when you say "Edit."

2. How Voice Train Works

As you have seen in Part I, Voice Train works in this way:

(1) An application's Word List is loaded into Voice Train by double-clicking on the Word List.

(2) Select the application's Voice File if you have previously started a Voice File for this Word List. Otherwise start a new Voice File.

(3) Click the Train button. Say the voice command presented to you in the left-hand corner of the Voice Train window. Repeat it the number of times you have set for training (from one to eight times), pausing between each time you say the command.

*Note:* If a voice command consists of a phrase with more than one word, do not pause between saying the words in that phrase.

Do pause before and after saying the entire phrase for each training.

(4) Voice Train makes a "model" of how you pronounced the word and stores it in memory. (The model is a kind of average of the ways you have pronounced the word during training.)

(5) Click the Test button to test the training. Say any word that is currently displayed with a diamond sign next to it showing it has been trained.

(6) After you say a word, the Navigator looks for a model of a trained word that matches the sound of your voice. If the match is correct, accurate recognition takes place.

(7) Save the trained words as a Voice File. When you use voice in an application, the Voice File for that application will be loaded. The Navigator will recognize your spoken commands by matching them to the trained words.

3. Training with Voice Train versus Training with Voice Control

• Voice Control enables you to use voice commands in applications. However, it is also possible to use Voice Control to train words while in the midst of an application without going back to Voice Train.

• When should you use Voice Train for training?

It is recommended that you use Voice Train for all of the initial training of Word Lists. Voice Train gives you greater control over training as well as easier testing of the trained words.

• When should you use Voice Control for training?

The training mode in Voice Control is useful for retraining troublesome words while in an application. For example, if you find you get incorrect recognition of words that sound alike, you should retrain these words by pronouncing them more distinctly, or by adding an extra word to the command, such as "File menu" instead of simply "File."

Chapter Two

1. Introduction

There are several ways to open up Voice Train. They all work equally well. You might choose one method over another for the sake of convenience and speed in loading a Word List and Voice File with Voice Train.

• If you are training a Word List for the first time (you have no Voice File for the Word List yet):

*See Section 2 below.*

• If you are opening up a Word List and a Voice File you have already been working with (for example to finish training, to test, or to retrain words):

*See Section 3 below.*

• If you are changing the Word List or Voice File (for example to train several Word Lists in one session with Voice Train):

*See Section 4 below.*

2. To Train a Word List for the First Time

There are two methods to start up Voice Train if you are training a Word List for the first time:

(1) Double click on the Voice Train icon

OR (2) Shortcut: Double click on a Word List.

These are described below.

Double Click on the Voice Train Icon (1) Double click on Voice Train (2) The Voice Train window will appear, with a dialog box (see Fig. 52).

See Fig. 54.

Shortcut: Double Click on a Word List Icon (1) Double click on the icon of the Word List you want to open.

(2) A dialog box will come up asking you for a Voice File. If you have none for this Word List, click New. If you have a Voice File, double click on it to open.

(3) The Word List will appear in the Voice Train window, with no Voice File, or with the Voice File selected.

3. To Open a Word List and a Voice File Already Created

There are several ways to open a Word List and its Voice file:

(1) Double click on Voice Train and select a Word List and Voice File when asked by the dialog boxes.

OR (2) Double click on a Word List icon:

Select a Voice File when asked by the dialog box.

OR (3) Select the icons for a Word List and its Voice File and then double click on either:

Voice Train will open up with these
files automatically loaded.

OR (4) Double click on a Voice File icon:

Voice Train will still open up, but the associated Word List will not be automatically loaded. A dialog box will ask you to select a Word List and a Voice File.

In other words, double clicking on a Voice File icon is the same as double clicking on the Voice Train icon – you still have to select a Word List and Voice File.

4. To Load a Different Word List or Voice File After Voice Train Is Open

Change a Word List

If you want to change to a different Word List after you have already opened one up in Voice Train:

1) Select Open Word List from the Voice Train File menu.

2) A dialog box asks you to *Locate a Word List*.

3) Double click on the Word List.

The new selection will be substituted for the previous Word List.

Change a Voice File

1) Select Open Voice File from the Voice Train File menu.

2) A dialog box asks you to *Locate a Voice File*.

3) Double click on the name of the Voice File.

Open a New Voice File

1) Select New Voice File from the Voice Train File menu.

2) The old Voice File will be discarded (unless you have previously saved it). All trainings will be removed (the diamonds will disappear from previously trained words on the Word List).

Chapter Three

1.
Microphone Type

*Default: External Microphone.*

To make a change in the default setting:

(1) Go to the Options menu and select Microphone . . .

(2) A dialog box will appear (see Fig. 55).

(3) Click the button next to the device you're going to use for voice input. Then click OK.

External Microphone

There is a wide range of choices for the type of external microphone to use. The higher the quality, the better the recognition.

For detailed descriptions of microphone types and what situations they best suit, see Appendix A: *Microphones*.

Internal Microphone

The internal microphone is the microphone built into the Speech Box. It should be used only in quiet places with no noise interference, and the box should be placed so that it is not near sound created by a disk drive, the fan in a computer, etc.

See Part I, Chapter Two, *How to Install Hardware*.

Telephone

If you use the telephone receiver as a microphone, be sure you've connected the jacks properly at the rear of the Speech Box.

See Part I, Chapter Two, *How to Install Hardware*.

Also, remember that you won't be able to use the telephone to send or receive calls while the Voice Navigator is running with the telephone being used as a microphone.

2.
Number of Trainings

*Default: Three trainings.*

Before making a change in the number of trainings you want to give each word, first decide on the number of trainings that will work best for you.

How to Decide on the Number of Trainings (1) It is better to train each word more than once.

• Most people do not say a word the exact same way each time when using the word in an application. For example, sometimes you might articulate carefully and clearly, and at other times slur words hurriedly.

• If you vary your pronunciation slightly during training, it's more likely that one of these ways of pronouncing a word will match the way you say the word while actually using voice in an application.

(2) It is especially important to train several times if you have many words that sound alike, e.g. "file" and "style". There's a possibility that the Navigator will confuse similar-sounding words if there is just one training per word. Several trainings will make it more likely that the correct word will be recognized.

(3) Is more always better? Should you train each word the maximum number of times? Not always.

• Training each word 8 times will be tedious and time-consuming if you have a large Word List.

• On the other hand, if you have a very large Word List with many words on each level, there is a greater chance of recognition errors because more words might sound alike. (Remember, the word you say is matched only with trained words in the same level – it is not matched against all of the words in a Word List). A higher number of trainings is a good idea for a Word List with a large number of words on each level.

Three to Four Trainings for Normal Uses (1) Start off with this rule of thumb:

*Three or Four Trainings for a Small Word List*

*Four Trainings for a Larger Word List*

*Note:* If you are using the built-in microphone, four or more trainings at different distances from the microphone are highly recommended. This will allow you to speak at variable distances from the microphone when using words in an application.

(2) Modify the number of trainings depending on the results you get.

• If you have accurate recognition when testing your words in Voice Train (see below) or using voice commands during an application, experiment with doing fewer trainings. See if recognition is as accurate.

• If you have poor recognition because you've said your words differently in actual use than you did in training, try a higher number of trainings and vary your pronunciation more to simulate a "real-life" situation.

• With experience you'll learn to strike a balance between enough trainings to ensure accurate recognition, and the time additional trainings take.

Six to Eight Trainings for Special Uses (1) Six to eight trainings are useful if two people want to train words at the same time (each person can say the word three or four times, passing the microphone back and forth for each word). The result is a single Voice File that two people can use.

However, this is not recommended. It is definitely best for each person to create a separate Voice File.

How to Set the Training Gauge (1) Point the mouse on the up/down arrow next to the Training gauge. Drag the arrows higher or lower to increase or decrease the number of trainings.

(2) At any time during training, you can change the number of trainings. If you wish to give certain troublesome words more trainings than others, you can increase the training gauge for those words and then set it back to normal for the rest of the Word List.

(3) As you train a word, the training in progress is shown in gray on the gauge. The trainings already completed are shown in black on the gauge. The trainings not yet done are shown by the section in white below the training mark.

3. Confidence Level

*Default: 80%.*

The Confidence Gauge gives you some amount of control over the accuracy of voice recognition.

What Does the Confidence Gauge Do?

• To understand how the Confidence Gauge works, it's helpful to review how voice recognition takes place. After you train a word, the training is stored in memory as a *model*. The models for all the trained words in a Word List become your Voice File for that application.

When you say a trained word while running an application, the Navigator responds by trying to match the word you said with the trained models in memory. (*Note:* The match is not made with all of the trained models in the Word List, only the models of words that are on the same level as the word you said.)

However, since you don't always speak the same each time you say a word, your pronunciation of the word while running an application may differ slightly from the trained model.

• The Confidence Level is the standard for how closely your pronunciation of a word must match the trained model of that word in your Voice File. The Navigator won't try to recognize a word unless it can make a match with the level of confidence you set.

• Look at the Confidence Gauge in the Voice Train window.

The gauge goes from a low of 0 confidence on the far left to a high of 100% confidence on the far right. The gauge is divided by ten notches, each notch representing 10%.

In this example, the shaded area starts two notches from the right. The Confidence Level ranges from 80% to 100%. If you set the Confidence Level at 80, you're saying, in effect, "The Navigator has to be 80% sure that what I said matches a word I trained before it will recognize a word. If it is less than 80% sure, I'd rather have no recognition take place at all and I'll say the word again, rather than risking an incorrect recognition."

80% is a good setting for most users.

• If you set the Confidence Level lower, at 70% for example, that means you want to have a wider latitude for pronouncing voice commands. However, this can possibly result in recognition errors.

• Too high a Confidence Level can create difficulties as well. If you set the gauge at 90%, your pronunciation while running an application will have to be much more precise. You will have to match your original training fairly closely. If your pronunciation deviates slightly, you may find that the Navigator doesn't recognize any word at all.

*Where to Set the Confidence Level*

The Confidence Level that's best for you depends on:

• How clearly you speak. The less clearly, the lower the Confidence Level should be set to give you greater leeway for imprecise pronunciation.

• How widely your pronunciation differs when running an application in contrast to your pronunciation when training the words. If there's a wide difference, the Confidence Level should be set lower.

• The number of words at each level in the Word List, and how close the words sound to each other (i.e., how many potential "close calls" there are). The larger the number of similar-sounding words, the higher the Confidence Level should be set so you have less chance of incorrect recognition.

*How to Set the Confidence Level*

• Drag the arrow at the top of the Confidence Gauge to the left to widen the shaded area, lowering the Confidence. Drag the arrow to the right to shorten the shaded area, raising the Confidence.

*Note:* The left-hand notch at which the shaded area begins marks the Confidence Level. Each notch represents about 10%. s If the notch is one from the right it's at 90%, if two from the right it's 80%, if three from the right it's 70%, and so forth.

• Experiment with different Confidence Levels to see what works best for you. See Chapter Seven, *Recognition Errors*, for more detail on how to check Confidence Levels after you've trained words.

*Chapter Four*

*1. Introduction*

There are several ways to change how a Word List is displayed in Voice Train.

The Options menu contains three items relating to the Word List display: Alphabetize, One Column List, and Show All Levels.

There is also another way that you can alter a Word List. You can transfer the trainings from one Word List to another, so that when you open the Word List any words shared by both Word Lists appear already trained.

These features are described below.

2. Alphabetize the Word List

What Does Alphabetize Do?

- The Alphabetize option lets you see the words in the Word List in alphabetical order.

- Alphabetizing the Word List is useful if you want to train a particular word or group of words. By alphabetizing the list you can find the words you want faster. It is also useful when testing, to locate quickly a word you want to test.

- When Alphabetize is not selected, the words are not listed alphabetically. You may find, however, that similar types of commands are grouped together. For example, numbers might be listed in a row (one, two, three) rather than mixed in alphabetically with other words. This is useful if you want to train words in clusters that logically go together.

How to Alphabetize

- To alphabetize the Word List, select Alphabetize from the Options menu. A check will appear to the left of the menu item.

- To turn off Alphabetize, select Alphabetize again from the menu. The check will disappear.

3. One Column List or Two Column List

What Are One Column Lists?

- One Column List is an item in the Options menu that lets you see the words in a Word List as a single column.

- Normally the words are displayed in two columns.

What Are the Advantages of Two Columns?

- Two columns allow you to see more words at a glance instead of scrolling through a single long column.

*What Are the Advantages of One Column?*

• If there is a phrase that is too long to fit in the two-column format, the phrase is cut off with an ellipsis (. . .). In the one-column format, you can see the entire phrase.

*How to Change the Column Format*

• Select One Column List from the Options menu. A check mark will appear next to the item.

• To change back to two columns, select One Column List again. The check mark disappears from the item.

*4. Show All Levels*

Normally you should not use Show All Levels when training and testing. When you are not using Show All Levels, the Word List is displayed one level at a time.

*Reminder: What Is a Level?*

• A level is a group of words that are active at a particular time while using voice in an application. Every Word List is divided into levels so that the Navigator does not have to try to make a match between what you say and every single possible word on the Word List. The Navigator takes the level triggered by the word that you just said, and only looks for trained words in that same level to make a match. This results in more accurate recognition.

• If you are using Show All Levels in Voice Train, the Word List is shown in its entirety, with all the levels of words in one long list. There are a few instances where this will be helpful for training, as explained in the last section below.

*Showing One Level at a Time*

•If you do not use Show All Levels you will see the Word List one level at a time.

Training the Word List one level at a time is useful for practicing the hierarchy of voice commands on a Word List.

• You should familiarize yourself with the levels of words for each application so that you know when you can use each voice command. A common problem is trying to say a word when it is not "active." If you know how words are grouped into levels, you know when you can say each word.

• When testing words, you will also go from level to level. If you say a word that leads to another level, the Word List will change to show the words on that level. If the next word you want to test is on a different level, you need to go down or up to the appropriate level.

How Levels Work

When you first open a Word List in Voice Train, you see the words that are on the first level. These are all the words you can say when you first begin using voice in an application.

*Example:*

Finder Word List

• If you open the Finder Word List, the first level of words includes all of the menu names: Apple, File, Special, etc. It also includes global words such as First Level and Scratch That. See Fig. 56.

• A word with an arrow next to it has a level of words that becomes active when you say the word in an application.

For example, after you say "File" you can say "New" or "Open" on the next level. Or say "Special" and then "Shut down"on the next level.

How to Move Down Levels (1) To see the words on a lower level, double click on any word marked with an arrow. The words on the level below will appear.

*Example:*

Double click on Apple. The "Apple words" appear (see Fig. 57).

(2) The word in the box above the list of words is the "lead" word, or the word that must be spoken before the words below become *active* or available for saying as voice commands. In the above example, Apple is the lead word.

(3) The number of words in the level shown is displayed at the top, along with the number of words previously trained (words with a ◊ mark).

How to Move Up Levels

There are two ways to move up a level.

(1) Click anywhere in the top section of the Word List display (see Fig. 58).

The list will go up a level. Continue to click in this section until you have reached the top level. You will know when you are on the top level because there will be no "lead word" displayed at the top, just the label "First Level," the total number of words in the level shown, and the number trained:

See Fig. 59.

OR (2) Double click on any word that does not have an arrow next to it. The Word List will go up a level.

*Note:* There is one exception to this rule: global words. See the section below.

Global Words on Every Level

Some words appear on the Word List on all levels. These are known as *global words*. They can be said at all times that you are using this Word List.

*Examples:* Scratch that, Voice Options.

- If a global word is trained on one level, it does not have to be retrained even though the word appears again when looking at the Word List on another level. A diamond will appear next to any global words that have been previously trained.

- If you double click on a global word, the level of the Word List will not change (there are no levels of words "below" or "above" a global).

How to Show All Levels

You have the option of showing all the levels of words on a Word List at once.

(1) Go to the Options menu and select Show All Levels.

The Word List will look like this (see Fig. 60).

- Notice that the total number of words on the list appears at the top.

- Also, in this example Alphabetize has been selected as well from the Options menu. Alphabetize makes it easier to look at the Word List with Show All Levels on. When a Word List is very long, you can locate a particular word more quickly when the list is alphabetized.

*Do Not Use Show All Levels When Training*

It is advisable to train the Word List when it is broken up into levels of active words – not to use Show All Levels.

(1) If the Word List is very large, breaking it up into smaller groups of words is a convenient way to train.

(2) By training in groups of active words, you will get used to what words are in each group. You will know what words are clustered together in a level.

• This is important because when you're using words in an application, you can only say the words that are active. If an inactive word is said, it will not be recognized.

• You will also get to know which active words trigger other words into becoming active when they're spoken. For example, saying "File" might trigger all of the menu items under File to become active, such as Open, New, and Save. If you tried saying these words when they weren't active, they wouldn't be recognized.

(3) Testing with Show All Levels on will result in a greater chance of recognition errors and more Close Calls than a real-life situation of using voice commands in an application.

*Why?* When testing with Show All Levels, the Navigator looks at all of the words on the Word List that have been trained to see which one matches with what you said. With so many words, there is more chance of an incorrect match.

• In contrast, when actually using voice commands in an application *only the words that become active are used for making a match.* With fewer possible matches, there is a smaller chance of a recognition error.

• For best recognition, train and test with levels (i.e., make sure Show All Levels is not checked).

*When To Use Show All Levels*

Sometimes it is a good idea to use Show All Levels.

(1) If you select Show All Levels for training, it is recommended that you turn off Show All Levels for testing.

*Note:* For testing, it's best never to use Show All Levels. That way only the words on one level will be matched with the word you say, rather than the Navigator looking through the entire Word List.

(2) If you want to see what the whole Word List looks like at a glance, without clicking from level to level, use Show All Levels.

(3) If you want to see if a particular word is on the Word List and don't remember what level it is on, it's easier to locate the word by displaying the entire Word List with Show All Levels and then selecting Alphabetize from the Options menu.

*5. Transfer Training From One Word List to Another*

If you have a Word List with some of the same words as the Base Word List, you don't have to retrain the same words twice. You can transfer the training from one Voice File to another.

This method is used with the Base Word List, which contains words that are shared with many other Word Lists. The procedure is outlined below:

(1) Open a Word List.

(2) Open the Voice File for the previously trained Base Word List. For example, after the Base Word List has been trained, open up the Base Voice File with the Finder Word List.

(3) Notice that diamond signs appear next to any words on the Word List that are the same as the previously trained list.

(3) After you train the rest of the words on the new Word List, save the Voice File under a new name.

- Go to the File menu and select Save As.

- Give the Voice File a new name (one that associates it with the new Word List).

*Example:*

Base Voice File
Finder Word List (1) Open Finder Words.

(2) Open the Base Voice File.

(3) Some words in Base Voice are the same as words in the Finder Word List.

These words are displayed with diamond signs next to them, showing they are already trained.

(4) Train the rest of the untrained words on the Finder Word List.

(5) Save the Voice File under a new name, Finder Voice.
The Base Voice File still exists as well.

Chapter Five

1.
Train and Test Buttons

There are two buttons, *Train* and *Test*.

Either Train or Test can be selected, but not at the same time.

To Train

Click on the Train button. The button changes to show that you are now ready to train.

To Quit Training

There are two ways to quit training.

(1) Click again on the Train button. The button changes back, showing you are not training.

OR (2) Click on the Test button. The Train button becomes inactive and the Test button now becomes active, showing you are ready to test.

To Test

Click on the Test button. The button changes showing you are ready to test.

To Quit Testing

There are two ways to quit testing.

(1) Click on the Test button again. The Test button becomes inactive.

OR (2) Click on the Train button. The Test button becomes inactive, and the Train button becomes active.

2. Training Choices

Training choices include:

- Train Untrained Words
- Train Selected Words
- Untrain
- Train All Words

Train Untrained Words (1) To train all the words that have not previously been trained, in consecutive order:

• Click on the Train button. You are automatically in Train Untrained Words mode.

• All of the untrained words in the displayed Word List will be presented for training in order.

• If you have already trained any words (marked with a ◊ sign), they are not presented for training.

(2) To skip ahead to train words and then continue in consecutive order:

• Click on the word you want to train . The word will be highlighted for training.

• Words will be presented for training in consecutive order from this point onward.

(3) To skip back one word or several words to retrain them while you're in the midst of training:

• Click on the word you want to retrain. Words will be highlighted for training in consecutive order from this point down.

*Example:* You may be training the words "1" through "9". When you reach word "5" you realize there has been too much noise in the background since you trained word "3". To retrain from "3" on, click on "3". Training will proceed from this point onward.

*Remember:* When you retrain a word, the old training is discarded. As a result, you can't "add on trainings" to trainings previously done.

Train Selected Words

You can choose to train words out of consecutive order.

*If Train Button Is Not Yet Selected*

• Use this method if you are just starting a training session, and have not yet clicked on the Train button.

| | |
|---|---|
| *Click* | Lets you select words anywhere in the list. The words must be in a consecutive group. They are selected by dragging over them. |
| *Shift-Click* | Lets you select words anywhere in the list whether or not they are consecutive. |

• After selecting words, click on the Train button. Checks marks will appear next to the words selected. The first word in the selected group will be presented for training.

*If Train Button is Already Selected*

• You can select words using the above click or shift-click methods while training.

• If you were in Train Untrained Words mode (that is, you simply clicked on the Train button and began training words), you can select a group of words not in consecutive order. Click to select the words. Check marks will appear next to the words. They will be presented for training in the order you chose, instead of the original sequence of untrained words.

*Note:* If only one word is selected, training will skip to that word (see above).

Untrain

Use Untrain to remove training from selected words.

• Untrain is useful to remove trainings from words that have been mistrained and do not need to be retrained immediately.

*Note:* If a word was mistrained and you want to retrain it on the spot, simply clicking on the word and retraining it will automatically discard the old training.

• If you wish, you can use Untrain to discard a training from a word before clicking on it to retrain.

(1) Click on the word you want to untrain. If you want to untrain more than one word, select the words by using click or shift-click and dragging the mouse across more than one selection.

(2) Go to the Edit menu and select Untrain. The diamond mark will disappear from the words you have selected.

*Shortcut:* If you want to untrain all of the words, to do a completely new training, there's an easier way than selecting all of the words and using Untrain:

• Go to the File menu and select New Voice File. All trainings will be removed and the Voice File name display above the list will become blank.

• If you want the new Voice File to replace the old one, save the new Voice File under the same name as the old Voice File, in the same folder, so that the new file replaces the old one (the old one is discarded).

• If you want to keep both the new Voice File and the old one, be sure to give the new Voice File a different name than the old Voice File when you save the file after quitting Voice Train. Or, you can give the new Voice File the same name as long as you put it into a different folder. (However, this can lead to confusion and is not recommended.)

Train All Words

This is another way that you can train all the words shown in the Word List, even if some words have been previously trained. The old trainings are discarded one by one as you go down the Word List doing the new training.

(1) Go to the Options menu and select Train All Words.

(2) Click on the Train button.

(3) Words will be presented to you for training in consecutive order.

*Note*: Make sure you do not have this menu item selected if you want to go back to normal training (Train Untrained Words mode).

3. How to Train (1) Before training make sure you have already selected the Options menu to set:

• Type of microphone (if different from the default, External Microphone).

• If desired, also select these options:

- Alphabetize
- One Column.

(2) Set the Confidence gauge and number of trainings on the Training gauge.

(3) Decide on a training mode (Train Untrained Words, Train All Words, Train Selected Words, Untrain). Follow the steps in the previous section for each training mode.

(4) Make sure your microphone is properly adjusted (the optimal distance, angle, etc). If there is an on/off switch, make sure it is switched On.

(5) Say the word that is presented in the upper-left corner.

(6) To check voice levels:

• Notice the red LEDs at the front right-hand section of the Speech Box. A minimum of 4 to 5 lights should turn red at the peak of your saying a word. For optimum recognition accuracy, 6 to 8 lights should turn red at the peak.

*Note:* Raising the volume of your voice may improve recognition accuracy while training and testing. But be sure that this is not much louder than you will normally be speaking when using voice to run an application.
See Part I, Chapter Two, and Appendix A: *Microphones* for ways to improve voice levels for your type of microphone and work environment.

(7) After you have said the word once, the training gauge begins to fill up to show what number training you've completed, what number you're about to do, and how many you have left to go.

(8) When you have completed the total number of trainings, the word disappears for a moment before it is replaced by the next word.

• This means the Navigator is building a model of the sound of your voice that it will store in memory.

• If the training is accepted, a diamond (◊) will appear to the left of the word you've trained on the Word List.

(9) If the training is not accepted, the same word will reappear. Repeat the training.

(10) The next word to be trained will appear highlighted on the Word List.

(11) It is a good idea to test your training after a few words.

See Chapter Six, *Testing*.

4.
How to Stop in the Middle of Training

You may need to stop training to take a phone call, cough, or make other sounds that might be picked up by the microphone and mistakenly registered as a training:

(1) If your microphone has an on/off switch, turn the switch off. If using the headset microphone, remove the headset or turn the microphone element aside.

OR (2) Leave the Training or Testing mode.

• Click on the Train button if you are training, or the Test button if you are testing, so that the button is deactivated (the chevrons on either side of >>Train<< or >>Test<< disappear).

• Click on the Train or Test button to go back into Training or Testing.

*Note:* This method is not recommended when training selected words. If you click on the Train button to deactivate training, when you click on the Train button again to turn training back on, the Word List will no longer show the word selections you made previously. You will have to select individual words once more (by using click or shift-click).

Chapter Six

1. What Is Testing?

• Testing demonstrates how well the Navigator recognizes your voice as you say the words you have trained on a Word List.

• You can test at any point -- after you have trained one word, several words, or the entire Word List.

• Testing after training a few words in your first training session is a good idea. It can provide important feedback that will make the rest of your training more effective.

2. How to Test Words

*Do Not Test With the Show All Levels Option*

(1) It is recommended that you do not test with Show All Levels from the Options menu. You should test with the Word List showing one level at a time.

• Testing with one level at a time will simulate actual recognition while running an application. The word you say is matched against the rest of the words that are active in the same level.

• If Show All Levels were active, then the word you say would be matched against all of the words in the entire word list -- which can lead to unnecessary recognition errors.

(2) Remember that *you can only test a word that is in the current level displayed*.

• To test a word that is not displayed, you have to bring up its level:

- Double-click on an arrow-marked word to go down a level.
- Click on the lead word in the top section to go up a level.
- Double-click on First Level, if it appears in the list, to go to the first level.

• Use the Alphabetize option to make it easier to look through the list to see whether the word you want to test is in that level.

Testing Procedure (1) Click on the Test button:

(2) Say a word you have trained (indicated by the diamond mark).

• The Amplitude needle will move in response to your voice.

• The Confidence needle also moves. (More on the Confidence Level in the next section.)

• The word that the Navigator matches with what you said will appear in the upper-left corner.

(3) See if any words are displayed under Close Calls.

• For example, if you said the word "May," under Close Calls you might see the words "Say" and "Pay" listed. These are words you've trained which sound similar enough to the word you just said for the Navigator to list them as Close Calls.

• Use Close Calls as a warning to pronounce these words more distinctly when training and using the words in applications, so that the words are not confused. Or train the words by adding a sound to distinguish one from the other, such as "File Menu" instead of "File" so that it will not be confused with "Style."

(4) Look at the Word List. Has the list changed when you tested a word?

• If the word you said would have led to a different level of "active" words when running with voice in an application, then the Word List will change to show that level.

• The next word you test has to be on the Word List shown. If the next word you want to say is on a different level, change levels:

- To go down a level, click on a word with an arrow (see Fig. 61).

- To go up a level, click anywhere in the top section that shows the "lead" word, number of words, and number trained (see Fig. 62).

(5) What if there is an error in recognition?

• The wrong word might be recognized, not the word you actually said. See if the correct word is listed under "Close Calls."

• There may be no word at all displayed -- nothing is recognized.

*The next chapter describes how to deal with recognition errors.*

Chapter Seven

1. No Word Is Recognized (1) Make sure the Navigator is "listening."

Check these items:

• The microphone is plugged in correctly and switched on if there is an on/off button.

• The Test button is active:

• At least 4 or 5 LEDs on the Speech Box flicker red when you speak, confirming that your voice is at minimum acceptable volume.

(2) Make sure the word you have said is on the Word List displayed.

• If you are not testing with Show All Levels, only one level of words is displayed. The word you said has to be in the displayed list of words. If the word is not in this level, click down or up to the level that contains your word:

- Go down a level by clicking twice on a word with an arrow.

- Go up a level by clicking once in the section at the top with the "lead" word in it. You are at the top level when you see the label "First Level."

(3) Make sure the word you have said is one of the words you have trained.

• See if there is a diamond sign (◊) next to the word you have said, showing it has been trained. You cannot test an untrained word.

(4) Check the Confidence Level:

• If the needle is to the left of the shaded area, that means it's below the Confidence range and the word will not be recognized.

• A low Confidence Level means you haven't said the word loudly enough, clearly enough, or close enough to your original pronunciation during training. As a result the Navigator can't make a match with a word you've trained with the degree of confidence shown by the shaded area.

(5) Say the word again. Speak a little louder, if necessary. Also speak more clearly, and try to pronounce the word the way you did when you trained it.

• See if a word is displayed in the upper-left corner of the window, showing that a word was recognized.

(6) If the word is not recognized after the second test, try adjusting the Confidence gauge.

• You may have set the Confidence Level too high. Lower the level by clicking on the arrow and dragging it to the left. This will pull the shaded area further to the left. Bring the level down at least one notch and then test again.

• You should probably not go below a Confidence Level of 50, otherwise you may get too many instances of incorrect recognition.

(7) Repeat the word.

• Check the Confidence Level again. If a word was recognized, the needle should fall within the shaded area. This shows with what degree of confidence the Navigator recognized the word.

• What if a word was recognized, but it wasn't the word you said?

Look under Close Calls to see if the correct word is listed (there can be up to five close call words). The word might be listed as a Close Call, or it might not be there either.

*See the next section to find out what to do if the wrong word is recognized.*

2. The Wrong Word Is Recognized

There are several steps you can take if you get incorrect recognition of a word.

(1) If your microphone has an on/off switch, make sure that the click of the microphone switch did not trigger recognition by mistake.

To avoid this problem:

• Turn on the microphone before you click on the Train or Test button.

• If you turn on the microphone after you are already in the Training or Testing mode, try to slowly and quietly move the on/off switch so that it does not create a sound loud enough to trigger recognition.

(2) Set the Confidence Level lower.

• You may have the Confidence Level too high. Drag the arrow to the left to widen the shaded area.

• Try saying the word again. Check to see if the correct word was recognized, and where the needle on the Confidence Level registers.

• If you lower the Confidence Level too much, more words may be recognized but the accuracy of recognition might decrease. In other words, you will be c ·ting a wider net and so you will catch more words in it; b· · you will have more chance of catching a stray word that's not the correct one. You should not set the Confidence gauge much below 50.

• If you are getting recognition of the wrong word with a lowered Confidence Level, then the problem may be that you haven't trained the word well enough or enough times.

(3) Retrain the word if necessary:

• Click on the word you want to retrain
• Click on the Train button
• Retrain the word.
• Test again.

(4) Increase the number of trainings.

If retraining the word doesn't work, you may want to increase the number of trainings.

• Increase the number of trainings by moving the arrow up on the Training gauge.

• Retrain the word by clicking on the word and then clicking Train.

*Remember:* Retraining a word discards the previous trainings you have done.

• Test the word. The correct word should be recognized.

Chapter Eight

1. Help Button

Click on this button for information on how to pick words for training:

*Note:* Additional information will be added in future releases.

2.
Memory Bar

• The *memory bar* shows you how much memory Voice Train is using. When you first open a Word List, you will see a certain amount of memory allocated for the Word List itself (the shaded area). As you train words and build up a Voice file, memory used will increase.

• The size of the entire bar does not indicate the total amount of active memory in your system, just the amount allocated for Voice Train itself. This portion does not depend on the type of Macintosh you're using or any other applications currently running.

• If the necessary amount of memory cannot be allocated to Voice Train when you first open up the program, an error message will appear. Consult Appendix B: *Memory* to accommodate memory requirements.

3.
How To Move the Window

You can move the Voice Train window to any position on your screen.

(1) Click and hold down the mouse on any area of white space inside the Voice Train window.

(2) Drag the window and release the mouse at the desired position on your screen.

Chapter Nine

1.
How to Save a Voice File

When to Save

• After a training session, save the trainings as a Voice File.

• You don't have to train and test all of the words in a Word List before saving a Voice File. A Voice File can have as many or as few trained words in it as you choose. You can train a few key words, create a Voice File, quit Voice Train, and then open up the Voice File later on to continue training or testing. Or you can use the Voice File right away in an application with Voice Control.

Procedure

There are two ways to save a Voice File.

(1) Quit Voice Train.

• A dialog box will come up asking you whether you want to *Save, Save As, Discard,* or *Cancel.*

See Fig. 63.

• In this, example, the Voice File has previously been named during a training session (*G's Finder Voice*). If this is your first time creating the Voice File and you have not yet named the file, when you click *Save* or *Save As* you will be asked to name the Voice File. (See Section 3 below, *How to Name a Voice File.*)

OR (2) Go to the File menu and select *Save* or *Save As*. For the difference between the two, see the next section.

2. Difference Between Save and Save As

Save

• If you have not yet created a Voice File and are saving for the first time, selecting *Save* from the File menu has the same effect as selecting *Save As*.

Name the Voice File. A new Voice File is created, with all the trained words present at the time.

• If you are working with a Voice File you've created previously, then selecting Save saves any changes made to the current Voice file . It adds the new trainings you've done. It also removes the previous training of words that were selected with Untrain.

Save As

• Save As saves trainings of words in the currently selected Word List. It creates a new Voice File.

• Use Save As rather than Save when you transfer the trainings from one Word List to another. See the example below.

*Example:*

Select Save As when using the Base Voice file to transfer previously trained words over to a new Word List, so that you do not have to repeat training of words that are shared by the two lists.

(1) Open the new Word List.
(2) Open the Base Voice File.

(3) Any trainings in the Base Voice File that are the same as words in the currently open Word List will be transferred over. Words that are shared by the old Voice File and the new Word List will appear in the display as trained (with a diamond sign).

(4) After you train the rest of the words in this new Word List, use Save As rather than Save. Give the Voice File a new name.

This way, words in the Base Voice File that are not relevant to this Word List will not be retained in the new Voice File. The old Base Voice File will still remain intact, under its old name.

3. How to Name a Voice File

One Person, One Word List

If this Voice File will be your only Voice File and you are using only one Word List, use a name to distinguish the Voice File from the Word List. You will need both files, the Word List and the Voice File, when you use voice recognition while running the application with Voice Control.

*Example:*

You just trained Finder Words. You can name the Voice File "Finder Voice" (this will be the suggestion in the "Save As" section in the dialog box).

Or, you can simply call it "Tim's Voice," for example, because you know it is linked with the Finder Word List (since this is the only Word List you are using with voice).

One Person, Several Word Lists

If you are using more than one application with voice, you have more than one Word List. You should give your Voice File a name that will link it to the correct Word List.

*Example:*

You train both MacPaint® Words and Finder Words.

You might call the Voice File for MacPaint Words "MacPaint Voice," and the Voice File for Finder Words, "Finder Voice."

Several People, Several Word Lists on the Same Disk

If more than one person will be training words for the same Word List and stored on the same disk, then you'll want two Voice Files for the same Word List.

- To distinguish the two files, it will be helpful to name the file in this format:

User's Name (or initial) + Name of Application + Voice.

*Example:*

G's Finder Voice, G's MacPaint Voice
Tim's Finder Voice, Tim's MacPaint Voice

If you didn't add the suffix "Voice" at the end, it might be hard to distinguish the Voice File from the name of a Word List; for example "Finder Words" and "G's Finder Voice."

4.
To Open a New Voice File

You may want to save the trainings you have already done, but start another training session from scratch using the same Word List without the previous trainings you've done.

(1) Go to the File menu and select New Voice File.

(2) The same Word List will remain, but with a new Voice File. Notice that previous trainings are not indicated on the Word List (no diamond signs appear next to previously trained words).

5.
To Reopen a Voice File

If you end a session with Voice Train before you have trained all the words on the list and want to reopen the Voice File again, so that your previous trainings are displayed on the Word List:

(1) Double click on the Word List, or click on the Word List and then the Open button.

(2) When the dialog box appears asking for a Voice File, select your previous Voice File.

The name of the previous Voice File will be displayed at the head of the Word List See Fig. 64.

6. Options Saved When Quitting Voice Train

Some of the choices you have made during a Voice Train session will be saved when you save the Voice File. The next time you open Voice Train, no matter what Voice File or Word List you load, there will be the same settings for:

- Confidence Level
- Number of Trainings
- Microphone
- Show All Levels
- Alphabetize
- One Column List.

Chapter Ten

1. File Menu

Open Word List

Select this item if:

(1) You have not already opened a Word List when you first began Voice Train and the dialog box asked you to select a Word List.

(2) You want to open a different Word List than the one you have selected.

New Voice File

Select this item if:

(1) You did not select New when the dialog box asked you to locate a Voice File after you first began Voice Train.

(2) You selected a Voice File but now want to begin a new Voice File.

*When would you want to begin a new Voice File?*

• If you have already been working with a Voice File training words, and want to open up a fresh Voice File without any words trained, select this item. It is a shortcut around quitting Voice Train, reloading the Word List, and loading a Voice File.

• You have opened a different Word List and want to open a new Voice File for the Word List.

• New Voice File can also be useful if a second person is going to train the same Word List and create a Voice File right after you have created your own Voice File.

• Or you may want to create a second Voice File for yourself with a different microphone choice, a different number of trainings, or other changed parameters.

Open Voice File

Select this item if:

(1) You did not open a Voice File when the dialog box asked you to at the beginning when you first opened up Voice Train.

(2) You want to open a different Voice File than the one you first selected.

Save

Select this item to save any changes you made to a Voice File.

Save As . . .

Select this item to save a new Voice File. A dialog box will ask you to give the file a name.

Also select Save As to save a Voice File when you transfer the training from Base Words to a new Word List.

Quit

Select this item when you want to quit Voice Train. If you have made any changes to the Voice File, a dialog box will come up asking you if you want to save your work. You will be asked to name the file if you haven't already done so.

2. Edit Menu

Untrain

If you want to remove training from selected words:

(1) Be sure the Train button is not clicked on (it does not have the chevrons showing it is active: >>Train<<). If it is on, click to turn it off. Using shift - click, select the words you want to untrain.

(2) Select Untrain from the Edit Menu.

Notice that the "trained" diamond (◊) is removed from the words you have selected.

3. Options Menu

Show All Levels

If selected, this item will be checked (√). To remove the check, select again.

• If you select Show All Levels, the entire Word List will appear with all levels or groups of words in one continuous list.

• If Show All Levels is not checked, then words will be shown one level at a time. In this way, you can easily see the hierarchy of words in a list -- that is, which sets of words can be active at any one time while running an application.

*Note:* A level is a group or set of words that are active after the "lead word" at the top of the list has been spoken.

Alphabetize

If selected, this item will be checked (√).

Alphabetize will cause the words currently shown to be displayed in alphabetical order.

One Column List

If selected, this item will be checked (√).

When selected, the Word List will appear only one column wide. Normally the Word List is two columns wide.

• This item is especially useful if you have voice commands consisting of several words that are too long to fit in the two-column format without being cut off and ending in an ellipsis (. . . ).

Train All Words

If selected, this item will be checked (√).

Train All Words in the Options menu differs significantly from Train Untrained Words.

• Train Untrained Words is activated by simply clicking on the Train button. Use this mode when you want to train all untrained words on the list. If you have done any previous trainings, the trainings will be retained. Only untrained words on the list will be presented consecutively for training.

• If you have done some previous trainings but now you want to delete previous trainings and proceed with training the entire list afresh, select Train All Words. All words will be automatically highlighted in consecutive order as you train.

*See Chapter Five, Training for more details.*

Microphone ...

When selected, this item brings up a dialog box that allows you to choose the type of microphone you are using.

*Note:* For all the Options menu items above the selections you make will be saved for the next time you open up Voice Train.

The exception is Train All Words. This will always be turned off when you first open up Voice Train.

PART III

Chapter One

1.
Overview of Part III

Part III explains how to use the words trained with Voice Train to run applications with Voice Control.

Chapter One provides a brief outline of how Voice Control works.

Chapter Two explains how to begin using voice.

Chapters Three and Four discuss how to set voice options and how to train words while in Voice Control.

Chapter Five continues with a discussion of advanced features.

Chapter Six covers selected questions and answers about using Voice Control.

2.
What Is Voice Control?

- Voice Control lets you run applications with voice.

- Voice Control uses the application's Word List and the Voice File created when you trained the Word List with Voice Train. See. Fig. 65.

- Voice Control does not have to be opened up each time you want to use voice in an application. The software resides permanently in your System (it is an INIT). This makes it instantly accessible.

3.
How Voice Control Works

- The first time you open an application that you want to run with voice, you can activate Voice Control and select the application's Word List and Voice File. The file names are saved in the *Voice Settings* file.

*Example:*

| | |
|---|---|
| *Application Name* | MacDraw |
| *Word List* | MacDraw Words |
| *Voice File* | Tim's MacDraw Voice |

• The Voice Settii.gs file is saved in the System Folder with the Voice Drivers and Voice Contro:. Whenever you open the application from now on, Voice Control will automatically load the correct Word List and Voice File.

4.
How Recognition Takes Place

• Voice Control tries to make a match between the word you say and words you have previously trained and saved in the Voice File.

• If there is a match, voice recognition takes place.

• The application will do whatever would have been done if you had used the mouse or keyboard, instead of voice.

*Example: Using Voice in a Word Processing Application*

| | |
|---|---|
| Say "File" | The File menu is selected |
| Say "New" | A new file is opened |
| Say "Font Size" | The Font Size menu opens |
| Say "12 point" | 12 point is selected, etc. |

Chapter Two

1.
How to Begin (1) If you followed the steps in Part I, you have already:

• Installed Voice Control in your *active System folder on your active disk*, the same place Voice Prep and Voice Driver are installed.

• After installation, you have restarted the computer. The Dragon dialog box appeared showing Drivers are loading.

• You have trained the Finder Words with Voice Train, and saved the training as a Voice File.

*Note:* You do not have to start out using voice in the Finder. You can use any application for which you have trained a Word List and created a Voice File.

(2) If you are not in the Finder, quit the application you are in and return to the desktop.

You will know you are in the Finder when you see the menu bar with Apple, File, Edit, View, Special.

See Fig. 66.

(3) The first time you go into an application for which you've created a Word List and Voice file, you must tell Voice Control you want to use voice. This will enable you to select the correct Word List and Voice File. After this, whenever you go into the application the Word List and Voice File will automatically load.

*To Activate Voice Control:*

• Press the Command-Clear or Command-Escape keys (depending on your keyboard).

(4) A dialog box appears to locate the Word List.
Select Finder Words and click Open. See Fig. 67.

(5) A dialog box appears to locate the Voice File.

• Select Finder Voice and click Open. See Fig. 68.

(6) After selecting the Word List and Voice File, the Dragon box will appear displaying the name of the Word List and Voice File that are being loaded.

(7) A "headset" will appear around the Apple menu icon showing that Voice Control is activated (see Fig. 69).

(8) If you are not using an external microphone (if you are using the telephone or the internal microphone), you need to change the default setting for Voice Control.

• Simultaneously press the Command key and number 2 from the numeric keypad.

*Note:* Do not press "2" on the regular keyboard above the letters. Go to the numeric keypad (usually to the right of the letter keyboard).

• The Voice Options dialog box appears. See Fig. 70.

• Select the type of microphone you are using by clicking on the appropriate button. Then click OK.

*Note:* You can ignore the rest of the settings in the Voice Options box for now. They will be explained in Chapter Three, *Voice Options*.

(9) Practice using voice in the Finder.

• Say any of the words you have trained.

• The Finder will respond as though you used the mouse or keyboard.

(10) Notice that in the menu bar at the far right, a box appears with the last word recognized. For example, say "Voice Options" to bring up the Voice Options dialog box (see Fig. 71).

This is the "Last Word Prompt" box . It will change as you speak to show the last word that was recognized.

(11) If you need a reminder of what voice commands you can use:

• Say "Word List."

• The Finder Word List appears, with diamond marks next to the words you have trained.

*Note:* The Word List only displays the level of words that became active when the last word was recognized.

• To change the Word List display, you can say "Scratch That" to erase the last recognition and move up a level. The words displayed will be the words that are active on another level.

• To quickly move back up to the first level, say "First Level." The display will show the words that are active on the first level.

(12) If you want to temporarily turn off recognition (for instance, to talk to someone or sneeze), there are several choices:

• Use the microphone's on/off switch to turn the microphone off.

• If the microphone you are using does not have an on/off switch or if you find that too much trouble, you can temporarily turn off full recognition by saying the global command "Go to sleep."

"Go to sleep" will still allow the word to be recognized (it will appear in the Last Word Prompt box). However, no operation will occur.

*Example:* Say "file" and the File menu will not open, although "file" will appear in the Last Word Prompt box.

• Say "Wake up" to restore full recognition.

2.
*What to Do If There Is a Recognition Error*

If you say a word but it is not displayed in the Last Word Prompt Box, a recognition error has occurred. There are two kinds of errors:

• You say a word but a different word is recognized

• You say a word and no word is recognized.

These are explained below.

(1) If the word that appears is a different word than the one you said:

• Say "Scratch That" to erase the last recognition.

• Say the word again.

*Note:* "Scratch That" will bring you up one level each time you say it. Keep saying "Scratch That" as many times as necessary to return to the level you want. To quickly return to the first level, say "First Level."

(2) If no new word appears (there has been no recognition of what you said):

• Say the word again.

• If there is still no recognition, say "Word List" to bring up a display of the words. Make sure the word was trained (there should be a diamond sign next to it).

• If the word was not trained, do a training on the spot. See Chapter Four for how to retrain words.

• If you bring up the Word List and do not see the word that you were trying to say, the word is not active at the time.

• Say "Scratch That" and then "Word List" again. You will see the Word List one level higher. If the word still isn't there, keep saying "Scratch That" until you reach the level where the word is displayed. Or say "First Level" to quickly return to the first level.

• Say the word or words that will trigger the active level you need.

(3) If you consistently have recognition problems with certain words (incorrect recognition or no recognition at all), you may want to alter the Confidence Level. See Chapter Three, *Voice Options*.

See the next section for ways to avoid recognition problems.

3.

To Ensure Recognition Accuracy

The main points are:

(1) The microphone must be turned on and recognition must be on.

(2) Conditions when using Voice Control should be similar to conditions when you trained the Word List with Voice Train.

(3) The word you say must have been trained.

(4) The word you say has to be on the level of words that is currently active.

These are explained below.

*(1) The microphone must be turned on and recognition must be on.*

• This seems obvious, but it's easy to forget. If you are using an external microphone with an on/off switch, it must be switched on before you begin speaking!

• Turn the microphone off when external noises can be picked up by the microphone and interfere with accurate recognition. Also turn the microphone off when not using voice to save the battery if you are using a battery powered microphone.

*Note:* If you have frequent noise interruptions and find turning the microphone switch on and off a bother, use "Go to sleep" to temporarily deactivate recognition. Be sure to say "Wake up" to reactivate recognition.

*(2) Conditions when using Voice Control should be similar to conditions when you trained the Word List with Voice Train.*

To make sure the Navigator picks up your voice commands so that there will be an accurate match with words you previously trained, follow these guidelines:

• Keep the microphone the same distance away from your mouth and use the same microphone as with Voice Train.

• Speak as loudly or softly as when you trained the words with Voice Train.

• Make sure that external noise conditions are similar to what they were when using Voice Train.

*Example:*

- An extremely noisy environment when using Voice Control may distort your voice when you speak if training was done in a very quiet environment, and result in recognition problems.

- The opposite is true as well. If you train in an extremely noisy environment and then use voice in a very quiet environment, your voice may sound quite different and lead to recognition errors.

*(3) The word you say must be trained.*

• Say "Word List" to call up the active list of words.

• If there is a diamond mark next to the word you want to say, it has been trained.

• If it has not been trained, you can train the word while still in Voice Control. See Chapter Four, *Training Words with Voice Control.*

*(4) The word you say has to be on the level of words that is currently active.*

• Look at the Last Word Prompt box in the menu bar to see what word was last recognized. This will indicate what level is active.

• If you do not know what words are on the currently active level, say "Word List." See if the word you want to say is displayed.

• If the word is not displayed, you are not on the level where that word is active.

*If you need to go down a level, say the word that will activate the correct level.*

*Example:* a) You want to say "Multiply."
b) The last word recognized was "Apple."
c) The Word List does not show "Multiply" on the level of active words. But it does show "Calculator."
c) Say "Calculator" to go down to the level that includes "Multiply."
d) Now "Multiply" is on the active Word List. Say "Multiply."

*Going Down Levels*

"Apple"
|

"Calculator "
|
"Multiply"

*If you need to go up a level, say "Scratch That."*

"Scratch That" is a global word, always available. Each time you say "Scratch That" you go up one level. Continue to say "Scratch That" until you reach the required level. Or say "First Level" to go directly to the First Level.

*Example:* a) You want to say "File," which is on the first level.
b) The last word recognized was "Multiply," which is two levels deep.
c) Say "Scratch That" twice to get back up to the first level.
Or, even faster, say "First Level" to go directly up to the first level.
d) Now say "File." File is recognized.

*Going Up Levels*

"Multiply"
|
"Scratch That": Go Up a Level
|
"Scratch That". Go Up Another Level
|
Say "File"

• Before using Voice Control you should first become thoroughly familiar with the levels of active words in a Word List.

- Practice going from level to level by using the Test mode of Voice Train. When you say each word, the active level of words appears in the Word List.

- Review the sections in the manual discussing how levels work. See Part I, Chapter Five, Section 2, and Part II, Chapter Four, Section 4.

4.
Quit the Application and Save (1) After practicing with Voice Control, quit the Finder by selecting a new application.

*Reminder:* You can use voice to open up a new application.

• Use the "launch" voice command to launch another application that has come with a Word List (e.g. ,"Launch MacPaint," "Launch Microsoft Word ").

OR

• Say "move" or "go" to bring the pointer to an application icon, and then say "double click" to open up the application.

*Note:* The difference between "move" and "go" in the Finder:

Move: Moves the cursor left, right, up, or down 10 pixels.

Go: The cursor moves continuously, in two different speeds depending on the direction command given:

- Left, right, up, and down will move the cursor at a slow rate.
- East, west, north, and south will move the cursor at a faster rate.

•Say "stop" or "halt" to bring the cursor to a stop.

(2) When you leave the application you have been working in (in this case the Finder), a dialog box appears:

See Fig. 72.

(3) To save the Voice Options settings for the next time you open the application (settings such as Microphone Type):

Click *Save*.

(4) To discard the Voice Options you just created and return to the default settings:

Click *Don't Save*.

(5) When to click *Save As:*

If more than one person is using Voice Control on your disk, you can save the Voice Options under your name so you will always have your own Voice Options loaded.

• Click *Save As*. A dialog box will come up asking you to name the user's voice settings:

See Fig. 73.

• Enter the user's name and click *Save*.

Chapter Three

1.
Open Voice Options

What are Voice Options?

The Voice Options dialog box allows you to set such options as the type of microphone you are using, the Confidence Level, etc. Generally you will only need to set these once. However, if you are a beginning user you might want to alter some of the settings as you progress with Voice Control until you decide on the settings that work best for you.

How to Bring Up the Voice Options Dialog (1) If you have not yet trained the command "Voice Options" and made the correct microphone settings, use the keyboard:

Press the Command key and then 2 from the numeric keypad.

*Note:* Do not use the "2" on the regular letter keyboard. Go to the numeric keypad (usually to the right of the letter keyboard).

(2) If you have trained "Voice Options" and have already made the correct microphone setting (or you are using the default, External Microphone):

Say "Voice Options."

(3) The Voice Options dialog box appears:

See Fig. 74.

(4) Each of the options are described in a section below. Remember, after you select options click OK to exit out of the dialog box and return to the application.

Saving Options will be explained in more detail in Section 11 below.

2.
Microphone

See Fig. 75.

*Default: External Microphone*

(1) To change the microphone selection, click on the appropriate button for External Microphone, Internal Microphone, or Telephone.

3. Number of Trainings

See Fig. 76.

*Default: Three Trainings*

To change the number of trainings given to each word that you train or retrain while in Voice Control:

(1) For one to three trainings, click next to the appropriate number of "trains."

(2) For more than three trainings, click in the box and insert a number up to eight.

*Note:* You should have already trained the Word List in Voice Train. However, if you need to you can train while in Voice Control, without opening up Voice Train.

Training while in Voice Control is useful if:

- There are any words you did not train
- There are words that need retraining (if you get repeated recognition errors because initial training was inadequate).

See Chapter Four for more on training while in Voice Control.

4. Confidence

See Fig. 77.

*Default: 80%.*

0% at the left is the lowest Confidence Level; 100% at the right is the highest Confidence Level. Each notch represents 10%.

(1) Lower the Confidence Level by sliding the bar to the left.

(2) Raise the level by sliding the bar to the right.

*Reminder:*

• The Confidence Level in Voice Control is similar to the Confidence Level in Voice Train. It sets the minimum standard for recognizing words.

*Example:*

• The level is set at 80%. Say a word. If the way you pronounced the word is close enough to the way you trained words so that Voice Control is at least 80% confident of a match, voice recognition will take place.

• If you say a word in a way that rates below the Confidence Level you have set, Voice Control will not try to make a match. There will be no response (non-recognition). You will have to repeat the word.

5. Close Calls

See Fig. 78.

*Default: 100.*

(1) First-time users of Voice Control should not change the default level (100).

(2) More Advanced Users:

• After working with a Word List and seeing how accurate recognition is, you will be able to judge whether you want to set the Close Calls gauge at a lower level in order to bring up the Close Calls box. See Chapter Five, *Advanced Features* for an explanation of how to use the Close Calls box.

• How to set the Close Calls Gauge to bring up the Close Calls box:

- Slide the bar to the left to set the Close Calls gauge at about 40.

- Set the Confidence Level at about 80.

6. Headset

*Default: Headset on.*

(1) The first button next to the headset icon in bold shows that Voice Control is active.

(2) To deactivate Voice Control for this application only, click the second button next to the muted headset. Notice that the headset icon around the Apple at the menu bar disappears. See Fig. 79.

*Note:* There are several ways to activate and deactivate Voice Control. See Chapter Five.

7. Voice Settings, Word List, Voice File

*Default: Name of Currently Selected Settings, Word List and Voice File.*

See Fig. 80.

Voice Settings

If more than one person is using the same disk for Voice Control, you should make sure the correct user's Word Lists and Voice Files are automatically loaded when applications are opened.

(1) Click on the Voice Settings icon.

(2) A dialog box appears asking you to select a User Setting.

(3) Select the correct user's name.

(4) The user's name is displayed in the Voice Options dialog box.

*Example:* GL's Voice Settings (5) If you save the change when you quit the application, from now on the Word List and Voice File for the user selected will automatically appear when an application is opened.

Word List and Voice File (1) The Word List and Voice File icons show what Word List and Voice File have been selected.

(2) To change the open Word List or Voice File, click on the Word List or Voice File icons and select a new file.

(3) The new file names will be displayed un 'er the icons.

(4) If you choose to save the change when you quit the application, whenever you open the application the new Word List and Voice File will open.

When to Select a New Word List or Voice File

• If you train a new Voice File for a Word List (for instance, if the old Voice File was done under noisy conditions and doesn't produce accurate results).

• If you make a new Word List for an application or modify the old Word List (with Language Maker – see Part IV), and you want the application to open automatically with the correct Word List.

*Note:* When changing the Voice File or Word List in the Voice Options dialog box, the old Voice File or Word List for that application will not be discarded. Only the Settings file will change, so that the newly selected Voice File or Word List will open automatically with this application.

- If you ever want to select the old Voice File or Word List, you can still do so. Click on the Word List or Voice icon and select them when the dialog boxes appear asking for a Word List or Voice File.

- If you want to discard the old Voice File or Word List, drag its icon into the trash when you are back at the desktop.

8.
Memory Bar

See Fig. 81.

Chapter Four

1.
When To Train or Retrain Words In Voice Control

Word Lists should be trained first with Voice Train. Occasionally you may want to train individual words while in Voice Control, if:

(1) You realize you forgot to train a word in Voice Train. You want to train "on the fly" while in an application, instead of quitting the application to open up Voice Train.

(2) You want to retrain some words. Certain words may consistently give you recognition problems – they are not being recognized or they are being confused with other words.

Retraining can help in several ways:

• If you suspect you didn't say certain "problem" words clearly enough during their initial training with Voice Train, retrain them with a more distinct pronunciation. Exaggerate or emphasize the sounds in problem words so they can easily be differentiated from other words.

*Remember:* The way you say the word when you retrain it is the way you should continue to pronounce it when using the word in an application.

• You may also want to give problem words an additional number of trainings.

See the next section below to add trainings.

2. How To Change the Number of Trainings

If you want to change the number of trainings that you set when you first brought up the Voice Options dialog box:

The Memory Bar indicates how much memory is being used by Voice Control.

Memory use is partly determined by the size of the Word List and Voice File. If memory is getting short, try increasing the amount of memory available. See Appendix B: *Memory*.

9. Save Options

Selections made in the Voice Options dialog take two steps to "stick."

(1) After you've made all the selections, click *OK*. This will record the settings only for this one time that you are using the application.

(2) When you quit the application, a dialog box will appear asking you if you want to permanently save the changes you have made in this voice session, including changes in the Voice Options dialog box. See Fig. 82.

• Click *Save* if you want the changes you've made in the Voice Options dialog to automatically be used each time you open the application.

• Click *Don't Save* if you want to make the Voice Options changes for this time only. The Voice Options settings will revert to whatever was lasted saved (or to the default settings).

(1) Say "Voice Options" to open up the dialog box, or use Command-2 (from the numeric keypad).

(2) Change the number of trainings by clicking a train button or clicking in the box and entering the number of trainings (up to 8). See Fig. 83.

(3) Say OK to quit the dialog box, or click OK.

3. How to Train Words (1) Say Word List (or press Command-1 from the numeric keypad).

(2) A Word List box appears, showing words on the level that became active when the last word was recognized (look in the Prompt Box at the menu bar for the last word recognized).

(3) Double click on the word you want to retrain.

(4) The word will be highlighted and a training dialog box will come up.

(5) Say the word the number of times indicated. The number of times corresponds to the number of trainings you set in the Voice Options dialog box.

*Example:* You set the number of trainings to 3. The training dialog box reads:

"Please say (1/3): APPLE."

The number 1/3 means you're doing the first training out of three.

(6) Say the word. The display changes to 2/3, showing you are ready for the second training out of three.

(7) Say the word a second time. The display changes to 3/3, showing you are ready for the last of three trainings.

(8) Say the word the last time. A message appears:

"Building the Model....."

This means the training has been accepted and a model is being stored in the Voice File.

*Note:* Retraining in Voice Control replaces the original training of a word in Voice Train. The old training is discarded and the new training is put into the Voice File.

(9) How to select several words to train:

- Use shift-click to highlight a group of words.
- Double-click on the highlighted group.
- The words will be presented in consecutive order for you to train.

(10) At any point you can stop in the middle of training:

Press down the Option key on the keyboard. The training dialog box will disappear.

(11) To exit from the Word List:

- Say the next word you want to be recognized.

OR

- Click anywhere in the window outside of the Word List box.

OR

- Press Command-1 (from the numeric keypad).

*Note:* Command-1 toggles the Word List on and off.

(12) To save changes made to a Voice File:

- When you exit the application, a dialog box will come up asking if you want to save the changes you made to the Voice File. See Fig. 84.
- Click Save if you want to save the changes.

Chapter Five

1.
To Activate/Deactivate Voice Recognition

How Voice Control Works (1) Voice Control is always ready to be used because you have installed it as an INIT in your System Folder. You will see the Dragon Voice Driver icon when you boot up your computer.

• If there is a Word List and Voice File for an application, Voice Control is automatically activated when you open that application. (The first time you use an application, Voice Control needs to be activated by pressing Command-Clear for you to load the correct Word List and Voice File. After that, Voice Control will be automatically activated when you start the application).

• If there is no Word List or Voice File, Voice Control is automatically deactivated when you open that application.

(2) There are times that you may want to override the automatic activate/deactivate feature to turn recognition on and off. There are several ways to do this. They have somewhat different effects, as described below.

To temporarily turn off full recognition while in an application

If you are in an application and don't have a microphone switch to turn recognition on and off in the midst of noise interruptions:

(1) Say "Go to sleep" to turn off full recognition.

The word will still appear in the Last Prompt Box, but the operation normally executed when the word is recognized will not occur.

(2) Say "Wake up" to return to full recognition.

To deactivate voice for one time only while launching an application

If you have a Word List and Voice File for an application, the first time you open up that application and select the Word List and Voice File it will be stored in the Settings file.

From then on, each time you launch the application Voice Control will be automatically activated. However, if for some reason you do not want to use voice a particular time that you are using the application, you can deactivate voice for one time only.

This method allows Voice to automatically become active again once you quit the application. Voice will be active the next time you open up that application, and it will be active for any other applications you open up.

(1) While opening up the application, hold down the Option Key. Voice will be deactivated for this application only, and for this one time only.

(2) To reactivate Voice while still in the application, press Command-Clear or Command-Escape.

*To permanently deactivate Voice for an application until reactivated*

This method deactivates voice for an application. From now on, whenever you open up the application voice will not be active. Voice remains deactivated for that application until you reactivate it again.

Voice will still remain active for other applications.

(1) Open the Voice Options dialog box ( say "Voice Options" or press Command-2 from the numeric keypad). The headset icon that is bold is selected, showing voice is activated.

See Fig. 85.

(2) Click the Headset icon that is dimmed to deactivate Voice.

See Fig. 86.

(3) To reactive Voice for that application, call up the Voice Options menu by pressing Command-2. Click the bold headset.

*Note*: Changing the headset icon will only work for the next time you open up the application if:

• You quit the application
• When the dialog box comes up asking whether you want to save the User Settings, you click *Save*.

*To deactivate Voice for all applications*

This method deactivates Voice Control for all applications, until you choose to activate it again.

(1) Press Command-Escape or Command-Clear (depending on the keyboard you have).

(2) To reactivate Voice, press the same keys again (either Command-Escape or Command Clear).

*2.*
*To Change the User*

If there is more than one person using the same disk for voice, when you change users you want to be sure that the correct user's Voice File is always automatically loaded when you open an application. Otherwise, you will have to select the correct Voice File each time you open an application.

(1) Open the Voice Options dialog box (by saying "Voice Options" or pressing Command-2 from the numeric keypad).

(2) Click on the Voice Settings icon.

(3) When the dialog box comes up, enter the new user's name.

(4) Click OK.

(5) The Voice Options dialog shows the name of the new user's settings.

(6) Your Voice files as well as the Voice Options you have previously set will automatically become active when you open an application.

3.
To Open a Word List and Voice File

Normally if an application does not have a Word List and Voice File in the Settings Table, Voice Control will automatically be deactivated when you open that application.

However, the first time you use an application with voice you must force the Voice Control dialog boxes to come up asking you to locate a Word List and Voice File.

(1) Press Command-Clear or Command-Escape to activate Voice Control.

(2) A dialog box asks you to locate a Word List.

(3) Select a Word List and click Open.

(4) A dialog box asks you to locate a Voice File .

(5) Select a Voice File and click Open.

*Note:* If no Word List or Voice File is selected, the Voice Options dialog box will show no selection (see Fig. 87).

4.
To Change a Word List or Voice File

If you are in an application and decide you want to change the Word List or Voice File you can do this easily.

(1) Bring up the Voice Options dialog box (by saying "Voice Options" or pressing Command-2 from the numeric keypad).

(2) Click on the Word List or Voice File icon.

(3) A dialog box will come up asking you to locate a Word List or Voice File.

- Select it and click OK.
- When you quit the application, save the new User Settings.

*Note:* From this point on, the new Word List or Voice File will become linked to the application you are in (it will be recorded in the Settings File). Whenever you open the application, the new Word List or Voice File you have chosen will be automatically opened.

(4) You can keep the same Word List and open a different Voice File, or keep the same Voice File and open a different Word List.

5.
To Start a New Voice Settings File

You may want to start a new Voice Settings File if you change all of the Word Lists and Voice Files associated with application names in the Settings Table. For example, you may have created new Voice Files for all your application Word Lists.

To delete the old Settings file and build a new one with your new Voice Files:

(1) Open Voice Options:

Say "Voice Options"

OR

Press Command-2 from the numeric keypad)

(2) Click on the Voice Settings icon.

(3) When the dialog box comes up, select a new Voice Settings file. See Fig. 88.

*Note:* You can retain the old Settings for future use, or discard them entirely.

6.
To Use the Close Calls Box

What Is the Close Calls Box?

If the Close Calls Gauge is set at a low level (40%) and the Confidence Gauge at a high level (80%), they act together to do the following:

(1) If you say a word that cannot be recognized with a high degree of certainty, a pop-up menu with up to six Close Call words will appear at the menu bar.

(2) Say the number that corresponds to the correct word.

(3) The word will be recognized.

*Note* The numbers 1-6 should have already been trained when you trained the Base Word List. The numbers will then be recognized when you are in another Word List (it is built into Voice Control).

When To Use the Close Calls Box

The Close Calls pop-up menu is especially helpful when doing text entry or other instances where:

(1) The Word List has many words on each level. Accurate recognition can be difficult if what you say is matched against many words on the same level of active words.

OR (2) There are very similar-sounding words on each level. This can also cause recognition difficulties.

How to Use the Close Calls Box (1) Call up "Voice Options."

(2) Set the Confidence Gauge at 80% and the Close Calls Gauge at a low level, such as 40%.

The two gauges will work together to bring up the Close Calls box when necessary.

Chapter Six (1) *Can you open up Voice Train while you have Voice Control running?*

If you start up Voice Train, it will temporarily render Voice Control inactive. Once you quit Voice Train, Voice Control will start up again automatically.

(2) *Can you run HyperCard with Voice Control?*

Yes, HyperCard will work just like any other application with Voice Control.

(3) *Can more than one Word List or Voice File be active at any one time while using Voice Control?*

No. Only one Word List or Voice File can be active for voice recognition at one time, whether you are using Voice Control or Voice Train.

(4) *Can you remove the headset icon from around the Apple menu icon?*

It will always be present whenever Voice Control is active.

(5) *What will happen if you don't load a Word List or Voice File when first beginning to use Voice Control with an application?*

• Voice recognition will not be activated for an application unless a Word List and Voice File are selected the first time you start up the application. Press Command-Clear and respond to the dialog boxes that will appear.

• If you do open up the Word List and Voice File the first time and save the Voice Settings, then every time you open the application the correct Word List and Voice File will be automatically loaded.

(6) *Can you use voice for some actions and use the mouse for others?*

Yes. For example, you can select a menu name with voice and then select the menu item under that name with a mouse click (e.g., you can say "File" and then click on "New").

*Special Note for Mac Plus Owners:* There is one exception to the above rule. On the Mac Plus, if you select a menu name by voice you have to select the menu item by voice as well. This is due to the way the Mac Plus operates, which is somewhat different than a Mac SE or II.

*Now you have learned how to train and use voice commands in applications. To make sure that you create a high-quality Voice File, be sure to review the points in Part II: Voice Train if you have not already done so.*

*If you want to modify Word Lists or create new Word Lists for applications for which Word Lists are not available, turn to Part IV, Language Maker.*

Part IV

Language Maker

Chapter One

1. What Is Language Maker?

Functions of Language Maker (1) *Create entirely new Word Lists for applications that have not come with prepared Word Lists.*

Language Maker is a powerful desk accessory that expands voice recognition to any application written to Apple specifications, whether or not it has a prepared Word List. With Language Maker you can create a Language File and compile a Word List so that you have unlimited use of voice in operating the Macintosh.

(2) *Customize the user interface for any application that has a Word List, creating commands and macros to operate in the application in entirely new ways.*

Language Maker can dramatically change how you run an application.

• Elevate menu items to the first level, so that you do not have to select a menu name before selecting the menu item.

*Examples:*

Say "New" to open a new file without having to say "File" first.

Say "12 point" without having to say "Font Size" first.

• Create macros to link together several operations in one voice command.

*Examples:*

Say "12 point Times bold" instead of selecting the menus for Font, Font Size, and Style separately.

• Answer dialog boxes by voice.

*Example:*

Say "Print All, OK" instead of selecting the Print dialog, clicking OK, etc.

• Move the mouse to specific places in a window, click or double click, drag, throw items in the Trash, etc., all with voice even if these commands are not in the original application.

See the following list for a sampling of the many commands available with Language Maker which can be added to any application.

*Voice Commands Available with Language Maker*

- Menu Selection
  - Menu names
  - Menu items
- Dialog Box Responses
  - Click on buttons
  - Click on icons, check boxes, etc.
- Mouse Control
  - Click on any specified place on the screen or in a window
  - Drag the mouse
  - Move, then click the mouse
  - Hold mouse down, let mouse up
- Windows
  - Scroll down, up, left, right
  - Page down, up, left, right
  - Move to parts of windows:
    Grow Box, Zoom Box, etc.
  - Change from one window to the next
- Text
  - Enter text
  - Enter text macros : Say a short phrase, such as "letterhead," and have a long text string automatically typed such as your name, address, and the date.
- Keystrokes
  - Press down or let up modifier keys:

Command, Control, Option, Shift

- Include characters to format text:

Enter, Return, Backspace, Tab, Arrows (left, right, up, down).

See Fig. 89.

*(3) Display the Language File for a Word List in a way that clearly shows how the Word List works.*

Language Maker displays words grouped by level, so you can see what words become active when a word is spoken.

It also shows ways of using the words that are specific to an application. For example, it indicates the number of times a word can be said, or the sequence in which words must be said.

As a result, Language Maker is a useful tool to learn how to run an application with voice commands.

*Note* : If you do screen dumps and then print an application's Language File you will have a very helpful copy of the entire Word List and the structure of levels. This is can be used when training the Word List in Voice Train to become thoroughly familiar with the levels of words so that it is easier to operate with voice.

2.
How Language Maker Works

The Language File

Language Maker creates a *Language File*. The Language File is compiled into a Word List with the help of another program, Vocal.

Vocal

You don't have to learn to use Vocal; it works in the background as a "silent partner" with Language Maker to produce a Word List. After you create a Language File, simply double click on the Language File icon to produce a Word List.

Altering Word Lists

At any point, you can take a Word List you've created and put it back into Language Maker to make alterations. This means that after using a Word List and discovering what features you would prefer, you can load the Word List back into Language Maker and make changes.

You can add items under the Apple menu, for example. You can change the names of voice commands. You can change the level of a voice command so that it is on the first level, and it is active when you first start up the application.

3. How to Learn to Use Language Maker

Language Maker has a wide range of features that can be used to create sophisticated Word Lists to accomplish many tasks by voice.

Chapter Two describes how to work with Language Maker. Chapter Three describes one of the most common ways to improve an existing Language File, changing the level of a command.

Chapters Three through Eight demonstrate how to create a new Language File for applications that have not come with prepared Word Lists. Many of these features can be incorporated into existing Word Lists if desired.

Advanced users will find it helpful to refer to Chapter Nine: *Output for Special Commands.*

*Turn to Chapter Two, How to Work with Language Maker, to learn the basics first.*

Chapter Two

How to Work with Language Maker

1. A Note About Memory

If you are running out of memory while using Language Maker, a warning may appear. The warning comes up when you still have enough memory to save what you are doing.

To increase memory:

(1) Turn off Multifinder, and/or
(2) Turn off Voice Control, or other INITs in your System that may be taking up memory.

*Note:* Voice Control does not have to be on to use Language Maker. You also do not need to be connected to the Speech Box.

2. Setting Up

Opening Language Maker (1) Make sure you have installed:

- Language Maker ( a desk accessory)
- Vocal
- Finder Words (or other Word List)
- Finder Language File (or the appropriate Language for the Word List).

(2) Select Language Maker from the Apple menu.

*Note:* To open Language Maker while using Multifinder:

- Press the Option key down and hold it down
- Select Language Maker from the Apple menu
- Release the Option key.

If you do not use the Option key, Multifinder will open Language Maker with the DA Handler. As a result you will not be in the application that you want to use with Language Maker.

Opening a Language File (1) Whenever you first open Language Maker, a window appears with six commands.

These are *global* commands that form the basis of creating a new Language File for an application that does not come with a Word List.

(2) Rather than working with a new Language, this chapter will start off by looking at an existing Language (the Finder).

To open the Finder Language File: Select Open from the Language Maker menu. See Fig. 90.

*Note:* How to Locate the Language Maker Menu

- The Language Maker menu is listed as LM. Normally it appears at the far right-hand side of the menu bar. If it does not, it may be in the middle of the menu bar (wherever there is room).
- If there is no room in the menu bar, the Language Maker menu may be hidden behind whatever is in the menu bar at the far right. Click to see whether the LM menu is there. If it is, it will appear over the normal menu item.

(3) A dialog box appears. See Fig. 91.

(4) Select Finder Language. Click *Open*.

(5) The Finder Language appears in the Language Maker window.

3. Format of a Language File

Changing Type Size and Style

If you would like to change the type size or style of the Language Maker list, you have some leeway in the Preferences menu.

(1) Select Preferences from the Language Maker menu.

(2) A dialog appears (see Fig. 92).

(3) Scroll to select a different type face. Click on your choice to highlight it.

(4) Select 9 point or 12 point by pressing the appropriate button.

(5) Click OK.

(6) The Language Maker list is now changed to a new type size and style.

(1) A voice command that consists of more than one word is written in the Language Maker list with an underscore between the words instead of a space.

*Example:*

The voice command Scratch That is listed as scratch_that.

(2) All words are written in lower case.

Position of Words

To see how words are indented according to levels, scroll down the list until you reach the words listed under File (about 3/4 the way down the list). See Fig. 93.

(1) Words that are flush left and not underlined are on the first level (they can be spoken first).

*Example:*

File is flush left; it is on the first level.

(2) Words on a lower level are listed below the first-level word that makes them active. The lower level group is indented to the right.

*Example:*

The menu items New folder, Open, Print, etc. are all on a level below File. They become active when File is spoken.

(3) If there were any words on an even lower level, they would be indented further to the right than the level above.

*Note:* This method of indenting further to the right each time a lower level is reached is similar to the way an outline is written.

Symbols Used

| Symbol | Meaning |
|---|---|
| *(1) Bold Circle (•)* | *List of Indented Words Below* |

Notice the bold circle next to File. This indicates that below File there is a word or words indented to the right.

Often words indented to the right are voice commands on another level below the word with the bold circle.

Sometimes the word indented to the right is an underlined word, which is a group name (see item 4 below).

| | |
|---|---|
| *(2) Open Circle (o)* | *No List of Indented Words Below* |

*Example:*

Notice the open circle next to New folder, Open, Print, etc. This indicates that these words do not have a list of words indented to the right beneath them. There is no level of words below; it is the end of a level.

*(3) Asterisk (*)* *Global Word*

*Example:*

Scroll back up to the beginning of the list. The first group of words have asterisks. This indicates that these are *global* words. They can be said at any time, since they are active on all levels. See Fig. 94.

*(4) Underlined Word* *Group Name*

An underlined word is not a voice command. It is a *group name* for the words listed beneath it. A group name is assigned for convenience only. It can be changed without changing the way the Word List works or what voice commands are spoken.

The examples below illustrate various types of group names used in the Finuer Language.

*Example 1:*

*Generic Group Name, such as Root Commards*

"Root commands" is a generic name used for grouping the miscellaneous first-level commands beneath it such as OK, Cancel, Yes, No, etc. (see Fig. 95).

Notice that these commands are marked by an open circle. That means there are no lower levels of words that become active by pronouncing these

*Example 2:*

*Group Name Relating to Type of Commands Below*

Keys is an example of a group name that relates to the type of commands listed below. In this case the key commands are Shift key down and Shift key up. See Fig. 96.

*Example 3:*

*Group Name Not on the First Level*

In this example, the underlined word locations is not flush left, but indented beneath Window. It is therefore on a level below Window.

The function of the underlined word is the same, despite its position -- it still indicates a group name for the list below it. In this case, the list below it contains location words such as Top, Top left, etc. Since the location words are indented below Window, they cannot be said until the word Window is said (just as with any group of indented words). See Fig. 97.

*Example 4:*

*Group Name Beginning with "Quit" or Similar Word*

Sometimes a group name begins with "Quit," such as "Quit Movement," or a similar word such as "Exit," "End," etc. This is a convention used to show that after saying any of commands in the group above it, the only way to quit the level and end the action is to say one of the "Quit" words. See Fig. 98.

In this example, after you say Move you can say any one of the movement words such as Left, Right, Up, Down, etc. to direct the movement of the cursor. However, you must then say a Quit Movement word in order to stop the movement of the cursor. When you say Click, Double Click or Halt, you exit out of the level of words that became active when you said Move. If you didn't say a Quit Movement word, you would stay on the Movement level and only be able to say words that change directions.

*Note:* Words that must be spoken in order to exit from an active level are not always underlined with a group name beginning with Quit, as above. However, another indication of such words is the & sign (see below).

*(5) & Sign - Groups of Commands Listed Below Must Be Spoken in Sequence*

When a word is preceded by an & sign, this indicates that the commands below must be said in sequence. The order in which the commands are listed defines the sequence.

*Remember:* Normally, words that are listed on the same level can be said in any sequence once the level is active.

*Example 1:*

*Words Spoken in Any Order*

Within the set of words headed by the group name movement you can say the words in any sequence. You can say Up, Right, Left, Down; or Left, Up, Down, Right, etc. See Fig. 99.

*Example 2:*

*Groups of Words Spoken in Sequence*

If there is an & sign before the word that heads two group names, the *groups* of words below must be said in sequence. However, the the *individual words within the group* can be said in any sequence.

In this example, you can say a movement word first, and then you must say a quit movement word. You can say Move, Left, Up; then you must say Click, Double Click or Halt.

*Note*: There is not always an underlined group name heading the second group of words in a sequence, such as quit movement. The second group of names may be marked out from the first group by not being indented as far to the right as the first group.

*Example 3:*

*Quit Group Without a Group Name*

In this example, after you say Scroll you can say any of the direction words such as Left, Right, etc. Then you must say Halt. Even though Halt is not listed under a group name such as quit scroll, you know that it is a separate group from the direction words because it is not indented as far right as the direction words. It is only indented one space, the same amount that directions (the group name) is indented. See Fig. 100.

*Example 4:*

*Sequence of Commands with No Group Name*
& file
o open
o close

This indicates that you need to say the sequence "File, Open, Close."

*(6) Superscripts $^{0\,1}$, $^{1\,\infty}$, $^{0\,\infty}$ Repetition of Commands*

These symbols indicate how many times a command can be repeated before exiting out of a level. For example, in a dialog box you may want to be able to repeat a command more than once, or only once, before quitting the dialog. Or perhaps you do not want to say any command at all (i.e., not use voice to press any dialog buttons) if you want to quit out of the dialog as soon as it is opened up.

A repetition symbol appears as a superscript after the name of a command or a group name. If it appears after a group name, it applies to all of the words within that group.

$^{0\,1}$ A command can be said 0 or 1 time $^{1\,\infty}$ A command can be said 1 or more times $^{0\,\infty}$ A command can be said 0 or more times

*Example:*

Next to <u>movement</u> notice the superscript $^{0\,\infty}$. This means that any of the movement commands listed below can be said from zero to an infinite number of times. See Fig. 101.

*Note:* No repetition symbol means you can say the command only once and then you go up to the previous level if the command is on a lower level.

Combining Features

In the last example above (*Figure 12*) several different Language Maker features are combined:

- & command indicating sequence
- Grouping commands (movement and quit movement)
- Repetition symbol ( ° ∞)
- Bold circle indicating a list indented below (next to movement)
- Open circle indicating no list indented below (next to the words Left, Right, etc.).

The result is a very specific and useful language. After you say Move, any movement commands can be said such as Left, Right, Up, Down, and they can be spoken from zero to an infinite number of times. After movement commands are spoken, you must say Halt or another Quit Movement word. The key to using Language Maker effectively is to learn to combine such features to create a language that is tailored to the application and to the user's needs.

Also, since Language Maker shows not only the levels of words but specific ways of using words – such as the number of times words can be said or the sequence of words – it is a useful tool to learn how to run an application with voice commands.

*4.*
*How to Select Words*

By selecting words and groups of words you can make changes in these voice commands.

This section summarizes how to select words.

*To Select A Word And Its Levels*

Click on the word. The word and all of the sub-levels made active by saying that word become bold.

*Shortcut:* Click on a word, then use the up/down arrow keys to scroll through the list. If you start at the first level, all of the levels below will be selected and you can click through the list going from first level to first level. If you start at any other level, you will go down level by level or word by word. See Fig. 102.

To Select Only A Single Word

Command-click on a word. Only that word becomes bold, without the levels beneath it.

*Shortcut*: Use the Command key with the up/down arrow keys to scroll up and down the language one word at a time. (See Fig. 103.)

To Select Several Levels of Words

To select levels for several words, use Shift-Click. First select one word by using Command-Click. Scroll down to the end of the group you want to select, and Shift-Click. All of the words in all the levels between the two clicks will be selected.
(See Fig. 104.)

*Note:* If you use shift-click, the words will always be selected from the beginning of one level to the end of another level. To end in the middle of a level, see the next item below.

To Select Words That Span Across Levels

To select a group of words that does not necessarily start at the beginning of a level or finish at the end of a level, use Command-Shift-Click. Command-Click to select a word that does not include its entire level, and then Command Shift-Click on the last word to select a group that spans across levels.
(See Fig. 105.)

To Cut, Copy And Paste Words

One reason for selecting words is to cut, copy, and paste within the Language Maker List.

To do this, make a selection of words using one of the methods described above. Then go to the Edit menu and select Cut, Copy or Paste as needed.

*Shortcut:* Use these keyboard equivalents:

| Key | Edit Item |
|---|---|
| Command - x | Cut |
| Command - c | Copy |
| Command - v | Paste |

5.
How to Alphabetize the List

If a list is large, alphabetizing the list makes it easier to locate a word.

Alphabetizing by First Level (1) Select a first-level word by using Command-Click.

(2) Select Alphabetize Group from the Language Maker menu.

(3) All first-level words will be put in alphabetical order. However, words below the first level will not be alphabetized. (See the next section to alphabetize within a level.)
(See. Fig. 106).

*Example:*

In the Finder list, File words were originally listed before Edit words (following the order of the menu in the Finder). After alphabetizing by first level, File words are listed after Edit words.

Alphabetizing Words Within a Level (1) Command-Click on any word within a level.

(2) Select Alphabetize from the Language Maker menu.

(3) All the words within the level will be alphabetized.

See Fig. 107.

6. How to Hide Levels

To make it easier to locate first-level words in a long list, lower levels can be "hidden" temporarily.

(1) Command-Click on a word with a level below it that you want to hide.

(2) Press the minus key (from the numeric keypad).

(3) All levels below the first-level word that was selected disappear.

(4) To show all levels again, Command-Click on the word and then press the plus key (from the numeric keypad).

*Shortcut:* Using Option-Click to select a word will act as a toggle, hiding/showing the levels of words below the word selected.

*Turn to Chapter Three to learn how to modify a Language File.*

Chapter Three

How to Alter Levels in a Word List

1. Why Alter Levels in a Word List?

This chapter demonstrates how to customize a Word List to make running an application more efficient, by cutting out steps that would normally be done either with voice or with the conventional keyboard and mouse.

The change that will be made is a simple but useful one: altering the level of a word. The word will be Open, which is on a level below File in the Finder. With the existing Finder Word List, you must say File before you can say Open.

If you find that inconvenient, and would rather say Open without having to say File first, you can do this by changing the level of Open. Open will become a first-level word just as File is on the first level.

*Remember:* To change a Word List, you must first change the Language File with Language Maker. Then the Language File is compiled into a new Word List by Vocal.

2.
How to Change a Word's Level

Procedure (1) Find File in the Language Maker list.

(If you have alphabetized the list as described in the previous chapter, File should be easy to locate.)

(2) Notice that Open is displayed on a level beneath File (it is indented to the right of File).

(3) Select Open by using Command-Click and holding the mouse down on the word. Do not let up the mouse yet.

(4) Notice that a gray line (a "slider bar") appears above the word selected.

(5) Still holding down the mouse, drag to the left. The "slider bar" will move to the left as the mouse moves (but the word remains stationery for the time).

(6) Drag up, until the slider bar is immediately above the word File.

(7) Release the mouse.

See Fig. 108.

(8) The word Open is now in line with where the "slider bar" moved, flush left. It is on the first level, and can be spoken before you say File.

(9) Notice that the word Open is still in bold. This is because you have just selected it to perform an operation. If you click elsewhere in the window, the boldface will disappear.

(10) The same "slider bar" method can be used to move words down a level in the hierarchy.

*Example:*

To bring Open back under File, select Open and drag it one space to the right and down below File. Release the mouse.

Open now must be said after File.

(11) Move Open to its first-level position once again:

Slide Open to the left and above File.

Summary

To change the level of a word, Command-Click to highlight the word. While holding the mouse down, drag the slider bar to the desired position.

*To go up levels:* Drag up immediately above the word that triggers the lower level that the word originally was on. Drag as far to the left as needed to put it on the proper level.

*To go down levels:* Drag down and to the right as far as needed.

*Shortcut:* Use the left/right arrow keys to move a selected word one space to the left or right.

Exercise Caution When Changing Levels

Changing levels can be convenient to elevate commands to the first level. However, this option should be chosen with care.

(1) Beware of Similar-Sounding Words

If you move many words up to the first level, there may be too many similar-sounding words for recognition accuracy to remain high.

(2) Commands that Depend on a Previous Command

An application may have an action that cannot be carried out until a previous action occurs. For example, you cannot respond to a dialog box until the dialog box is brought up.

For this reason you would not want to elevate the command for a dialog response above the command that brings up the dialog in the first place.

(3) Forgetting When a Command Is Elevated

Memory problems are not always computer-resident; they can involve the user as well. Will you remember that you have taken a command out of its normal order in an application? For example, while in the heat of working in an application will you recall that you earlier took a menu item out of its place below a menu name?

To make sure you cover your bases, it is wise to make a copy of a command before when you elevate it, rather than simply removing it from its previous place. Having a command in two places (on two different levels, one in its normal place and one in an elevated place) will ensure that you can say the word in its normal sequence or use the shortcut to say the word on a higher level.

To copy a word, select the word and use Copy and Paste from the Edit menu. Then proceed with the normal method of moving the word up a level. One copy of the word will remain in its usual spot on the level below.

(4) Idiosyncrasies of Applications

Some applications will not work as expected when you elevate a command. This may have to do with reasons internal to the application.

For example, a menu item that is not normally highlighted until the menu name is clicked may not work if you try to use voice to say the menu item before saying the menu name.

In such cases, if elevating a command does not work then it is easiest to go back to the original hierarchy that follows the way the application was structured.

3. Save Changes

When changes are made to a Language File, it must be compiled into a new Word List before the changes can take effect while using the Navigator.

To compile a Word List, first save the changes you made in the Language File. Then Vocal will compile the Language File into a new Word List.

*How to Save*

(1) Click on the Close Box of the Language Maker Window.

(2) A dialog box appears:

(3) Click Save. (See Fig. 109).

(4) A dialog box appears (see Fig. 110).

(5) The default shown is the same name as the previous file (Finder).

• If you want to keep the same name, click Save. This means that you intend to replace the previous version of the Finder Word List.

• If you want to keep the old version as well as the new version, give this file a different name, such as *Finder Language 2*. Then click Save.

(6) A dialog box will appear if you kept the same name:

(7) If you want this new version to replace the previous version of the Finder Word List (you will not keep two versions), click *Yes*. See Fig. 111.

4. Compile a New Word List (1) Double click on the new Finder Language icon.

(2) Vocal will automatically begin compiling the Language File into a Word List. See Fig. 112.

(3) The result will be a new Word List for the Finder. See Fig. 113.

*Note:* If you have selected the altered Word List under a new name, and you want to start using it to run an application with Voice Control, you will have to tell Voice Control to use this new file instead of the old one. See Part III, Chapter Five, Section 4, *To Change a Word List or Voice File.*

*Turn to Chapter Four to learn how to start a new Language File for applications that do not have prepared Word Lists.*

Chapter Four

How to Start a New Language File with Menu Items

1. Introduction

The previous chapters have described how to work with a Word List that already exists. However, a Word List may not have been provided for an application you want to run with voice. You can create a Word List from scratch with Language Maker.

This chapter covers one of the primary features to control by voice, selection of menu items.

The following chapter (Chapter Five) will add dialog box responses. These two areas -- menus and dialog boxes -- will enable you to effectively run an application by voice.

The example used is WriteNow. You can follow along using any application you choose.

2.
To Open a New Language File (1) Open the application you are going to work with (in this example, WriteNow).

(2) Select Language Maker from the Apple menu.

*Remember:* If using Multifinder, hold down the Option key to select Language Maker from the Apple menu.

(3) The Language Maker window appears with several global words. These are words that can be said at any time, on any level of the hierarchy.
It is suggested that you keep these global words to begin any new Language File.
See Fig. 114.

| Global Word | Meaning |
|---|---|
| Scratch That | Goes up one level at a time |
| First Level | Goes directly up to the first level of words |
| Go to Sleep | Temporarily suspends full recognition |
| Wake Up | Restores recognition |
| Voice Options | Calls up the Voice Options dialog box while in Voice Control |
| Word List | Calls up the Word List while in Voice Control. |

(4) It is not recommended that you add many global words, as this complicates recognition since global words are active on all levels.

If you do want to add a new global word, you can do so by using the Action window. This procedure will be described in Chapter Seven, Section 4.

3.
To Change the Name of a Command

If you want to retain what the global words do, but change the word you say to accomplish the action:

(1) Double click on the global word you want to change.

(2) The word's Action window appears.

• The selected word appears highlighted in the bottom rectangle. This is the voice command that is actually said. (See. Fig. 115.)

• In the larger rectangle is the type of command selected. In this case, Scratch That is described as Previous Level.

• If you wanted to see what the Output for the word is (the message that is given to Voice Control to execute the action):

- Double click on Previous Level. The Output window appears with 'escape' as the way Scratch That is translated to Voice Control.

- In this example you will not be making any change in the Output window. Click Cancel to go back to the Action window.

*Note*: The rest of the icons and buttons in the Action window will be discussed later on. For now, they can be ignored.

(3) To change the voice command that is spoken, type a new voice command in the highlighted box.

(4) Click the OK button.

(5) The new voice command now appears in the Language Maker list, replacing the previous voice command. (See Fig. 116.)

*Remember:* You can rename a voice command any way you wish. For better recognition accuracy, the word you substitute should follow these rules:

• A word with several syllables is better than a one-syllable word.

• Strong consonants like 'k' and hard 'g' are better than weak consonants that don't record well, like 'w' and 'p'.

• Words that sound similar to other words may be confused. Try to use distinctive words, or add an extra word. For example, "file" and "style" are often confused, but you can say "file menu" which will distinguish it from "style". See Chapter Five for *Tips on Using Language Maker.*

4. To Create Default Menu Commands (1) Click on the application window to make it the active window.

If you don't, you may not see all of the application's menus.

(2) If you cannot see both the application window and the Language Maker window at the same time on your screen:

• Use the Grow Box to shrink the application window so that you can see both the application window and the Language Maker window on your screen at the same time.

OR

• Drag the Language Maker Window and the application window apart, so that the windows do not overlap and both can be seen.

*Warning:* Do not make the mistake of clicking the Close Box of the Language Maker window to temporarily hide the window. It will quit Language Maker entirely.

(3) Select Create Default Menus from the Language Maker menu (listed as LM). The application's menu names appear in the Language Maker window.

(4) A message may appear warning that some words have been skipped. See Fig. 117.

This applies only to voice commands within the same level. The exact voice command cannot appear twice in the same level. However, it can be repeated on different levels.

In this case, the same menu item will never appear twice under the same menu name. Therefore, the same voice command will never appear twice within the same level. You can ignore the message in this instance.

(5) The voice commands are listed in Language Maker in a hierarchy of levels that reflect the way the menu names and menu items appear in the menu bar of the application.

• *Menu names* are on the first level. They are listed flush left, with a black circle next to them (showing there are words beneath them).

• *Menu items* are listed under their menu names on a lower level. They are indented to the right, with an open circle next to them (if there are no words beneath them).
(See. Fig. 118.)

(6) If you want to change the hierarchy, so that you say voice commands in an order that is more convenient, follow the procedure described in Chapter Three to bring menu items up a level:

• Command-click on the word.

• Drag to the left. The "slider bar" moves to the left.

• Drag the "slider bar" up immediately *above* the word that activates its level. (In this case, File.)

• Release the mouse.

Now you can say this word without first saying another word to make it active.

*Note:* Create Default Menus will scan the menu bar as currently shown and add the names of menu items.

• If there are menu items that change when you use an application (for example, Show Clipboard when selected will change to Hide Clipboard), you can add the "hidden" name separately. Only the default menu items are selected when you use Create Default Menus.

• Palettes, tool boxes, and other special types of menu items that do not have names may not be listed.

See Sections 5 and 6 below for these types of menu items.

5. To Add Menu Commands

Adding a "Hidden" Menu Item (1) Click on the application window to make it the active window.

(2) Perform the operation in the application to make the menu item change.

In this example, click on Show Clipboard in the Edit menu so that it changes to Hide Clipboard.

(3) Command-click on the word in the Language Maker list that you want the new menu item to follow.

In this case, you want Hide Clipboard to be listed after Show Clipboard. Command-click on Show Clipboard so that it is highlighted.

(4) Select Preferences from the Language Maker menu. (See Fig. 119).

(5) Click on the check box for *Use Menu Item Numbers*. See Fig. 120.

*Note:* This refers to the Output of the menu item and will not affect the voice command for the menu item.

(6) Click OK.

(7) Click on the application window again to make it the active window.

(8) Select New Action from the Language Maker menu.

(9) The Action window appears with nothing yet recorded in it. (See Fig. 121.)

(10) Move the cursor up to the menu bar.

• Notice that when the cursor leaves the Action window and moves across the screen, it becomes a cursor with a small microphone icon attached.

• When the cursor reaches the menu bar, the microphone icon changes to show that what is being recorded is a menu.

(11) Select the menu item by pulling down the menu and letting up the mouse in the usual fashion.

(12) The Action window records the menu selection.

• The voice command is called Hide Clipboard (highlighted in the lower rectangle).

• The type of voice command is Menu Item (in the upper rectangle).
(See. Fig. 122.)

(13) If you want to change the voice command, type the change into the lower rectangle.

(14) To see how the menu item number was used in the Output for this command, double click on Menu Item. The Output appears (see Fig. 123).

(15) Click OK to return to the Action window.

(16) Click OK in the Action window.

(17) The voice command for the menu item is listed in the Language Maker window in its proper place.

In this case, Hide Clipboard appears after Show Clipboard. (See Fig. 124).

(18) For consistency, also change the Output for Show Clipboard so that it uses the menu item number. (Remember, the menu item numbers for menu names that change are the same, because both menu names reside in the same location.)

- Double click on Show Clipboard to bring up its Action window.

- Double click on Menu Item to bring up the Output.

- Change the Output to the menu item number used for Hide Clipboard (#30,#17). Click OK.

- Click OK in the Action window to exit.

Adding Several Menu Items

Whenever you use New Action to add several commands, there is a shortcut you can use:

(1) After you record the first menu item in the Action window, click More rather than OK. The Action window will disappear briefly and then reappear for the next menu item to be recorded.

(2) After the final item has been recorded, click OK.

(3) The Action window disappears and all of the recorded menu items are displayed in the Language Maker window.

6. Palettes and Tools

- Graphics applications often include special menus such as palettes and tools. The items are not named but are displayed visually as a design, a color, or a symbol (a circle or lasso, for instance).

- When using Create Default Menus, these items will not be picked up by Language Maker. Only the menu name will be listed.

The following section describes how to add commands for these items.

Adding Palettes and Tools That Are in the Menu (1) Select Preferences from the Language Maker menu.

(2) Click on Use Item Numbers.

(3) Click OK.

(4) Select New Action from the Language Maker menu.

(5) Select the menu with the palette or toolbox items, and click on the first item. (It is suggested that you start from the first item on the left in the top row.)

(6) The item will be recorded in the Action window with a number.

• Numbers are useful for visual symbols that are difficult or confusing to name, such as "White squiggles on black" versus "Black squiggles on white."

• If you prefer, you can give the item a name:

- Type the new name in the highlighted rectangle.

- Click More if you will be going on to record another item.

(7) Proceed with the remaining items. Click OK after the last item has been recorded.

(8) The palette or tool items will be added to the Language Maker list.

Adding Palettes and Tools That Are Separate Windows

In many applications, palettes and tools are not in the menu at all. They are separate windows.

You can add commands for items in separate windows with a somewhat different procedure than that used for items in the menu:

(1) Select Preferences from the Language Maker menu.

(2) Click on Use Window Name.

(3) Click OK.

(4) Select New Action from the Language Maker menu.

(5) You will be clicking on each individual palette or tool item. The spot where the click takes place becomes its "location" which is recorded by Language Maker. The location is defined by coordinates (y,x).

What if you later move the palette window around the screen? The location coordinates should be relative to the window itself and not the entire screen, so that no matter where the window is placed the items within it will still have the same location coordinates. To do this:

• Click on the lower right-hand box of the four large boxes in the Action window. The window changes from gray (screen-relative) to white (window-relative). (See Fig. 125.)

• Clicks will now be recorded with window-relative coordinates.

(6) Click on the first palette or tool item you want to record.

*Note*: If you will be recording all the items, it is suggested that you proceed in some order that will be easy to remember later on (such as left to right, top to bottom). Also, remember that you do not have to record all the items (especially if there are many choices). Record only those you want to access with voice.

(7) After you click on the item, the item is recorded in the Action window.

(8) Double click on the upper rectangle to see the Output window. The window name is included in the Output with the coordinates that locate the place in the window where the click was recorded.

(9) Click OK to return to the Action window.

(10) If you wish you can give the item a name by typing in the lower highlighted rectangle.

(11) Click More to go to the next item. Proceed as above, clicking on the tool or palette and renaming it if you wish.

*Note:* If the palette changes to another set of choices when you click on a box or icon in the palette window, you can record this second set of choices as well.

• Using New Action, first click on the box or icon that makes the window change from its default state to another set of choices.

• Then click on an item in the window.

• Both clicks will appear in the Action window, one beneath the other. Give both clicks a single name. This creates a macro. A single voice command will change the window from its default state to bring up the new set of choices, and then click on the item you want to select.

• Click OK to exit out of the Action window.

• Now click in the palette window to go back to the default state again (this click is not recorded, as you are not in the Action window).

• Select New Action again, and click to change the palette window from its default again. Click on the second item. Give this macro a name.

*Shortcut:* You do not have to click in the palette window to change the default each time. You can stay in the Action window and simply type in the click and its Output. Then click on the palette item.

• Proceed until all of the menu items have been recorded as macros, so that two actions occur at once when the command is spoken (the default window is changed, and the menu item that now appears in that location is selected).

7.
Save the Language File (1) Select Save As from the Language Maker menu.

(2) A dialog box appears.

(3) Enter a name for the Language File. If you want to keep the default name, click *Save*. (See Fig. 126.)

*Note*: For the purposes of learning how to use Language Maker, WriteNow is the example. However, a Word List and Language for WriteNow already come with the Navigator.

If you are following along with any application that already has a Language provided, then you should give a different name to the practice Language File that you are developing as you follow this tutorial. For example, you could name the new WriteNow Language "WriteNow Lang 2."

If you kept the same name, you would be replacing the previous Language File that came with the Navigator, which is not advisable.

(4) If you want to quit Language Maker for now, click on the close box in the Language Maker window.

*You have now created a Language File that enables you to use voice to select menu names and menu items in an application.*

*Go on to Chapter Five to add voice commands for clicking in dialog boxes.*

Chapter Five

How to Create Voice Commands for Dialog Boxes

1. Introduction

This chapter will describe how to add dialog box responses to the Language File for WriteNow started in the previous chapter. The dialog used as an example is one that appears in many applications, the Print dialog under the File menu.

Voice commands will be created to click on buttons, check boxes, and icons. First the default buttons will be recorded, i.e., the buttons as they appear when first opening up the dialog box. Later you will be able to add "hidden" buttons that do not appear until an action is taken in the dialog box.

The button names will be grouped in the Language Maker list so that they can be used just the way clicks are used in the dialog box.

2. Record Dialog Responses

Record Clicks (1) If you are not already in Language Maker with the correct Language loaded:

• Select Language Maker from the Apple menu. (Remember to use the Option key if in Multifinder.)

• Select Open from the Language Maker menu.

• A dialog box appears:

• Select WriteNow Language 2 (or whatever Language File you created in the previous chapters). Click Open. (See Fig. 127.)

(2) If you will be working with a large or complex dialog box with many buttons, it is helpful to have a printed copy of the dialog box so that you can keep track of the button names as they are recorded:

• Refer to the printed version of the dialog box in the application manual, or

• Do a screen dump of the dialog box and then print it out.

(3) Command-Click on the word in the Language Maker list after which you want the dialog buttons listed. The word you select should be the word that brings up the dialog box.

• In this case. since the Print dialog is brought up by selecting Print under the File menu, command-click on Print. The word is highlighted.

(4) Select Record Dialog from the Language Maker menu. A window appears:

(5) Drag the Dialog window so that it will be out of the way when you open the application's dialog box. However, the Record and Cancel buttons should still be visible (partially visible is fine, so long as you can you can still click on the buttons). (See Fig. 129.)

(6) Click in the application window to make it the active window. The application's menu bar appears.

(7) Bring up the application's dialog box that you want to operate by voice command.

• In this example, select Print from the File menu.

(8) Make sure that the Record and Cancel buttons in the Language Maker Dialog window are still visible, so that you can click on them.

• If two windows are overlapping, the application's dialog box should be the first window on top of Language Maker's Dialog window.

• Most application dialog boxes can be moved around but some (called modal dialogs) cannot be moved. The Print dialog is one such example; the Page Setup dialog is another. These cannot be dragged out of the way. If you cannot see the Language Maker's Dialog window, quit out of the modal dialog box and move the Language Maker Dialog window to a better position. Open up the application's dialog box once more.

(9) Click Record in the Language Maker Dialog window.

(10) Now you are ready to start recording mouse clicks in the application's dialog box.

• Move the cursor to the application's dialog box (in this case, the Print dialog).

• Notice that the cursor has a microphone attached to it to signify it will be recording the clicks you make.

*How to Order Clicks*

(1) As you click on all of the buttons, check boxes or icons that you would normally click on while operating in the dialog box, the clicks will be recorded in the Language Maker list.

*Note:* Do not click in boxes where you normally would type something, such as the From and To boxes in the Print dialog (where you would type a page number).

(2) In some cases, the buttons will be listed with the names as they appear in the dialog box. In other cases where there is no name, the clicks will simply be recorded as Click, Click 1, Click 2, etc., numbered consecutively as you click. You will give the buttons their correct names after recording all of the clicks.

(3) To remember what name to give to Click 1, Click 2, etc. later on, it is best to record the clicks in the order in which the buttons appear in the dialog box. (If you have done a printout of the dialog box as suggested above, it will be easier to keep track of which clicks correspond to which buttons. Note down the order of the clicks on the buttons, and refer to this later when naming the buttons.)

(4) Some buttons are clustered together in groups according to what they do (for example, the buttons for the type of paper source in the Print dialog, Paper Cassette or Manual feed). It is best to click all the buttons in one cluster before moving on to the next. This is important because:

• It will be easier to assign the right names to the right buttons if the order of the clicks corresponds to the order of buttons in the dialog box.

• It saves time when grouping the clicks in order to specify features of the group, such as the number of times a group of buttons can be clicked.

• Since the buttons that quit out of a dialog box can only be clicked once (such as OK or Cancel), when you are recording clicks do not record these quit buttons until the very end, after all other buttons have been recorded. That way they will already be grouped together at the end when you work with them in the Language Maker list.

*Note:* If there are any "hidden" buttons that do not appear until an action is performed in the dialog box, these buttons will be added later on. See Section 4.

(5) After clicking all the buttons, check boxes, and icons in the application dialog, click Cancel in the Language Maker Dialog window (6) Quit out of the application's dialog box.

3. Name the Recorded Clicks

The recorded clicks are listed in the Language Maker window. To give the clicks the names you want to call them when using voice commands:

(1) Double click on the first button you want to rename.

(2) The Action window appears. (See Fig. 130.)

• In the larger rectangle, the type of command is listed as Button.

• In the smaller rectangle, the default name of the command is highlighted.

(3) To rename the command, type in the highlighted rectangle.

*Note:* See Section 9, *Types of Commands to Use*, for guidelines on the kinds of names that will work best.

(4) To name other buttons:

• If you want to go on to the next button name in the Language Maker list, click the More button in the action window. The next name in the sequence will appear in the Action window.

• If you want to bring up a button that is out of sequence in the Language Maker list, click the OK button in the Action window. Then scroll to the button in the Language Maker list and double click on it to bring up its Action window. Rename the button.

(5) Proceed with all of the remaining clicks until they are renamed with the correct voice commands.

(6) Click OK to exit the Action window.

4. Record "Hidden "Button Names

If there are any hidden buttons that do not appear until an action takes place in the application's dialog box, record these buttons now.

An example of a dialog where there are hidden buttons is the Find/Replace dialog in Microsoft Word. There the Find button changes to Find Next after the first search.

To record such hidden button names:

(1) Bring up the application's dialog box again.

(2) Perform the action that will cause the dialog box's hidden button names to appear.

For example, if using the Find/Replace dialog in Microsoft Word, clicking on the Find button would cause it to change to Find Next.

(3) Proceed as above:

• Select Record Dialog from the Language Maker menu.

• Click on Record.

• Click on the hidden button name.

• Click Cancel to exit the Dialog window.

• Exit from the application's dialog.

• Double click on the name in the Language Maker list to rename the button in the Action window. Click OK.

5.
Group the Button Names

The names of the buttons in the dialog box now can be grouped to correspond to the way the dialog box operates.

In the Print dialog used as an example, there are two groups of buttons:

• *Buttons you can click on any number of times* :

*Example:*
All, From.

• *Buttons you can click on only once while still in the dialog box, because clicking on the button causes the dialog box to disappear:*

*Example:*
OK, Cancel.

The button names will be grouped in Language Maker in this way, and repetition symbols added to specify the number of times the buttons names can be said.

(1) Make sure the button names are in the correct order on the list:

• First all of the button names that can be said zero or more times.

• Next all of the button names that can be said only once (OK, Cancel).

• If any button names appear out of order, select with Command-Click and move the name up or down in the list to place in the correct group.

(2) The word after which you want the group name to appear should be highlighted.

In this case, Command-Click on Print.

(3) Create a heading for the first group of button names:

• Select New Action from the Language Maker menu.

• A blank Action window appears.

(3) Click on the first icon at the top left of the double row of icons. This is the Grouping icon. (See Fig. 131.)

- The type of command (upper rectangle) is Group.

- The name of the command (lower rectangle) is group.

(4) If you want to give the group a more specific name, type it into the highlighted rectangle. For example, you can call this Print Group.

(5) Click OK.

(6) Scroll down to the last command in this group and command-click on it to highlight it. This is the word after which you want the second group to begin.

(7) Select New Action from the Language Maker window.

(8) Click on the Group icon. Type in a new name for this group, calling it Quit Print.

(9) Click OK.

6. Move the Commands into a Hierarchy

Position the Print dialog words so that they reflect the hierarchy of commands.

(1) Command-click on Print Group.

(2) Drag Print Group to the right so that it is indented below Print.

*Note*: Print Group will be indented two places to the right, since File is flush left and Print is one place to the right. Print Group has to be positioned to the right of Print. See Fig. 132.

(3) One at a time, command-click on the words under Print Group and drag them three places to the right so that they are indented below Print Group. (See Fig. 133.)

(3) Do the same for the Quit Print group:

• Drag Quit Print two places to the right of Print.

• Drag the words under Quit Print three places the right so that they are indented below Quit Print. (See Fig. 134.)

7. Specify the Number of Repetitions

Now there are two group headings, Print Group and Quit Print. Under the first group heading are all the commands that can be said more than once. Under the second group are all the commands that can only be said once.

To specify the number of repetitions for each group:

(1) Double click on the first group heading, Print Group.

(2) The command's Action window appears.

(3) Notice the repetition box (lower left box of the four on the right). It says "1 time" (by default).

Other choices are: 0 or 1 time, 1 - ∞ times, (1 to infinite number of times), or 0 - ∞ times (zero to infinite number of times).

(4) Click in the box until 0 - ∞ appears. (See Fig. 135.)

(5) Click OK.

(6) The highlighted word in the Language Maker window, Print Group, now has a superscript after it, $^{0\infty}$.

*Note*: When a superscript appears after a group heading, all of the words under the group are affected. All of the Print Group words can now be spoken zero to infinite times.
(See Fig. 136.)

(7) The second group consists of words that can be said only once. You do not need to add a repetition symbol, because by default any word listed with no superscript can be said once while still on that level.

8. Specify Sequence of Commands

The final step is to specify the sequence in which the two groups of Print commands can be spoken.

The default is that commands in a level or a group can be spoken in any sequence. In other words, the default is *or* (this *or* that can be spoken).

The other choice is the *and* sequence, signifying that after one word or group of words is spoken, the second group must be spoken (this *and then* that must be spoken).

In this case the Print Group is spoken first, and the Quit Print group is spoken second.

(1) Double click on the word that brings up the dialog box (Print).

(2) The Action window for Print appears.

(3) Click on the sequence box so that the *&* sign appears instead of the default.

(4) Click OK. The *&* sign appears in front of Print. (See Fig. 137.)

*Note:* What if you open the Print dialog and decide not to click on any buttons, but to quit or cancel right away?

You can still do this even though you have used the & sign. The first group of commands can be said zero to infinite times. Zero times means, in effect, that no word in this group has to be spoken at all. If you wish you can go on to the second group of commands that are spoken once only.

*Shortcut:* You can combine these steps by selecting the repetition number, group name, or sequence at the same time that you initially work with a command in the Action window.

9. Tips on Naming Commands

In working with the Action Window, you saw how to rename a command by typing a new name into the highlighted box.

These guidelines will help you make better choices when creating voice commands.

*Using the Same Word on Different Levels*

(1) If you want to use the same word to mean two different things in two different contexts, you can.
However, the words must be in different levels. You cannot have the same word repeated twice in the same level to mean two different things.

(2) This rule also applies to global words. Because global words are active on all levels, you cannot have the same word used for a global word and a word within a level.

*Note:* A warning dialog will appear if you attempt to use the same word twice in a level.

*What Kinds of Words to Use*

(1) Follow the words used in the application as much as possible.

• While you can use almost any word you wish by typing a name in the Action Box, sticking to the application's original names will make it easier to remember the hierarchy of commands and the names of commands.

(2) If you make a change, follow the guidelines for all voice commands whether using Voice Train, Voice Control, or Language Maker.

For best recognition:

• Use words of more than one syllable.

*Note:* To avoid confusion between one-syllable words, you can add a second word or syllable. For example, instead of saying File and Style you can say File and Style Menu.

• Use words that do not sound very similar to other words in the Word List (especially one-syllable words that rhyme, like File and Style).

• Try to use words that have "hard," distinct sounds (such as k, s, and b) rather than "soft," vague sounds (like p or m or f).

*Letters of the Alphabet*

If you are going to be saying the names of letters – for example, to choose a dialog check box that is designated with a letter in the application, or to spell out words – the international words for the letters of the alphabet are preferred. Because they are generally more than one syllable, and they are distinct from each other, they will result in greater recognition accuracy.

This is the international alphabet that is used in the Finder Word List. It should be used in any Word List you create where you will be spelling (for example, to spell out the name of a file folder, or to do text or data entry).

| Letter | Name |
|---|---|
| A | Alpha |
| B | Bravo |
| C | Charlie |
| D | Delta |
| E | Echo |
| F | Foxtrot |
| G | Golf |
| H | Hotel |
| I | India |
| J | Juliet |
| K | Kilo |
| L | Lima |
| M | Mike |
| N | November |
| O | Oscar |
| P | Papa |
| Q | Quebec |
| R | Romeo |
| S | Sierra |
| T | Tango |
| U | Uniform |
| V | Victor |
| W | Whiskey |
| X | X-ray |
| Y | Yankee |
| Z | Zulu. |

Chapter Six

Mouse Commands

1. Introduction

In the previous chapters you have gained some practice in working with mouse clicks with Language Maker.

You have seen how to click on buttons in dialog boxes and then name the clicks as commands.

This chapter describes other ways to record the action of the mouse. Language Maker affords a great deal of flexibility in working with mouse clicks, drags, directional moves, and locational moves. They can be added to any application to perform new operations by voice that may not even have existed in the original application.

2.
Clicks Relative to Window or Screen

Difference Between Window and Screen Coordinates

You can choose whether to record a click or double click with coordinates relative to the window or relative to the screen.

*(1) Window Coordinates:*

The advantage of using window coordinates is that you can take the same application and run it with voice on any size monitor. No matter where the window is positioned on the screen, the click will always occur in the same place in the application window.

You might use window coordinates to be able to record a double click on a folder that is always in the same place in the Finder window. For example, if you always keep your System Folder in same place in the upper left corner, double-clicking on that spot will let you open the System Folder by voice if you name the double click "System Folder."

*(2) Screen Coordinates:*

Screen coordinates let you specify a place on the screen that is the same no matter what size monitor is used. For example, the Trash by default always opens in the same spot relative to any size screen. The active Drive is another example of an icon positioned in the same spot relative to any size screen.

By choosing screen coordinates you can click on the same site no matter what the screen size. For example, always doing a mouse-down on the location where a floppy disk icon appears, dragging it to the spot where the Trash is located, and then doing a mouse-up would eject the disk. (You could call such a command "Eject Disk.")

Selecting Window or Screen Coordinates (1) Open up Language Maker.

(2) Select New Action from the menu.

(3) Notice the four large boxes at the top right-hand side of the Action window. The lower right-hand box lets you choose screen- or window-relative commands. (See Fig. 138.)

(4) Click several times in the middle of the box. It toggles between gray and white.

- Gray indicates the entire Macintosh screen.

- White indicates a window on the screen.

See Fig. 139.

(5) By selecting either the screen or the window, and then clicking on a location, the mouse click will be recorded with coordinates relative to the screen or the window.

(6) By default, the coordinates are relative to the upper left corner of the window or screen.

• Notice that in the box, there are four corners marked out. The upper-left corner is black, signifying the default: coordinates relative to the upper-left corner (whether the window or the screen is chosen).

• To change the default, click in one of the other corners. The corner becomes black, showing that the coordinates will be recorded relative to the selected corner. (See Fig. 140.)

*Example of Window-Relative Click*

(1) Open an application and open the Language File if not already selected.

(2) Command-click on the word in the Language after which you want the click to be listed.

(3) Select New Action from the Language Maker menu.

(4) Click on the box on the lower right so that it is white (window-relative).

(5) Move the cursor to the position in the application window where you want to record a click (the position could be on a word, on a button, in white space, or anywhere).

• Notice that the cursor now has a small microphone icon attached to it, indicating that recording is about to occur.

(6) Click on the site.

(7) Notice the Action window records the click:

• The type of command is Local Click.

• The name of the command is Click.

*Note*: To delete the type of command for this example or any other command inserted while using the Action window, click on the command in the upper rectangle so it is highlighted. The Delete button is no longer dimmed. Click on delete. The selected command will be deleted.

(8) If you want to give the click a name, type the command in the highlighted rectangle.

(9) To see how the coordinates of the click are recorded, double click on Local Click.

(10) The Output window appears, showing the local click format:

@LMSE(y,x)

In this format, y and x are the coordinates relative to the corner of the screen that was chosen (in this case, the upper left-hand corner).

*Note*: To include the name of the window in the Output (in case you are working with more than one active window, such as a toolbox or color palette):

• Before making the local click, select Preferences from the Language Maker menu.

• Click on the check box for Use Window Names.

• Click OK.

• When you click in a window, the window name will appear in the Output.
(See Fig. 141.)

(10) Click OK to exit out of the Output window.

(11) Click OK to add the window-relative click to the Language Maker list.

Example of a Screen-Relative Click (1) Repeat steps (1) through (3) above.

(2) Click on the lower right-hand box so that it is gray rather than white, for a screen-relative click. (See Fig. 142.)

(3) Click anywhere on the Macintosh screen.

(4) The click is recorded in the Action window:

(5) To see the coordinates for this click, double click on Global Click. (See Fig. 143.)

(6) Notice that the format is:

@GMSE(y,x).

3. Click, Move, or Both

By default, mouse clicks are recorded when you move the mouse to a position and then click.

However, you can also specify that only mouse moves or both mouse clicks and moves will be recorded:

Move Only (1) Select Preferences from the Language Maker window.

(2) A dialog appears (See Fig. 144.)

(3) The default Click Only is selected. Click on Move.

(4) Click OK.

(5) Command-click on the word after which you want the Move listed.

(6) Select New Action from the Language Maker menu.

(7) Choose whether you want the move to be screen-relative or window-relative by clicking on the lower right box until it is white for the window or gray for the screen.

(8) Move the mouse across the screen.

(9) Click to end the move.

*Note:* The click will not be recorded, only the move from the spot where the mouse leaves the Action window until the click to finish the move.

(10) The move is recorded in the Action window. Its type is listed as a Local Move or a Global Move depending on whether window-relative or screen-relative was selected previously.

(11) Double click on Local Move or Global Move to see the move's Output.
(See Fig. 145.)

- The format for a screen-relative move is: @MOVL(y,x)
- The format for a window-relative move is: @MOVG(y,x).

(12) Click OK to return to the Action window.

(13) If you wish, name the move by typing in the highlighted rectangle.

(14) Click OK.

*Move, then Click*

If you would like the click at the end of the move to be recorded as well:

(1) Select Preferences from the Language Maker menu.

(2) Click on the button for Move, then Click. Click OK.

(3) Command-click on the word after which you want the Move-Click listed.

(4) Open New Action from the Language Maker menu.

(5) Proceed as above to choose screen or window-relative.

(6) Move and click as desired.

(7) The move and click will be recorded in the Action window (see Fig. 146).

(8) Name the move and click by typing in the highlighted rectangle.

(9) Click OK.

(10) The move and click action is recorded in the Language Maker list.

4. Mouse Down/Up

You can automatically record a mouse down or mouse up action that is relative to the screen or window.

This is useful in situations such as pop-up menus, where you might use a mouse-down to select the pop-up menu and hold it down while some other action occurs.

How to Record a Mouse Down (1) Command-click on the word after which you want the mouse down to be listed.

(2) Select New Action from the Language Maker menu.

(3) Select window-relative (white) or screen-relative (gray) by clicking on the bottom-right box of the four large boxes in the upper right.

(4) Move the cursor to the position where you want the mouse-down to occur, and click.

*Note:* If you want to record just a click where the mouse down will occur, be sure that you have selected Click Only in the Preferences dialog. If you want to record a move or a move and then a click before the mouse down, make the appropriate selection in the Preferences dialog.

(5) Select the mouse-down icon by clicking on the second icon from the left in the top row.

(6) The mouse-down will occur after the mouse has moved to or clicked on the specified location. (See Fig. 147).

(7) To record a mouse-up, click in the third icon that shows a finger on a mouse that is not highlighted.

*Note*: To record a drag, use New Action and perform the drag. Language Maker will automatically list this as a Mouse Down, Move, Mouse Up. (See Fig. 148.)

How to Keep the Mouse Down

You may want to wait a certain amount of time before the mouse-up occurs, so that the mouse remains down long enough to look at the pop up menu, for example.

(1) After recording the mouse-down and before recording the mouse-up, click on the timepiece icon (the third icon from the left in the bottom row of icons).

(2) You will be able to choose a certain number of "ticks" of waiting time.

• Each tick is 1/60th of a second. The choices are increments of 10 ticks, up to 60 ticks (60 ticks being one second).

• If you need more than one second of waiting time, select 60 ticks as many times as necessary.

(3) The selected waiting time is recorded as a Pause in the upper rectangle of the Action window (4) Now select Mouse Up by clicking on the icon (the third from the left in the top row of icons).

(5) You can name the entire chain of events by typing in the highlighted rectangle. (See Fig. 149.)

In this case, a macro will be triggered by saying one voice command, such as Pop-Up menu: There will be a mouse down, the pop-up menu will be held down for a designated period of time, and then there will be a mouse up and the menu will disappear.

(6) If you wanted to name the individual events separately:

• Record the events separately.

• Name them separately by clicking on the type of command in the upper rectangle and typing the new command name in the bottom rectangle.

• Click OK after the last event is renamed to exit out of the Action window.

5. Paging and Scrolling

Differences and Similarities Between Page and Scroll (1) Similarities:

Page and scroll are both movement commands. They use the directional commands left, right, up, and down.

(2) Differences:

• Paging occurs only one window-full at a time. The action starts and stops in one command: Page up, for example. It corresponds to one click of the mouse in the scroll bar.

• Scrolling is a continuous move. It needs a quit-movement word to stop the scrolling action (otherwise the mouse would be held down on the scroll arrow and not let up).

The two types of movement commands are handled somewhat differently, as described below.

*Adding Page Movements as First-Level Words*

There are two ways to add Page Movements:

• Name the commands Page Up, Page Down, Page Left, and Page Right, and list all of these commands as first-level words.

However, this means you will have to repeat Page each time you want to move a Page, as in Page up, Page up, Page up, etc. It would be easier just to say Page once and then up, up, up as many times as necessary, as described below.

• Call the first-level command Page, and then add the directional words up, down, left, and right on a level below. If the Page command were listed with a repetition symbol (0 - ∞), then the directional commands could be repeated as many times as necessary.

The first method is described in this section. The second method is described in the next section.

(1) Command-click on the word after which you want to insert page movement commands in the Language Maker list.

• The word is highlighted.

(2) Select New Action from the Language Maker menu.

(3) Click on the Scroll/Page icon, the fourth box from the left in the lower row of icons (see Fig. 150).

(4) Select Page Left.

(5) The type of command is listed as Page Left. The name of the command is left.

(6) Rename the command Page Left by typing in the lower rectangle that is highlighted.

(7) Click More.

(8) Select the Scroll & Page icon again, and choose Page Right.

(9) Rename the command Page Right by typing in the lower rectangle that is highlighted.

(10) Click More.

(11) Repeat this procedure by selecting Page Up and Page Down, renaming the command Up as Page Up, and Down as Page Down.

(12) After the last selection, click OK instead of more.

(13) The commands are listed in the Language Maker window, all on the first level. (See Fig. 151.)

*Adding Movement Commands On a Level Beneath Page*

You do not have to repeat Page each time you want to issue a series of page commands. You can simply say Page once and then repeat the direction command, such as up, as many times as needed.

To set up the Language in this way, you will list two groups: Page Direction words, and Quit Page words. The first group will be marked with a repetition symbol to show that they can be said any number of times (up, up, up). The second group will end the action.

The sequence of commands will be: first a Page Direction word is spoken, and then a Quit Page word. To indicate this sequence, an & sign will be added to the Page command to show the order in which the commands below will be spoken.

(1) Command-click on the word after which you want to insert page movement commands in the Language Maker list.

•The word is highlighted.

Part IV Chapter 6

(2) Select New Action from the Language Maker menu.

(3) Type Page in the smaller highlighted rectangle of the Action window.

(4) Click in the Sequence Box (the top left box of the four boxes in the Action window). It will toggle from List to the & sign.

(5) Click the More button.

• Page is now added to the Language Maker list.

*Note:* The & sign indicating sequence is not displayed yet next to Page. It will appear after the grouping command with the repetition symbol is added (see step 6 below).

(6) Create a Group so that you can specify the number of repetitions for the directional commands that you will put in the group (up, down, left, right).

• Click on the first icon on the left in the top row, the Grouping icon.

• Click on the repetition box (the lower left-hand box of the four large boxes to the right), until 0 - ∞ appears.

• Type in the lower rectangle Page Group.

• Click OK.

• The Page group with the repetition symbol is added to the Language Maker list. In addition, the & sign now appears next to Page above it.

(7) Indent the Page Group one space to the right, beneath Page, by dragging Page Group to the right.

(8) Now add the directional commands:

• Select New Action.

• Make sure the repetition box is back to the default 1 Time (if necessary click in the box to bring up the default).

• Click on the Scroll/Page icon and select the first Page command, Page Left.

• The default name of the command listed in the lower rectangle is Left. Click OK.

• Left is added to the Language Maker list below Page Group. Drag it two spaces to the right so that it is indented beneath Page Group.

(9) Follow the same procedure with the rest of the Page commands, indenting each two spaces to the right so that they are beneath the Page Group.

(10) Add the Quit Page group:

• Select New Action.

• Click on the Grouping icon (the first icon on the top left).

• Type the name of the command in the lower rectangle: Quit Page.

• Click More. The Quit Page group is added to the Language.

(11) Type a Quit Page command in the lower rectangle. It can be any word such as Stop or Halt.

*Note:* This command will not have an Output since it is only a signal to the Navigator that you will quit the Page commands. Whenever there is a group of commands with a repetition sign, there must be a Quit word to get out of the level.

In other cases such as Scroll where the Quit word actually does something (such as letting the mouse up after a mouse down to scroll), the Quit word will have an Output. See the next section below, Selecting Scroll Movements.

(12) Click OK to exit from the Action window.

(13) Drag the Quit Page grouping command to the right so that it is lined up with the Page Movement grouping command.

(14) Drag the Quit word (Stop or Halt) an additional space to the right so that it is a level below the Quit page grouping command.

You can now say "Page" and then the directional commands left, right, up or down without having to repeat "Page" each time. You can say the directional commands as many times as you wish. (See Fig. 152.)

Selecting Scroll Movements

Scroll movement words can be treated the same as Page movement words above.

(1) Command-click on the word after which you want the Scroll words to be listed.

(2) Select New Action from the Language Maker menu.

(3) Click in the sequence box (the top-left box of the four large boxes in the Action window) so that the & sign appears.

(4) Type Scroll in the smaller highlighted rectangle at the bottom of the Action window.

(5) Click More.

(6) Now add a grouping name, Scroll Group:

• Click on the Grouping icon (the top left icon in the first row of icons in the Action window).

• Click on the repetition box (the bottom left box of the larger group of four boxes in the Action window). Stop clicking when the repetition symbol 0 - ∞ appears.

• Type Scroll Group in the small rectangle at the bottom that is highlighted.

• Click OK.

(7) Scroll Group is added to the Language Maker List. Move the group name over one space, so that it is indented below & Scroll. (See Fig. 153.)

(8) Now add the Scroll commands:

• Select New Action from the Language Maker menu.

• Click on the Scroll/Page icon, the fourth from the left in the bottom row of icons.

• Select the first Scroll command, Scroll Left.

• Click more.

• Select the remaining Scroll commands, Scroll Right, Scroll Up, and Scroll down (but not Stop Scroll yet).

• After the last selection, click OK.

(9) The scroll commands are listed in the Language Maker window.

(10) One by one, drag each scroll command two spaces to the right so that they are indented below Scroll Group.

(11) Now, to add the second group (see Fig. 154).

• Select New Action.

• Click on the first icon on the top left row, the Grouping icon.

• Type Quit Scroll in the lower highlighted rectangle.

• Click OK.

• The second group is now added to the Language Maker List, Quit Scroll. Drag it one space to the right so that it is indented below the first-level command, & Scroll.

(12) Add Stop Scroll:

• Select New Action again.

• Click on the Scroll/Page icon, and select the last item, Stop Scroll.

• Rename the command if you want to call it something other than Stop.

• Click OK.

• Move the Stop command two spaces to the right so that it is indented under the Quit Scroll group.

You have now listed all of the scroll commands so that they can be repeated any number of times without repeating the word "scroll" each time.

6. Moving the Mouse in Directions

There are two types of move commands: Move, which moves the pointer in increments, and Continuous Move, which keeps the pointer moving until halted by a Stop Move. (See Fig. 155.)

(1) Select New Action from the Language Maker menu.

(2) Click on the Move icon (the second from the left in the bottom row, showing the pointer).

(3) Select a Move choice from the sub-menu (Move left, right, up or down).

• Move causes the pointer to move 10 pixels (a fairly small amount of space).

• To alter the size of a move, double click on the type of command (i.e. the larger rectangle) to bring up the Output box.

• Change the number in the parentheses to make the move longer (a higher number of pixels) or shorter (a smaller number of pixels).

• Click OK to return to the Action window.

(4) Click on the Move icon again. Select a Continuous Move choice (left, right, up or down).

(5) End the Continuous Move by selecting Stop Move from the Move icon menu.

(6) To rename any of the selections, click on the type of command in the larger rectangle. Type in the voice command in the smaller highlighted rectangle.

(7) Add grouping names and repetition symbols as needed, and indent the commands appropriately (following the other examples in this chapter).

7. Keyboard Shortcuts

When working with the Action window there are a number of keyboard macros that you can use as shortcuts.

| Keyboard Shortcut | Result |
|---|---|
| Double click on a word in Language Maker list | Bring up Action window |
| OR | |
| If a word is already highlighted in Language Maker list, | |
| Press Return key | Bring up Action window |
| Press Enter key | Click More button |
| Press Return key | Click OK button |
| Press Cancel key | Click Cancel button |
| Press Escape key | Click Delete button |
| Press Tab key | Bring up Output window. |

*Chapter Seven continues working with the Action box to add commands for launching applications, accessing the zoom box or grow box, changing windows, and adding Navigator-related commands.*

Chapter Seven

Miscellaneous Commands in the Action Window

1. Zoom Box and Grow Box

You can add commands for the Zoom Box and Grow Box by clicking on icons in the Action Window.

(1) Command-click on the word after which you want the command to appear in the Language Maker list.

(2) Select New Action from the Language Maker menu.

(3) To add the zoom command, click on the Zoom Box icon (the fourth icon in the top row of the Action window). (See Fig. 156.)

(4) Notice that the command is called Zoom. If you want to rename the command, type the new name into the highlighted rectangle at the bottom of the Action window.

(5) Click More to add another command.

(6) Click on the Grow Box icon (the fifth icon in the top row of the Action window). (See Fig. 157.)

(7) The Grow Box command appears in the Action window.

(8) To rename the command (which appears as Grow Box), type a new name into the highlighted rectangle at the bottom of the Action window.

(9) Click OK.

(10) The two commands, Zoom and Grow Box, appear in the Language Maker List as first-level commands. (See. Fig. 158.)

*2. Next Window*

To add a Next Window command so that you can change windows by voice:

(1) Command-click on the word in the Language Maker list after which you want the Change Window command to appear.

(2) Select New Action from the Language Maker menu.

(3) Click on the Next Window icon, the last icon in the top row on the right.

(4) Next Window appears as the name of the command. If you would like to rename the command, type the new name in the highlighted rectangle at the bottom of the Action window (5) Click OK.

(6) Next Window is added to the Language Maker list.

3.
Launch an Application

The Launch command is equivalent to double clicking on an application to open it. You can specify the name of an application to launch. This is much quicker than using movement commands to move the cursor onto the application's icon, and then saying double click to open it up.

*Note*: The Launch command is used when in the Finder. It will only search for an application one level deep. This means that when you say "Launch Microsoft Word," for example, there will be a search for the application either on the desktop or inside one folder at most.

*Remember*: The Launch command will only work if the application is in the same Drive that contains the System Folder in which the Voice Drivers and Voice Control are installed.

(1) Command-click on the word in the Language Maker list after which you want the Launch command to be inserted.

(2) Select New Action from the Language Maker menu.

(3) Click on the Launch icon (the first icon on the far left in the second row of icons). (See Fig. 159.)

(5) A dialog appears (see Fig. 160).

(6) Select the application by clicking on the application you want to launch. Then Click Open.

(7) The name of the application appears in the lower rectangle. The type of command listed in the upper rectangle is called Launch. (See Fig. 161).

(8) If you want to rename the command to something other than the application name, type the new name into the lower rectangle.

(9) Click OK. The Launch command is now added to the Language Maker list.

*Note*: If you already have a series of Launch commands in the Finder list, and want to add the name of an application (see Fig. 162).

• Command-Click on the last application in the Language list to highlight the name after which you want the new application to be added.

• Proceed as before, clicking on the Launch icon and then selecting the application name. Click OK.

• Indent the name of the application one space to the right, so that it is under the Launch command in the Language list.

4. Navigator Commands

Navigator-related commands can be added by clicking the Navigator icon, the last icon at the far right in the second row of the Action window.

(1) Select New Action from the Language Maker menu.

(2) Select the Navigator icon (the small dog at the far right). (See Fig. 163.)

(3) A menu appears with the choices:

| Navigator Command | Effect |
|---|---|
| First Level | Return to the first level of commands |
| Previous Level | Go back one level |
| Sleep | Temporarily suspend voice recognition |
| Voice Options | Bring up the Options dialog in Voice Control |
| Wake Up | Reactivate voice recognition |
| Word List | Bring up the Word List in Voice Control |

(4) These are generally listed as global commands, so that they can be spoken on all levels. Activate the global icon before selecting these commands (see Fig. 164).

• Click on the dimmed globe icon, the upper right of the four large boxes in the Action window.

(5) Select the first choice in the Navigator list.

(6) If you want to change the name of the command, type the new name in the lower highlighted rectangle. Click OK.

(7) Add another Navigator command. Click OK.

(8) Continue until all of the commands have been added.

(9) The global commands are added to the Language Maker list with an asterisk to indicate that they are global (active on all levels).

*Remember:* The global icon returns to its default state (dimmed) when the Action window is closed. This is true of all icons that have been changed; they will return to default after OK is clicked and the Action window is closed.

*Turn to Chapter Eight to learn how to add text-related commands.*

Chapter Eight

Text Commands

1.
Ways to Enter Text

You can enter text with voice in three ways:

(1) Use the international alphabet to spell out a word, if the alphabet is included in a Language File.

(2) Use Create Default Text from the Language Maker menu.

(3) Use the text icon in the Action window to enter strings of text just by saying a word or two.

The first method is obvious: it is tedious and time-consuming for all but short, simple words. The second and third methods are described below.

2.
Create Default Text

Create Default Text is an item in the Language Maker menu that lets you copy text from any source to the Clipboard. Language Maker then scans the clipboard and adds the words to the Language list. Each word becomes a voice command.

(1) Copy the text you want to convert into voice commands.

• The text can consist of sentences, lists of words, items for data entry, numbers, etc.

• The text can already exist in another document. or be created specifically for this purpose.

• Highlight the text you want to copy, and then select Copy from the Edit menu. (See fig. 165.)

• If you wish, use Show Clipboard to make sure that it has been copied onto the clipboard.

(2) Click in the Language Maker window so that it is the active window.

(3) Select Create Default Text from the Language Maker menu.

(4) The words from the clipboard will be added as individual first-level voice commands in the Language Maker list. (See Fig. 167.)

(5) If you want to change the levels of the words, drag up or down and indent as appropriate.

(6) If you decide you want to omit some of the words:

- Command click on a word.
- Select Cut from the Edit menu.
- The word will be removed.

3. Text Macros

Uses for Text Macros

Text macros are a very convenient way of compressing long strings of text into just a few voice commands.

For example, instead of saying an entire company name and address when composing a letter, you can simply say Name and Address. The text that will be typed is a group of lines that specify name, address, city, state, and zip.

Or if you are doing data entry, instead of saying "Right ventricle occluded," you can abbreviate it with "RVO" and the data will be entered in full.

How to Enter Text (1) Command-click on the word in the Language list after which you want the text macros to be added.

(2) Select New Action from the Language Maker menu.

(3) Select the Text Icon (the second to the last icon on the right in the bottom row of icons). (See. Fig. 168.)

(4) A sub-menu appears with the choices:

- Type
- Capitalize
- Erase Text.

(5) Select Type.

(6) A dialog appears. (See Fig. 169.)

(7) Enter a string of text, and click OK.

(8) In the Action window, the type of command is listed in the larger rectangle as Text. (See. Fig. 170.)

(9) Type the voice command for this text in the lower window.

(10) Double click on the word Text in the upper rectangle to see the Output.

(11) The Output window shows the entire text string that was typed: (see Fig. 171.)

*Note*: If you pressed the Return key to start a new line when entering the text, you will see that the return is spelled out in the Output as 'return' in single quotes. For more on using keystrokes, see the next section, *How to Include Keystrokes in Text Entry*.

(12) Click OK.

(13) Click OK in the Action Window.

(14) The macro is entered as a voice command in the Language Maker list. If you say that command, the entire text string will be typed. (See. Fig. 172.)

How to Include Keystrokes In Text Entry (1) Some keys can be typed while entering text. They will have the normal result when the text is entered on screen after you say the macro for that text.

Keystrokes That Can Be Used for Text Entry
Space bar
Return key
Command key
Option key
Shift key.

(2) There are several exceptions: Key names that must be typed out in order for them to have the normal result when the text is entered after saying the macro.

*Note*: These keys must be entered in single quotes when typing them into the text entry dialog box.

| Keys That Must be Typed In Single Quotes | Meaning |
|---|---|
| 'enter' | Enter key |
| 'backspace' | Backspace key |
| 'tab' | Tab key |
| 'esc' | Escape key |
| 'clear' | Clear key |
| 'left' | Left Arrow key |
| 'right | Right Arrow key |
| 'up' | Up Arrow key |
| 'down' | Down Arrow key |

Special Punctuation Techniques

Two common types of commands used when dictating are period and new paragraph. They require special treatment.

The reason is that when a string of text is typed into the Text Dialog box, you leave a space after each word as you would normally do. When you say the word, the word is typed with a space automatically put in after it so that you do not have to say a word and then "space" after each word.

However, period is usually placed right next to the last word in a sentence, without a space between the word and the period. If you want to use a voice command for period, you need to remove the space that would automatically be placed after the word and before the period. You also need to add spaces after the period before the next sentence begins.

For a new paragraph, you need to remove the two spaces normally left after the period in a sentence. Otherwise, the two spaces will appear at the beginning of the new paragraph.

These techniques are described below.

(1) To add a voice command for "period":

• Select Type from the Text submenu in the Action window.

• Type into the Text Dialog box the word 'backspace' in single quotes, and then type a period. Hit the space bar twice to add two spaces as is customary after the end of a sentence (or one space if that is the style you are using).

• Click OK.

• Type the voice command Period into the smaller rectangle at the bottom of the Action window. Now if you say Period there will not be an extra space between the last word spoken and the period, and there will be two spaces left after the period before the next sentence.

(2) To add a voice command for "new paragraph":

• Select Type from the Text icon's submenu in the Action window.

• Type into the Text Dialog box: 'backspace' 'backspace' 'return'
(instead of typing 'return', you can simply hit the Return key).

*Note*: The two backspaces remove the normal two spaces entered after you said "period" to end the sentence. The return key skips a line. If you wanted to add a tab indent for a new paragraph, you would type in 'tab' after the return key was pressed.

• Click OK.

• Type the voice command New Paragraph into the lower rectangle in the Action window.

• Click OK.

4. Capitalize

Capitalize is useful when dictating with voice. You can specify that the next word that is spoken (or next string of text) will be typed with capitalized first letters.

(1) Select New Action from the Language Maker menu.

(2) Select Capitalize from the Text submenu.

(3) The voice command Capitalize appears in the lower rectangle. Change the name if desired by typing in a new name.

(4) Click OK.

(5) You can now say "capitalize" and the next word dictated will be capitalized.

5. Erase Text

The Erase command is useful in dictation to erase the last text that was typed in as a result of a voice command. (See Fig. 173.)

(1) Select New Action from the Language Maker menu.

(2) Select Erase Text from the Text icon's submenu.

(3) The voice command is named Backup, and the type of command is Erase Last Word.

(4) If you want to substitute a different word for backup, type the voice command in the lower rectangle.

*Remember*: It may be tempting to substitute a one-syllable word such as "Cut," but a two syllable word has a better chance of accurate recognition (5) Click OK.

(6) The command is now entered in the Language Maker list.

*Chapter Nine summarizes the output format for commands that you have learned to use with Language Maker. Advanced users will find this chapter of interest.*

Chapter Nine

Output for Special Commands

• For each command, the function of the command and the output format are listed.

• Any special considerations regarding the command are flagged by a *Note* below the Output.

• The output for each command is automatically entered when selecting Action window icons or Language Maker menu items. The output format is included for reference purposes only. Advanced users may wish to make alterations in the Output to change the resulting action.

1. Mouse Commands

Hold Down the Mouse

*Function*: Hold the mouse button down

*Output*: @MSDN

*Note*: The mouse stays down until Escape or Mouse-up or a Click

*Function*: Let the mouse button up

*Output*: @MSUP

Move the Mouse

*Note*: These commands have the optional arguments of starting place and window name.

*Function*: Move the mouse to current location (± Δy, ±Δx) coordinates

*Output*: @MOVE(Δy, Δx)

*Function*: Continuously move the mouse to current location (±Δy, ±Δx)

*Output*: @MOVI(Δy, Δx)

*Note*: Move is halted by any new command or event

*Function*: Move the mouse to front window's (y,x) coordinates

*Output*: @MOVL(y,x)

*Function*: Move the mouse to screen's (y,x) coordinates

*Output*: @MOVG(y,x)

Mouse Clicks

*Function*: Click the mouse in front windcw's (y,x) coordinates

*Output*: @LMSE(local y, local x)

*Function*: Click the mouse in screen's (y,x) coordinates

*Output*: @GMSE(global y, global x)

*Function*: Double click the mouse in screen's (y,x) coordinates

*Output:* @DCLK(global y, global x)

*Note:* (0,0) double clicks at current mouse

*Function:* Click the mouse in a button of a dialog box

*Output:* @CTRL(Button Name)

*Note:* CTRL stands for "control" (a synonym for button is "control name").

2.
Continuous Scroll and Page Scroll

The Continuous Scroll and Page Scroll commands locate the first horizontal or vertical scroll bar in the front window, and scroll or page accordingly.

*Note:* Scroll down, up, left, and right commands continue until halted by @MSUP (mouse up command).

Continuous Scroll

*Function:* Move the scroll bar down

*Output:* @SCDN

*Function:* Move the scroll bar up

*Output:* @SCUP

*Function:* Move the scroll bar left

*Output:* @SCLF

*Function:* Move the scroll bar right

*Output:* @SCRT

Page Scroll

*Function:* Move scroll bar down a windowful

*Output:* @PGDN

*Function:* Move scroll bar up a windowful

*Output:* @PGUP

*Function:* Move scroll bar left a windowful

*Output:* @PGLF

*Function:* Move scroll bar right a windowful

*Output:* @PGRT

3. Change Windows

*Function:* Select the next window, if it exists

*Output:* @NEXT

4. Menu Selection

*Function:* Select menu and item

*Output:* @MENU(menuname,{itemname or #itemnum})

*Example:*

"Open" in the "File" menu:

@MENU(File,#2)

File is the item name, and #2 is the item number. "Open" is the second item in the File menu.

*Note:* (menuname,#0) pulls down the menu name.

5.
Zoom and Grow Box

*Function:* Click in zoom box of front window

*Output:* @ZOOM

*Function:* Click in the grow box of front window

*Output:* @MOVL(g)

6.
Hold Down/Let Up Various Keys

These commands press the option, shift, command or control keys down or let them up.

Option Key

*Function:* Option key down

*Output:* @OPDN

*Function:* Let the option key up

*Output:* @OPUP

Shift Key

*Function:* Shift key down

*Output:* @SHDN

*Function:* Let the shift key up

*Output:* @SHUP

Command Key

*Function:* Command key down

*Output:* @CMDN

*Function:* Let the command key up

*Output:* @CMUP

Control Key

*Function:* Control key down

*Output:* @CTLD

*Function:* Let the control key up

*Output:* @CTUP

7. Numeric Keys

*Function:* Key Down from the numeric keypad

*Output:* @KYPD(0-9)

*Note:* Insert a number from 0 through 9 in the parentheses.

8. Directional Commands

There are several ways you can customize commands having to do with direction: MOVL (move in local window) or MOVG (move in global screen) commands.

You can specify the direction by adding these symbols in parentheses directly after the Move command:

| Symbol | Meaning |
|---|---|
| g | Grow Box |

| | |
|---|---|
| m | Middle of the window |
| n | North (top of the window) |
| s | South (bottom of the window) |
| e | East (right side of the window) |
| w | West (west side of the window) |
| ne | Upper right hand corner |
| nw | Upper left hand corner |
| se | Bottom right hand corner |
| sw | Bottom left hand corner. |

*Examples:*

@MOVL(g) - Moves to the Grow box

@MOVL(se) - Moves to the Southeast corner of the local window.

@MOVG(se) - Moves to the Southeast corner of the global window (the screen).

*Note:* You can include also coordinates (y,x) in parentheses after the directional symbol.

9. Miscellaneous Commands

These commands include Launch, Wait, and Navigator commands.

*Function:* Open an application by saying *Launch (name of the application)*. Will search one level deep for the application name.

*Format:* @LAUN(appname)

*Function:* Voice Control will wait (n) ticks before posting another voice command

*Format:* @WAIT(n)

*Function:* Return to First Level

*Format:* 'toplevel'

*Function:* Return to Previous Level

*Format:* 'escape'

*Function*: Go to sleep (deactivate full recognition temporarily)

*Format:* 'sleep'

*Function*: Wake up (reactivate full recognition)

*Format:* 'wake'

*Function*: Bring up Voice Options dialog in Voice Control

*Format*: 'options'

*Function*: Bring up Word List in Voice Control

*Format*: 'words'

10. Keystrokes

These keystrokes must be typed out and used with single quotes.

| Format | Function |
|---|---|
| 'enter' | Enter key |
| 'backspace' | Backspace key |
| 'tab' | Tab key |
| 'left' | Left arrow key |
| 'right' | Right arrow key |
| 'up' | Up arrow key |
| 'down' | Down arrow key |
| 'esc' | Escape key |
| 'clear' | Clear key. |

*Note:* Other keystrokes such as Return, Space bar, Command, Option, and Shift do not have to be typed out. The keys can be pressed and the output will automatically be entered.

Appendix A

Microphones

1. Introduction

An essential for success with the Voice Navigator is a microphone that provides top-quality voice recognition.

The headset microphone that comes with the Navigator will provide excellent results. The Speech Box also has a built-in microphone for hands-free, wire-free voice control. These are described in Part I, Chapter Two.

However, other types of microphones may better suit certain kinds of work environments and user preferences. Special situations include:

- The amount of ambient noise at the work place
- The amount of mobility the user requires
- The preferred distance between the user and the microphone, etc.

This section describes four major types of microphones recommended in addition to the two types of microphones that come with the Navigator. The advantages and disadvantages for different kinds of users are discussed for each microphone type.

If you decide to purchase a microphone that is well suited to your work environment, it will return the cost many times over by enhancing the way you work with the Voice Navigator.

See the *Voice Navigator Accessory Guide* (separately printed) for information on other recommended microphones.

2. Types of Microphones

Inexpensive Hand-Held Microphones

*Profile*

For users who work in a normal noise environment. For those who do not want to wear the headset microphone provided with the Navigator, and who need better recognition accuracy than the built-in microphone provides.

*Advantages*

(1) Very good overall recognition accuracy (2) Low cost (3) Does not tie the user to the Speech Box with wires (as with the headset microphone), or require a very quite environment (as with the built-in microphone).

*Disadvantages*

(1) Does not provide hands-free voice control (2) Must generally be held no further than 5" away from your mouth.

*Description*

The headset microphone provided with the Navigator may not suit users who prefer not to wear something on their head.

An inexpensive hand-held microphone will provide accurate voice recognition if used properly:

*Hand-held mikes must generally be no more than 1 to 5 inches away from your mouth.*

Further than 5 inches from your mouth will produce only nominal recognition accuracy.

*Requirements for Hand-Held Microphone*

(1) The microphone should have a 3.5mm jack that will fit the microphone jack on the Speech Box.

(2) If the microphone has a 1/4" jack, an adapter must be used ( 1/4" to 3.5mm adapter).

(3) Microphones with on/off switches can be used, provided the on/off cable from the microphone, if there is one, has a 2.5mm jack attached.

(4) The microphone can be either an "omnidirectional" or a "unidirectional" type. (This refers to whether it picks up sound from all directions, or from one direction only.)

(5) The output impedance of the mike should be less than 1000 ohms.

(6) The output level should be between -70 and -60 db.

Clip-On (Lavalier) Microphones

*Profile*

For use in fairly quiet environments.

*Advantages*

(1) Hands-free operation from a small-sized device (2) Good recognition accuracy.

*Disadvantages*

(1) Microphone must be clipped to user's clothing (lapel or collar), with a wire running to the Speech Box (2) If battery-powered, make sure battery is not old or dead -- otherwise recognition accuracy will be severely affected (3) Recognition not as high as the headset microphone, especially for noisy environments (4) Must be sure mouth is fairly close to the clip-on microphone.

*Description*

Clip-on microphones are a good alternative for those who require hands-free operation. Clip-ons are smaller, less obtrusive, and more comfortable than wearing a headset microphone. They are hands-free, unlike a hand-held microphone.

Recognition accuracy of clip-on microphones is also generally better than the accuracy of the built-in microphone, for three reasons:

(1) The microphone element in the clip-on will normally be physically closer to the user's mouth than the built-in microphone.

(2) Peripheral noises from computer devices, such as the noise of a fan, will generally be further away from the microphone.

(3) Many clip-on microphones have some directional properties -- in other words, they will tend to pick up sound from the source they are pointed at, rather than ambient sound from anywhere in the vicinity. Clip-on mikes can be positioned on a person's clothing to point toward the user's mouth.

*Note:* Most clip-on microphones require a small battery to power them. To avoid using up the battery quickly, remember to switch the mike on when in use and off when not in use. An old or dead battery will be very detrimental or fatal to recognition accuracy. Keep extra batteries on hand.

Superdirectional "Boom" Microphones

*Profile*

High recognition accuracy in normal to low noise environments when used properly.

*Advantages*

(1) Can be used as a hands-free device on the tabletop, or when taken off its stand, the microphone can also be used as a hand-held device (for presentations, for example)

(2) Can tolerate some amount of background noise (3) Does not have to be right next to the user's mouth, as with the hand-held microphone or headset microphone (4) Limits effects of ambient noise because of its directional properties

*Disadvantages*

(1) Must be aimed toward the user's mouth when used on the tabletop (2) Requires more rigorous training and operating procedures (3) If used as a tabletop microphone in some situations and then as a hand-held microphone in other situations, two separate Voice Files must be created: a Voice File for tabletop use and a Voice File for hand-held use.

*Why?* Voice pickup differs significantly depending on how the microphone is used. As a tabletop device the microphone is a certain distance from the user's mouth, and as a hand-held device it is much closer. Also, some microphones of this type have different settings for the different modes of use (for example, unidirectional and more sensitive when used as a tabletop device, and more omnidirectional and less sensitive when used as a hand-held device).This creates different voice patterns and therefore different models of trained words stored in memory. For best recognition, there should be two Voice Files when using the microphone in two different modes.

*Warning* Please note that, as with any tabletop microphone, changes in your acoustic environment may adversely affect the voice recognition accuracy of the system.

*Description*

Like the built-in microphone, a boom microphone frees the user from having to hold or wear any type of microphone. There are no wires that tie the person to the Speech Box, and no need to use hands for voice recognition when the boom microphone is set up on the desktop.

However, as a tabletop device the boom microphone is unidirectional. It must be pointed at the source of sound input, at a distance from approximately 6" to no more than 36" (range varies with microphone).

The user must always be positioned so that when using voice commands, the user's mouth is generally in line with the microphone.

• The best way to do this is to place the microphone on the desktop between the keyboard and the monitor, on top of the monitor, or just off to the side of the monitor. That way you will be naturally facing the microphone when facing the monitor, and your mouth will be correctly aligned for top recognition quality.

• Another advantage to setting up the microphone directly in front of the user is that if someone comes into the room, you can turn away from the monitor to talk to them. The microphone is set to the unidirectional mode when it is on the tabletop, so it will not pick up most sound coming from another direction.

*Wireless Microphones*

*Profile*

For use in special situations such as overhead presentations or inventory control, where maximum freedom of movement and distance from the Speech Box is required.

*Advantages*

(1) User can move from 10 feet to more than 200 feet away from the Speech Box, depending on the quality of the microphone (2) No wires attach the user to the Speech Box.

*Disadvantages*

(1) User must either wear a microphone clipped on to the clothing, or a headset around the head, or have to hold one. In addition, the user often carries a small body transmitter (2) Wireless microphones that work at maximum distances can be very expensive.

*Description*

Wireless micrcphones provide good recognition accuracy, while allowing the user to move freely.

Usually wireless microphones come in either a clip-on, hand-held, or headset model. The microphone is attached to a small transmitter that the user often wears as well. Signals from the transmitter are sent via radio waves to a receiver attached to the microphone input jack of the Speech Box.

The distance between the user and the receiver attached to the Speech Box varies widely with different wireless models. Cheaper systems require that the user be less than 10 feet from the receiver for interference-free reception. If the user moves further away, there may be ambient electrical noise that is conveyed.

Very expensive systems allow the user to stand at distances up to or greater than 200 feet.

The choice of a low-cost, short-distance wireless mike or a high-cost, long-distance mike depends on the needs of the user. The important point is that whichever model is chosen, distance limitations should be observed for consistent interference-free reception at the Speech Box end.

3. How to Check Microphone Levels

LED Display

At the front of the Speech Box , in the upper right corner, there are eight small red lights in a row (to the right of the green "power-on" light).

These LEDs can serve as a measure of the amplitude of words spoken into the microphone, as well as the amplitude of background noise.

Microphone Levels

The minimum level of sound required to trigger the Speech Box to recognize a word is indicated when 4 or 5 lights are lit (24 - 30 db).

For optimum recognition, 6 to 8 lights should be lit (36 - 48 db).

When you speak into the microphone, notice how many lights are red. If there are not at least 4 or 5 LEDs lit up at the peak of your utterance, the sound level is too low. To increase amplitude speak louder, or try a smaller distance between your mouth and the microphone.

It is best if 6 to 8 LEDs light up when you say a voice command. This will result in a much higher chance of accurate recognition of what you said.

*Note:* Make sure that the click of the microphone switch, if there is one, does not trigger recognition by mistake.

To avoid this problem:

• Turn on the microphone before you click on the Train or Test button in Voice Train (that is, before recognition is activated).

• If you turn on the microphone after you are already in the Training or Testing mode in Voice Train, or while you are in Voice Control, try to slowly and quietly move the on/off switch so that it does not create a sound loud enough to trigger recognition.

*Background Noise*

The LEDs also display the level of background noise that may interfere with recognition.

Notice the lights when the microphone is switched on and the Navigator is activated, but you are not saying anything into the microphone. One or two lights may constantly flicker on and off, showing that some degree of background noise is present. This level may not be enough to trigger (false) recognition. However, everything should be done to try to diminish or remove the source of background noise for maximum voice recognition quality.

Often overlooked sources of background noise include the fan inside a computer or other electrical equipment on or near the desktop. If you are using the built-in microphone or a tabletop one, try to locate the microphone as far away from such noises as possible, while still placing the microphone close enough to your mouth.

If more than two lights flicker on and off when you are not saying anything into the microphone, then recognition may be accidentally triggered. This will become clear if you tap a pencil or drop a book next to the microphone. See how many lights turn red, and whether the Navigator tries to recognize the sound as a word.

The lights are particularly helpful when using a hands-free microphone such as the built-in microphone, a clip-on, or a directional boom microphone. In these cases, the microphone and/or the entire Speech Box should be repositioned to achieve the best results, and the user should try to speak directly into the microphone.

*Remember:*

The LED display reacts to sound input by flickering on and off only when recognition is activated and while the microphone switch is on.

At all other times, when recognition is deactivated or when the microphone switch is off, the lights will either be all on (red) or all off.

Appendix B

1. Introduction

The Navigator takes *at least* one megabyte of RAM memory to operate. Two megabytes or more are recommended, especially if:

• You are working with a number of fonts, INITs (utilities inside the System) and desk accessories that use a significant amount of memory

• You have memory-intensive applications that you are running with voice

• You use Multifinder while working with the Navigator

• You will be using Word Lists with a large number of words in each level

Follow the instructions below to see whether you have enougn memory available. If not, you may be able to increase memory within the limitations of your existing system.

If these steps do not provide sufficient memory to run the Navigator, see your dealer for information about installing additional RAM if necessary.

2. How to Estimate Memory Requirements

• The Navigator uses at least 400K of memory to run one application Word List with 200 words. 192K of this comes from the System memory, and the rest comes from the application memory.

• The exact amount of memory used depends on the size of Word Lists and Voice files.

*Note:* Even if you are not using voice in an application, and have deactivated Voice Control, the drivers still take 192K in system memory.

System Memory Used: 192K

• The Navigator's memory needs are split between the System and the application. The drivers (192K) use System memory. The Word Lists and Voice files use application memory, but only when that application is running with Voice Control activated.

Application Memory Used: 100K minimum + .8K per word

• Word Lists themselves take up very little memory. It is the number of trained words in a Word List, in other words, the size of the Voice Files, that determine how much more memory is needed by the Navigator.

• A Voice File, no matter what size, requires a minimum of 100K to run. In addition, each trained word in a Word List (i.e., each word in a Voice File) takes about .8K

*To figure out how much memory a Voice File with 200 words will need:*

.8K x 200 words = 160K + 100K to run = 260K of application memory.

260K application memory + 192K system memory = 452K total memory

*If you are using a very large Voice File, 1,000 words total, you will use about 1000K total memory.*

.8K x 1000 words = 800K + 100K to run = 900K application memory 900K application memory + 192 system memory =1,092K total memory.

3. How to Accommodate Memory Requirements

Follow these steps to increase System memory needed for the Navigator. This procedure is mandatory if you are going to try using the Navigator on a machine with only one megabyte of RAM memory.

To Accommodate System Memory (1) First check to see whether the System has enough memory to use the Navigator. While in the Finder, go to the Apple Menu and select "About the Finder." You will see how much memory the System takes up.

(2) If you need to make more space in the System for the Navigator, remove INITs from the System Folder that you don't need while running the Navigator.

*Example:*

Remove fonts or desk accessories that are not essential.

(3) Check to see how much System space has been added. While in the Finder, select About the Finder from the Apple menu.

(4) If you still need more memory in your System, try removing additional items from the System that you will not need while working with the Navigator.

To Accommodate Application Memory

*Note:* Application memory cannot be increased unless you are using Multifinder. When you use Multifinder, you must increase the Finder memory by about 500K. See Section 4, *Special Cases*, for more on Navigator Memory in Multifinder.

(1) To see if you have enough memory in your application to run the Navigator:

• Select the application.

• Choose "Get Info" from the File menu.

• You will see two figures: Suggested Memory Size and Application Size. The second figure, application size, is the one you need to check against your Navigator memory requirements.

(2) If you need more memory in your application to run the Navigator, and you are using Multifinder, increase the Application Memory Size by the appropriate amount. Insert the appropriate number in the Application Memory Size box.

(3) Restart the computer.

4.
Special Cases

Multifinder (1) If you are using Multifinder with the Navigator, you must first increase the Finder memory by about 500K.

(2) Open the System Folder and select the Finder.

(3) Select Get Info from the File menu.

(4) When the window comes up, click in the Application Memory Size window. Insert a number that will increase the memory size by 500K.

(5) Restart the computer.

HyperCard (1) HyperCard applications with the Navigator require about 800K of memory.

(2) Increase the memory size using the Get Info method above, used for Multifinder.

*Important Note:* Due to HyperCard's large memory requirement, it is not possible to run the Navigator with HyperCard using a one-megabyte machine.

Appendix C

Troubleshooting

Problem

*Navigator not working at all after installing hardware and software.*

Checklist

Hardware

*(See Part I, Chapter 2.)*

*(1) Termination*

• Is the termination status of the Speech Box selected correctly for the configuration of your system?

- See Figure 3, System Configurations and Termination in Part I, Chapter Two to determine Speech Box termination status: termination on or off.

• Is the termination switch (the tab on the bottom of the Speech Box) pushed all the way in either direction?

- Away from the rear of the box to turn termination on
- Towards the rear of the box to turn termination off.

• Try pushing the termination switch the opposite way and then back again.

• Do LEDs below SCSI ports confirm termination status?

- One LED red if termination on.
- Both LEDs green if termination off.

*(2) SCSI Connection*

• SCSI cables:

- Do you have the proper SCSI cables? Long or "noisy" cables may cause problems if you have substituted a cable for the one provided with the Navigator.

- Are the cables attached securely to a port in the rear of the Speech Box at one end, and a port in your computer, hard disk, or other SCSI device at the other end ? Tighten the screws if necessary.

• SCSI ID Number (SCSI "Address"):

- Do you have another SCSI device with the same ID?

- If so, change the Speech Box ID by using a Phillips screwdriver to rotate the dial at the rear of the box to a free number.

• Are other SCSI devices connected to your computer turned on when the Speech Box is on? Is the computer on?

*(3) Power Supply*

• Is the power supply cord plugged into the Speech Box at one end and the power cube plugged into an electrical outlet at the other end?

• Is the power supply working?

- If the power button at the rear of the box is on, the green "power on" LED at the front of the Speech Box will light up, and the eight red LEDs next to it will light up as well.

*(4) Microphone*

• If working with an external microphone, is it plugged all the way into the port in front of the Speech Box? (The far-right port of the three ports in front of the Speech Box on the left-hand side.)

• If the microphone has an on/off line. is it plugged into a port as well? (The middle port of the three ports in front of the Speech Box.)

• If the microphone has an on/off switch, is it on?

• Are you getting adequate amplitude levels?

- Check the LEDs at the front of the Speech Box. When microphone is switched on no more than one or two lights should be lit up before speaking (indicating ambient noise). Higher levels of ambient noise may interfere with voice levels.

- At least four or five LEDs should be lit up at the peak of your saying a word, with six or eight lit up for best amplitude.

• Depending on the type of microphone, problems could include:

- Not speaking loudly enough
- Mouth too far from the microphone (no more than 1/2" if using the headset).
- Ambient noise too high for your type of microphone
- If using microphone built into the Speech Box, noise of computer fans or other nearby equipment may be interfering with voice levels.

*Note:* If amplitude levels are not satisfactory, check the instructions for optimizing use of your type of microphone (see Part I, Chapter Two as well as Appendix A: *Microphones*).

Software *(See Part I, Chapter Three.)*

*(1) System Version*

• Are you running with System version ?.0 or later?

• If not, obtain an upgrade from your Apple dealer.

*(2) Installation*

• Are Voice Driver, Voice Prep and Voice Control installed in the *active* System Folder on your startup hard disk?

*Note:* If you have more than one System Folder or hard disk, you may have installed on the wrong one.

• Have you installed all of the remaining Navigator software on the same startup disk?

Memory *(See Part I, Chapter One, and Appendix B.)*

(1) Do you have sufficient RAM to run the Navigator?

• Check both System and application memory.

*Note:* Running with voice in large applications or with Multifinder on greatly increases memory requirements. Two megabytes of memory or more are recommended in such cases. Also, if you have done many retrainings of words the memory needed increases significantly (retrain selectively for this reason).

---

Problem

*Voice Train not working properly to train words.*

Checklist

*(See Part II, Voice Train.)*

(1) Have you installed Voice Train on your active hard disk?

(2) Have you opened up Voice Train (by double clicking on the icon for Voice Train, the icon for the Word List, or the icon for the Voice File)?

(3) Have you selected the correct Word List and Voice File for your application in response to the dialog boxes?

• If no Voice File has been created yet for this Word List, have you clicked New in the Voice File dialog box?

(4) Is the microphone turned on if there is an on/off switch?

(5) Have you clicked the Train button (so that the chevrons appear: >>Train<<)?

(6) Did you say the voice command that was highlighted?

*Note:* If you want to train a word that is different from the one displayed, click to select a word out of order.

(7) Did you say the voice command without pausing between words if it is a phrase with several words in it?

(8) Did you pause between repetitions of the voice command (1/4 second minimum)?

(9) Did you say the voice command the number of times set on the training gauge?

(10) Were amplitude levels sufficient?

• Did you speak loudly enough? A minimum of 4 to 5 LEDs should light up in red on the Speech Box, with 6 or 8 preferred for best amplitude.

• Are you close enough to the microphone? If using a hand-held microphone, it should be no more than 5" away from your mouth. If using the headset, the microphone should be no more than 1/2" away.

• Is the microphone aimed toward your mouth if you are using the microphone provided with the Navigator as a tabletop device?

(11) Did an extraneous noise mistakenl, record as a training?

• Try to minimize ambient noise.

• If the click of the microphone switch is being recorded accidentally as a training:

- Turn the switch on before clicking the Train button, or
- Leave the switch on as you train instead of clicking it on and off, or
- Slowly and quietly move the switch on and off if you are in the midst of training.

(12) Are you saying a word that is displayed in the Word List?

• If the word is on a different level, it cannot be trained until it is displayed.

- *To go down a level*: Double click on an arrow-marked word

- *To go up a level*: Click in the top section of the list (where the number of words in the list is indicated); OR

- If you have already trained "Scratch That" or "First Level," saying these words will bring you up one level or all the way to the first level.

(13) Is each training you give a word radically different in pronunciation? Each training should be somewhat similar. Wide differences will result in a training being rejected. The training gauge will not register the training as accepted (the gauge will not rise), or after the last training the word will be presented again for training.

---

Problem

*Voice Train not working properly to test words.*

Checklist

*(See Part II, Voice Train.)*

(1) Have you loaded the correct Word List and Voice File for the word you want to test?

(2) Is the microphone turned on?

(3) Have you clicked the Test button (so that the chevrons appear: >>Test<<)?

(4) Did you say a voice command that is currently displayed?

• If the word is on a different level, it cannot be tested until it is displayed (when it becomes active).

• To bring up another level:

- *To go down a level*: Double click on an arrow-marked word

- *To go up a level*: Click in the top section of the list (where the number of words in the list is indicated); or

- If you have already trained "Scratch That" or "First Level," saying these words will bring you up one level or all the way to the first level.

(5) Is the word you are saying trained? A diamond mark indicates a trained word.

(6) Are you testing with Show All Levels on?

• If so, there are too many words for the Navigator to match against to test a word accurately. Testing as well as training should be done with Show All Levels off.

• To turn off Show All Levels, go to the Options menu and select Show All Levels (the check will disappear).

(7) Have you set the Confidence Level too high?

• 100% confidence is too high; 90% may be too high. 80% or under is recommended.

(8) Are you speaking in a way that is consistent with conditions when you trained?

• Did you speak loudly enough? A minimum of 4 to 5 red LEDs should light on the Speech box.

*Note:* Do not speak too loudly or softly when testing compared to the amplitude when you trained. Similar amplitude is better than speaking extra loudly when testing.

• Are you close enough to the microphone? The distance should be similar to what it was when training. If using the headset microphone, it should be no more than 1/2" from your mouth.

(9) Did you pronounce the voice command as trained?

• Did your pronunciation differ too greatly from your pronunciation when you trained the word?

• Be sure to pause before and after saying a voice command.

• If the command consists of a phrase with more than one word, you should not pause between the words in that command.

---

Problem

*Voice Control does not start up when an application is opened up.*

Checklist

*(See Part III, Voice Control.)*

(1) Is Voice Control activated?

• Press Command-Clear or Command-Escape to activate Voice Control the first time you want to use voice in an application. This will bring up Word List and Voice File dialog boxes. Select the correct files for the application you are using.

• Have you previously turned off Voice Control by selecting the dimmed headset icon in the Voice Options dialog?

- If so, press Command-2 to bring up the Voice Options dialog box.

- Click on the bold headset icon. Then click OK.

• Have you held down the Option key while launching an application? This deactivates voice for that application. To reactivate, press Command-Clear or Command-Escape while in the application.

(2) Do you have a Word List for that application? If not, you can create a Word List with Language Maker.

(3) Have you trained the Word List and created a Voice File for that application? Have you saved the Voice File?

(4) Did you load the correct Word List and Voice File the first time you wanted to use voice in that application? Did you save the User Settings when you quit the application so that the correct Word List and Voice Files would automatically load when you started up the application in the future?

(5) Have you changed the User Settings to bring up a Voice File for a different user if several people are using the same Word List on the same disk? To bring up your own Voice Files, click on the Voice Settings icon in the Voice Options dialog and select the correct user.

---

Problem

*You say a word in Voice Control but it is not recognized.*

Checklist

*(See Part III, Voice Control.)*

(1) Is the microphone switched on if there is an on/off switch?

(2) Is voice recognition on?

• Did you say "Go to sleep" to deactivate recognition? Say "Wake up" to reactivate.

• Did you press Command-Clear or Command-Escape to temporarily deactivate Voice Control? Press either of these keys to reactivate Voice Control.

(3) Did you train the word?

• If you are not sure, say "Word List" or press Command-1 (from the numeric keypad) to bring up the Word List. See if there is a diamond mark next to the word.

• If you are not on the correct level to find the word, you may need to go up or down a level:

- *To go up levels,* say "Scratch That" or "First Level" ;

- *To go down levels,* say the words that trigger the correct level of the word you wish to say.

• If you did not train the word, you can train while in Voice Control.

- Double click on a word in the Word List.

- Say the word the number of times indicated.

- Say the word to leave the Word List and return to the application.

(4) Is the word on the level of words that are active at the time?

• Check the Last Word Prompt to see what word was last recognized. That word triggers the current level of words that is active.

• To see whether the word is on the active level, call up the Word List (say "Word List" or press Command-1).

• To make the level active, say the word necessary to trigger the level becoming active; or say "Scratch That" to move up one level, or "First Level" to move directly to the First Level.

(5) Did you pronounce the word as it was trained?

• Use similar pronunciation

• Say the word as loudly or softly as you trained it

• Use the same microphone you used for training the word, and set it at about the same distance from your mouth.

(6) Do you have the Confidence Level set too high?

• If you set the Confidence at 90% or 100%, it may be too high for recognition unless you say the word exactly as you trained it.

• To lower the Confidence Level, say "Voice Options" or press Command-2 ( from the numeric keypad). Change the Confidence Gauge. Click OK.

(7) Is the wrong word recognized?

• Was a word that sounds similar to the one you said recognized?

- Say "Scratch That" to erase the last word recognized.

- Say the word again more clearly and distinctly.

OR

• See if the right word is listed in the Close Calls pop-up box:

- If you have set the Close Calls gauge at 40 and the Confidence Level at 80, you should see a close calls box with the correct word in it.

- Say the number corresponding to the correct word if it is in the Close Calls list.

• Did an extraneous noise mistakenly trigger recognition? If so, the word that was recognized may not resemble the word you say. Say the word again.

---

Problem

*The word you say is recognized, but the computer does not respond the way you expected.*

Checklist

*(See Part III, Voice Control, and Part IV, Language Maker.)*

(1) If you are using a Mac Plus, did you say the name of a menu and then click on a menu item, only to have nothing happen (everything freezes up)?

• The Mac Plus is unique; you must say the name of a menu item if you have already said the name of the menu it is under (with all other models of the Macintosh, the SE or the II, you can alternate saying commands and then clicking without restriction).

• To get out of the "frozen" state, press the space bar. Either use voice for selecting both the menu name and menu item, or use the mouse for both operations.

(2) Did you elevate the level of the word in Language Maker?

• If other events need to occur before saying a word (such as a dialog box coming up), elevating the level of the word in Language Maker may have cut out the rest of the events that need to take place.

(3) If an application is not written to Apple specifications, there may be some anomalies in how it works with the Navigator.

Appendix D

Glossary

*Action Window*

The Action window is a dialog box in Language Maker used to create new voice commands or modify existing commands.

*See Part IV.*

*Active Words*

A Word List can consist of many levels (groups) of words. Active words are the level of words that are available for using as voice commands at a particular time. Different levels of words can become active depending on what word was said previously. The rest of the words are temporarily inactive (with the exception of global words, which are always active).

With the Voice Navigator the maximum number of active words in any active level is 200; with the Voice Navigator XA it is 1000. However, the total number of voice commands for each application can be much larger, and is limited only by considerations such as memory limitations of the computer system being used.

*See Part I.*

*Base Word List*

The Base Word List contains voice commands that are shared by many application Word Lists. By training the Base Words once, shared words do not have to be retrained for other Word Lists. The trainings can be automatically transferred from the Base to other Word Lists.

*See Part I.*

*Close Calls*

In Voice Train, Close Calls are trained words that are presented as alternatives to a word recognized by the Navigator.

In Voice Control, the Close Calls pop-up menu contains up to six choices of words that the user can select to be recognized as a word just spoken. Close Calls appear when a word cannot be recognized with high enough confidence. The Confidence Gauge must be set at about 80% and the Close Calls gauge at about 40% in the Voice Options dialog for the Close Calls box to appear in such cases.

*See Parts II and III.*

*Confidence Gauge & Confidence Level*

The Confidence Gauge is a way of setting the Confidence Level for recognition. The Confidence Level is the level of certainty the Navigator must have that it will correctly recognize a word just spoken. If the level is lower, no word will be recognized.

For example, setting the gauge at 80% means the Navigator must be at least 80% certain of a correct match between what is spoken and a previously trained word. When a voice command is spoken, the needle on the Confidence Gauge registers how closely the spoken word resembles a trained word. The needle must fall within the Confidence Level previously set for recognition to take place. If it is lower than 80%, no recognition will occur.

*See Parts I and II.*

*Global Click*

A global click is a mouse click recorded in Language Maker so that its location is defined in relation to the entire Macintosh screen (rather than a local window where the click might have occurred). As a result a voice command is created that will cause the click to always occur in the same location relative to the screen.

*See Part IV.*

*Global Command*

A global command is a voice command that is active on every level. It can always be said no matter what level of words is active. Examples of global words are Word List, Voice Options, First Level.

*See Parts I, II, and III.*

*Go To Sleep*

"Go to sleep" is a voice command that temporarily suspends full recognition of any word or sound picked up by the microphone after "Go to sleep" is spoken. A word still appears in the Last Prompt Box at the menu bar, but the action that would normally take place in the application does not occur. This is a convenient way to temporarily interrupt voice recognition in lieu of switching off the microphone or deactivating voice recognition more permanently. Cf. "Wake up" to reactivate recognition after "Go to sleep" is spoken.

*See Part III.*

*Group Name*

A group name is a convention used for grouping voice commands in Language Maker. A group name is not a voice command in itself, but a heading under which related voice commands are listed in a Language. For example, Quit Print is a group name for words used to quit the Print dialog (words such as OK and Cancel).

*See Part IV.*

*ID Number*

An ID number is a number set on a dial in back of the Speech Box that serves as the Speech Box's "address." The ID number of the Speech Box cannot be the same as the ID number of any other SCSI device connected directly or indirectly to the Speech Box. If it is the same, the ID number can be changed.

*See Part I.*

*Installer*

The Installer provides an automatic way of installing three elements of Navigator software into the System folder: Voice Driver, Voice Prep, and Voice Control. Installation can also be tested with this procedure.

*See Part I.*

*International Alphabet*

The international alphabet consists of words that stand for letters of the alphabet, such as Alpha for A, Beta for B, etc. These words are more accurate to use for voice commands rather than names of the letters themselves because they are easier to recognize (they generally have more than one syllable and are distinct from each other).

*See Part IV.*

*Language*

A Language is a set of words that will be used for voice control in an application. The Language first must be compiled into a Word List and then trained before the words can be spoken in an application. Languages are created and modified by Language Maker.

*See Part IV.*

*Language Maker*

Language Maker creates Word Lists for applications that do not have Word Lists supplied, so that these applications can be used with voice control. Language Maker can also modify Word Lists originally created with Language Maker. Word Lists can be customized in a wide variety of ways, such as changing the levels of words, creating voice macros for long strings of text, inserting clicks or mouse-down/mouse-up features, etc.

*See Part IV.*

*Last Word Prompt*

Last Word Prompt is a box in the menu bar that displays the last voice command recognized when using Voice Control.

*See Part III.*

*Launch*

Launch is a voice command that will open up an application when in the Finder. For example, you can say "Launch MacWrite" or "Launch MacDraw" if these application names are in the Finder Word List on a level under the Launch command. Note that the application will only be launched if it is on the desktop or not more than one-level deep (that is, inside one folder at most).

*See Part IV.*

*Levels of Words*

Levels of words are sets of words in a Word List that become active at a particular time. The first level of words is active when you first begin working in an application. Another level can become active when you say a word that triggers a different level. Each level can have up to 200 or 1000 words, depending on the Voice Navigator model being used.

*See Parts I, II and III.*

*Local Click*

A local click is a mouse click recorded in Language Maker with the location marked by coordinates relative to the local window (the window in which the click occurs). The other option is to use coordinates relative to the entire Macintosh screen (cf. Global Click).

*See Part IV.*

*Modal Dialog*

A modal dialog is a dialog box that cannot be moved around the screen. It also does not allow any other action to take place in the application until the dialog is quit (e.g., by clicking Cancel or OK). Examples: Page Setup and Print dialogs.

*See Part IV.*

*Model*

A model (or voice model) is a representation of the ways a word was pronounced when trained. This representation is stored in a Voice File. When the word is spoken during an application, all of the models for words on the active level are compared to the spoken command. If the command is correctly matched with its model, accurate recognition results.

*See Parts I and II.*

*Output*

The Output for a voice command is a way in which the command is interpreted by Voice Control in order to execute an action. The general format of the Output is determined by the type of action, and the specific content of the format is determined by the specific voice command. For example, if menu selection is the type of action, the general format is: @MENU(menuname, menuitem or menunumber). @MENU(File,#2) selects the second menu item under the File menu. In Language Maker, the format for voice commands can be displayed or changed.

*See Part IV.*

*Recognition*

Recognition takes place when the Navigator matches a spoken word with a trained word in an application's Word List. When using Voice Control, recognition results in a word appearing in the Last Word Prompt box and possibly an action taking place in the application (such as a menu selected). When using Voice Train to test words, recognition simply results in a word displayed in the window (no action occurs).

*See Parts II and III.*

*Recognition Errors*

Recognition errors are of two kinds:

(1) An incorrect word is recognized instead of the word actually said, or
(2) No word is recognized even though a word was said. Repeating a word, retraining a word, or adjusting the Confidence Level are some of the ways to correct recognition errors.

*See Parts II and III.*

*Root Commands*

"Root commands" is a name used for grouping together commonly used commands in a Language displayed in Language Maker. Root commands are words available on the first level, such as OK and Cancel. The name "root commands" is a convention only, and could be changed to any name without changing the function of the commands themselves.

*See Part IV.*

*SCSI Device*

A SCSI device is a device such as an external hard disk or the Speech Box that is connected to the computer via SCSI cables that hook into SCSI ports. It is important to determine the order of SCSI devices in the chain so that the termination status of the Speech Box can be set (Cf. termination below.)

*See Part I.*

*Scratch That*

"Scratch that" is a voice command that causes the last word recognized to be erased. If the last word recognized triggered a lower level of words to become active, Scratch that causes the Navigator to go back up one level higher. Each time "Scratch that" is spoken the Navigator goes another level higher until the first level is reached.

*See Parts II and III.*

*Sequence*

Sequence refers to the order in which voice commands must be said. The order is determined when the commands are created in Language Maker. A word prefixed by an & sign in the Language means that the commands in the level below that word must be said in the order in which they are listed. Otherwise, the commands in a level can be spoken in any order

*See Part IV.*

*Speech Box*

The Speech Box is the hardware that makes the Voice Navigator work. It comes with a built-in microphone or it can be connected to an external microphone to receive speech and convert the signals to digitized form.

*See Part I.*

*Termination*

A terminator is an electrical resistor attached to SCSI devices such as the Speech Box. The terminator can either be switched on or off. If it is on, the Speech Box is terminated; if it is off, the Speech Box is not terminated.

Whether to switch termination on or off is determined by the way the Speech Box is connected to the computer and/or other SCSI devices in the system.

*See Part I.*

*Testing*

Testing of words should be done after training words in Voice Train. Testing involves pronouncing trained words, and seeing whether accurate recognition takes place. The results of testing may indicate that certain words should be retrained, pronounced more distinctly, etc.

*See Part II.*

*Training*

Training words involves saying the words in an application's Word List so that the user's pronunciation is saved in a Voice File. Trained words are then available for recognition. Training takes place primarily in Voice Train, but can also be done in Voice Control.

*See Parts II and III.*

*Vocal*

Vocal is the software that enables a Language File to be compiled into a Word List. The resulting Word List is then trained and used to run an application with voice. The Language Files that come with the Navigator are already compiled into Word Lists. Vocal is only used if changes are made to the Language or a new Language File is created.

*See Part IV.*

*Voice Command*

A voice command is a word or phrase in an application's Word List that can be spoken by the user and recognized by the Navigator. A single voice command consisting of more than one word should be spoken with no pause between the words. However, there must be a short pause before saying the next voice command.

*See Parts I, II and III.*

*Voice Control*

Voice Control is the software that enables voice recognition to take place while running an application. It is installed in the System Folder as an INIT. Voice Control automatically loads an application's Word List and Voice File after the first time the application is operated with voice.

*See Part III.*

*Voice Driver*

The Voice Driver is installed in the System Folder, and enables the Voice Navigator to work.

*See Pa. I.*

*Voice File*

A Voice File contains the voice commands in an application's Word List that have been trained. To run an application with voice, both the Word List and Voice File must be loaded. A separate Voice File should be created by each person using voice commands to ensure accurate recognition. (Cf. Training.)

*See Parts I and II.*

*Voice Navigator*

The Voice Navigator is a voice recognition system for the Macintosh. It enables applications to be operated with voice control, as though the operations had been done with the keyboard or mouse.

*See Parts I, II, III and IV.*

*Voice Options*

Voice Options is a dialog box with settings for the number of trainings, confidence level, microphone type, etc. while using Voice Control.

*See Part III.*

*Voice Prep*

Voice Prep is installed in the System Folder, enabling the Voice Driver to run the Voice Navigator.

*See Part I.*

*Voice Settings File*

The Voice Settings file is created by Voice Control and stored in the System Folder. The file links together the name of an application and its appropriate Word List and Voice File. A Voice Setting is created after an application is first opened in Voice Control and the Word List and Voice File are manually loaded. The information is stored in the Voice Settings File, and from then on it will automatically cause the correct Word List and Voice File to be opened when the application is opened.

*See Part III.*

*Voice Tools*

Voice Tools is the name of the folder containing several pieces of Navigator software to be installed: Voice Train, Language Maker, and Vocal.

*See Part I.*

*Voice Train*

Voice Train is software that allows the user to train and test voice commands in an application's Word List. Voice Train creates a Voice File that is opened with the Word List when voice is going to be used in applications.

*See Part II.*

*Wake Up*

"Wake up" is a voice command that restores full voice recognition after "Go to sleep" was spoken to temporarily suspend full recognition.

*See Part III.*

*Word List*

An application Word List is a group of words and phrases that have been designed as voice commands for that application. Word Lists are provided for many Macintosh applications and can be customized with Language Maker. Word Lists for applications without Word Lists also can be created with Language Maker.

*See Part IV.*

Appendix E

Navigator Reference

1. Introduction

This appendix summarizes how to use the Voice Navigator. It is not meant as a substitute for the manual, but an outline of some of the key points.

Sections 2-4 cover hardware and software installation, training and testing words with Voice Train, and using words in applications with Voice Control. Consult the chapter references for a full explanation of any of these topics.

Section 5 lists useful tips for working with the Navigator while using Voice Control.

2. Installation

Hardware

*Consult Part I, Chapter Two.*

(1) Connect the Speech Box.

• Change the SCSI ID Number of Speech Box if it conflicts with the ID of any other device connected to your system. To change the number, rotate the dial at the rear of the Speech Box to a free number.

• Set Speech Box termination according to its position in the chain of devices connected to the computer.

- Rule of thumb:

*Terminate* if at the beginning or end of the chain.

*Do not terminate* if in the middle (first and last devices already terminated).

- To set termination: With power off, push the small plastic tab at the bottom of the Speech Box in the required direction.

*Terminated*: Push tab away from the rear of the box.
*Not terminated*: Push tab towards the rear of the box.

- Confirm:

*If terminated:* With power on, the LED beneath the SCSI Output port is red.

*If not terminated:* Both LEDs below SCSI ports are green.

• Use SCSI cables to connect Speech Box to the computer or other SCSI device. LEDs at front of box should light up (first one green, the rest red).

(2) Connect the microphone (if using an external microphone).

• Plug microphone into ports at front of Speech Box.

(3) Connect external speaker if desired.

Software

*Consult Part I, Chapter Three.*

(1) Voice Tools:

• Voice Train - Copy onto hard disk.

• Language Maker & Vocal - Only needed if modifying Word Lists or creating new Word Lists for applications that do not have prepared Word Lists:

- Install Language Maker with Font/DA Mover or Suitcase.
- Copy Vocal onto hard disk.

(2) Word Lists:

• Copy onto hard disk Base and Finder Words, as well as Word Lists for applications to be used with voice.

(3) Languages:

*Note:* Only necessary if using Language Maker to modify the Languages and create altered Word Lists.

• Copy onto hard disk the Languages for applications to be used with voice. Include Base and Finder Languages.

(4) Drivers (Voice Driver, Voice Prep, Voice Control) - For automatic installation:

- Double click on the Installer.
- Click Install button. Message reads "Installation was successful."
- Click Test after installation. Message reads "The Macintosh is Listening."
- Click Restart. The Dragon icon appears, "Initializing Voice Drivers."

3. Train and Test Words with Voice Train

*Consult Part I, Chapters 4 to 6, and Part II.*

*Example*: Train Base Words, transfer training to Finder Words.

Train Words (1) Double click on Base Words icon.

(2) Dialog box: *Locate Voice File*. Click "New."

(3) Adjust microphone for best voice pickup and least background interference:

(4) Set options if desired:

- Type of microphone (if not external) : Select Microphone . . . . from File menu.
- Alphabetize Word List: Select Alphabetize from File menu.
- Show All Levels (to see all the words in the list at once -- not recommended for training, but useful at the beginning to see the entire Word List): Select Show All Levels from File menu.
- One Column List (to see the words in a single column rather than two columns, the default): Select One Column from File menu.
- Number of trainings: To change the default (3), drag the arrow on the training gauge up or down.
- Confidence Level: To change the default (80%), drag the arrow on the Confidence Gauge to the left or right to lower or raise the Confidence Level.

(5) Click on Train button.

(6) Say first word presented in upper-left corner.

(7) Check voice amplitude: At least 4 or 5 LEDs at front of Speech Box should flicker red as you speak, optimally all 8 at peak of utterance.

(8) Check background noise: No more than one or two LEDs should flicker on when microphone is on but you are not speaking.

(9) Train Base Words

• If a voice command has more than one word in it, do not pause between words.

• Do pause before and after saying a complete voice command.

• Train the word by saying it the number of times set on the training gauge (three times recommended). If training is accepted after the last time you say the word, the next word will be presented.

• Continue down the list until all displayed words are trained.

• To train words on another level, double click on any word with an arrow. Train the words on this lower level.

• To go back to the first level, click anywhere in the top section of the box indicating the number of words in the level, or say *First Level* if this command is trained.

• Double click on another arrow-marked word, and train these. Continue until all words on every level of the list have been trained.

(10) Go to the File menu and select Save. Name the file (the default name is *Name of Application + Voice*, e.g. Base Voice).

Test Words (1) Click on Test button. Say any word in the list you have trained (any word with a diamond sign). Word must appear in the display (showing it is active) in order to test the training.

• If word is not displayed (it is not currently active), bring up the level on which the word appears (to activate the level).

- Go down a level by double-clicking on an arrow-marked word

- Go up a level by clicking in the top section of the Word List or say

"Scratch That" to go up one level, or "First Level" to go up to the first level if these commands are trained.

(2) Recognized word appears in upper left corner.

• If this word would have triggered another level of active words, the list changes to show the new level displayed.

(3) If no word appears, or the wrong word (check the Close Calls box to see if the word appears here):

• Speak more clearly and pronounce the word closer to the way you trained it.

(4) Retrain words constantly misrecognized (words not trained properly, words that sound alike):

• Click or shift-click on words to be retrained.

• Click on Train button

• Pronounce words more distinctly.

• If necessary give problematic words a larger number of trainings than other words (adjust training gauge).

• If words that sound alike are confused, add a second word to one of the commands, e.g. "Style menu" instead of "Style" (which sounds like "File).

*Note:* Retraining a word replaces the previous training. However, the memory taken up by the model of that trained word increases with retraining. If you have tight memory constraints, retrain selectively and be sure to have a backup copy of the Voice File saved.

(5) Save the Voice File again.

Transfer Training to Another Word List

If you transfer trained Base Words to another Word List (such as the Finder) you do not have to train standard words over again. To transfer:

(1) Select Open Word List from File menu.

(2) Select Finder Words (or any other Word List).

(3) Load Base Voice (if not already loaded). Any words in the new Word List that were already trained in the previous Voice File now appear trained (diamond marks next to them).

(4) Save as a new Voice File (select Save As from the File menu and give the Voice File a new name, e.g. Finder Voice).

(5) Train any untrained words in the new Word List.

(6) Save the new trainings (select Save from the File menu).

(6) Quit Voice Train.

4.
Use Voice Control

*Consult Part III.*

(1) Bring up the application you want to use with voice (e.g., the Finder).

(2) Press Command-Clear or Command-Escape the first time you use the application with voice.

(3) When dialog boxes appear, select the appropriate Word List and Voice File.

(4) A headset icon appears around the Apple menu icon.

(5) Say any trained word on the first level (the level of words active when you first begin using Voice Control with that application).

• For a reminder of First Level words, say "Word List." (Saying Word List will bring up the active words on whatever level was triggered by the last word recognized; if none was recognized yet, it will bring up First Level words.)

• After saying a word, the word that was recognized appears in the Last Word Prompt box at the far right corner of the menu bar.

• The Macintosh responds as though you had used the mouse or keyboard instead of speech.

(6) For a reminder of active words on any level: Say "Word List."

(7) To erase the last word recognized and go back up one level, say "Scratch That."

(8) To return directly to the first level of active words, say "First Level."

(9) To temporarily turn off recognition:

• Use microphone on/off switch if your microphone has one, or

• Say "Go to sleep" ("Wake up" will restore recognition), or

• Press Command-Clear or Command-Escape (the same keys will restore recognition).

(10) To train or retrain while in Voice Control:

• Say "Word List."

• Double click on the word you want to retrain.

• Say the word the number of times indicated.

• Exit from the Word List (say any word).

(11) To change options such as number of trainings, type of microphone used, etc.:

• Say "Voice Options" or press Command-2 (from the numeric keypad).

• Make desired changes, then click OK.

(12) When exiting the application, a dialog box asks if you want to save any changes made to the Voice File (e.g. new trainings). Click Yes to save.

(13) A second dialog box appears asking whether the user wants to save the User Settings. Click Save (if you have changed any settings in the Voice Options dialog box).

5.
Tips for Working with the Navigator

This section will serve as a handy reminder while using Voice Control in applications.

*To load Word List/Voice File the first time you go into an application*

Press Command-Clear or Command-Escape

*To bring up the Word List*

Say "Word List" or Press Command-1 (from numeric keypad)

*To bring up Voice Options*

Say "Voice Options" or Press Command-2 (from numeric keypad)

*To change levels*

Say "Scratch That" to erase last recognition and go up one level at a time

Say "First Level" to go to the first level

*To turn voice off and on*

1. Temporarily suspend full recognition (partial recognition still exists, word displayed but no action takes place):

Say "Go to sleep" - "Recognition off"
Say "Wake up" - Recognition on.

2. Deactivate voice one time only while launching an application:

Hold down Option key while launching.

To reactivate voice while still in application:

Press Command-Clear or
Press Command-Escape.

3. Permanently deactivate voice for one application (from now on whenever application is launched, voice will not be activated):

Say" Voice Options" to open dialog box. Click dimmed headset button. Click OK. When quitting application, save new setting by clicking "Save" in User Setting dialog box.

To reactivate voice:

Press Command-2. Click bold headset in dialog. Click OK. Save new User Setting.

4. Deactivate voice for all applications:

Press Command-Clear or Command-Escape.

To reactivate, press same key combination.

*To change a Word List or Voice File while using Voice Control*

Say "Voice Options" or Press Command-2 (from numeric keypad).

Click on Word List or Voice File icon and select new file.

*To change user settings in Voice Control (automatically bring up a different user's Word Lists & Voice Files)*

Bring up Voice Options: Say "Voice Options" or Press Command-2.
Click on Voice Settings icon;
Open setting for new user;
Click OK.
When leave Voice Options, click OK.

*To start a new Voice Settings file*

Bring up Voice Options (Say "Voice Options" or Press Command-2).
Click on Voice Settings icon. Select new Voice Settings file.

*To use the Close Calls pop-up menu*

Bring up Voice Options
(Say "Voice Options" or Press Command-2).

Set Close Calls gauge at 40% and Confidence at 80%.

Click OK to exit dialog.

If Close Calls box appears, say the number corresponding to the correct word (up to 5 words will be listed).

*To increase recognition accuracy*

• Choose a microphone appropriate to your working conditions and personal preferences.

• If using headset that comes with the Navigator, make sure distance and angle are consistent (at corner of mouth, 1/2" away maximum).

• Train each word several times. Pronounce similar- sounding words with extra care (clearly & distinctly).

• Users should train & load their own Voice Files for each application.

• Conditions while in Voice Train & Voice Control should be consistent (level of ambient noise, loudness/softness of voice, pronunciation of words, same microphone, microphone position & distance of speaker from microphone).

• Pause slightly (1/4 second) between voice commands.

• Do not pause between words that constitute a single voice command.

• Words must be trained and in the level of words active at the time to be recognized.

• Remember any changes made to the Word List (substituting words or abbreviations).

• Experiment with Confidence Level to achieve best results.

Appendix F

Technical Specifications

Speech Box

Processor
TMS 320C10; 16-bit data bus; 14.3 MHz

Memory
8K words 100ns static RAM
Expandable to 64K words

Analog/Digital Converter
8-bit υlaw, compounded
8 stages of software-controlled gain
For effective 12-bit bandwidth

Digitizer
0-48 kHz program selectable sampling rate

Speaker
3.5" speaker; 1 watt amp; 8 ohms

SCSI Interface
NCR 53C90 controller/driver chip
Maximum transfer rate: 256 Kb/sec
(limited by Macintosh)

Line Voltage
110 volts, 60 Hz

Power Supply
8 volts AC at 2 amps

Internal Microphone
Electret microphone (-68 dB sensitivity)

Telephone Interface
RJ-11 telephone line jack
RJ-11 telephone jack
Ringer equivalence: 1.1 B
Local telephone power: 24 volts
Off-hook detector sensitivity: 15 Ma
DTMF tone output level (-10 dBm)
DTMF receiver sensitivity (-32 dBm)
Call progress sensitivity (-40 dBm)

Dimensions and Weight

| | |
|---|---|
| Width: | 9.6" |
| Depth: | 9.25" |
| Height: | 1.7" |
| Weight: | 2.63 lbs. |

*Speech Recognition System*

Discrete utterance recognizer
Speaker dependent

*System Requirements*

Macintosh Plus, SE, or II
1 Mb RAM required, 2 Mb recommended
System Version 6.0 or later
Custom SCSI cable, power supply, and microphone (included)

*Models*

Voice Navigator
Unlimited commands for each application;
200 commands per level.

Voice Navigator XA
Unlimited commands for each application;
1,000 commands per level.

A portion of the disclosure of this patent document contains material which is subject to copyright protection (for example, the microfiche Appendix, the User's Manual, and the Reference Manual). The copyright owner has no objection to the facsimile reproduction by anyone of the patent document or patent disclosure, as it appears in the Patent and Trademark Office patent file or records, but otherwise reserves all copyright rights whatsoever.

Appendix A: Voice Control Command Language Syntax

Menu Command - @MENU(menuname,itemnum).

Finds item named itemnum in the menu named menuname and selects it. If itemnum is 0, hold the menu down.

Control Command - @CTRL(ctlname)

Finds the control named ctlname and clicks in its rectangle.

Key Pad Command - @KYPD(n), where n = 0-9, -, +, *, /, =, and c for clear

Posts a Keydown for keys on the numeric keypad.

Zoom Command - @ZOOM

Clicks in the zoom box of the front window.

Local Mouse Click Command - @LMSE(y,x)

Clicks at local coordinates (y,x) of the front window.

Global Mouse Click Command - @GMSE(y,x)

Clicks at the global coordinates (y,x) of the current screen.

Double Click Command - @DCLK(y,x)

Double clicks at the global coordinates (y,x) of the current screen. If y=x=0, double click at the current Mouse location.

Mouse Down Command - @MSDN

Set the mouse button state to down and set up traps to keep it down.

<u>Mouse Up Command</u> - @MSUP

Set the mouse button state to up.

<u>Scroll Down Command</u> - @SCDN

Post a mouse down in the down arrow portion of the front window's scroll bar.

<u>Scroll Up Command</u> - @SCUP

Post a mouse down in the up arrow portion of the front window's scroll bar.

<u>Scroll Left Command</u> - @SCUP

Post a mouse down in the left arrow portion of the front window's scroll bar.

<u>Scroll Right Command</u> - @SCRT

Post a mouse down in the right arrow portion of the front window's scroll bar.

<u>Page Down Command</u> - @PGDN

Click in the page down portion of the front window's scroll bar.

<u>Page Up Command</u> - @PGUP

Click in the page up portion of the front window's scroll bar.

<u>Page Left Command</u> - @PGLF

Click in the page left portion of the front window's scroll bar.

<u>Page Right Command</u> - @PGRT

Click in the page right portion of the front window's scroll bar.

<u>Move Command</u> - @MOVE(δy,δx)

Move the Mouse from its current location (y,x), to a new location (y+δy,x+δx) where δy and δx are pixels and can be either positive or negative values.

<u>Move Continuous Command</u> - MOVI(δy,δx)

Move the mouse continuously from its present location, moving $\delta y, \delta x$ every refresh of the screen.

Move to Local Coordinate Command - MOVL(y,x<,windowname>) or MOVL(n<,y,x<,windowname>> where n=N,S,E,W,NE,SE,SW,NW,C,G Move the cursor to the local coordinates given by (y,x) or by (n.v+y,n.h+x). Use the grafPort of the window named "windowname". If there is no "windowname" use the grafPort of the front window.

Move to Global Coordinate Command - @MOVG(n,<y,x>)

where n=N,S,E,W,NE,SE,SW,NW,C,G move the cursor to the global coordinates given by (y,x) or by (n.v+y,n.h+x). Use the grafPort of the screen.

Option Key Down Command - @OPTD

Press (and hold) the option key.

Option Key Up Command - @OPTU

Release the option key.

Shift Key Down Command - @SHFD

Press (and hold) the shift key.

Shift Key Up Command - @SHFU

Release the shift key.

Command Key Down Command - @CMDD

Press (and hold) the command key.

Command Key Up Command - @CMDU

Release the command key.

Control Key Down Command - @CTLD

Press (and hold) the control key.

Control Key Up Command - @CTLU

Release the control key.

Next Window Command - @NEXT

Sends the front window to the back.

Erase Command - @ERAS

Erase the last numChars typed.

Capitalize Command - @CAPS

Capitalize the next letter typed.

Launch Command - @LAUN(application_name)

Launch the application named application_name. The application must be on the boot drive no more than one level deep.

Wait Command - @WAIT(nnn)

Wait for nnn ticks to elapse before doing anything else in recognition.

Appendix B: Macintosh OS Globals

Interfacing to the Macintosh Operating System requires that certain low memory globals be managed by Voice Control. The following describes the most important globals. Further information is available in "Inside Macintosh", Vols. I-V.

Mouse Globals

MickeyBytes EQU $D6A - a pointer to the cursor value; used to control the acceleration of the mouse. Set to point to tablet whenever the mouse is moved more than 10 pixels. [pointer]

MTemp EQU $828 - a low-level interrupt mouse location; used to move the mouse during VBL handling while executing a @MOVI command. [long]

Mouse EQU $830 - the processed mouse coordinate; used to move the mouse for all other @MOVx commands. [long]

MBState EQU $172 - current mouse button state; used to set the MouseDown for @MSDN and for @MENU when itemname = 0. [byte]

Keyboard Globals

KeyMap EQU $174 - keyboard bit map, with one bit mapped to each key on the keyboard. Set the bit to TRUE to set the Meta keys (option, command, shift, control) down. [2 longs]

Filter Globals

JGNEFilter EQU $29A - Get Next Event filter proc; set to Voice Control's main loop to intercept calls to Get Next Event. [pointer]

Event Queue Globals evtMax EQU $1E - maximum number of events in the event queue. When this number is reached, stop Posting events.

EventQueue EQU $14A - event queue header, the location of the Macintosh event queue. [10 bytes]

Time Globals

Ticks EQU $16A - Tick count, time since boot. Used to measure elapsed time between Voice Control actions. [long]

Cursor Globals

CrsrCouple EQU $8CF - cursor coupled to mouse? Used to disconnect cursor when doing remote clicks with @LMSE and @GMSE. [byte]

CrsrNew EQU $8CE - Cursor changed? Force a new cursor after moving the cursor. [byte]

Menu Globals

MenuList EQU $A1 Current menuBar list structure. This handle can be de-referenced to find all the menus associated with an application. Use for @MENU commands [handle]

Window Globals

WindowList EQU $9D6 - Z-ordered linked list of windows. This pointer will lead to a chain of all existing windows for an application. Use to find a window queue for all local commands. [pointer]

Window Offsets

These values are offsets within the window records that describe characteristics of the window. Once a window is located, these offsets are used to calculate:

thePort EQU 0 - GrafPtr; local coordinates for @LMSE and @MOVL commands.

portRect EQU $10 - port's rectangle [rect]; window relative forms of the @MOVL command.

controlList EQU 140 - used to find the controls associated with a window.

contrlTitle EQU 40 - used to compare control Titles for @CTRL commands.

contrlRect EQU 8 - used to calculate the click locations in a control.

nextWindow EQU 144 - used to locate the next window for the @NEXT command.

I claim:

1. A system for enabling voiced utterances to control window elements in a graphical user interface, said graphical user interface being provided by an operating system responsive to events posted in an event queue, some events in the queue being posted in response to signals received from an alphanumeric keyboard in accordance with a predetermined format specific to the keyboard, said events including higher level events, comprising a voice recognizer for recognizing voiced utterances, and an interpreter functionally connected to said voice recognizer for converting at least some of the voiced utterances into said higher level events for controlling said window elements and posting said higher level events to the event queue, without first converting said voiced utterances into signals expressed in the predetermined format specific to the keyboard.

2. The system of claim 1 wherein said higher level events posted by said interpreter mimic events fed to said event queue by a mouse.

3. The system of claim 1 wherein said one of said higher level events directs said program to wait for a predetermined time delay.

4. The system of claim 1 wherein said interpreter converts at least some of said voiced utterances to said higher level events based on each of said voiced utterances and on a state of said program.

5. The system of claim 4 wherein said interpreter further comprises stored data controlling said conversion of said voiced utterance to said higher level event, and means for generating a portion of said stored data by examining said program.

6. The system of claim 5 wherein said data are generated by examining menus and control buttons of an executable image of said program.

7. The system of claim 4 wherein said interpreter further comprises stored data controlling said conversion of said voiced utterances to said higher level events, means for viewing and editing said stored data.

8. The system of claim 1 further comprising stored data controlling said conversion of said voiced utterances to said higher level events, and an event recorder for generating a portion of said data by said event recorder examining an execution session of said program.

9. The system of claim 8 wherein said event recorder is implemented by code substituted for the code normally executed by a trap handler of said operating system.

10. The system of claim 9 wherein said event recorder examines the state of data structures maintained by said operating system.

11. The system of claim 8, wherein said event recorder can be rerun to incrementally re-generate a portion of said data.

12. The system of claim 8 further comprising a pointing device to control a location indicator on a display, means to control said event recorder with said pointing device, and means within said event recorder to distinguish pointer movements and pointer device button presses as either intended to produce commands to said program or to control said event recorder.

13. The system of claim 12 wherein said distinguishing means comprises a global variable tracking the state of the buttons of said pointer device.

14. The system of claim 1 further adapted to enable voiced utterances to be substituted for manipulation of a pointing device to control motion of a displayed location indicator on a computer display, the indicator being moved by an operating system in a computer in response to control signals received from the pointing device, and wherein said interpreter is further connected to said voice recognizer for converting voiced utterances into events which will cause desired movements of the indicator aided by the operating system.

15. The system of claim 14 further comprising a program for execution with said operating system, a state of said program comprising a configuration on said display, and wherein said higher level events posted by said interpreter direct motion of said indicator relative to said configuration.

16. The system of claim 15 wherein said configuration on said display comprises characters.

17. The system of claim 15 wherein said higher level events posted by said interpreter further direct said location indicator to the screen position said location indicator indicated immediately before said voiced utterance was recognized.

18. The system of claim 14 wherein one of said higher level events directs said location indicator to indicate a position specified by a local window-relative coordinate.

19. The system of claim 14 wherein one of said higher level events directs the location indicator to indicate a position specified by a global screen-absolute coordinate.

20. The system of claim 14 wherein one of said higher level events directs the location indicator to indicate a specified screen button or dialog box.

21. The system of claim 14 wherein one of said high level events directs the indicator to move from a current position (y,x) to a new position $(y+\delta y, x+\delta x)$.

22. The system of claim 14 wherein one of said high level events directs the location indicator to move continuously by a $(\delta y, \delta x)$ predetermined incremental distance per predetermined time interval.

23. The system of claim 22 wherein said one high level event is generated during a timer interrupt of said operating system, said timer interrupt occurring on the order of ten to one hundred times per second.

24. The system of claim 14 wherein said program provides user menu selections to be selected by pointer device movements and/or button presses, and wherein said interpreter produces a series of higher level events in response to said pointer device movements and/or button presses.

25. The system of claim 14 or 1 wherein said operating system is an operating system of a Macintosh computer, and said event queue is an event queue of said Macintosh operating system.

26. The system of claim 14 or 1 wherein said window elements comprise zooming windows.

27. The system of claim 14 or 1 wherein said window elements comprise moving windows nearer to or farther from the front of a set of windows.

28. The system of claim 14 or 1 wherein said voiced utterances are converted into events which will cause movement of the indicator in a desired direction aided by the operating system in the computer, said movement continuing unabated until stopped by an action of the user.

* * * * *